US009785305B2

(12) United States Patent
Alonso Ruiz et al.

(10) Patent No.: US 9,785,305 B2
(45) Date of Patent: Oct. 10, 2017

(54) TOUCH INPUT CURSOR MANIPULATION

(71) Applicant: Apple Inc., Cupertino, CA (US)

(72) Inventors: Marcos Alonso Ruiz, San Francisco, CA (US); Stephen O. Lemay, San Francisco, CA (US); Tiffany S. Jon, Cupertino, CA (US); Nicholas V. King, San Jose, CA (US); Imran A. Chaudhri, San Francisco, CA (US); Patrick L. Coffman, San Francisco, CA (US); Morgan H. Winer, Sunnyvale, CA (US); Nicholas K. Jong, Seattle, WA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/864,737

(22) Filed: Sep. 24, 2015

(65) Prior Publication Data

US 2016/0274761 A1 Sep. 22, 2016

Related U.S. Application Data

(60) Provisional application No. 62/135,619, filed on Mar. 19, 2015, provisional application No. 62/172,162, (Continued)

(51) Int. Cl.
*G06F 3/0481* (2013.01)
*G06F 3/0488* (2013.01)
(Continued)

(52) U.S. Cl.
CPC .......... *G06F 3/04812* (2013.01); *G06F 3/016* (2013.01); *G06F 3/0412* (2013.01); (Continued)

(58) Field of Classification Search
CPC ...... G06F 3/016; G06F 3/0414; G06F 3/0416; G06F 3/041; G06F 3/048; G06F 3/044;
(Continued)

(56) References Cited

U.S. PATENT DOCUMENTS 4,674,044 A 6/1987 Kalmus et al.
4,750,135 A 6/1988 Boilen
(Continued)

FOREIGN PATENT DOCUMENTS

CN 1658150 8/2005
CN 1661556 8/2005
(Continued)

OTHER PUBLICATIONS

Goldman, "The 12 Best Android Camera Apps Around," www.cnet.com/news/the-12-best-android-camera-apps-around/, Jul. 13, 2012, 6 pages.
(Continued)

*Primary Examiner* — Priyank Shah
(74) *Attorney, Agent, or Firm* — Morgan, Lewis & Bockius LLP

(57) ABSTRACT

The method for manipulating a cursor is performed at a portable multifunction device with one or more processors, memory, and a touch screen display. Initially, content of an electronic document is displayed on the display, where a cursor is displayed within the electronic document. Two substantially simultaneous touch inputs are then detected on the touch screen display, and preferably anywhere on the touch screen display. In response to detecting the two substantially simultaneous touch inputs, a portion of the content in the document closest to the cursor is selected, and the portion of the content is displayed as selected content.

79 Claims, 145 Drawing Sheets

Related U.S. Application Data filed on Jun. 7, 2015, provisional application No. 62/213,593, filed on Sep. 2, 2015, provisional application No. 62/215,720, filed on Sep. 8, 2015.

(51) Int. Cl.

| | | |
|---|---|---|
| *G06F 3/041* | (2006.01) | |
| *G06F 3/0484* | (2013.01) | |
| *G06F 3/01* | (2006.01) | |
| *G06F 3/0483* | (2013.01) | |

(52) U.S. Cl.
CPC .......... *G06F 3/0416* (2013.01); *G06F 3/0483* (2013.01); *G06F 3/0484* (2013.01); *G06F 3/0488* (2013.01); *G06F 3/04883* (2013.01); *G06F 3/04886* (2013.01); *G06F 2203/04104* (2013.01); *G06F 2203/04105* (2013.01)

(58) Field of Classification Search
CPC .... G06F 3/0484; G06F 3/0487; G06F 3/0488; G06F 3/04883; G06F 3/04886; G06F 3/0426; G06F 2203/014; G06F 2203/04803; G06F 2203/04808; G06F 2203/04105; G06F 2203/04101
See application file for complete search history.

(56) References Cited

U.S. PATENT DOCUMENTS

| | | |
|---|---|---|
| 4,903,201 A | 2/1990 | Wagner |
| 5,038,284 A | 8/1991 | Kramer |
| 5,077,665 A | 12/1991 | Silverman et al. |
| 5,101,353 A | 3/1992 | Lupien et al. |
| 5,136,501 A | 8/1992 | Silverman et al. |
| 5,270,922 A | 12/1993 | Higgins |
| 5,297,031 A | 3/1994 | Gutterman et al. |
| 5,297,032 A | 3/1994 | Trojan et al. |
| 5,374,787 A | 12/1994 | Miller et al. |
| 5,455,965 A | 10/1995 | Shaughnessy et al. |
| 5,463,722 A | 10/1995 | Venolia |
| 5,510,813 A | 4/1996 | Makinwa et al. |
| 5,555,354 A | 9/1996 | Strasnick et al. |
| 5,559,301 A | 9/1996 | Bryan, Jr. et al. |
| 5,590,265 A | 12/1996 | Nakazawa |
| 5,627,914 A | 5/1997 | Pagallo |
| 5,689,651 A | 11/1997 | Lozman |
| 5,695,400 A | 12/1997 | Fennell, Jr. et al. |
| 5,710,896 A | 1/1998 | Seidl |
| 5,717,725 A | 2/1998 | Campana, Jr. |
| 5,719,796 A | 2/1998 | Chen |
| 5,727,165 A | 3/1998 | Ordish et al. |
| 5,774,877 A | 6/1998 | Patterson, Jr. et al. |
| 5,775,996 A | 7/1998 | Othmer et al. |
| 5,793,301 A | 8/1998 | Patterson, Jr. et al. |
| 5,793,360 A | 8/1998 | Fleck et al. |
| 5,793,377 A | 8/1998 | Moore |
| 5,797,002 A | 8/1998 | Patterson, Jr. et al. |
| 5,801,692 A | 9/1998 | Muzio et al. |
| 5,805,144 A | 9/1998 | Scholder et al. |
| 5,809,267 A | 9/1998 | Moran et al. |
| 5,820,463 A | 10/1998 | O'Callaghan |
| 5,825,352 A | 10/1998 | Bisset et al. |
| 5,844,560 A | 12/1998 | Crutcher et al. |
| 5,845,266 A | 12/1998 | Lupien et al. |
| 5,872,922 A | 2/1999 | Hogan et al. |
| 5,880,733 A | 3/1999 | Horvitz et al. |
| 5,910,882 A | 6/1999 | Burrell |
| 5,915,245 A | 6/1999 | Patterson, Jr. et al. |
| 5,924,082 A | 7/1999 | Silverman et al. |
| 5,924,083 A | 7/1999 | Silverman et al. |
| 5,946,647 A | 8/1999 | Miller et al. |
| 5,946,667 A | 8/1999 | Tull, Jr. et al. |
| 5,953,708 A | 9/1999 | Midorikawa et al. |
| 5,963,923 A | 10/1999 | Garber |
| 6,002,397 A | 12/1999 | Jaaskelainen, Jr. |
| 6,012,046 A | 1/2000 | Lupien et al. |
| 6,014,643 A | 1/2000 | Minton |
| 6,031,989 A | 2/2000 | Cordell |
| 6,035,287 A | 3/2000 | Stallaert et al. |
| 6,072,488 A | 6/2000 | Mcfarland |
| 6,088,019 A | 7/2000 | Rosenberg |
| 6,088,027 A | 7/2000 | Konar et al. |
| 6,098,051 A | 8/2000 | Lupien et al. |
| 6,111,575 A | 8/2000 | Martinez et al. |
| 6,115,043 A | 9/2000 | Levine et al. |
| 6,131,087 A | 10/2000 | Luke et al. |
| 6,134,535 A | 10/2000 | Belzberg |
| 6,180,894 B1 | 1/2001 | Chao et al. |
| 6,195,647 B1 | 2/2001 | Martyn et al. |
| 6,208,329 B1 | 3/2001 | Ballare |
| 6,208,340 B1 | 3/2001 | Amin et al. |
| 6,219,034 B1 | 4/2001 | Elbing et al. |
| 6,227,743 B1 | 5/2001 | Robb |
| 6,229,542 B1 | 5/2001 | Miller |
| 6,243,080 B1 | 6/2001 | Molne |
| 6,247,000 B1 | 6/2001 | Hawkins et al. |
| 6,252,594 B1 | 6/2001 | Xia et al. |
| 6,266,684 B1 | 7/2001 | Kraus et al. |
| 6,272,474 B1 | 8/2001 | Garcia |
| 6,278,982 B1 | 8/2001 | Korhammer et al. |
| 6,282,521 B1 | 8/2001 | Howorka |
| 6,323,846 B1 | 11/2001 | Westerman et al. |
| 6,347,997 B1 | 2/2002 | Armstrong |
| 6,377,940 B2 | 4/2002 | Tilfors et al. |
| 6,396,523 B1 | 5/2002 | Segal et al. |
| 6,396,962 B1 | 5/2002 | Haffey et al. |
| 6,400,303 B2 | 6/2002 | Armstrong |
| 6,405,180 B2 | 6/2002 | Tilfors et al. |
| 6,408,282 B1 | 6/2002 | Buist |
| 6,411,998 B1 | 6/2002 | Bryant et al. |
| 6,429,846 B2 | 8/2002 | Rosenberg et al. |
| 6,448,977 B1 | 9/2002 | Braun et al. |
| 6,456,778 B2 | 9/2002 | Armstrong |
| 6,459,424 B1 | 10/2002 | Resman |
| 6,459,442 B1 | 10/2002 | Edwards et al. |
| 6,469,691 B1 | 10/2002 | Armstrong |
| 6,470,078 B1 | 10/2002 | Armstrong |
| 6,489,975 B1 | 12/2002 | Patil et al. |
| 6,504,527 B1 | 1/2003 | Armstrong |
| 6,512,761 B1 | 1/2003 | Schuster et al. |
| 6,532,000 B2 | 3/2003 | Armstrong |
| 6,551,357 B1 | 4/2003 | Madduri |
| 6,559,831 B1 | 5/2003 | Armstrong |
| 6,563,487 B2 | 5/2003 | Martin et al. |
| 6,567,102 B2 | 5/2003 | Kung |
| 6,570,557 B1 | 5/2003 | Westerman et al. |
| 6,583,798 B1 | 6/2003 | Hoek et al. |
| 6,590,568 B1 | 7/2003 | Astala et al. |
| 6,659,861 B1 | 12/2003 | Faris et al. |
| 6,661,438 B1 | 12/2003 | Shiraishi et al. |
| 6,670,952 B2 | 12/2003 | Jaeger et al. |
| 6,677,932 B1 | 1/2004 | Westerman |
| 6,735,307 B1 | 5/2004 | Volckers |
| 6,750,890 B1 | 6/2004 | Sugimoto |
| 6,772,132 B1 | 8/2004 | Kemp, II et al. |
| 6,822,635 B2 | 11/2004 | Shahoian et al. |
| 6,831,666 B1 | 12/2004 | Kreis |
| 6,891,551 B2 | 5/2005 | Keely et al. |
| 6,904,405 B2 | 6/2005 | Suominen |
| 6,906,697 B2 | 6/2005 | Rosenberg |
| 6,919,927 B1 | 7/2005 | Hyodo |
| 6,954,899 B1 | 10/2005 | Anderson |
| 7,036,088 B2 | 4/2006 | Tunney |
| 7,058,146 B2 | 6/2006 | Paulraj et al. |
| 7,114,091 B2 | 9/2006 | Vrancic |
| 7,134,093 B2 | 11/2006 | Etgen et al. |
| 7,138,983 B2 | 11/2006 | Wakai et al. |
| 7,159,189 B2 | 1/2007 | Weingart et al. |
| 7,259,752 B1 | 8/2007 | Simmons |
| 7,312,791 B2 | 12/2007 | Hoshino et al. |
| 7,346,855 B2 | 3/2008 | Hellyar et al. |
| 7,380,218 B2 | 5/2008 | Rundell |
| 7,411,575 B2 | 8/2008 | Hill et al. |

(56) References Cited

U.S. PATENT DOCUMENTS

| | | |
|---|---|---|
| 7,441,204 B2 | 10/2008 | Thomson et al. |
| 7,461,026 B2 | 12/2008 | Schluetter |
| 7,479,949 B2 | 1/2009 | Jobs et al. |
| 7,492,720 B2 | 2/2009 | Pruthi et al. |
| 7,532,206 B2 | 5/2009 | Morrison et al. |
| 7,533,352 B2 | 5/2009 | Chew et al. |
| 7,577,167 B2 | 8/2009 | Kikuchi et al. |
| 7,577,530 B2 | 8/2009 | Vignalou-Marche |
| 7,581,186 B2 | 8/2009 | Dowdy et al. |
| 7,614,008 B2 | 11/2009 | Ording |
| 7,619,616 B2 | 11/2009 | Rimas Ribikauskas et al. |
| 7,633,076 B2 | 12/2009 | Huppi et al. |
| 7,653,883 B2 | 1/2010 | Hotelling et al. |
| 7,656,413 B2 | 2/2010 | Khan et al. |
| 7,657,849 B2 | 2/2010 | Chaudhri et al. |
| 7,663,607 B2 | 2/2010 | Hotelling et al. |
| 7,673,255 B2 | 3/2010 | Schechter et al. |
| 7,680,513 B2 | 3/2010 | Haitani et al. |
| 7,683,889 B2 | 3/2010 | Rimas Ribikauskas et al. |
| 7,694,231 B2 | 4/2010 | Kocienda et al. |
| 7,694,236 B2 | 4/2010 | Gusmorino et al. |
| 7,739,604 B1 | 6/2010 | Lyons et al. |
| 7,743,348 B2 | 6/2010 | Robbins et al. |
| 7,752,115 B2 | 7/2010 | Schluetter |
| 7,757,185 B2 | 7/2010 | Paquette et al. |
| 7,760,187 B2 | 7/2010 | Kennedy |
| 7,787,026 B1 | 8/2010 | Flory et al. |
| 7,788,595 B2 | 8/2010 | Biwer et al. |
| 7,797,642 B1 | 9/2010 | Karam et al. |
| 7,801,796 B2 | 9/2010 | Friedman et al. |
| 7,801,950 B2 | 9/2010 | Eisenstadt et al. |
| 7,812,826 B2 | 10/2010 | Ording et al. |
| 7,817,568 B2 | 10/2010 | Paik et al. |
| 7,844,914 B2 | 11/2010 | Andre et al. |
| 7,880,728 B2 | 2/2011 | de los Reyes et al. |
| 7,890,862 B2 | 2/2011 | Kompe et al. |
| 7,903,090 B2 | 3/2011 | Soss et al. |
| 7,921,373 B2 | 4/2011 | Yamashita et al. |
| 7,952,566 B2 | 5/2011 | Poupyrev et al. |
| 7,956,847 B2 | 6/2011 | Christie |
| 7,957,762 B2 | 6/2011 | Herz et al. |
| 7,966,352 B2 | 6/2011 | Madan et al. |
| 7,973,778 B2 | 7/2011 | Chen |
| 8,001,189 B2 | 8/2011 | Nielsen et al. |
| 8,006,002 B2 | 8/2011 | Kalayjian et al. |
| 8,010,900 B2 | 8/2011 | Hart et al. |
| 8,020,028 B1 | 9/2011 | Lutter |
| 8,024,670 B1 | 9/2011 | Rahmation et al. |
| 8,040,142 B1 | 10/2011 | Bokma et al. |
| 8,046,712 B2 | 10/2011 | Landman et al. |
| 8,106,856 B2 | 1/2012 | Matas et al. |
| 8,125,440 B2 | 2/2012 | Guyot-Sionnest et al. |
| 8,150,098 B2 | 4/2012 | Gallagher et al. |
| RE43,448 E | 6/2012 | Kimoto et al. |
| 8,209,628 B1 | 6/2012 | Davidson |
| 8,214,768 B2 | 7/2012 | Boule et al. |
| 8,239,784 B2 | 8/2012 | Hotelling et al. |
| 8,276,098 B2 | 9/2012 | Fagans et al. |
| 8,279,180 B2 | 10/2012 | Hotelling et al. |
| 8,363,020 B2 | 1/2013 | Li et al. |
| 8,381,135 B2 | 2/2013 | Hotelling et al. |
| 8,390,583 B2 | 3/2013 | Forutanpour et al. |
| 8,423,089 B2 | 4/2013 | Song et al. |
| 8,438,504 B2 | 5/2013 | Cranfill et al. |
| 8,446,376 B2 | 5/2013 | Levy et al. |
| 8,456,431 B2 | 6/2013 | Victor |
| 8,466,889 B2 | 6/2013 | Tong et al. |
| 8,479,122 B2 | 7/2013 | Hotelling et al. |
| 8,508,494 B2 | 8/2013 | Moore |
| 8,542,205 B1 | 9/2013 | Keller |
| 8,581,870 B2 | 11/2013 | Bokma et al. |
| 8,587,542 B2 | 11/2013 | Moore |
| 8,593,415 B2 | 11/2013 | Han et al. |
| 8,625,882 B2 | 1/2014 | Backlund et al. |
| 8,638,311 B2 | 1/2014 | Kang et al. |
| 8,665,227 B2 | 3/2014 | Gunawan |
| 8,669,945 B2 | 3/2014 | Coddington |
| 8,674,932 B2 | 3/2014 | Armstrong |
| 8,698,765 B1 | 4/2014 | Keller |
| 8,698,845 B2 | 4/2014 | Lemay |
| 8,717,305 B2 | 5/2014 | Williamson et al. |
| 8,743,069 B2 | 6/2014 | Morton et al. |
| 8,773,389 B1 | 7/2014 | Freed |
| 8,793,577 B2 | 7/2014 | Schellingerhout et al. |
| 8,799,816 B2 | 8/2014 | Wells et al. |
| 8,806,369 B2 | 8/2014 | Khoe et al. |
| 8,854,316 B2 | 10/2014 | Shenfield |
| 8,872,729 B2 | 10/2014 | Lyons et al. |
| 8,872,773 B2 | 10/2014 | Mak et al. |
| 8,875,044 B2 | 10/2014 | Ozawa et al. |
| 8,914,732 B2 | 12/2014 | Jun et al. |
| 8,952,987 B2 | 2/2015 | Momeyer et al. |
| 8,959,430 B1 | 2/2015 | Spivak et al. |
| 8,976,128 B2 | 3/2015 | Moore |
| 9,026,932 B1 | 5/2015 | Dixon |
| 9,030,419 B1 | 5/2015 | Freed |
| 9,030,436 B2 | 5/2015 | Ikeda |
| 9,058,186 B2 | 6/2015 | Chaudhri |
| 9,069,460 B2 | 6/2015 | Moore |
| 9,086,755 B2 | 7/2015 | Cho et al. |
| 9,092,058 B2 | 7/2015 | Kasahara et al. |
| 9,098,188 B2 | 8/2015 | Kim |
| 9,116,571 B2 | 8/2015 | Zeliff et al. |
| 9,122,364 B2 | 9/2015 | Kuwabara et al. |
| 9,148,618 B2 | 9/2015 | Matas et al. |
| 9,164,779 B2 | 10/2015 | Brakensiek et al. |
| 9,170,607 B2 | 10/2015 | Bose et al. |
| 9,218,105 B2 | 12/2015 | Mansson et al. |
| 9,244,562 B1 | 1/2016 | Rosenberg et al. |
| 9,244,576 B1 | 1/2016 | Vadagave et al. |
| 9,244,601 B2 | 1/2016 | Kim et al. |
| 9,246,487 B2 | 1/2016 | Casparian et al. |
| 9,262,002 B2 | 2/2016 | Momeyer et al. |
| 9,304,668 B2 | 4/2016 | Rezende et al. |
| 9,307,112 B2 | 4/2016 | Molgaard et al. |
| 9,349,552 B2 | 5/2016 | Huska et al. |
| 9,361,018 B2 | 6/2016 | Defazio et al. |
| 9,389,718 B1 | 7/2016 | Letourneur |
| 9,389,722 B2 | 7/2016 | Matsuki et al. |
| 9,400,581 B2 | 7/2016 | Bokma et al. |
| 9,405,367 B2 | 8/2016 | Jung et al. |
| 9,417,754 B2 | 8/2016 | Smith |
| 9,436,344 B2 | 9/2016 | Kuwabara et al. |
| 9,471,145 B2 | 10/2016 | Langlois et al. |
| 9,477,393 B2 | 10/2016 | Zambetti et al. |
| 9,542,013 B2 | 1/2017 | Dearman et al. |
| 9,600,114 B2 | 3/2017 | Milam et al. |
| 9,600,116 B2 | 3/2017 | Tao et al. |
| 2001/0024195 A1 | 9/2001 | Hayakawa et al. |
| 2001/0045965 A1 | 11/2001 | Orbanes et al. |
| 2002/0008691 A1 | 1/2002 | Hanajima et al. |
| 2002/0015024 A1 | 2/2002 | Westerman et al. |
| 2002/0015064 A1 | 2/2002 | Robotham et al. |
| 2002/0023038 A1 | 2/2002 | Fritsch et al. |
| 2002/0026321 A1 | 2/2002 | Faris et al. |
| 2002/0027957 A1 | 3/2002 | Paulraj et al. |
| 2002/0035534 A1 | 3/2002 | Buist et al. |
| 2002/0055899 A1 | 5/2002 | Williams |
| 2002/0073016 A1 | 6/2002 | Furbush et al. |
| 2002/0075289 A1 | 6/2002 | Hatori et al. |
| 2002/0077117 A1 | 6/2002 | Cloutier et al. |
| 2002/0107748 A1 | 8/2002 | Boies et al. |
| 2002/0109678 A1 | 8/2002 | Marmolin et al. |
| 2002/0120837 A1 | 8/2002 | Maxemchuk et al. |
| 2002/0138401 A1 | 9/2002 | Allen et al. |
| 2002/0140680 A1 | 10/2002 | Lu |
| 2002/0149609 A1 | 10/2002 | Suzuki et al. |
| 2002/0149630 A1 | 10/2002 | Kitainik et al. |
| 2002/0161687 A1 | 10/2002 | Serkin et al. |
| 2002/0161693 A1 | 10/2002 | Greenwalk |
| 2002/0178102 A1 | 11/2002 | Scheinberg et al. |
| 2002/0180763 A1 | 12/2002 | Kung |
| 2003/0001869 A1 | 1/2003 | Nissen |
| 2003/0074413 A1 | 4/2003 | Nielsen et al. |

(56) References Cited

U.S. PATENT DOCUMENTS

| | | |
|---|---|---|
| 2003/0086496 A1 | 5/2003 | Zhang et al. |
| 2003/0117440 A1 | 6/2003 | Hellyar et al. |
| 2003/0119562 A1 | 6/2003 | Kokubo |
| 2003/0151589 A1 | 8/2003 | Bensen et al. |
| 2003/0177154 A1 | 9/2003 | Vrancic |
| 2003/0184574 A1 | 10/2003 | Phillips et al. |
| 2003/0189647 A1 | 10/2003 | Kang |
| 2003/0206169 A1 | 11/2003 | Springer et al. |
| 2003/0222915 A1 | 12/2003 | Marion et al. |
| 2004/0021643 A1 | 2/2004 | Hoshino et al. |
| 2004/0025112 A1 | 2/2004 | Chasen et al. |
| 2004/0056849 A1 | 3/2004 | Lohbihler et al. |
| 2004/0085328 A1 | 5/2004 | Maruyama et al. |
| 2004/0108995 A1 | 6/2004 | Hoshino et al. |
| 2004/0138849 A1 | 7/2004 | Schmidt et al. |
| 2004/0150631 A1 | 8/2004 | Fleck et al. |
| 2004/0150644 A1 | 8/2004 | Kincaid et al. |
| 2004/0155908 A1 | 8/2004 | Wagner |
| 2004/0174398 A1 | 9/2004 | Luke et al. |
| 2004/0174399 A1 | 9/2004 | Wu et al. |
| 2004/0219969 A1 | 11/2004 | Casey et al. |
| 2005/0012723 A1 | 1/2005 | Pallakoff |
| 2005/0022138 A1 | 1/2005 | Tunney |
| 2005/0073961 A1 | 4/2005 | Paik et al. |
| 2005/0110769 A1 | 5/2005 | DaCosta et al. |
| 2005/0125742 A1 | 6/2005 | Grotjohn et al. |
| 2005/0132297 A1 | 6/2005 | Milic-Frayling et al. |
| 2005/0134578 A1 | 6/2005 | Chambers et al. |
| 2005/0177798 A1 | 8/2005 | Thomson et al. |
| 2005/0183017 A1 | 8/2005 | Cain |
| 2005/0183035 A1 | 8/2005 | Ringel et al. |
| 2005/0184973 A1 | 8/2005 | Lum et al. |
| 2005/0190059 A1 | 9/2005 | Wehrenberg |
| 2005/0190280 A1 | 9/2005 | Haas et al. |
| 2005/0204295 A1 | 9/2005 | Voorhees et al. |
| 2005/0223338 A1 | 10/2005 | Partanen |
| 2005/0229112 A1 | 10/2005 | Clay et al. |
| 2005/0289476 A1 | 12/2005 | Tokkonen |
| 2006/0017692 A1 | 1/2006 | Wehrenberg et al. |
| 2006/0022955 A1 | 2/2006 | Kennedy |
| 2006/0022956 A1 | 2/2006 | Lengeling et al. |
| 2006/0026535 A1 | 2/2006 | Hotelling et al. |
| 2006/0026536 A1 | 2/2006 | Hotelling et al. |
| 2006/0033724 A1 | 2/2006 | Chaudhri et al. |
| 2006/0036971 A1 | 2/2006 | Mendel et al. |
| 2006/0041846 A1 | 2/2006 | Masselle et al. |
| 2006/0055662 A1 | 3/2006 | Rimas-Ribikauskas et al. |
| 2006/0059436 A1 | 3/2006 | Nurmi |
| 2006/0067677 A1 | 3/2006 | Tokiwa et al. |
| 2006/0101347 A1 | 5/2006 | Runov et al. |
| 2006/0107226 A1 | 5/2006 | Matthews et al. |
| 2006/0109252 A1 | 5/2006 | Kolmykov-Zotov et al. |
| 2006/0109256 A1 | 5/2006 | Grant et al. |
| 2006/0119586 A1 | 6/2006 | Grant et al. |
| 2006/0132455 A1 | 6/2006 | Rimas-Ribikauskas et al. |
| 2006/0132456 A1 | 6/2006 | Anson |
| 2006/0132457 A1 | 6/2006 | Rimas-Ribikauskas et al. |
| 2006/0136834 A1 | 6/2006 | Cao et al. |
| 2006/0136845 A1 | 6/2006 | Rimas-Ribikauskas et al. |
| 2006/0161861 A1 | 7/2006 | Holecek et al. |
| 2006/0161868 A1 | 7/2006 | Van et al. |
| 2006/0197753 A1 | 9/2006 | Hotelling |
| 2006/0212812 A1 | 9/2006 | Simmons et al. |
| 2006/0213754 A1 | 9/2006 | Jarrett et al. |
| 2006/0224986 A1 | 10/2006 | Lindsay et al. |
| 2006/0233248 A1 | 10/2006 | Rynderman et al. |
| 2006/0242602 A1 | 10/2006 | Schechter et al. |
| 2006/0265653 A1 | 11/2006 | Paasonen et al. |
| 2006/0274042 A1 | 12/2006 | Krah et al. |
| 2006/0277469 A1 | 12/2006 | Chaudhri et al. |
| 2006/0282778 A1 | 12/2006 | Barsness et al. |
| 2006/0284858 A1 | 12/2006 | Rekimoto |
| 2006/0290681 A1 | 12/2006 | Ho et al. |
| 2007/0004451 A1 | 1/2007 | Anderson |
| 2007/0004461 A1 | 1/2007 | Bathina et al. |
| 2007/0024595 A1 | 2/2007 | Baker et al. |
| 2007/0024646 A1 | 2/2007 | Saarinen et al. |
| 2007/0070066 A1 | 3/2007 | Bakhash |
| 2007/0080953 A1 | 4/2007 | Lii |
| 2007/0113681 A1 | 5/2007 | Nishimura et al. |
| 2007/0115264 A1 | 5/2007 | Yu et al. |
| 2007/0120835 A1 | 5/2007 | Sato |
| 2007/0124699 A1 | 5/2007 | Michaels |
| 2007/0128899 A1 | 6/2007 | Mayer |
| 2007/0152980 A1 | 7/2007 | Kocienda et al. |
| 2007/0157089 A1 | 7/2007 | Van Os et al. |
| 2007/0168369 A1 | 7/2007 | Bruns |
| 2007/0168890 A1 | 7/2007 | Zhao et al. |
| 2007/0176904 A1 | 8/2007 | Russo |
| 2007/0186178 A1 | 8/2007 | Schiller |
| 2007/0220445 A1 | 9/2007 | Yach et al. |
| 2007/0222768 A1 | 9/2007 | Geurts et al. |
| 2007/0226327 A1 | 9/2007 | Redpath |
| 2007/0229455 A1 | 10/2007 | Martin et al. |
| 2007/0229464 A1 | 10/2007 | Hotelling et al. |
| 2007/0236450 A1 | 10/2007 | Colgate et al. |
| 2007/0236477 A1 | 10/2007 | Ryu et al. |
| 2007/0245241 A1 | 10/2007 | Bertram et al. |
| 2007/0245249 A1 | 10/2007 | Weisberg |
| 2007/0257821 A1 | 11/2007 | Son et al. |
| 2007/0262964 A1 | 11/2007 | Zotov et al. |
| 2007/0270182 A1 | 11/2007 | Gulliksson et al. |
| 2007/0294295 A1 | 12/2007 | Finkelstein et al. |
| 2007/0294639 A1 | 12/2007 | Van Berkel et al. |
| 2007/0296333 A1 | 12/2007 | Kim et al. |
| 2008/0001924 A1 | 1/2008 | dos los Reyes et al. |
| 2008/0024459 A1 | 1/2008 | Poupyrev et al. |
| 2008/0034306 A1 | 2/2008 | Ording |
| 2008/0036743 A1 | 2/2008 | Westerman et al. |
| 2008/0051989 A1 | 2/2008 | Welsh |
| 2008/0052945 A1 | 3/2008 | Matas et al. |
| 2008/0066010 A1 | 3/2008 | Brodersen et al. |
| 2008/0094367 A1 | 4/2008 | Van De Ven et al. |
| 2008/0094368 A1 | 4/2008 | Ording et al. |
| 2008/0106523 A1 | 5/2008 | Conrad |
| 2008/0109753 A1 | 5/2008 | Karstens |
| 2008/0136790 A1 | 6/2008 | Hio |
| 2008/0155415 A1 | 6/2008 | Yoon et al. |
| 2008/0165144 A1 | 7/2008 | Forstall et al. |
| 2008/0165152 A1 | 7/2008 | Forstall et al. |
| 2008/0168379 A1 | 7/2008 | Forstall et al. |
| 2008/0168395 A1 | 7/2008 | Ording et al. |
| 2008/0168401 A1 | 7/2008 | Boule et al. |
| 2008/0168403 A1 | 7/2008 | Westerman et al. |
| 2008/0202824 A1 | 8/2008 | Philipp et al. |
| 2008/0204424 A1 | 8/2008 | Jin et al. |
| 2008/0204427 A1 | 8/2008 | Heesemans et al. |
| 2008/0211959 A1 | 9/2008 | Balram et al. |
| 2008/0219493 A1 | 9/2008 | Tadmor |
| 2008/0222545 A1 | 9/2008 | Lemay et al. |
| 2008/0222569 A1 | 9/2008 | Champion et al. |
| 2008/0259046 A1 | 10/2008 | Carsanaro |
| 2008/0263452 A1 | 10/2008 | Tomkins |
| 2008/0270910 A1 | 10/2008 | Lukasik et al. |
| 2008/0284866 A1 | 11/2008 | Mizutani |
| 2008/0294984 A1 | 11/2008 | Ramsay et al. |
| 2008/0297475 A1 | 12/2008 | Woolf et al. |
| 2008/0303799 A1 | 12/2008 | Schwesig et al. |
| 2008/0307335 A1 | 12/2008 | Chaudhri et al. |
| 2008/0307351 A1 | 12/2008 | Louch et al. |
| 2008/0307359 A1 | 12/2008 | Louch et al. |
| 2008/0307360 A1 | 12/2008 | Chaudhri et al. |
| 2008/0316183 A1 | 12/2008 | Westerman et al. |
| 2008/0317378 A1 | 12/2008 | Steinberg et al. |
| 2008/0320391 A1 | 12/2008 | Lemay et al. |
| 2008/0320419 A1 | 12/2008 | Matas et al. |
| 2009/0002392 A1 | 1/2009 | Hou et al. |
| 2009/0007017 A1 | 1/2009 | Anzures et al. |
| 2009/0036108 A1 | 2/2009 | Cho |
| 2009/0037846 A1 | 2/2009 | Spalink et al. |
| 2009/0046110 A1 | 2/2009 | Sadler et al. |
| 2009/0051667 A1 | 2/2009 | Park et al. |
| 2009/0058828 A1 | 3/2009 | Jiang et al. |
| 2009/0066668 A1 | 3/2009 | Kim et al. |

(56) References Cited

U.S. PATENT DOCUMENTS

| | | |
|---|---|---|
| 2009/0073118 A1 | 3/2009 | Yamaji et al. |
| 2009/0083665 A1 | 3/2009 | Anttila et al. |
| 2009/0085878 A1 | 4/2009 | Heubel et al. |
| 2009/0085881 A1 | 4/2009 | Keam |
| 2009/0085886 A1 | 4/2009 | Huang et al. |
| 2009/0094562 A1 | 4/2009 | Jeong et al. |
| 2009/0100343 A1 | 4/2009 | Lee et al. |
| 2009/0102804 A1 | 4/2009 | Wong et al. |
| 2009/0102805 A1 | 4/2009 | Meijer et al. |
| 2009/0140985 A1 | 6/2009 | Liu |
| 2009/0158198 A1 | 6/2009 | Hayter et al. |
| 2009/0160793 A1 | 6/2009 | Rekimoto |
| 2009/0160814 A1 | 6/2009 | Li et al. |
| 2009/0167507 A1 | 7/2009 | Maenpaa |
| 2009/0167508 A1 | 7/2009 | Fadell et al. |
| 2009/0167509 A1 | 7/2009 | Fadell et al. |
| 2009/0167704 A1 | 7/2009 | Terlizzi et al. |
| 2009/0167728 A1 | 7/2009 | Geaghan et al. |
| 2009/0169061 A1 | 7/2009 | Anderson et al. |
| 2009/0197635 A1 | 8/2009 | Kim et al. |
| 2009/0225037 A1 | 9/2009 | Williamson et al. |
| 2009/0237374 A1 | 9/2009 | Li et al. |
| 2009/0247112 A1 | 10/2009 | Lundy et al. |
| 2009/0256947 A1 | 10/2009 | Ciurea et al. |
| 2009/0267906 A1 | 10/2009 | Schroderus |
| 2009/0282360 A1 | 11/2009 | Park et al. |
| 2009/0293007 A1 | 11/2009 | Duarte et al. |
| 2009/0293009 A1 | 11/2009 | Meserth et al. |
| 2009/0303187 A1 | 12/2009 | Pallakoff |
| 2009/0307633 A1 | 12/2009 | Haughay, Jr. et al. |
| 2009/0322893 A1 | 12/2009 | Stallings et al. |
| 2010/0007926 A1 | 1/2010 | Imaizumi et al. |
| 2010/0011304 A1 | 1/2010 | Van Os |
| 2010/0013777 A1 | 1/2010 | Baudisch et al. |
| 2010/0017710 A1 | 1/2010 | Kim et al. |
| 2010/0023858 A1 | 1/2010 | Ryu et al. |
| 2010/0026640 A1 | 2/2010 | Kim et al. |
| 2010/0026647 A1 | 2/2010 | Abe et al. |
| 2010/0039446 A1 | 2/2010 | Hillis et al. |
| 2010/0044121 A1 | 2/2010 | Simon et al. |
| 2010/0057235 A1 | 3/2010 | Wang et al. |
| 2010/0058231 A1 | 3/2010 | Duarte et al. |
| 2010/0070908 A1 | 3/2010 | Mori et al. |
| 2010/0073329 A1 | 3/2010 | Raman et al. |
| 2010/0083116 A1 | 4/2010 | Akifusa et al. |
| 2010/0085302 A1 | 4/2010 | Fairweather et al. |
| 2010/0085314 A1 | 4/2010 | Kwok |
| 2010/0085317 A1 | 4/2010 | Park et al. |
| 2010/0088596 A1 | 4/2010 | Griffin et al. |
| 2010/0088628 A1 | 4/2010 | Flygh et al. |
| 2010/0088639 A1 | 4/2010 | Yach et al. |
| 2010/0090988 A1 | 4/2010 | Park |
| 2010/0125816 A1 | 5/2010 | Bezos |
| 2010/0127983 A1 | 5/2010 | Irani et al. |
| 2010/0128002 A1 | 5/2010 | Stacy et al. |
| 2010/0138776 A1 | 6/2010 | Korhonen |
| 2010/0148999 A1 | 6/2010 | Casparian et al. |
| 2010/0149096 A1 | 6/2010 | Migos et al. |
| 2010/0156812 A1 | 6/2010 | Stallings et al. |
| 2010/0156813 A1 | 6/2010 | Duarte et al. |
| 2010/0156818 A1 | 6/2010 | Burrough et al. |
| 2010/0156823 A1 | 6/2010 | Paleczny et al. |
| 2010/0156825 A1 | 6/2010 | Sohn et al. |
| 2010/0171713 A1* | 7/2010 | Kwok .................. G06F 3/0488 345/173 |
| 2010/0175023 A1 | 7/2010 | Gatlin et al. |
| 2010/0180225 A1 | 7/2010 | Chiba et al. |
| 2010/0194693 A1 | 8/2010 | Selin et al. |
| 2010/0199227 A1 | 8/2010 | Xiao et al. |
| 2010/0211872 A1 | 8/2010 | Rolston et al. |
| 2010/0214257 A1 | 8/2010 | Wussler et al. |
| 2010/0225604 A1 | 9/2010 | Homma et al. |
| 2010/0228644 A1 | 9/2010 | Schluetter |
| 2010/0231534 A1 | 9/2010 | Chaudhri et al. |
| 2010/0235726 A1 | 9/2010 | Ording et al. |
| 2010/0235735 A1 | 9/2010 | Ording et al. |
| 2010/0235746 A1 | 9/2010 | Anzures |
| 2010/0251168 A1 | 9/2010 | Fujita et al. |
| 2010/0269039 A1 | 10/2010 | Pahlavan et al. |
| 2010/0271312 A1 | 10/2010 | Alameh et al. |
| 2010/0271500 A1 | 10/2010 | Park et al. |
| 2010/0289807 A1 | 11/2010 | Yu et al. |
| 2010/0299597 A1 | 11/2010 | Shin et al. |
| 2010/0302177 A1 | 12/2010 | Kim et al. |
| 2010/0302179 A1 | 12/2010 | Ahn et al. |
| 2010/0306702 A1 | 12/2010 | Warner |
| 2010/0308983 A1 | 12/2010 | Conte et al. |
| 2010/0309147 A1 | 12/2010 | Fleizach et al. |
| 2010/0313124 A1 | 12/2010 | Privault et al. |
| 2010/0313156 A1 | 12/2010 | Louch et al. |
| 2010/0313158 A1 | 12/2010 | Lee et al. |
| 2010/0313166 A1 | 12/2010 | Nakayama et al. |
| 2010/0315417 A1 | 12/2010 | Cho et al. |
| 2010/0315438 A1 | 12/2010 | Horodezky et al. |
| 2010/0321301 A1 | 12/2010 | Casparian et al. |
| 2010/0325578 A1 | 12/2010 | Mital et al. |
| 2011/0018695 A1* | 1/2011 | Bells .................. G06F 3/016 340/407.2 |
| 2011/0035662 A1 | 2/2011 | King et al. |
| 2011/0043652 A1 | 2/2011 | King et al. |
| 2011/0050588 A1 | 3/2011 | Li et al. |
| 2011/0050591 A1 | 3/2011 | Kim et al. |
| 2011/0050594 A1 | 3/2011 | Kim et al. |
| 2011/0050629 A1 | 3/2011 | Homma et al. |
| 2011/0050630 A1 | 3/2011 | Ikeda |
| 2011/0050653 A1 | 3/2011 | Miyazawa et al. |
| 2011/0054837 A1 | 3/2011 | Ikeda |
| 2011/0055135 A1 | 3/2011 | Dawson et al. |
| 2011/0057886 A1 | 3/2011 | Ng et al. |
| 2011/0057903 A1 | 3/2011 | Yamano et al. |
| 2011/0061029 A1 | 3/2011 | Yeh et al. |
| 2011/0063248 A1 | 3/2011 | Yoon |
| 2011/0069012 A1 | 3/2011 | Martensson |
| 2011/0069016 A1 | 3/2011 | Victor |
| 2011/0074697 A1 | 3/2011 | Rapp et al. |
| 2011/0080350 A1 | 4/2011 | Almalki et al. |
| 2011/0084910 A1 | 4/2011 | Almalki et al. |
| 2011/0087982 A1 | 4/2011 | McCann et al. |
| 2011/0087983 A1 | 4/2011 | Shim |
| 2011/0093815 A1 | 4/2011 | Gobeil |
| 2011/0093817 A1 | 4/2011 | Song et al. |
| 2011/0096174 A1 | 4/2011 | King et al. |
| 2011/0107272 A1 | 5/2011 | Aquilar |
| 2011/0115721 A1 | 5/2011 | Li et al. |
| 2011/0116716 A1 | 5/2011 | Kwon et al. |
| 2011/0122087 A1 | 5/2011 | Jang et al. |
| 2011/0141031 A1 | 6/2011 | McCullough et al. |
| 2011/0141052 A1 | 6/2011 | Bernstein et al. |
| 2011/0144777 A1 | 6/2011 | Firkins et al. |
| 2011/0145068 A1 | 6/2011 | King et al. |
| 2011/0145752 A1 | 6/2011 | Fagans |
| 2011/0145753 A1 | 6/2011 | Prakash |
| 2011/0145764 A1 | 6/2011 | Higuchi et al. |
| 2011/0149138 A1 | 6/2011 | Watkins |
| 2011/0163971 A1 | 7/2011 | Wagner et al. |
| 2011/0164042 A1 | 7/2011 | Chaudhri |
| 2011/0167058 A1 | 7/2011 | Van Os |
| 2011/0167339 A1 | 7/2011 | Lemay |
| 2011/0167382 A1 | 7/2011 | Van Os |
| 2011/0169765 A1 | 7/2011 | Aono |
| 2011/0175830 A1 | 7/2011 | Miyazawa et al. |
| 2011/0179368 A1 | 7/2011 | King et al. |
| 2011/0179381 A1 | 7/2011 | King |
| 2011/0181538 A1 | 7/2011 | Aono |
| 2011/0185299 A1 | 7/2011 | Hinckley et al. |
| 2011/0185300 A1 | 7/2011 | Hinckley et al. |
| 2011/0185316 A1 | 7/2011 | Reid et al. |
| 2011/0193809 A1 | 8/2011 | Walley et al. |
| 2011/0193881 A1 | 8/2011 | Rydenhag |
| 2011/0201387 A1 | 8/2011 | Paek et al. |
| 2011/0202834 A1 | 8/2011 | Mandryk et al. |
| 2011/0202853 A1 | 8/2011 | Mujkic |
| 2011/0202872 A1 | 8/2011 | Park |
| 2011/0205163 A1 | 8/2011 | Hinckley et al. |

(56) References Cited

U.S. PATENT DOCUMENTS

| | | |
|---|---|---|
| 2011/0209088 A1 | 8/2011 | Hinckley et al. |
| 2011/0209093 A1 | 8/2011 | Hinckley et al. |
| 2011/0209099 A1 | 8/2011 | Hinckley et al. |
| 2011/0210931 A1 | 9/2011 | Shai |
| 2011/0215914 A1 | 9/2011 | Edwards |
| 2011/0221684 A1 | 9/2011 | Rydenhag |
| 2011/0221776 A1 | 9/2011 | Shimotani et al. |
| 2011/0231789 A1* | 9/2011 | Bukurak ............ G06F 3/04883 715/773 |
| 2011/0238690 A1 | 9/2011 | Arrasvuori et al. |
| 2011/0239110 A1 | 9/2011 | Garrett et al. |
| 2011/0242029 A1 | 10/2011 | Kasahara et al. |
| 2011/0246877 A1 | 10/2011 | Kwak et al. |
| 2011/0248948 A1 | 10/2011 | Griffin et al. |
| 2011/0252357 A1 | 10/2011 | Chaudhri |
| 2011/0252362 A1 | 10/2011 | Cho et al. |
| 2011/0252376 A1 | 10/2011 | Chaudhri et al. |
| 2011/0258537 A1 | 10/2011 | Rives et al. |
| 2011/0258582 A1 | 10/2011 | Bang |
| 2011/0263298 A1 | 10/2011 | Park |
| 2011/0267530 A1 | 11/2011 | Chun |
| 2011/0279380 A1 | 11/2011 | Weber et al. |
| 2011/0279381 A1 | 11/2011 | Tong et al. |
| 2011/0279395 A1 | 11/2011 | Kuwabara et al. |
| 2011/0279852 A1 | 11/2011 | Oda et al. |
| 2011/0285656 A1 | 11/2011 | Yaksick et al. |
| 2011/0285659 A1 | 11/2011 | Kuwabara et al. |
| 2011/0291951 A1 | 12/2011 | Tong |
| 2011/0296333 A1 | 12/2011 | Bateman et al. |
| 2011/0296351 A1 | 12/2011 | Ewing, Jr. et al. |
| 2011/0304559 A1 | 12/2011 | Pasquero |
| 2011/0304577 A1 | 12/2011 | Brown et al. |
| 2011/0307778 A1 | 12/2011 | Tsai et al. |
| 2011/0310049 A1 | 12/2011 | Homma et al. |
| 2012/0011437 A1 | 1/2012 | James et al. |
| 2012/0013541 A1* | 1/2012 | Boka ............ G06F 3/0488 345/173 |
| 2012/0013542 A1 | 1/2012 | Shenfield |
| 2012/0019448 A1 | 1/2012 | Pitkanen et al. |
| 2012/0026110 A1 | 2/2012 | Yamano |
| 2012/0036556 A1 | 2/2012 | LeBeau et al. |
| 2012/0038580 A1 | 2/2012 | Sasaki |
| 2012/0044153 A1 | 2/2012 | Arrasvuori et al. |
| 2012/0051644 A1 | 3/2012 | Das et al. |
| 2012/0056837 A1 | 3/2012 | Park et al. |
| 2012/0056848 A1 | 3/2012 | Yamano et al. |
| 2012/0062564 A1 | 3/2012 | Miyashita et al. |
| 2012/0062604 A1 | 3/2012 | Lobo |
| 2012/0066630 A1 | 3/2012 | Kim et al. |
| 2012/0066648 A1 | 3/2012 | Rolleston et al. |
| 2012/0081375 A1 | 4/2012 | Robert et al. |
| 2012/0084689 A1 | 4/2012 | Ledet et al. |
| 2012/0089932 A1 | 4/2012 | Kano et al. |
| 2012/0089951 A1 | 4/2012 | Cassidy |
| 2012/0092355 A1 | 4/2012 | Yamamoto et al. |
| 2012/0098780 A1 | 4/2012 | Fujisawa et al. |
| 2012/0102437 A1 | 4/2012 | Worley et al. |
| 2012/0105358 A1 | 5/2012 | Momeyer et al. |
| 2012/0105367 A1 | 5/2012 | Son et al. |
| 2012/0106852 A1 | 5/2012 | Khawand et al. |
| 2012/0113023 A1 | 5/2012 | Koch et al. |
| 2012/0126962 A1 | 5/2012 | Ujii et al. |
| 2012/0131495 A1 | 5/2012 | Goossens et al. |
| 2012/0139864 A1 | 6/2012 | Sleeman et al. |
| 2012/0146945 A1 | 6/2012 | Miyazawa et al. |
| 2012/0147052 A1 | 6/2012 | Homma et al. |
| 2012/0154328 A1 | 6/2012 | Kono |
| 2012/0154329 A1 | 6/2012 | Shinozaki |
| 2012/0159380 A1 | 6/2012 | Kocienda et al. |
| 2012/0169646 A1 | 7/2012 | Berkes et al. |
| 2012/0176403 A1 | 7/2012 | Cha et al. |
| 2012/0179967 A1 | 7/2012 | Hayes |
| 2012/0182226 A1 | 7/2012 | Tuli |
| 2012/0183271 A1 | 7/2012 | Forutanpour et al. |
| 2012/0206393 A1 | 8/2012 | Hillis et al. |
| 2012/0216114 A1 | 8/2012 | Privault et al. |
| 2012/0216139 A1 | 8/2012 | Ording et al. |
| 2012/0216143 A1 | 8/2012 | Shiplacoff et al. |
| 2012/0218203 A1 | 8/2012 | Kanki |
| 2012/0218304 A1 | 8/2012 | Anzures et al. |
| 2012/0235912 A1* | 9/2012 | Laubach ............ G06F 3/04895 345/163 |
| 2012/0240044 A1 | 9/2012 | Johnson et al. |
| 2012/0249575 A1 | 10/2012 | Krolczyk et al. |
| 2012/0249853 A1 | 10/2012 | Krolczyk et al. |
| 2012/0256846 A1 | 10/2012 | Mak |
| 2012/0256847 A1 | 10/2012 | Mak et al. |
| 2012/0256857 A1 | 10/2012 | Mak |
| 2012/0257071 A1 | 10/2012 | Prentice |
| 2012/0260220 A1 | 10/2012 | Griffin |
| 2012/0274591 A1 | 11/2012 | Rimas-Ribikauskas et al. |
| 2012/0274662 A1 | 11/2012 | Kim et al. |
| 2012/0284673 A1 | 11/2012 | Lamb et al. |
| 2012/0293449 A1 | 11/2012 | Dietz |
| 2012/0293551 A1 | 11/2012 | Momeyer et al. |
| 2012/0299859 A1 | 11/2012 | Kinoshita |
| 2012/0304132 A1 | 11/2012 | Sareen et al. |
| 2012/0304133 A1 | 11/2012 | Nan et al. |
| 2012/0306748 A1 | 12/2012 | Fleizach et al. |
| 2012/0306764 A1 | 12/2012 | Kamibeppu |
| 2012/0306765 A1 | 12/2012 | Moore |
| 2012/0306772 A1* | 12/2012 | Tan ............ G06F 3/0488 345/173 |
| 2012/0306778 A1 | 12/2012 | Weeldreyer et al. |
| 2012/0311429 A1 | 12/2012 | Decker et al. |
| 2012/0311437 A1 | 12/2012 | Weeldreyer et al. |
| 2012/0311498 A1 | 12/2012 | Kluttz et al. |
| 2013/0002561 A1 | 1/2013 | Wakasa |
| 2013/0016042 A1 | 1/2013 | Makinen et al. |
| 2013/0019158 A1 | 1/2013 | Watanabe |
| 2013/0019174 A1 | 1/2013 | Gil et al. |
| 2013/0044062 A1 | 2/2013 | Bose et al. |
| 2013/0047100 A1 | 2/2013 | Kroeger et al. |
| 2013/0050131 A1 | 2/2013 | Lee et al. |
| 2013/0061172 A1 | 3/2013 | Huang et al. |
| 2013/0063389 A1 | 3/2013 | Moore |
| 2013/0067383 A1 | 3/2013 | Kataoka et al. |
| 2013/0067513 A1 | 3/2013 | Takami |
| 2013/0077804 A1 | 3/2013 | Glebe et al. |
| 2013/0080923 A1 | 3/2013 | Anzures et al. |
| 2013/0082824 A1* | 4/2013 | Colley ............ G06F 3/0488 340/6.1 |
| 2013/0093691 A1 | 4/2013 | Moosavi |
| 2013/0097520 A1 | 4/2013 | Lewin et al. |
| 2013/0097521 A1 | 4/2013 | Lewin et al. |
| 2013/0097534 A1 | 4/2013 | Lewin et al. |
| 2013/0097539 A1 | 4/2013 | Mansson et al. |
| 2013/0097564 A1 | 4/2013 | Morikawa et al. |
| 2013/0106766 A1 | 5/2013 | Yilmaz et al. |
| 2013/0113720 A1* | 5/2013 | Van Eerd ............ G06F 3/04883 345/173 |
| 2013/0120295 A1 | 5/2013 | Kim et al. |
| 2013/0135243 A1 | 5/2013 | Hirsch et al. |
| 2013/0135499 A1 | 5/2013 | Song |
| 2013/0141364 A1 | 6/2013 | Lynn et al. |
| 2013/0141396 A1 | 6/2013 | Lynn et al. |
| 2013/0145313 A1 | 6/2013 | Roh et al. |
| 2013/0154948 A1 | 6/2013 | Schediwy et al. |
| 2013/0154959 A1 | 6/2013 | Lindsay et al. |
| 2013/0155018 A1 | 6/2013 | Dagdeviren |
| 2013/0159893 A1 | 6/2013 | Lewin et al. |
| 2013/0162667 A1 | 6/2013 | Eskolin et al. |
| 2013/0169549 A1 | 7/2013 | Seymour et al. |
| 2013/0174094 A1 | 7/2013 | Heo et al. |
| 2013/0174179 A1 | 7/2013 | Park et al. |
| 2013/0179840 A1 | 7/2013 | Fisher et al. |
| 2013/0191791 A1 | 7/2013 | Rydenhag et al. |
| 2013/0198690 A1 | 8/2013 | Barsoum et al. |
| 2013/0212541 A1 | 8/2013 | Dolenc et al. |
| 2013/0222274 A1 | 8/2013 | Mori et al. |
| 2013/0222671 A1 | 8/2013 | Tseng et al. |
| 2013/0227450 A1 | 8/2013 | Na et al. |
| 2013/0232402 A1 | 9/2013 | Lu et al. |
| 2013/0232445 A1 | 9/2013 | Ording et al. |

(56) References Cited

U.S. PATENT DOCUMENTS

| | | |
|---|---|---|
| 2013/0234929 A1 | 9/2013 | Libin |
| 2013/0249814 A1 | 9/2013 | Zeng |
| 2013/0257793 A1 | 10/2013 | Zeliff et al. |
| 2013/0257817 A1 | 10/2013 | Yliaho |
| 2013/0265246 A1 | 10/2013 | Tae |
| 2013/0268875 A1 | 10/2013 | Han et al. |
| 2013/0278520 A1 | 10/2013 | Weng et al. |
| 2013/0325342 A1 | 12/2013 | Pylappan et al. |
| 2013/0326420 A1 | 12/2013 | Liu et al. |
| 2013/0326421 A1 | 12/2013 | Jo |
| 2013/0328770 A1 | 12/2013 | Parham |
| 2013/0332892 A1 | 12/2013 | Matsuki |
| 2013/0339909 A1 | 12/2013 | Ha |
| 2014/0002355 A1 | 1/2014 | Lee et al. |
| 2014/0002374 A1 | 1/2014 | Hunt et al. |
| 2014/0002386 A1 | 1/2014 | Rosenberg et al. |
| 2014/0026098 A1 | 1/2014 | Gilman |
| 2014/0028571 A1 | 1/2014 | St. Clair |
| 2014/0028601 A1 | 1/2014 | Moore |
| 2014/0049491 A1 | 2/2014 | Nagar et al. |
| 2014/0055367 A1 | 2/2014 | Dearman et al. |
| 2014/0055377 A1 | 2/2014 | Kim |
| 2014/0059485 A1 | 2/2014 | Lehrian et al. |
| 2014/0063316 A1 | 3/2014 | Lee et al. |
| 2014/0078343 A1 | 3/2014 | Dai et al. |
| 2014/0082536 A1 | 3/2014 | Costa et al. |
| 2014/0092025 A1 | 4/2014 | Pala et al. |
| 2014/0109016 A1 | 4/2014 | Ouyang et al. |
| 2014/0111456 A1 | 4/2014 | Kashiwa et al. |
| 2014/0111670 A1 | 4/2014 | Lord et al. |
| 2014/0139471 A1 | 5/2014 | Matsuki |
| 2014/0152581 A1 | 6/2014 | Case et al. |
| 2014/0157203 A1 | 6/2014 | Jeon et al. |
| 2014/0160063 A1 | 6/2014 | Yairi et al. |
| 2014/0160073 A1 | 6/2014 | Matsuki |
| 2014/0165006 A1 | 6/2014 | Chaudhri et al. |
| 2014/0168093 A1 | 6/2014 | Lawrence |
| 2014/0168153 A1 | 6/2014 | Deichmann et al. |
| 2014/0173517 A1 | 6/2014 | Chaudhri |
| 2014/0184526 A1 | 7/2014 | Cho |
| 2014/0210758 A1 | 7/2014 | Park et al. |
| 2014/0210798 A1 | 7/2014 | Wilson |
| 2014/0229888 A1 | 8/2014 | Ko et al. |
| 2014/0245202 A1 | 8/2014 | Yoon et al. |
| 2014/0267114 A1 | 9/2014 | Lisseman et al. |
| 2014/0267135 A1 | 9/2014 | Chhabra |
| 2014/0282084 A1 | 9/2014 | Murarka et al. |
| 2014/0282214 A1 | 9/2014 | Shirzadi et al. |
| 2014/0300569 A1 | 10/2014 | Matsuki et al. |
| 2014/0304651 A1 | 10/2014 | Johansson et al. |
| 2014/0306897 A1* | 10/2014 | Cueto ................. G06F 3/04883 345/173 |
| 2014/0306899 A1 | 10/2014 | Hicks |
| 2014/0310638 A1 | 10/2014 | Lee et al. |
| 2014/0313130 A1 | 10/2014 | Yamano et al. |
| 2014/0333561 A1 | 11/2014 | Bull et al. |
| 2014/0344765 A1 | 11/2014 | Hicks et al. |
| 2014/0354845 A1 | 12/2014 | Molgaard et al. |
| 2014/0354850 A1 | 12/2014 | Kosaka et al. |
| 2014/0359528 A1 | 12/2014 | Murata |
| 2014/0380247 A1 | 12/2014 | Tecarro et al. |
| 2015/0015763 A1 | 1/2015 | Lee et al. |
| 2015/0020036 A1 | 1/2015 | Kim et al. |
| 2015/0026584 A1 | 1/2015 | Kobayakov et al. |
| 2015/0026592 A1 | 1/2015 | Mohammed et al. |
| 2015/0029149 A1 | 1/2015 | Andersson et al. |
| 2015/0033184 A1 | 1/2015 | Kim et al. |
| 2015/0046876 A1 | 2/2015 | Goldenberg |
| 2015/0058723 A1 | 2/2015 | Cieplinski et al. |
| 2015/0062052 A1 | 3/2015 | Bernstein et al. |
| 2015/0062068 A1 | 3/2015 | Shih et al. |
| 2015/0067495 A1 | 3/2015 | Bernstein et al. |
| 2015/0067496 A1 | 3/2015 | Missig et al. |
| 2015/0067497 A1 | 3/2015 | Cieplinski et al. |
| 2015/0067513 A1 | 3/2015 | Zambetti et al. |
| 2015/0067519 A1 | 3/2015 | Missig et al. |
| 2015/0067559 A1 | 3/2015 | Missig et al. |
| 2015/0067560 A1* | 3/2015 | Cieplinski ........... G06F 3/04842 715/765 |
| 2015/0067563 A1 | 3/2015 | Bernstein et al. |
| 2015/0067596 A1 | 3/2015 | Brown et al. |
| 2015/0067601 A1 | 3/2015 | Bernstein et al. |
| 2015/0067602 A1 | 3/2015 | Bernstein et al. |
| 2015/0067605 A1 | 3/2015 | Zambetti et al. |
| 2015/0071547 A1 | 3/2015 | Keating et al. |
| 2015/0116205 A1 | 4/2015 | Westerman et al. |
| 2015/0121225 A1 | 4/2015 | Somasundaram et al. |
| 2015/0128092 A1 | 5/2015 | Lee et al. |
| 2015/0135109 A1 | 5/2015 | Zambetti et al. |
| 2015/0138126 A1 | 5/2015 | Westerman |
| 2015/0138155 A1 | 5/2015 | Bernstein et al. |
| 2015/0139605 A1 | 5/2015 | Wiklof |
| 2015/0143273 A1* | 5/2015 | Bernstein .............. G06F 3/0488 715/767 |
| 2015/0149899 A1 | 5/2015 | Bernstein et al. |
| 2015/0149964 A1 | 5/2015 | Bernstein et al. |
| 2015/0149967 A1 | 5/2015 | Bernstein et al. |
| 2015/0153929 A1 | 6/2015 | Bernstein et al. |
| 2015/0160729 A1 | 6/2015 | Nakagawa |
| 2015/0205495 A1 | 7/2015 | Koide et al. |
| 2015/0234446 A1 | 8/2015 | Nathan et al. |
| 2015/0253866 A1 | 9/2015 | Amm et al. |
| 2015/0268813 A1* | 9/2015 | Bos ..................... G06F 3/04812 715/773 |
| 2015/0321607 A1 | 11/2015 | Cho et al. |
| 2015/0332107 A1 | 11/2015 | Paniaras |
| 2015/0378519 A1 | 12/2015 | Brown et al. |
| 2015/0378982 A1* | 12/2015 | Mckenzie ............. G06F 3/0482 715/261 |
| 2015/0381931 A1 | 12/2015 | Uhma et al. |
| 2016/0004427 A1 | 1/2016 | Zambetti et al. |
| 2016/0004428 A1 | 1/2016 | Bernstein et al. |
| 2016/0004429 A1 | 1/2016 | Bernstein et al. |
| 2016/0004430 A1 | 1/2016 | Missig et al. |
| 2016/0004431 A1 | 1/2016 | Bernstein et al. |
| 2016/0004432 A1 | 1/2016 | Bernstein et al. |
| 2016/0011771 A1 | 1/2016 | Cieplinski |
| 2016/0019718 A1 | 1/2016 | Mukkamala et al. |
| 2016/0041750 A1 | 2/2016 | Cieplinski et al. |
| 2016/0048326 A1 | 2/2016 | Kim et al. |
| 2016/0062466 A1 | 3/2016 | Moussette et al. |
| 2016/0062619 A1 | 3/2016 | Reeve et al. |
| 2016/0070401 A1 | 3/2016 | Kim et al. |
| 2016/0103605 A1* | 4/2016 | Mese .................... G06F 3/017 345/174 |
| 2016/0132139 A1 | 5/2016 | Du et al. |
| 2016/0188181 A1 | 6/2016 | Smith |
| 2016/0210025 A1 | 7/2016 | Bernstein et al. |
| 2016/0224220 A1 | 8/2016 | Ganguly |
| 2016/0259412 A1 | 9/2016 | Flint et al. |
| 2016/0259413 A1 | 9/2016 | Anzures et al. |
| 2016/0259495 A1 | 9/2016 | Butcher et al. |
| 2016/0259496 A1 | 9/2016 | Butcher et al. |
| 2016/0259497 A1 | 9/2016 | Foss et al. |
| 2016/0259498 A1 | 9/2016 | Foss et al. |
| 2016/0259499 A1 | 9/2016 | Kocienda et al. |
| 2016/0259516 A1 | 9/2016 | Kudurshian et al. |
| 2016/0259517 A1 | 9/2016 | Butcher et al. |
| 2016/0259518 A1 | 9/2016 | King et al. |
| 2016/0259519 A1 | 9/2016 | Foss et al. |
| 2016/0259527 A1 | 9/2016 | Kocienda et al. |
| 2016/0259528 A1 | 9/2016 | Foss et al. |
| 2016/0259536 A1 | 9/2016 | Kudurshian et al. |
| 2016/0274686 A1 | 9/2016 | Ruiz et al. |
| 2016/0274728 A1 | 9/2016 | Luo et al. |
| 2016/0320906 A1 | 11/2016 | Bokma et al. |
| 2016/0357305 A1 | 12/2016 | Wells et al. |
| 2016/0357368 A1 | 12/2016 | Federighi et al. |
| 2016/0357389 A1 | 12/2016 | Dakin et al. |
| 2016/0357390 A1 | 12/2016 | Federighi et al. |
| 2016/0357404 A1 | 12/2016 | Alonso Ruiz et al. |
| 2016/0360116 A1 | 12/2016 | Penha et al. |

(56) References Cited

U.S. PATENT DOCUMENTS

| | | |
|---|---|---|
| 2017/0075520 A1 | 3/2017 | Bauer et al. |
| 2017/0075562 A1 | 3/2017 | Bauer et al. |
| 2017/0075563 A1 | 3/2017 | Bauer et al. |

FOREIGN PATENT DOCUMENTS

| | | |
|---|---|---|
| CN | 1808362 A | 7/2006 |
| CN | 1955906 | 5/2007 |
| CN | 101102573 | 1/2008 |
| CN | 101222704 A | 7/2008 |
| CN | 201107762 | 8/2008 |
| CN | 101320303 A | 12/2008 |
| CN | 101593077 A | 12/2009 |
| CN | 101727268 | 6/2010 |
| CN | 101809526 A | 8/2010 |
| CN | 102004593 A | 4/2011 |
| CN | 102037435 | 4/2011 |
| CN | 102099776 | 6/2011 |
| CN | 102112946 A | 6/2011 |
| CN | 102160021 A | 8/2011 |
| CN | 102385478 A | 3/2012 |
| CN | 102438092 A | 5/2012 |
| CN | 102662573 A | 9/2012 |
| CN | 102841677 A | 12/2012 |
| CN | 103097992 A | 5/2013 |
| DE | 100 59 906 A1 | 6/2002 |
| DE | 21 2009 000 073 | 2/2011 |
| DE | 20 2009 018 283 | 8/2011 |
| DE | 11 2009 001 276 | 1/2012 |
| DE | 11 2009 001 281 | 1/2012 |
| EP | 0 388 162 A2 | 3/1990 |
| EP | 0 859 307 A1 | 3/1998 |
| EP | 0 880 090 A2 | 11/1998 |
| EP | 1 028 583 A1 | 8/2000 |
| EP | 1 067 471 A1 | 1/2001 |
| EP | 1 406 150 A1 | 4/2004 |
| EP | 1 571 549 A2 | 2/2005 |
| EP | 1 562 105 A2 | 8/2005 |
| EP | 1 568 966 A2 | 8/2005 |
| EP | 1 640 855 A2 | 3/2006 |
| EP | 1 674 977 A2 | 6/2006 |
| EP | 1 882 902 A1 | 1/2008 |
| EP | 2 000 896 A2 | 12/2008 |
| EP | 2 017 701 A1 | 1/2009 |
| EP | 2 028 583 A2 | 2/2009 |
| EP | 2 141 574 A2 | 1/2010 |
| EP | 2 175 357 A1 | 4/2010 |
| EP | 2 196 893 A2 | 6/2010 |
| EP | 2 214 087 A1 | 8/2010 |
| EP | 2 226 715 A2 | 9/2010 |
| EP | 2 286 324 | 2/2011 |
| EP | 2 286 325 | 2/2011 |
| EP | 2 299 351 A2 | 3/2011 |
| EP | 2 302 496 A1 | 3/2011 |
| EP | 2 375 309 A1 | 10/2011 |
| EP | 2 375 314 A1 | 10/2011 |
| EP | 2 386 935 A1 | 11/2011 |
| EP | 2 407 868 A1 | 1/2012 |
| EP | 2 426 580 A2 | 3/2012 |
| EP | 2 447 818 A1 | 5/2012 |
| EP | 2 527 966 A2 | 11/2012 |
| EP | 2 530 677 A2 | 12/2012 |
| EP | 2 541 376 A1 | 1/2013 |
| EP | 2 555 500 A1 | 2/2013 |
| EP | 2 568 359 A2 | 3/2013 |
| EP | 2 615 535 A1 | 7/2013 |
| EP | 2 631 737 A1 | 8/2013 |
| EP | 2 674 846 A2 | 12/2013 |
| EP | 2 733 578 A2 | 5/2014 |
| EP | 2 808 764 A1 | 12/2014 |
| EP | 2 809 058 A1 | 12/2014 |
| EP | 2 813 938 A1 | 12/2014 |
| GB | 2 350 991 | 12/2000 |
| GB | 2 366 630 A | 3/2002 |
| GB | 2 402 105 A | 12/2004 |
| GB | 2 492 709 A | 11/2009 |
| GB | 2 473 389 | 3/2011 |
| GB | 2 474 153 | 4/2011 |
| JP | H07-151512 A | 6/1995 |
| JP | H08-227341 A | 9/1996 |
| JP | H09-330175 A | 12/1997 |
| JP | H11-203044 A | 7/1999 |
| JP | 2000-148348 | 5/2000 |
| JP | 2001-202192 A | 7/2001 |
| JP | 2002-041023 A | 2/2002 |
| JP | 2002-149312 A | 5/2002 |
| JP | 2002-268867 A | 9/2002 |
| JP | 2002-286489 | 10/2002 |
| JP | 2003-084744 A | 3/2003 |
| JP | 2003-157131 A | 5/2003 |
| JP | 2003-186597 A | 7/2003 |
| JP | 2004-054861 A | 2/2004 |
| JP | 2004-062648 A | 2/2004 |
| JP | 2004-070492 A | 3/2004 |
| JP | 2004-086733 A | 3/2004 |
| JP | 2004-152169 A | 5/2004 |
| JP | 2005-031786 A | 2/2005 |
| JP | 2005-070777 A | 3/2005 |
| JP | 2005-092386 A | 4/2005 |
| JP | 2005-135106 A | 5/2005 |
| JP | 2005-157842 A | 6/2005 |
| JP | 2005-222553 A | 8/2005 |
| JP | 2005-309933 A | 11/2005 |
| JP | 2006-185443 A | 7/2006 |
| JP | 2007-116384 A | 5/2007 |
| JP | 2007-517462 A | 6/2007 |
| JP | 2007-264808 A | 10/2007 |
| JP | 2008-009759 A | 1/2008 |
| JP | 2008-015890 A | 1/2008 |
| JP | 2008-017373 A | 1/2008 |
| JP | 2008-033739 A | 2/2008 |
| JP | 2008-076818 A | 4/2008 |
| JP | 2008-076853 A | 4/2008 |
| JP | 2008-146453 A | 6/2008 |
| JP | 2008-537615 | 9/2008 |
| JP | 2008 305174 A | 12/2008 |
| JP | 2009-500761 | 1/2009 |
| JP | 2009-211704 A | 9/2009 |
| JP | 2009-217543 A | 9/2009 |
| JP | 2009-217815 A | 9/2009 |
| JP | 2010-009321 A | 1/2010 |
| JP | 2010-503130 A | 1/2010 |
| JP | 2010-055274 A | 3/2010 |
| JP | 2010-146507 A | 7/2010 |
| JP | 2010-152716 A | 7/2010 |
| JP | 2010-176174 A | 8/2010 |
| JP | 2010-176337 A | 8/2010 |
| JP | 2010-181934 A | 8/2010 |
| JP | 2010-541071 A | 12/2010 |
| JP | 2011-501307 A | 1/2011 |
| JP | 2011-048666 A | 3/2011 |
| JP | 2011-048686 A | 3/2011 |
| JP | 2011-048762 A | 3/2011 |
| JP | 2011-048832 A | 3/2011 |
| JP | 2011-053831 A | 3/2011 |
| JP | 2011-053973 A | 3/2011 |
| JP | 2011-059821 A | 3/2011 |
| JP | 2011-070342 A | 4/2011 |
| JP | 2011-100290 A | 5/2011 |
| JP | 2011-107823 A | 6/2011 |
| JP | 2011-123773 A | 6/2011 |
| JP | 2011-141868 A | 7/2011 |
| JP | 2011-192179 A | 9/2011 |
| JP | 2011-192215 A | 9/2011 |
| JP | 2011-242386 A | 12/2011 |
| JP | 2011-253556 A | 12/2011 |
| JP | 2011-257941 A | 12/2011 |
| JP | 2011-530101 A | 12/2011 |
| JP | 2012-027940 A | 2/2012 |
| JP | 2012-043266 A | 3/2012 |
| JP | 2012-043267 A | 3/2012 |
| JP | 2012-053754 | 3/2012 |
| JP | 2012-053926 A | 3/2012 |
| JP | 2012-073873 A | 4/2012 |

(56) References Cited

FOREIGN PATENT DOCUMENTS

| | | |
|---|---|---|
| JP | 2012-509605 A | 4/2012 |
| JP | 2012-093820 A | 5/2012 |
| JP | 2012-123564 A | 6/2012 |
| JP | 2012-128825 A | 7/2012 |
| JP | 2013-030050 A | 2/2013 |
| JP | 2013-058149 A | 3/2013 |
| JP | 2013-080521 A | 5/2013 |
| JP | 2013-529339 A | 7/2013 |
| JP | 2013-542488 A | 11/2013 |
| JP | 2014-130567 A | 7/2014 |
| JP | 2014-519109 A | 8/2014 |
| JP | 2015-153420 A | 8/2015 |
| KR | 2006-0071353 A | 6/2006 |
| KR | 2008-0045143 A | 4/2008 |
| KR | 2008-0054346 A | 6/2008 |
| KR | 2008-0078108 A | 8/2008 |
| KR | 2010-0010302 | 2/2010 |
| KR | 2010-0023637 | 3/2010 |
| KR | 2010-0034608 | 4/2010 |
| KR | 2010 0046087 | 6/2010 |
| KR | 2010 0133246 A | 12/2010 |
| KR | 2011 0086501 A | 7/2011 |
| KR | 2013 0099647 A | 9/2013 |
| KR | 2014 0079110 A | 6/2014 |
| KR | 20150021977 A | 3/2015 |
| WO | WO 90/10910 A1 | 9/1990 |
| WO | WO 90/11571 A1 | 10/1990 |
| WO | WO 91/14231 A1 | 9/1991 |
| WO | WO 95/26005 A1 | 9/1995 |
| WO | WO 98/49639 A1 | 11/1998 |
| WO | WO 99/19821 A1 | 4/1999 |
| WO | WO 99/30259 A1 | 6/1999 |
| WO | WO 99/53424 A1 | 10/1999 |
| WO | WO 00/11587 A1 | 3/2000 |
| WO | WO 00/50974 A2 | 8/2000 |
| WO | WO 00/52619 A1 | 9/2000 |
| WO | WO 00/62187 A2 | 10/2000 |
| WO | WO 00/65510 A1 | 11/2000 |
| WO | WO 01/16830 A1 | 3/2001 |
| WO | WO 01/16852 A2 | 3/2001 |
| WO | WO 01/22263 A2 | 3/2001 |
| WO | WO 01/22315 A2 | 3/2001 |
| WO | WO 01/88808 A1 | 11/2001 |
| WO | WO 00/62187 A3 | 12/2001 |
| WO | WO 01/22263 A3 | 1/2002 |
| WO | WO 01/22315 A3 | 1/2002 |
| WO | WO 02/07032 A1 | 1/2002 |
| WO | WO 02/15461 A2 | 2/2002 |
| WO | WO 01/16852 A8 | 6/2002 |
| WO | WO 2005/106637 A2 | 11/2005 |
| WO | WO 2006/013485 A2 | 2/2006 |
| WO | WO 2006/043209 A1 | 4/2006 |
| WO | WO 2006/073020 A1 | 7/2006 |
| WO | WO 2007/121557 A1 | 11/2007 |
| WO | WO 2008/030976 A2 | 3/2008 |
| WO | WO 2008/064142 A2 | 5/2008 |
| WO | WO 2009/059062 A2 | 5/2009 |
| WO | WO 2009/143075 A2 | 11/2009 |
| WO | WO 2009/143076 A2 | 11/2009 |
| WO | WO 2009/143294 A2 | 11/2009 |
| WO | WO 2009/148781 A2 | 12/2009 |
| WO | WO 2009/155981 A1 | 12/2009 |
| WO | WO 2009/158549 A2 | 12/2009 |
| WO | WO 2010/013876 A1 | 2/2010 |
| WO | WO 2010/090010 A1 | 8/2010 |
| WO | WO 2011/024389 A1 | 3/2011 |
| WO | WO 2011/024465 A1 | 3/2011 |
| WO | WO 2011/093045 A1 | 8/2011 |
| WO | WO 2011/105009 A1 | 9/2011 |
| WO | WO 2011/114630 A1 | 9/2011 |
| WO | WO 2011/115187 A1 | 9/2011 |
| WO | WO 2011/121375 A1 | 10/2011 |
| WO | WO 2012/037664 | 3/2012 |
| WO | WO 2012/096804 A2 | 7/2012 |
| WO | WO 2012/114760 A1 | 8/2012 |
| WO | WO 2012/150540 A2 | 11/2012 |
| WO | WO 2013/169299 A1 | 11/2013 |
| WO | WO 2013/169849 A2 | 11/2013 |
| WO | WO 2013/169851 A2 | 11/2013 |
| WO | WO 2013/169853 A1 | 11/2013 |
| WO | WO 2013/169854 A2 | 11/2013 |
| WO | WO 2013/169870 A1 | 11/2013 |
| WO | WO 2013/169875 A2 | 11/2013 |
| WO | WO 2013/169877 A2 | 11/2013 |
| WO | WO 2013/169882 A2 | 11/2013 |
| WO | WO 2014/105275 A1 | 7/2014 |
| WO | WO 2014/105276 A1 | 7/2014 |
| WO | WO 2014/105277 A1 | 7/2014 |
| WO | WO 2014/105278 A1 | 7/2014 |
| WO | WO 2014/105279 A1 | 7/2014 |
| WO | WO 2014/129655 A1 | 8/2014 |
| WO | WO 2014/149473 A1 | 9/2014 |
| WO | WO 2014/200733 A1 | 12/2014 |
| WO | WO 2016/200584 A2 | 12/2016 |

OTHER PUBLICATIONS

Office Action, dated May 18, 2016, received in Australian Patent ApplicationU.S. Patent Application No. 2014238116, which corresponds with U.S. Appl. No. 14/183,405, 4 pages.

Agarwal, "How to Copy and Paste Text on Windows Phone 8," Guiding Tech, http://web.archive.org/web20130709204246/http://www.guidingtech.com/20280/copy-paste-text-windows-phone-8/, Jul. 9, 2013, 10 pages.

Alzona, "Full Screen Maximization with RightZoom," http://www.brighthub.com/computing/mac-platform/articles/31024.aspx>, Mar. 31, 2009, 6 pages.

Apple Inc., "iPhone User Guide for iPhone and iPhone 3G," http://manuals.info.apple.com/en_US/iPhone_User_Guide.pdf, Jul. 11, 2008, 154 pages.

Ask.MetaFilter, "Enable Screen Resize?" ask. Metafilter.com, Jan. 29, 2006, http://ask.metafilter.com/31720/Enable-screen-resize, 4 pages.

Awduche et al., "Synchronized Broadcast in Cellular Networks," 2nd Telecommunications R&D Conference in Massachusetts, Mar. 1996, 12 pages.

Azundris, "A Fire in the Sky," http://web.archive.org/web/20140722062639/http://blog.azundrix.com/archives/168-A-fire-in-the-sky.html, Jul. 22, 2014, 8 pages.

Bautista, "Microsoft Mathematics Tutorial 7—The Ink Input", <URL:http://mathandmultimedia.com/2012/05/23/microsoft-math-tutorial-7-ink>, May 23, 2012, 3 pages.

Cohen, Cinemagraphs are Animated Gifs for Adults, http:www.tubefilter.com//2011/07/10/cinemagraph/, Jul. 10, 2011, 3 pages.

CrackBerry Forums, Windows 8 Bezel Control and Gestures, http://wwwforums.crackberry.com/blackberry-playbook-f222/windows-8-bezel-control-gestures-705129/, Mar. 1, 2012, 8 pages.

Crook, "Microsoft Patenting Multi-Screen, Milti-Touch Gesures," http://techcrunch.com/2011/08/25/microsoft-awarded-patents-for-multi-screen-multi-touch-gestures/, Aug. 25, 2011, 8 pages.

cvil.ly—a design blog, Interesting Touch Interactions on Windows 8, http://cvil.ly/2011/06/04/interesting-touch-interactions-on-windows-8/, Jun. 4, 2011, 3 pages.

Davidson, et al., "Extending 2D Object Arrangement with Pressure-Sensitive Layering Cues", Proceedings of the 21st Annual ACM Symposium on User Interface Software and Technology, Oct. 19, 2008, 4 pages.

Deeter, "DigiStamp Signs Strategic Partnership with European Trust Center EuroSignCard to Safeguard Monetary Transactions in Financial Sector," http://proquest.umi.com/, Mar. 14, 2001, 2 pages.

Dilger, "Inside Apple's iPad: Multitasking," Appleinsider.com, <http://www.appleinsider.com/articles/10/02/18/inside_apples_ipad_multitasking.html>, Feb. 17, 2010, 3 pages.

Dinwiddie, et al., "Combined-User Interface for Computers, Television, Video Recorders, and Telephone, Etc", ip.com Journal, Aug. 1, 1990, 3 Pages.

Drinkwater, "Glossary: Pre/Post Alarm Image Buffer," http://www.networkwebcams.com/ip-camera-learning-center/2008/07/17/glossary-prepost-alarm-image-buffer/, Jul. 17, 2008, 1 page.

(56) References Cited

OTHER PUBLICATIONS

Fahey, "The iPad Blows Up iPhone Apps Read Good," Kotaku http://kotaku.com/5458316/the-ipad-blows-up-iphone-apps-rel-good, Jan. 27, 2010, 3 pages.
Fehily, "Visual QuickStart Guide: Microsoft Windows 7," Peachpit Press, 9 pages.
Fenlon, "The Case for Bezel Touch Gestures on Apple's iPad," http://www.tested.com/tech/tablets/3104-the case-for-bezel-touch-gestures-on-apples-ipad/, Nov. 2, 2011, 6 pages.
Flixel, "Cinemagraph Pro for Mac", https://flixel.com/products/mac/cinemagraph-pro, 2014, 7 pages.
Flock, "Cinemagraphics: What It Looks Like When a Photo Moves," http://www.washingtonpost.com/blogs/blowpost/post/cinemagraphs-what-it-looks-like-when-a-photo-moves/2011/07-08/gl@AONez3H.blog.html, Jul. 12, 2011, 3 pages.
Flowplayer, "Slowmotion: Flowplayer," https://web.archive.org/web/20150226191526/http://flash.flowplayer.org/plugins/streaming/slowmotion.html, Feb. 26, 2015, 4 pages.
Forlines, et al., "Glimpse: a Novel Input Model for Multi-level Devices", Chi '05 Extended Abstracts on Human Factors in Computing Systems, Apr. 2, 2005, 4 pages.
Gorman, "Hands-On With Immersion HD Integrator Hi-Fi Haptics," http://www.engadget.com/2012/02/23/hands-on-with-immersion-hd-integrator-hi-fi-haptics/?utm_medium=referral&utm_source=pulsenews, Feb. 23, 2012, 10 pages.
Harris, "Windows 8 Consumer Preview: Product Demo," https://www.youtube.com/watch?feature=[;auer-embedded&v=jDYAQmQ-phX8, Feb. 28, 2012, 3 pages.
Harrison, "Stylus-Based Interface with Full Mouse Emulation", IBM Technical Disclosure Bulletin, vol. 34, No. 10B, Mar. 1, 1992, 3 pages.
HTC, "HTC One (M7)," Wikipedia, the free encyclopedia, https://en.wikipedia.org/wiki/HTC_One_(M7), Mar. 2013, 20 pages.
HTC, "User Manual—PDA Phone—HTC_P3050 Touch," http://web.archive.org/web/20101228223033/http://www.comparecellular.com, Nov. 2, 2007, 154 pages.
IBM et al., "Pressure-Sensitive Icons", IBM, US, Jun. 1, 1990, 3 pages.
iCIMS Recruiting Software, "Blackberry Playbook Review," http://www.tested.com/tech.tablets/5749-blackberry-playbook-review/, 2015, 11 pages.
Jade et al., "Apple's iPhone 4.0 to Support Multitasking via Expose-like Interface," AppleInsider.com, Mar. 31, 2010, 4 pages.
Jade et al., "Apple's iPhone 4.0 Software to Deliver Multitasking Support," AppleSider.com, Mar. 11, 2010, 3 pages.
Kronfli, "HTC Zoe Comes to Goole Play, Here's Everthing You Need to Know," Know Your Mobile, http://www.knowyourmobile.com/htc/htc-one/19550/what-htc-zoe, Aug. 14, 2014, 5 pages.
Nikon, "Scene Recognition System and Advanced SRS," http://www.nikonusa.com/en/Learn-And-Explore/Article/ftlzi4rr/Scene-Recognition-System-html, downloaded on May 20, 2016, 2 pages.
Kishore, "Make the OS X Maximize Button Work like Windows," http://www.switchingtomac.com/making-the-switch/make-the-os-x-maximize-buttom-work-like-windows/, May 5, 2009, 11 pages.
MacRumors, "Fit to Screen Button Poll for Mac / Windows Users," http://forums.macrumors.com/showthread.php?t=615215>, Dec. 11, 2008, 15 pages.
MacRumors, "Window, Fit to Screen?," http://forums.macrumors.com/showthread.php?t=439783>, Feb. 22, 2008, 5 pages.
McRitchie, "Internet Explorer Right-Click Menus," http://web.archive.org/web/201405020/http:/dmcritchie.mvps.org/ie/rightie6.htm, May 2, 2014, 10 pages.
MetaFilter Network Inc., "Enable Screen Resize?", http://ask.metafilter.com/31720/Enable-screen-resize>, Jan. 29, 2006, 4 pages.
Mick, "iPhone OS 4.0 Will Bring True Multitasking This Summer", Daily Tech, http:///www.dailytech.com/report+iphone+os+40+will+bring+true+multitasking+this+summer/article 17878.htm>, Mar. 11, 2010, 3 pages.

Minsky, "Computational Haptics the *Sandpaper* System for Synthesizing Texture for a Force-Feedback Display," Massachusetts Institute of Technology, Jun. 1978, 217 pages.
Moth, "Share Code—Write Code Once for Both Mobile and Desktop Apps," MSDN Magazine, Jul. 2007, http://msdn.microsoft.com/en-us/magazine/cc163387.aspx, 8 pages.
Newman, "Sprint's HTC EVO 4G: 5 Killer Features," pcworld, http://www.pcworld.com/article/192286/sprints_htc_evo_4g_5_killer_features.html, Mar. 24, 2010, 3 pages.
Nickinson, "Review: The New HTC Sense Interface on Android Phones," Android Central, Feb. 22, 2010, http://www.androidcentral.com/review-new-htc-sense-android-phone, 10 pages.
Nilsson, "Design Guidelines for Mobile Applications," SINTEF ICT, Jun. 2008, 73 pages.
Nilsson et al., "Design Patterns for User Interface for Mobile Applications," Advances in Engineering Software, Elsevier Science, Oxford, GB vol. 40, No. 12, Dec. 1, 2009, 11 pages.
O'Hara, et al., "Pressure-Sensitive Icons", ip.com Journal, Jun. 1, 1990, 2 Pages.
Pallenberg, "Wow, the new iPad had gestures." https://plus.google.com/+SaschaPallenberg/posts/aaJtJogu8ac, Mar. 7, 2012, 2 pages.
PoliceOne.com, "COBAN Technoligies Pre-Event Buffer & Fail Safe Feature," http://www.policeone.com/police-products/police-technology/mobile-computures/videos/5955587-COBAN-Technologies-Pre-Event, Nov. 11, 2010, 2 pages.
Pradeep, "Android App Development—Microsoft Awarded With Patents on Gestures Supported on Windows 8," http://mspoweruser.com/microsoft-awarded-with-patents-on-gestures-supported-on-windows-8/, Aug. 25, 2011, 16 pages.
Quinn, et al., "Zoofing! Faster List Selections with Pressure-Zoom-Flick-Scrolling", Proceedings of the 21st Annual Conference of the Australian Computer-Human Interaction Special Interest Group on Design, Nov. 23, 2009, ACM Press, vol. 411, 8 pages.
Reiger, "Effective Design for Multiple Screen Sizes," mobiForge, http://mobiforge.com/designing/story/effective-design-multiple-screen-sizes, Jan. 2009, 12 pages.
Rekimoto, et al., "PreSense: Interaction Techniques for Finger Sensing Input Devices", Proceedings of the 16th Annual ACM Symposium on User Interface Software and Technology, Nov. 30, 2003, 10 pages.
Rekimoto, et al., "PreSensell: Bi-directional Touch and Pressure Sensing Interactions with Tactile Feedback", Conference on Human Factors in Computing Systems Archive, ACM, Apr. 22, 2006, 6 pages.
Robertson et al., "The Task Gallery: A 3D Window Manager," Redmond, WA, Sep. 12, 1999, 8 pages.
Savov, "HTC Enhances Sense with Leap and Friend Stream (updated with video)," Engadget, http://www.engadget.com/2010/02/16/htc-enhances-sense-with-leap-and-friend-stream/, Feb. 16, 2010, 4 pages.
Seffah et al., Multi-devices "Multiple" User Interfaces: Development Models and Research Opportunities, The Journal of Systems Software, www.sciencedirect.com, Dec. 25, 2003, 14 pages.
Siracusa, "Antacid Tablet," http://arstechnica.com/staff/2010/01/antacid-tablet/>, Jan. 1, 2010, 3 pages.
Song, et al., "Grips and Gestures on a Multi-Touch Pen," The ACM CHI Conference on Human Factors in Computing Systems, <URL:research.microsoft.com/pubs/.../gripsandgenstures%20mtpen-chi201>, May 7-12, 2011, 10 pages.
Sony, "Intelligent Scene Recognition," https://www.sony-asia.com/article/252999/section/product/product/dsc-t77, downloaded on May 20, 2016, 5 pages.
Sony, "Sony Xperia Z1", Wikipedia, the free encyclopedia, https://en.wikipedia.org/wiki/Sony_Xperia_Z1, Sep. 2013, 10 pages.
Stross, "Wearing a Badge, and a Video Camera," The New York Times, http://www.nytimes.com/2013/04/07/business/wearable-video-cameras-for-police-offers.html? R=0, Apr. 6, 2013, 4 pages.
Taser, "Taser Axon Body Camera User Manual," https://www.taser.com/images/support/downloads/product-resourses/axon_body_product_manual.pdf, Oct. 1, 2013, 24 pages.
Tidwell, "Designing Interfaces," O'Reilly Media, Inc., USA, Nov. 2005, 348 pages.

(56) References Cited

OTHER PUBLICATIONS

Viana et al., "Xmobile: A MB-UID Environment for Semi-Automatic Generation of Adaptive Applications for Mobile Devices," The Journal of Systems and Software, www.sciencedirect.com, Jun. 9, 2007, 13 pages.
Wikipedia, "AirDrop,", Wikipedia, the free encyclopedia, http://en.wikipedia.org/wiki/AirDrop, May 17, 2016, 5 pages.
Wikipedia, "Cinemagraph," Wikipedia, the free encyclopedia, http://en.wikipedia.org/wiki/Cinemagraph, 2 pages.
Wikipedia, "Mobile Ad Hoc Network," Wikipedia, the free encyclopedia, http://en.wikipedia.org/wiki/Mobile_ad_hoc_network, May 20, 2016, 4 pages.
Windows, "Stupid Geek Tricks: Tile or Cascade Multiple Windows in Windows 7," How to Geek, Feb. 18, 2010, 3 pages.
YouTube, "Blackberry Playbook bezel interation," https://www.youtube.com/watch?v=YGkzFqnOwXI, Jan. 10, 2011, 2 pages.
Office Action, dated Dec. 18, 2015, received in Australian Patent Application No. 2013368440, which corresponds with U.S. Appl. No. 14/536,426, 3 pages.
Office Action, dated Apr. 5, 2016, received in Korean Patent Application No. 10-20157018851, which corresponds with U.S. Appl. No. 14/536,426, 7 pages.
Office Action, dated Dec. 17, 2015, received in U.S. Appl. No. 14/536,426, 28 pages.
Office Action, dated May 6, 2016, received in U.S. Appl. No. 14/536,426, 23 pages.
Office Action, dated Jul. 15, 2015, received in Australian Patent Application No. 2013259606, which corresponds with U.S. Appl. No. 14/536,426, 3 pages.
Notice of Allowance, dated May 23, 2016, received in Australian Patent Application No. 2013259606, which corresponds with U.S. Appl. No. 14/536,426, 3 pages.
Office Action, dated Nov. 18, 2015, received in Australian Patent Application No. 2015101231, which corresponds with U.S. Appl. No. 14/536,426, 3 pages.
Office Action, dated Mar. 4, 2016, received in Japanese Patent Application No. 2015-511644, which corresponds with U.S. Appl. No. 14/536,426, 3 pages.
Office Action, dated Feb. 1, 2016, received in Australian Patent Application No. 2013368441, which corresponds with U.S. Appl. No. 14/608,926, 3 pages.
Notice of Allowance, dated Mar. 30, 2016, received in Australian Patent Application No. 2013368441, which corresponds with U.S. Appl. No. 14/608,926, 1 page.
Office Action, dated Apr. 21, 2016, received in European Patent Application No. 13795392.3, which corresponds with U.S. Appl. No. 14/608,926, 6 pages.
Office Action, dated May 6, 2016, received in European Patent Application No. 13795392.3, which corresponds with U.S. Appl. No. 14/608,926, 6 pages.
Office Action, dated Mar. 14, 2016, received in Japanese Patent Application No. 2015-549392, which corresponds with U.S. Appl. No. 14/608,926, 4 pages.
Office Action, dated May 12, 2016, received in Korean Patent Application No. 10-2015-7018853, which corresponds with U.S. Appl. No. 14/608,926, 4 pages.
Office Action, dated Jul. 17, 2015, received in Australian Patent Application No. 2013259613, which corresponds with U.S. Appl. No. 14/536,646, 5 pages.
Office Action, dated May 31, 2016, received in Australian Patent Application No. 2013259613, which corresponds with U.S. Appl. No. 14/536,646, 4 pages.
Office Action, dated Nov. 12, 2015, received in European Patent Application No. 13724102.2, which corresponds with U.S. Appl. No. 14/536,646, 6 pages.
Office Action, dated May 31, 2016, received in European Patent Application No. 13724102.2, which corresponds with U.S. Appl. No. 14/536,646, 5 pages.
Office Action, dated Feb. 29, 2016, received in Japanese Patent Application No. 2015-511645, which corresponds with U.S. Appl. No. 14/536,646, 5 pages.
Office Action, dated Aug. 27, 2015, received in Australian Patent Application No. 2013259614, which corresponds with U.S. Appl. No. 14/536,141, 4 pages.
Office Action, dated Jan. 7, 2016, received in European Patent Application No. 13726053.5, which corresponds with U.S. Appl. No. 14/536,141, 10 pages.
Office Action, dated Feb. 29, 2016, received in Japanese Patent Application No. 2015-511646, which corresponds with U.S. Appl. No. 14/536,141, 3 pages.
Office Action, dated Jan. 29, 2016, received in Australian Patent Application No. 2013368443, which corresponds with U.S. Appl. No. 14/536,141, 3 pages.
Notice of Allowance, dated Mar. 11, 2016, received in Australian Patent Application No. 2013368443, which corresponds with U.S. Appl. No. 14/536,141, 2 pages.
Office Action, dated Apr. 5, 2016, received in Korean Patent Application No. 10-2015-7018448, which corresponds with U.S. Appl. No. 14/536,141, 6 pages.
Office Action, dated Jul. 9, 2015, received in Australian Patent Application No. 2013259630, which corresponds with U.S. Appl. No. 14/536,203, 3 pages.
Office Action, dated Nov. 11, 2015, received in European Patent Application No. 13724104.8, which corresponds with U.S. Appl. No. 14/536,203, 5 pages.
Office Action, dated May 31, 2016, received in European Patent Application No. 13724104.8, which corresponds with U.S. Appl. No. 14/536,203, 5 pages.
Office Action, dated Feb. 15, 2016, received in Japanese Patent Application No. 2015-511650, which corresponds with U.S. Appl. No. 14/536,203, 5 pages.
Office Action, dated Dec. 4, 2015, received in Korean Patent Application No. 2014-7034520, which corresponds with U.S. Appl. No. 14/536,203, 4 pages.
Office Action, dated Aug. 10, 2015, received in Australian Patent Application No. 2013259637, which corresponds with U.S. Appl. No. 14/536,267, 3 pages.
Office Action, dated Jan. 29, 2016, received in Japanese Patent Application No. 2015-511652, which corresponds with U.S. Appl. No. 14/536,267, 3 pages.
Office Action, dated Dec. 4, 2015, received in Korean Patent Application No. 2014-7034530, which corresponds with U.S. Appl. No. 14/536,267, 3 pages.
Office Action, dated Aug. 18, 2015, received in Australian Patent Application No. 2013259642, which corresponds with U.S. Appl. No. 14/536,291, 3 pages.
Office Action, dated Jan. 7, 2016, received in European Patent Application No. 13724107.1, which corresponds with U.S. Appl. No. 14/052,515, 11 pages.
Office Action, dated Apr. 25, 2016, received in Japanese Patent Application No. 2015-550384, which corresponds with U.S. Appl. No. 14/608,985, 4 pages.
Office Action, dated Mar. 31, 2016, received in U.S. Appl. No. 14/864,737, 17 pages.
Office Action, dated Apr. 5, 2016, received in Danish Patent Application No. 201500577, which corresponds with U.S. Appl. No. 14/864,737, 7 pages.
Office Action, dated Mar. 18, 2016, received in Danish Patent Application No. 201500575, which corresponds with U.S. Appl. No. 14/866,981, 9 pages.
Office Action, dated Mar. 9, 2016, received in Danish Patent Application No. 201500574, which corresponds with U.S. Appl. No. 14/866,159, 11 pages.
Office Action, dated Mar. 30, 2016, received in Danish Patent Application No. 201500588, which corresponds with U.S. Appl. No. 14/868,078, 9 pages.
Office Action, Apr. 4, 2016, received in Danish Patent Application No. 201500582, which corresponds with U.S. Appl. No. 14/863,432, 10 pages.

(56) References Cited

OTHER PUBLICATIONS

Office Action, dated Mar. 22, 2016, received in Danish Patent Application No. 201500576, which corresponds with U.S. Appl. No. 14/866,989, 10 pages.
Notice of Allowance, dated Jun. 8, 2016, received in Danish Patent Application No. 201500576, which corresponds with U.S. Appl. No. 14/866,989, 2 pages.
Office Action, dated Feb. 3, 2016, received in Danish Patent Application No. 201500592, which corresponds with U.S. Appl. No. 14/869,899, 9 pages.
Office Action, dated Mar. 18, 2016, received in Danish Patent Application No. 201500593, which corresponds with U.S. Appl. No. 14/866,992, 10 pages.
Office Action, dated Nov. 30, 2015, received in U.S. Appl. No. 14/845,217, 24 pages.
Final Office Action, dated Apr. 22, 2016, received in U.S. Appl. No. 14/845,217, 36 pages.
Office Action, dated Feb. 3, 2016, received in U.S. Appl. No. 14/856,517, 36 pages.
Office Action, dated Feb. 11, 2016, received in U.S. Appl. No. 14/856,519, 34 pages.
Office Action, dated Feb. 1, 2016, received in U.S. Appl. No. 14/857,645, 15 pages.
Office Action, dated Jan. 25, 2016, received in U.S. Appl. No. 14/864,580, 29 pages.
Notice of Allowance, dated May 17, 2016, received in U.S. Appl. No. 14/152,971, 9 pages.
Office Action, dated Apr. 8, 2016; received in Danish Patent Application No. 201500584, which corresponds with U.S. Appl. No. 14/864,580, 9 pages.
Office Action, dated Apr. 19, 2016, received in U.S. Appl. No. 14/864,627, 9 pages.
Office Action, dated Apr. 8, 2016, received in Danish Patent Application No. 201500585, which corresponds with U.S. Appl. No. 14/864,627, 9 pages.
Office Action, dated Mar. 29, 2016, received in U.S. Appl. No. 14/866,361, 22 pages.
Office Action, dated Apr. 7, 2016, received in Danish Patent Application No. 201500579, which corresponds with U.S. Appl. No. 14/866,361, 10 pages.
Office Action, dated Mar. 22, 2016, received in Danish Patent Application No. 201500587, which corresponds with U.S. Appl. No. 14/866,987, 8 pages.
Office Action, dated Apr. 1, 2016, received in Danish Patent Application No. 201500589, which corresponds with U.S. Appl. No. 14/866,989, 8 pages.
Office Action, dated Apr. 11, 2016, received in U.S. Appl. No. 14/871,236, 23 pages.
Office Action, dated Apr. 8, 2016, received in Danish Patent Application No. 201500595, which corresponds with U.S. Appl. No. 14/871,236, 12 pages.
Office Action, dated May 26, 2016, received in Danish Patent Application No. 201500595, which corresponds with U.S. Appl. No. 14/871,236, 14 pages.
Office Action, dated Apr. 6, 2016, received in Danish Patent Application No. 201500596, which corresponds with U.S. Appl. No. 14/870,882, 7 pages.
Office Action, dated Apr. 7, 2016, received in Danish Patent Application No. 201500597, which corresponds with U.S. Appl. No. 14/871,227, 7 pages.
Office Action, dated Apr. 18, 2016, received in Danish Patent Application No. 201500601, which corresponds with U.S. Appl. No. 14/871,336, 8 pages.
Notice of Allowance, dated Apr. 18, 2016, received in Danish Patent Application No. 201500600, which corresponds with U.S. Appl. No. 14/871,462, 7 pages.
Office Action, dated Apr. 29, 2016, received in U.S. Appl. No. 14/867,823, 28 pages.
Office Action, dated Mar. 18, 2016, received in Danish Patent Application No. 201500594, which corresponds with U.S. Appl. No. 14/867,823, 10 pages.
Office Action, dated May 10, 2016, received in U.S. Appl. No. 14/867,892, 28 pages.
Office Action, dated Mar. 21, 2016, received in Danish Patent Application No. 201500598, which corresponds with U.S. Appl. No. 14/867,892, 9 pages.
Office Action, dated May 23, 2016, received in Australian Patent Application No. 2016100253, which corresponds with U.S. Appl. No. 14/867,990, 5 pages.
Office Action, dated Mar. 18, 2016, received in Danish Patent Application No. 201500581, which corresponds with U.S. Appl. No. 14/867,990, 9 pages.
International Search Report and Written Opinion dated May 26, 2014, received in International Application No. PCT/US2013/040053, which corresponds to U.S. Appl. No. 14/535,671, 32 pages.
International Preliminary Report on Patentability dated Nov. 20, 2014, received in International Application No. PCT/US2013/040053, which corresponds to U.S. Appl. No. 14/535,671, 26 pages.
Invitation to Pay Additional Fees dated Feb. 10, 2014, received in International Application No. PCT/US2013/069472, which corresponds to U.S. Appl. No. 14/608,895, 6 pages.
International Search Report and Written Opinion dated Apr. 7, 2014, received in International Application No. PCT/US2013/069472, which corresponds to U.S. Appl. No. 14/608,895, 24 pages.
International Preliminary Report on Patentability, dated Jun. 30, 2015, received in International Patent Application No. PCT/US2013/069472, which corresponds with U.S. Appl. No. 14/608,895, 18 pages.
International Search Report and Written Opinion dated Aug. 7, 2013, received in International Application No. PCT/US2013/040054, which corresponds to U.S. Appl. No. 14/536,235, 12 pages.
International Preliminary Report on Patentability dated Nov. 20, 2014, received in International Application No. PCT/US2013/040054, which corresponds to U.S. Appl. No. 14/536,235, 11 pages.
International Search Report and Written Opinion dated Aug. 7, 2013, received in International Application No. PCT/US2013/040056, which corresponds to U.S. Appl. No. 14/536,367, 12 pages.
International Preliminary Report on Patentability dated Nov. 20, 2014, received in International Application No. PCT/US2013/040056, which corresponds to U.S. Appl. No. 14/536,367, 11 pages.
Extended European Search Report, dated Nov. 6, 2015, received in European Patent Application No. 15183980.0, which corresponds with U.S. Appl. No. 14/536,426, 7 pages.
International Search Report and Written Opinion dated Aug. 6, 2013, received in International Application No. PCT/US2013/040058, which corresponds to U.S. Appl. No. 14/536,426, 12 pages.
International Preliminary Report on Patentability dated Nov. 20, 2014, received in International Application No. PCT/US2013/040058, which corresponds to U.S. Appl. No. 14/536,426, 11 pages.
Invitation to Pay Additional Fees dated Sep. 25, 2013, received in International Application No. PCT/US2013/040061, which corresponds to U.S. Appl. No. 14/536,464, 6 pages.
International Search Report and Written Opinion dated Feb. 5, 2014, received in International Application No. PCT/US2013/040061, which corresponds to U.S. Appl. No. 14/536,464, 30 pages.
International Preliminary Report on Patentability dated Nov. 20, 2014, received in International Application No. PCT/US2013/040061, which corresponds to U.S. Appl. No. 14/536,464, 26 pages.
Invitation to Pay Additional Fees dated Oct. 8, 2013, received in International Application No. PCT/US2013/040067, which corresponds to U.S. Appl. No. 14/536,644, 8 pages.
International Search Report and Written Opinion dated May 8, 2014, received in International Application No. PCT/US2013/040067, which corresponds to U.S. Appl. No. 14/536,644, 45 pages.
International Preliminary Report on Patentability dated Nov. 20, 2014, received in International Application No. PCT/US2013/040067, which corresponds to U.S. Appl. No. 14/536,644, 36 pages.
International Search Report and Written Opinion dated Mar. 12, 2014, received in International Application No. PCT/US2013/069479, which corresponds with U.S. Appl. No. 14/608,926, 14 pages.

(56) References Cited

OTHER PUBLICATIONS

International Preliminary Report on Patentability, dated Jun. 30, 2015, received in International Patent Application No. PCT/US2013/069479, which corresponds with U.S. Appl. No. 14/608,926, 11 pages.
International Search Report and Written Opinion dated Aug. 7, 2013, received in International Application No. PCT/US2013/040070, which corresponds to U.S. Appl. No. 14/535,646, 12 pages.
International Preliminary Report on Patentability dated Nov. 20, 2014, received in International Application No. PCT/US2013/040070, which corresponds to U.S. Appl. No. 14/535,646, 10 pages.
Invitation to Pay Additional Fees dated Oct. 28, 2013, received in International Application No. PCT/US2013/040072, which corresponds to U.S. Appl. No. 14/536,141, 7 pages.
International Search Report and Written Opinion dated Apr. 7, 2014, received in International Application No. PCT/US2013/040072, which corresponds to U.S. Appl. No. 14/536,141, 38 pages.
International Preliminary Report on Patentability dated Nov. 20, 2014, received in International Application No. PCT/US2013/040072, which corresponds to U.S. Appl. No. 14/536,141, 32 pages.
Invitation to Pay Additional Fees dated Feb. 14, 2014, received in International Application No. PCT/US2013/069483, which corresponds with U.S. Appl. No. 14/608,942, 7 pages.
International Search Report and Written Opinion dated Apr. 7, 2014, received in International Application No. PCT/US2013/069483, which corresponds with U.S. Appl. No. 14/608,942, 18 pages.
International Preliminary Report on Patentability, dated Jun. 30, 2015, received in International Application No. PCT/2013/069483, which corresponds to U.S. Appl. No. 14/608,942, 13 pages.
Invitation to Pay Additional Fees dated Oct. 28, 2013, received in International Application No. PCT/US2013/040087, which corresponds to U.S. Appl. No. 14/536,166, 8 pages.
International Search Report and Written Opinion dated Mar. 3, 2014, received in International Application No. PCT/US2013/040087, which corresponds to U.S. Appl. No. 14/536,166, 35 pages.
International Preliminary Report on Patentability dated Nov. 20, 2014, received in International Application No. PCT/US2013/040087, which corresponds to U.S. Appl. No. 14/536,166, 29 pages.
International Search Report and Written Opinion dated Aug. 7, 2013, received in International Application No. PCT/US2013/040093, which corresponds to U.S. Appl. No. 14/536,203, 11 pages.
International Preliminary Report on Patentability dated Nov. 20, 2014, received in International Application No. PCT/2013040093, which corresponds to U.S. Appl. No. 14/536,203, 9 pages.
Invitation to Pay Additional Fees dated Apr. 17, 2014, received in International Application No. PCT/US2013/069484, which corresponds with U.S. Appl. No. 14/608,965, 7 pages.
International Search Report and Written Opinion dated Jul. 9, 2014, received in International Application No. PCT/US2013/069484, which corresponds with U.S. Appl. No. 14/608,965, 17 pages.
International Preliminary Report on Patentability, dated Jun. 30, 2015, received in International Patent Application No. PCT/US2013/069484, which corresponds with U.S. Appl. No. 14/608,965, 12 pages.
Invitation to Pay Additional Fees dated Sep. 25, 2013, received in International Application No. PCT/US2013/040098, which corresponds to U.S. Appl. No. 14/536,247, 8 pages.
International Search Report and Written Opinion dated Feb. 5, 2014, received in International Application No. PCT/US2013/040098, which corresponds to U.S. Appl. No. 14/536,247, 35 pages.
International Preliminary Report on Patentability dated Nov. 20, 2014, received in International Application No. PCT/2013/040098, which corresponds to U.S. Appl. No. 14/536,247, 27 pages.
Invitation to Pay Additional Fees dated Aug. 7, 2013, received in International Application No. PCT/US2013/040101, which corresponds to U.S. Appl. No. 14/536,267, 7 pages.
International Search Report and Written Opinion dated Jan. 27, 2014, received in International Application No. PCT/US2013/040101, which corresponds to U.S. Appl. No. 14/536,267, 30 pages.
International Preliminary Report on Patentability dated Nov. 20, 2014, received in International Application No. PCT/2013/040101, which corresponds to U.S. Appl. No. 14/536,267, 24 pages.
Invitation to Pay Additional Fees dated Aug. 7, 2013, received in International Application No. PCT/US2013/040108, which corresponds to U.S. Appl. No. 14/536,291, 6 pages.
International Search Report and Written Opinion dated Jan. 8, 2014, received in International Application No. PCT/US2013/040108, which corresponds to U.S. Appl. No. 14/536,291, 30 pages.
International Preliminary Report on Patentability dated Nov. 20, 2014, received in International Application No. PCT/2013/040108, which corresponds to U.S. Appl. No. 14/536,291, 25 pages.
Invitation to Pay Additional Fees dated Apr. 1, 2014, received in International Application No. PCT/US2013/069486, which corresponds with U.S. Appl. No. 14/608,985, 7 pages.
International Search Report and Written Opinion dated Jun. 2, 2014, received in International Application No. PCT/US2013/069486, which corresponds with U.S. Appl. No. 14/608,985, 7 pages.
International Preliminary Report on Patentability, dated Jun. 30, 2015, received in International Patent Application No. PCT/US2013/069486, which corresponds with U.S. Appl. No. 14/608,985, 19 pages.
International Search Report and Written Opinion dated Mar. 6, 2014, received in International Application No. PCT/US2013/069489, which corresponds with U.S. Appl. No. 14/609,006, 12 pages.
International Preliminary Report on Patentability, dated Jun. 30, 2015, received in International Patent Application No. PCT/US2013/069489, which corresponds with U.S. Appl. No. 14/609,006, 10 pages.
International Search Report and Written Opinion, dated Apr. 25, 2016, received in International Patent Application No. PCT/US2016/018758, which corresponds with U.S. Appl. No. 14/866,159, 15 pages.
Anonymous, "Nokia 808 PureView screenshots", retrieved from Internet; no URL, Nov. 12, 2012, 8 pages.
Anonymous, "Nokia 808 PureView User Guide," http://download-fds.webapps.microsoft.com/supportFiles/phones/files/pdf_guides/devices/808/Nokia_808_UG_en_APAC.pdf, Jan. 1, 2012, 144 pages.
b-log—betriebsraum weblog, "Extremely Efficient Menu Selection: Marking Menus for the Flash Platform," http://www.betriebsraum.de/blog/2009/12/11/extremely-efficient-menu-selection-marking -for-the-flash-platform, Dec. 11, 2009, 9 pages.
Bolluyt, "5 Apple Watch Revelations from Apple's New WatchKit", http://www.cheatsheet.com/tecnology/5-apple-watch-revelations-from-apples-new-watchkit.html/?a=viewall, Nov. 22, 2014, 3 pages.
Clark, "Global Moxie, Touch Means a Renaissance for Radial Menus," http://globalmoxie.com/blog/radial-menus-for-touch-ui~print.shtml, Jul. 17, 2012, 7 pages.
Cohen, Cinemagraphs are Animated Gifs for Adults, http://www.tubefilter.com/2011/07/10/cinemagraph, Jul. 10, 2011, 3 pages.
Farshad, "SageThumbs-Preview and Convert Pictures From Windows Context Menu", https://web.addictivetips.com/windows-tips/sagethumbs-preview-and-convert-photos-from-windows-context-menu, Aug. 8, 2011, 5 pages.
Flaherty, "Is Apple Watch's Pressure-Sensitive Screen a Bigger Deal Than the Gadget Itself?", http://www.wired.com/2014/09/apple-watchs-pressure-sensitive-screen-bigger-deal-gadget, Sep. 15, 2014, 3 pages.
iPodHacks 142: "Water Ripple Effects on the Home and Lock Screen: AquaBoard Cydia Tweak Review", YouTube, https://www.youtube.comwatch?v-Auu_uRaYHJs, Sep. 24, 2012, 3 pages.
Kaaresoja, "Snap-Crackle-Pop: Tactile Feedback for Mobile Touch Screens," Nokia Research Center, Helsinki, Finland, Proceedings of Eurohaptics vol. 2006, Jul. 3, 2006, 2 pages.
Kumar, "How to Enable Ripple Effect on Lock Screen of Galaxy S2", YouTube, http, http://www.youtube.com/watch?v+B9-4M5abLXA, Feb. 12, 2013, 3 pages.
Laurie, "The Power of the Right Click," http://vlaurie.com/right-click/customize-context-menu.html, 2002-2016, 3 pages.

(56) References Cited

OTHER PUBLICATIONS

Matthew, "How to Preview Photos and Images From Right-Click Context Menue in Windows [Tip]", https://dottech.org/159009/add-image-preview-in-windows-context-menu-tip, Jul. 4, 2014, 5 pages.

Nacca, "NiLS Lock Screen Notifications / Floating Panel—Review", https://www.youtube.com/watch?v=McT4QnS9TDY, Feb. 3, 2014, 4 pages.

Nikon, "Scene Recognition System and Advanced SRS," http://www.nikonusa.com/en.Learn-And-Explore/Article/ftlzi4rr/Scene-Recognition-System.html, Jul. 22, 2015, 2 pages.

"Quickly Preview Songs in Windows Media Player 12 in Windows 7," Quickly Preview Songs in Windows Media Player 12 in Windows 7. How-to Geek, Apr. 28, 2010, Web. May 8, 2010, http://web.archive.org/web/20100502013134/http://www.howtogeek.com/howto/16157/quickly-preview-songs-in-windows-media-center-12-in-windows-7>, 6 pages.

VGJFeliz, "How to Master Android Lollipop Notifications in Four Minutes!", https://www.youtube.com/watch?v=S-zBRG7GJgs, Feb. 8, 2015, 5 pages.

Wikipedia, "Context Menu," Wikipedia, the free encyclopedia https://en.wikipedia.org/wiki/Context menu, Last Modified May 15, 2016, 4 pages.

Wikipedia, "Pie Menu," Wikipedia, the free encyclopedia, http://en.wikipedia.org/wiki/Pie_menu, Last Modified Jun. 4, 2016, 3 pages.

Wikipedia, "Quick Look," from Wikipedia, the free encyclopedia, https;//en.wikipedia.org/wiki/Quick_Look, Last Modified Jan. 15, 2016, 3 pages.

Office Action, dated Oct. 18, 2016, received in Australian Patent Application No. 2013368440, which corresponds with U.S. Appl. No. 14/536,426, 3 pages.

Office Action, dated Jul. 21, 2016, received in European Patent Application No. 13795391.5, which corresponds with U.S. Appl. No. 14/536,426, 9 pages.

Office Action, dated Sep. 13, 2016, received in Japanese Patent Application No. 2015-547948, which corresponds with U.S. Appl. No. 14/536,426, 5 pages.

Certificate of Grant, dated Sep. 15, 2016, received in Australian Patent Australian Patent Application No. 2013259606, which corresponds with U.S. Appl. No. 14/536,426, 1 page.

Decision to Grant, dated Jul. 14, 2016, received in European Patent Application No. 13724100.6, which corresponds with U.S. Appl. No. 14/536,426, 1 page.

Letters Patent, dated Aug. 10, 2016, received in European Patent Application No. 13724100.6, which corresponds with U.S. Appl. No. 14/536,426, 1 page.

Certificate of Grant, dated Jul. 29, 2016, received in Australian Patent Application No. 2013368441, which corresponds with U.S. Appl. No. 14/608,926, 1 page.

Notice of Allowance, dated Jul. 5, 2016, received in Australian Patent Application No. 2013259613, which corresponds with U.S. Appl. No. 14/536,646, 3 pages.

Notice of Allowance, dated Aug. 15, 2016, received in Australian Patent Application No. 2013259614, which corresponds with U.S. Appl. No. 14/536,141, 1 page.

Office Action, dated Aug. 31, 2016, received in European Patent Application No. 13726053.5, which corresponds with U.S. Appl. No. 14/536,141, 10 pages.

Certificate of Grant, dated Jul. 7, 2016, received in Australian Patent Application No. 2013368443, which corresponds with U.S. Appl. No. 14/536,141, 3 pages.

Office Action, dated Oct. 7, 2016, received in European Patent Application No. 13798464.7, which corresponds with U.S. Appl. No. 14/608,942, 7 pages.

Office Action, dated Jul. 4, 2016, received in Japanese Patent Application No. 2015549393, which corresponds with U.S. Appl. No. 14/536,141, 4 pages.

Office Action, dated Aug. 1, 2016, received in U.S. Appl. No. 14/536,203, 14 pages.

Notice of Allowance, dated Jun. 15, 2016, received in Australian Patent Application No. 2013259630, which corresponds with U.S. Appl. No. 14/536,203, 3 pages.

Certificate of Grant, dated Oct. 21, 2016, received in Australian Patent Application No. 2013259630, which corresponds with U.S. Appl. No. 14/536,203, 3 pages.

Notice of Allowance, dated Aug. 5, 2016, received in Japanese Patent Application No. 2015-511650, which corresponds with U.S. Appl. No. 14/536,203, 4 pages.

Certificate of Patent, dated Sep. 9, 2016, received in Japanese Patent Application No. 2015-511650, which corresponds with U.S. Appl. No. 14/536,203, 3 pages.

Notice of Allowance, dated Sep. 1, 2016, received in Korean Patent Application No. 2014-7034520, which corresponds with U.S. Appl. No. 14/536,203, 5 pages.

Office Action, dated Jul. 22, 2016, received in European Office Action No. 13798465.4, which corresponds with U.S. Appl. No. 14/608,965, 8 pages.

Office Action, dated Oct. 20, 2016, received in U.S. Appl. No. 14/536,247, 10 pages.

Notice of Allowance, dated Jun. 28, 2016, received in Australian Patent Application No. 2013259637, which corresponds with U.S. Appl. No. 14/536,267, 3 pages.

Certificate of Grant, dated Oct. 21, 2016, received in Australian Patent Application No. 2013259637, which corresponds with U.S. Appl. No. 14/536,267, 3 pages.

Notice of Allowance, dated Sep. 26, 2016, eceived in Japanese Patent Application No. 2015-511652, which corresponds with U.S. Appl. No. 14/536,267, 5 pages.

Notice of Allowance, dated Sep. 1, 2016, received in Korean Patent Application No. 2014-7034530, which corresponds with U.S. Appl. No. 14/536,267, 3 pages.

Office Action, dated Jul. 25, 2016, received in Australian Patent Application No. 2013259642, which corresponds with U.S. Appl. No. 14/536,291, 3 pages.

Office Action, dated Aug. 10, 2016, received in Australian Patent Application No. 2013259642, which corresponds with U.S. Appl. No. 14/536,291, 4 pages.

Innovation Patent, dated Sep. 1, 2016, received in Australian Patent Application No. 2016101481, which corresponds with U.S. Appl. No. 14/536,291, 1 page.

Office Action, dated Sep. 29, 2016, received in Australian Patent Application No. 2016101481, which corresponds with U.S. Appl. No. 14/536,291, 3 pages.

Office Action, dated Aug. 22, 2016, received in European Patent Application No. 13724107.1, which corresponds with U.S. Appl. No. 14/536,291, 7 pages.

Office Action, dated Mar. 8, 2016, received in Japanese Patent Application No. 2015-511655, which corresponds with U.S. Appl. No. 14/536,291, 4 pages.

Office Action, dated Jan. 15, 2016, received in Australian Patent Application No. 2013368445, which corresponds with U.S. Appl. No. 14/608,985, 3 pages.

Office Action, dated Jul. 25, 2016, received in Japanese Patent Application No. 13811032.5, which corresponds with U.S. Appl. No. 14/608,985, 8 pages.

Office Action, dated Apr. 25, 2016, received in Japanese Patent Application No. 2015550384, which corresponds with U.S. Appl. No. 14/608,985, 4 pages.

Notice of Allowance, dated Jul. 1, 2016, received in Chinese Patent Application No. 201620214376.7, which corresponds with U.S. Appl. No. 14/864,737, 3 pages.

Patent, dated Aug. 3, 2016, received in Chinese Patent Application No. 201620214376.7, which corresponds with U.S. Appl. No. 14/864,737, 5 pages.

Certificate of Registration, dated Jun. 20, 2016, received in German Patent Application No. 202016001845.1, which corresponds with U.S. Appl. No. 14/864,737, 3 pages.

Office Action and Search Report, dated Apr. 5, 2016, received in Danish Patent Application No. 201500577, which corresponds with U.S. Appl. No. 14/864,737, 7 pages.

(56) References Cited

OTHER PUBLICATIONS

Intention to Grant, dated Aug. 2, 2016, received in Danish Patent Application No. 201500577, which corresponds with U.S. Appl. No. 14/864,737, 2 pages.
Office Action, dated Jun. 27, 2016, received in U.S. Appl. No. 14/866,981, 22 pages.
Notice of Allowance, dated Oct. 24, 2016, received in U.S. Appl. No. 14/866,981, 7 pages.
Office Action, dated May 10, 2016, received in Australian Patent Application No. 2016100254, which corresponds with U.S. Appl. No. 14/866,981, 6 pages.
Notice of Allowance, dated Jul. 27, 2016, received in Chinese Patent Application No. 201620176169.7, which corresponds with U.S. Appl. No. 14/866,981, 3 pages.
Patent, dated Sep. 28, 2016, received in Chinese Patent Application No. 201620176169.7, which corresponds with U.S. Appl. No. 14/866,981, 4 pages.
Certificate of Registration, dated Jun. 20, 2016, received in German Patent Application No. 202016001514.2, which corresponds with U.S. Appl. No. 14/864,737, 3 pages.
Office Action and Search Report, dated Mar. 18, 2016, received in Danish Patent Application No. 2016100254, which corresponds with U.S. Appl. No. 14/866,981, 9 pages.
Office Action, dated May 19, 2016, received in Australian Patent Application No. 2016100251, which corresponds with U.S. Appl. No. 14/866,159, 5 pages.
Office Action, dated Jul. 5, 2016, received in Chinese Patent Application No. 201620186008.6, which corresponds with U.S. Appl. No. 14/866,159, 3 pages.
Certificate of Registration, dated Jun. 16, 2016, received in German Patent No. 202016001483.9, which corresponds with U.S. Appl. No. 14/866,159, 3 pages.
Office Action (Search Report), dated Mar. 9, 2016, received in Danish Patent Application No. 201500574, which corresponds with U.S. Appl. No. 14/866,159, 11 pages.
Office Action, dated Sep. 27, 2016, received in Danish Patent Application No. 201500574, which corresponds with U.S. Appl. No. 14/866,159, 4 pages.
Innovation (Unexamined) Patent, dated Aug. 4, 2016, received in Australian Patent Application No. 2016101201, which corresponds with U.S. Appl. No. 14/686,078, 1 page.
Office Action, dated Oct. 12, 2016, received in Australian Patent Application No. 2016101201, which corresponds with U.S. Appl. No. 14/686,078, 3 pages.
Notice of Allowance, dated Oct. 1, 2016, received in Chinese Patent Application No. 201620175847.8, which corresponds with U.S. Appl. No. 14/686,078, 1 page.
Certificate of Registration, dated Jun. 30, 2016, received in German Patent Application No. 20201600156.9, which corresponds with U.S. Appl. No. 14/868,078, 3 pages.
Office Action (Search Report), dated Mar. 30, 2016, received in Australian Patent Application No. 201500588, which corresponds with U.S. Appl. No. 14/868,078, 9 pages.
Office Action, dated Sep. 2, 2016, received in Australian Patent Application No. 201500588, which corresponds with U.S. Appl. No. 14/868,078, 4 pages.
Office Action, dated May 9, 2016, received in U.S. Appl. No. 14/863,432, 26 pages.
Office Action, dated Aug. 19, 2016, received in Australian Patent Application No. 2016100647, which corresponds with U.S. Appl. No. 14/863,432, 5 pages.
Office Action (Search Report), dated Apr. 4, 2016, received in Danish Patent Application No. 201500582, which corresponds with U.S. Appl. No. 14/863,432, 10 pages.
Office Action and Additional Search Report, dated Oct. 7, 2016, received in Danish Patent Application No. 201500582, which corresponds with U.S. Appl. No. 14/863,432, 6 pages.
Office Action, dated Oct. 13, 2016, received in U.S. Appl. No. 14/866,511, 27 pages.
Patent, dated Aug. 8, 2016, received in Australian Patent Application 2016100653, corresponds with U.S. Appl. No. 14/866,511, 1 page.
Office Action and Search Report, dated Mar. 22, 2016, received in Danish Patent Application No. 201500576, which corresponds with U.S. Appl. No. 14/866,511, 10 pages.
Intention to Grant, dated Jun. 8, 2016, received in Danish Patent Application No. 201500576, which corresponds with U.S. Appl. No. 14/866,511, 2 pages.
Grant, dated Aug. 26, 2016, received in Danish Patent Application No. 201500576, which corresponds with U.S. Appl. No. 14/866,511, 2 pages.
Office Action, dated May 10, 2016, received in U.S. Appl. No. 14/866,489, 15 pages.
Final Office Action, dated Sep. 16, 2016, received in U.S. Appl. No. 14/866,489, 24 pages.
Office Action, dated Mar. 28, 2016, received in U.S. Appl. No. 14/869,899, 17 pages.
Office Action, dated Jun. 28, 2016, received in U.S. Appl. No. 14/869,899, 5 pages.
Final Office Action, dated Sep. 2, 2016, received in U.S. Appl. No. 14/869,899, 22 pages.
Innovation (Unexamined) Patent, dated Aug. 25, 2016, received in Australian Patent Application No. 2016101438, which corresponds with U.S. Appl. No. 14/869,899, 1 page.
Certificate of Examination, dated Oct. 11, 2016, received in Australian Patent Application No. 2016101438, which corresponds with U.S. Appl. No. 14/869,899, 1 page.
Office Action (Search Report), dated Feb. 3, 2016, received in Danish Patent Application No. 201500592, which corresponds with U.S. Appl. No. 14/869,899, 9 pages.
Office Action, dated Oct. 7, 2016, received in Danish Patent Application No. 201500592, which corresponds with U.S. Appl. No. 14/869,899, 6 pages.
Office Action, dated Mar. 4, 2016, received in U.S. Appl. No. 14/866,992, 30 pages.
Final Office Action, dated Jul. 29, 2016, received in U.S. Appl. No. 14/866,992, 35 pages.
Innovation Patent, dated Sep. 22, 2016, received in Australian Patent Application No. 2016101418, which corresponds with U.S. Appl. No. 14/866,992, 1 page.
Office Action (Search Report), dated Mar. 18, 2016, received in Danish Patent Application No. 201500593, which corresponds with U.S. Appl. No. 14/866,992, 10 pages.
Office Action, dated Jun. 27, 2016, received in Danish Patent Application No. 201500593, which corresponds with U.S. Appl. No. 14/866,992, 7 pages.
Notice of Allowance, dated Aug. 26, 2016, received in U.S. Appl. No. 14/845,217, 5 pages.
Final Office Action, dated Jul. 13, 2016, received in U.S. Appl. No. 14/856,517, 30 pages.
Final Office Action, dated Jul. 15, 2016, received in U.S. Appl. No. 14/856,519, 31 pages.
Final Office Action, dated Jun. 16, 2016, received in U.S. Appl. No. 14/857,645, 12 pages.
Notice of Allowance, dated Oct. 24, 2016, received in U.S. Appl. No. 14/857,645, 6 pages.
Corrected Notice of Allowability, dated Jun. 16, 2016, received in U.S. Appl. No. 14/864,580, 2 pages.
Notice of Allowance, dated Aug. 4, 2016, received in U.S. Appl. No. 14/864,580, 9 pages.
Office Action, dated Aug. 19, 2016, received in Australian Patent Application No. 2016100648, which corresponds with U.S. Appl. No. 14/864,580, 6 pages.
Certificate of Registration, dated Oct. 14, 2016, received in German Patent Application No. 20201600003234.9, which corresponds with U.S. Appl. No. 14/864,580, 3 pages.
Office Action, dated Oct. 7, 2016, received in Danish Patent Application No. 201500584, which corresponds with U.S. Appl. No. 14/864,580, 3 pages.
Office Action, dated Oct. 7, 2016, received in Danish Patent Application No. 201500585, which corresponds with U.S. Appl. No. 14/864,627, 3 pages.

(56) References Cited

OTHER PUBLICATIONS

Notice of Allowance, dated Jul. 19, 2016, received in U.S. Appl. No. 14/866,361, 8 pages.
Office Action, dated Jun. 10, 2016, received in Australian Patent Application No. 2016100292, which corresponds with U.S. Appl. No. 14/866,361, 4 pages.
Notice of Allowance/Grant, dated Jul. 1, 2016, received in Chinese Patent Application No. 201620251706.X, which corresponds with U.S. Appl. No. 14/866,361, 3 pages.
Letters Patent, dated Aug. 3, 2016, received in Chinese Patent Application No. 201620251706.X, which corresponds with U.S. Appl. No. 14/866,361, 3 pages.
Certificate of Registration, dated Jun. 24, 2016, received in German Patent Application No. 202016001819.2, which corresponds with U.S. Appl. No. 14/866,361, 3 pages.
Patent, dated Aug. 8, 2016, received in Australian Patent Application No. 2016100649, which corresponds with U.S. Appl. No. 14/866,987, 1 page.
Intention to Grant, dated Jun. 10, 2016, received in Danish Patent Application No. 201500587, which corresponds with U.S. Appl. No. 14/866,987, 2 pages.
Office Action and Search Report, dated Sep. 9, 2016, received in Danish Patent Application No. 201670463, which corresponds with U.S. Appl. No. 14/866,987, 7 pages.
Certificate of Exam, dated Jul. 21, 2016, received in Australian Patent Application No. 2016100652, which corresponds with U.S. Appl. No. 14/866,989, 1 page.
Intention to Grant, dated Jun. 10, 2016, received in Danish Patent Application No. 201500589, which corresponds with U.S. Appl. No. 14/866,989, 2 pages.
Office Action, dated Jun. 28, 2016, received in U.S. Appl. No. 14/871,236, 21 pages.
Innovation (Unexamined) Patent, dated Aug. 25, 2016, received in Australian Patent Application No. 2016101433, which corresponds with U.S. Appl. No. 14/871,236, 1 page.
Office Action, dated Oct. 14, 2016, received in Australian Patent Application No. 2016101433, which corresponds with U.S. Appl. No. 14/871,236, 3 pages.
Office Action and Additional Search Report, dated Sep. 30, 2016, received in Danish Patent Application No. 201500595, which corresponds with U.S. Appl. No. 14/871,236, 10 pages.
Innovation (Unexamined) Patent, dated Aug. 25, 2016, received in Australian Patent Application No. 2016101436, which corresponds with U.S. Appl. No. 14/871,236, 1 pages.
Office Action and Search Report, dated Jun. 9, 2016, received in Danish Patent Application No. 201500596, which corresponds with U.S. Appl. No. 14/870,882, 9 pages.
Office Action, dated Oct. 17, 2016, received in Australian Patent Application No. 2016203040, which corresponds with U.S. Appl. No. 14/871,227, 7 pages.
Oct. 18, 2016, received in Australian Patent Application No. 2016101431, which corresponds with U.S. Appl. No. 14/871,227, 3 pages.
Grant, dated Jun. 21, 2016, received in Danish Patent Application No. 201500597, which corresponds with U.S. Appl. No. 14/871,227, 2 pages.
Patent, dated Sep. 26, 2016, received in Danish Patent Application No. 201500597, which corresponds with U.S. Appl. No. 14/871,227, 7 pages.
Office Action, dated Oct. 14, 2016, received in Australian Patent Application No. 2016101437, which corresponds with U.S. Appl. No. 14/871,336, 2 pages.
Office Action, dated Oct. 18, 2016, received in Australian Patent Application No. 201500601, which corresponds with U.S. Appl. No. 14/871,336, 3 pages.
Innovation Patent, dated Aug. 25, 2016, received in Australian Patent Application No. 2016101435, which corresponds with U.S. Appl. No. 14/871,462, 1 page.
Office Action, dated Oct. 4, 2016, received in Australian Patent Application No. 2016101435, which corresponds with U.S. Appl. No. 14/871,462, 3 pages.
Office Action, dated Oct. 4, 2016, received in Australian Patent Application No. 2016231505, which corresponds with U.S. Appl. No. 14/871,462, 3 pages.
Grant, dated Aug. 30, 2016, received in Danish Patent Application No. 201500600, which corresponds with U.S. Appl. No. 14/871,462, 2 pages.
Final Office Action, dated Sep. 28, 2016, received in U.S. Appl. No. 14/867,823, 31 pages.
Office Action, dated Sep. 7, 2016, received in Danish Patent Application No. 201500594, which corresponds with U.S. Appl. No. 14/867,823, 4 pages.
Office Action, Sep. 14, 2016, received in Danish Patent Application No. 201500598, which corresponds with U.S. Appl. No. 14/867,892, 4 pages.
Office Action, dated Jul. 5, 2016, received in Chinese Patent Application No. 201620176221.9, which corresponds with U.S. Appl. No. 14/867,990, 4 pages.
Certificate of Registration, dated Jun. 16, 2016, received in German Patent No. 202016001489.8, which corresponds with U.S. Appl. No. 14/867,990, 3 pages.
Office Action, dated Sep. 26, 2016, received in Danish Patent Application No. 201500581, which corresponds with U.S. Appl. No. 14/867,990, 5 pages.
Office Action and Search Report, dated Oct. 17, 2016, received in Danish Patent Application No. 201670587, which corresponds with U.S. Appl. No. 15/231,745, 9 pages.
Office Action and Search Report, dated Oct. 12, 2016, received in Danish Patent Application No. 201670593, which corresponds with U.S. Appl. No. 15/231,745, 7 pages.
Extended European Search Report, dated Oct. 7, 2016, received in European Patent Application No. 16177863.4, which corresponds with U.S. Appl. No. 14/536,267, 12 pages.
International Search Report and Written Opinion, dated Jul. 21, 2016, received in International Patent Application No. PCT/US2016/019913, which corresponds with U.S. Appl. No. 14/868,078, 16 pages.
International Search Report and Written Opinion, dated Aug. 29, 2016, received in International Patent Application No. PCT/US2016/021400, which corresponds with U.S. Appl. No. 14/869,899, 48 pages.
Anonymous, "Notifications, Android 4.4 and Lower", Android Developers, https://developer.android.com/design/patterns/notifications_k.html, May 24, 2015, 9 pages.
Dzyre, "10 Android Notification Features You Can Fiddle With", http://www.hongkiat.com/blog/android-notification-features, Mar. 10, 2014, 10 pages.
Gardner, "Recenz—Recent Apps in One Tap", You Tube, https://www.youtube.com/watch?v-qailSHRgsTo, May 15, 2015, 1 page.
Gonzalo et al., "Zliding: Fluid Zooming and Sliding for High Precision Parameter Manipulation", Department of Computer Science, University of Toronto, Seattle, Washington, Oct. 23, 2005, 10 pages.
Grant, "Android's Notification Center", https://www.objc.io/issues/11-android/android-notifications, Apr. 30, 2014, 26 pages.
Kiener, "Force Touch on iPhone", https://www.youtube.com/watch?v=CEMmnsU5fC8, Aug. 4, 2015, 4 pages.
Mitroff, "Google Android 5.0 Lollipop," http://www.cnet.com/products/google-android-5-0-lollipop, Mar. 12, 2015, 5 pages.
Mohr, "Do Not Disturb—The iPhone Feature You Should Be Using", http.www.wonderoftech.com/do-not-disturb-iphone, Jul. 14, 2014, 30 pages.
Phonebuff, "How to Pair Bluetooth on the iPhone", https://www.youtube.com/watch?v=LudNwEar9A8, Feb. 8, 2012, 3 pages.
Notice of Allowance, dated Dec. 20, 2016, received in Australian Patent Application No. 2013368440, which corresponds with U.S. Appl. No. 14/536,426, 3 pages.
Office Action, dated Jan. 20, 2017, received in European Patent Application No. 15183980.0, which corresponds with U.S. Appl. No. 14/536,426, 5 pages.

(56) References Cited

OTHER PUBLICATIONS

Office Action, dated Feb. 6, 2017, received in Japanese Patent Application No. 2015-511644, which corresponds with U.S. Appl. No. 14/536,426, 6 pages.
Office Action, dated Jan. 3, 2017, received in Australian Patent Application No. 2016201451, which corresponds with U.S. Appl. No. 14/608,926, 3 pages.
Office Action, dated Nov. 11, 2016, received in European Patent Application No. 13795392.3, which corresponds with U.S. Appl. No. 14/608,926, 6 pages.
Notice of Allowance, dated Jan. 17, 2017, received in Japanese Patent Application No. 2015-549392, which corresponds with U.S. Appl. No. 14/608,926, 2 pages.
Office Action, dated Dec. 1, 2016, received in Chinese Patent Application No. 2013800362059, which corresponds with U.S. Appl. No. 14/536,646, 3 pages.
Notice of Allowance, dated Jan. 4, 2017, received in European Patent Application No. 13724102.2, which corresponds with U.S. Appl. No. 14/536,646, 5 pages.
Notice of Allowance, dated Dec. 22, 2016, received in Japanese Patent Application No. 2015-511645, which corresponds with U.S. Appl. No. 14/536,646, 2 pages.
Office Action, dated Oct. 25, 2016, received in Japanese Patent Application No. 2015-511646, which corresponds with U.S. Appl. No. 14/536,141, 6 pages.
Office Action, dated Dec. 8, 2016, received in U.S. Appl. No. 14/608,942, 9 pages.
Notice of Allowance, dated Feb. 1, 2017, received received in U.S. Appl. No. 14/536,203, 9 pages.
Office Action, dated Feb. 6, 2017, received in Korean Patent Application No. 2016-7033834, which corresponds with U.S. Appl. No. 14/536,203, 4 pages.
Office Action, dated Dec. 9, 2016, received in Chinese Patent Application No. 2016120601564130, which corresponds with U.S. Appl. No. 14/536,267, 4 pages.
Office Action, dated Jan. 5, 2017, received in Korean Patent Application No. 2016-7029533, which corresponds with U.S. Appl. No. 14/536,267, 2 pages.
Final Office Action, dated Dec. 22, 2016, received in Japanese Patent Application No. 2015-511655, which corresponds with U.S. Appl. No. 14/536,291, 3 pages.
Notice of Allowance, dated Jan. 18, 2017, received in Australian Patent Application No. 2013368445, which corresponds with U.S. Appl. No. 14/608,985, 3 pages.
Notice of Allowance, dated Jan. 24, 2017, received in Japanese Patent Application No. 2015-550384, which corresponds with U.S. Appl. No. 14/608,985, 5 pages.
Office Action, dated Nov. 4, 2016, received in Korean Patent Application No. 102015-7019984, which corresponds with U.S. Appl. No. 14/608,985, 8 pages.
Office Action, dated Jan. 19, 2017, received in U.S. Appl. No. 14/609,042, 12 pages.
Notice of Allowance, dated Feb. 10, 2017, received in U.S. Appl. No. 14/866,981, 5 pages.
Patent, dated Nov. 2, 2016, received in Australian Patent Application No. 2016100254, which corresponds with U.S. Appl. No. 14/866,981, 1 page.
Office Action, dated Dec. 5, 2016, received in Danish Patent Application No. 201500575, which corresponds with U.S. Appl. No. 14/866,981, 3 pages.
Notice of Allowance, dated Jan. 30, 2017, received in received in Danish Patent Application No. 201500588, which corresponds with U.S. Appl. No. 14/868,078, 2 pages.
Notice of Allowance, dated Nov. 14, 2016, received in U.S. Appl. No. 14/863,432, 7 pages.
Notice of Allowance, dated Jan. 12, 2017, received in Chinese Patent Application No. 201620470063.8, which corresponds with U.S. Appl. No. 14/863,432, 1 page.
Final Office Action, dated Jan. 27, 2017, received in U.S. Appl. No. 14/866,511, 26 pages.
Notice of Allowance, dated Jan. 12, 2017, received in Chinese Patent Application No. 201620470281.1, which corresponds with U.S. Appl. No. 14/866,511, 1 page.
Patent, dated Jan. 23, 2017, received in Danish Patent Application No. 201500576, which corresponds with U.S. Appl. No. 14/866,511, 3 pages.
Office Action, dated Nov. 22, 2016, received in Danish Patent Application No. 201670594, which corresponds with U.S. Appl. No. 14/869,899, 9 pages.
Office Action, dated Nov. 22, 2016, received in Australian Patent Application No. 2016101418, which corresponds with U.S. Appl. No. 14/866,992, 7 pages.
Office Action, dated Feb. 7, 2017, received in Australian Patent Application No. 2016101418, which corresponds with U.S. Appl. No. 14/866,992, 5 pages.
Office Action, dated Feb. 6, 2017, received in Danish Patent Application No. 201500593, which corresponds with U.S. Appl. No. 14/866,992, 4 pages.
Notice of Allowance, dated Jan. 4, 2017, received in U.S. Appl. No. 14/845,217, 5 pages.
Notice of Allowance, dated Dec. 28, 2016, received in U.S. Appl. No. 14/864,580, 8 pages.
Notice of Allowance, dated Nov. 8, 2016, received in Chinese Patent Application No. 201620470247.4, which corresponds with U.S. Appl. No. 14/864,580, 3 pages.
Notice of Allowance, dated Nov. 23, 2016, received in U.S. Appl. No. 14/864,601, 12 pages.
Notice of Allowance, dated Jan. 31, 2017, received in U.S. Appl. No. 14/864,627, 7 pages.
Certificate of Examination, dated Dec. 8, 2016, received in Australian Patent Application No. 2016100292, which corresponds with U.S. Appl. No. 14/866,361, 1 page.
Office Action, dated Oct. 28, 2016, received in Danish Patent Application No. 201500579, which corresponds with U.S. Appl. No. 14/866,361, 3 pages.
Office Action, dated Oct. 19, 2016, received in Chinese Patent Application No. 2016201470246.X, which corresponds with U.S. Appl. No. 14/866,987, 4 pages.
Patent, dated Sep. 19, 2016, received in German Patent Application No. 202016002908.9, which corresponds with U.S. Appl. No. 14/866,987, 3 pages.
Notice of Allowance, dated Nov. 1, 2016, received in Danish Patent Application No. 201500587, which corresponds with U.S. Appl. No. 14/866,987, 2 pages.
Notice of Allowance, dated Jan. 31, 2017, received in Danish Patent Application No. 201670463, which corresponds with U.S. Appl. No. 14/866,987, 3 pages.
Notice of Allowance, dated Nov. 1, 2016, received in Danish Patent Application No. 201500589, which corresponds with U.S. Appl. No. 14/866,989, 2 pages.
Final Office Action, dated Nov. 4, 2016, received in U.S. Appl. No. 14/871,236, 24 pages.
Office Action, dated Oct. 31, 2016, received in Australian Patent Application No. 2016101438, which corresponds with U.S. Appl. No. 14/871,236, 6 pages.
Final Office Action, dated Nov. 2, 2016, received in U.S. Appl. No. 14/867,892, 48 pages.
Office Action, dated Feb. 9, 2017, received in U.S. Appl. No. 14/869,873, 17 pages.
Office Action, dated Oct. 25, 2016, received in Chinese Patent Application No. 201620176221.9, which corresponds with U.S. Appl. No. 14/867,990, 7 pages.
Office Action, dated Nov. 25, 2016, received in U.S. Appl. No. 15/081,771, 17 pages.
Office Action, dated Jan. 20, 2017, received in U.S. Appl. No. 15/231,745, 21 pages.
Office Action (Search Report), dated Dec. 14, 2016, received in Danish Patent Application No. 201670590, which corresponds with U.S. Appl. No. 15/231,745, 9 pages.
Office Action (Search Report), dated Nov. 10, 2016, received in Danish Patent Application No. 201670591, which corresponds with U.S. Appl. No. 15/231,745, 12 pages.

(56) References Cited

OTHER PUBLICATIONS

Office Action and Search Report, dated Oct. 26, 2016, received in Danish Patent Application No. 201670592, which corresponds with U.S. Appl. No. 15/231,745, 8 pages.
Office Action, dated Jan. 5, 2017, received in Danish Patent Application No. 201670592, which corresponds with U.S. Appl. No. 15/231,745, 3 pages.
International Search Report and Written Opinion, dated Oct. 14, 2016, received in International Patent Application No. PCT/US2016/020697, which corresponds with U.S. Appl. No. 14/866,981, 21 pages.
International Search Report and Written Opinion, dated Oct. 31, 2016, received in International Patent Application No. PCT/US2016/033578, which corresponds with U.S. Appl. No. 14/863,432, 36 pages.
International Search Report and Written Opinion, dated Nov. 14, 2016, received in International Patent Application No. PCT/US2016/033541, which corresponds with U.S. Appl. No. 14/866,511, 29 pages.
International Search Report and Written Opinion, dated Jan. 12, 2017, received in International Patent No. PCT/US2016/046419, which corresponds with U.S. Appl. No. 14/866,992, 23 pages.
International Search Report and Written Opinion, dated Dec. 15, 2016, received in International Patent Application No. PCT/US2016/046403, which corresponds with U.S. Appl. No. 15/009,661, 17 pages.
Extended European Search Report, dated Dec. 21, 2016, received in European Patent Application No. 16189790.5, which corresponds with U.S. Appl. No. 14/871,462, 8 pages.
International Search Report and Written Opinion, dated Jan. 3, 2017, received in International Patent Application No. PCT/US2016/046214, which corresponds with U.S. Appl. No. 15/231,745, 25 pages.
Angelov, "Sponsor Flip Wall With Jquery & CSS", Tutorialzine. N. p., Mar. 24, 2010. Web. http://tutorialzine.com/2010/03/sponsor-wall-slip-jquery-css/, Mar. 24, 2010, 8 pages.
Elliot, "Mac System 7", YouTube. Web. Mar. 8, 2017, http://www.youtube.com/watch?v=XLv22hfuuik, Aug. 3, 2011, 1 page.
iPhoneOperator, "Wasser Liveeffekt fur Homescreen & Lockscreen—Aquaboard (Cydia)", http://www.youtube.com/watch?v=fG9YMF-mB0Q, Sep. 22, 2012, 3 pages.
Kost, "LR3-Deselect All Images But One", Julieanne Kost's Blog, blogs.adobe.com/jkost/2011/12/lr3-deselect-all-images-but-one.html, Dec. 22,.2011, 1 page.
Office Action, dated Mar. 15, 2017, received in U.S. Appl. No.14/535,671, 13 pages.
Office Action, dated Feb. 24, 2017, received in Korean Patent Application No. 10-2015-7018851, which corresponds with U.S. Appl. No.14/536,426, 3 pages.
Office Action, dated Apr. 5, 2017, received in U.S. Appl. No. 14/536,367, 16 pages.
Office Action, dated May 15, 2017, received in Australian Patent Application No. 2016216580, which corresponds with U.S. Appl. No. 14/536,426, 3 pages.
Office Action, dated Mar. 9, 2017, received in U.S. Appl. No. 14/536,464, 21 pages.
Office Action, dated May 4, 2017, received in Chinese Patent Application No. 201380068414.1, which corresponds with U.S. Appl. No. 14/608,926, 5 pages.
Notice of Allowance, dated Mar. 31, 2017, received in Korean Patent Application No. 2015-7018853, which corresponds with U.S. Appl. No. 14/608,926, 4 pages.
Office Action, dated Apr. 3, 2017, received in U.S. Appl. No. 14/536,141, 11 pages.
Office Action, dated Mar. 3, 2017, received in Chinese Patent Application No. 201380035893.7, which corresponds with U.S. Appl. No. 14/536,646, 8 pages.
Notice of Allowance, dated May 12, 2017, received in U.S. Appl. No. 14/608,942, 10 pages.
Office Action, dated Mar. 29, 2017, received in Australian patent Application No. 2016201303, which corresponds with U.S. Appl. No. 14/608,942, 3 pages.
Office Action, dated May 12, 2017, received in Japanese Patent Application No. 2015549393, which corresponds with U.S. Appl. No. 14/608,942, 5 pages.
Office Action, dated Feb. 24, 2017, received in Korean Patent Application No. 2015-7018448, which corresponds with U.S. Appl. No. 14/608,942, 4 pages.
Final Office Action, dated Mar. 24, 2017, received in U.S. Appl. No. 14/536,247, 14 pages.
Office Action, dated Mar. 24, 2017, received in U.S. Appl. No. 14/536,267, 12 pages.
Office Action, dated Mar. 24, 2017, received in Australian Patent Application No. 2016204411, which corresponds with U.S. Appl. No. 14/536,267, 3 pages.
Office Action, dated Mar. 3, 2017, received in Japanese Patent Application No. 2016-125839, which corresponds with U.S. Appl. No. 14/536,267, 6 pages.
Office Action, dated Apr. 7, 2017, received in U.S. Appl. No. 14/536,291, 11 pages.
Office Action, dated Mar. 23, 2017, received in European Patent Application No. 13724107.1, which corresponds with U.S. Appl. No. 14/536,291, 8 pages.
Office Action, dated Feb. 27, 2017, received in European Patent Application No. 13811032.5, which corresponds with U.S. Appl. No. 14/608,985, 6 pages.
Patent, dated Feb. 24, 2017, received in Japanese Patent Application No. 2015-550384, which corresponds with U.S. Appl. No. 14/608,985, 2 pages.
Office Action, dated Mar. 24, 2017, received in U.S. Appl. No. 14/609,006, 13 pages.
Office Action, dated Apr. 19, 2017, received in U.S. Appl. No. 14/536,296, 12 pages.
Office Action, dated May 15, 2017, received in Japanese Patent Application No. 2016-558331, which corresponds with U.S. Appl. No. 14/864,737, 5 pages.
Office Action, dated May 18, 2017, received in Dutch Patent Application No. 2016452, which corresponds with U.S. Appl. No. 14/864,737, 22 pages.
Office Action, dated Mar. 14, 2017, received in Danish Patent Application No. 201500574, which corresponds with U.S. Appl. No. 14/866,159, 5 pages.
Notice of Allowance, dated May 2, 2017, received in received in Danish Patent Application No. 201500588, which corresponds with U.S. Appl. No. 14/868,078, 2 pages.
Office Action, dated May 18, 2017, received in Dutch Patent Application No. 2016376, which corresponds with U.S. Appl. No. 14/868,078, 15 pages.
Notice of Allowance, dated Apr. 27, 2017, received in U.S. Appl. No. 14/863,432, 7 pages.
Office Action, dated May 18, 2017, received in Dutch Patent Application No. 2016801, which corresponds with U.S. Appl. No. 14/863,432, 34 pages.
Notice of Allowance, dated Apr. 27, 2017, received in U.S. Appl. No. 16/866,489, 27 pages.
Notice of Allowance, dated Feb. 28, 2017, received in U.S. Appl. No. 14/869,899, 9 pages.
Office Action, dated Apr. 13, 2017, received in U.S. Appl. No. 14/866,992, 34 pages.
Office Action, dated May 2, 2017, received in U.S. Appl. No. 14/856,517, 34 pages.
Office Action, dated May 18, 2017, received in U.S. Appl. No. 14/856,519, 35 pages.
Office Action, dated Mar. 31, 2017, received in U.S. Appl. No. 14/857,700, 14 pages.
Office Action, dated May 5, 2017, received in Danish Patent Application No. 201500584, which corresponds with U.S. Appl. No. 14/864,580, 3 pages.
Notice of Allowance, dated Apr. 20, 2017, received in U.S. Appl. No. 14/864,601, 13 pages.

(56) References Cited

OTHER PUBLICATIONS

Office Action, dated May 4, 2017, received in Danish Patent Application No. 201500585, which corresponds with U.S. Appl. No. 14/864,627, 4 pages.
Patent, dated May 3, 2017, received in Chinese Patent Application No. 2016201470246.X, which corresponds with U.S. Appl. No. 14/866,987, 2 pages.
Office Action, dated Apr. 19, 2017, received in Danish Patent Application No. 201670463, which corresponds with U.S. Appl. No. 14/866,987, 3 pages.
Notice of Allowance, dated Feb. 28, 2017, received in U.S. Appl. No. 14/871,236, 9 pages.
Office Action, dated Apr. 13, 2017, received in Australian Patent Application No. 2016101431, which corresponds with U.S. Appl. No. 14/871,227, 4 pages.
Office Action, dated Mar. 24, 2017, received in Japanese Patent Application No. 2016-533201, which corresponds with U.S. Appl. No. 14/871,227, 6 pages.
Office Action, dated Apr. 11, 2017, received in Australian Patent Application No. 2016101437, which corresponds with U.S. Appl. No. 14/871,336, 4 pages.
Notice of Allowance, dated Mar. 23, 2017, received in Danish Patent Application No. 201500601, which corresponds with U.S. Appl. No. 14/871,336, 2 pages.
Office Action, dated Mar. 13, 2017, received in Japanese Patent Application No. 2016-183289, which corresponds with U.S. Appl. No. 14/871,462, 5 pages.
Office Action, dated May 11, 2017, received in U.S. Appl. No. 14/867,823, 42 pages.
Office Action, dated May 15, 2017, received in Danish Patent Application No. 201500594, which corresponds with U.S. Appl. No. 14/867,823, 4 pages.
Office Action, dated May 4, 2017, received in Danish Patent Application No. 201500598, which corresponds with U.S. Appl. No. 14/867,892, 4 pages.
Office Action, dated Mar. 1, 2017, received in U.S. Appl. No. 14/869,855, 14 pages.
Office Action, dated May 3, 2017, received in Danish Patent Application No. 201500581, which corresponds with U.S. Appl. No. 14/867,990, 5 pages.
Final Office Action, dated May 1, 2017, received in U.S. Appl. No. 15/136,782, 18 pages.
Office Action, dated May 23, 2017, received in Danish Patent Application No. 201770190, which corresponds with U.S. Appl. No. 15/136,782, 7 pages.
Extended European Search Report, dated Mar. 15, 2017, received in European Patent Application No. 17153418.3, which corresponds with U.S. Appl. No. 14/536,648, 7 pages.
International Search Report and Written Opinion, dated Feb. 27, 2017, received in International Patent Application No. PCT/US2016/046407, which corresponds with U.S. Appl. No. 15/009,688, 30 pages.
Patent, dated May 12, 2017, received in Japanese Patent Application No. 2015-547948, which corresponds with U.S. Appl. No. 14/536,426, 3 pages.
Patent, dated May 26, 2017, received in European Patent Application No. 13724102.2, which corresponds with U.S. Appl. No. 14,536,646, 1 page.
Office Action, dated May 19, 2017, received in Chinese Patent Application No. 201380068399.0, which corresponds with U.S. Appl. No. 14/608,985, 5 pages.
Office Action, dated Jun. 9, 2017, received in Japanese Patent Application No. 2016558214, which corresponds with U.S. Appl. No. 14/866,511, 6 pages.
Office Action, dated Jun. 9, 2017, received in U.S. Appl. No. 14/856,520, 36 pages.
Office Action, dated Jun. 15, 2017, received in Danish Patent Application No. 201500595, which corresponds with U.S. Appl. No. 14/871,236, 4 pages.

Office Action, dated Apr. 20, 2017, received in Chinese Patent Application No. 201621044346.2, which corresponds with U.S. Appl. No. 14/871,462, 3 pages.
Final Office Action, dated Jun. 2, 2017, received in U.S. Appl. No. 15/081,771, 17 pages.
Extended European Search Report, dated Jun. 8, 2017, received in European Patent Application No. 16189425.8, which corresponds with U.S. Appl. No. 14/866,989, 8 pages.
Sood, "MultitaskingGestures", http://cydia.saurik.com/package/org.thebigboxx.multitaskinggestures/, Mar. 3, 2014, 2 pages.
YouTube, "Multitasking Gestures: Zephyr Like Gestures on iOS", https://www.youtube.com/watch?v=Jcod-f7Lw0I, Jan. 27, 2014, 3 pages.
Patent, dated May 18, 2017, received in Australian Patent Application No. 2013368445, which corresponds with U. S. Appl. No. 14/608,985, 1 page.
Office Action, dated Jun. 29, 2017, received in U.S. Appl. No. 14/608,895, 30 pages.
Office Action, dated Jul. 26, 2017, received in U.S. Appl. No. 14/536,235, 14 pages.
Office action, dated Aug. 3, 2017, received in U.S. Appl. No. 14/536,426, 10 pages.
Office Action, dated Jul. 17, 2017, received in U.S. Appl. No. 14/536,166, 19 pages.
Notice of Allowance, dated Jul. 10, 2017, received in U.S. Appl. No. 14/609,042, 8 pages.
Notice of Allowance, dated Jul. 6, 2017, received in U.S. Appl. No. 14/866,489, 12 pages.
Office Action, dated Jun. 30, 2017, received in U.S. Appl. No. 14/856,522, 22 pages.
Notice of Allowance, dated Jun. 16, 2017, received in in U.S. Appl. No. 14/857,645, 5 pages.
Office Action, dated Jul. 6, 2017, received in U.S. Appl. No. 14/867,892, 55 pages.
Final Office Action, dated Aug. 18, 2017, received in U.S. Appl. No. 14/869,873, 20 pages.
Brownlee, "Android 5.0 Lollipop Feature Review!", https//www.youtube.com/watch?v=pEDQ1z1-PvU, Oct. 27, 2014, 5 pages.
Google-Chrome, "Android 5.0 Lollipop", http://androidlovernet/android-os/android-5-0-lollipop/android-5-0-lollipop-recent-apps-card-google-search.html, Oct. 19, 2014, 10 pages.
YouTube, "How to Master Android Lollipop Notifications in Four Minutes!", Video Gadgets Journal (VGJFelix), https://www.youtube.com/watch?v=S-zBRG7GGJgs, Feb. 8, 2015, 4 pages.
Patent, dated May 26, 2017, received in Korean Patent Application No. 2015-7018851, which corresponds with U.S. Appl. No. 14/536,426, 3 pages.
Office Action, dated Jul. 4, 2017, received in European Patent Application No. 13795392.3, which corresponds with U.S. Appl. No. 14/608,926, 4 pages.
Patent, dated Jun. 30, 2017, received in Korean Patent Application No. 2015-7018853, which corresponds with U.S. Appl. No. 14/608,926, 3 pages.
Office Action, dated Jul. 21, 2017, received in Australian Patent Application No. 2016262773, which corresponds with U.S. Appl. No. 14/536,141, 3 pages.
Notice of Allowance, dated Jun. 30, 2017, received in Japanese Patent Application No. 2015-511646, which corresponds with U.S. Appl. No. 14/536,141, 5 pages.
Patent, dated Jul. 28, 2017, received in Japanese Patent Application No. 2015511646, which corresponds with U.S. Appl. No. 14/536,141, 3 pages.
Office Action, dated Jun. 16, 2017, received in Chinese Patent Application No. 201380068295.X, which corresponds with U.S. Appl. No. 14/608,942, 6 pages.
Patent, dated Jun. 16, 2017, received in Japanese Patent Application No. 2015-549393, which corresponds with U.S. Appl. No. 14/608,942, 3 pages.
Office Action, dated Jul. 4, 2017, received in Australian Patent Application No. 2016238917, which corresponds with U.S. Appl. No. 14/536,203, 5 pages.

(56) References Cited

OTHER PUBLICATIONS

Office Action, dated Jun. 23, 2017, received in Japanese Patent Application No. 2016173113, which corresponds with U.S. Appl. No. 14/536,203, 5 pages.
Office Action, dated Jul. 21, 2017, received in Australian Patent Application No. 2016216658, which corresponds with U.S. Appl. No. 14/536,291, 3 pages.
Office Action, dated Jul. 21, 2017, received in Australian Patent Application No. 2016247194, which corresponds with U.S. Appl. No. 14/536,648, 3 pages.
Notice of Allowance, dated Jun. 23, 2017, received in Japanese Patent Application No. 2016-558331, which corresponds with U.S. Appl. No. 14/864,737, 5 pages.
Patent, dated Jul. 28, 2017, received in Japanese Patent Application No. 2016-558331, which corresponds with U.S. Appl. No. 14/864,737, 3 pages.
Office Action, dated Jul. 7, 2017, received in Danish Patent Application No. 201500575, 4 pages.
Office Action, dated Jul. 6, 2017, received in Danish Patent Application No. 201500574, which corresponds with U.S. Appl. No. 14/866,159, 3 pages.
Office Action, dated Jun. 12, 2017, received in Danish Patent Application No. 201500582, which corresponds with U.S. Appl. No. 14/863,432, 5 pages.
Grant, dated Jul. 21, 2017, received in Dutch Patent Application No. 2016801, which corresponds with U.S. Appl. No. 14/871,227, 8 pages.
Notice of Allowance, dated Jul. 14, 2017, received in Japanese Patent Application No. 2016558214, which corresponds with U.S. Appl. No. 14/866,511, 5 pages.
Office Action, dated Jul. 3, 2017, received in Danish Patent Application No. 201500592, which corresponds with U.S. Appl. No. 14/869,899, 5 pages.
Office Action, dated Jun. 15, 2017, received in Danish Patent Application No. 201500579, which corresponds with U.S. Appl. No. 14/866,361, 2 pages.
Office Action, dated Jul. 31, 2017, received in Japanese Patent Application No. 2017126445, which corresponds with U.S. Appl. No. 14/866,987, 6 pages.
Office Action, dated Jun. 16, 2017, received in Japanese Patent Application No. 2016-233450, which corresponds with U.S. Appl. No. 14/866,989, 6 pages.
Office Action, dated Aug. 4, 2017, received in Japanese Patent Application No. 2016-533201, which corresponds with U.S. Appl. No. 14/871,227, 6 pages.
Office Action, dated Jun. 29, 2017, received in Danish Patent Application No. 201670587, which corresponds with U.S. Appl. No. 15/231,745, 4 pages.
Office Action, dated Jul. 6, 2017, received in Danish Patent Application No. 201670590, which corresponds with U.S. Appl. No. 15/231,745, 3 pages.
Office Action, dated Jul. 27, 2017, received in Australian Patent Application No. 2017100535, which corresponds with U.S. Appl. No. 15/272,341, 4 pages.
Office Action, dated Aug. 4, 2017, received in Danish Patent Application No. 201770377, 9 pages.
Search Report, dated Jun. 22, 2017, received in Dutch Patent Application No. 2016375, which corresponds with U.S. Appl. No. 14/866,981, 17 pages.
Search Report, dated Jun. 19, 2017, received in Dutch Patent Application No. 2016377, which corresponds with U.S. Appl. No. 14/866,159, 13 pages.
Extended European Search Report, dated Jun. 22, 2017, received in European Patent Application No. 16189421.7, which corresponds with U.S. Appl. No. 14/866,987, 7 pages.
Extended European Search Report, dated Jul. 25, 2017, received in European Patent Application No. 17171972.7, which corresponds with U.S. Appl. No. 14/870,882, 12 pages.
Extended European Search Report, dated Jul. 25, 2017, received in European Patent Application No. 17172266.3, which corresponds with U.S. Appl. No. 14/871,336, 9 pages.

* cited by examiner

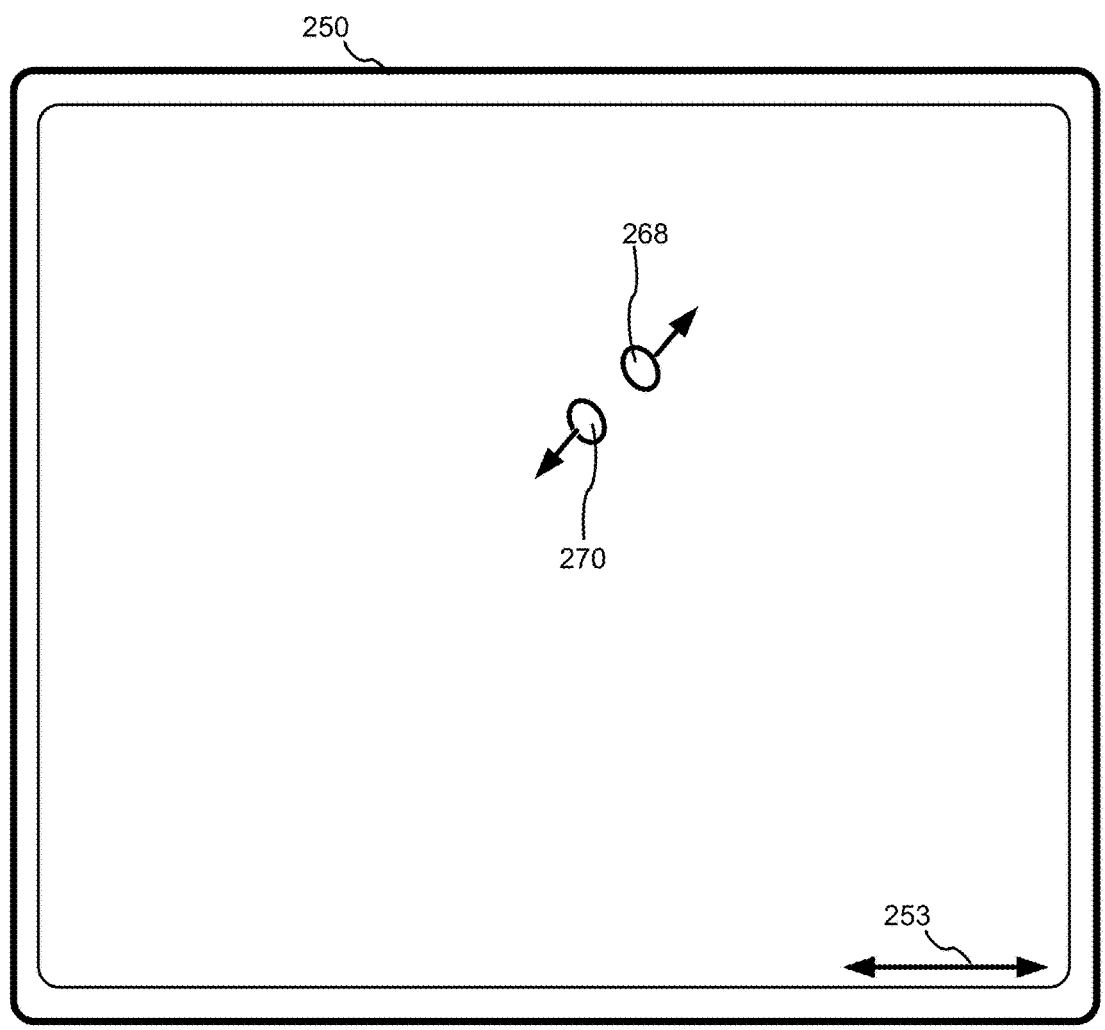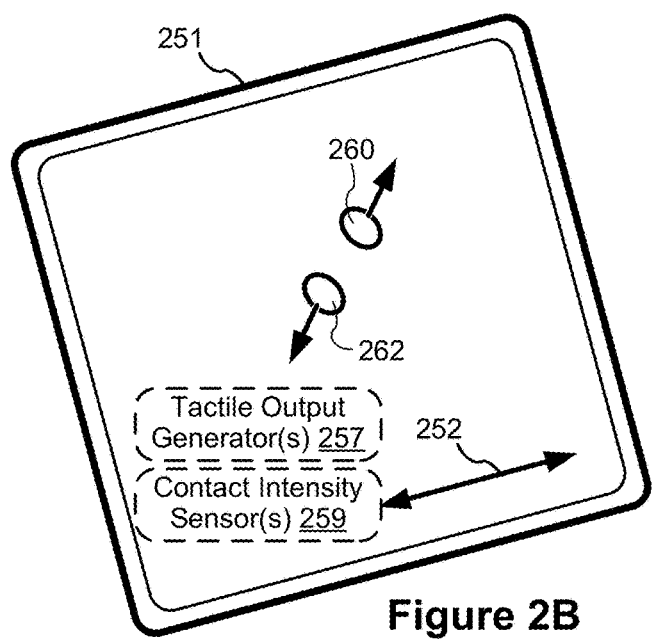
Figure 2B

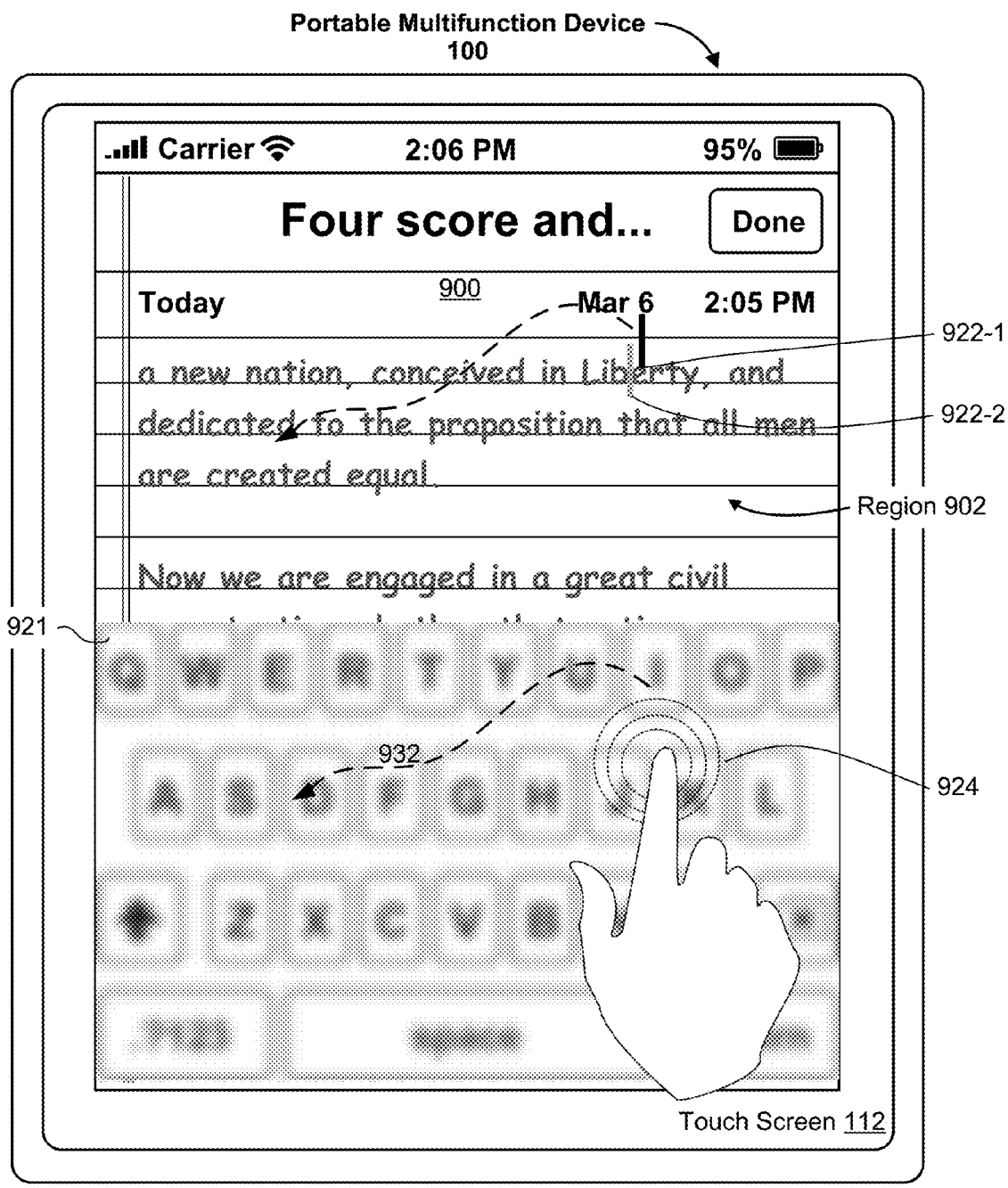
Figure 9B

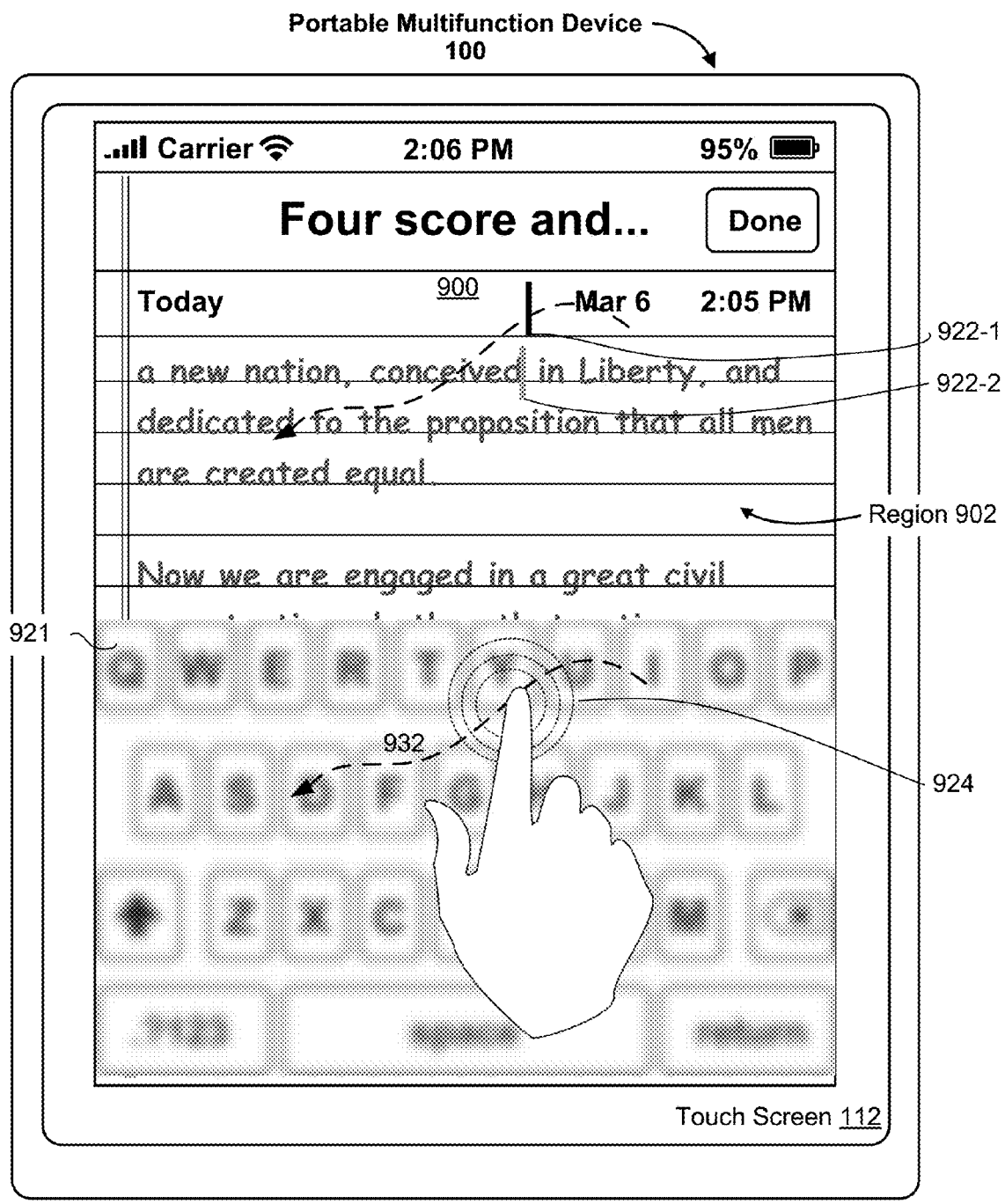
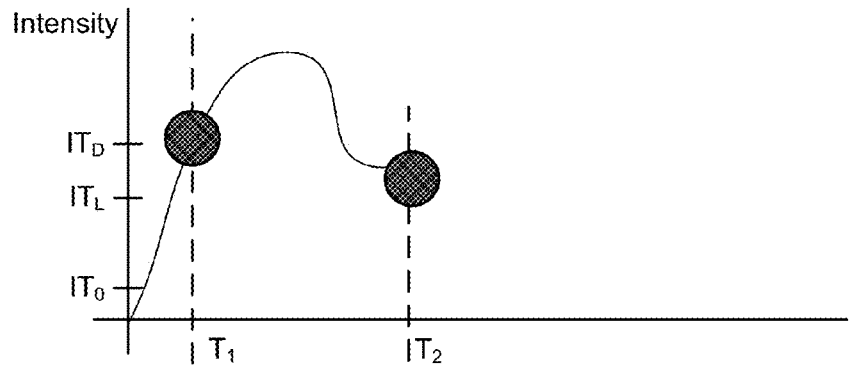
Figure 9C

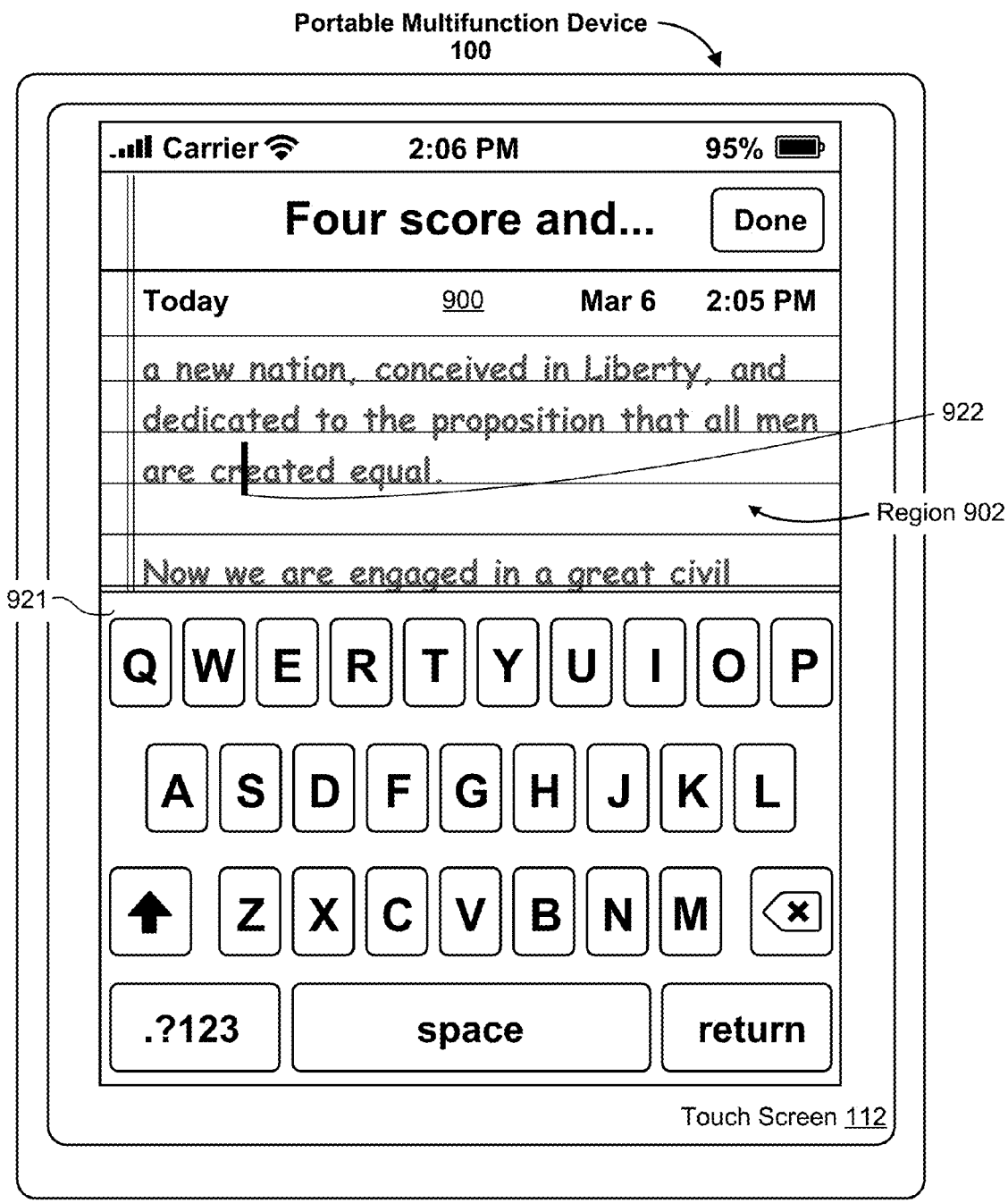
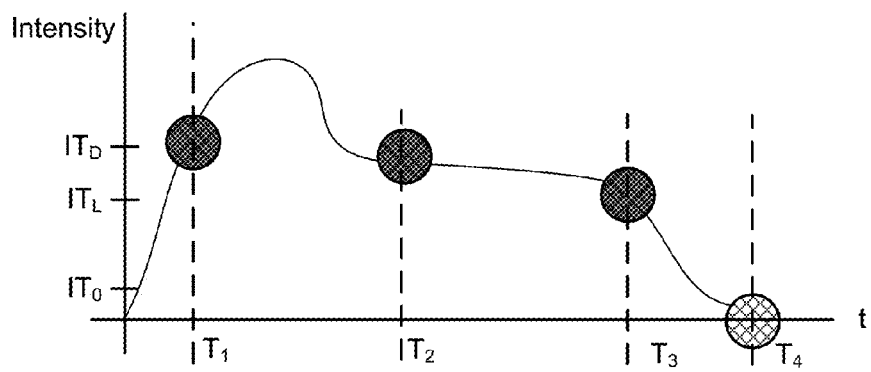
Figure 9E

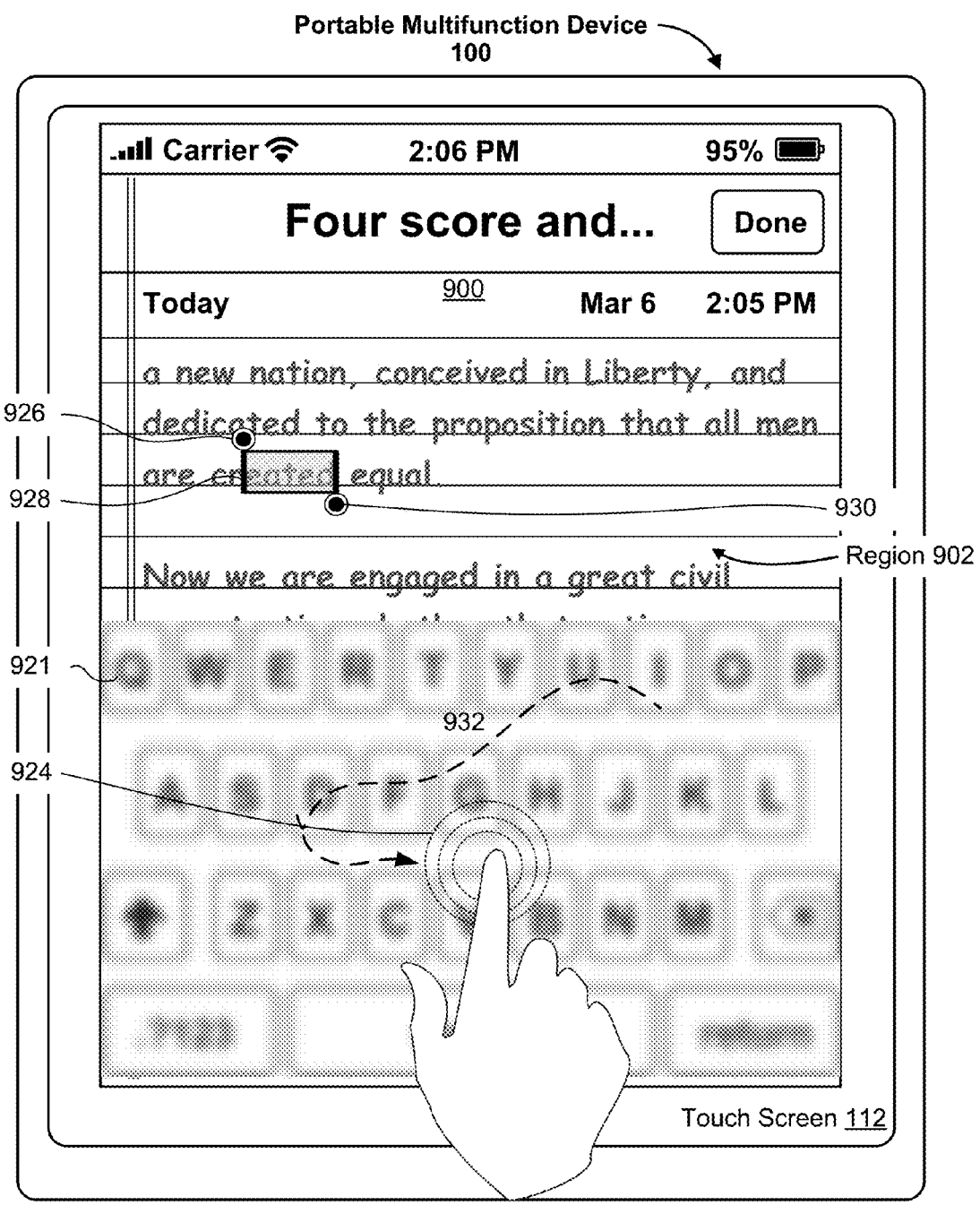
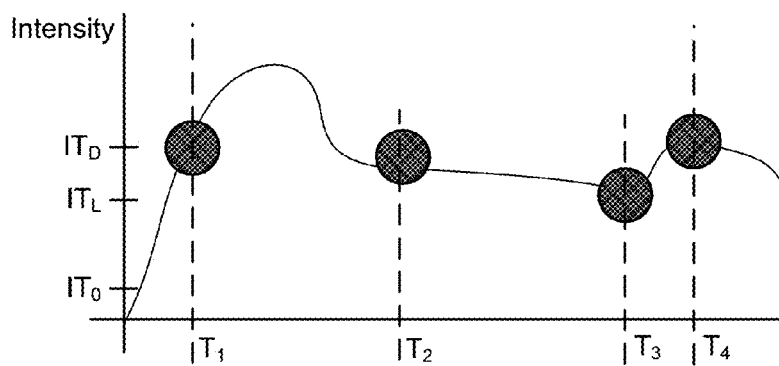
Figure 9F

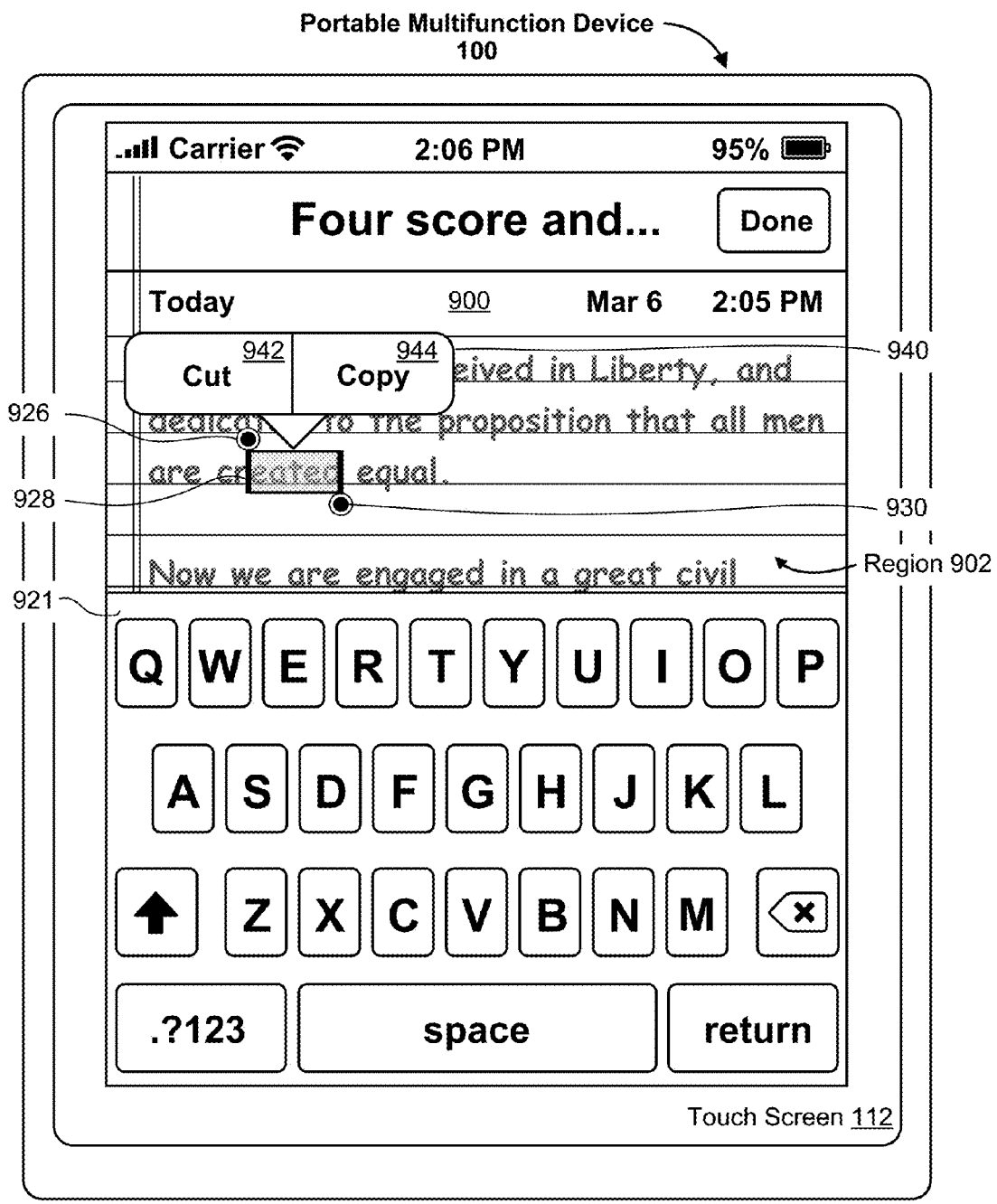
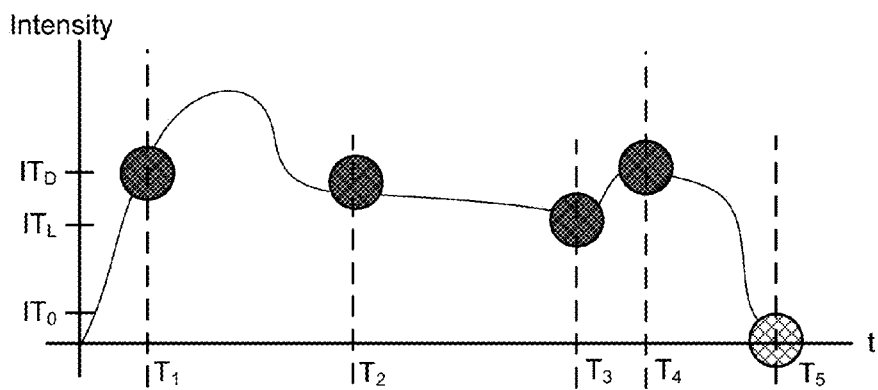
Figure 9G

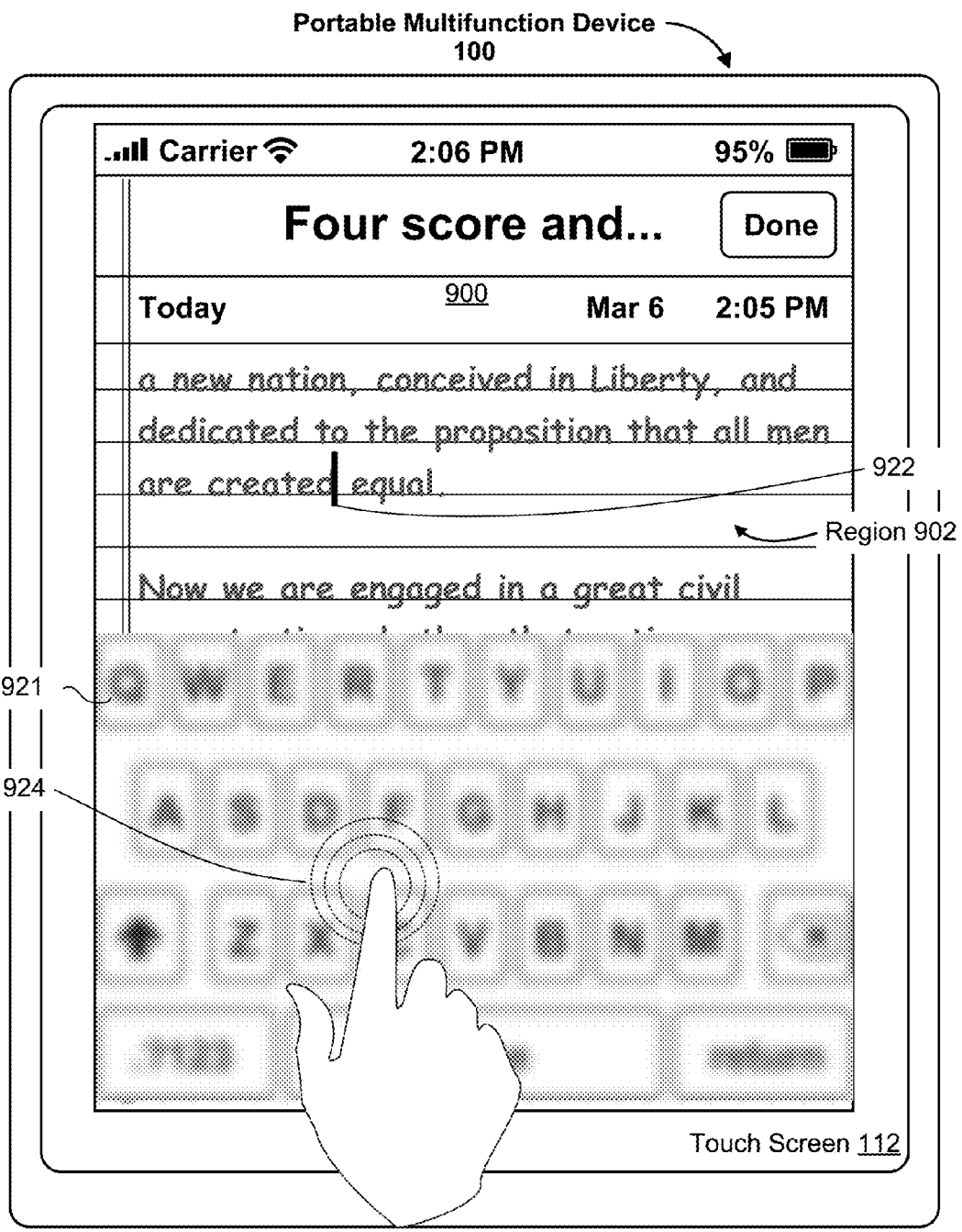
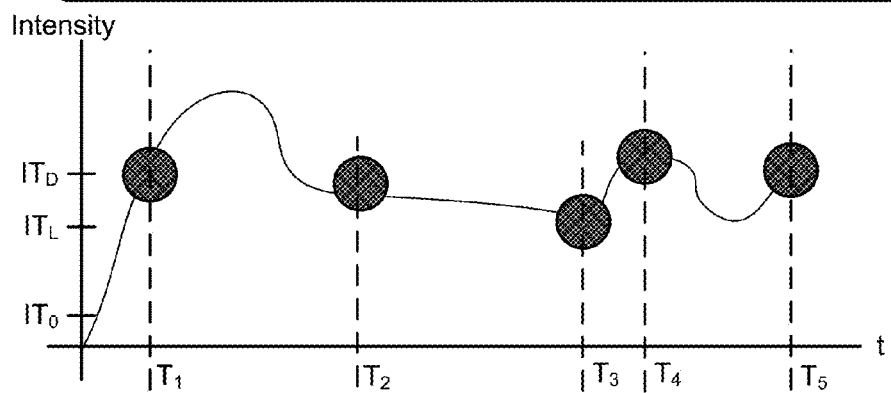
Figure 9H

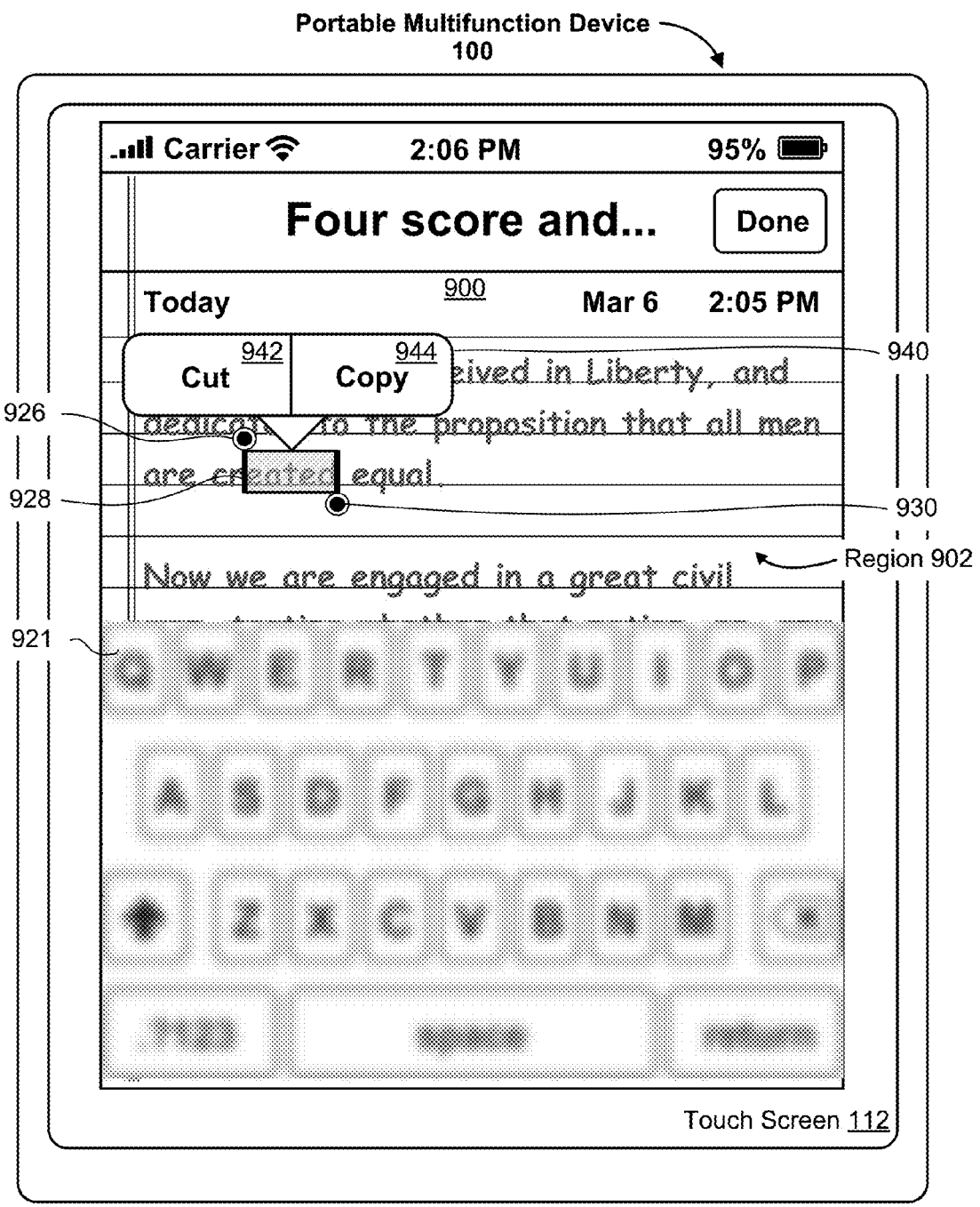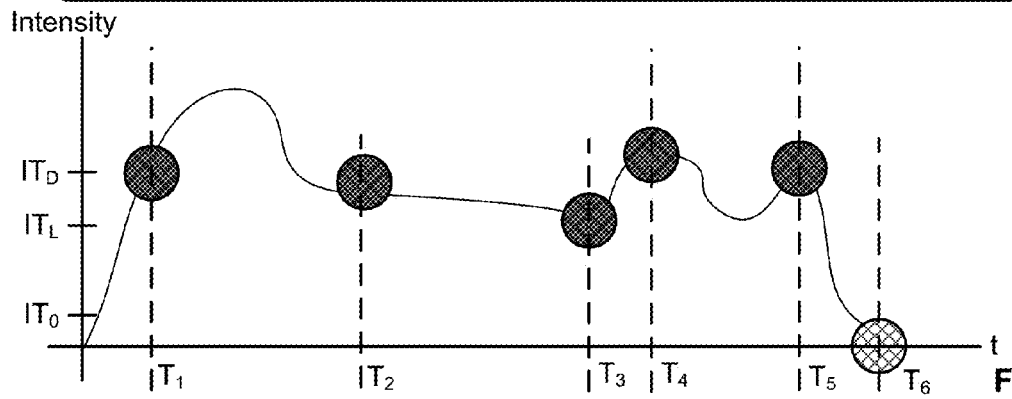
Figure 9I

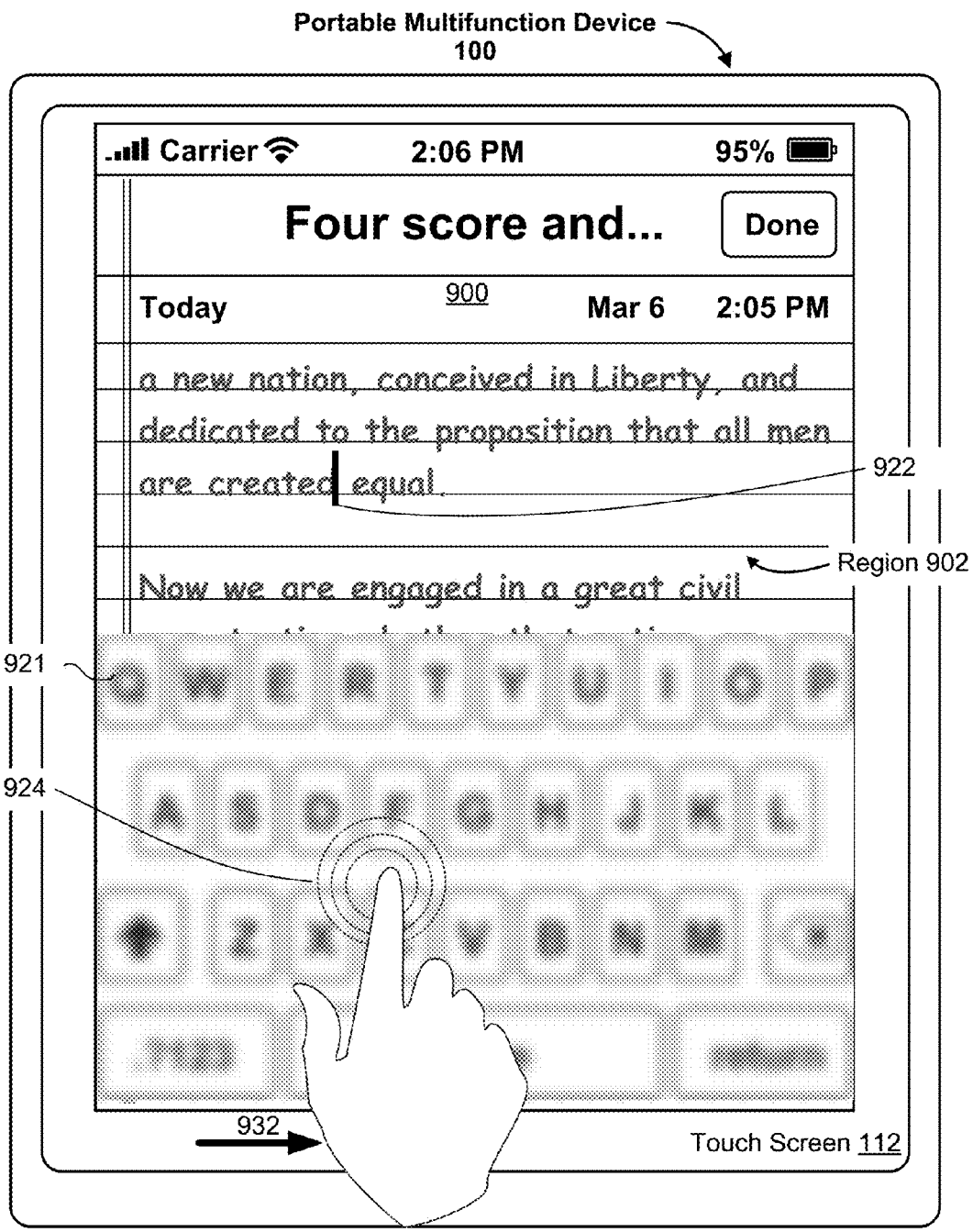
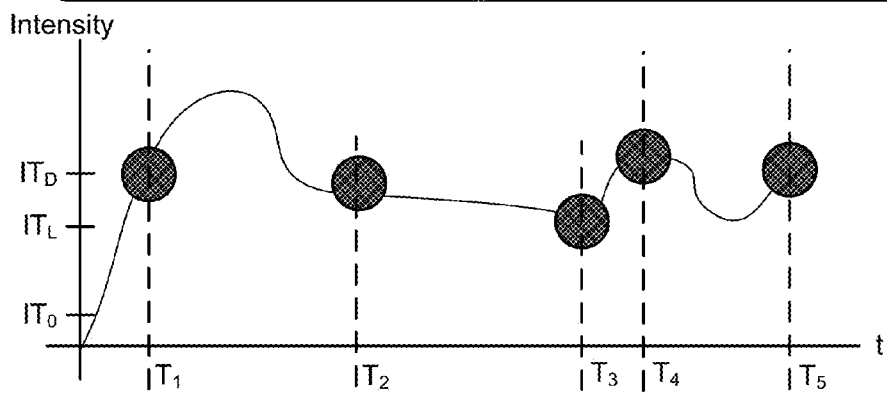
Figure 9J

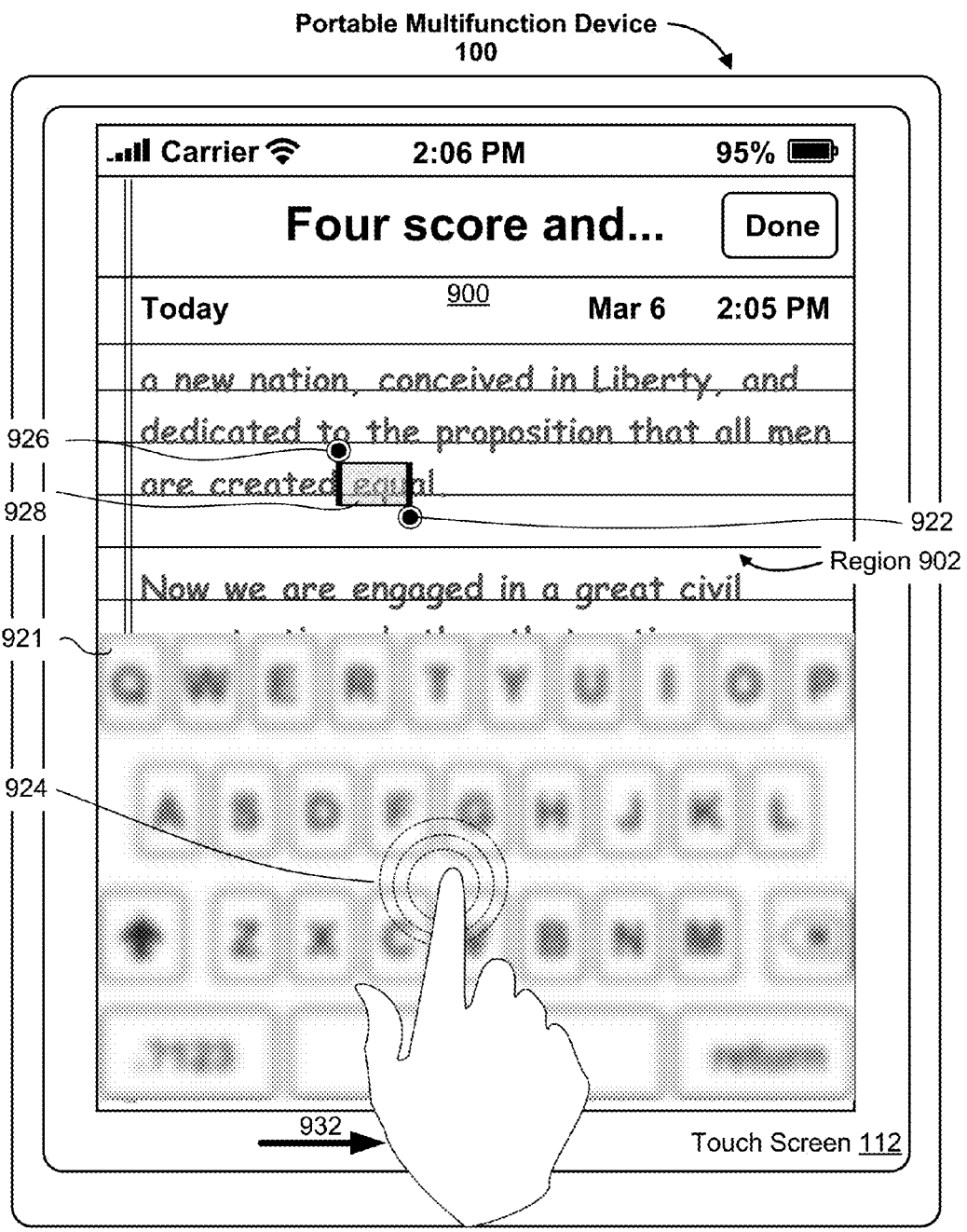
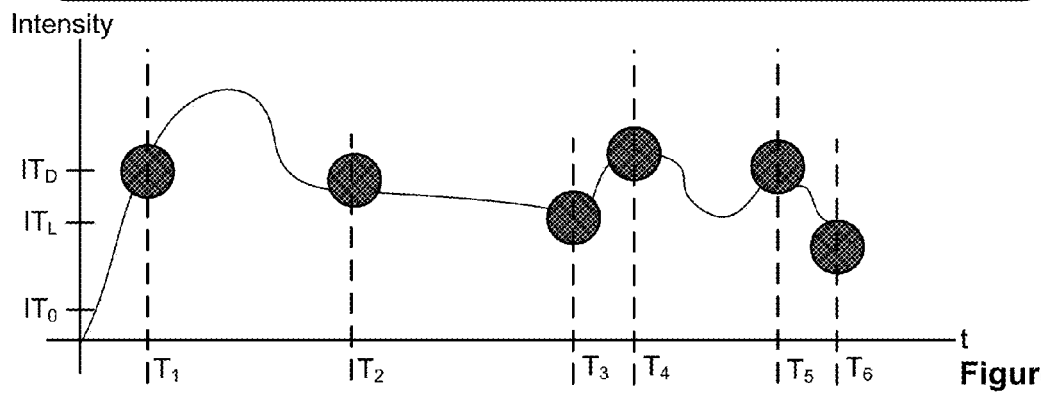
Figure 9K

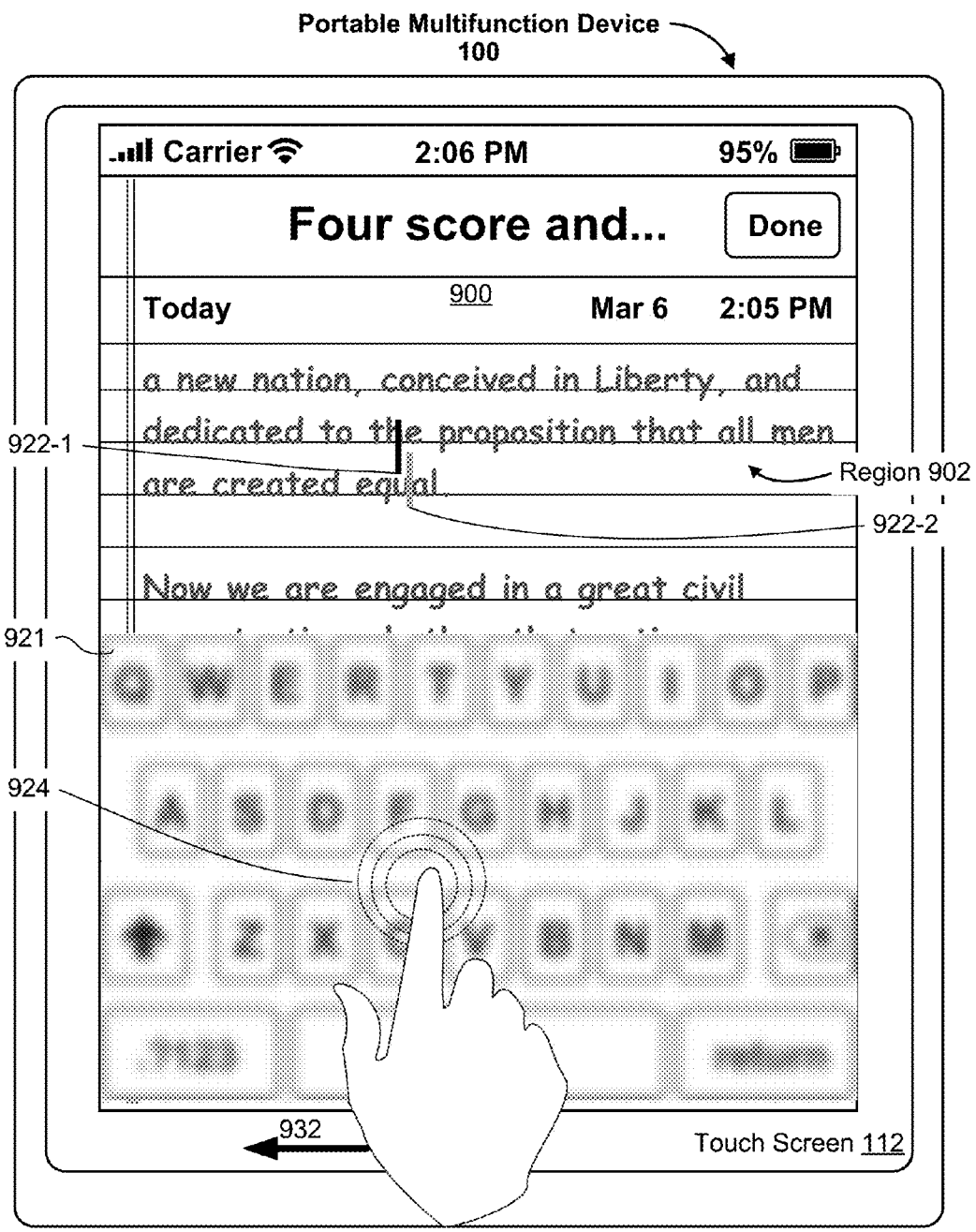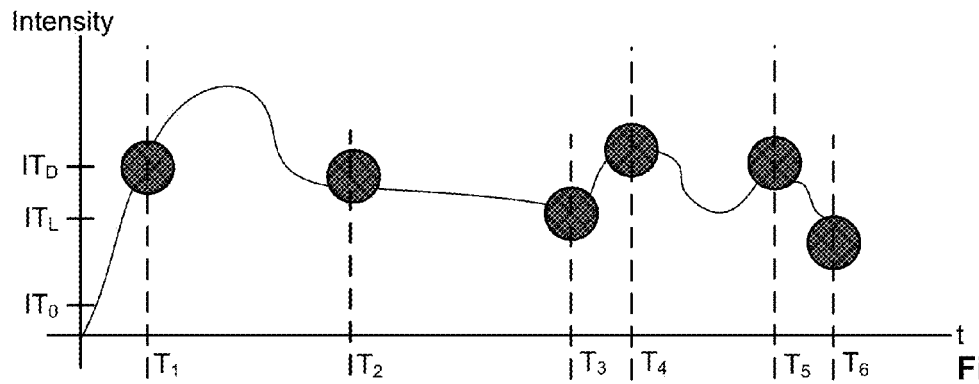
Figure 9L

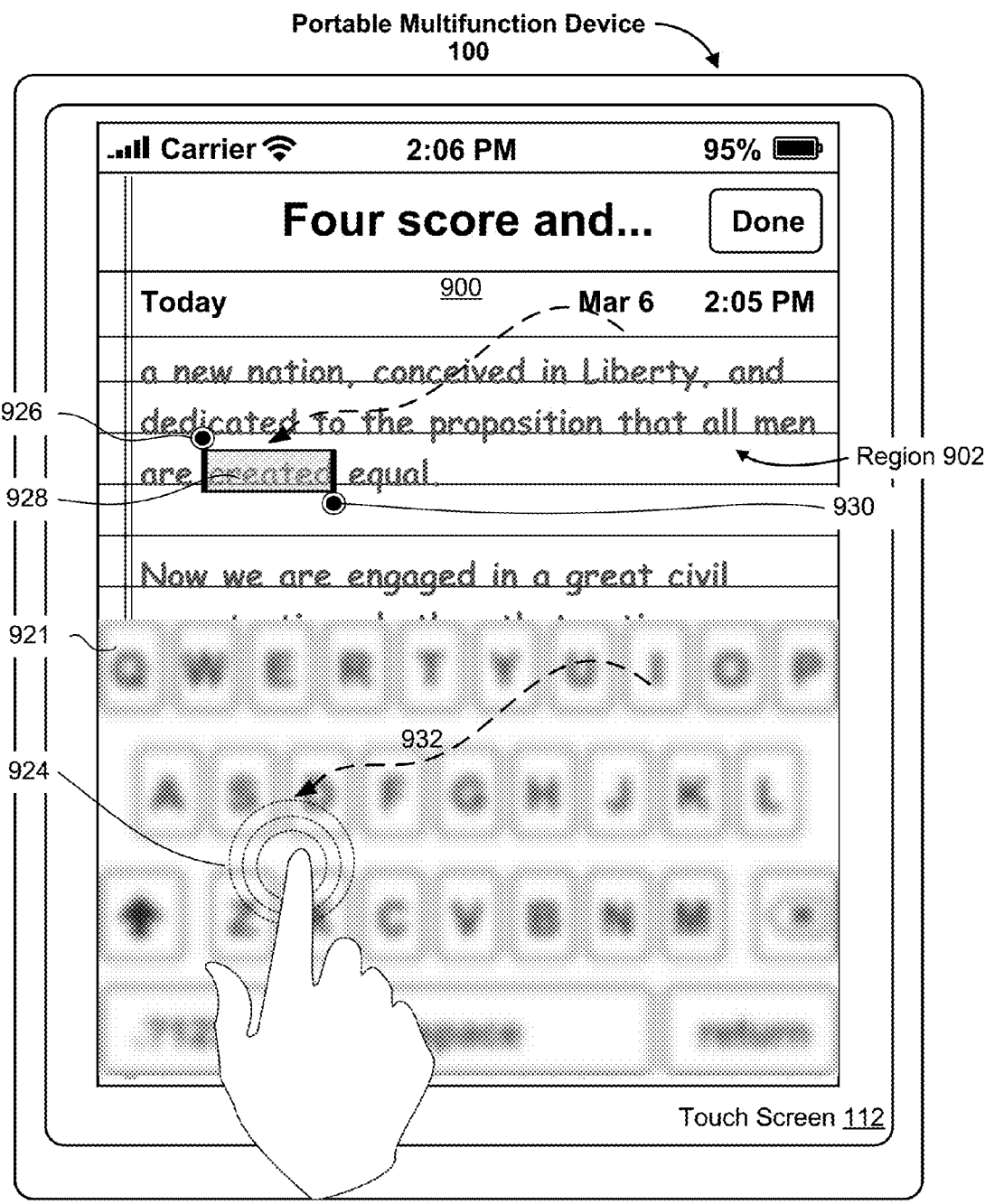
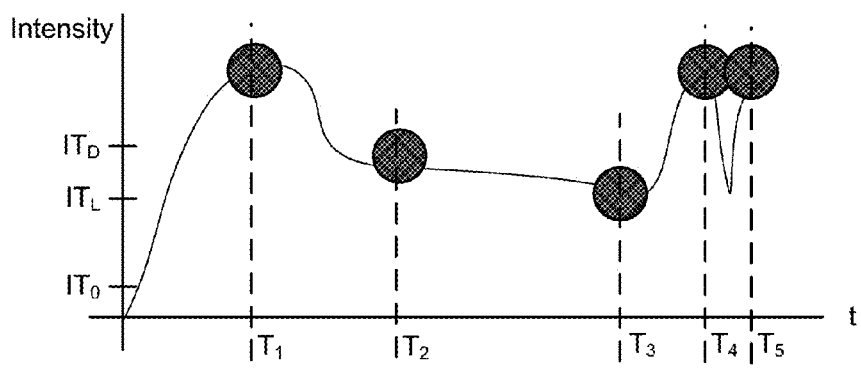
Figure 9M

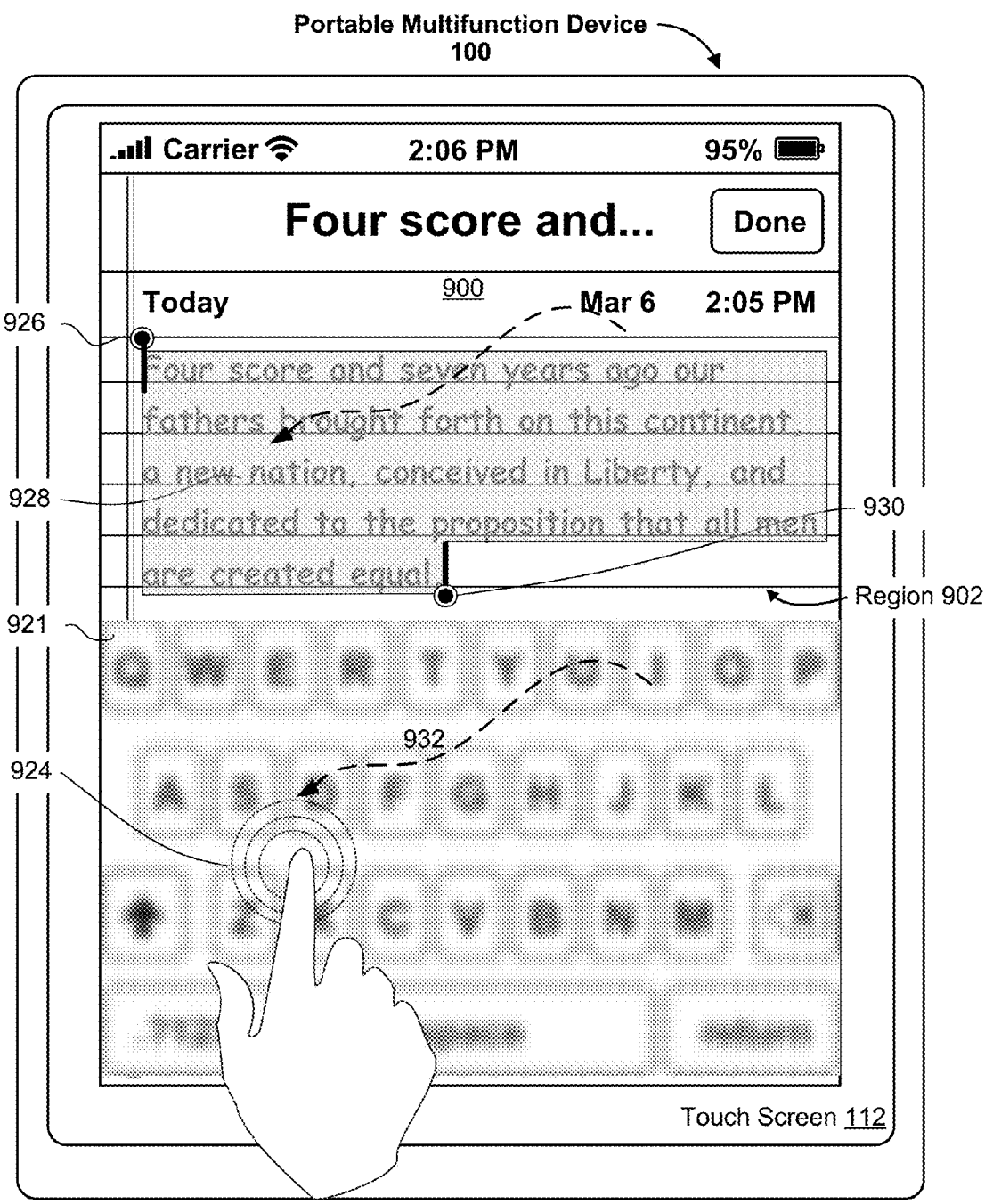
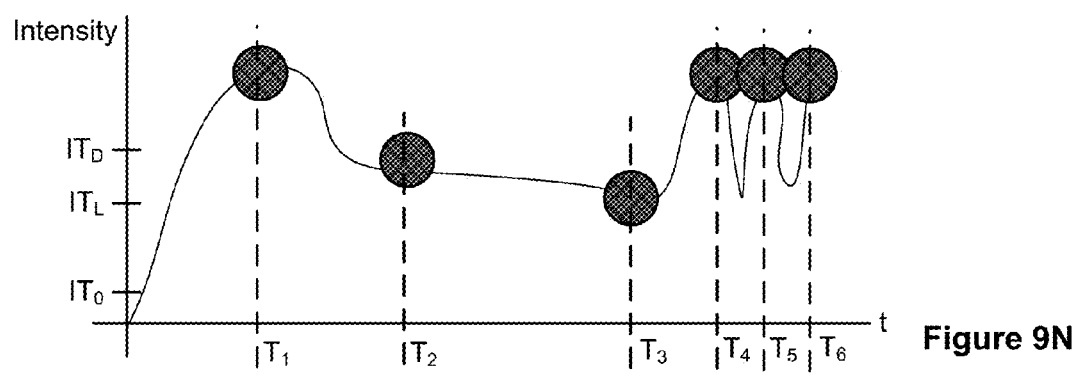
Figure 9N

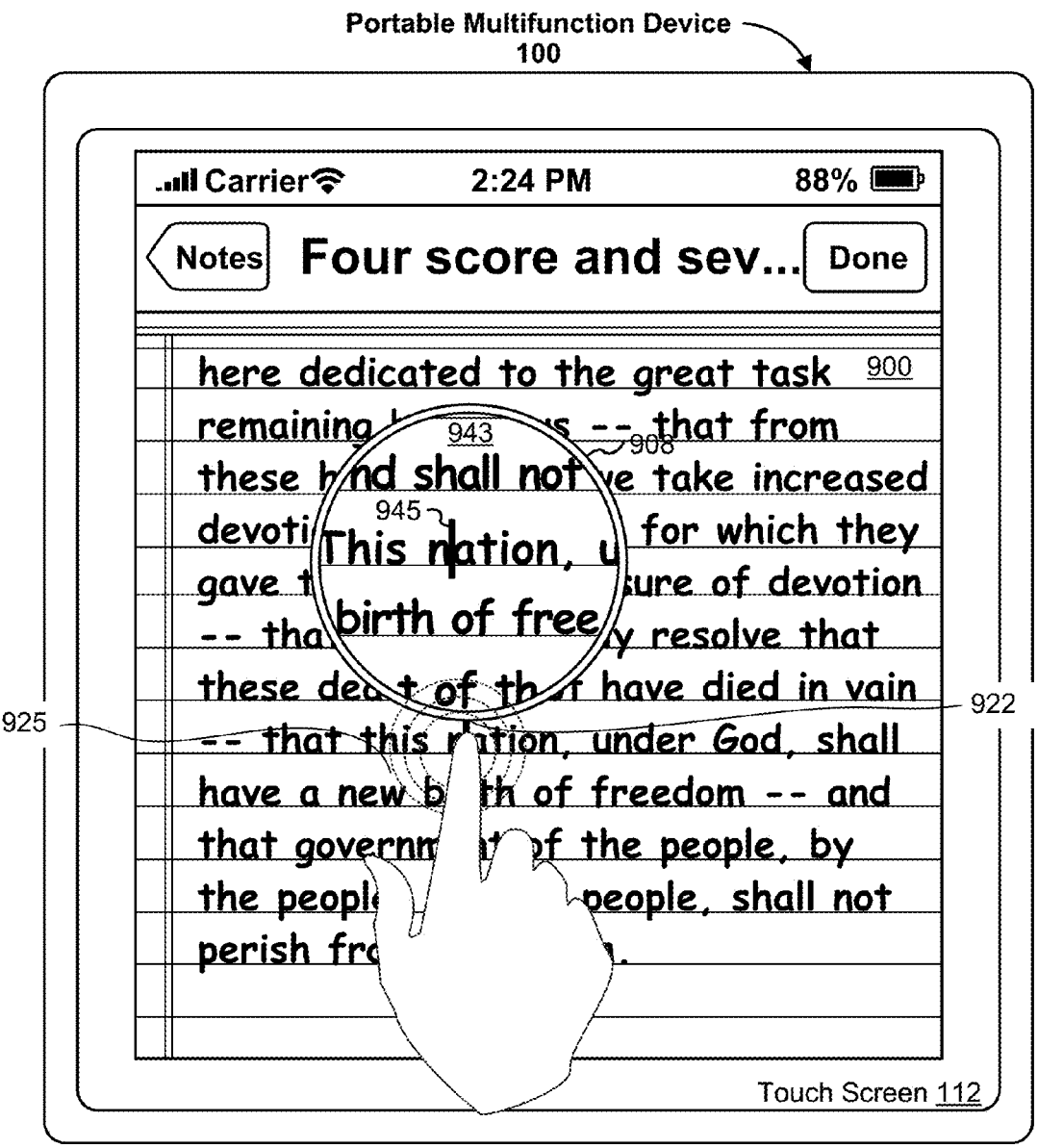
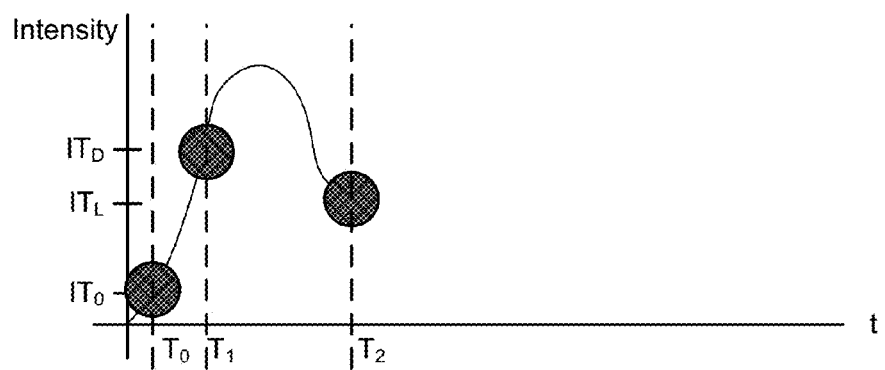
Figure 9R

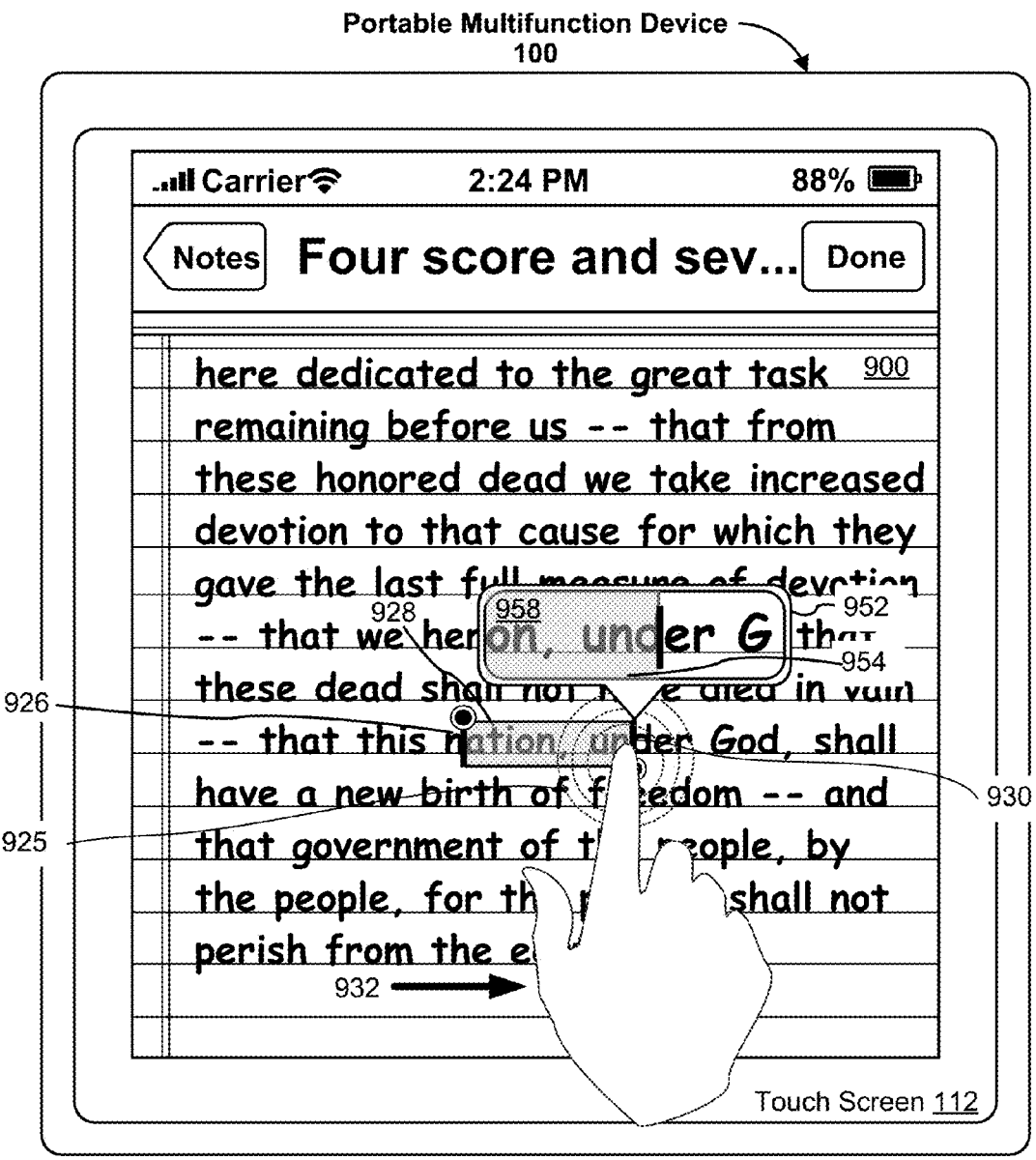
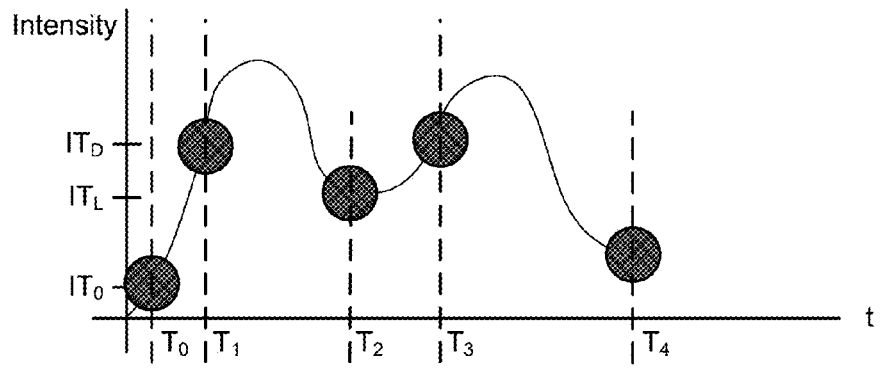
Figure 9S

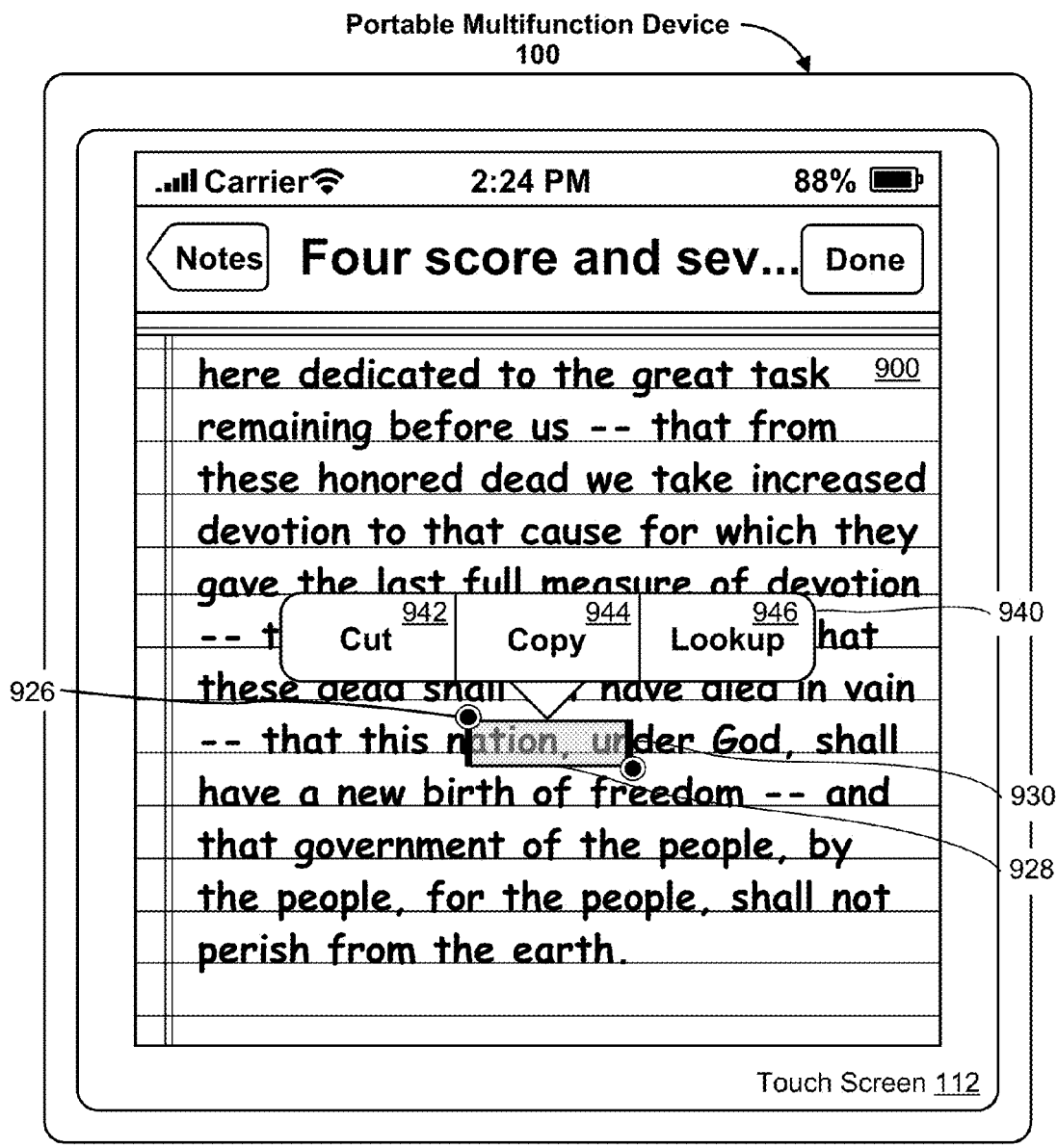
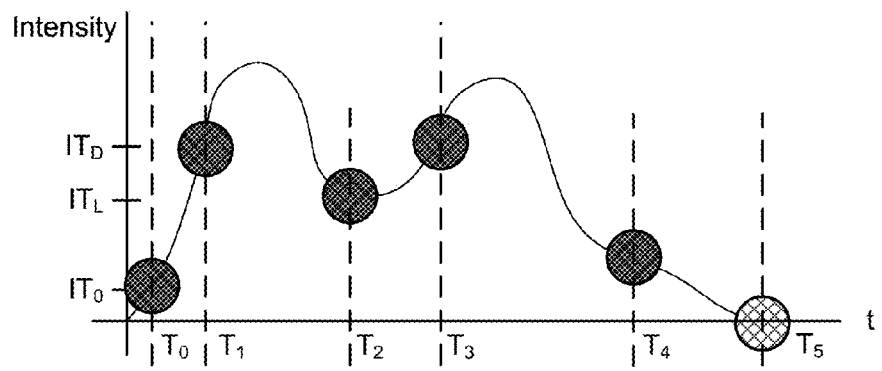
Figure 9T

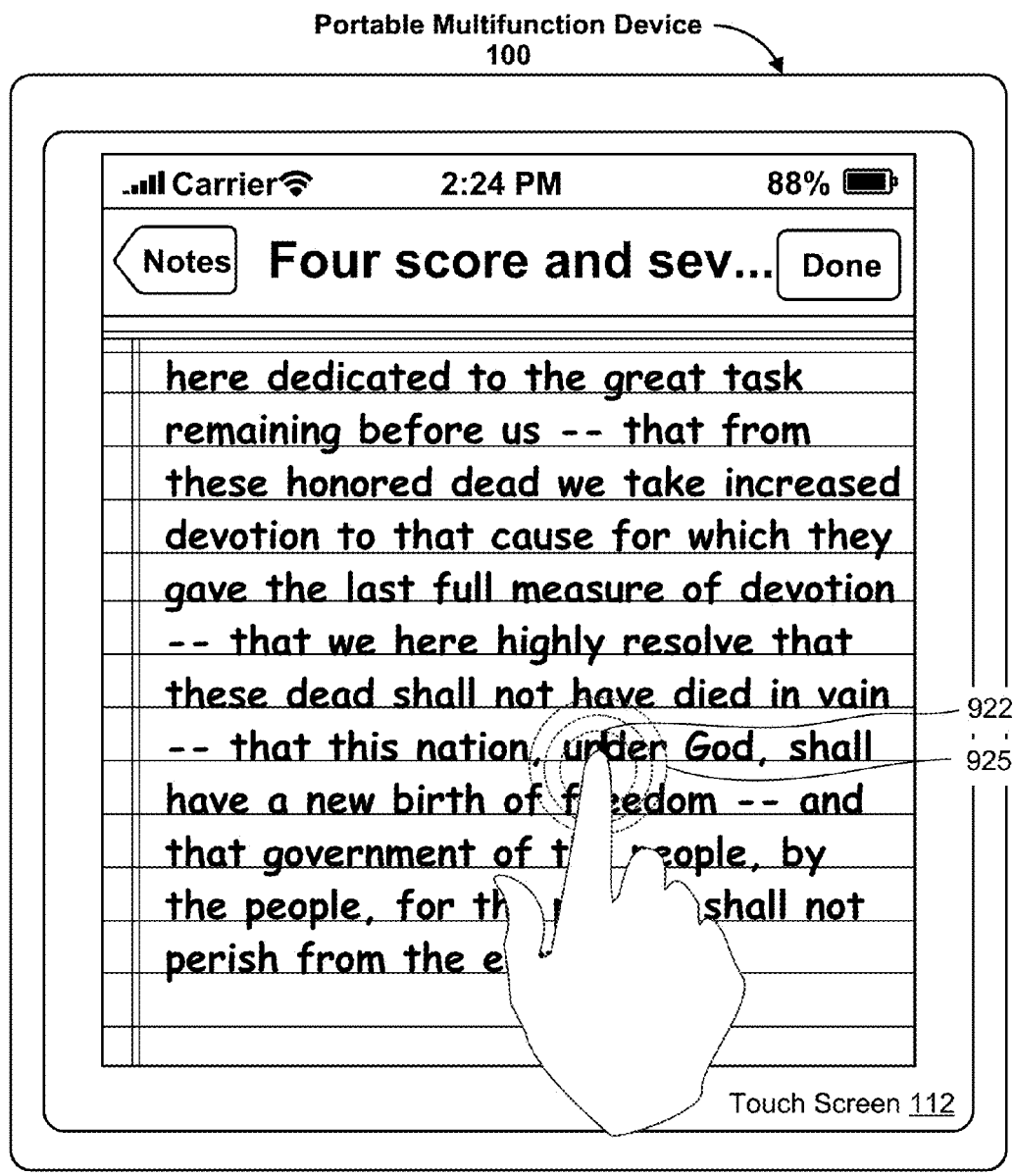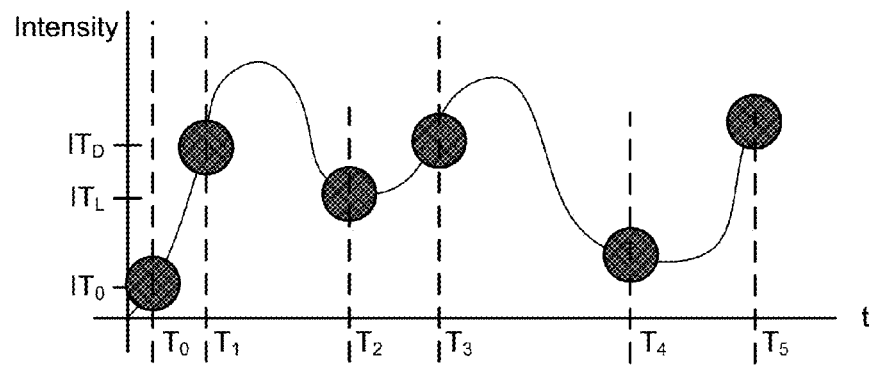
Figure 9U

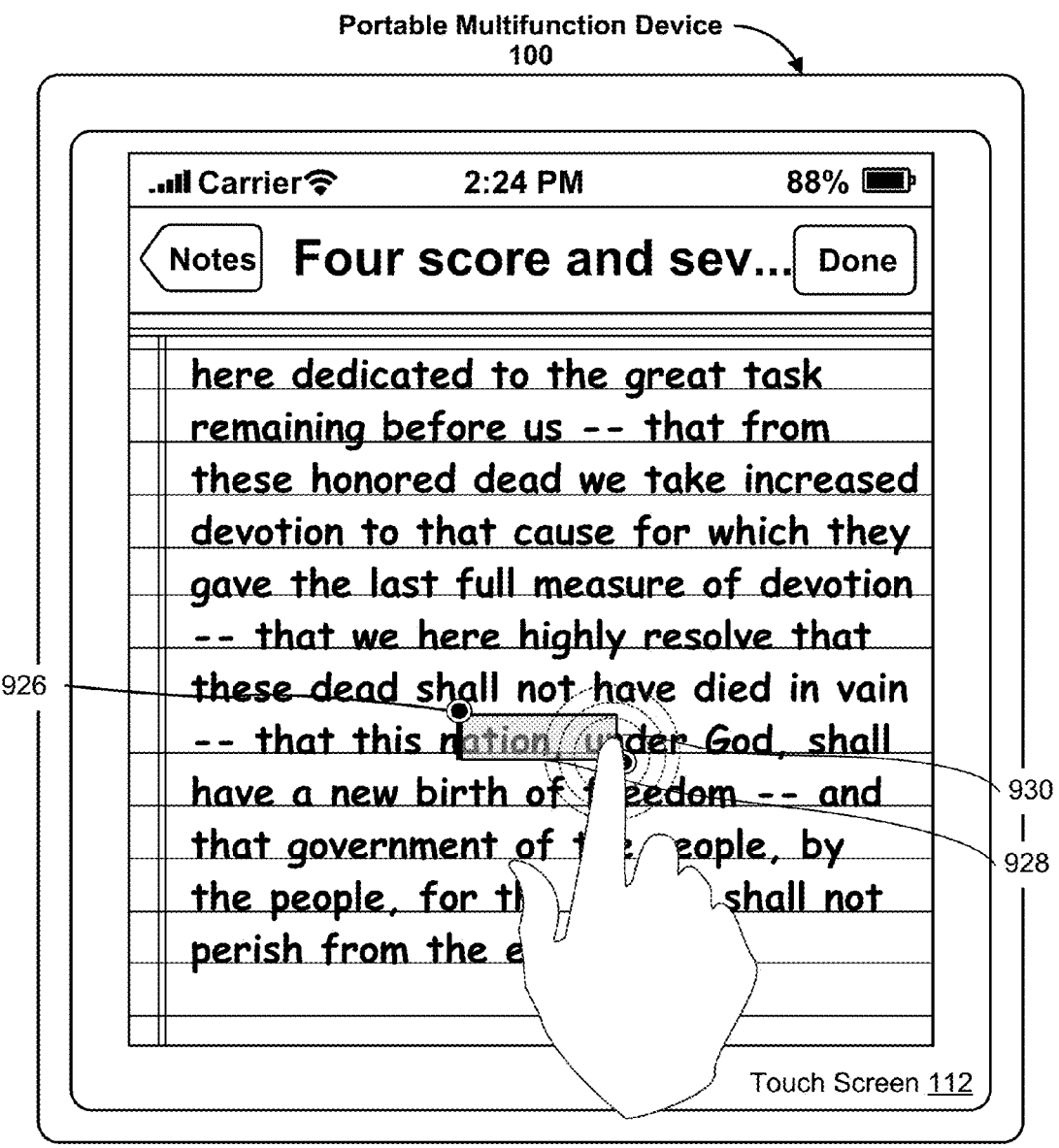
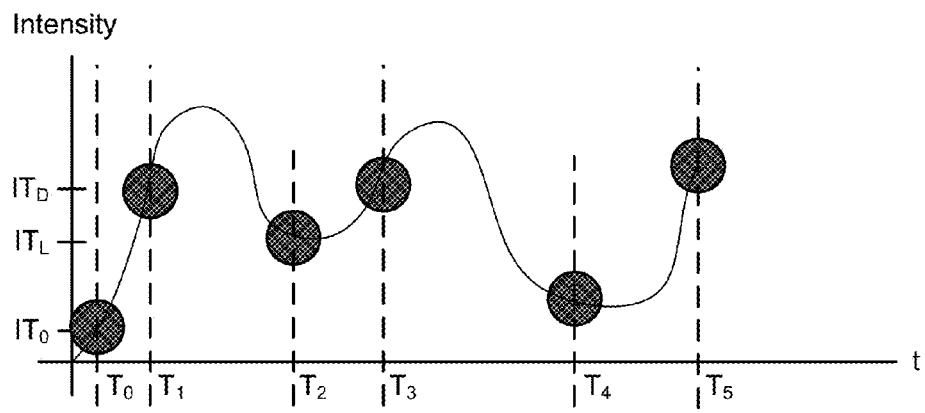
Figure 9V

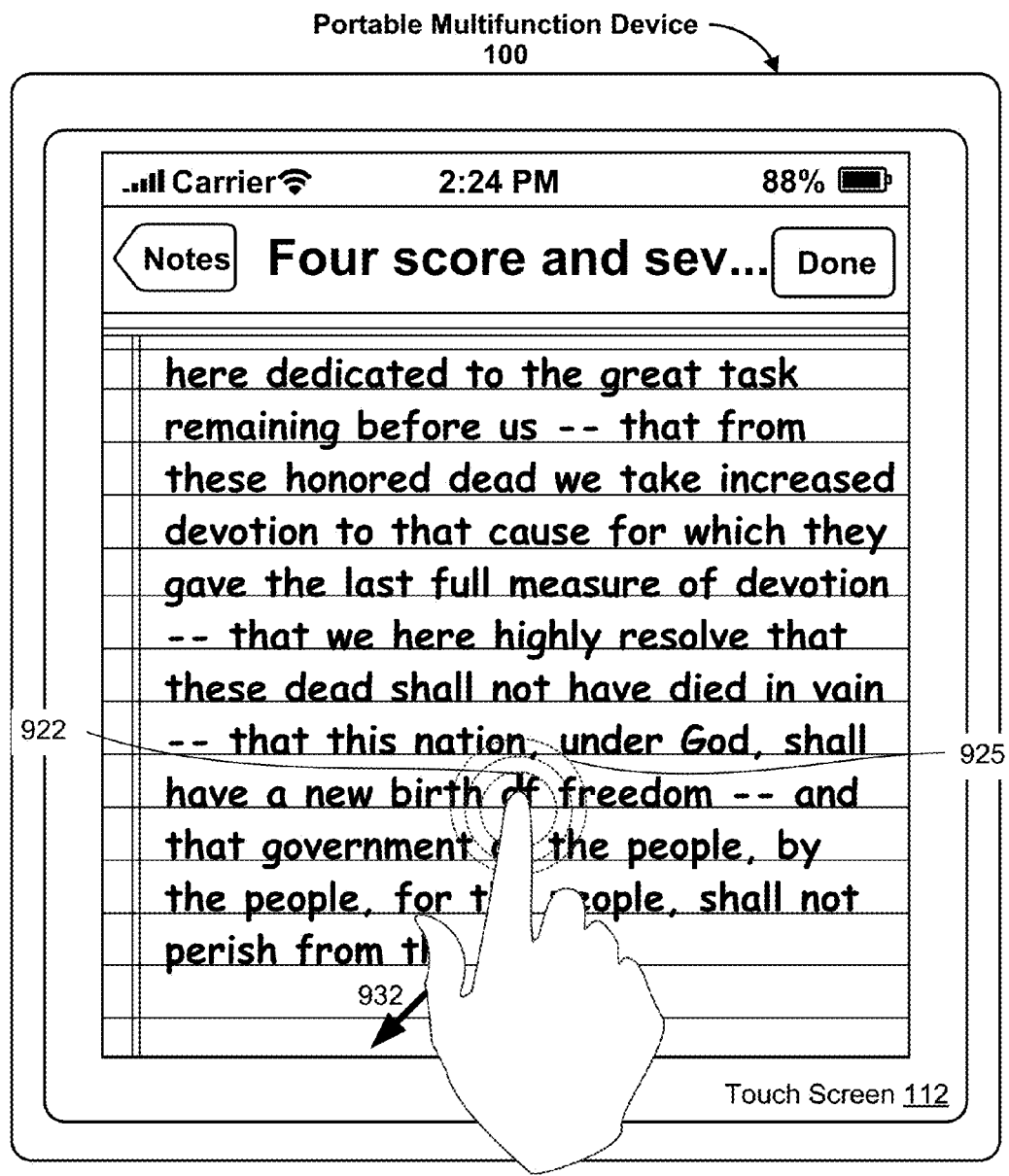
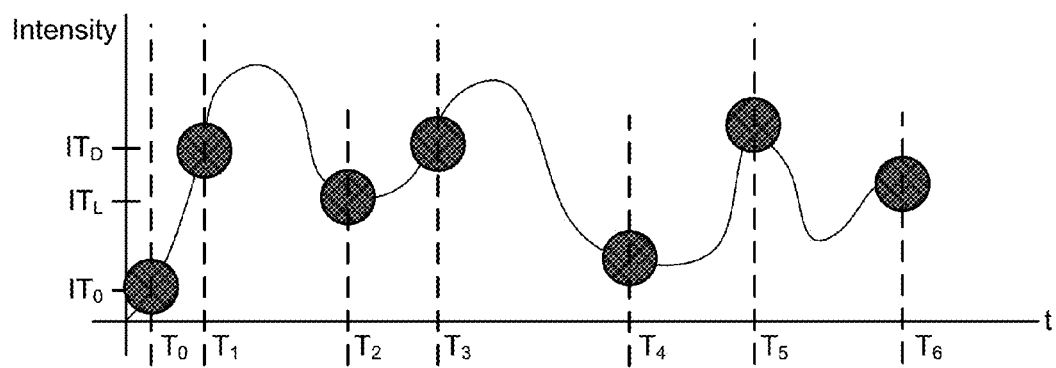
Figure 9W

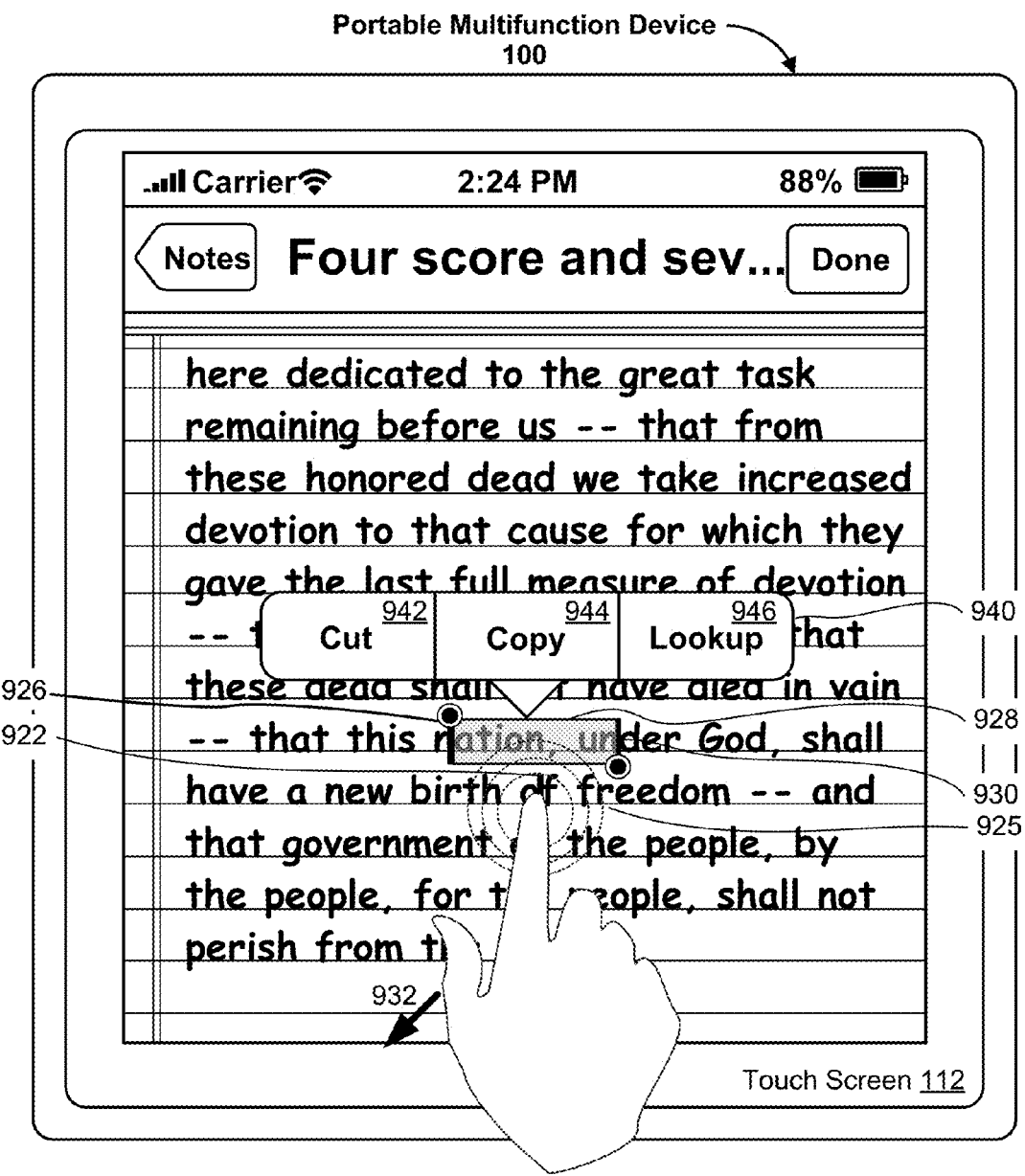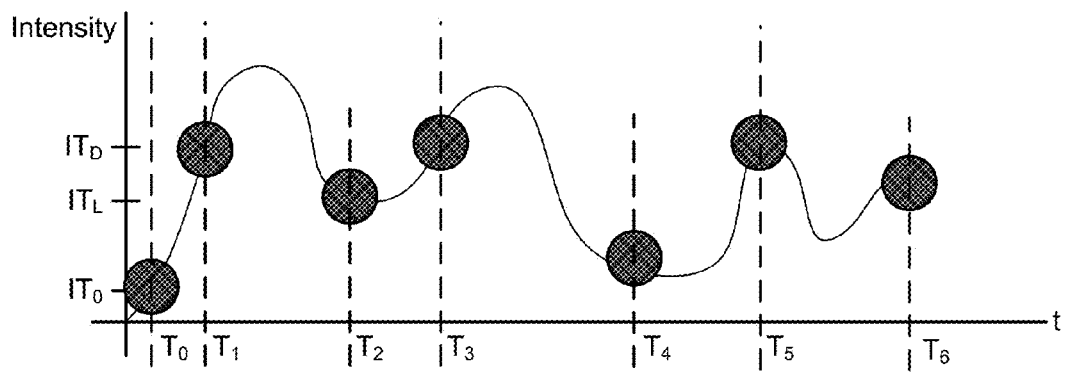
Figure 9X

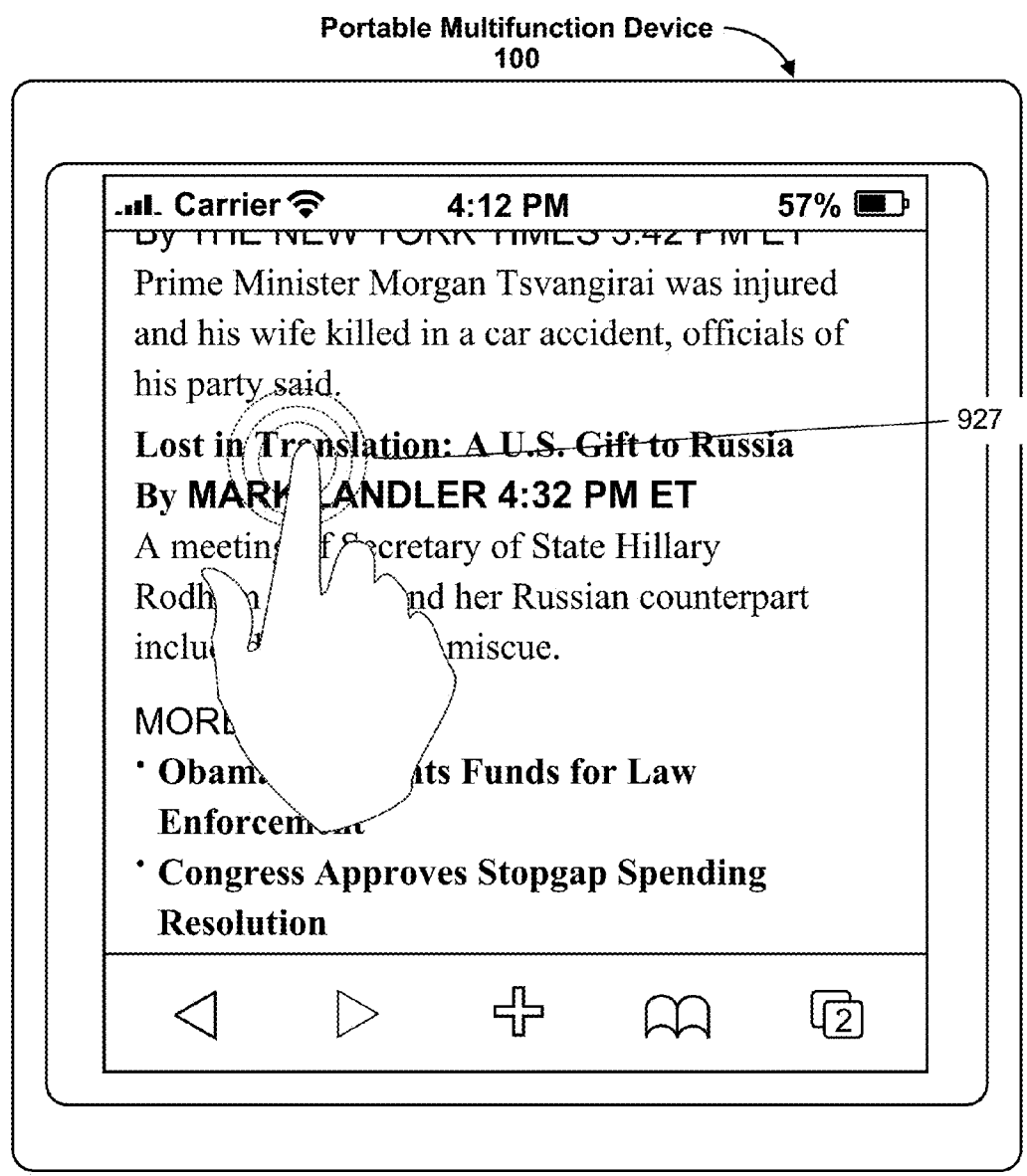
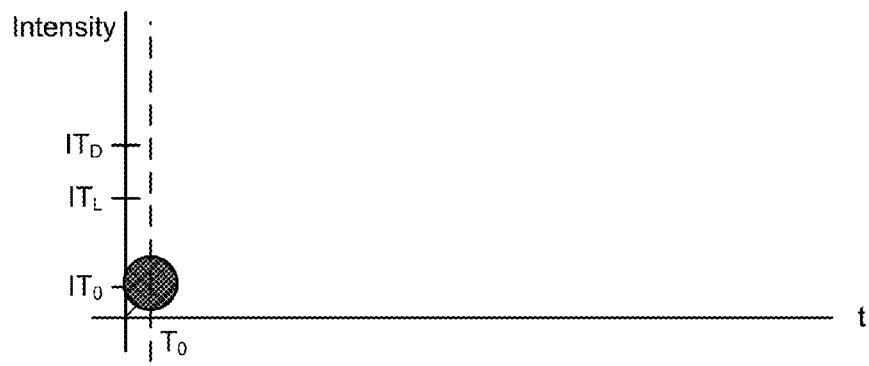
Figure 9Y

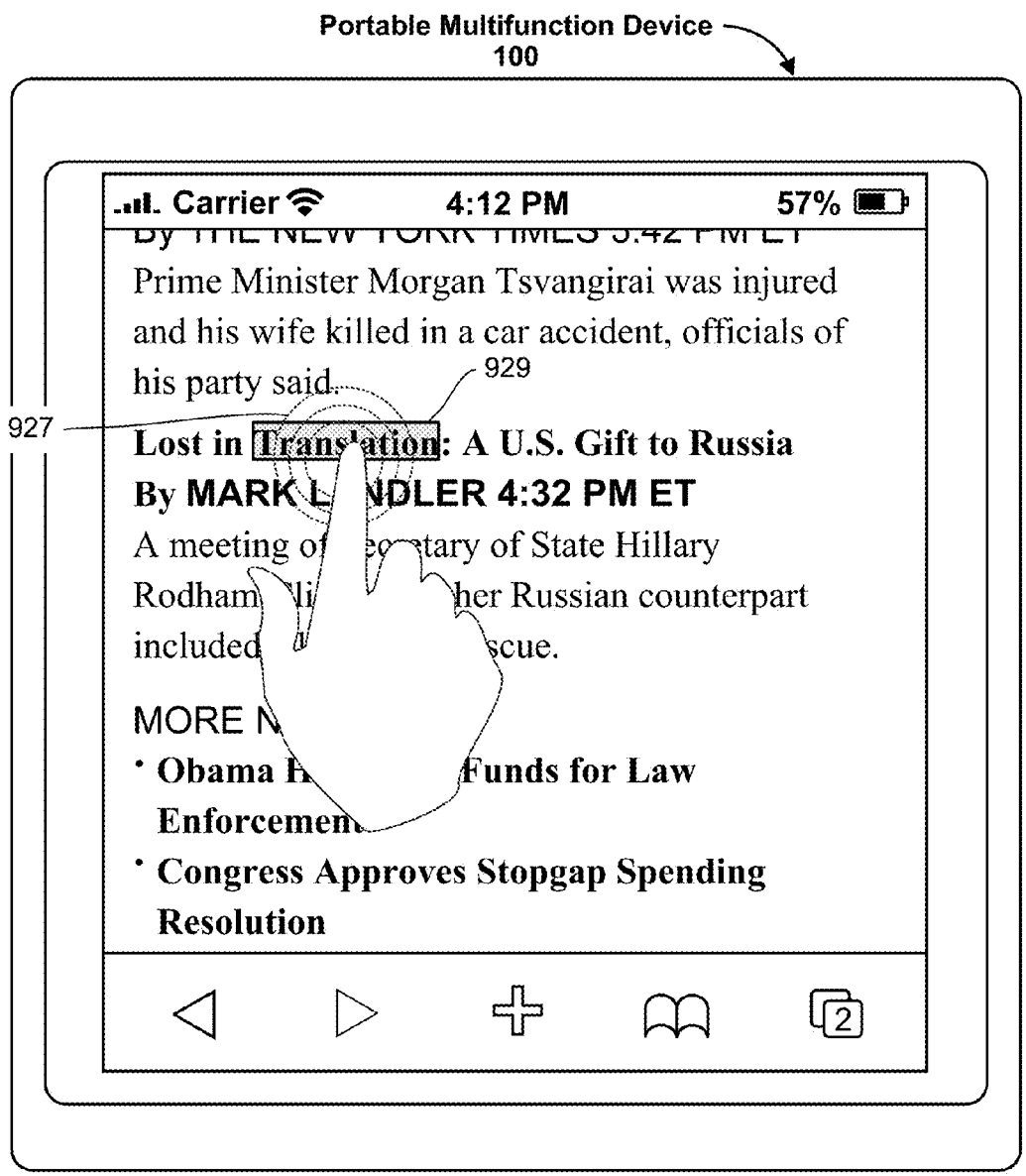
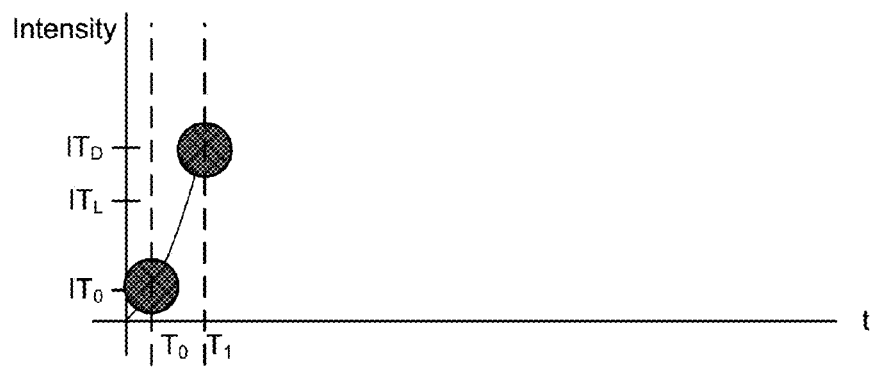
Figure 9Z

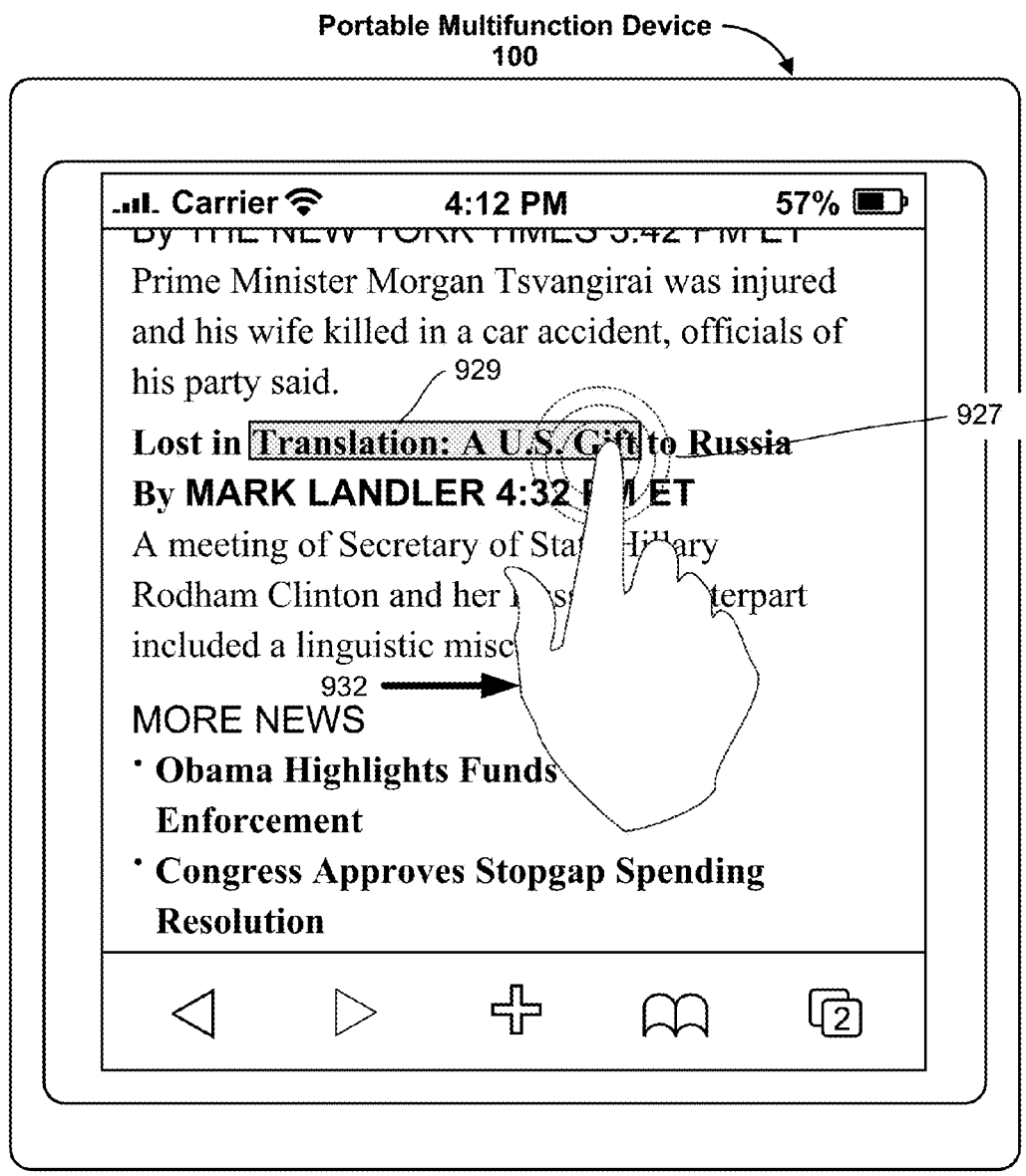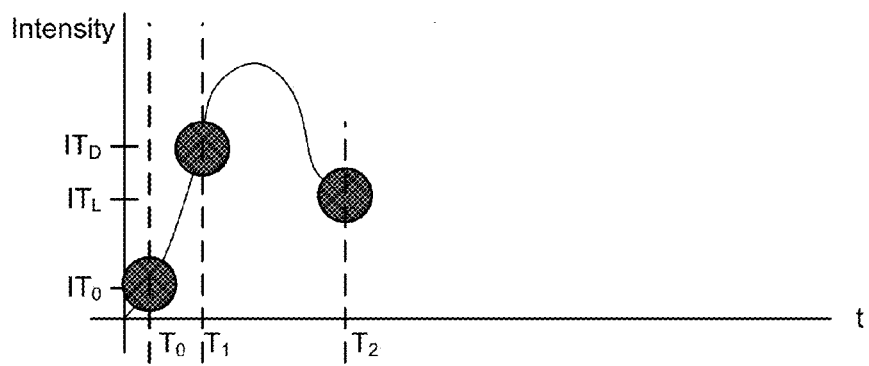
Figure 9AA

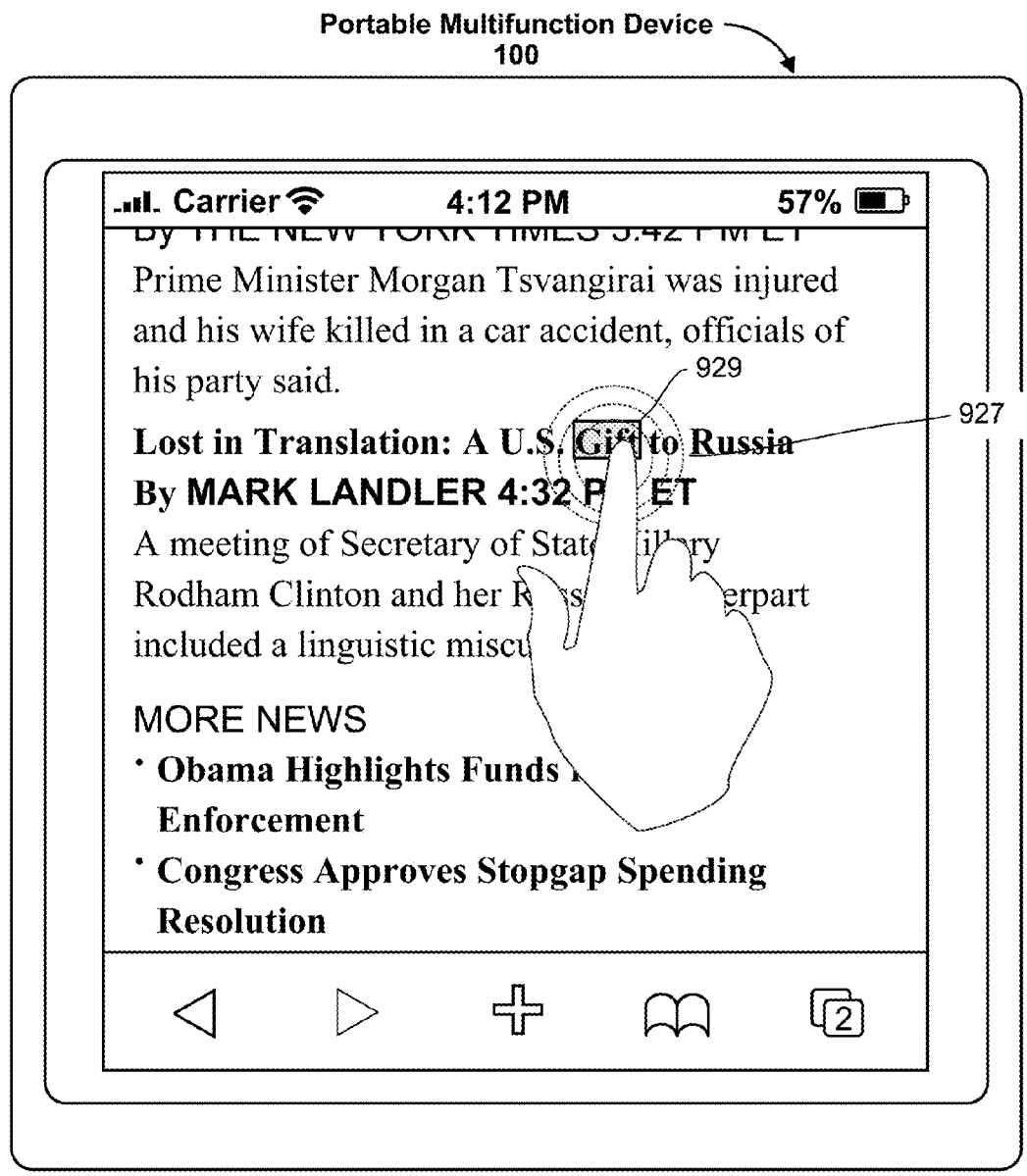
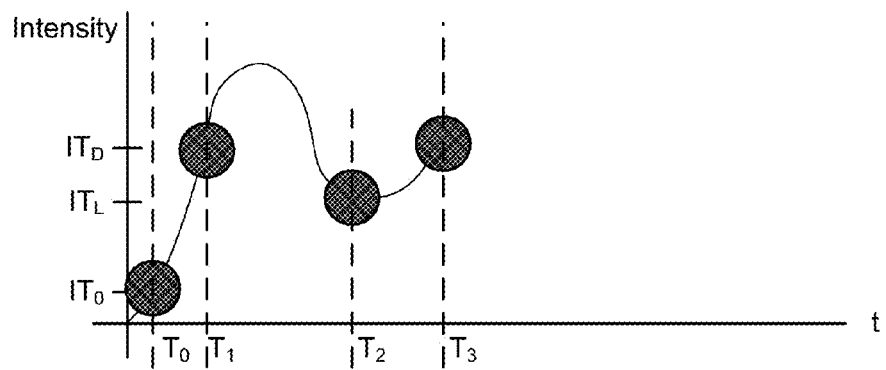
Figure 9AB

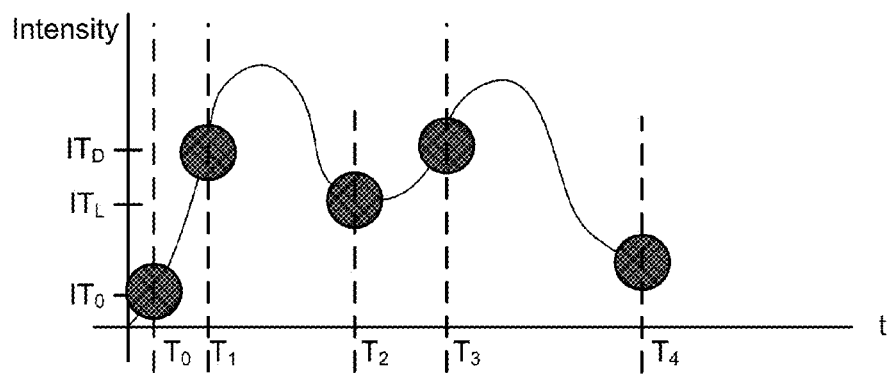
Figure 9AC

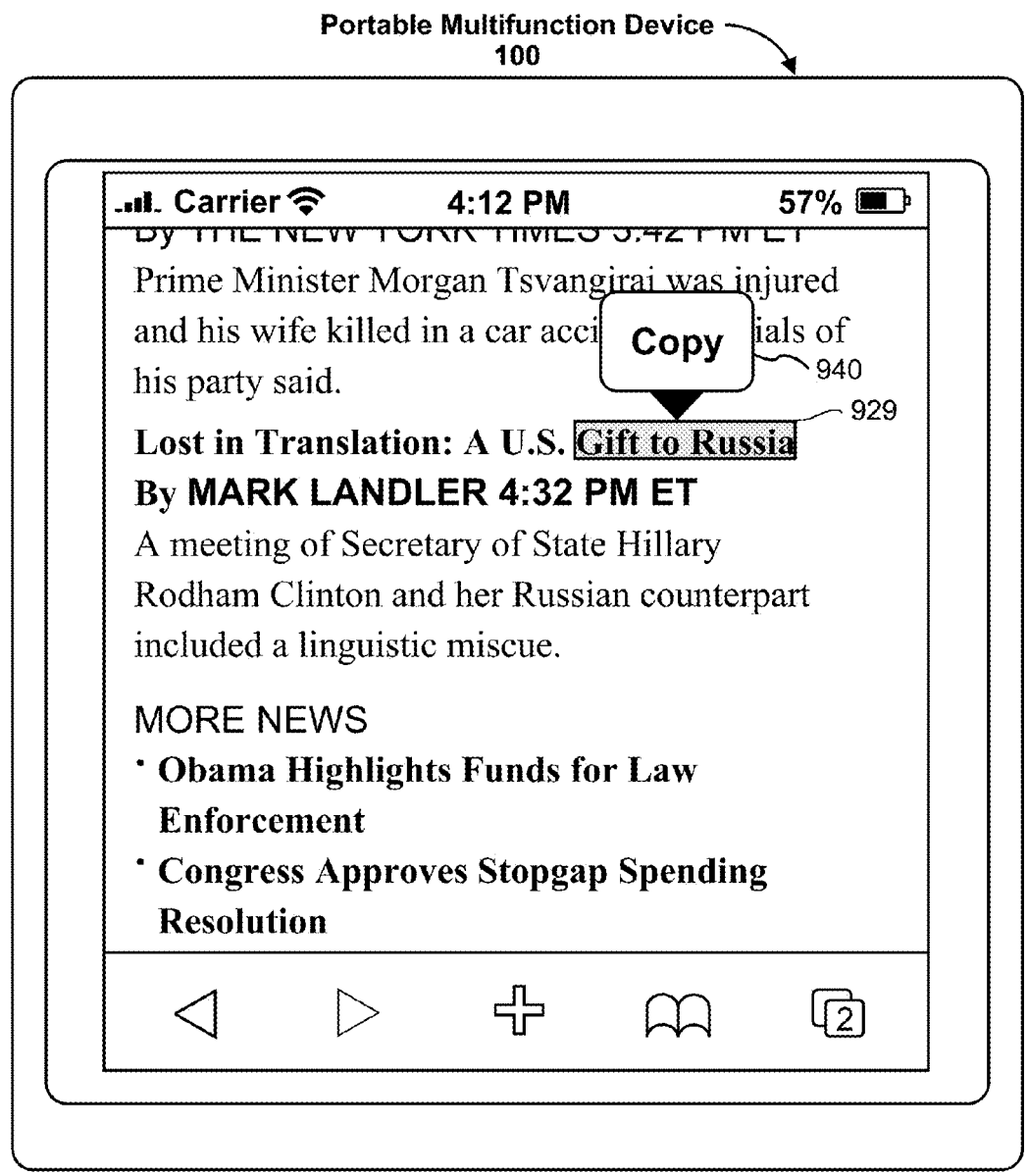
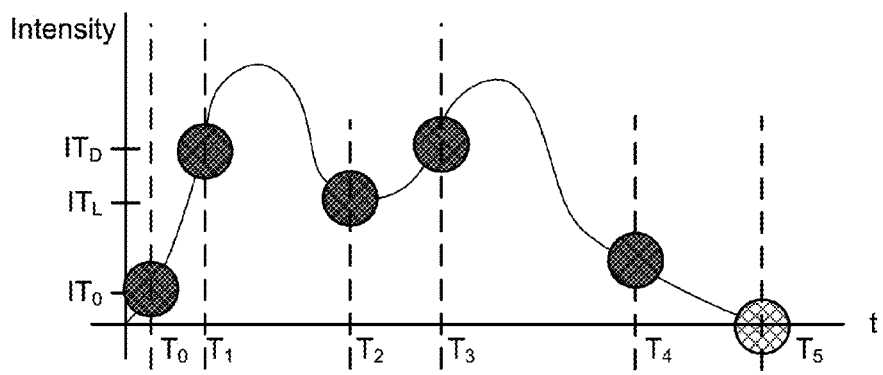
Figure 9AD

1000

```
In accordance with the determination that the touch input satisfies the one
or more criteria for entering the text selection mode: visually obscure keys      1018
                        on the onscreen keyboard Visually obscuring the keys on the onscreen keyboard includes              1020
              applying a blurring effect to the onscreen keyboard Visually obscuring the keys on the onscreen keyboard includes              1022
         transforming the onscreen keyboard into an onscreen touchpad Visually obscuring the keys on the onscreen keyboard includes              1024
      making the onscreen keyboard semitransparent to partially reveal
               content lying underneath the onscreen keyboard
```

At an electronic device having one or more processors, memory, and a touch-sensitive display:  1002

```
The second location is based on a location of an initial contact in the        1026
                              touch input; and
     the first location is a permitted insertion position in the content
              presentation region that is based on the second location
```

At an electronic device having one or more processors, memory, and a touch-sensitive display:  1002

```
    The first location is an insertion position at which the first cursor is   1028
    located when the touch input is determined to satisfy the one or more
              criteria for enter the text selection mode; and
       the second location is displaced from the first location by a
                          predetermined offset
```

| The device has one or more sensors to detect intensity of contacts with the touch-sensitive display, and in the text selection mode, detect a first local intensity peak in the touch input followed by a second local intensity peak in the touch input that both exceed a predetermined intensity threshold |  ─1076

| In response to detecting the first local intensity peak followed by the second local intensity peak that both exceed the predetermined intensity threshold, select a first predetermined unit of the text input according to a current location of the first cursor | ─1078

| After detecting the first local intensity peak followed by the second local intensity peak, detect a third consecutive local intensity peak in the touch input that exceeds the predetermined intensity threshold | ─1080

| In response to detecting the three consecutive local intensity peaks in the touch input that all exceed the predetermined deep press intensity threshold, select a second predetermined unit (e.g., a sentence) of the text input that is larger than and includes the first predetermined unit (e.g., a word) of the text input | ─1082

In response to detecting the first press input by the contact followed by movement of the contact across the touch-sensitive surface: display at least the portion of the text selection indicator at the second location within the content — 1116

In response to detecting the second press input by the contact on the touch-sensitive surface, perform a text selection operation, associated with the content between the first location and the second location, in accordance with the second press input, wherein the first press input, the movement across the touch-sensitive surface, and the second press input is performed by a single continuous contact with the touch-sensitive surface — 1114

The text selection operation includes stopping selection of content at the second location and maintaining selection of the content between the first location and the second location — 1118

After detecting the second press input and while the content between the first location and the second location remains selected, (1) detect lift-off of the contact; and (2) in response to detecting the lift-off of the contact, display an action menu — 1120

| After detecting the second press input by the contact on the touch-sensitive surface and stopping the selection of the content at the second location, (1) detect further movement of the contact; and (2) in response to detecting the further movement of the contact, display at least a portion of the text selection indicator at a third location within the content | 1124 |

| In response to detecting the further movement of the contact, cancel selection of content between the first location and the second location without selecting content between the second location and the third location | 1126 |

In response to detecting the second press input by the contact on the touch-sensitive surface, perform a text selection operation, associated with the content between the first location and the second location, in accordance with the second press input, wherein the first press input, the movement across the touch-sensitive surface, and the second press input is performed by a single continuous contact with the touch-sensitive surface — 1114

| The text selection operation includes cancelling selection of content between the first location and the second location | 1128 |

| After detecting the second press input by the contact on the touch-sensitive surface and canceling the selection of content between the first location and the second location, (1) detect further movement of the contact; and (2) in response to detecting the further movement of the contact, select content between the second location and a third location | 1130 |

| While the content between the second location and the third location is selected, (1) detect lift-off of the contact; and (2) in response to detecting the lift-off of the contact while the content between the second location and the third location is selected, stop selection of the content at the third location and maintain selection of the content between the second location and the third location | 1132 |

- - - - - - - - - - - - - - - - - - - - - - - - - - -
Before displaying the text selection indicator at the first location within the content, (1) detect an initial press input by the contact on the touch-sensitive surface; and (2) in response to detecting the initial press input, display the text selection indicator at an initial location within the content that corresponds to a location of the initial press input on the touch-sensitive surface ⟋1134

- - - - - - - - - - - - - - - - - - - - - - - - - - -
The initial press input is detected at a location on the touch-sensitive surface that corresponds to a location of the content on the display ⟋1136

- - - - - - - - - - - - - - - - - - - - - - - - - - -
The display is a touch-sensitive display that includes the touch-sensitive surface. Concurrently display, on the touch-sensitive display, the content and an onscreen keyboard, wherein the initial press input is detected on the onscreen keyboard ⟋1138

- - - - - - - - - - - - - - - - - - - - - - - - - - -
The display is a touch-sensitive display that includes the touch-sensitive surface, and concurrently display, on the touch-sensitive display, the content and an onscreen keyboard ⟋1140

- - - - - - - - - - - - - - - - - - - - - - - - - - -
Before displaying the text selection indicator at the first location within the content, (1) detect a multi-contact drag input on the onscreen keyboard; and, (2) in response to detecting the multi-contact drag input on the onscreen keyboard, display the text selection indicator at an initial location within the content based on a location of the multi-contact drag input on the onscreen keyboard ⟋1142

At an electronic device having one or more processors, memory, a touch-sensitive surface, a display, and one or more sensors to detect intensity of contacts with the touch-sensitive surface: ⟋ 1102

(G)

The content includes editable content and the text selection indicator includes a cursor ⟋ 1144

Display a magnifying loupe that displays a magnified version of the cursor and a region surround the cursor ⟋ 1146

Selecting the content between the first location and the second location includes: (1) moving the cursor one character space at a time in response to detecting the movement of the contact across the touch-sensitive surface; and (2) selecting one additional character at a time in accordance with the movement of the cursor ⟋ 1148

At an electronic device having one or more processors, memory, a touch-sensitive surface, a display, and one or more sensors to detect intensity of contacts with the touch-sensitive surface: ⟋ 1102

(H)

The content includes read-only content and the text selection indicator includes a selection area.
Displaying the text selection indicator at the first location includes displaying a first word located at the first location within the selection area ⟋ 1150

Selecting the content between the first location and the second location includes: (1) expanding the selection area one word at a time in accordance with the movement of the contact across the touch-sensitive surface; and (2) selecting one additional word at a time in accordance with the expansion of the selection area ⟋ 1152

Display a magnify loupe that displays a magnified version of the selection area and a region surrounding the selection area ⟋ 1154

Figure 11E

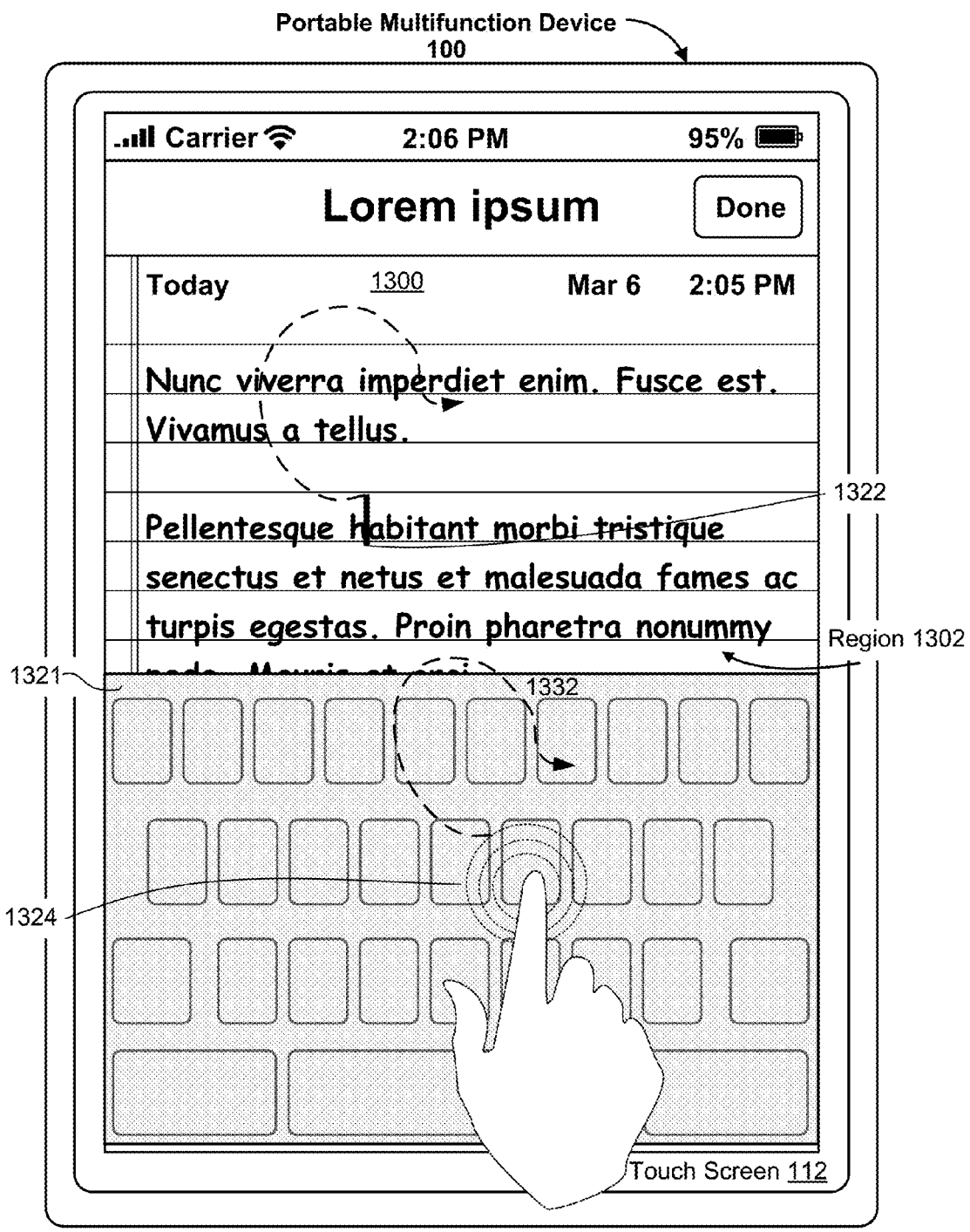
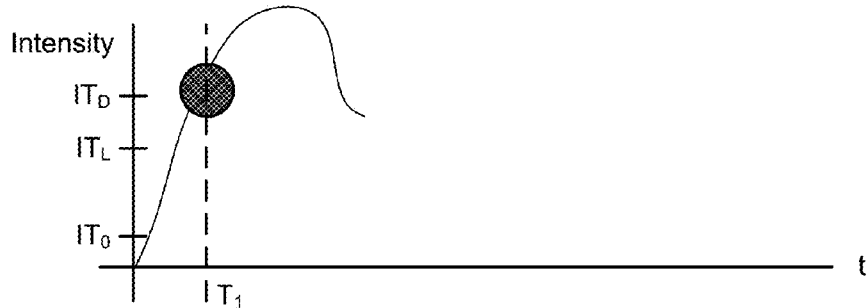
Figure 13B

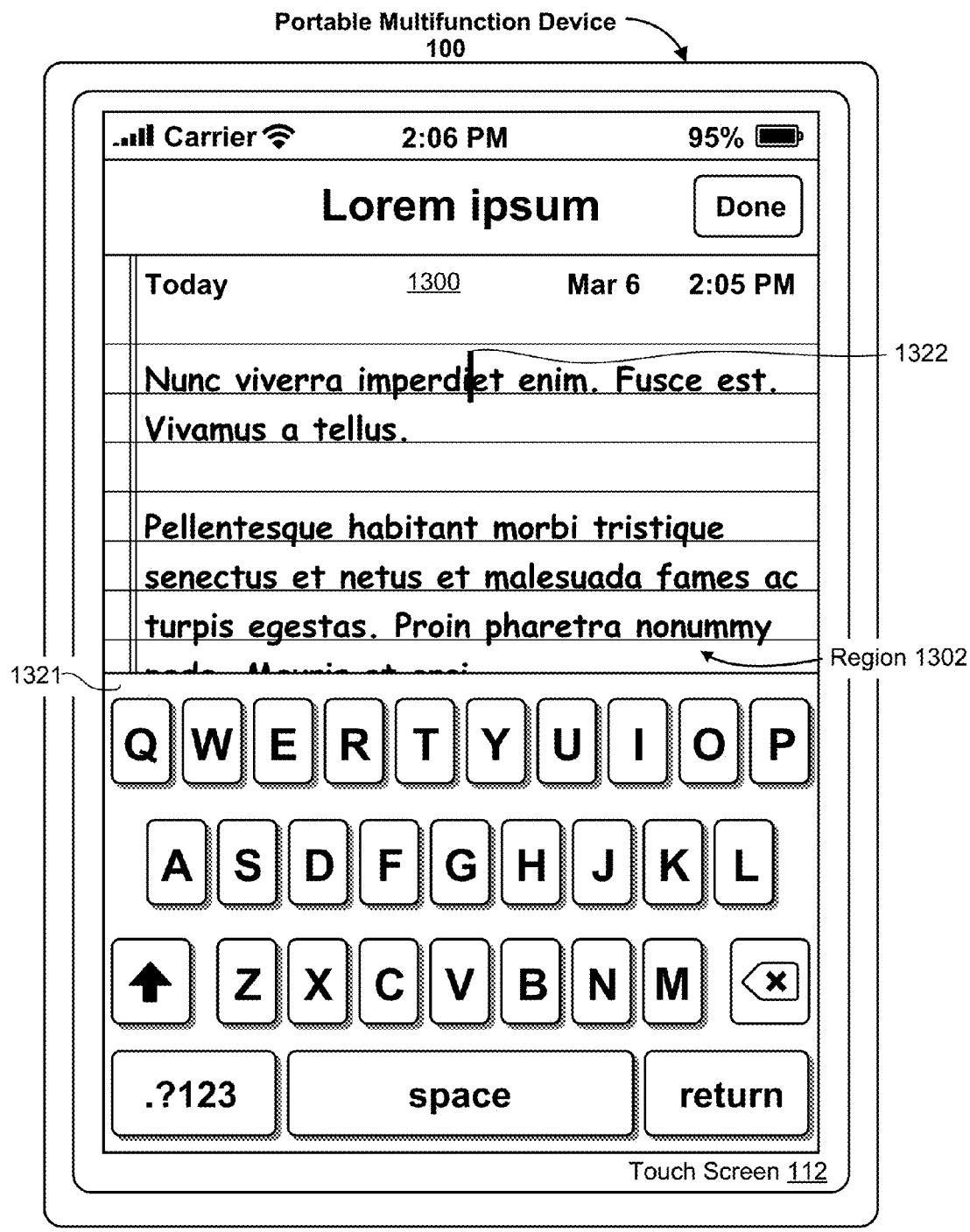
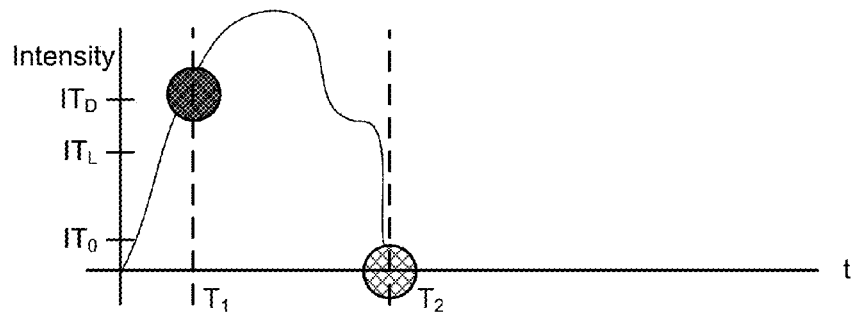
Figure 13C

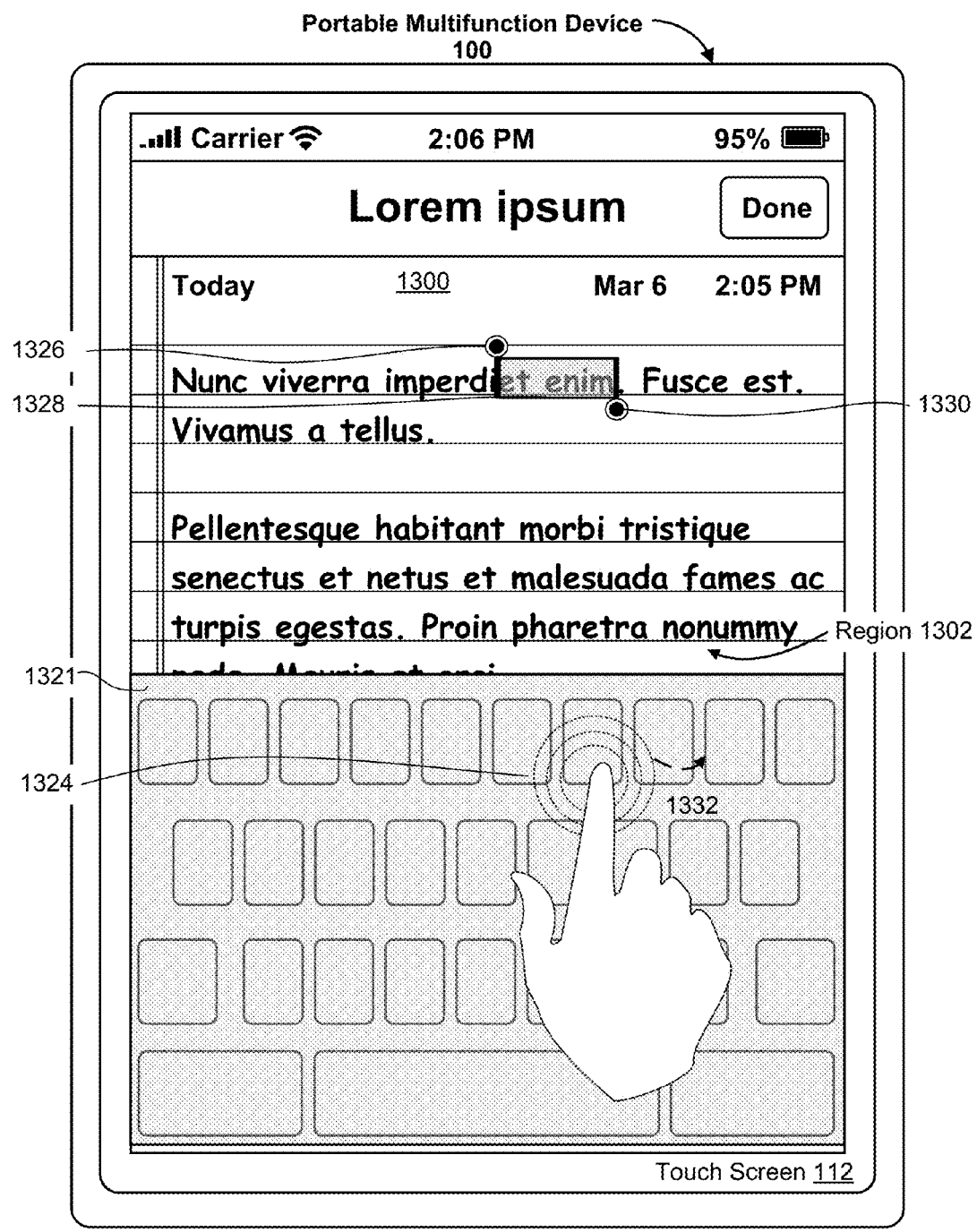
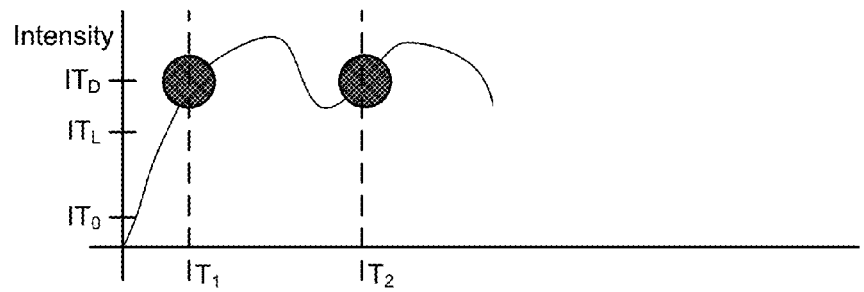
Figure 13D

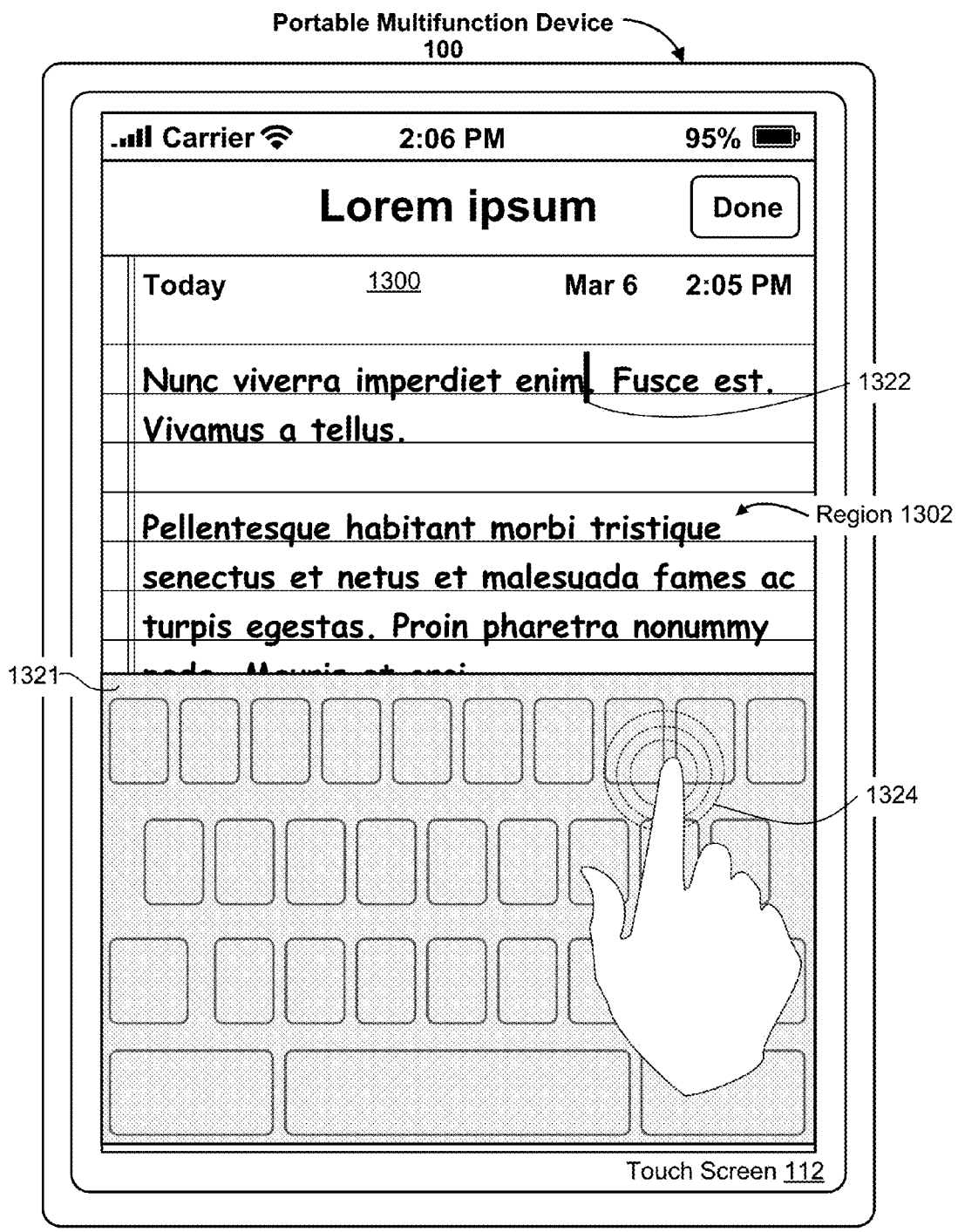
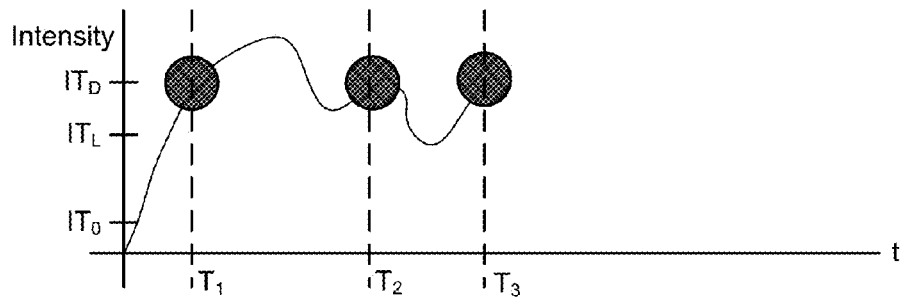
Figure 13F

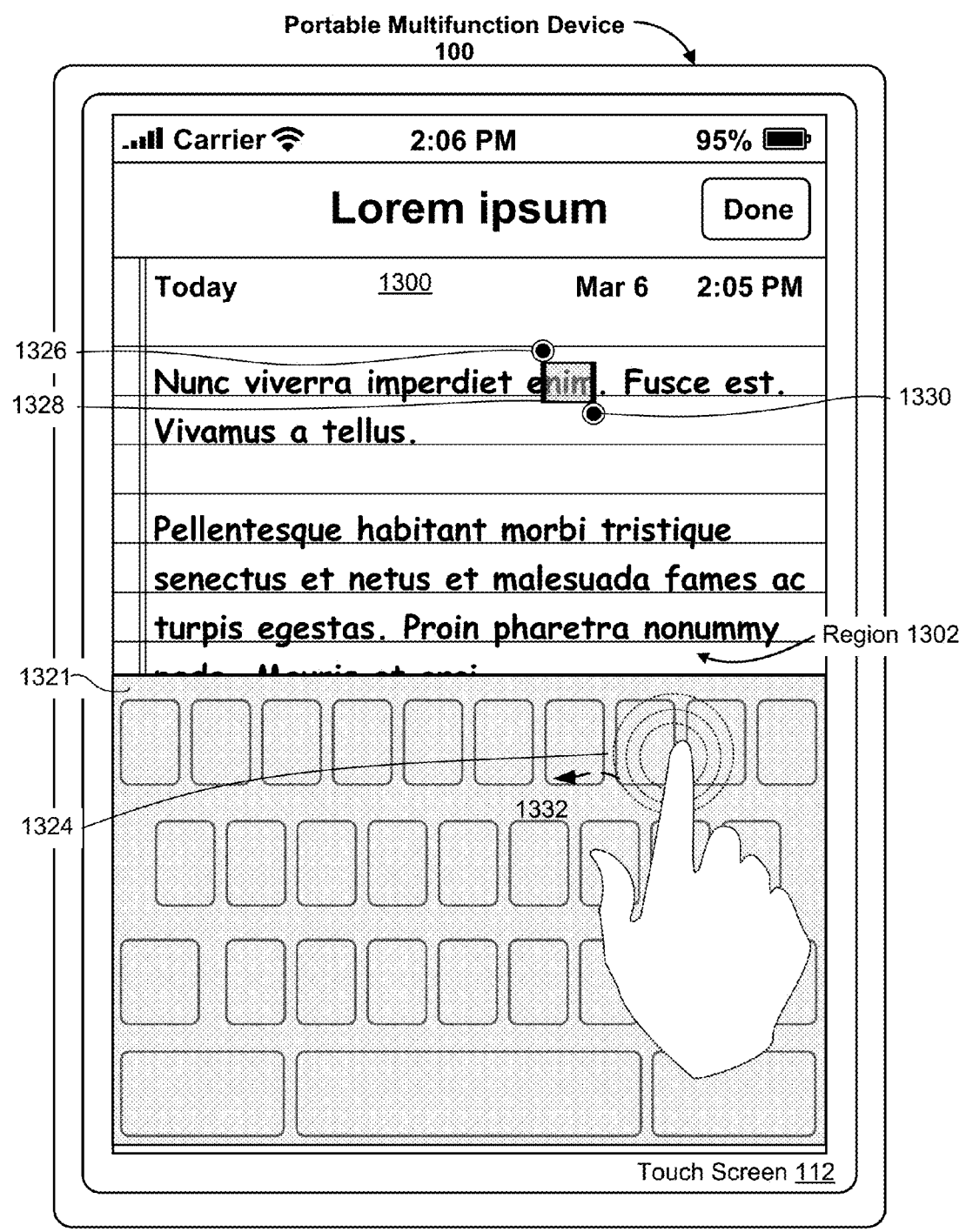
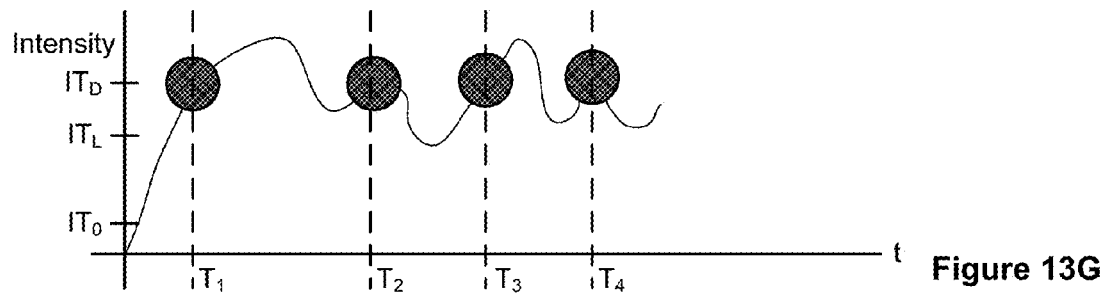
Figure 13G

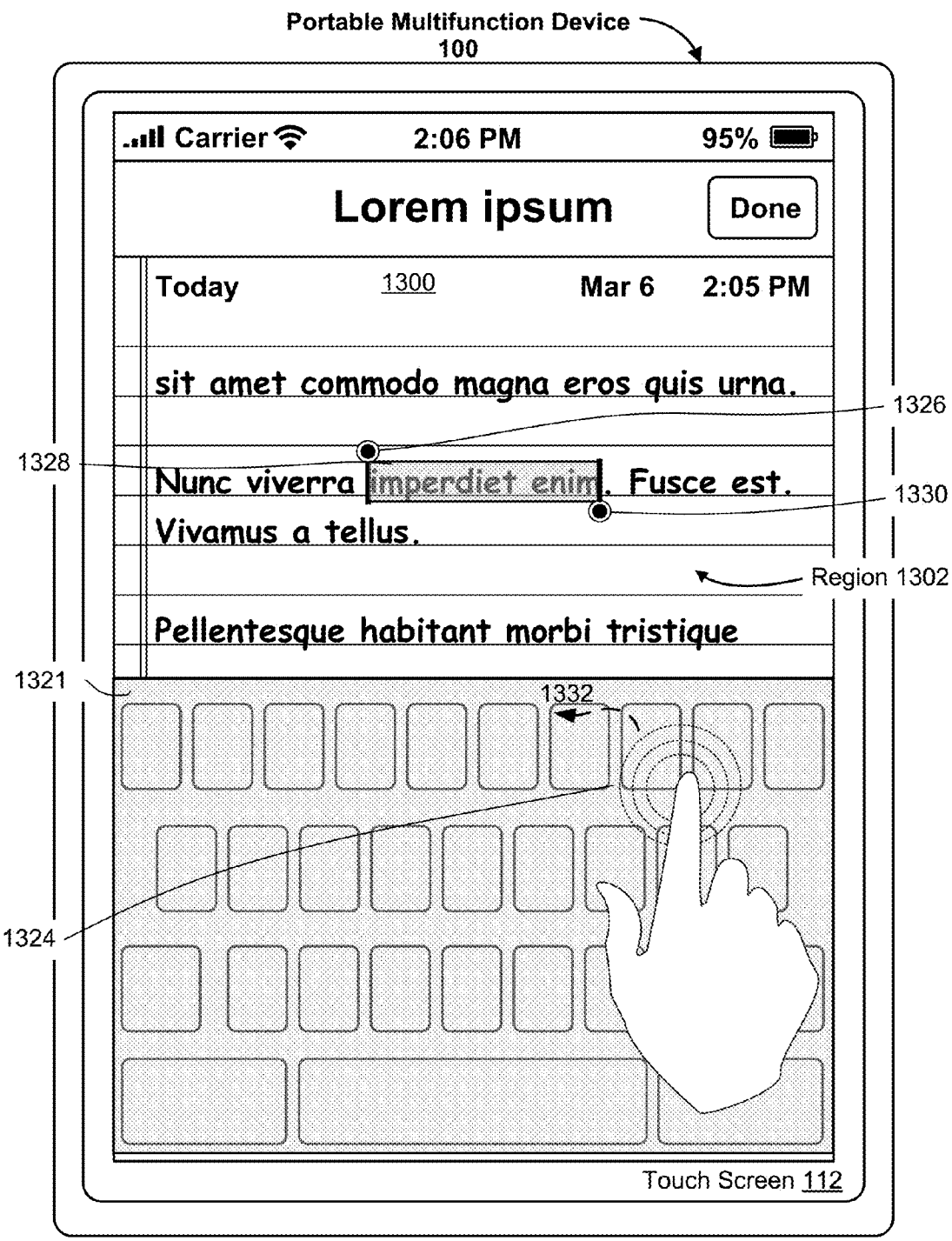
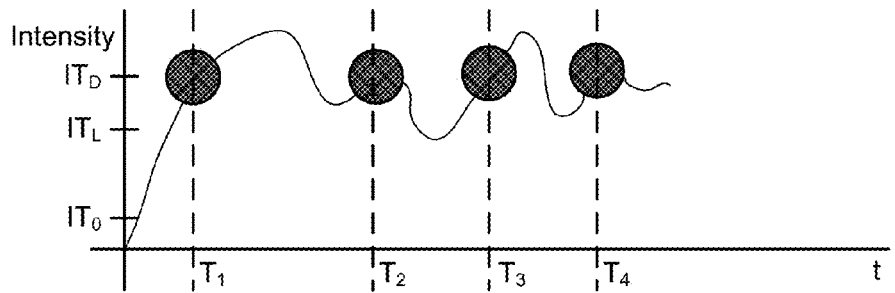
Figure 13J

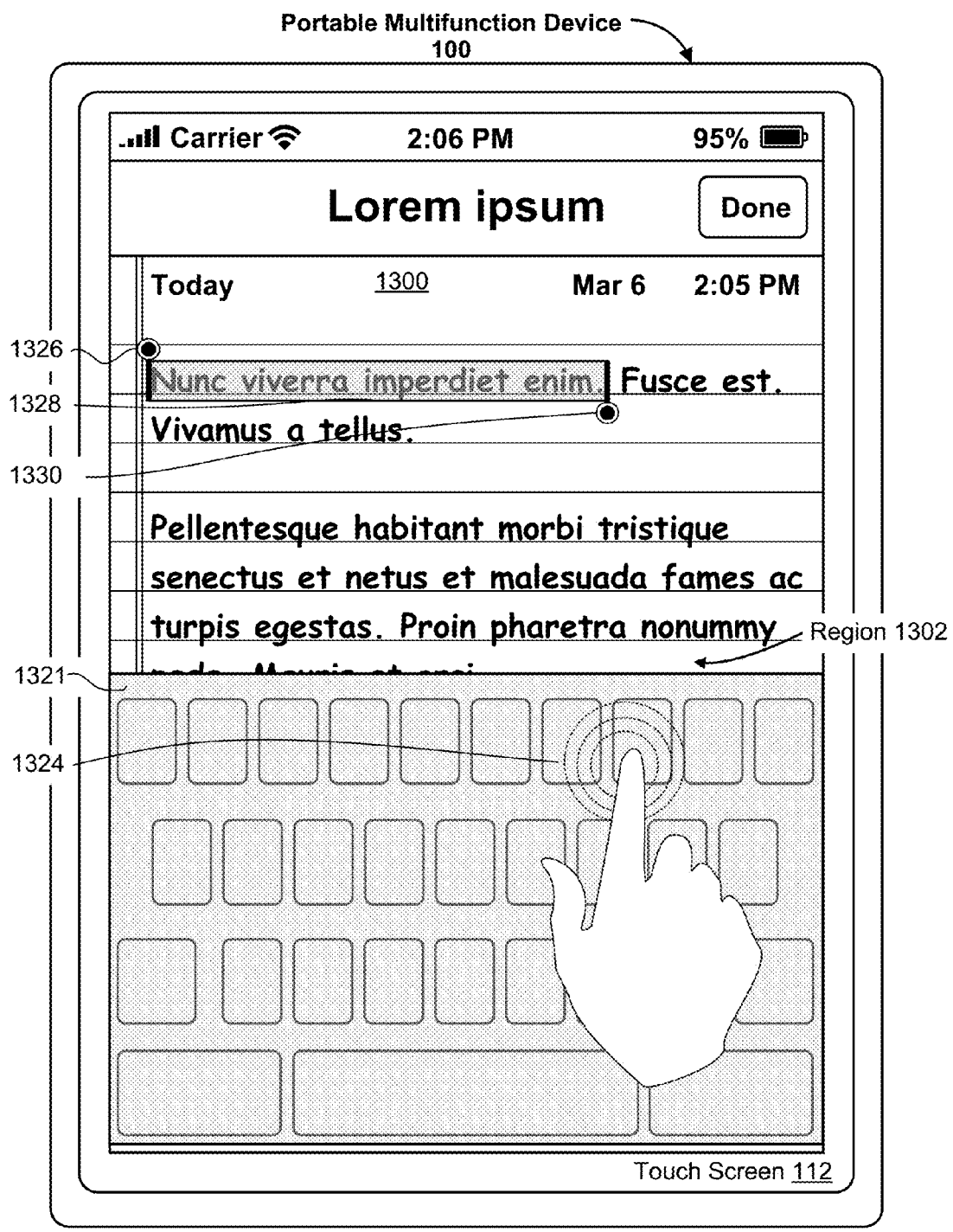
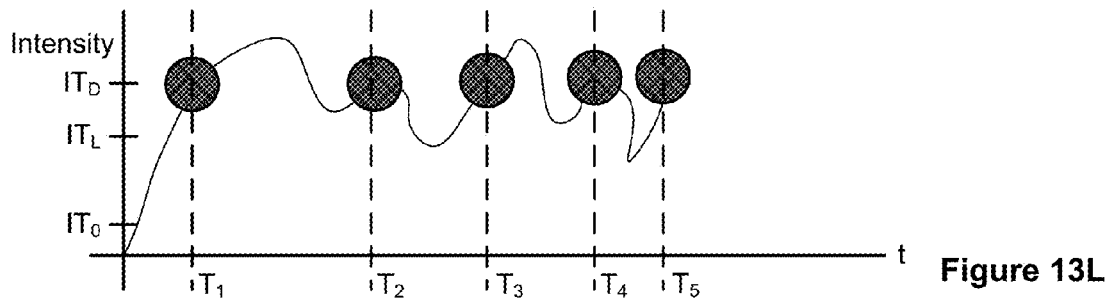
Figure 13L

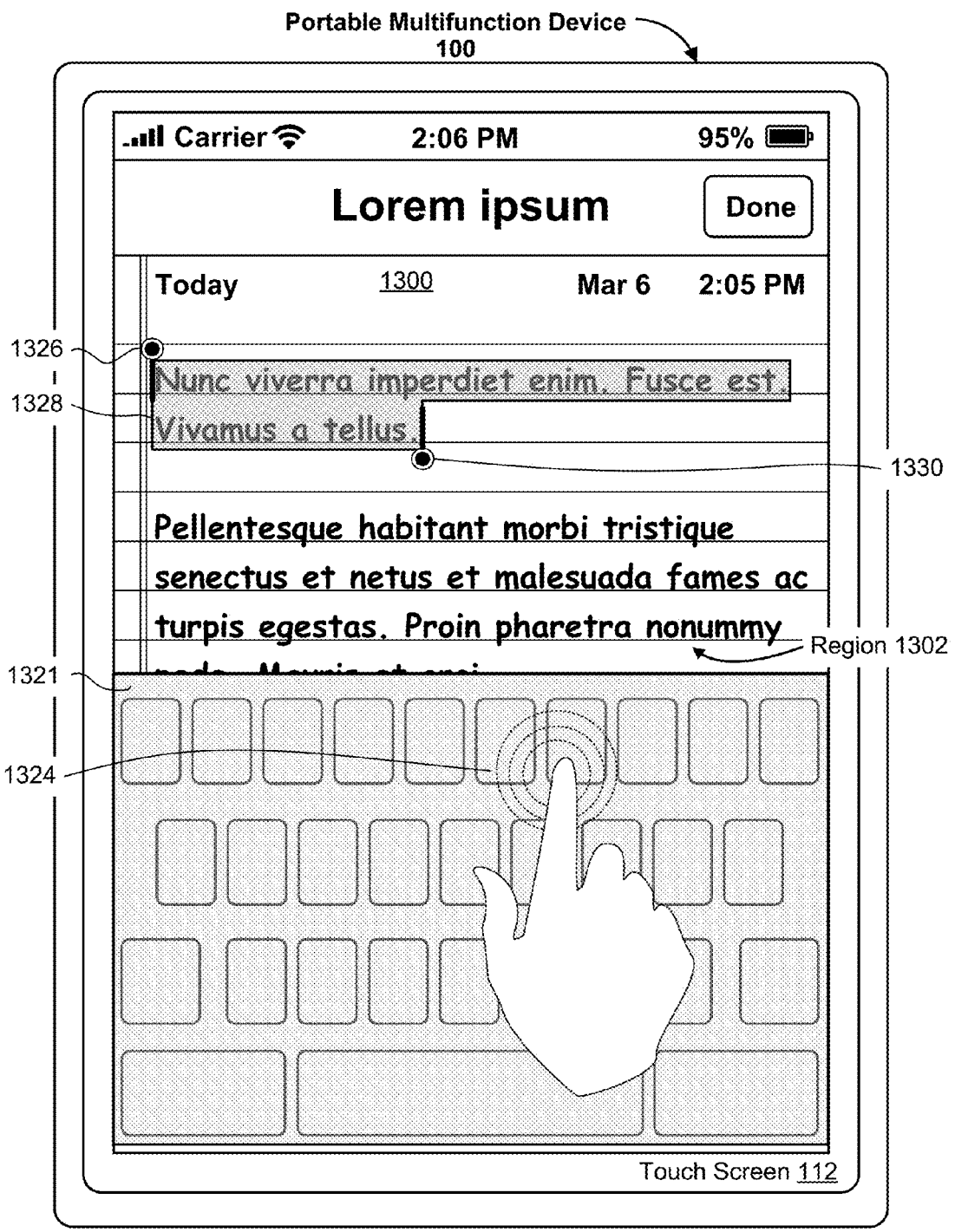
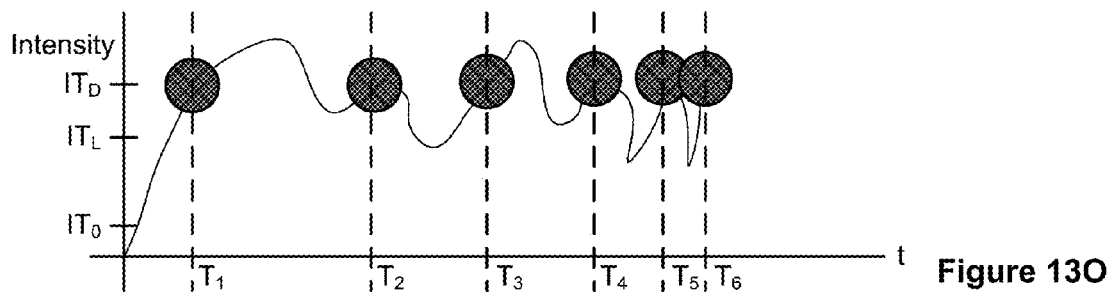
Figure 13O

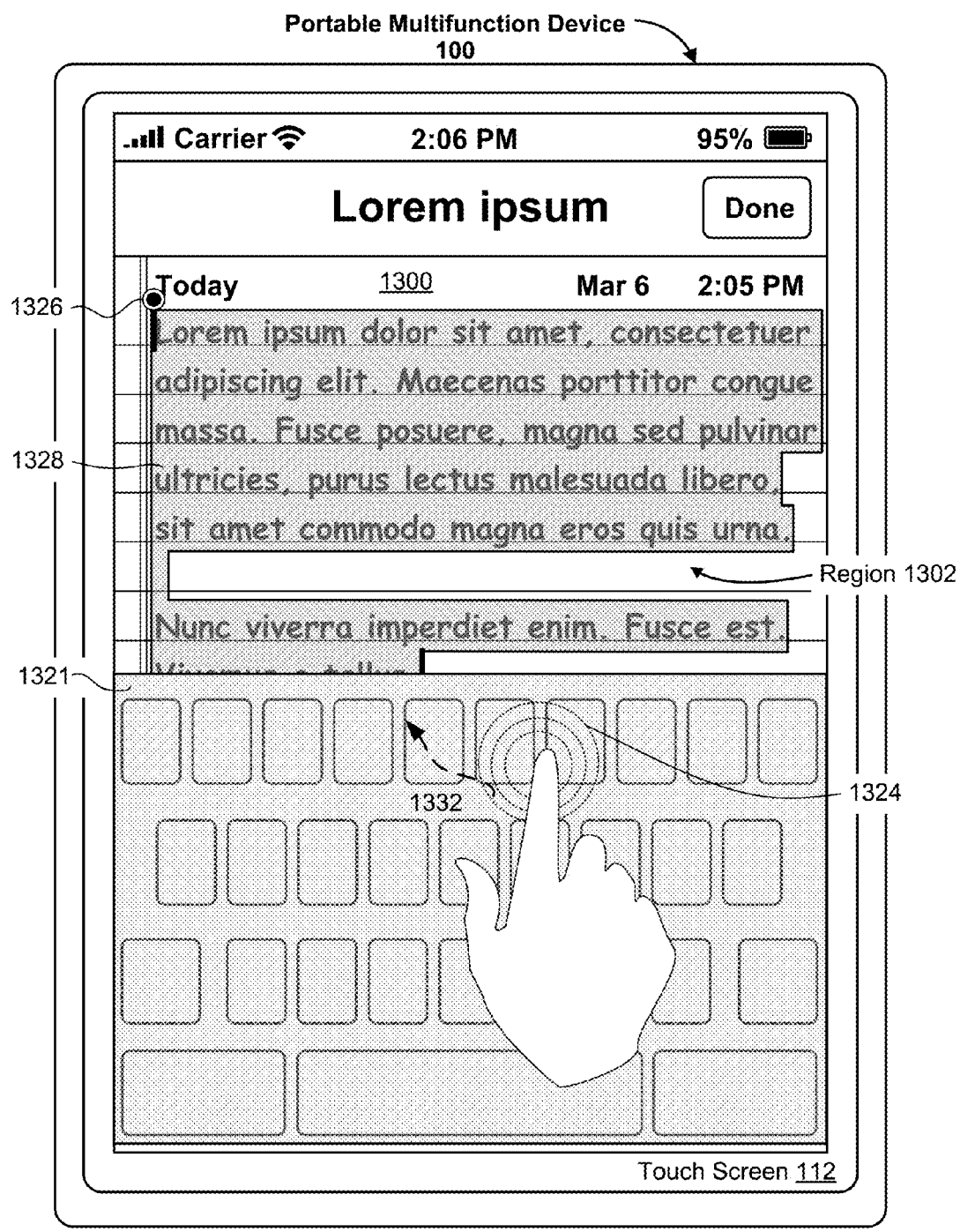
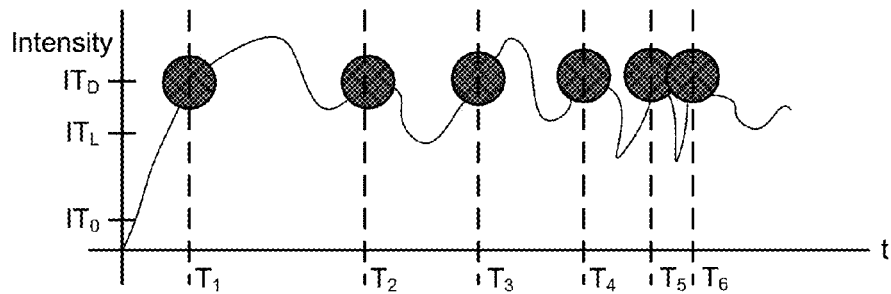
Figure 13P

1400

1402 Concurrently display an onscreen keyboard and a content presentation region on a touch-sensitive display. The content presentation region displays text input received from the onscreen keyboard.

1404 Detect a touch input on the onscreen keyboard displayed on the touch-sensitive display. Detect the touch input includes detect movement of a contact and liftoff of the contact.

1406 In response to detecting the touch input on the onscreen keyboard displayed on the touch-sensitive display:

1408 In accordance with a determination that the touch input satisfies text-selection criteria, the text-selection criteria include a criterion that is met when a characteristic intensity of the contact increases above a text-selection intensity threshold, perform a text selection operation based on the movement of the contact.

1410 The text-selection criteria include a criterion that is met when the contact does not move more than a threshold distance before detect an increase in the characteristic intensity of the contact above the text-selection intensity threshold.

1412 The text-selection operation includes one of: moving a cursor within the content region or selecting text within the content region.

1414 In accordance with a determination that the touch input satisfies text-entry criteria, the text-entry criteria include a criterion that is met when the characteristic intensity of the contact does not increase above the text-selection intensity threshold, enter text into the content presentation region based on the touch input.

1416 The text-entry criteria include a criterion that is met when the liftoff of the contact is detected while the contact is at a location of a character key of the onscreen keyboard.

1418 The text-entry criteria include a criterion that is met when the contact does not move outside of the onscreen keyboard before liftoff of the contact is detected.

1414 In accordance with a determination that the touch input satisfies text-entry criteria, the text-entry criteria include a criterion that is met when the characteristic intensity of the contact does not increase above the text-selection intensity threshold, enter text into the content presentation region based on the touch input.

(A)

| 1420 Enter the text into the content region includes enter a character that corresponds to character key at a location at which touchdown of the contact was detected on the onscreen keyboard.

| 1422 Enter the text into the content region includes enter a character that corresponds to character key at a location at which liftoff of the contact was detected on the onscreen keyboard.

(B)

| 1424 In response to detecting that the text-selection criteria have been met, generate a tactile output that is indicative of an entry into a text selection mode of operation.

(C)

| 1426 In response to detecting that the text-selection criteria have been met, change an appearance of the onscreen keyboard to indicate that the device is operating in a text selection mode of operation. Change the appearance of the onscreen keyboard includes obscure an appearance of characters on keys of the onscreen keyboard.

| 1428 End the text selection mode of operation and, in conjunction with the end of the text selection mode of operation, reverse the change in appearance of the onscreen keyboard to reveal the characters on the keys of the onscreen keyboard.

1430 When the touch input satisfies the text-selection criteria, detect movement of the contact after the touch input has satisfied the text-selection criteria and move a cursor in the content region in accordance with the movement of the contact detected after the touch input has satisfied the text-selection criteria.

1432 When the touch input satisfies the text-selection criteria, detect a first subsequent change in the characteristic intensity of the contact followed by additional movement of the contact on the touch-sensitive display.

1434 In response to detecting the first subsequent change in the characteristic intensity of the contact:

1436 In accordance with a determination that the touch input satisfies selection-start criteria, the selection-start criteria include a criterion that is met when the characteristic intensity of the contact increases above a selection-start intensity threshold, start to select content in the content region at a location of a cursor in accordance with the additional movement of the contact; and in accordance with a determination that the touch input does not satisfy the selection-start criteria, move the cursor in accordance with the additional movement of the contact without starting to select content in the content region.

1438 When the touch input satisfies selection-start criteria, after starting to select content in the content region, detect liftoff of the contact from the touch-sensitive display and confirm the selection in response to detecting the liftoff of the contact.

---
1440 When the touch input satisfies selection-start criteria, after starting to select content in the content region, and while continuing to detect the contact on the touch-sensitive display, detect a second subsequent change in intensity of the contact.
---

---
1442 In response to detecting the second subsequent change in the characteristic intensity of the contact:

---
1444 In accordance with a determination that the second subsequent change in the characteristic intensity of the contact satisfies selection-cancellation criteria, the selection-cancellation criteria include a criterion that is met when the characteristic intensity of the contact increases above a selection-cancellation intensity threshold, cancel the selection; and in accordance with a determination that the second subsequent change in the characteristic intensity of the contact does not satisfy the selection-cancellation criteria, maintain the selection.
---

---
1446 The selection-cancellation criterion include a criterion that is met when the contact moves no more than a threshold distance within a threshold amount of time before the characteristic intensity of the contact increases above the selection-cancellation intensity threshold.
---
---

(G)

---
1448 In response to detecting that the selection-cancellation criteria have been met, generate a tactile output that is indicative of an exit from the text selection mode of operation.
---

---
1450 After cancelling the selection, and while continuing to detect the contact on the touch-sensitive display, detect a third subsequent change in the characteristic intensity of the contact.

---

1452 In response to detecting the third subsequent change in the characteristic intensity of the contact:

1454 In accordance with a determination that the touch input satisfies the selection-start criteria, start to select content in the content region at a location of the cursor; and in accordance with a determination that the touch input does not satisfy the selection-start criteria, forgo starting to select content in the content region.

1456 Start to select content in response to detecting the third subsequent change in the characteristic intensity of the contact includes select a respective word at the location of the cursor.

  

1458 The selected respective word is a first word. While the first word is selected, detect first subsequent movement of the contact; and in response to detecting the first subsequent movement of the contact while the first word is selected: in accordance with a determination that the touch input meets selection-movement criteria which includes a movement criterion that is met when the contact moves more than a respective threshold amount : cancel selection of the first word; and select a second word that is adjacent to the first word in a first direction in accordance with the first subsequent movement of the contact, such that the selected respective word is the second word.

1460 While the respective word is selected, detect first subsequent movement of the contact; and in response to detecting the first subsequent movement of the contact while the respective word is selected: in accordance with a determination that the touch input meets selection-expansion criteria which includes a movement criterion that is met when the contact moves more than a respective threshold amount, expand the selection to include a word that is adjacent to the respective word in a first direction in accordance with the first subsequent movement of the contact.

1462 While the respective word is selected, detect a fourth subsequent change in the characteristic intensity of the contact above a respective intensity threshold; and, in response to detecting the fourth subsequent change in the characteristic intensity of the contact, in accordance with a determination that the touch input meets the selection-cancellation criteria, which includes a criterion that is met when the amount of time between when the third subsequent change in the characteristic intensity of the contact is detected and when the fourth subsequent change in the characteristic intensity of the contact is detected is greater than the delay threshold, cancel selection of the respective word.

1464 While the respective word is selected, detecting a fourth subsequent change in the characteristic intensity of the contact above a respective intensity threshold (e.g., the selection-start intensity threshold); and, in response to detecting the fourth subsequent change in the characteristic intensity of the contact, in accordance with a determination that the touch input meets sentence-selection criteria which include a movement criterion that is met when the contact moves less than a threshold amount within a threshold time period before the fourth subsequent change in intensity of the contact was detected and a time criterion that is met when an amount of time between when the third subsequent change in the characteristic intensity of the contact is detected and when the fourth subsequent change in the characteristic intensity of the contact is detected is less than a delay threshold, expand the selection to include the respective sentence that contains the respective word.

 

1466 While the respective sentence is selected, detect second subsequent movement of the contact; and in response to detecting the second subsequent movement of the contact while the respective sentence is selected: in accordance with a determination that the touch input meets selection-expansion criteria which includes a movement criterion that is met when the contact moves more than a respective threshold amount, expand the selection to include a sentence that is adjacent to the respective sentence in a first direction in accordance with the second subsequent movement of the contact.

1468 The respective sentence is selected in response to the fourth subsequent change in the characteristic intensity of the contact. While the respective sentence is selected: detect a fifth subsequent change in the characteristic intensity of the contact above the respective intensity threshold; and, in response to detecting the fifth subsequent change in the characteristic intensity of the contact, in accordance with a determination that the touch input meets the selection-cancellation criteria, which includes a criterion that is met when the amount of time between when the fourth subsequent change in the characteristic intensity of the contact is detected and when the fifth subsequent change in the characteristic intensity of the contact is detected is greater than the delay threshold, cancel selection of the respective sentence.

1470 In response to detecting the fifth subsequent change in the characteristic intensity of the contact, in accordance with a determination that the touch input meets paragraph-selection criteria which include a movement criterion that is met when the contact moves less than the threshold amount within the threshold time period before the fifth subsequent change in intensity of the contact was detected and a time criterion that is met when an amount of time between when the fourth subsequent change in the characteristic intensity of the contact is detected and when the fifth subsequent change in the characteristic intensity of the contact is detected is less than the delay threshold, expand the selection to include the respective paragraph that contains the respective sentence.

1472 While the respective paragraph is selected, detect third subsequent movement of the contact; and in response to detecting the third subsequent movement of the contact while the respective paragraph is selected: in accordance with a determination that the touch input meets selection-expansion criteria which includes a movement criterion that is met when the contact moves more than a respective threshold amount, expand the selection to include a paragraph that is adjacent to the respective paragraph in a first direction in accordance with the third subsequent movement of the contact.

1474 The respective paragraph is selected in response to the fifth subsequent change in the characteristic intensity of the contact. While the respective paragraph is selected: detect a sixth subsequent change in the characteristic intensity of the contact above the respective intensity threshold; and, in response to detecting the sixth subsequent change in the characteristic intensity of the contact, in accordance with a determination that the touch input meets selection-cancellation criteria, which includes a criterion that is met when the amount of time between when the fifth subsequent change in the characteristic intensity of the contact is detected and when the sixth subsequent change in the characteristic intensity of the contact is detected is greater than the delay threshold, cancel selection of the respective paragraph.

1476 In response to detecting the sixth subsequent change in the characteristic intensity of the contact, in accordance with a determination that the touch input meets document selection criteria which include a movement criterion that is met when the contact moves less than the threshold amount within the threshold time period before the sixth subsequent change in intensity of the contact was detected and a time criterion that is met when an amount of time between when the fifth subsequent change in the characteristic intensity of the contact is detected and when the sixth subsequent change in the characteristic intensity of the contact is detected is less than the delay threshold, expand the selection to include the respective document that contains the respective paragraph.

Figure 14H

TOUCH INPUT CURSOR MANIPULATION

RELATED APPLICATIONS

This application claims priority to U.S. Provisional Patent Application Ser. No. 62/135,619, filed Mar. 19, 2015, entitled "Touch Input Cursor Manipulation," U.S. Provisional Patent Application Ser. No. 62/172,162, filed Jun. 7, 2015, entitled "Touch Input Cursor Manipulation," U.S. Provisional Patent Application Ser. No. 62/213,593, filed Sep. 2, 2015, entitled "Touch Input Cursor Manipulation," and U.S. Provisional Patent Application Ser. No. 62/215,720, filed Sep. 8, 2015, entitled "Touch Input Cursor Manipulation". All of these applications are incorporated by reference herein in their entireties.

TECHNICAL FIELD

This disclosure relates generally to electronic devices with touch-sensitive surfaces, and in particular to cursor manipulation and content selection in an electronic document.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to review and edit electronic documents by manipulating a cursor within the electronic document presented on a display. These electronic documents are viewed or edited within applications having viewing and editing capabilities (e.g., drawing applications, presentation applications (e.g., Apple's KEYNOTE, or Microsoft's POWERPOINT), word processing applications (e.g., Apple's PAGES or Microsoft's WORD), website creation applications, spreadsheet applications (e.g., Apple's NUMBERS or Microsoft's EXCEL)).

Conventional cursor manipulation methods that require the use of a mouse, or other peripheral input mechanism, are relatively inefficient as they require the user to move one hand away from the keyboard to the mouse in order to make the selection. Similarly, conventional user interfaces provided on touch screen displays do not provide a simple and intuitive way to manipulate the cursor for content selection and editing. As such, it is desirable to provide a more efficient means for manipulating a cursor displayed in an electronic document presented on a touch screen display.

SUMMARY

Accordingly, there is a need for electronic devices with faster, more efficient methods and interfaces for cursor manipulation and content (e.g., text) selection. Such methods and interfaces optionally complement or replace conventional methods for cursor manipulation and content selection. Such methods and interfaces reduce the number, extent, and/or nature of the inputs from a user and produce a more efficient human-machine interface. For battery-operated devices, a more efficient input mechanism also requires less computing resources, thereby increasing battery life of the device.

In order to manipulate a cursor in a document on a conventional portable multifunction device, users often need to make finger contact with precise locations on a touch sensitive screen at the location of the cursor. This is often difficult and the user cannot see the precise location of the cursor under their finger.

The above deficiencies and other problems associated with user interfaces for electronic devices with touch-sensitive surfaces are addressed by the devices and methods described herein. The methods described herein allow a user manipulate a cursor and perform editing functions, such as text selection and moving a selection, from any part of the touch-sensitive surface. For example, a two-finger touch input can be detected anywhere on the touch screen, including over the keyboard. Users can greatly benefit from this for at least two reasons. First, the multi-finger gesture detection can be distinguished from a single-finger detection (e.g., single-finger taps), so that a single-finger contact or gesture at the keyboard can be reserved for other functions, e.g., text entry. Second, it allows for a more efficient user input because the user does not have to consider where the cursor gestures are being made (e.g., the user need not be concerned about inadvertent key activation) and can instead focus on the movement of the cursor.

In some embodiments, the device is portable (e.g., a notebook computer, tablet computer, or handheld device), while in other embodiments, the device is a desktop computer. The device has a touch-sensitive display (also known as a "touch screen" or "touch screen display"), and in some embodiments it also includes a touchpad.

In some embodiments, the device has a graphical user interface (GUI), one or more processors, memory and one or more modules, programs or sets of instructions stored in the memory for performing multiple functions. In some embodiments, the user interacts with the GUI primarily through touch inputs, including finger contacts and gestures, on the touch-sensitive surface. In some embodiments, the functions optionally include image reviewing, editing, drawing, presenting, word processing, website creation, authoring disks, spreadsheet creation or editing, playing games, using a telephone on the device, video-conferencing, e-mailing, instant messaging, digital photography or videography, web browsing, playing digital music or video, note taking, or the like. Executable instructions for performing these functions are, optionally, included in a non-transitory computer readable storage medium or other computer program product configured for execution by one or more processors.

In accordance with some embodiments, a method of cursor manipulation is performed at a portable multifunction device including one or more processors, memory, and a touch screen display. The method includes: displaying content of an electronic document on the display; displaying a cursor within the electronic document; detecting two substantially simultaneous touch inputs anywhere on the touch screen display; and in response to detecting the two substantially simultaneous touch inputs: selecting a portion of the content in the document closest to the cursor; and displaying the portion of the content as selected content.

In accordance with some embodiments, the method of cursor manipulation further includes: while the portion of the content is displayed as selected content, detecting an additional two substantially simultaneous touch inputs anywhere on the touch screen display; in response to detecting the additional two substantially simultaneous touch inputs, selecting a first expanded portion of the content that includes the portion of the content; and displaying the first expanded portion as selected content.

In accordance with some embodiments, the method of cursor manipulation further includes: while the first expanded portion of the content is displayed as selected content, detecting an additional two substantially simultaneous touch inputs on the touch screen display; in response to detecting the additional two substantially simultaneous touch inputs, selecting a second expanded portion of the content that includes the expanded portion of the content; and displaying the second expanded portion as selected content.

In accordance with some embodiments, the method of cursor manipulation further includes: while the second expanded portion of the content is displayed as selected content, detecting an additional two substantially simultaneous touch inputs on the touch screen display; in response to detecting the additional two substantially simultaneous touch inputs, selecting a third expanded portion of the content that includes the first expanded portion of the content; and displaying the third expanded portion as selected content.

In accordance with some embodiments, the content includes text and the portion of the content is a word located closest to the cursor in the text, the expanded portion is a sentence, the first expanded portion is a paragraph, and the second expanded cursor is a page.

In accordance with some embodiments, the content includes text and the portion of the content is a word located closest to the cursor.

In accordance with some embodiments, the method of cursor manipulation further includes: detecting lift-off of the two substantially simultaneous touch inputs from the touch screen display, followed by an additional two substantially simultaneous touch inputs anywhere on the touch screen display; detecting a continuous touch gesture from locations of the additional two substantially simultaneous touch inputs on the touch screen display to additional locations on the touch screen display; and in response to detecting the continuous touch gesture, expanding the selected content to include additional content beyond the portion in a direction of toward the additional locations.

In accordance with some embodiments, the method of cursor manipulation further includes: detecting a first touch input on the touch screen display at a first location within the expanded selected content; detecting, substantially simultaneous with the detection of the first touch input, a second touch input at a second location within the expanded selected content; and in response to detecting the first and second touch inputs, expanding the display of the selected content based on the selected content.

In accordance with some embodiments, the method further includes: upon determining that the two substantially simultaneous touch inputs remain in contact with the touch screen display, detecting a continuous touch gesture at least partially across the touch screen display from locations of the two substantially simultaneous touch inputs; in response to the gesture, expanding the selection of the content beyond the portion of the content in a direction of the gesture.

In accordance with some embodiments, the cursor is an insertion point.

In accordance with some embodiments, the method of cursor manipulation further includes: detecting an additional two substantially simultaneous touch inputs on the touch screen display at respective first and second locations within boundaries of the selected content; upon determining that the two substantially simultaneous touch inputs remain in contact with the touch screen display, detecting a continuous touch gesture across the touch screen display; in response to detecting a lift off of the continuous touch gesture, moving the selected content to a different location.

In accordance with some embodiments, the method of cursor manipulation further includes: prior to moving the selected content to the second location, displaying a ghost cursor offset from the selected content, wherein the ghost selection moves with the continuous touch gesture, wherein the different location is the location of the ghost cursor at the time of the lift off.

In accordance with some embodiments, a method of cursor manipulation is performed at a portable multifunction device including one or more processors, memory, and a touch screen display. The method includes: displaying content of an electronic document on the touch screen display; displaying a cursor at a current location within the content on the touch screen display; detecting two substantially simultaneous touch inputs at a first region on the touch screen display; upon determining that the two substantially simultaneous touch inputs remain in contact with the touch screen display, detecting a continuous touch gesture from a location of the two substantially simultaneous touch inputs across the touch screen display from the first region to a second region; and in response to detecting the continuous touch gesture: moving the cursor from the current location to a new location in a direction of the continuous touch gesture.

In accordance with some embodiments, a distance between the first region and the second region is substantially the same as a distance between the current location and the new location.

In accordance with some embodiments, the method further includes: while moving the cursor, displaying a ghost cursor offset from the cursor; and upon detecting a termination of the continuous touch gesture, placing the cursor at the location of the ghost cursor and ceasing the display of the ghost cursor.

In accordance with some embodiments, displaying the cursor at a current location includes displaying a selection of a portion of the content at the current location, moving the cursor from the current location to a new location in a direction of the continuous touch gesture includes: dismissing the selection and moving the cursor from the current location to the new location.

In accordance with some embodiments, a method of cursor manipulation is performed at a portable multifunction device including one or more processors, memory, and a touch screen display. The method includes: displaying text on the display; displaying a cursor at a line within the text; detecting a two-finger swipe gesture on the touch screen display in a direction at least partially parallel to the line and towards an edge of the touch screen display; and in response to detecting the two-finger swipe gesture moving the cursor to a distal point of the text. For example, an end or beginning of a line or a top or bottom of a page or document.

In accordance with some embodiments, the detecting requires that the two-finger swipe gesture be performed at a speed higher than a predetermined speed.

In accordance with some embodiments, the distal point of the text is at a location in the direction of the gesture. For example, an end or beginning of a line or a top or bottom of a page or document.

In accordance with some embodiments, moving the cursor to the distal point of the text includes moving the cursor to a beginning or an end of the line of the text or a beginning or an end of the text (e.g., the top or bottom of a document or page) in accordance with the direction of the two-finger swipe.

In accordance with some embodiments, a method of cursor manipulation is performed at a portable multifunction device including one or more processors, memory, and a touch screen display. The method includes: displaying content of an electronic document on the display; displaying a cursor within the electronic document; detecting a touch input on the touch screen display, wherein the touch input is located on a word within the content; and in response to detecting the touch input: selecting the word; and displaying a command display area adjacent to the selected word, wherein the second command display area includes an icon for cutting the selected word, an icon for copying the selected word, and an icon for pasting a previously selected content.

In accordance with some embodiments, a method of selection manipulation is performed at a portable multifunction device including one or more processors, memory, and a touch screen display. The method includes: displaying content of an electronic document on the display; displaying a selection of the content within the electronic document; detecting a single touch input on the touch screen display at a location over the selection; in response to detecting the single touch input at the location, displaying a set of options related to the selection; determining if the single touch input remains at the location for a predetermined amount of time followed by a continuous touch gesture away from the location on the touch screen display; and in response to detecting the single touch input remaining at the location for the predetermined amount of time followed by the continuous touch gesture away from the location, moving the selection to a different location in a direction of the continuous touch gesture.

In accordance with some embodiments, a method of selection manipulation is performed at a portable multifunction device including one or more processors, memory, and a touch screen display. The method includes: displaying content of an electronic document on the display; displaying a selection of the content within the electronic document; detecting three substantially simultaneous touch inputs at locations anywhere on the touch screen display; determining if the three substantially simultaneous touch inputs is followed by three continuous touch gestures away from the locations on the touch screen display; and in response to detecting the three continuous touch gestures, moving the selection to a different location in a direction of the continuous touch gestures.

In accordance with some embodiments, a method of cursor manipulation is performed at a portable multifunction device including one or more processors, memory, and a touch screen display. The method includes: displaying content of an electronic document on the touch screen display, the content includes at least one line of text comprising at least two words; detecting a touch input on the content; and in response to detecting the touch input: determining a distance of the touch input to a closest space between the two words within the electronic document; and in accordance with a determination that the distance is greater than a predetermined threshold distance, selecting a word within the electronic document closest to the touch input and displaying an indication of the selection.

In accordance with some embodiments, the method further places a cursor in the closest space after a preceding word when the distance is less than the predetermined threshold distance.

In accordance with some embodiments, the predetermined threshold distance is calculated based on the percentage of the size of the word closest to the touch input.

In accordance with some embodiments, the method further includes: while displaying the selection, detecting an additional touch input on the touch screen display at a location within the selection; and in response to detecting the additional touch input, dismissing the selection and placing a cursor adjacent to a word within the electronic document based on the location of the additional touch input relative to the closest space to this word.

In accordance with some embodiments, the method further includes: while displaying the selection, detecting an additional touch input on the touch screen display at a location within the selection; detecting, without breaking contact with the touch screen display following the additional touch input, a continuous touch gesture from a first location of the additional touch input on the touch screen display to a second location on the touch screen display; and in response to detecting the continuous touch gesture, expanding the selection to include additional content beyond the word in a direction towards the second location.

In accordance with some embodiments, the method further includes: detecting a double-tap touch input; in response to detecting the double-tap touch input, selecting a word closest to the double-tap touch input; and displaying an indication of the selection.

In accordance with some embodiments, the method further includes: detecting a double-tap touch input at a space between two words within the electronic document; in response to detecting the double-tap touch input, selecting the word closest to the double-tap touch input that follows the space; and displaying an indication of the selection.

In accordance with some embodiments, the method further includes: detecting a triple-tap touch input; in response to detecting the triple-tap touch input, selecting a sentence closest to the triple-tap touch input; and displaying an indication of the selection of the sentence.

In accordance with some embodiments, the method further includes: detecting a quadruple-tap touch input; in response to detecting the quadruple-tap touch input, selecting a paragraph closest to the quadruple-tap touch input; and displaying an indication of the selection of the paragraph.

In accordance with some embodiments, the method further includes: detecting a quintuple-tap touch input; in response to detecting the quintuple-tap touch input, selecting the content; and displaying an indication of the selection of the content.

In accordance with some embodiments, selecting the word within the electronic document closest to the touch input is performed when the distance is equal to the predetermined threshold distance.

In accordance with some embodiments, placing the cursor in the closest space after the preceding word is performed when the distance is equal to the predetermined threshold distance.

In accordance with some embodiments, a method of keyboard display is performed at a portable multifunction device including one or more processors, memory, and a touch screen display. The method includes: displaying content of an electronic document on the touch screen display; displaying a soft keyboard on the touch screen display; detecting two substantially simultaneous touch inputs on the soft keyboard; and in response to detecting the two substantially simultaneous touch inputs on the soft keyboard, displaying a blurred soft keyboard.

In accordance with some embodiments, the method further includes: detecting, without breaking contact with the touch screen display following the two substantially simultaneous touch inputs, movements of the two substantially touch inputs from the soft keyboard to the content; and in response to detecting the continuous finger contact to the content, replacing display of the blurred soft keyboard with display of the soft keyboard.

In accordance with some embodiments, displaying the blurred soft keyboard includes changing one or more of: color, hue, saturation, brightness, and contrast of the soft keyboard based on the content of the electronic document.

In accordance with some embodiments, a method of content selection is performed at a portable multifunction device including one or more processors, memory, and a touch-sensitive display. The method includes: concurrently displaying an onscreen keyboard and a content presentation region on the touch-sensitive display, wherein the content presentation region displays text input received from the onscreen keyboard; detecting a touch input on the onscreen keyboard displayed on the touch-sensitive display; in response to detecting the touch input on the onscreen keyboard displayed on the touch-sensitive display, determining whether the touch input satisfies one or more criteria for entering a text selection mode; and in accordance with a determination that the touch input satisfies the one or more criteria for entering the text selection mode: concurrently displaying, in the content presentation region, a first cursor at a first location and a second cursor at a second location that is different from the first location.

In accordance with some embodiments, the one or more criteria for entering the text selection mode include the touch input including a two-finger drag gesture over the onscreen keyboard.

In accordance with some embodiments, the device has one or more sensors to detect intensity of contacts with the touch-sensitive display, the touch input on the touch-sensitive display includes an input by a contact on the onscreen keyboard, and the one or more criteria for entering the text selection mode include the contact on the onscreen keyboard having an intensity that exceeds a predetermined deep press intensity threshold.

In accordance with some embodiments, the method further includes: in accordance with the determination that the touch input satisfies the one or more criteria for entering the text selection mode: visually obscuring keys on the onscreen keyboard.

In accordance with some embodiments, visually obscuring the keys on the onscreen keyboard includes applying a blurring effect to the onscreen keyboard.

In accordance with some embodiments, visually obscuring the keys on the onscreen keyboard includes transforming the onscreen keyboard into an onscreen touchpad.

In accordance with some embodiments, visually obscuring the keys on the onscreen keyboard includes making the onscreen keyboard semitransparent to partially reveal content lying underneath the onscreen keyboard.

In accordance with some embodiments, the second location is based on a location of an initial contact in the touch input; and the first location is a permitted insertion position in the content presentation region that is based on the second location.

In accordance with some embodiments, the first location is an insertion position at which the first cursor is located when the touch input is determined to satisfy the one or more criteria for entering the text selection mode; and the second location is displaced from the first location by a predetermined offset.

In accordance with some embodiments, one of the first and second cursors is already displayed in the content presentation region before both of the first and second cursors are concurrently displayed in the content presentation region.

In accordance with some embodiments, the method further includes: detecting movement of one or more contacts of the touch input; and moving the second cursor within the content presentation region in accordance with the movement of the one or more contacts of the touch input.

In accordance with some embodiments, the method further includes: moving the first cursor based on the movement of the second cursor, wherein movement of the first cursor includes discrete movements between permitted insertion positions in the content presentation region.

In accordance with some embodiments, the method further includes: detecting a lift-off of the touch input after detecting the movement of the one or more contacts of the touch input; and in response to detecting the lift-off of the touch input: ceasing to display the second cursor.

In accordance with some embodiments, the method further includes: in response to detecting the lift-off of the touch input, maintaining display of the first cursor at a respective permitted insertion position reached by the first cursor after the discrete movements of the first cursor.

In accordance with some embodiments, the method further includes: in response to detecting the lift-off of the touch input, ceasing to display the first cursor.

In accordance with some embodiments, the onscreen keyboard is obscured in accordance with the determination that the touch input satisfies the one or more criteria for entering the text selection mode, and the method further includes: in response to detecting the lift-off of the touch input, restoring display of the onscreen keyboard.

In accordance with some embodiments, the device has one or more sensors to detect intensity of contacts with the touch-sensitive display, and the method further includes: in the text selection mode, detecting that an intensity of a contact in the touch input exceeds a predetermined intensity threshold; after detecting that the intensity of the contact in the touch input exceeds the predetermined intensity threshold, detecting movement of the contact in the touch input; in response to detecting the movement of the contact in the touch input, after detecting that the intensity of the contact in the touch input exceeds the predetermined intensity threshold: selecting a portion of the text input in accordance with the movement of the contact in the touch input.

In accordance with some embodiments, the selected portion of the text input begins at a position of the first cursor when the detected intensity of the contact in the touch input exceeded the predetermined intensity threshold.

In accordance with some embodiments, the method further includes: detecting lift-off of the contact in the touch input after selecting the portion of the text input in accordance with the movement of the contact in the touch input; and, in response to detecting the lift-off of the contact in the touch input, confirming selection of the portion of the text input.

In accordance with some embodiments, the method further includes: after selecting the portion of the text input, while the portion of the text input is selected, detecting an intensity of the contact in the touch input that exceeds the predetermined threshold; and, in response to detecting the intensity of the contact in the touch input that exceeds the predetermined threshold while the portion of the text input is selected, clearing selection of the portion of the text input.

In accordance with some embodiments, the method further includes: after selecting the portion of the text input, while the portion of the text input is selected, detecting an intensity of the contact in the touch input that exceeds the predetermined threshold and that is followed by lift-off of the contact without further movement of the contact; and, in response to detecting the intensity of the contact in the touch input that exceeds the predetermined threshold and that is followed by lift-off of the contact without further movement of the contact, confirming selection of the portion of the text input.

In accordance with some embodiments, the method further includes: after selecting the portion of the text input, while the portion of the text input is selected, detecting an intensity of the contact in the touch input that exceeds the predetermined threshold and that is followed by further movement of the contact; and, in response to detecting the intensity of the contact in the touch input that exceeds the predetermined threshold and that is followed by the further movement of the contact: clearing selection of the portion of the text input.

In accordance with some embodiments, the method further includes: in response to detecting the intensity of the contact in the touch input that exceeds the predetermined threshold and that is followed by the further movement of the contact: starting selection of a new portion of the text input in accordance with the further movement of the contact.

In accordance with some embodiments, the method further includes: in response to detecting the intensity of the contact in the touch input that exceeds the predetermined threshold and that is followed by the further movement of the contact: further moving the second cursor and the first cursor within the content presentation region in accordance with the further movement of the contact.

In accordance with some embodiments, the device has one or more sensors to detect intensity of contacts with the touch-sensitive display, and the method further includes: in the text selection mode, detecting a first local intensity peak in the touch input followed by a second local intensity peak in the touch input that both exceed a predetermined intensity threshold; and, in response to detecting the first local intensity peak followed by the second local intensity peak that both exceed the predetermined intensity threshold, selecting a first predetermined unit of the text input according to a current location of the first cursor.

In accordance with some embodiments, the method further includes: after detecting the first local intensity peak followed by the second local intensity peak, detecting a third consecutive local intensity peak in the touch input that exceeds the predetermined intensity threshold; and in response to detecting the three consecutive local intensity peaks in the touch input that all exceed the predetermined deep press intensity threshold, selecting a second predetermined unit of the text input that is larger than and includes the first predetermined unit of the text input.

In accordance with some embodiments, a method of content selection is performed at a portable multifunction device including one or more processors, memory, a touch screen display, and one or more sensors to detect intensity of contacts with the touch-sensitive surface. The method includes: while a contact is detected on the touch-sensitive surface, concurrently displaying on the display content and a text selection indicator at a first location within the content; detecting a first press input by the contact followed by movement of the contact across the touch-sensitive surface that corresponds to movement of at least a portion of the text selection indicator from the first location to a second location on the display; in response to detecting the first press input by the contact followed by movement of the contact across the touch-sensitive surface, selecting content between the first location and the second location; while the content between the first location and the second location is selected, detecting a second press input by the contact on the touch-sensitive surface; in response to detecting the second press input by the contact on the touch-sensitive surface, performing a text selection operation, associated with the content between the first location and the second location, in accordance with the second press input, wherein the contact in the first press input, the movement across the touch-sensitive surface, and the second press input is a single continuous contact with the touch-sensitive surface.

In accordance with some embodiments, detecting the first press input by the contact followed by movement of the contact across the touch-sensitive surface includes: detecting an increase in intensity of the contact above a predetermined intensity threshold followed by detecting a decrease in intensity of the contact to an intensity that remains above a predetermined minimum intensity value.

In accordance with some embodiments, the method further includes: in response to detecting the first press input by the contact followed by movement of the contact across the touch-sensitive surface: displaying at least the portion of the text selection indicator at the second location within the content.

In accordance with some embodiments, the text selection operation includes stopping selection of content at the second location and maintaining selection of the content between the first location and the second location.

In accordance with some embodiments, the method further includes: after detecting the second press input and while the content between the first location and the second location remains selected, detecting lift-off of the contact; and in response to detecting the lift-off of the contact, displaying an action menu for the selected content between the first location and the second location.

In accordance with some embodiments, the method further includes: after detecting the second press input by the contact on the touch-sensitive surface and stopping the selection of the content at the second location, detecting further movement of the contact; and in response to detecting the further movement of the contact, displaying at least a portion of the text selection indicator at a third location within the content.

In accordance with some embodiments, the method further includes: in response to detecting the further movement of the contact, canceling selection of content between the first location and the second location without selecting content between the second location and the third location.

In accordance with some embodiments, the text selection operation includes cancelling selection of content between the first location and the second location.

In accordance with some embodiments, the method further includes: after detecting the second press input by the contact on the touch-sensitive surface and canceling the selection of content between the first location and the second location, detecting further movement of the contact; and, in response to detecting the further movement of the contact, selecting content between the second location and a third location.

In accordance with some embodiments, the method further includes: while the content between the second location and the third location is selected, detecting lift-off of the contact; and, in response to detecting the lift-off of the contact while the content between the second location and the third location is selected, stopping selection of the content at the third location and maintaining selection of the content between the second location and the third location.

In accordance with some embodiments, the method further includes: before displaying the text selection indicator at the first location within the content, detecting an initial press input by the contact on the touch-sensitive surface; and in response to detecting the initial press input, displaying the text selection indicator at an initial location within the content that corresponds to a location of the initial press input on the touch-sensitive surface.

In accordance with some embodiments, the display is a touch-sensitive display that includes the touch-sensitive surface, and the method further includes: concurrently displaying, on the touch-sensitive display, the content and an onscreen keyboard, wherein the initial press input is detected on the onscreen keyboard.

In accordance with some embodiments, the initial press input is detected at a location on the touch-sensitive surface that corresponds to a location of the content on the display.

In accordance with some embodiments, the display is a touch-sensitive display that includes the touch-sensitive surface, and the method further includes: concurrently displaying, on the touch-sensitive display, the content and an onscreen keyboard; before displaying the text selection indicator at the first location within the content, detecting a multi-contact drag input on the onscreen keyboard; and, in response to detecting the multi-contact drag input on the onscreen keyboard, displaying the text selection indicator at an initial location within the content based on a location of the multi-contact drag input on the onscreen keyboard.

In accordance with some embodiments, the content includes editable content and the text selection indicator includes a cursor.

In accordance with some embodiments, the method further includes: displaying a magnifying loupe that displays a magnified version of the cursor and a region surrounding the cursor.

In accordance with some embodiments, selecting the content between the first location and the second location includes: moving the cursor one character space at a time in response to detecting the movement of the contact across the touch-sensitive surface; and selecting one additional character at a time in accordance with the movement of the cursor.

In accordance with some embodiments, the content includes read-only content and the text selection indicator includes a selection area; and displaying the text selection indicator at the first location includes displaying a first word located at the first location within the selection area.

In accordance with some embodiments, the method further includes: displaying a magnifying loupe that displays a magnified version of the selection area and a region surrounding the selection area.

In accordance with some embodiments, selecting the content between the first location and the second location includes: expanding the selection area one word at a time in accordance with the movement of the contact across the touch-sensitive surface; and selecting one additional word at a time in accordance with the expansion of the selection area.

In accordance with some embodiments, the method further includes: foregoing performing the text selection operation, in response to detecting the second press input, in accordance with a determination that the second press input is accompanied by simultaneous movement of the contact across the touch-sensitive surface.

In accordance with some embodiments, when the text is editable text, the text selection indicator is a cursor and selecting content between the first location and the second location includes expanding the selection character-by-character in accordance with movement of the contact on the touch-sensitive surface; and when the text is non-editable text, the text selection indicator is a selection region that initially encompasses a single word and selecting content between the first location and the second location includes expanding the selection word-by-word in accordance with movement of the contact on the touch-sensitive surface.

In accordance with some embodiments, a method of content selection is performed at a portable multifunction device including one or more processors, memory, and a touch-sensitive display. The method includes: concurrently displaying an onscreen keyboard and a content presentation region on the touch-sensitive display, wherein the content presentation region displays text input received from the onscreen keyboard; detecting a touch input on the onscreen keyboard displayed on the touch-sensitive display, wherein detecting the touch input includes detecting movement of a contact and liftoff of the contact; in response to detecting the touch input on the onscreen keyboard displayed on the touch-sensitive display: in accordance with a determination that the touch input satisfies text-selection criteria, wherein the text-selection criteria include a criterion that is met when a characteristic intensity of the contact increases above a text-selection intensity threshold, performing a text selection operation based on the movement of the contact; and in accordance with a determination that the touch input satisfies text-entry criteria, wherein the text-entry criteria include a criterion that is met when the characteristic intensity of the contact does not increase above the text-selection intensity threshold, entering text into the content presentation region based on the touch input.

In accordance with some embodiments, the text-entry criteria include a criterion that is met when the liftoff of the contact is detected while the contact is at a location of a character key of the onscreen keyboard.

In accordance with some embodiments, the text-entry criteria include a criterion that is met when the contact does not move outside of the onscreen keyboard before liftoff of the contact is detected.

In accordance with some embodiments, entering the text into the content region includes entering a character that corresponds to character key at a location at which touch-down of the contact was detected on the onscreen keyboard.

In accordance with some embodiments, entering the text into the content region includes entering a character that corresponds to character key at a location at which liftoff of the contact was detected on the onscreen keyboard.

In accordance with some embodiments, the text-selection criteria include a criterion that is met when the contact does not move more than a threshold distance before detecting an increase in the characteristic intensity of the contact above the text-selection intensity threshold.

In accordance with some embodiments, the text-selection operation includes one of: moving a cursor within the content region or selecting text within the content region.

In accordance with some embodiments, the method further includes, in response to detecting that the text-selection criteria have been met, generating a tactile output that is indicative of an entry into a text selection mode of operation.

In accordance with some embodiments, the method further includes, in response to detecting that the text-selection criteria have been met, changing an appearance of the onscreen keyboard to indicate that the device is operating in a text selection mode of operation, wherein changing the appearance of the onscreen keyboard includes obscuring an appearance of characters on keys of the onscreen keyboard.

In accordance with some embodiments, the method further includes, ending the text selection mode of operation and, in conjunction with the end of the text selection mode of operation, reversing the change in appearance of the onscreen keyboard to reveal the characters on the keys of the onscreen keyboard.

In accordance with some embodiments, the method further includes, when the touch input satisfies the text-selection criteria, detecting movement of the contact after the touch input has satisfied the text-selection criteria and moving a cursor in the content region in accordance with the movement of the contact detected after the touch input has satisfied the text-selection criteria.

In accordance with some embodiments, the method further includes, when the touch input satisfies the text-selection criteria, detecting a first subsequent change in the characteristic intensity of the contact followed by additional movement of the contact on the touch-sensitive display; and, in response to detecting the first subsequent change in the characteristic intensity of the contact: in accordance with a determination that the touch input satisfies selection-start criteria, wherein the selection-start criteria include a criterion that is met when the characteristic intensity of the contact increases above a selection-start intensity threshold, starting to select content in the content region at a location of a cursor in accordance with the additional movement of the contact; and in accordance with a determination that the touch input does not satisfy the selection-start criteria, moving the cursor in accordance with the additional movement of the contact without starting to select content in the content region.

In accordance with some embodiments, the method further includes, when the touch input satisfies selection-start criteria, after starting to select content in the content region, detecting liftoff of the contact from the touch-sensitive display and confirming the selection in response to detecting the liftoff of the contact.

In accordance with some embodiments, the method further includes, when the touch input satisfies selection-start criteria, after starting to select content in the content region, and while continuing to detect the contact on the touch-sensitive display, detecting a second subsequent change in intensity of the contact; in response to detecting the second subsequent change in the characteristic intensity of the contact: in accordance with a determination that the second subsequent change in the characteristic intensity of the contact satisfies selection-cancellation criteria, wherein the selection-cancellation criteria include a criterion that is met when the characteristic intensity of the contact increases above a selection-cancellation intensity threshold cancelling the selection; and in accordance with a determination that the second subsequent change in the characteristic intensity of the contact does not satisfy the selection-cancellation criteria, maintaining the selection.

In accordance with some embodiments, the selection-cancellation criteria include a criterion that is met when the contact moves no more than a threshold distance within a threshold amount of time before the characteristic intensity of the contact increases above the selection-cancellation intensity threshold.

In accordance with some embodiments, the method further includes, in response to detecting that the selection-cancellation criteria have been met, generating a tactile output that is indicative of an exit from the text selection mode of operation.

In accordance with some embodiments, the method further includes, after canceling the selection, and while continuing to detect the contact on the touch-sensitive display, detecting a third subsequent change in the characteristic intensity of the contact; and, in response to detecting the third subsequent change in the characteristic intensity of the contact: in accordance with a determination that the touch input satisfies the selection-start criteria, starting to select content in the content region at a location of the cursor; and in accordance with a determination that the touch input does not satisfy the selection-start criteria, forgoing starting to select content in the content region.

In accordance with some embodiments, starting to select content in response to detecting the third subsequent change in the characteristic intensity of the contact includes selecting a respective word at the location of the cursor.

In accordance with some embodiments, the selected respective word is a first word, and the method further includes, while the first word is selected, detecting first subsequent movement of the contact; and in response to detecting the first subsequent movement of the contact while the first word is selected: in accordance with a determination that the touch input meets selection-movement criteria which includes a movement criterion that is met when the contact moves more than a respective threshold amount, canceling selection of the first word; and selecting a second word that is adjacent to the first word in a first direction in accordance with the first subsequent movement of the contact, such that the selected respective word is the second word.

In accordance with some embodiments, the method further includes, while the respective word is selected, detecting first subsequent movement of the contact; and in response to detecting the first subsequent movement of the contact while the respective word is selected: in accordance with a determination that the touch input meets selection-expansion criteria which includes a movement criterion that is met when the contact moves more than a respective threshold amount, expanding the selection to include a word that is adjacent to the respective word in a first direction in accordance with the first subsequent movement of the contact.

In accordance with some embodiments, the method further includes, while the respective word is selected, detecting a fourth subsequent change in the characteristic intensity of the contact above a respective intensity threshold; and, in response to detecting the fourth subsequent change in the characteristic intensity of the contact, in accordance with a determination that the touch input meets the selection-cancellation criteria, which includes a criterion that is met when the amount of time between when the third subsequent change in the characteristic intensity of the contact is detected and when the fourth subsequent change in the characteristic intensity of the contact is detected is greater than the delay threshold, cancelling selection of the respective word.

In accordance with some embodiments, the method further includes, while the respective word is selected, detecting a fourth subsequent change in the characteristic intensity of the contact above a respective intensity threshold; and, in response to detecting the fourth subsequent change in the characteristic intensity of the contact, in accordance with a determination that the touch input meets sentence-selection criteria which include a movement criterion that is met when the contact moves less than a threshold amount within a threshold time period before the fourth subsequent change in intensity of the contact was detected and a time criterion that is met when an amount of time between when the third subsequent change in the characteristic intensity of the contact is detected and when the fourth subsequent change in the characteristic intensity of the contact is detected is less than a delay threshold, expanding the selection to include the respective sentence that contains the respective word.

In accordance with some embodiments, the method further includes, while the respective sentence is selected, detecting second subsequent movement of the contact; and in response to detecting the second subsequent movement of the contact while the respective sentence is selected: in accordance with a determination that the touch input meets selection-expansion criteria which includes a movement criterion that is met when the contact moves more than a respective threshold amount, expanding the selection to include a sentence that is adjacent to the respective sentence in a first direction in accordance with the second subsequent movement of the contact.

In accordance with some embodiments, the respective sentence is selected in response to the fourth subsequent change in the characteristic intensity of the contact and the method further includes, while the respective sentence is selected: detecting a fifth subsequent change in the characteristic intensity of the contact above the respective intensity threshold; and, in response to detecting the fifth subsequent change in the characteristic intensity of the contact, in accordance with a determination that the touch input meets the selection-cancellation criteria, which includes a criterion that is met when the amount of time between when the fourth subsequent change in the characteristic intensity of the contact is detected and when the fifth subsequent change in the characteristic intensity of the contact is detected is greater than the delay threshold, cancelling selection of the respective sentence.

In accordance with some embodiments, the method further includes, in response to detecting the fifth subsequent change in the characteristic intensity of the contact, in accordance with a determination that the touch input meets paragraph-selection criteria which include a movement criterion that is met when the contact moves less than the threshold amount within the threshold time period before the fifth subsequent change in intensity of the contact was detected and a time criterion that is met when an amount of time between when the fourth subsequent change in the characteristic intensity of the contact is detected and when the fifth subsequent change in the characteristic intensity of the contact is detected is less than the delay threshold, expanding the selection to include the respective paragraph that contains the respective sentence.

In accordance with some embodiments, the method further includes, while the respective paragraph is selected, detecting third subsequent movement of the contact; and in response to detecting the third subsequent movement of the contact while the respective paragraph is selected: in accordance with a determination that the touch input meets selection-expansion criteria which includes a movement criterion that is met when the contact moves more than a respective threshold amount, expanding the selection to include a paragraph that is adjacent to the respective paragraph in a first direction in accordance with the third subsequent movement of the contact.

In accordance with some embodiments, the respective paragraph is selected in response to the fifth subsequent change in the characteristic intensity of the contact and the method further includes, while the respective paragraph is selected: detecting a sixth subsequent change in the characteristic intensity of the contact above the respective intensity threshold; and, in response to detecting the sixth subsequent change in the characteristic intensity of the contact, in accordance with a determination that the touch input meets selection-cancellation criteria, which includes a criterion that is met when the amount of time between when the fifth subsequent change in the characteristic intensity of the contact is detected and when the sixth subsequent change in the characteristic intensity of the contact is detected is greater than the delay threshold, cancelling selection of the respective paragraph.

In accordance with some embodiments, the method further includes, in response to detecting the sixth subsequent change in the characteristic intensity of the contact, in accordance with a determination that the touch input meets document selection criteria which include a movement criterion that is met when the contact moves less than the threshold amount within the threshold time period before the sixth subsequent change in intensity of the contact was detected and a time criterion that is met when an amount of time between when the fifth subsequent change in the characteristic intensity of the contact is detected and when the sixth subsequent change in the characteristic intensity of the contact is detected is less than the delay threshold, expanding the selection to include the respective document that contains the respective paragraph.

In accordance with some embodiments, a method of content manipulation is performed at a portable multifunction device including one or more processors, memory, and a touch screen display. The method includes: displaying content of an electronic document and a cursor within the content on the touch screen display; displaying, on the touch screen display, a soft keyboard having multiple keys each having a respective alphanumeric character of a plurality of alphanumeric characters; detecting two substantially simultaneous touch inputs on the soft keyboard; and in response to detecting the two substantially simultaneous touch inputs on the soft keyboard, changing the appearance of the soft keyboard to a changed appearance.

In accordance with some embodiments, the method of content manipulation further includes: detecting, without breaking contact with the touch screen display following the two substantially simultaneous touch inputs, a sliding gesture from a first location of the two substantially touch inputs on the soft keyboard to a second location on the content; and in response to detecting the sliding gesture, maintaining the changed appearance of the soft keyboard.

In accordance with some embodiments, changing the appearance of the soft keyboard includes: removing the plurality of alphanumeric characters from the multiple keys, or changing one or more of: color, hue, saturation, brightness, or contrast of the soft keyboard based on the content of the electronic document.

In accordance with some embodiments, the method of content manipulation further includes: detecting a continuous movement of the two substantially simultaneous touch inputs from a first location on the soft keyboard to a second location anywhere on the touch screen display without breaking contact with the touch screen display; and expanding the selected content to include additional content beyond the portion in a direction towards the second location in response to detecting the continuous movement.

In accordance with some embodiments, expanding the selected content to include additional content beyond the portion in a direction towards the second location includes:

displaying a start-point object and an end-point object at respective ends of the selection; and moving one of the start-point object or the end-point object in accordance with the location of the first location and the second location. For example, the selection is expanded by moving a start-point object or an end-point object like dragging a cursor. The initial direction of the continuous movement of the two substantially simultaneous touch inputs defines what part of the selection is expanded. For example, a left/up movement of the two substantially simultaneous touch inputs drags a lollipop shaped start-point object and expands the selection backwards, while a right/down movement of the two substantially simultaneous touch inputs drags an upside down lollipop shaped end-point object and expands the selection forward.

In accordance with some embodiments, expanding the selected content to include additional content beyond the portion in a direction towards the second location includes: in accordance with a determination that the speed of the continuous movement exceeds a predetermined threshold, expanding the selection one word at a time.

In accordance with some embodiments, the method of content manipulation further includes: after detecting the two substantially simultaneous touch inputs, detecting a lift-off followed by an additional two substantially simultaneous touch inputs followed by a sliding gesture of the additional two substantially simultaneous touch inputs across the touch screen display to additional locations; dismissing the selected content; selecting a word as the selected content closest to the cursor; and expanding the selected content to include additional content beyond the selected content in a direction towards the additional locations.

In accordance with some embodiments, the method of content manipulation further includes: detecting an additional two substantially simultaneous touch inputs on the soft keyboard; and in response to detecting the additional two substantially simultaneous touch inputs on the soft keyboard: in accordance with a determination that the selected content is a word, expanding the selected content to include a sentence containing the word.

In accordance with some embodiments, the method of content manipulation further includes: in accordance with a determination that the selected content is more than a word, displaying the cursor at the beginning of the selected content and dismissing the selected content.

In accordance with some embodiments, the method of content manipulation further includes: detecting additional two substantially simultaneous touch inputs; in response to detecting the additional two substantially simultaneous touch inputs, expanding the selected content to a sentence containing the portion; and displaying an indication of the selected content.

In accordance with some embodiments, expanding the selected content to a sentence containing the portion includes expanding the selected content to the sentence containing the portion in accordance with a determination that the duration between the two substantially simultaneous touch inputs and the additional two substantially simultaneous touch inputs is less than a predetermined threshold (e.g., 0.66 seconds).

In accordance with some embodiments, the method of content manipulation further includes: detecting a further two substantially simultaneous touch inputs; in response to detecting the further two substantially simultaneous touch inputs, expanding the selected content to a paragraph containing the portion; and displaying an indication of the selected content.

In accordance with some embodiments, expanding the selected content to a paragraph containing the portion includes: expanding the selected content to the paragraph containing the portion in accordance with a determination that the duration between the two substantially simultaneous touch inputs and the further two substantially simultaneous touch inputs is less than a predetermined threshold (e.g., 0.66 seconds).

In accordance with some embodiments, there is provided an electronic device that includes a display, a touch-sensitive surface, one or more processors, memory, and one or more programs; the one or more programs are stored in the memory and configured to be executed by the one or more processors, where the one or more programs include instructions for performing any of the methods described herein.

In accordance with some embodiments there is provided a graphical user interface on an electronic device with a display, a touch-sensitive surface, a memory, and one or more processors to execute one or more programs stored in the memory. The graphical user interface includes one or more of the elements displayed in any of the methods described above, which are updated in response to inputs, as described in any of the methods described herein.

In accordance with some embodiments, there is provided a non-transitory computer readable storage medium that has stored therein instructions which when executed by an electronic device with a display, a touch-sensitive surface, cause the device to perform the any of the methods described herein.

In accordance with some embodiments, an electronic device includes a display unit configured to display content of an electronic document and a cursor within the electronic document; a touch-sensitive surface unit configured to receive user contacts; and a processing unit coupled to the display unit and the touch-sensitive surface unit. The processing unit is configured to: detect two substantially simultaneous touch inputs anywhere on the touch screen display; and in response to detecting the two substantially simultaneous touch inputs: select a portion of the content in the document closest to the cursor; and display the portion of the content as selected content.

In accordance with some embodiments, an electronic device includes a display unit configured to display content of an electronic document and a cursor at a current location within the content; a touch-sensitive surface unit configured to receive user contacts; and a processing unit coupled to the display unit and the touch-sensitive surface unit. The processing unit is configured to: detect two substantially simultaneous touch inputs at a first region on the touch screen display; upon determining that the two substantially simultaneous touch inputs remain in contact with the touch screen display, detect a continuous touch gesture from a location of the two substantially simultaneous touch inputs across the touch screen display from the first region to a second region; and in response to detecting the continuous touch gesture: move the cursor from the current location to a new location in a direction of the continuous touch gesture.

In accordance with some embodiments, an electronic device includes a display unit configured to display text and a cursor at a line within the text; a touch-sensitive surface unit configured to receive user contacts; and a processing unit coupled to the display unit and the touch-sensitive surface unit. The processing unit is configured to: detect a two-finger swipe gesture on the touch screen display in a direction at least partially parallel to the line and towards an edge of the touch screen display; and in response to detecting the two-finger swipe gesture: move the cursor to a distal point of the text.

In accordance with some embodiments, an electronic device includes a display unit configured to display content of an electronic document and a cursor within the electronic document; a touch-sensitive surface unit configured to receive user contacts; and a processing unit coupled to the display unit and the touch-sensitive surface unit. The processing unit is configured to: detect a touch input on the touch screen display, wherein the touch input is located on a word within the content; and in response to detecting the touch input: select the word; and display a command display area adjacent to the selected word, wherein the second command display area includes an icon for cutting the selected word, an icon for copying the selected word, and an icon for pasting a previously selected content.

In accordance with some embodiments, an electronic device includes a display unit configured to display content of an electronic document and a selection of the content within the electronic document; a touch-sensitive surface unit configured to receive user contacts; and a processing unit coupled to the display unit and the touch-sensitive surface unit. The processing unit is configured to: detect a single touch input on the touch screen display at a location over the selection; in response to detecting the single touch input at the location, display a set of options related to the selection; determine if the single touch input remains at the location for a predetermined amount of time followed by a continuous touch gesture away from the location on the touch screen display; and in response to detecting the single touch input remaining at the location for the predetermined amount of time followed by the continuous touch gesture away from the location, move the selection to a different location in a direction of the continuous touch gesture.

In accordance with some embodiments, an electronic device includes a display unit configured to display content of an electronic document and a selection of the content within the electronic document; a touch-sensitive surface unit configured to receive user contacts; and a processing unit coupled to the display unit and the touch-sensitive surface unit. The processing unit is configured to: detect three substantially simultaneous touch inputs at locations anywhere on the touch screen display; determine if the three substantially simultaneous touch inputs is followed by three continuous touch gestures away from the locations on the touch screen display; and in response to detecting the three continuous touch gestures, move the selection to a different location in a direction of the continuous touch gestures.

In accordance with some embodiments, an electronic device includes a display unit configured to display content of an electronic document, the content includes at least one line of text comprising at least two words; a touch-sensitive surface unit configured to receive user contacts; and a processing unit coupled to the display unit and the touch-sensitive surface unit. The processing unit is configured to: detect a touch input on the content; and in response to detecting the touch input: determine a distance of the touch input to a closest space between the two words within the electronic document; and in accordance with a determination that the distance is greater than a predetermined threshold distance, select a word within the electronic document closest to the touch input and display an indication of the selection.

In accordance with some embodiments, an electronic device includes a display unit configured to display content of an electronic document and a soft keyboard; a touch-sensitive surface unit configured to receive user contacts; and a processing unit coupled to the display unit and the touch-sensitive surface unit. The processing unit is configured to: detect two substantially simultaneous touch inputs on the soft keyboard; and in response to detecting the two substantially simultaneous touch inputs on the soft keyboard, display a blurred soft keyboard.

In accordance with some embodiments, an electronic device includes a touch-sensitive surface unit configured to receive user touch inputs, a display unit configured to concurrently display an onscreen keyboard and a content presentation region on the touch-sensitive display unit, wherein the content presentation region displays text input received from the onscreen keyboard; a touch-sensitive surface unit configured to receive user touch inputs; and a processing unit coupled to the display unit and the touch-sensitive surface unit. The processing unit is configured to: detect a touch input on the onscreen keyboard displayed on the touch-sensitive display; in response to detecting the touch input on the onscreen keyboard displayed on the touch-sensitive display, determine whether the touch input satisfies one or more criteria for entering a text selection mode; and in accordance with a determination that the touch input satisfies the one or more criteria for entering the text selection mode: concurrently display, in the content presentation region, a first cursor at a first location and a second cursor at a second location that is different from the first location.

In accordance with some embodiments, an electronic device includes a touch-sensitive surface unit configured to receive user touch inputs; a display unit configured to, while a contact is detected on the touch-sensitive surface unit, concurrently display on the display unit content and a text selection indicator at a first location within the content; one or more sensors to detect intensity of contacts with the touch-sensitive surface unit; and a processing unit coupled to the display unit and the touch-sensitive surface unit. The processing unit is configured to: detect a first press input by the contact followed by movement of the contact across the touch-sensitive surface unit that corresponds to movement of at least a portion of the text selection indicator from the first location to a second location on the display unit; in response to detecting the first press input by the contact followed by movement of the contact across the touch-sensitive surface unit, select content between the first location and the second location; while the content between the first location and the second location is selected, detect a second press input by the contact on the touch-sensitive surface unit; in response to detecting the second press input by the contact on the touch-sensitive surface unit, perform a text selection operation, associated with the content between the first location and the second location, in accordance with the second press input, wherein the contact in the first press input, the movement across the touch-sensitive surface unit, and the second press input is a single continuous contact with the touch-sensitive surface unit.

In accordance with some embodiments, an electronic device includes a touch-sensitive surface unit configured to receive user touch inputs; a display unit configured to concurrently display an onscreen keyboard and a content presentation region on the touch-sensitive display unit, wherein the content presentation region displays text input received from the onscreen keyboard; one or more sensors to detect intensity of contacts with the touch-sensitive surface unit; and a processing unit coupled to the display unit and the touch-sensitive surface unit. The processing unit is configured to: detect a touch input on the onscreen keyboard displayed on the touch-sensitive display unit, wherein detecting the touch input includes detecting movement of a contact and liftoff of the contact; in response to detecting the touch input on the onscreen keyboard displayed on the touch-sensitive display: in accordance with a determination that the touch input satisfies text-selection criteria, wherein the text-selection criteria include a criterion that is met when a characteristic intensity of the contact increases above a text-selection intensity threshold, perform a text selection operation based on the movement of the contact; and in accordance with a determination that the touch input satisfies text-entry criteria, wherein the text-entry criteria include a criterion that is met when the characteristic intensity of the contact does not increase above the text-selection intensity threshold, enter text into the content presentation region based on the touch input.

In accordance with some embodiments, there is provided an electronic device that includes a display unit configured to display content of an electronic document and a cursor within the electronic document; a touch-sensitive surface unit configured to receive user contacts; and a processing unit coupled to the display unit and the touch-sensitive surface unit. The processing unit is configured to: display, on the touch-sensitive surface display unit, a soft keyboard having multiple keys each having a respective alphanumeric character of a plurality of alphanumeric characters; detect two substantially simultaneous touch inputs on the soft keyboard; and in response to detecting the two substantially simultaneous touch inputs on the soft keyboard, change the appearance of the soft keyboard to a changed appearance.

Thus, electronic devices with displays, touch-sensitive surfaces are provided with faster, more efficient methods and interfaces for cursor manipulation, thereby increasing the effectiveness, efficiency, and user satisfaction with such devices. Such methods and interfaces may complement or replace conventional methods for cursor manipulation.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 2B illustrates an exemplary user interface for a multifunction device with a touch-sensitive surface that is separate from the display in accordance with some embodiments.

FIGS. 10A-10G are flow diagrams illustrating a method of manipulating a cursor in accordance with some embodiments.

FIGS. 11A-11F are flow diagrams illustrating a method of selecting content in accordance with some embodiments.

FIGS. 14A-14H are flow diagrams illustrating a method of manipulating a cursor and selecting content in accordance with some embodiments.

DESCRIPTION OF EMBODIMENTS

Described below are devices and methods that allow a user to efficiently manipulate a cursor in an electronic document. The methods are particularly useful on portable devices with small displays, including handheld or pocket-sized devices (e.g., smartphones). When using conventional portable devices, a user may find it difficult to precisely place her finger (or make contact) at the cursor location on the touch screen display, as the cursor is often small, hidden under the user's finger, and/or disposed between text or graphics. As such, users often need to lift their finger and reposition it multiple times until the cursor is placed at the correct location. This conventional process is time consuming, inefficient, and alienates users. The methods described herein allow a user to manipulate and place a cursor at a desired location within an electronic document, as well as perform certain editing functions, such as text selection or moving text. In some embodiments, this cursor (or selected text) manipulation can be controlled from any part of the touch-sensitive surface, not just the location of the cursor. These methods greatly reduce the number of steps that a user need perform to navigate and edit a document, thereby increasing efficiency and ease of use when performing these tasks.

Figure 2A:
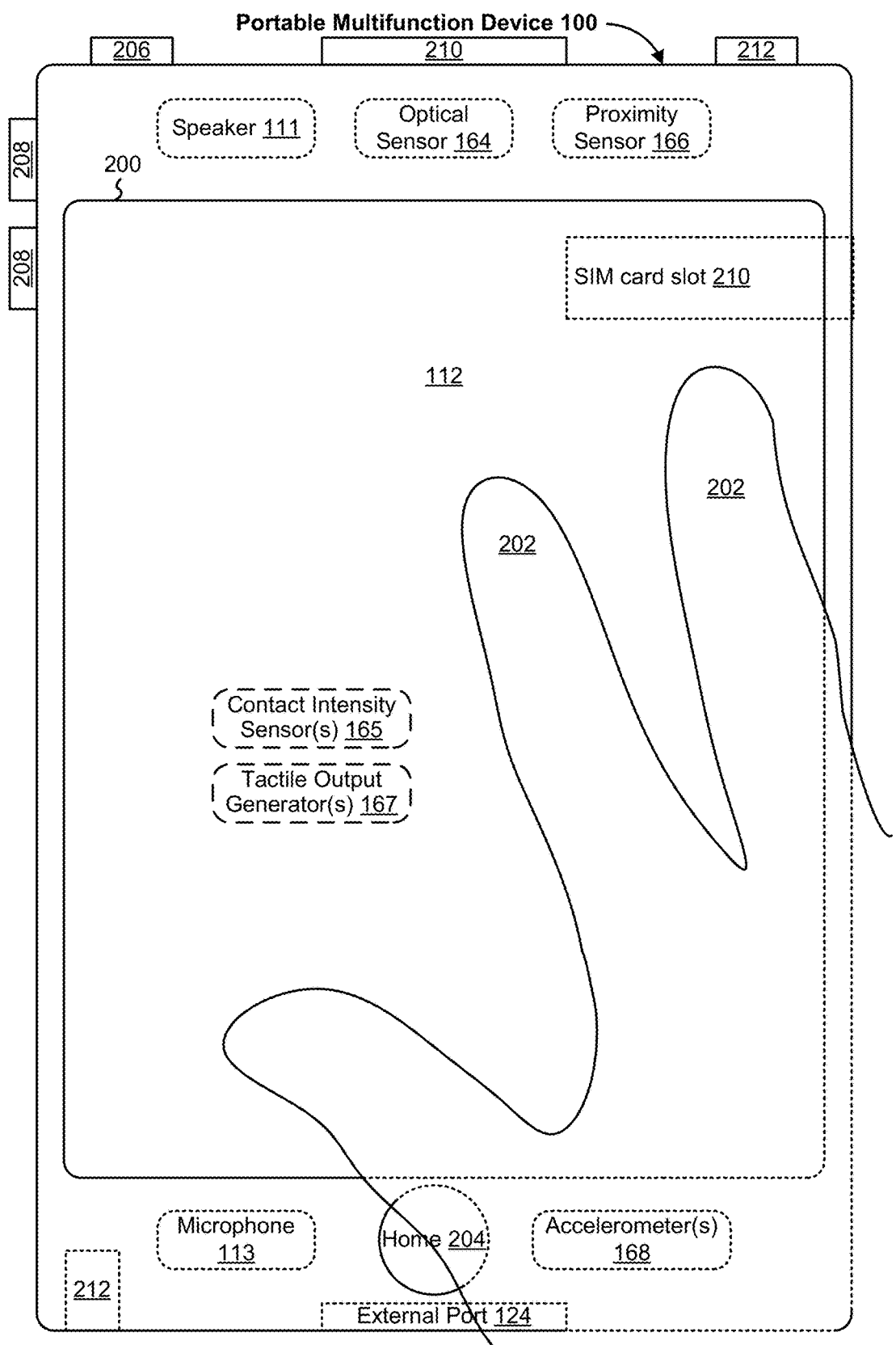
FIG. 2A is a schematic diagram of a portable multifunction device having a touch screen, in accordance with some embodiments.
Figure 3:
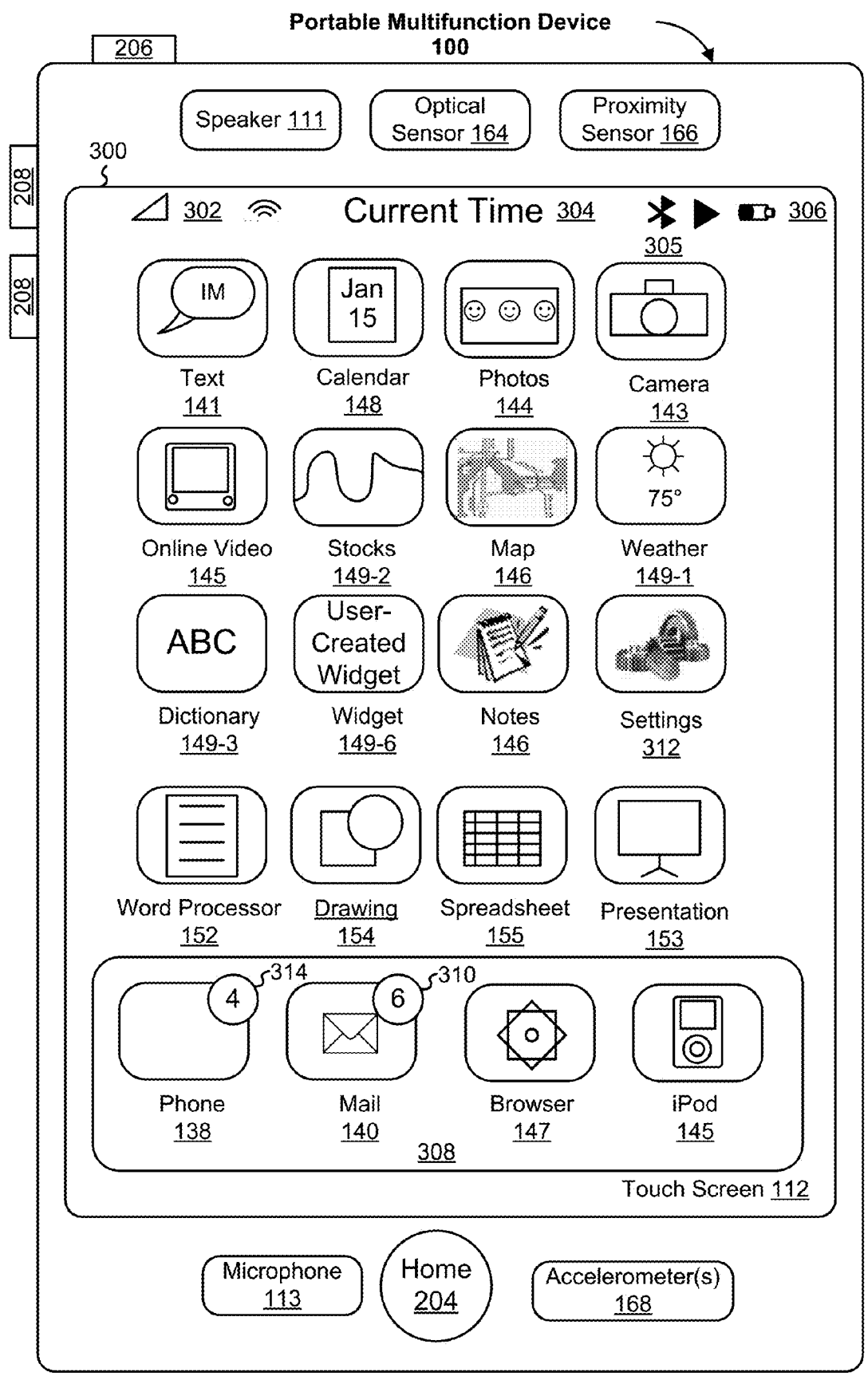
FIG. 3 is a schematic diagram of a user interface for a menu of applications on a portable multifunction device, in accordance with some embodiments.
Figure 4A:
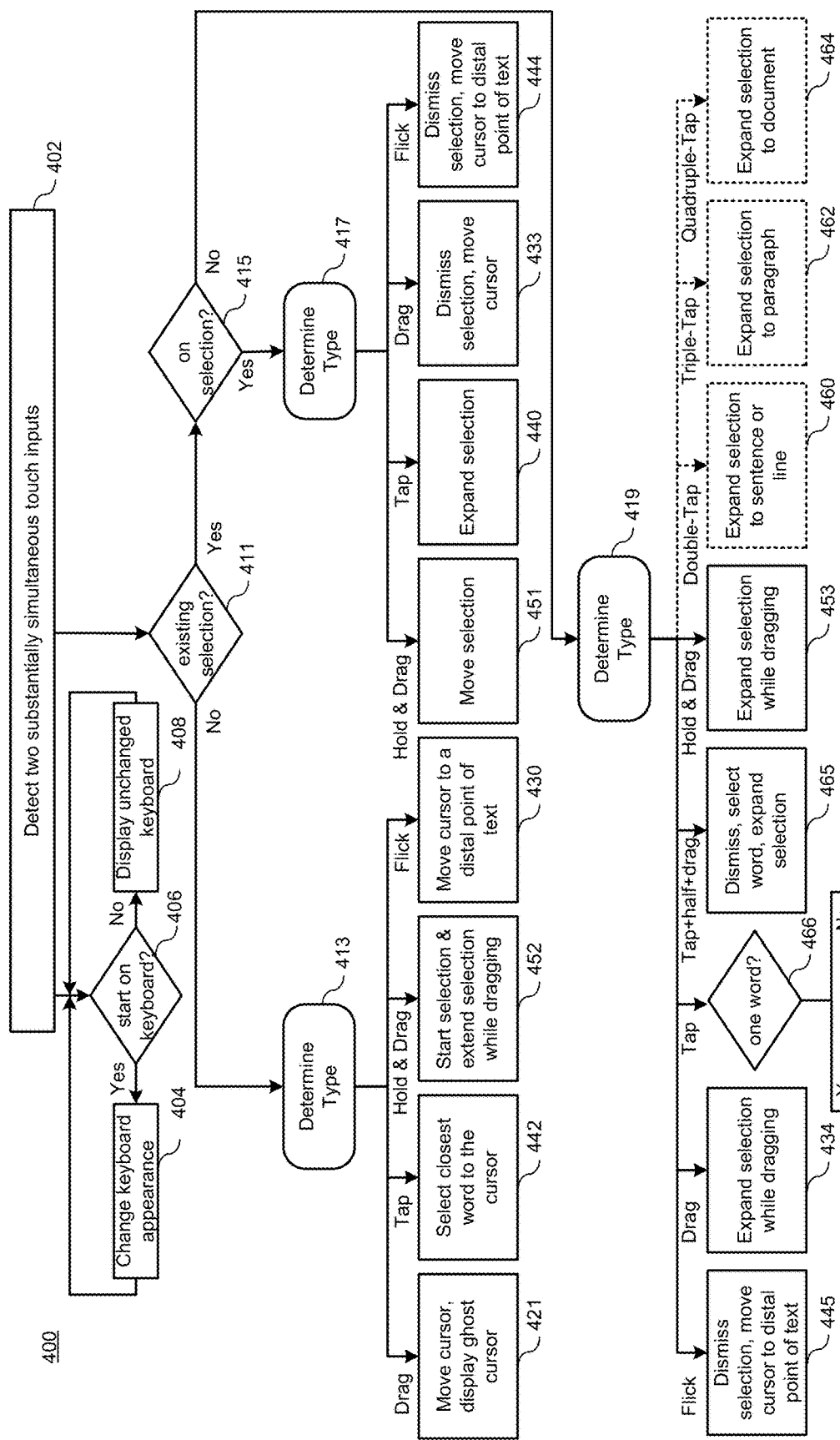
FIG. 4A is a flow chart illustrating a method of cursor manipulation with two substantially simultaneous touch inputs, in accordance with some embodiments.
Figure 4B:
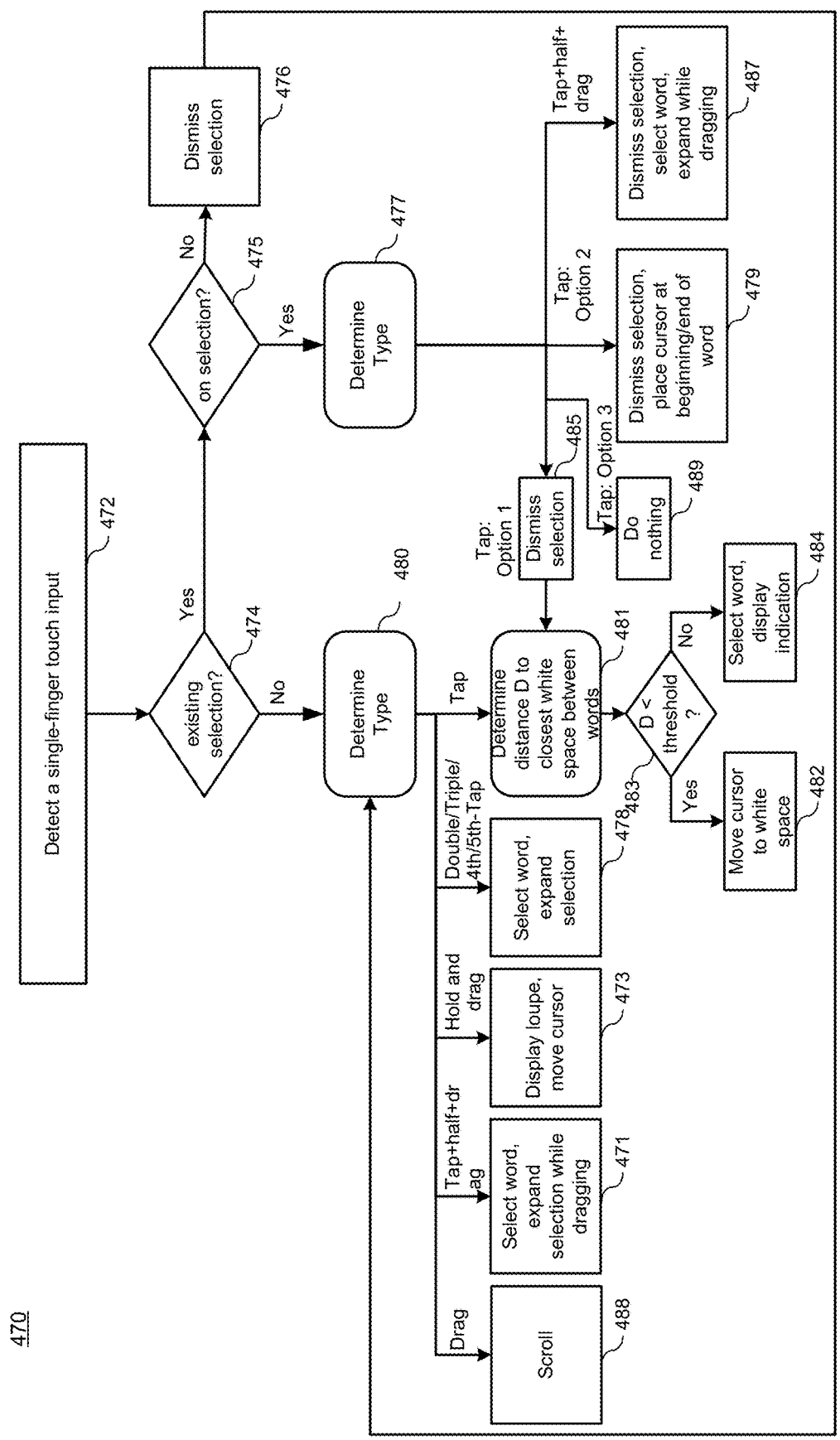
FIG. 4B is a flow chart illustrating a method of cursor manipulation with a single touch input, in accordance with some embodiments.
Figure 4C:
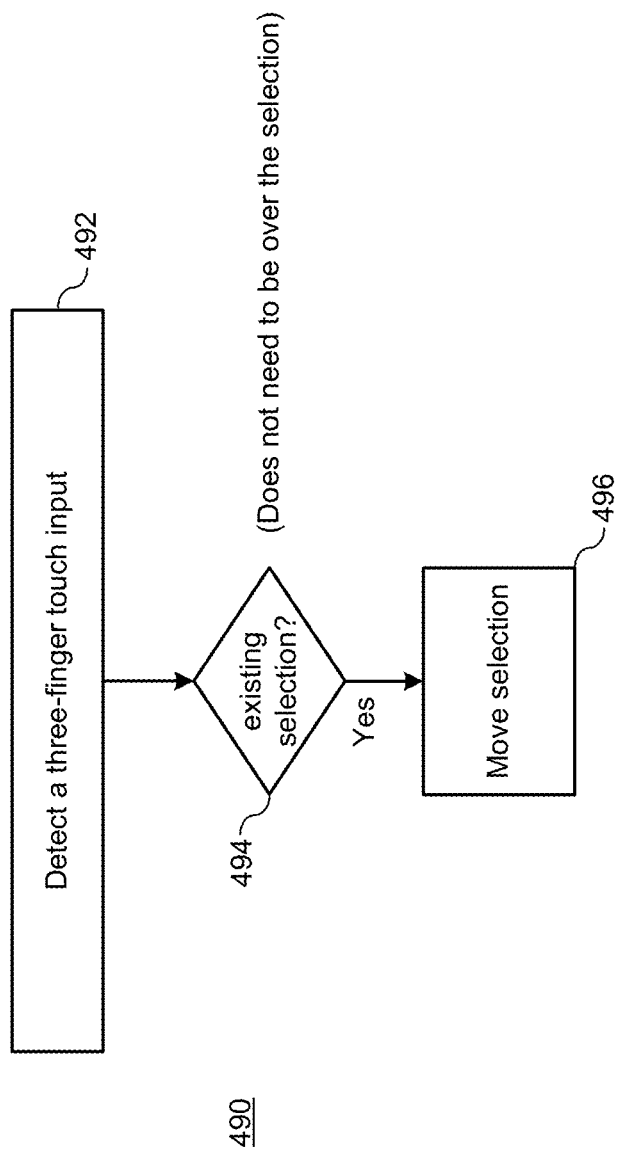
FIG. 4C is a flow chart illustrating a method of cursor manipulation with three substantially simultaneous touch inputs (e.g., three finger touch input), in accordance with some embodiments.
Figure 5A:
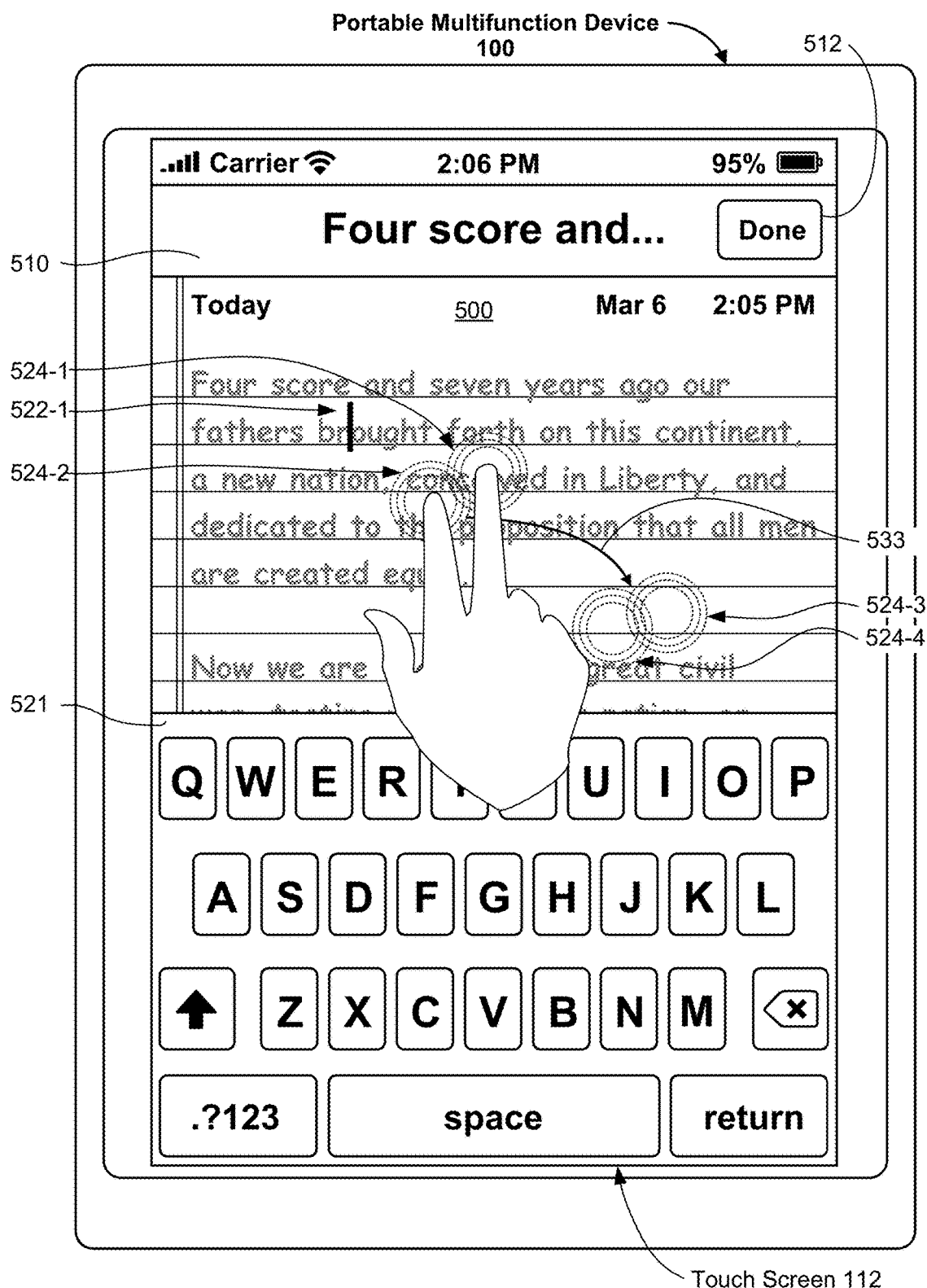
FIGS. 5A-5AX illustrate exemplary user interfaces for cursor manipulation, in accordance with some embodiments.

Below, FIGS. 1A-1B, 2A-2B, and 3 provide a description of exemplary devices. FIGS. 5A-5AR illustrate exemplary user interfaces for cursor manipulation when editing an electronic document. FIGS. 4A-4C are flow charts illustrating methods of cursor manipulation. The user interfaces in FIGS. 5A-5AX, 6A-6J, 7A-7C, 9A-9AD, and 13A-13Q are used to illustrate the processes in FIGS. 4A-4C, 10A-10G, 11A-11F, 14A-14H and the method recited in the claims.

EXEMPLARY DEVICES

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of computing devices, user interfaces for such devices, and associated processes for using such devices are described. In some embodiments, the computing device is a portable communications device such as a mobile telephone that also contains other functions, such as PDA and/or music player functions. Exemplary embodiments of portable multifunction devices include, without limitation, the IPHONE, IPAD, and IPOD TOUCH devices from Apple Computer, Inc. of Cupertino, Calif.

In the discussion that follows, a computing device that includes a touch-sensitive display is described. It should be understood, however, that the computing device may include one or more other physical user-interface devices, such as a separate display, physical keyboard, a mouse, and/or a joystick.

The device supports a variety of applications, such as one or more of the following: a note taking application, a drawing application, a presentation application, a word processing application, a website creation application, a disk authoring application, a spreadsheet application, a gaming application, a telephone application, a video-conferencing application, an e-mail application, an instant messaging application, a fitness application, a photo management application, a digital camera application, a digital video camera application, a web browsing application, a digital music player application, a digital video player application, and/or a home automation application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference in their entirety. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1A:
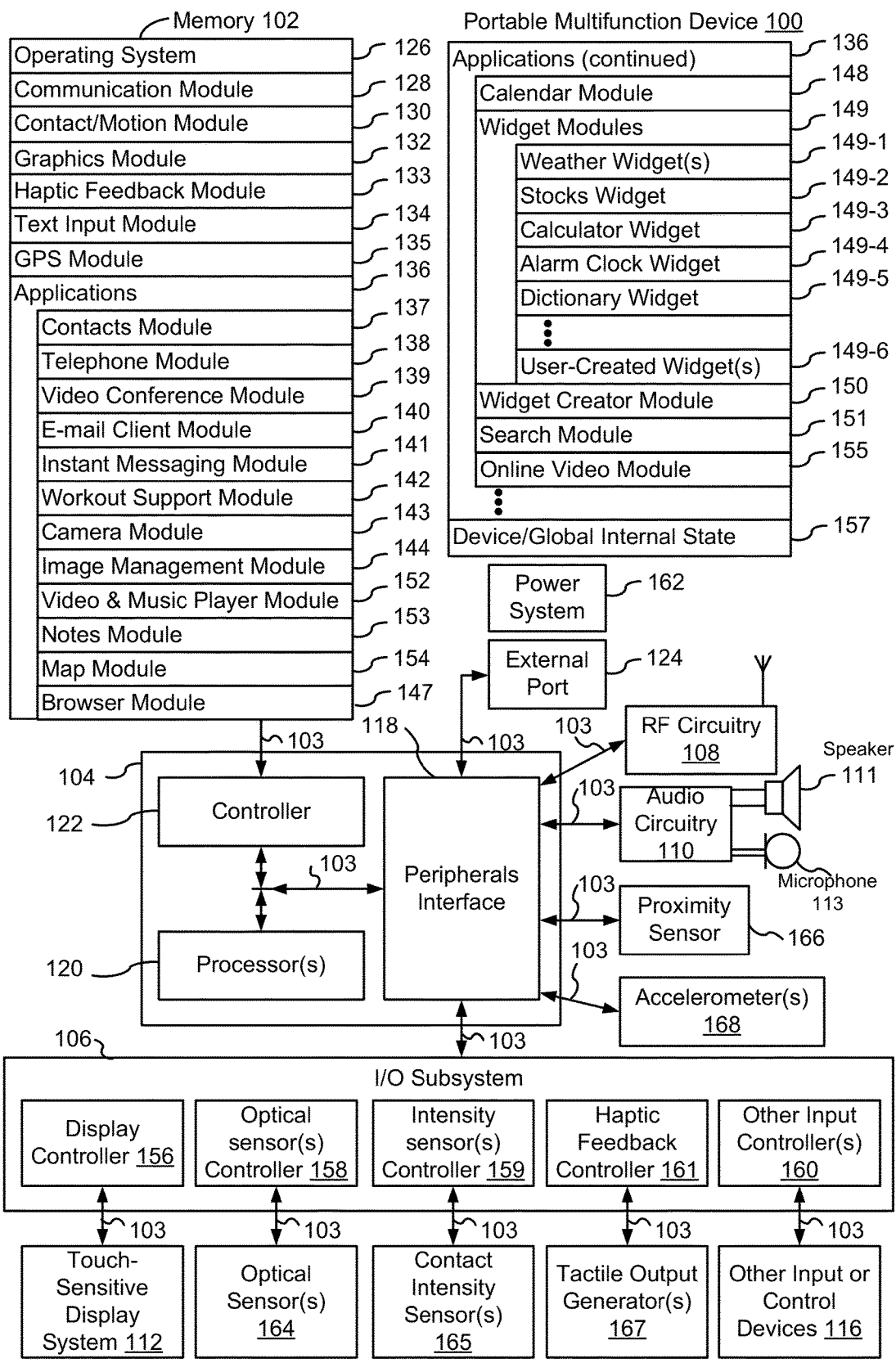
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2A). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2A) optionally include an up/down button for volume control of speaker 111 and/or microphone 113. The one or more buttons optionally include a push button (e.g., 206, FIG. 2A).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user-interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an exemplary embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an exemplary embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. Tactile output generator(s) 167 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
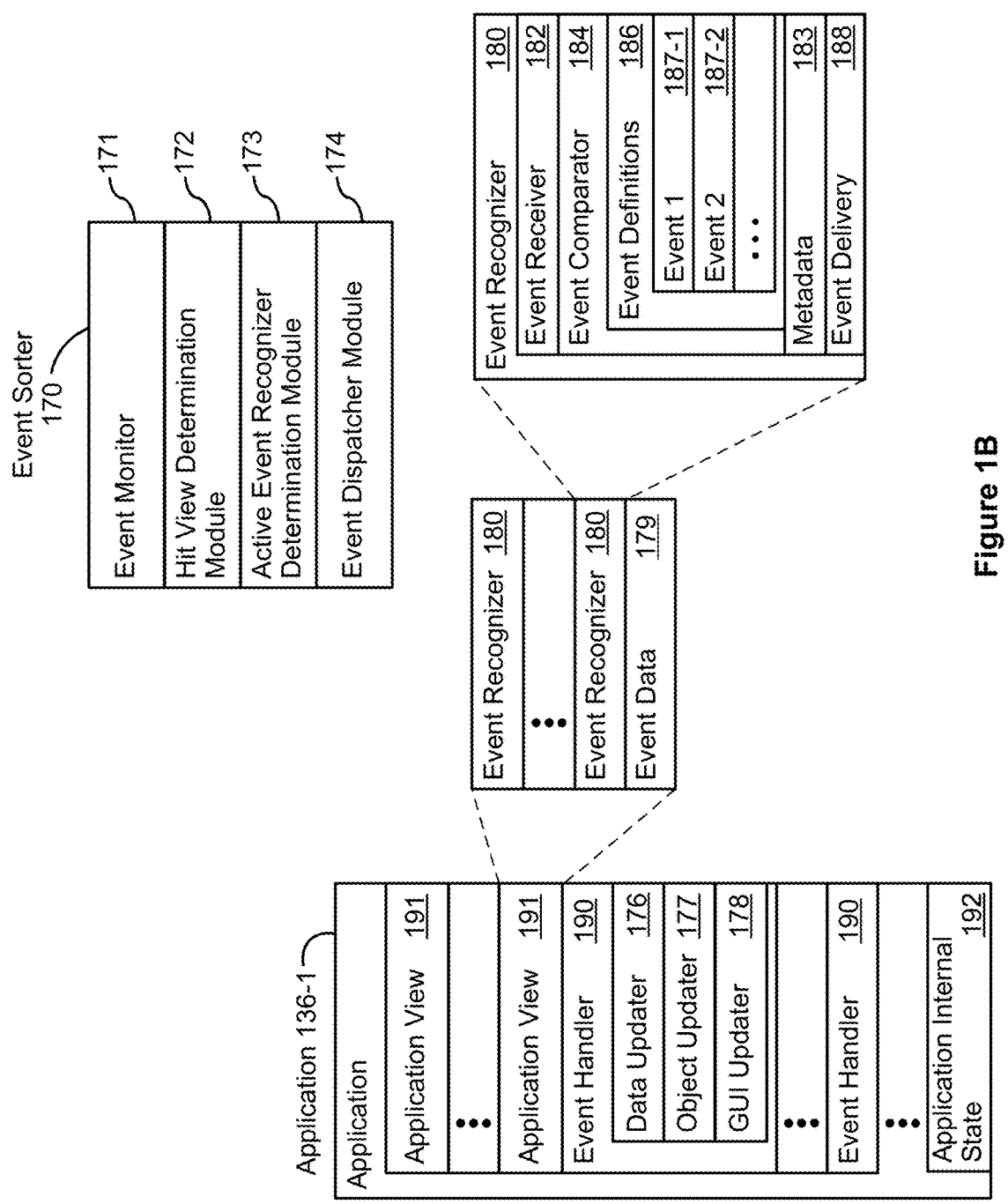
FIG. 1B is a block diagram illustrating exemplary components for event handling, in accordance with some embodiments.

FIG. 1B is a block diagram illustrating exemplary components for event handling in accordance with some embodiments. In some embodiments, memory 102 (in FIG. 1A) includes event sorter 170 (e.g., in operating system 126) and a respective application 136-1 (e.g., any of the aforementioned applications 137-153).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state stored in the memory 102 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double-tap on a displayed object. The double-tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video and music player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

FIG. 2A illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 167 for generating tactile outputs for a user of device 100.

FIG. 2B illustrates an exemplary user interface on a device (e.g., device 100, FIG. 1A) with a touch-sensitive surface 251 (e.g., a tablet or touchpad) that is separate from the display 250. Device 100 also, optionally, includes one or more contact intensity sensors (e.g., one or more of sensors 259) for detecting intensity of contacts on touch-sensitive surface 251 and/or one or more tactile output generators 257 for generating tactile outputs for a user of device 100.

Although many of the examples that follow will be given with reference to inputs on touch screen display 112 (where the touch sensitive surface and the display are combined), in some embodiments, the device detects inputs on a touch-sensitive surface that is separate from the display, as shown in FIG. 2B. In some embodiments, the touch-sensitive surface (e.g., 251 in FIG. 2B) has a primary axis (e.g., 252 in FIG. 2B) that corresponds to a primary axis (e.g., 253 in FIG. 2B) on the display (e.g., 250). In accordance with these embodiments, the device detects contacts (e.g., 260 and 262 in FIG. 2B) with the touch-sensitive surface 251 at locations that correspond to respective locations on the display (e.g., in FIG. 2B, 260 corresponds to 268 and 262 corresponds to 270). In this way, user inputs (e.g., contacts 260 and 262, and movements thereof) detected by the device on the touch-sensitive surface (e.g., 251 in FIG. 2B) are used by the device to manipulate the user interface on the display (e.g., 250 in FIG. 2B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad or touch-sensitive surface 251 in FIG. 2B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 2A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined thresholds values without changing the trackpad or touch-screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures described herein optionally include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$ (e.g., that is at least initially higher than $I_L$), and/or one or more other intensity thresholds (e.g., an intensity threshold $I_H$ that is lower than $I_L$)). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms in duration (e.g., 40, 100, or 120 ms, depending on the magnitude of the second intensity threshold, with the delay time increasing as the second intensity threshold increases). This delay time helps to avoid accidental deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Exemplary factors are described in U.S. patent application Ser. Nos. 14/399,606 and 14/624,296, which are incorporated by reference herein in their entireties.

Figure 2C:
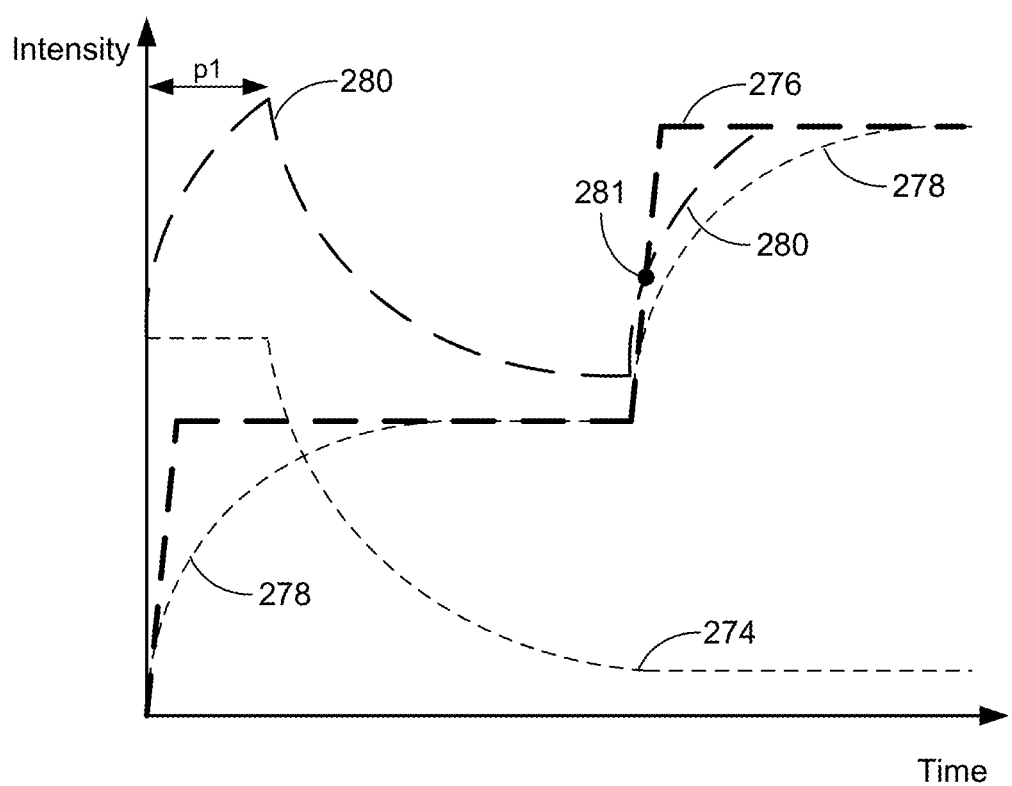
FIGS. 2C-2E illustrate exemplary dynamic intensity thresholds in accordance with some embodiments.

For example, FIG. 2C illustrates a dynamic intensity threshold 280 that changes over time based in part on the intensity of touch input 276 over time. Dynamic intensity threshold 280 is a sum of two components, first component 274 that decays over time after a predefined delay time p1 from when touch input 276 is initially detected, and second component 278 that trails the intensity of touch input 276 over time. The initial high intensity threshold of first component 274 reduces accidental triggering of a "deep press" response, while still allowing an immediate "deep press" response if touch input 276 provides sufficient intensity. Second component 278 reduces unintentional triggering of a "deep press" response by gradual intensity fluctuations of in a touch input. In some embodiments, when touch input 276 satisfies dynamic intensity threshold 280 (e.g., at point 281 in FIG. 2C), the "deep press" response is triggered.

Figure 2D:
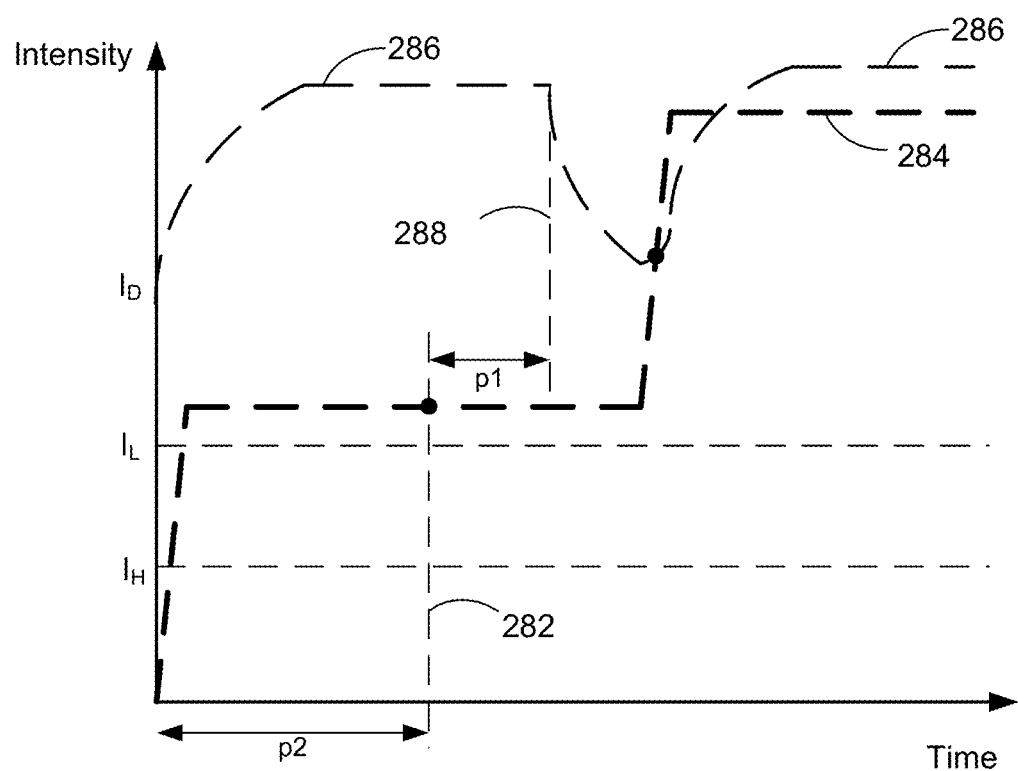

FIG. 2D illustrates another dynamic intensity threshold 286 (e.g., intensity threshold $I_D$). FIG. 2D also illustrates two other intensity thresholds: a first intensity threshold $I_H$ and a second intensity threshold $I_L$. In FIG. 2D, although touch input 284 satisfies the first intensity threshold $I_H$ and the second intensity threshold $I_L$ prior to time p2, no response is provided until delay time p2 has elapsed at time 282. Also in FIG. 2D, dynamic intensity threshold 286 decays over time, with the decay starting at time 288 after a predefined delay time p1 has elapsed from time 282 (when the response associated with the second intensity threshold $I_L$ was triggered). This type of dynamic intensity threshold reduces accidental triggering of a response associated with the dynamic intensity threshold $I_D$ immediately after, or concurrently with, triggering a response associated with a lower intensity threshold, such as the first intensity threshold $I_H$ or the second intensity threshold $I_L$.

Figure 2E:
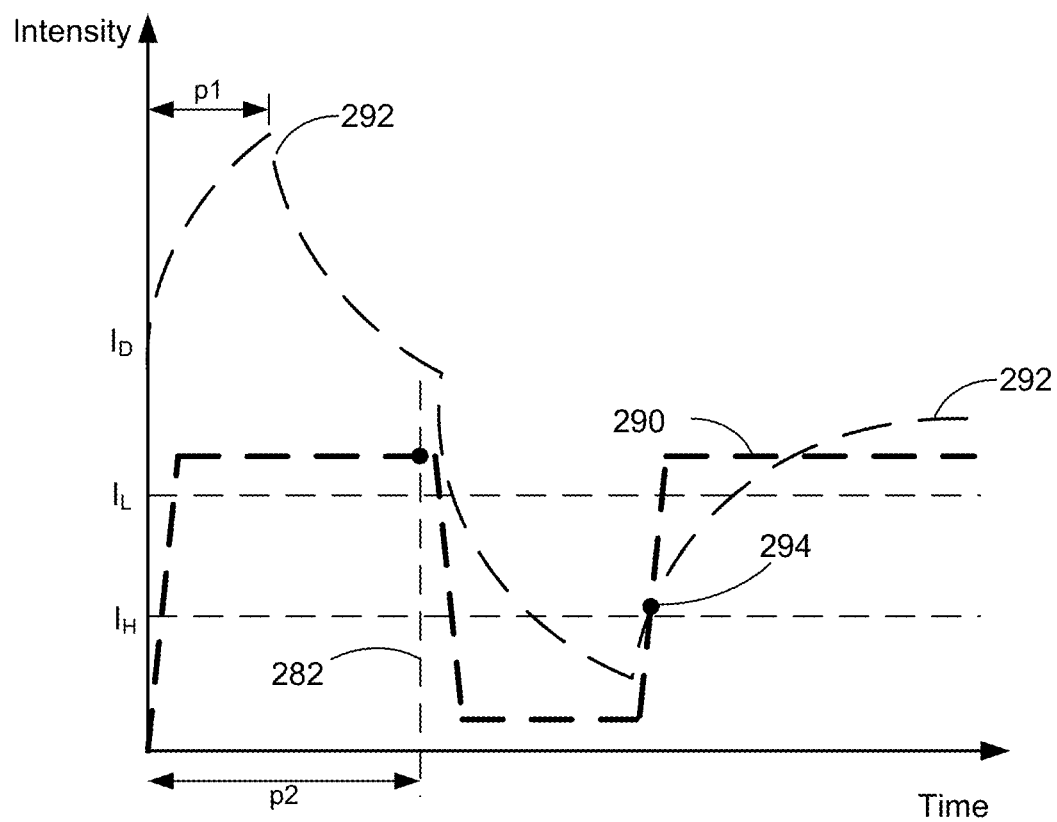

FIG. 2E illustrate yet another dynamic intensity threshold 292 (e.g., intensity threshold $I_D$). In FIG. 2E, a response associated with the intensity threshold $I_L$ is triggered after the delay time p2 has elapsed from when touch input 290 is initially detected. Concurrently, dynamic intensity threshold 292 decays after the predefined delay time p1 has elapsed from when touch input 290 is initially detected. So a decrease in intensity of touch input 290 after triggering the response associated with the intensity threshold $I_L$, followed by an increase in the intensity of touch input 290, without releasing touch input 290, can trigger a response associated with the intensity threshold $I_D$ (e.g., at time 294) even when the intensity of touch input 290 is below another intensity threshold, for example, the intensity threshold $I_L$.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

FIG. 3 is a schematic of a user interface for a menu of applications on portable multifunction device 100, in accordance with some embodiments. Similar user interfaces may be implemented on a desktop device 300 in accordance with some embodiments. In some embodiments, user interface 300 includes the following elements, or a subset or superset thereof:

Signal strength indicator(s) 302 for wireless communication(s), such as cellular and Wi-Fi signals;
Time 304;
Bluetooth indicator 305;
Battery status indicator 306;
Tray 308 with icons for frequently used applications, such as:
  Phone 138, which may include an indicator 314 of the number of missed calls or voicemail messages;
  E-mail client 140, which may include an indicator 310 of the number of unread e-mails;
  Browser 147; and
  Video and music player 145, also referred to as iPod (trademark of Apple Inc.) module 152; and
Icons for other applications, such as:
  IM 141;
  Calendar 148;
  Image management 144;
  Camera 143;
  Online video module 145, also referred to as YouTube (trademark of Google Inc.) module 145;
  Stocks 149-2;
  Map 146;
  Weather 149-1;
  Dictionary 149-3;
  User-Created Widget 149-6;
  Notes 146;
  Settings 312, which provides access to settings for device 100 and its various applications 136;
  Word processor 153-1;
  Drawing 153-2;
  Spreadsheet 153-3; and
  Presentation 153-4.

USER INTERFACES AND ASSOCIATED PROCESSES

Attention is now directed towards embodiments of processes and associated user interfaces ("UI") that may be implemented on an electronic device with a display, a touch-sensitive surface, and optionally one or more sensors to detect intensities of contacts with the touch-sensitive surface, such as the portable multifunction device 100.

FIG. 4A is a flow chart illustrating a method 400 of cursor manipulation, in accordance with some embodiments. The method 400 is performed at a portable multifunction device (e.g., the device 100 in FIG. 1A) with a touch screen display (e.g., the touch screen display 112 in FIG. 1A). As described below, the method 400 provides an expedient mechanism for selecting content at a portable multifunction device with a touch screen display. This method is both faster and easier to perform than using a peripheral device, like a mouse. The method is also intuitive to a user, thereby reducing the number, extent, and/or nature of the inputs from the user when selecting content, and creating a more efficient human-machine interface. A more efficient input mechanism also requires less computing resources, thereby increasing battery life of the device.

In some embodiments, the device 100 displays content of an electronic document on the touch screen display 112. In some embodiments, the content comprises text (e.g., plain text, unstructured text, formatted text, or text in a web page). In other embodiments, the content comprises graphics with or without text. Moreover, the content may be editable or read-only. In addition to displaying the content, when no content is selected, the device 100 may display a cursor within the electronic document, e.g., for text entry. In some embodiments, while displaying the content of the electronic document, the device 100 detects two substantially simultaneous touch inputs at 402. These two substantially simultaneous touch inputs can occur and be detected anywhere on the screen, including over an active virtual keyboard being displayed on the screen.

In some embodiments, the device 100 continuously monitors touch inputs and continuous movements of the touch inputs on the touch screen 112. Once touch inputs are detected by the device 100, the device 100 determines whether the two substantially simultaneous touch inputs are located on a soft keyboard on the touch screen at 406. In response to detecting the two substantially simultaneous touch inputs that started on the soft keyboard (406—Yes), the device 100 displays a soft keyboard that has a changed appearance at 404. In some embodiments, the device continuously monitors the touch inputs at step 406 so that the appearance of the keyboard remains changed when the two substantially simultaneous touch inputs that started on the soft keyboard are followed by a continuous movement of the two substantially simultaneous touch inputs without breaking contact with the touch screen 112. In other words, the device at step 406 detects whether there were two substantially simultaneous inputs on the soft keyboard either with or without a subsequent continuous movement off the keyboard. In some embodiments, in response to detecting the two substantially simultaneous touch inputs where not initially detected on the soft keyboard (406—No), the device 100 displays a soft keyboard with an unchanged appearance at 408, e.g., displays a regular unblurred soft keyboard or a keyboard with all alphanumeric characters displayed. A soft keyboard is a set of multiple virtual keys displayed on the screen, e.g., a QWERTY keyboard, as shown in FIG. 13A.

Figure 13A:
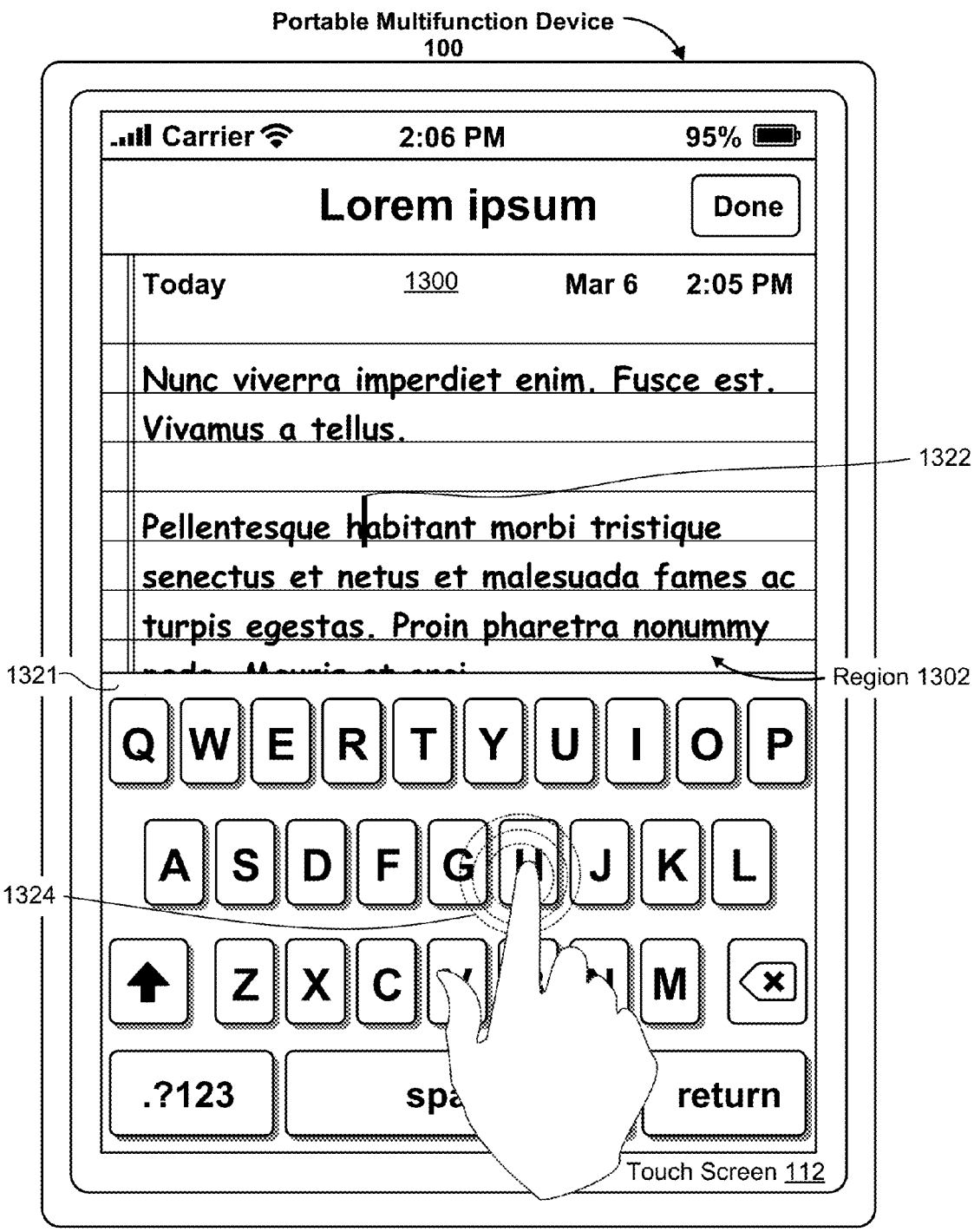
FIGS. 13A-13Q illustrate exemplary user interfaces for manipulating a cursor and selecting content in accordance with some embodiments.

In FIG. 13A, the exemplary soft keyboard 1321 has multiple virtual keys and each key has a respective alphanumeric character. In addition, in some embodiments, each key has simulated three-dimensional characteristics (e.g., a three-dimensional shape, drop shadow, etc.) In some embodiments, in response to detecting two substantially simultaneous touch inputs at a first location on the soft keyboard, the device 100 displays a soft keyboard with a changed appearance as shown in FIG. 13B. In comparison with the soft keyboard with the unchanged appearance shown in FIG. 13A, the soft keyboard 1321 with the changed appearance shown in FIG. 13B does not have the simulated three-dimensional characteristics (e.g., the drop shadow is removed) and the alphanumeric characters on the keys are removed. In addition, in some embodiments, the color, hue, saturation, brightness, and/or contrast of the soft keyboard 1321 is also changed (e.g., semitransparent) to indicate that the application has entered a mode that is different from a text entering mode. In the non-text entering mode, the soft keyboard is not responsive to keystrokes for text entries, but rather serves as an onscreen touchpad or track pad for moving the cursor or for selecting content. The changed keyboard appearance provides an intuitive indication that the function of the soft keyboard has changed.

As shown in FIG. 13B, in some embodiments, the device 100 detects a sliding gesture 1332 starting from the first location on the soft keyboard 1321 to a second location anywhere on the touch screen 112. The sliding gesture 1332 follows the two substantially simultaneous touch inputs without breaking contact with the touch screen 112, e.g., it starts on the soft keyboard and moves beyond the soft keyboard 1321 into the content region 1302. In response to detecting the sliding gesture, the device 100 maintains the changed appearance of the soft keyboard 1320 throughout the entire sliding gesture. At the end of the sliding gesture, as shown in FIG. 13C, in response to a lift-off gesture, the device 100 displays the soft keyboard with its original unchanged appearance, e.g., with the alphanumeric characters on the virtual keys and the three-dimensional characteristics of the virtual keys and/or an unblurred the virtual keyboard.

Figure 7A:
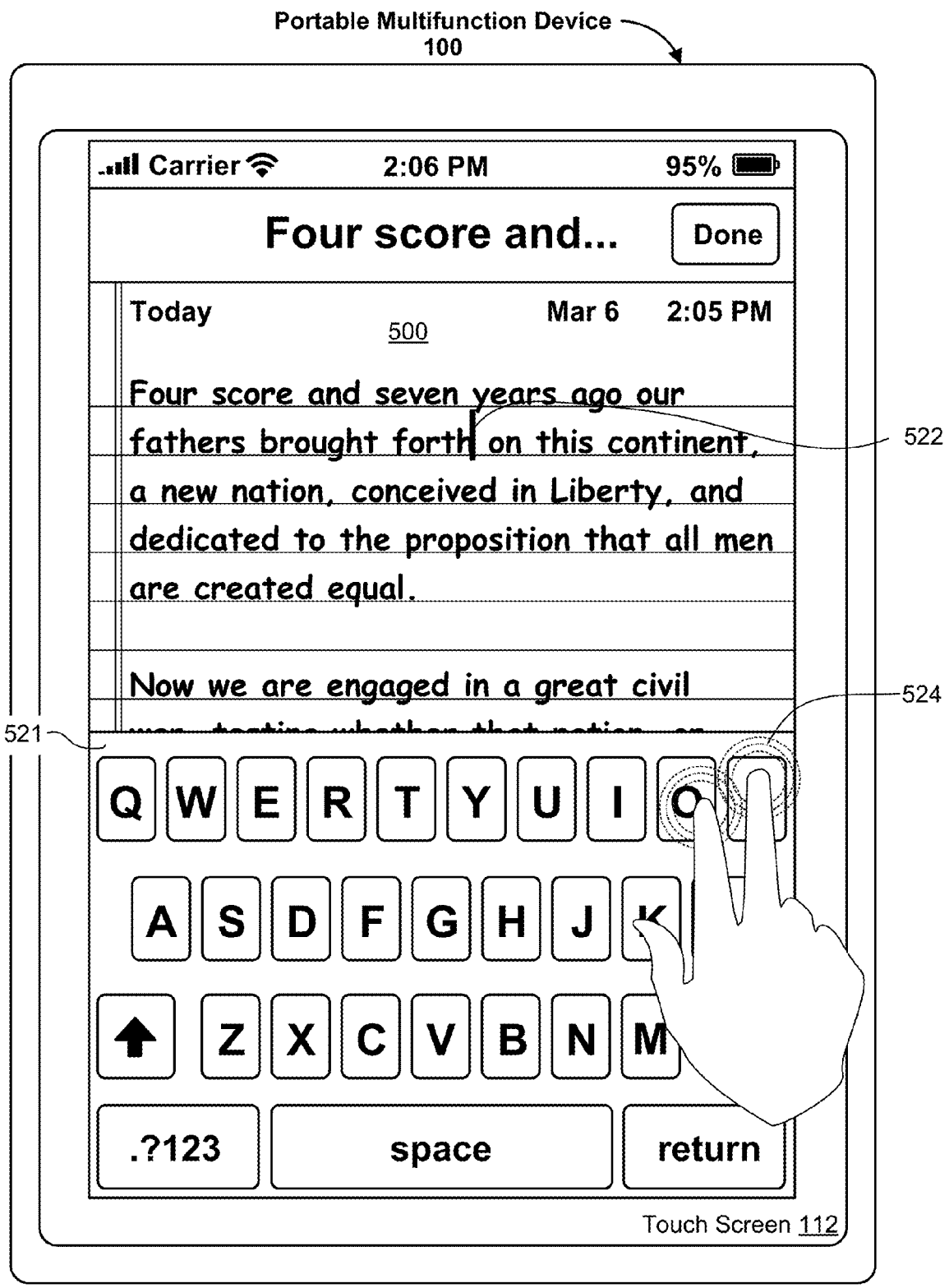
FIGS. 7A-7C illustrate exemplary keyboard appearance changes in response to two substantially simultaneous touch inputs, in accordance with some embodiments.
Figure 7B:
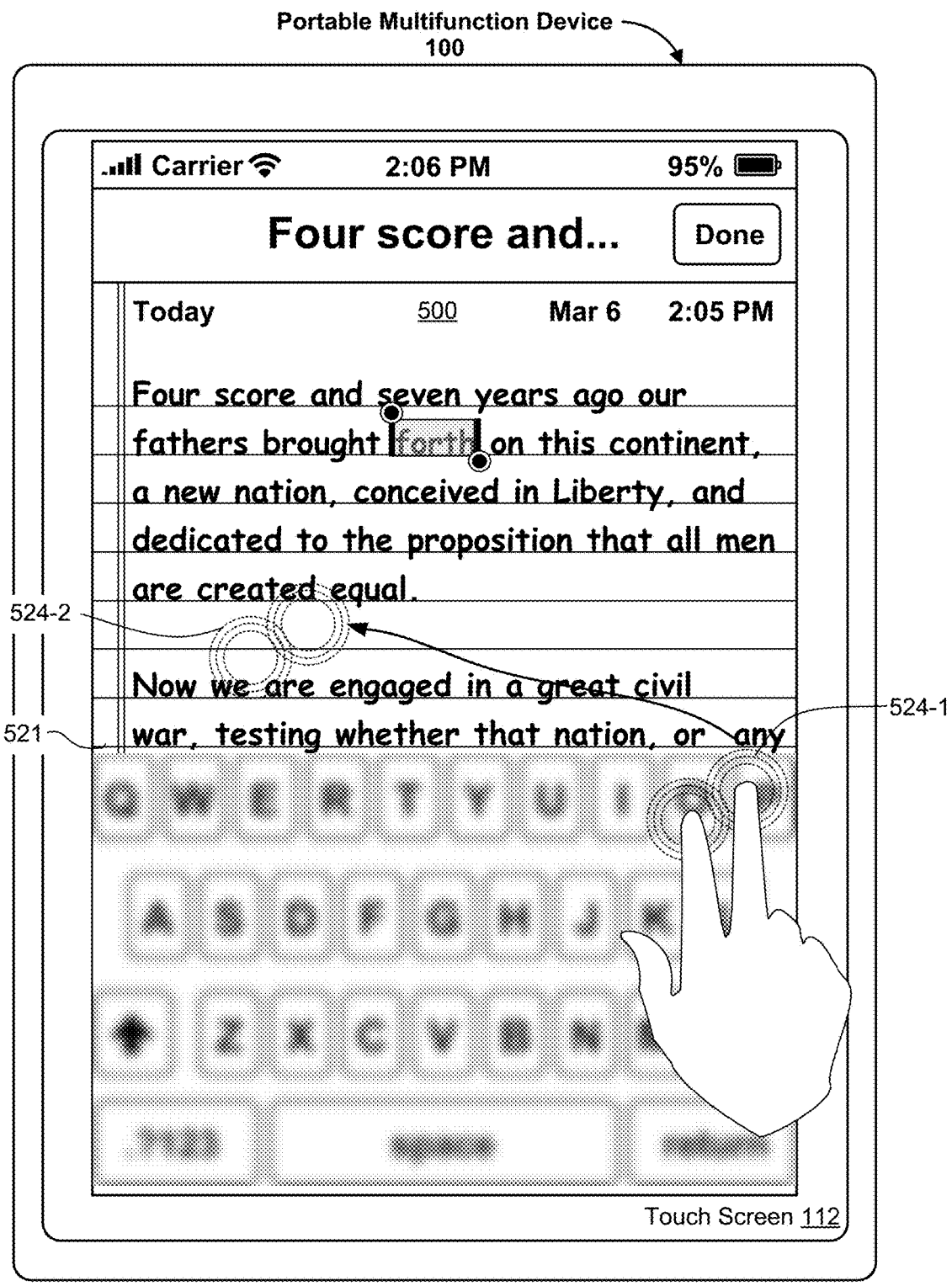
Figure 7C:
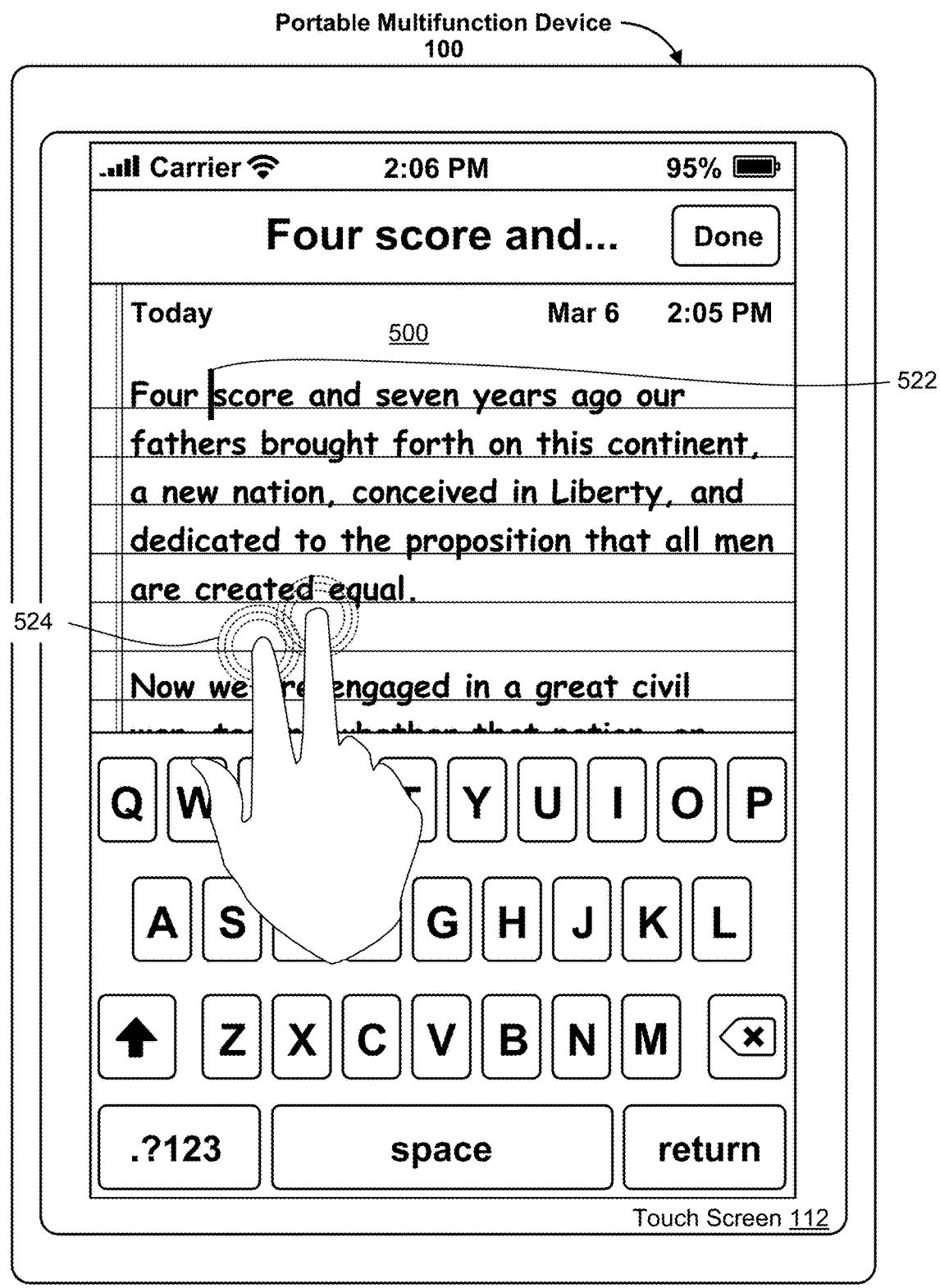

FIGS. 7A-7C illustrate exemplary user interfaces of soft keyboard appearance changes, in accordance with some embodiments. In FIG. 7A, content of an electronic document is displayed on the touch screen display 112. Also displayed on the touch screen display 112 is a soft keyboard 521 that is displayed in focus. Subsequently, the device 100 detects two substantially simultaneous touch inputs (e.g., two-finger tap) 524 on the soft keyboard 521. In response to detecting the two substantially simultaneous touch inputs on the soft keyboard 521, the device 100 displays a blurred soft keyboard 521, as shown in FIG. 7B.

In some embodiments, instead of displaying the blurred soft keyboard, the device changes one or more of: color, hue, saturation, brightness, and contrast of the soft keyboard 521 based on the content of the electronic document. In some embodiments, the appearance of the blurred keyboard 521 is based on the content displayed and a set of control-appearance values for blur radius, saturation adjustment, opacity of a white overlay, opacity of a black overlay, opacity of user interface elements in keyboard 521, and/or the color of text displayed in the region where the keyboard 521 is displayed. For example, in FIG. 7B, the region where keyboard 521 is located has been blurred in accordance with a value for the blur radius, the black text color of the content 500, etc.

As shown in FIG. 7B, once the device 100 detects a continuous movement without breaking contact with the touch screen display following the two substantially simultaneous touch input from location 524-1 on the keyboard 521, leaving the keyboard 521, and moving to location 524-2 on the content 500 and not over the keyboard. In response, the device 100 replaces the display of the blurred soft keyboard with display of focused soft keyboard 521, as shown in FIG. 7C. Subsequently, as shown in FIG. 7C, as long as the touch inputs 524 are not located on the keyboard 521, the keyboard stays in focus.

Referring back to FIG. 4A, following the detection of two substantially simultaneous touch inputs, the portable multifunction device 100 determines whether prior to detecting the touch inputs, there is an existing selection of the content at 411. By a selection it is meant that certain text, graphics, or other objects are selected (e.g., shown as highlighted text). If the device 100 does not detect an existing selection, the device 100 then determines the type of touch input at 413. The portable multifunction device 100 can identify at least four types of the touch inputs, namely, drag, tap, hold-and-drag, and flick, among others. In some embodiments, a drag input is a sliding gesture along the surface of the touch screen. In some embodiments, a tap is a touch contact followed by a lift-off or release of contact from the surface of the touch screen, without any intervening sliding gesture detected between the touch and the lift-off. In some embodiments, a hold-and-drag is an initial touch contact, followed by a predetermined period of time greater than zero (the hold period) (e.g., 1.5 seconds), and then followed by a sliding gesture on the surface of the touch screen away from the initial point of contact, without any intervening lift-off or release of contact from the surface of the touch screen. In some embodiments, a flick is a rapid sliding gesture in a single direction along the surface of the touch screen followed by a lift-off or release of contact from the surface of the touch screen.

Depending on the type of the touch input received, the device 100 performs different actions. As shown in FIG. 4A, if a drag is detected immediately after the two touch inputs are detected at 402 (e.g., with no intervening lift-off), then the device 100 moves the cursor, at 421. In some embodiments, prior to dragging the cursor, the cursor is animated (e.g., enlarged) to clearly indicate the beginning of a cursor movement. In some embodiments, a ghost cursor is displayed while the cursor is being moved or instead of the actual cursor being moved. For example, a ghost cursor can be a cursor with a different appearance, such as a lighter colored cursor, that is offset from the cursor but linked to it, so that when the cursor moves around the screen, so does the ghost cursor. Alternatively, the ghost cursor is a lighter colored cursor, while the cursor is moved around the screen by the user, the ghost cursor shows the closest right position for the cursor, until a lift off event occurs, whereafter the real cursor replaces the ghost cursor at the position of the ghost cursor when the lift off event occurred. If a tap is detected (e.g., if after the two touch inputs are detected at 402, a lift-off is detected without any intervening swipe gesture), then a portion of the document, such as a word, image, or other object closest to the cursor is selected, at 442. If a hold and drag is detected (e.g., the touch inputs remain in contact with the screen without moving for a predetermined period of time before the drag gesture occurs), then the device 100 starts selecting text and/or graphics while the selection is extended in the direction of the drag gesture, at 452. If a flick is detected, then the device 100 moves the cursor to a distal point of the text of the document, at 430. For example, the distal point in the text is the end or beginning of a line or a top or bottom of a page or document. Examples are described in further detail below with respect to each type of touch input.

For example, if the type of touch input is a drag and the touch input is not located on a selection, then the device 100 moves the cursor and displays a ghost cursor at 421. FIG. 5A illustrates an exemplary user interface for dragging cursor when there is no existing selection of content, in accordance with some embodiments. In this embodiment, the electronic document 500 is displayed in the user interface of an application (e.g., a word processing application 152, a presentation application 153, a spreadsheet application 155, or the like). The application user interface in which document 500 is displayed may include toolbar 510 and button(s) 512 for navigating to, if any, other documents. Electronic document 500 includes content, such as text, images, objects, tables, charts, and so on. In addition to displaying the content of the electronic document, the device 100 further displays a cursor 522-1 within the electronic document. In some embodiments, the cursor 522-1 is the same as an insertion point. In some embodiments, the insertion point marker is identified by an insertion point marker 522-1.

While document 500 is displayed in a document editing mode, keyboard 521 is also displayed. A user may enter text into document 500 by typing on keyboard 521, and confirm completion of editing of document 500 by performing a touch input (e.g., a tap on "done" button 512) to exit an editing mode.

In some embodiments, the device 100 detects two substantially simultaneous touch inputs at a first region 524-1, 524-2 on the touch screen display 112. The device 100 can further determine that the two substantially simultaneous touch inputs remain in contact with the touch screen display 112, and detect a continuous touch gesture or drag gesture from a location of the two substantially simultaneous touch inputs across the touch screen display from the first region 524-1, 524-2 to a second region 524-3, 524-3. In response to detecting the continuous touch gesture, the device 100 moves the cursor or insertion point marker 522-1 across document 500 from the current location 522-1 in FIG. 5A to a new location 522-2 in FIG. 5B along a path 533 of the continuous gesture.

Figure 5B:
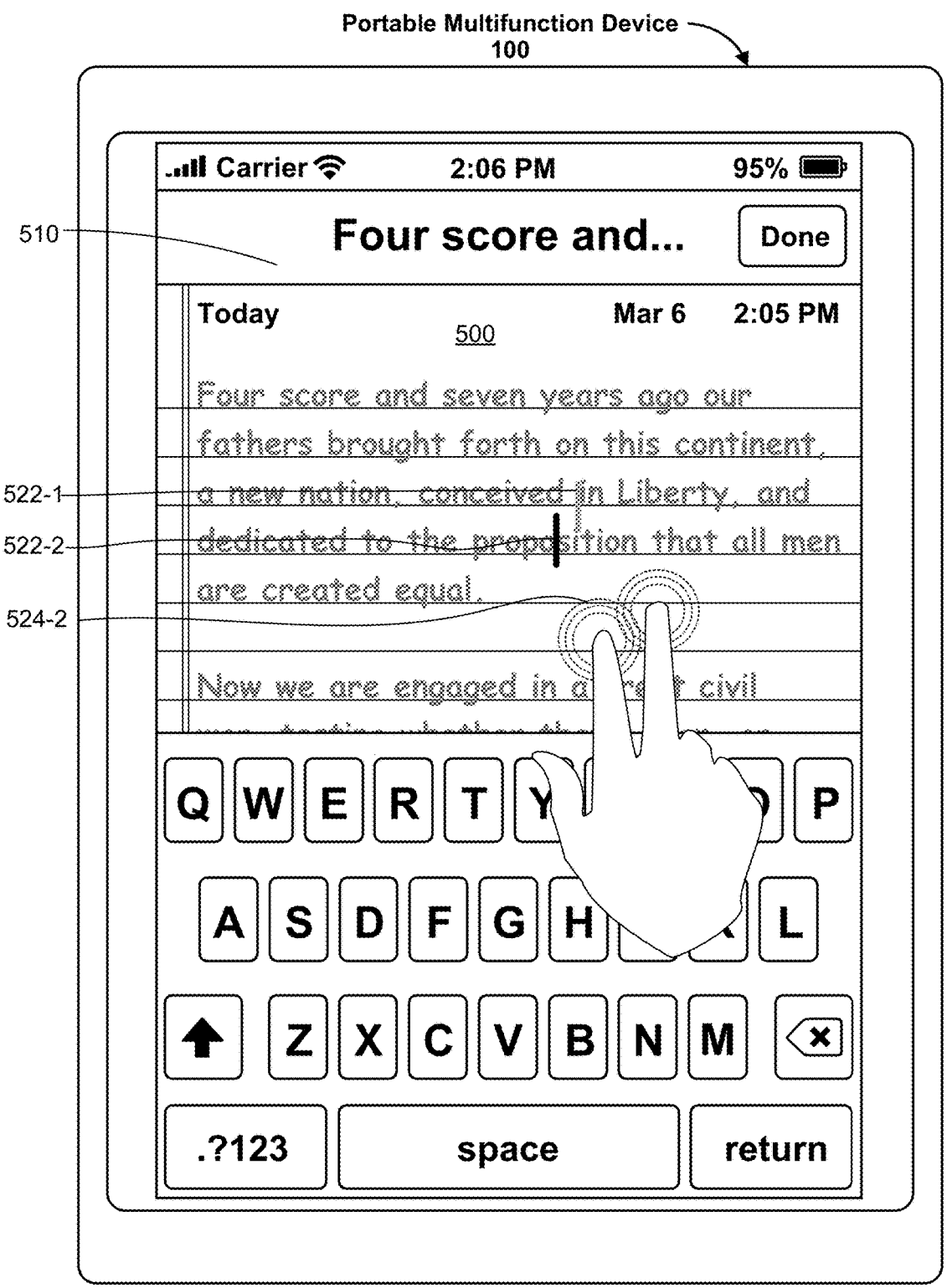

FIG. 5B illustrates an exemplary user interface brought about by the drag gesture of FIG. 5A, in accordance with some embodiments. In some embodiments, as soon as the device 100 determines that there is a drag gesture (421 of FIG. 4A), it displays a ghost cursor 522-2 offset from the real cursor 522-1. In this embodiment, when the user drags their two-fingers around the screen, both the cursor 522-1 and the ghost cursor 522-2 move together, e.g., the ghost cursor is linked to the actual cursor. The position of this ghost cursor is the position in the document where the actual cursor will be placed when the user lifts their fingers from the screen (e.g., a lift-off event of the two-fingers), e.g., while dragging, the ghost cursor 522-2 moves in the direction of the two-finger drag gesture, and indicates the position where the cursor 522-1 will be dropped or displayed when the user lifts the two fingers. In some embodiments, the ghost cursor 522-2 has a different appearance to the cursor 522-1. For example, the ghost cursor 522-2 can have a different color, size, and/or shape to the cursor 522-1. The ghost cursor 522-2 can also be animated to get the user's attention. For example, the animation of the cursor 522-1 can include shrinking, enlarging, rotating, blinking, and/or flipping, or the like.

In another embodiment, instead of moving the cursor while dragging two-fingers (e.g., a two-finger slide gesture), the ghost cursor 522-2 moves but not the actual cursor. In some embodiments, a distance between the first region 524-1, 524-2 and the second region 524-3, 524-4 of the touch inputs in FIG. 5A is substantially the same as a distance between the original location of the cursor shown in FIG. 5A and a new location of the cursor shown in FIG. 5B. On release of the two-finger drag, the device 100 places the cursor 522-1 at the location of the ghost cursor 522-2. As a result, upon detecting the termination of the continuous touch gesture, the device 100 ceases display of the ghost cursor 522-2, and the insertion marker 522-3 replaces the ghost cursor 522-2, as shown in FIG. 5C.

Figure 5C:
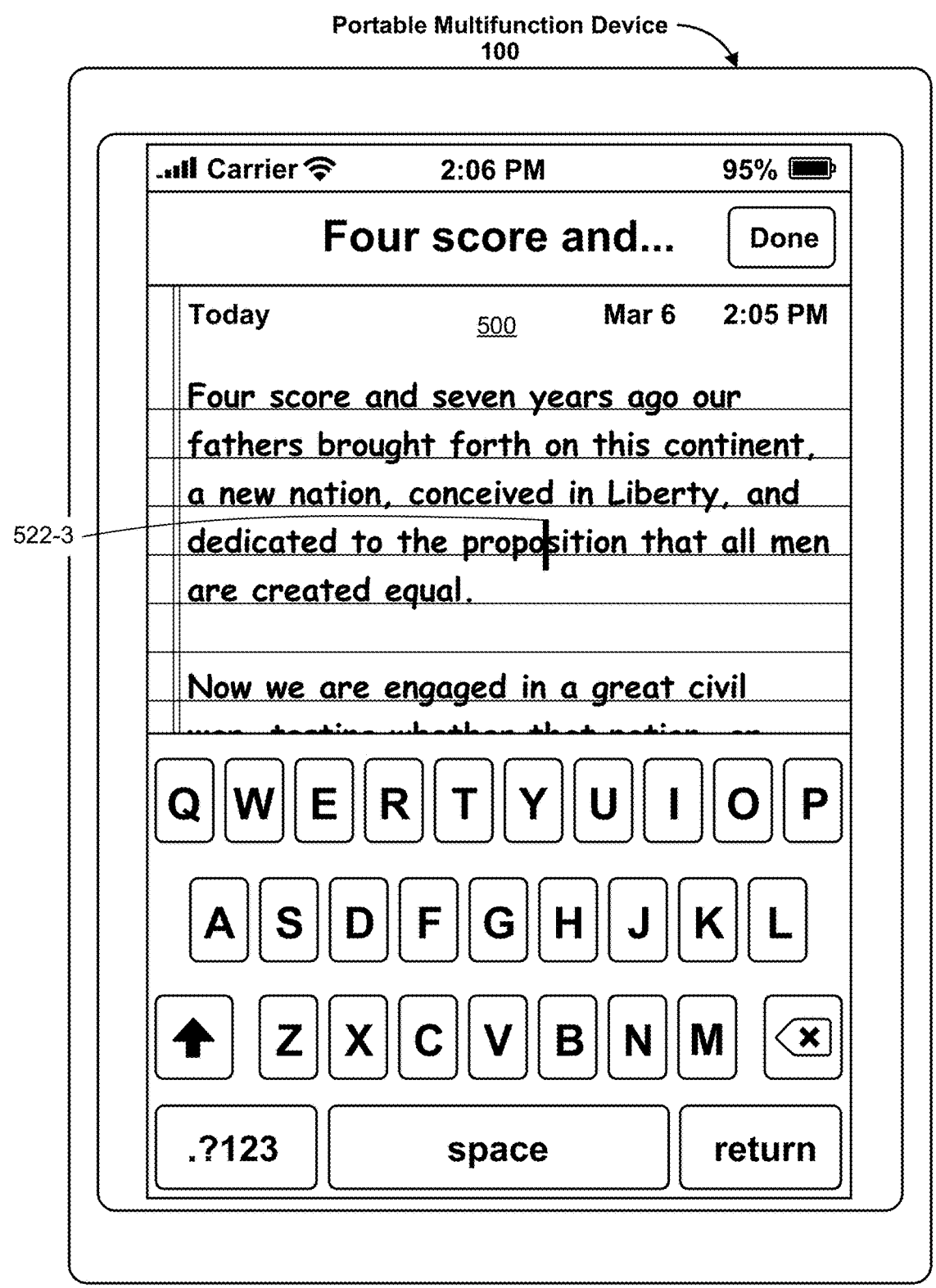
Figure 5D:
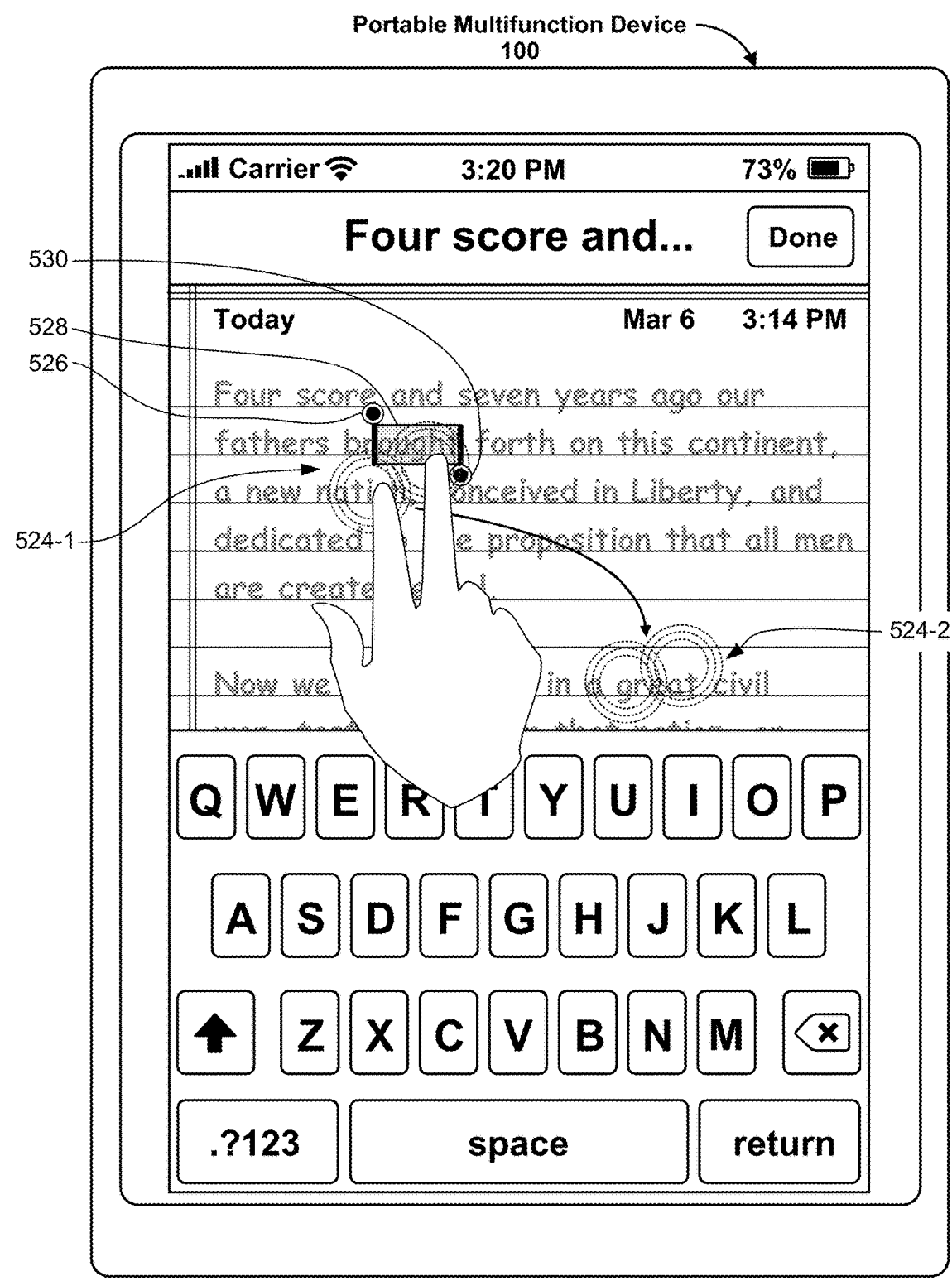
Figure 5E:
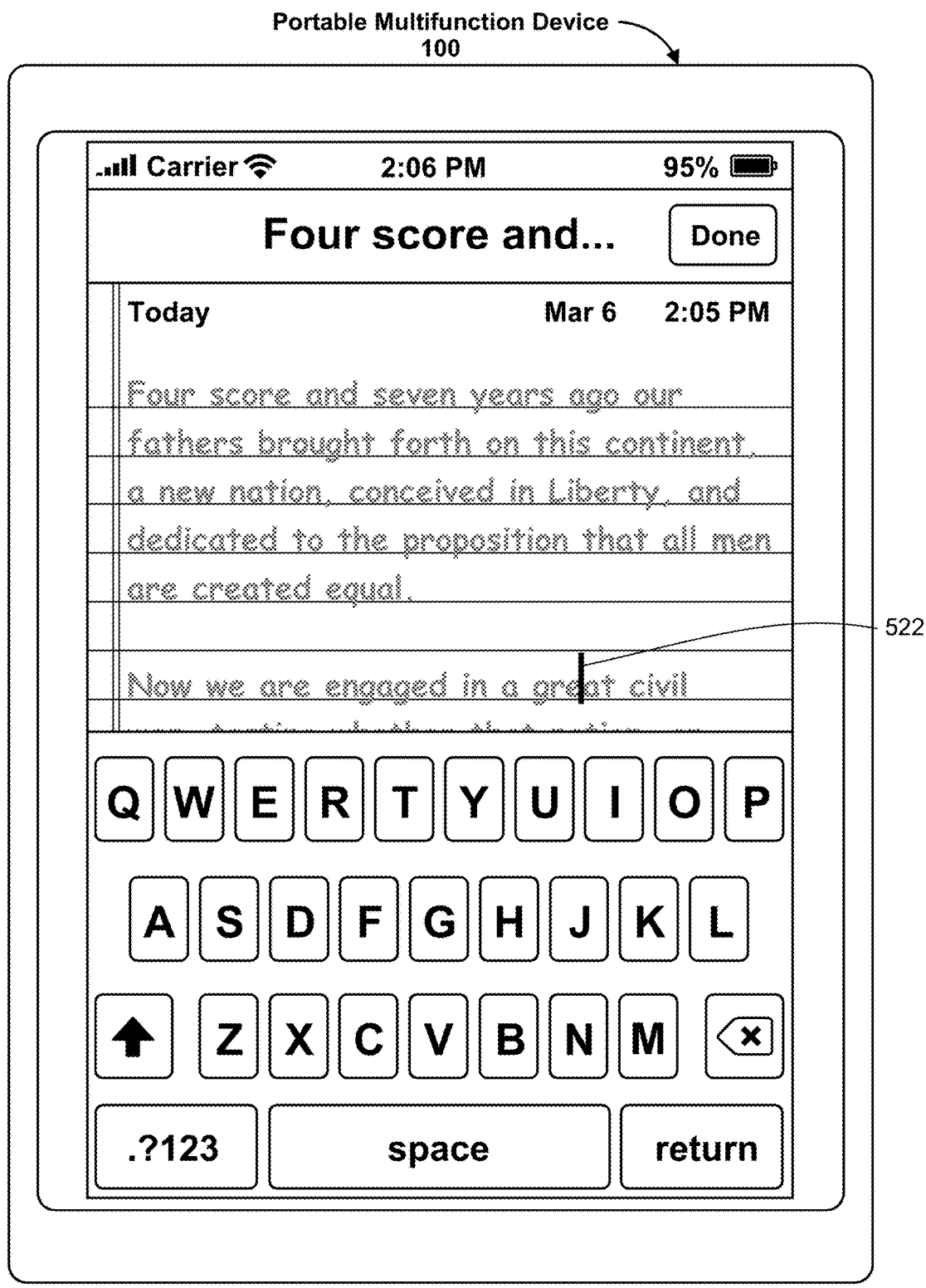

The above examples as shown in FIGS. 5A-5C illustrate cursor manipulation in response to detecting a drag gesture when there is no existing selection of content. Referring back to FIG. 4A, if there is existing selection of content in the document (411—Yes) (e.g., a word is selected), then the device 100 determines if the touch inputs are located on the selection at 415. If the device 100 determines that the touch inputs are located on the selection (415—Yes), the device then determines the type of touch input at 417. If the touch input is a drag gesture, then the device 100 dismisses the selection and moves the cursor in a direction of the drag at 433. FIGS. 5D-5E illustrate exemplary user interfaces implementing step 433 in response to a drag gesture.

For example, as shown in FIG. 5D, the device 100 detects a selection of a portion of the content 500 and displays the selection 528. For example, the selection of "ought" from the word "brought" is highlighted as selected. In some embodiments, the device 100 displays markers, such as a start-point object 526 and an end-point object 530 at respective ends of "ought" to indicate the selection 528. The device 100 can detect two substantially simultaneous touch inputs at a first region 524-1 on the touch screen display followed by a continuous touch movement or drag gesture of the two substantially simultaneous touch inputs across the touch screen display from the first region 524-1 to a second region 524-2. The first region 524-1 is at least partially over the selection 528. In response to detecting the continuous touch movement or drag gesture, the device 100 dismisses the selection 528 and moves the cursor 522 to a new location as shown in FIG. 5E. In some embodiments, the new location is at a proximate location of the termination of the two-finger drag.

In some embodiments, in addition to the selection indicators 526-530, the device 100 displays a command display area adjacent to the selected content 528 as shown in FIG. 5AR and described in greater detail below. The command display area includes affordances such as an affordance for cutting the selected content 528 and an affordance for copying the selected content 528 (e.g., "Cut" icon 542 and "Copy" icon 544 in FIG. 5AR). In some embodiments, the command display area is displayed every time text is selected. In some embodiments, when the text is selected by two substantially simultaneous touch inputs, the command display area is not displayed until the device 100 detects a tap on the selected text.

Referring back to FIG. 4A, in some embodiments, if the device 100 determines that the touch inputs are not on the selection (415—No) (e.g., outside the selection), and then determines at 419 that the touch inputs are a drag gesture, then the device 100 expands the selection in accordance with the dragging gesture at 434.

For example, prior to detecting touch inputs, the device 100 detects an existing selection of a portion of the content and displays the selection. The selection is highlighted, and the device 100 displays markers, such as a start-point object and an end-point object at respective ends of the selection. After displaying a soft keyboard that has a changed appearance in response to detecting two substantially simultaneous touch inputs on the soft keyboard, the device 100 detects a continuous movement of the two substantially simultaneous touch inputs from a first location on the soft keyboard to a second location anywhere on the touch screen display (e.g., within the boundaries of the soft keyboard or beyond the soft keyboard and onto the content region) without breaking contact with the touch screen display. In response to detecting the continuous movement that started on the soft keyboard outside the selected content, the device expands the selected content to include additional content beyond the portion in a direction towards the second location in response to detecting the continuous movement.

In some embodiments, when expanding the selected content, the selection can expand either backward or forward. The initial direction of the drag gesture determines the direction of the expansion. For example, a right and/or down continuous movement moves the end-point object right and/or down without moving the start-point object in order to expand the selection forward; while a left and/or up drag gesture moves the start-point object 530 left and/or up without moving the end-point object in order to expand the selection backward. In some embodiments, the selection expands one word at a time if the continuous movement is fast, and expands one character at a time if the continuous movement is slow.

In some embodiments, in accordance with a determination that the touch inputs are not on the selection (415—No) (e.g., outside the selection) and determines at 419 that the touch inputs are a drag gesture, the device 100 dismisses the selection and moves the cursor in a direction of the drag gesture.

Figure 5F:
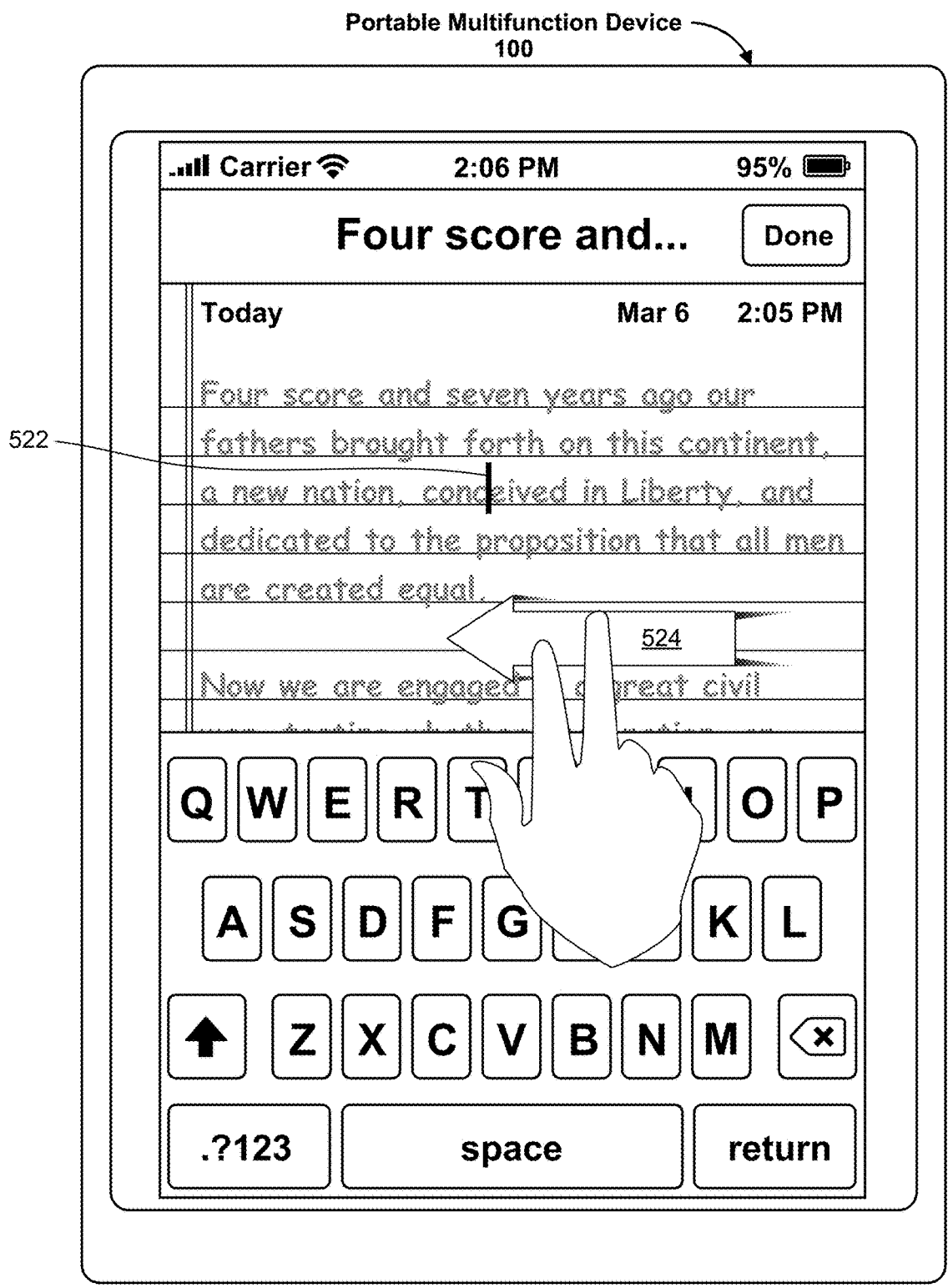
Figure 5G:
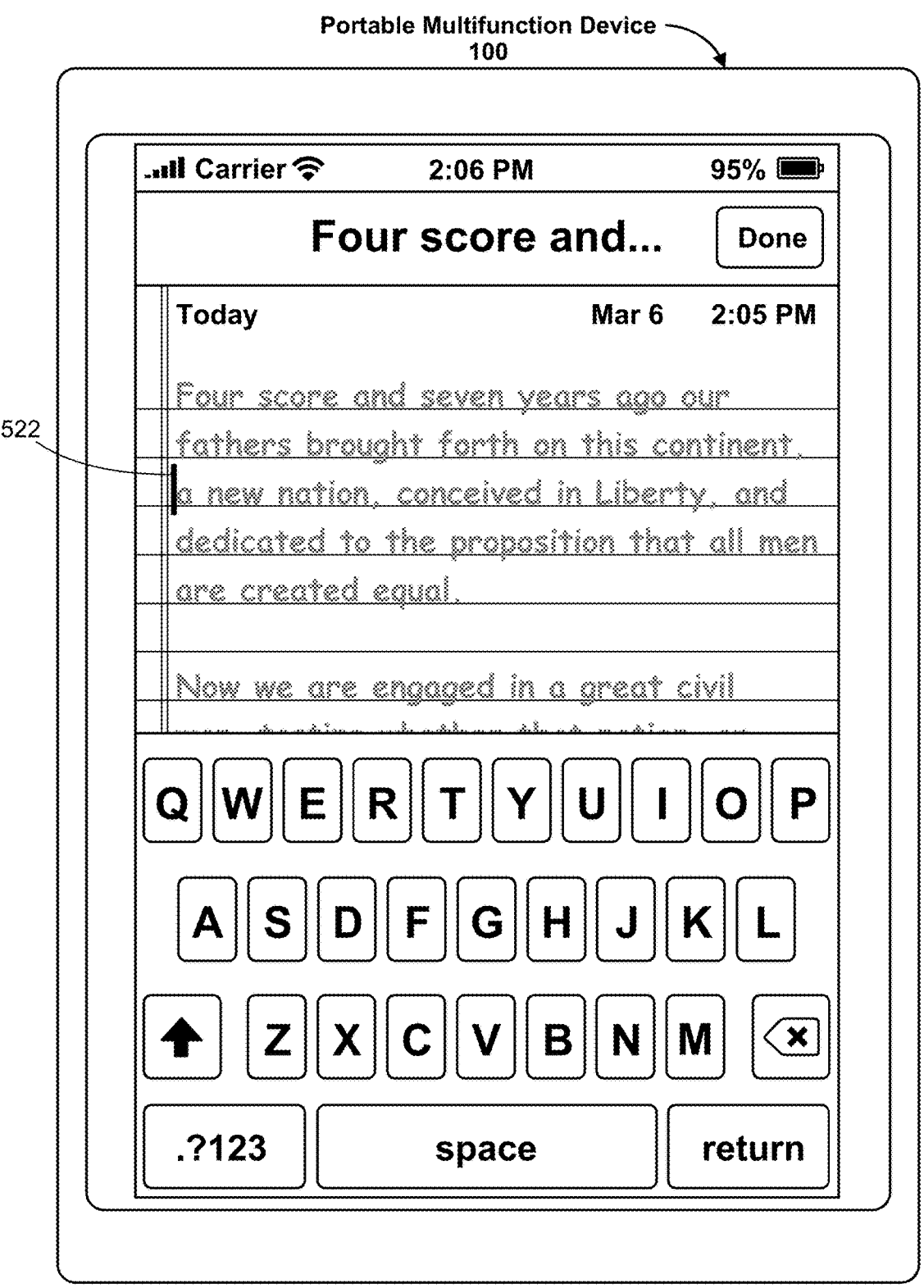

FIGS. 5A-5E above illustrate cursor manipulation in response to detecting a drag gesture. In addition to drag, the device 100 can detect the touch inputs as a flick and perform corresponding actions. As used herein, a flick gesture is the same type of motion as a swipe gesture in that both slides the finger(s) across the touch screen display in one direction. However, different from swipe, a flick gesture is a faster movement across the touch screen display. In some embodiments, the device 100 detects a flick gesture, e.g., a swipe gesture that is performed at a speed higher than a predetermined speed, or an acceleration beyond a predetermined velocity. Referring back to FIG. 4A, after determining that there is no selection (411—No), and that the touch input is a flick gesture, the device 100 moves the cursor to a distal point of line at 430. If the flick was up or down, the cursor would be moved to the top or bottom of a page or document, respectively. FIGS. 5F-5G illustrate exemplary user interfaces of moving the cursor to a distal point in the text.

For example, in FIG. 5F, electronic document 500 includes content, such as text, images, objects, tables, charts, and so on is displayed on the touch screen display 112. In addition to displaying the content of the electronic document, without detecting any existing selection, the device 100 further displays a cursor 522 within the electronic document. In some embodiments, the cursor 522 is the same as an insertion point. The insertion point marker is identified by an insertion point marker 522 placed between the letter "c" and "e" in the word "conceived". The device 100 detects a two-finger flick gesture on the touch screen display in a direction 524 towards an edge of the touch screen display as shown, such as a left two-finger flick towards the left edge of the touch screen display 112. In response to detecting the two-finger left flick gesture, the device 100 moves the cursor 522 to a distal point of the text, as shown in FIG. 5G where the cursor 522 has been moved to the beginning of the line containing the word "conceived." If the flick was up or down, the cursor would be moved to the top or bottom of a page or document, respectively. In some embodiments, the two-finger flick gesture detected on the touch screen display 112 is in a direction along the line within the text where the cursor 522 is displayed, and the distal location of the line is at a location in the direction of the two-finger flick. In those embodiments where the flick is vertical, e.g., perpendicular to the line of text, either up or down, the cursor would be moved to the top or bottom of a page or document, respectively.

The above examples as shown in FIG. 5F-5G illustrate cursor manipulation in response to detecting a flick gesture when there is no existing selection of content. Referring back to FIG. 4A, on the other hand, if there is existing selection of content detected by the device 100 (411—Yes), then the device 100 determines if the touch inputs are located on the selection at 415. If the device 100 determines that the touch inputs are located on the selection (415—Yes), and the device determines at 417 that the touch input is a flick gesture, then the device 100 dismisses the selection and moves the cursor to the distal point (e.g., beginning or end) of the text (e.g., line, page or document) at 444.

Figure 5H:
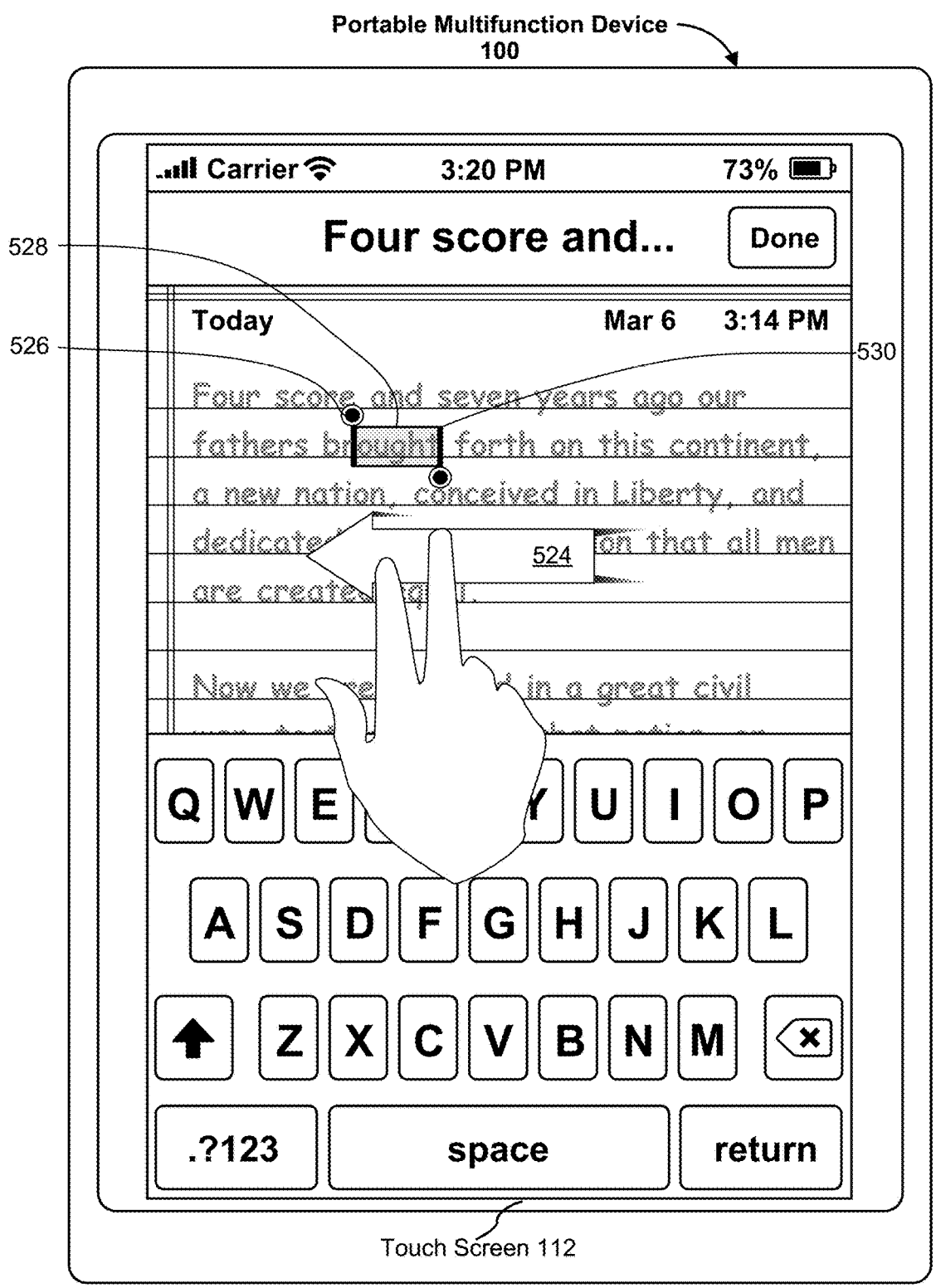
Figure 5I:
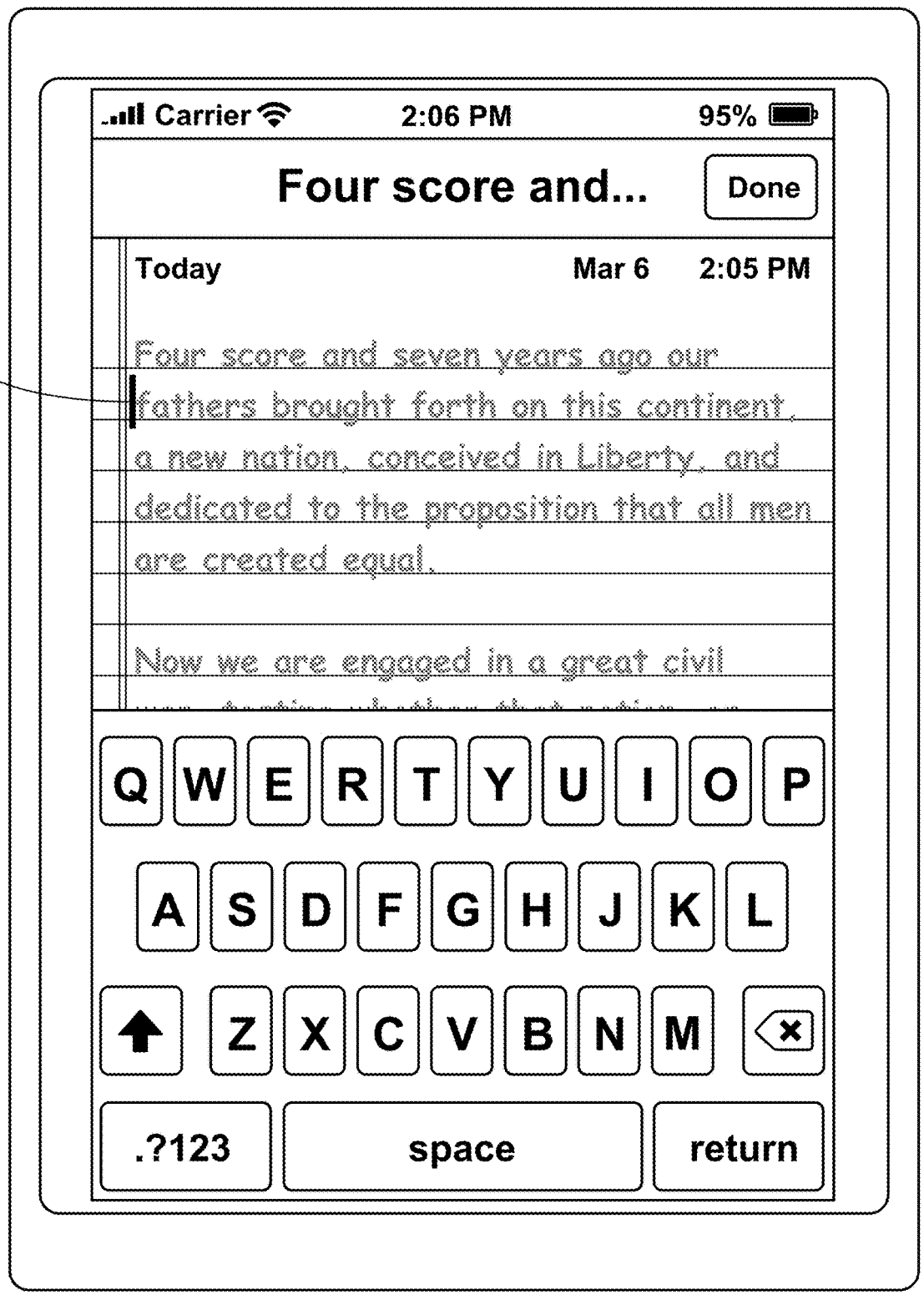

Similarly, if the device 100 determines at 415 that the touch inputs are not on the selection (415—No) (e.g., outside the selection), and determines at 419 that the touch input is a flick gesture (also known as a "swipe" gesture), then the selection is again dismissed and the cursor is moved to the distal point of the text at 445. FIGS. 5H-5I illustrate exemplary user interfaces implementing step 445 in response to flick.

For example, as shown in FIG. 5H, the device 100 detects an existing selection of a portion of the content 500 and displays the selection 528. The selection of "ought" is highlighted, and the device 100 displays markers, such as a start-point object 526 and an end-point object 530 at respective ends of "ought" to indicate the selection 528. The device 100 detects a two-finger flick gesture on the touch screen display in a direction 524 towards an edge of the touch screen display. In response to detecting a two-finger left flick gesture, the device 100 dismisses the selection 528 before moving the cursor 522 to a distal point of the text, such as to the beginning of the line where the cursor 522 was initially located, as shown in FIG. 5I.

Though FIGS. 5F-5I illustrate cursor manipulation in response to a left flick or swipe, similarly, a right flick or swipe towards right edge of the touch screen display 112, an up flick or swipe towards top edge of the touch screen display 112, and a down flick or swipe towards bottom edge of the touch screen display 112 can be detected by the device 100. In response to the right, up, and down flick or swipe, the device 100 moves the cursor to the end of line, beginning of page, and end of page, respectively.

Referring back to FIG. 4A, in addition to determining the type of touch inputs as drag and flick, the device 100 can detect the type of touch inputs as tap and perform corresponding actions. After determining the type of the touch inputs is tap and the touch inputs that are not located on a selection, the device 100 selects the closest word to the cursor at 442. FIGS. 5J-5P illustrate exemplary user interfaces of selecting the closest word to the cursor in step 442.

Figure 5J:
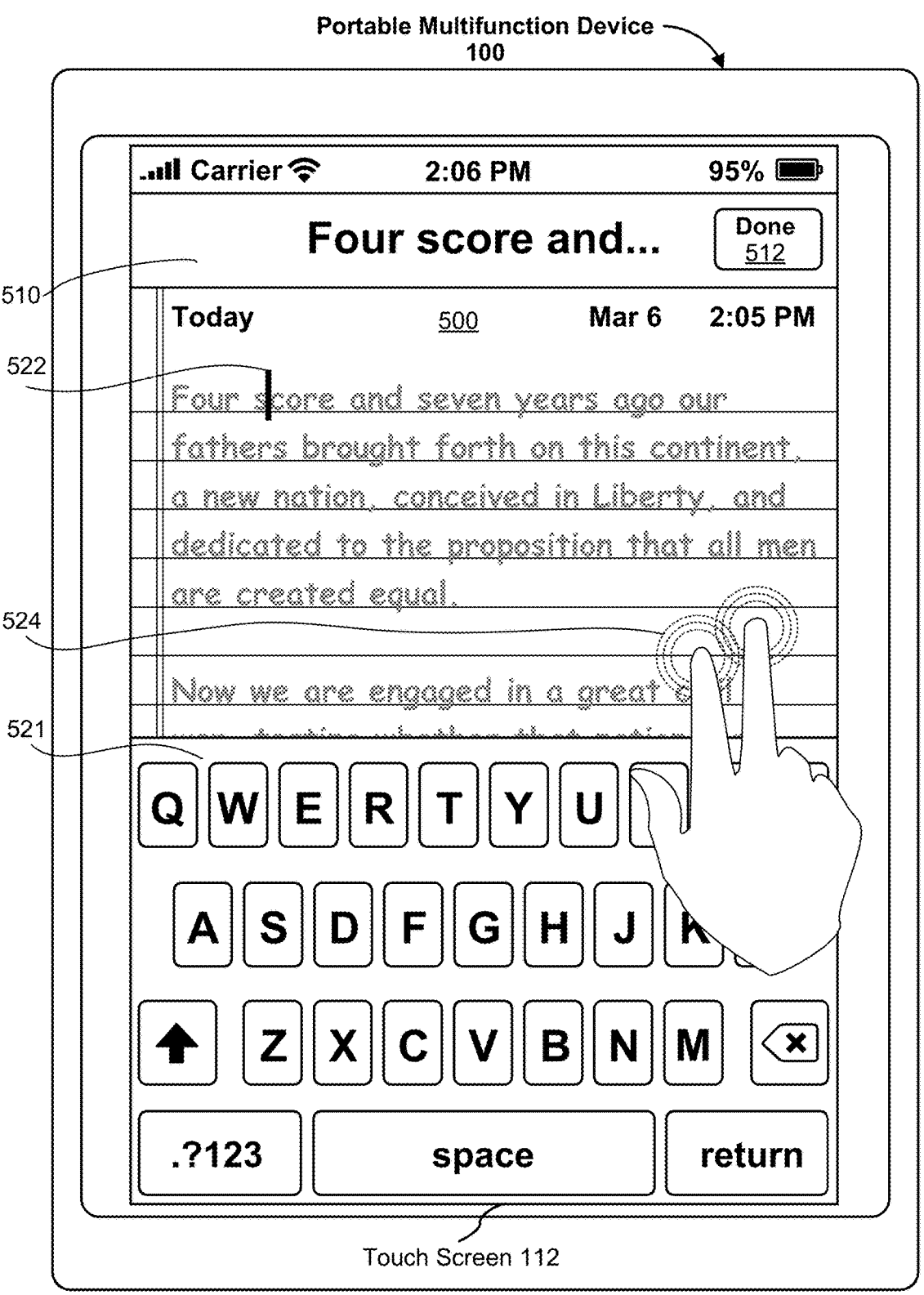

For example, in FIG. 5J, electronic document 500 is displayed in the user interface of an application (e.g., a word processing application 152, a presentation application 153, a spreadsheet application 155, etc.). The application user interface in which document 500 is displayed may include toolbar 510 and button 512 for navigating to, if any, other documents. Electronic document 500 includes content, such as text, images, objects, tables, charts, and so on. In addition to displaying the content of the electronic document, the device 100 further displays a cursor 522 within the electronic document. In some embodiments, the cursor 522 is the same as an insertion point. The cursor 522 indicates the insertion point in the electronic document 500 as on a word "score", between the character "s" and "c" of the word "score".

Figure 5K:
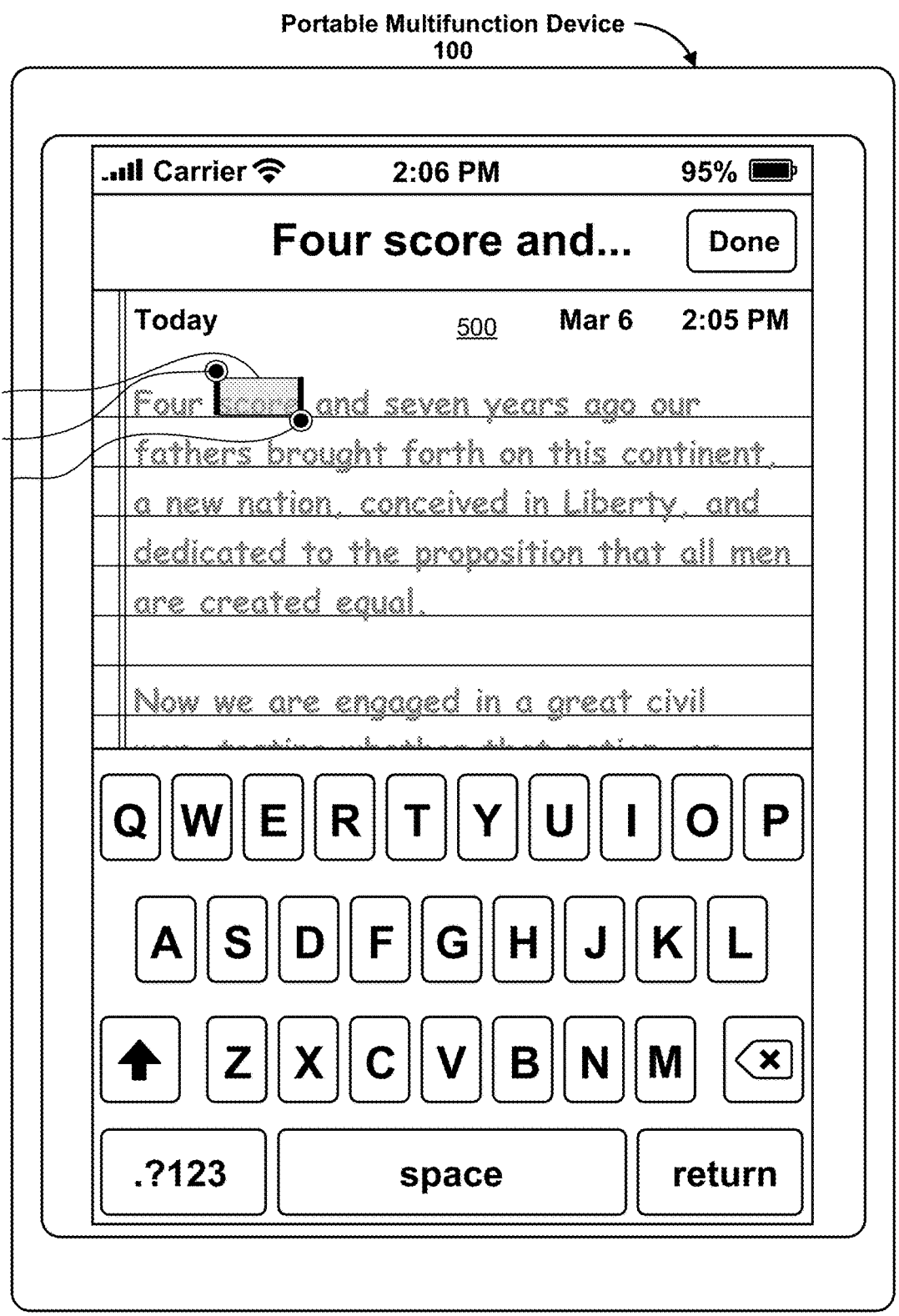
Figure 5L:
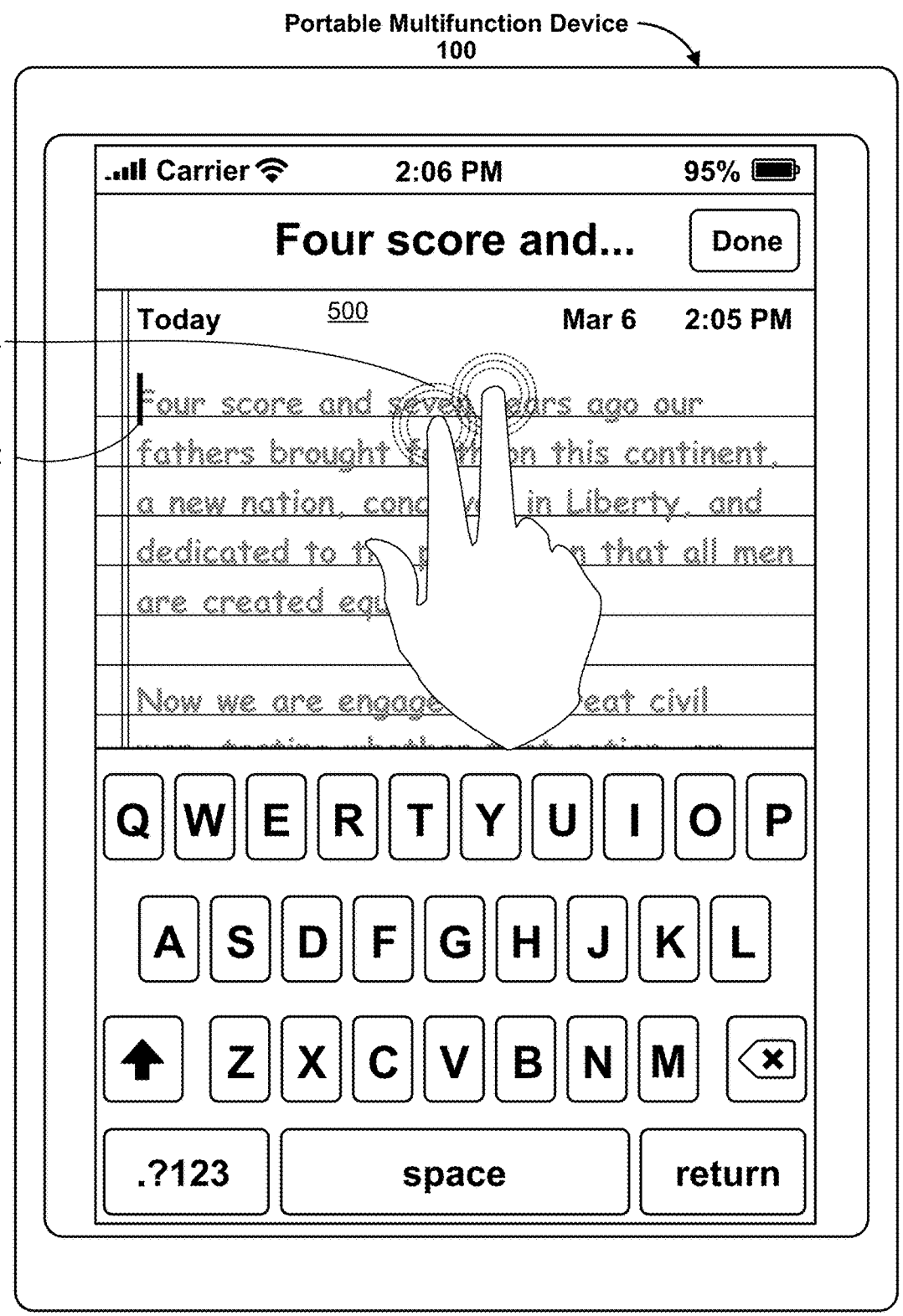
Figure 5M:
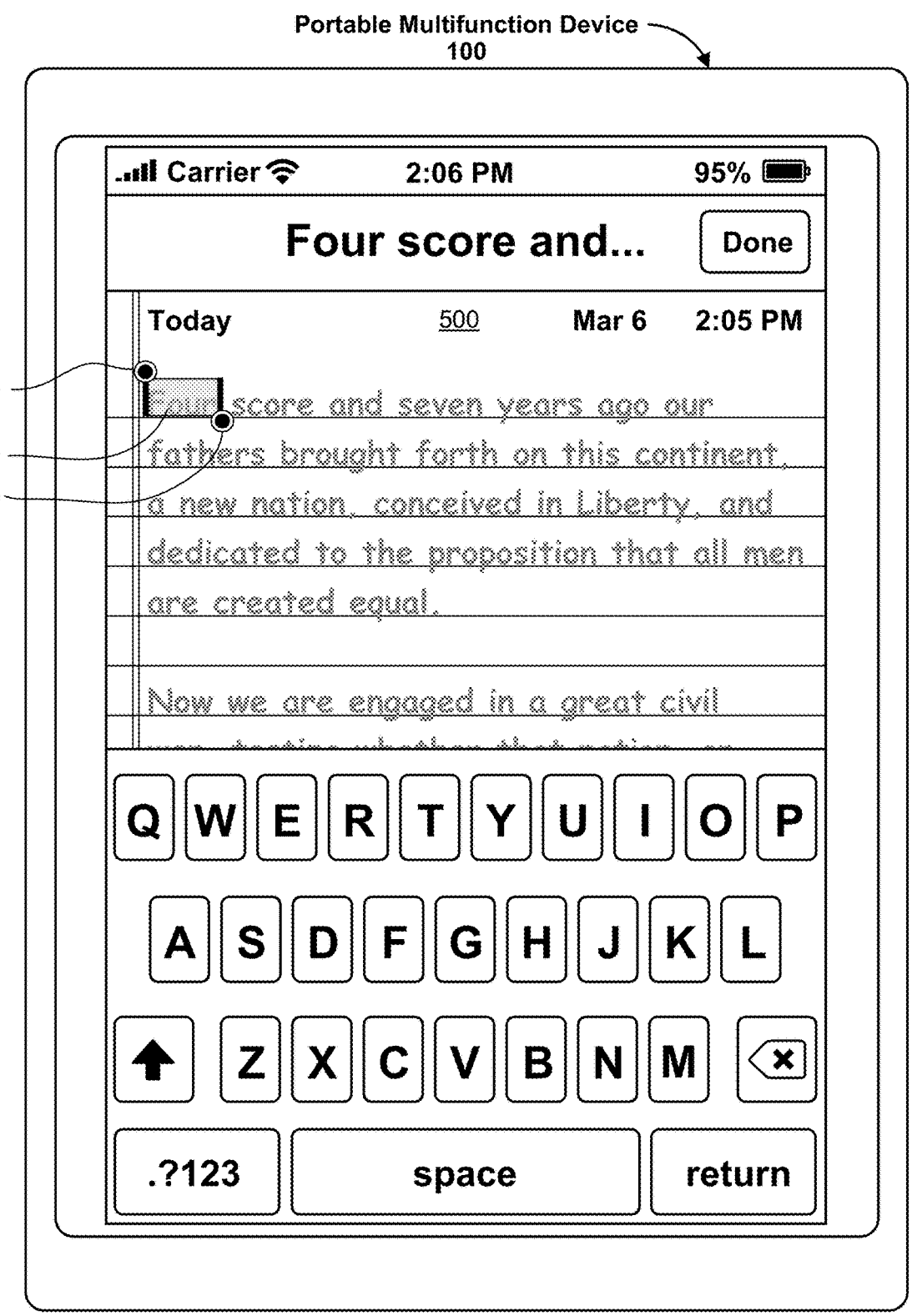

Subsequently, while displaying the content of the document 500, and when there is no existing selection (411—No of FIG. 4A), the device 100 detects two substantially simultaneous touch inputs 524 that are not located on a selection (442 of FIG. 4A). Turning to FIG. 5K, in response to detecting the touch inputs, the device 100 determines the touch inputs are not located on a selection, and selects the word "score", since it is the closest to the cursor 522. The selection of the word "score" is displayed and highlighted, and the device 100 displays markers, such as a start-point object 526 and an end-point object 530 at respective ends of "score" to indicate the selection 528.

Figure 5N:
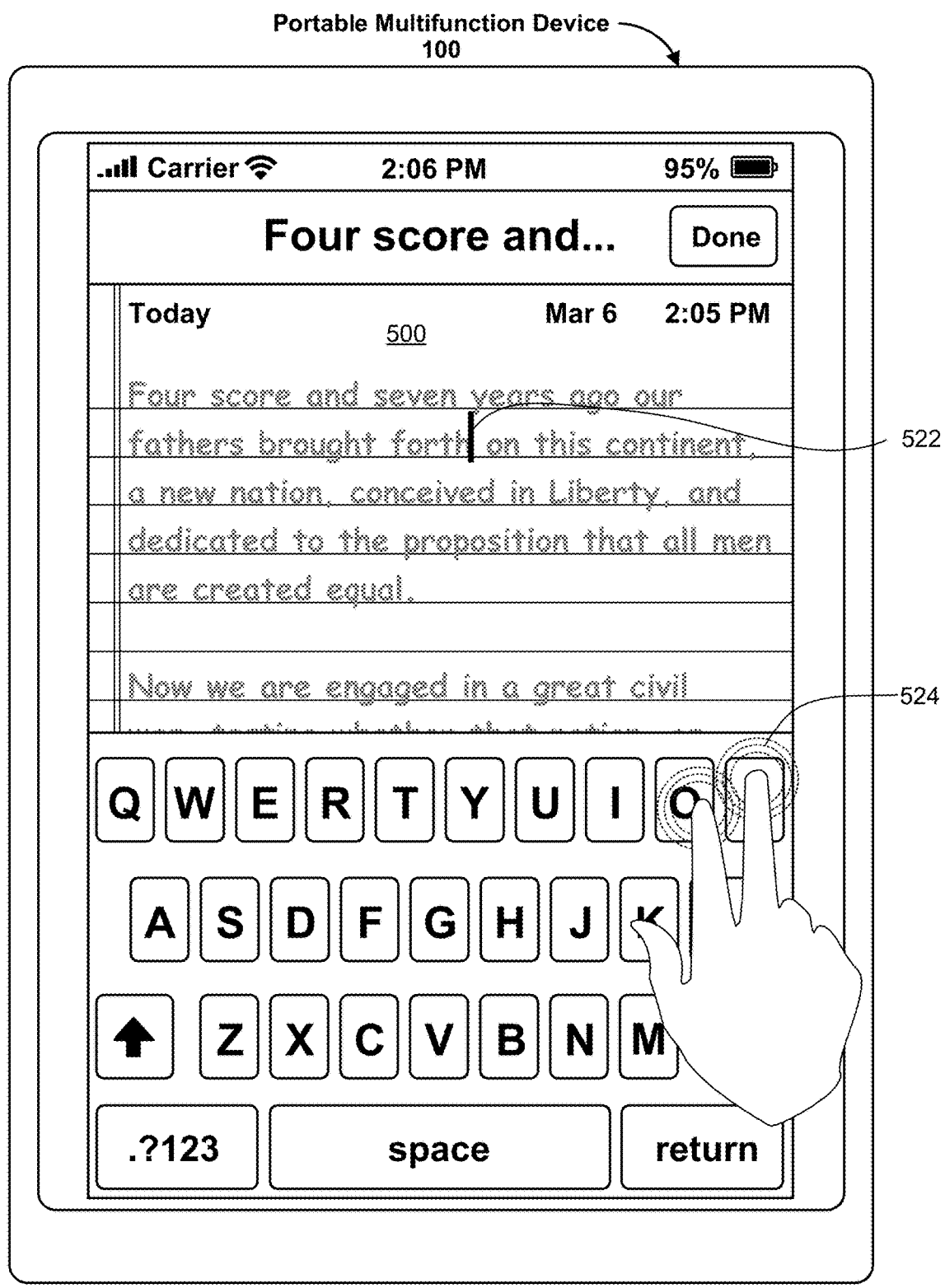
Figure 5O:
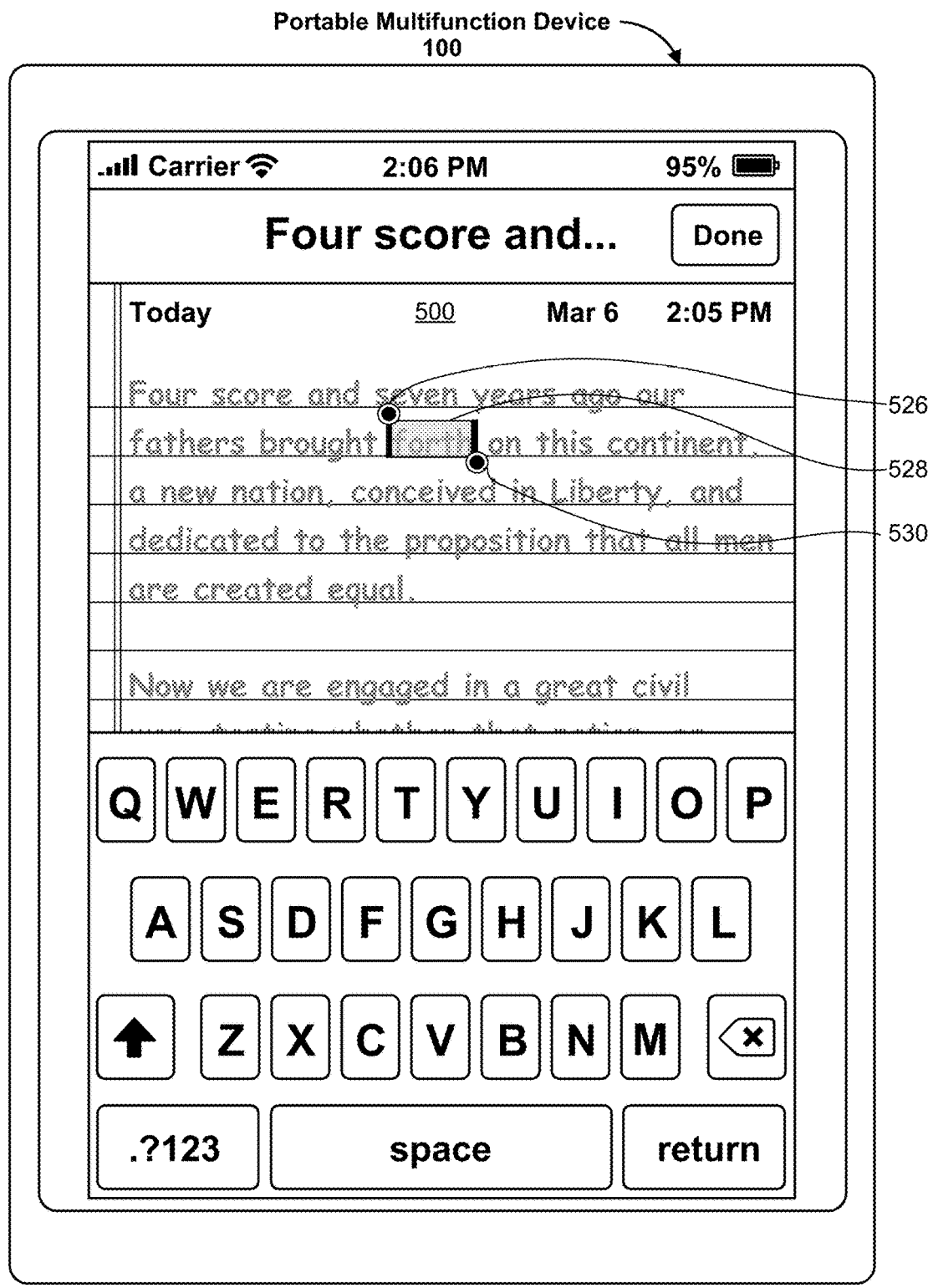
Figure 5P:
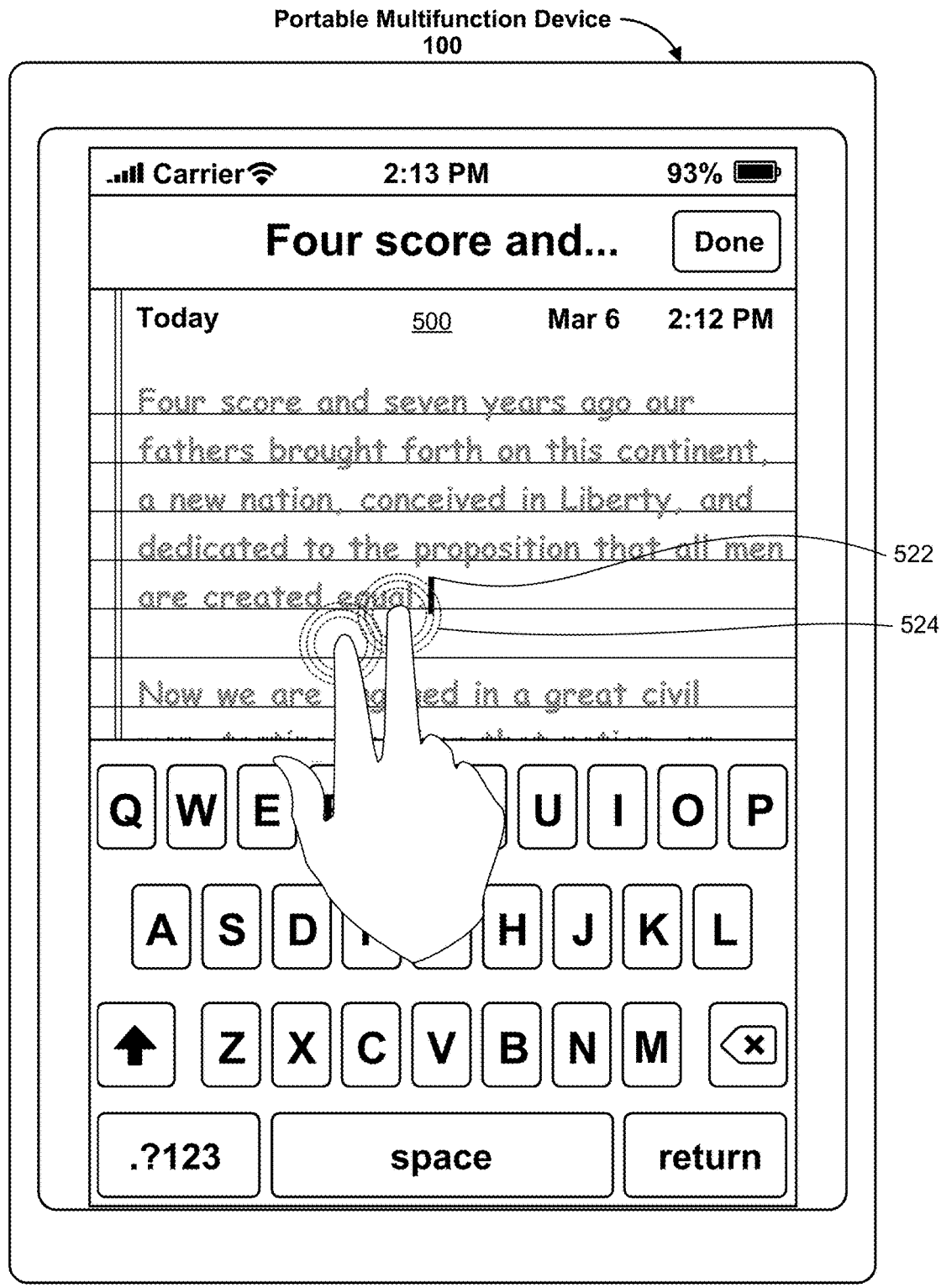
Figure 5Q:
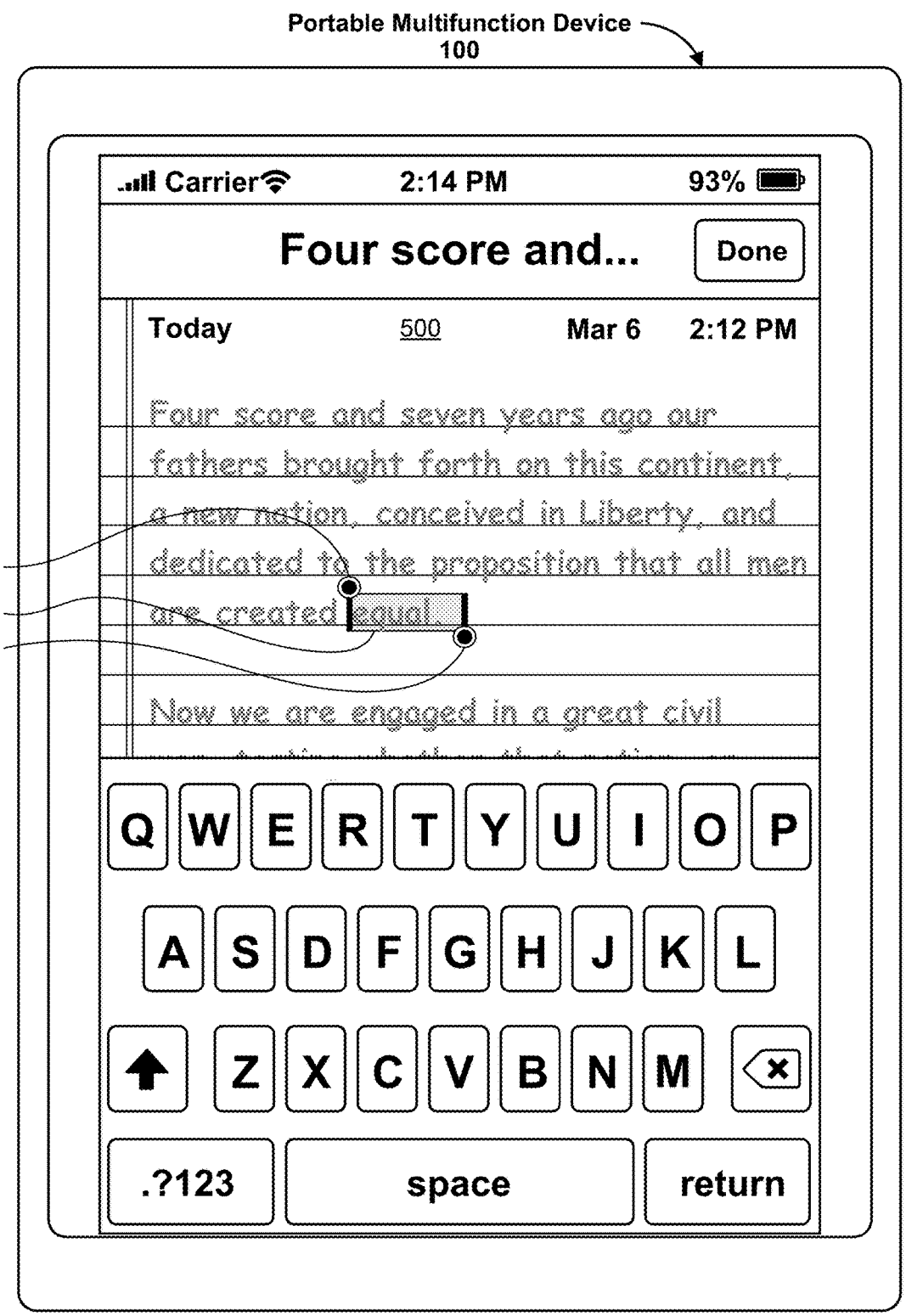

In some embodiments, a word is selected if the cursor 522 is within the word (e.g., the word "score" in FIGS. 5J-5K), adjacent to the first letter of the word (e.g., the word "Four" in FIG. 5L-5M), or adjacent to the last letter of the word (e.g., the word "forth" in FIGS. 5N-5O). In some embodiments, the closest word and any punctuation and/or spaces are selected if the cursor 522 is currently located after a sentence and not within a word or adjacent to the first or last letter of a word (e.g., "equal." in FIGS. 5P-5Q).

It should be noted that in FIGS. 5J-5P, the two substantially simultaneous touch inputs 524 can be located anywhere on the touch screen display, not just where the cursor is located. Conventional portable multifunction devices often require users to precisely contact their fingers on a touch sensitive screen at the location where the cursor is located in order to manipulate the cursor. Such a requirement is cumbersome. The methods described herein allow a user manipulate a cursor and perform editing functions, such as text selection and moving selection, from any part of the touch-sensitive surface 112, not just where the cursor is located. For example, the two substantially simultaneous touch inputs 524 can be located after a first paragraph but before a second paragraph (e.g., FIG. 5J), on a different word not adjacent to the cursor 522 (e.g., FIG. 5L), on the touch screen keyboard (e.g., FIG. 5N), or on the word that the cursor is located within (e.g., FIG. 5P), among others. These methods reduce the number of steps that a user has to perform to navigate and edit a document, thereby increasing efficiency and ease of use when performing these tasks.

The above examples as shown in FIG. 5J-5P illustrate cursor manipulation in response to detecting tap when there is no existing selection of content. Referring back to FIG. 4A, on the other hand, if there is an existing selection of content detected by the device 100, then the device 100 determines if the touch inputs are located on the selection at 415. If the device 100 determines that the touch inputs are located on the selection (415—Yes), and determines at 417 that the touch inputs are a tap, then the device 100 expands the selection at 440. For example, if a word is selected, and a tap 440 is detected, then the sentence containing the previously selected word is selected. In this way a selection can be expanded from a word to a sentence to a paragraph to a page to a document. In some embodiments, instead of expanding the selection, a single two-finger tap on a selected word deselects the word and returns to an initial cursor placement display (e.g., ceasing display of the selection indication 528 and displaying a cursor on the touch screen display). In some embodiments, the placement of the cursor depends on the location of the single two-finger tap.

On the other hand, if the device 100 determines at 415 that the touch inputs are not on the selection (415—No) (e.g., outside the selection) and determines at 419 that the touch inputs are a tap, then the device 100 determines whether the selected content is one word at 466. In accordance with a determination that the selected content is one word (466—Yes), the device 100 expands the selected content to include a sentence containing the word at 467. On the other hand, in accordance with a determination that the selected content is more than a word, the device 100 displays a cursor at the beginning or end of the selection and dismisses the selection at 468. In some embodiments, in accordance with a determination that the tap is not on the selection, the device 100 dismisses the selection and selects the closest word to the contact point of the tap.

In other embodiments, after selecting the closest word to the cursor, the device 100 can further detect a two-finger double-tap (e.g., tapping twice with two fingers), a two-finger triple-tap (e.g., tapping three times with two fingers), or a two-finger quadruple-tap (e.g., tapping four times with two fingers). In response to detecting a two-finger double-tap, two-finger triple-tap, or two-finger quadruple-tap, the device 100 expands the selection to a sentence or a line at 460, to a paragraph at 462, or to the document at 464, respectively. In some embodiments, the selection expansion operation is only operable to paragraph level. For example, in response to a two-finger quadruple-tap, the device 100 keeps the paragraph selected without further expanding the selection to the entire document at 464. In some embodiments, device 100 determines if there is a multi-tap and expands the selection if the duration between each subsequent tap is less than a predetermined threshold (e.g., 0.66 seconds).

In some embodiments, if the device 100 determines two substantially simultaneous touch inputs that are located outside an existing selection (415—No) (e.g., on a soft keyboard) and the type of touch inputs is a tap (down), followed by a lift-off (up), followed by another tap (down), and without lift-off, a drag (419—Tap-∓half∓drag), the device 100 at step 465 first dismisses the selection, then performs actions similar to those performed at step 471 in FIG. 4B described below, such as selecting a word closest to the touch input and expanding the selection while dragging. In some embodiments, similar to the selection expansion behavior described with respect to steps 452 and 434 above, the initial direction of the drag gesture determines the direction of the expansion and the selection expands one word at a time if the drag gesture moves fast, and expands one character at a time if the drag gesture moves slow.

Figure 5R:
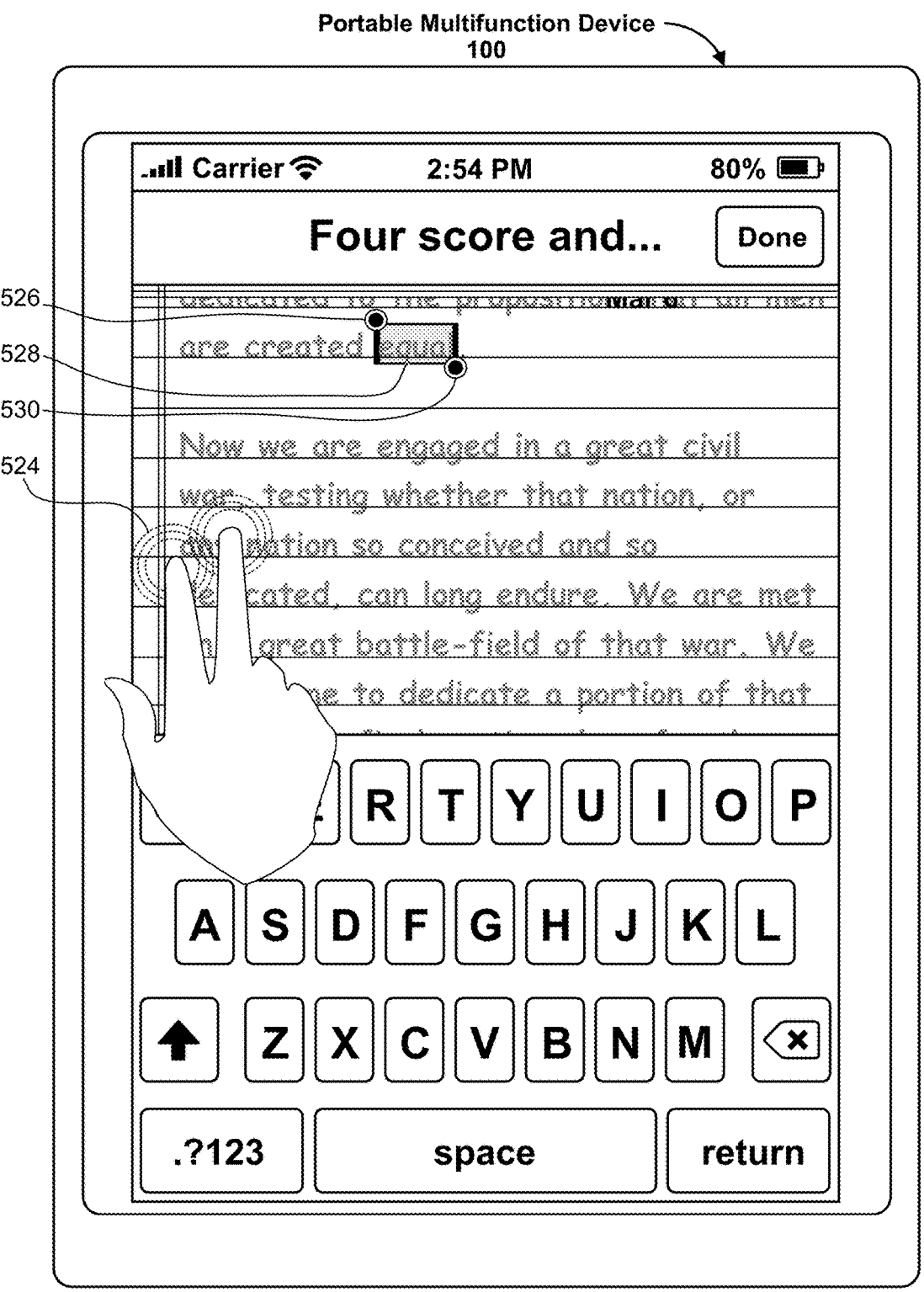
Figure 5S:
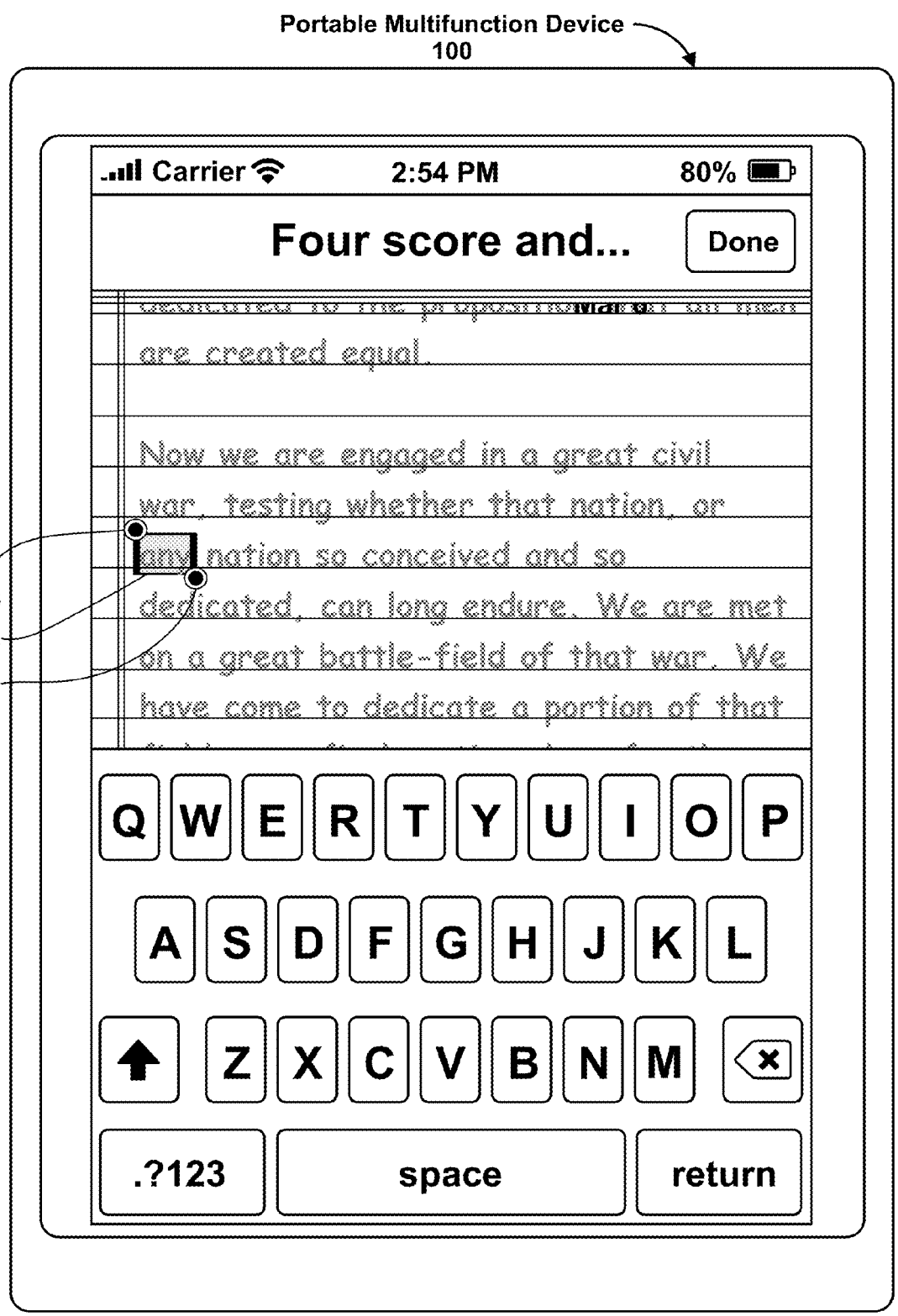
Figure 5T:
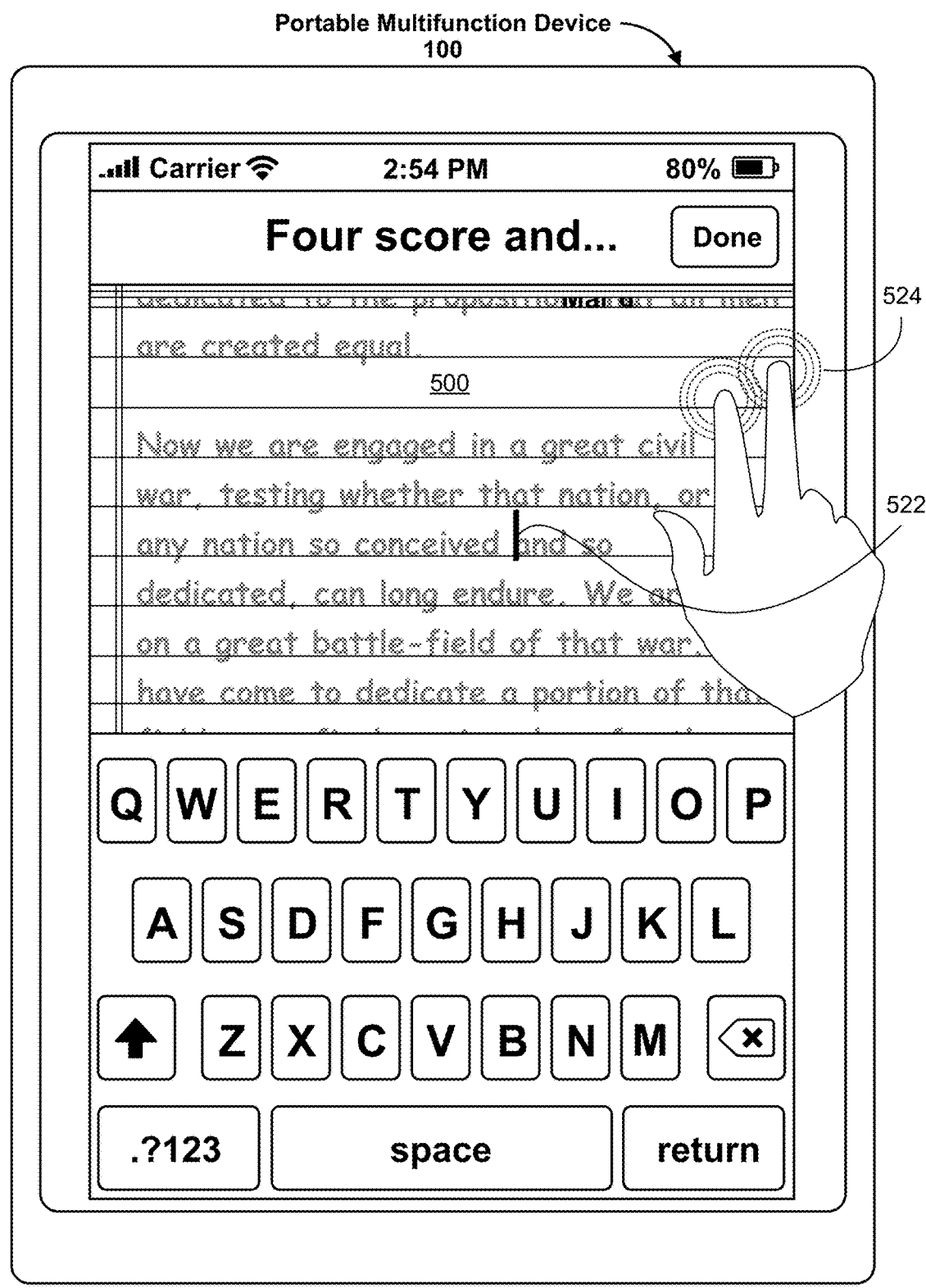

FIGS. 5R-5S illustrate exemplary user interfaces for implementing a tap that is detected outside a selection and selecting the closest word to a contact point of the tap. FIGS. 5T-5Y illustrate exemplary user interfaces implementing the steps 460-464 (FIG. 4A) of expanding the selection in response to a two-finger double-tap, a two-finger triple-tap, and a two-finger quadruple-tap. FIGS. 5Z-5AD illustrate exemplary user interfaces for implementing step 440 of expanding the selection in response to tapping on a selection.

Turning to FIG. 5R, which illustrates an exemplary user interface of selecting the closest word to a contact point of a two-finger tap in accordance with some embodiments. In some embodiments, an existing selection 528 (e.g., the word "equal") is detected by the device 100, a cursor is not displayed on the touch screen display. In response to detecting the two substantially simultaneous touch inputs 524 located outside the selection 528 (e.g., on the word "any" in FIG. 5S), the device 100 selects a word closest to the contact location of the two substantially simultaneous touch inputs 524 (e.g., selects the word "any" 528 in FIG. 5S).

Figure 5U:
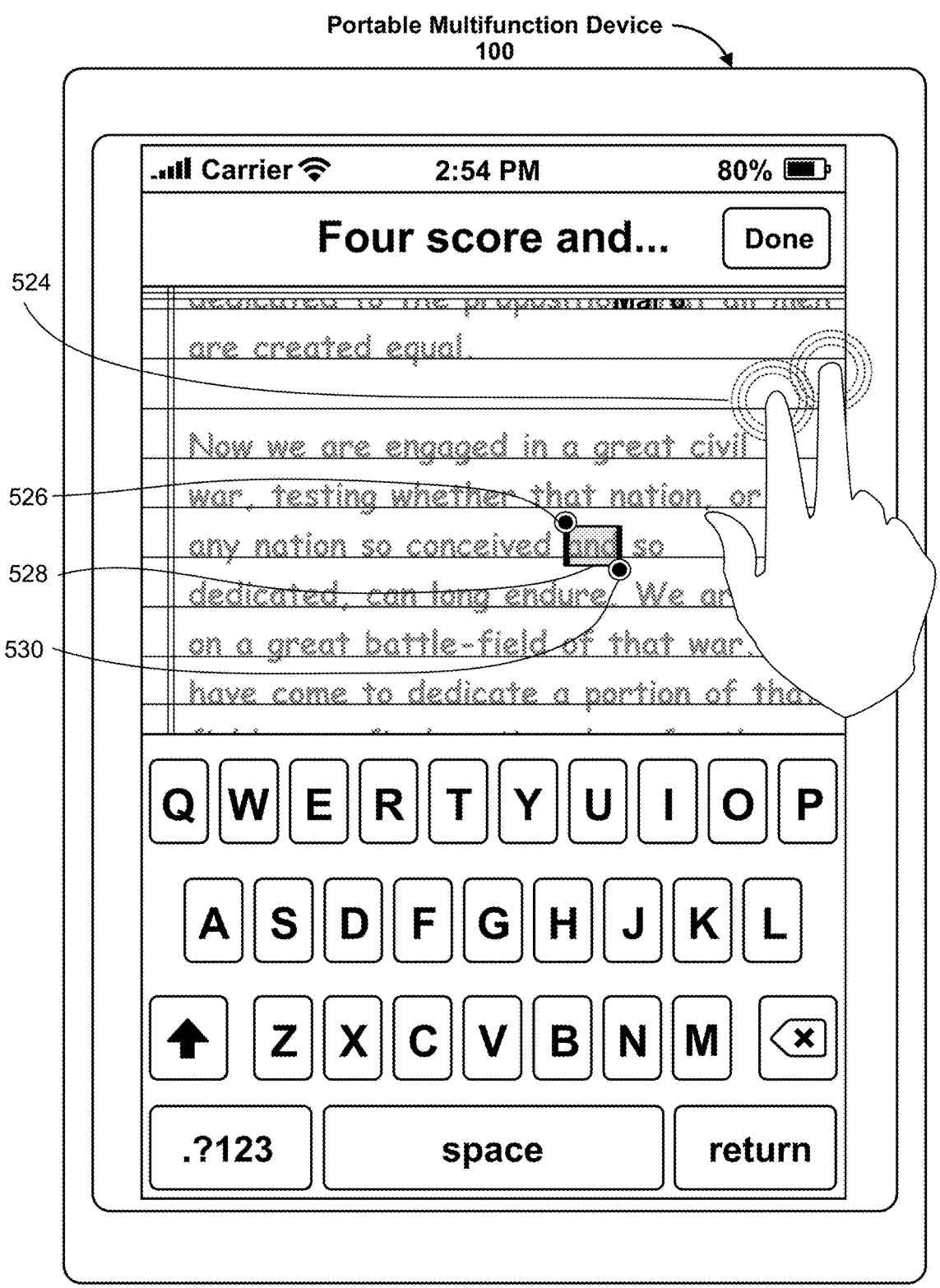

FIGS. 5T-5Y illustrate the steps 442 and 460-464 (FIG. 4A) of cursor manipulation in response to two-finger single tap, two-finger double-tap, two-finger triple-tap, and two-finger quadruple-tap, in accordance with an alternative embodiment. When there is no existing selection (411—No) (FIG. 4A), in response to detecting a two-finger tap 524 (FIG. 5T), and when the cursor 522 is located closest to the word "and," the device 100 selects (442—FIG. 4A) the word "and" and displays markers, such as a start-point object 526 and an end-point object 530 at respective ends of "and" to indicate the selection 528, as shown in FIG. 5U.

In some embodiments, upon determining that there is an existing selection 528 (411—Yes, FIG. 4A), e.g., following the two-finger tap as shown in FIG. 5U, the device 100 detects a two-finger double-tap at a contact point not on the selection (415—No, 419, and 460 of FIG. 4A). In some embodiments, the two-finger double-taps need to be at or near the same contact point on the touch screen display and made within a short predetermined time of one another, e.g., 0.5 seconds. In response to detecting the two-finger double-tap (460 of FIG. 4A), the device 100 selects a first predetermined expanded portion of the content (e.g., a line or a sentence) that includes at least a portion of the previously selected content 528. For example, the single line of text ("any nation so conceived and so") containing the word "and" is selected with a start-point object 526 and an end-point object 530 at respective ends of the single line of text selection 528, as shown in FIG. 5V, or the sentence ("Now we are engaged in a great civil war, testing whether that nation, or any nation so conceived and so dedicated, can long endure") containing the word "and" is selected with a start-point object 526 and an end-point object 530 at respective ends of the sentence selection 528, as shown in FIG. 5W.

Figure 5V:
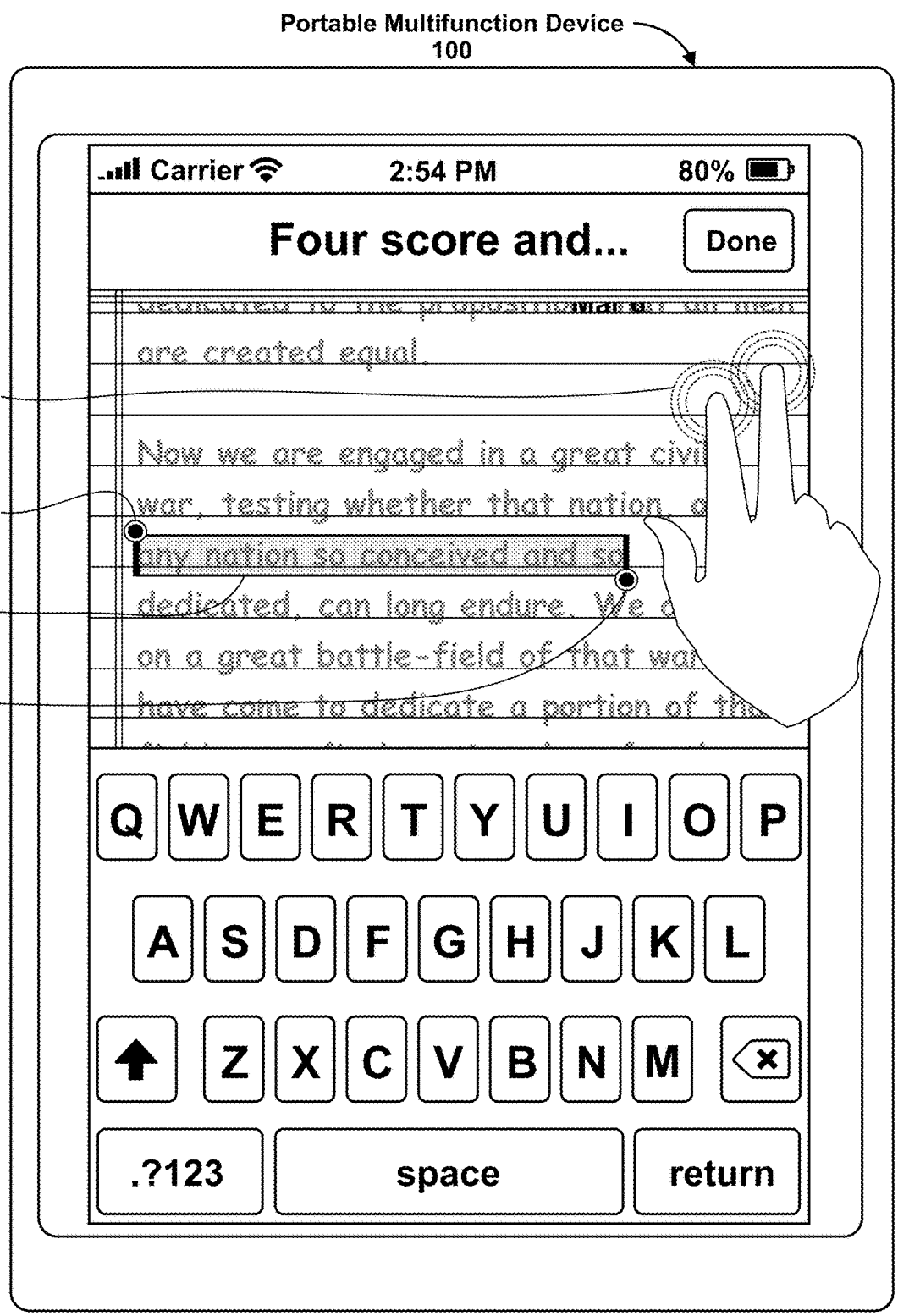
Figure 5W:
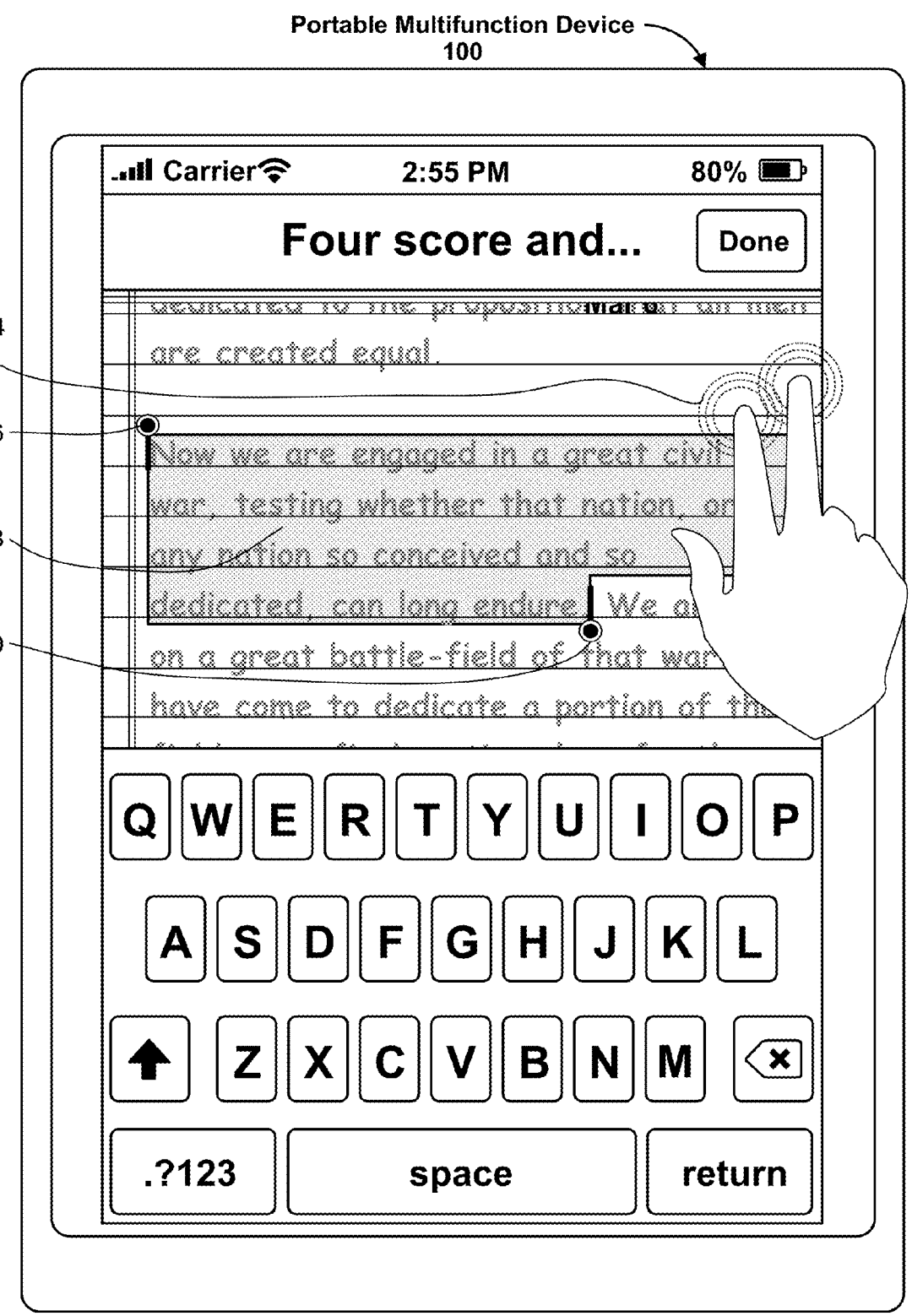
Figure 5X:
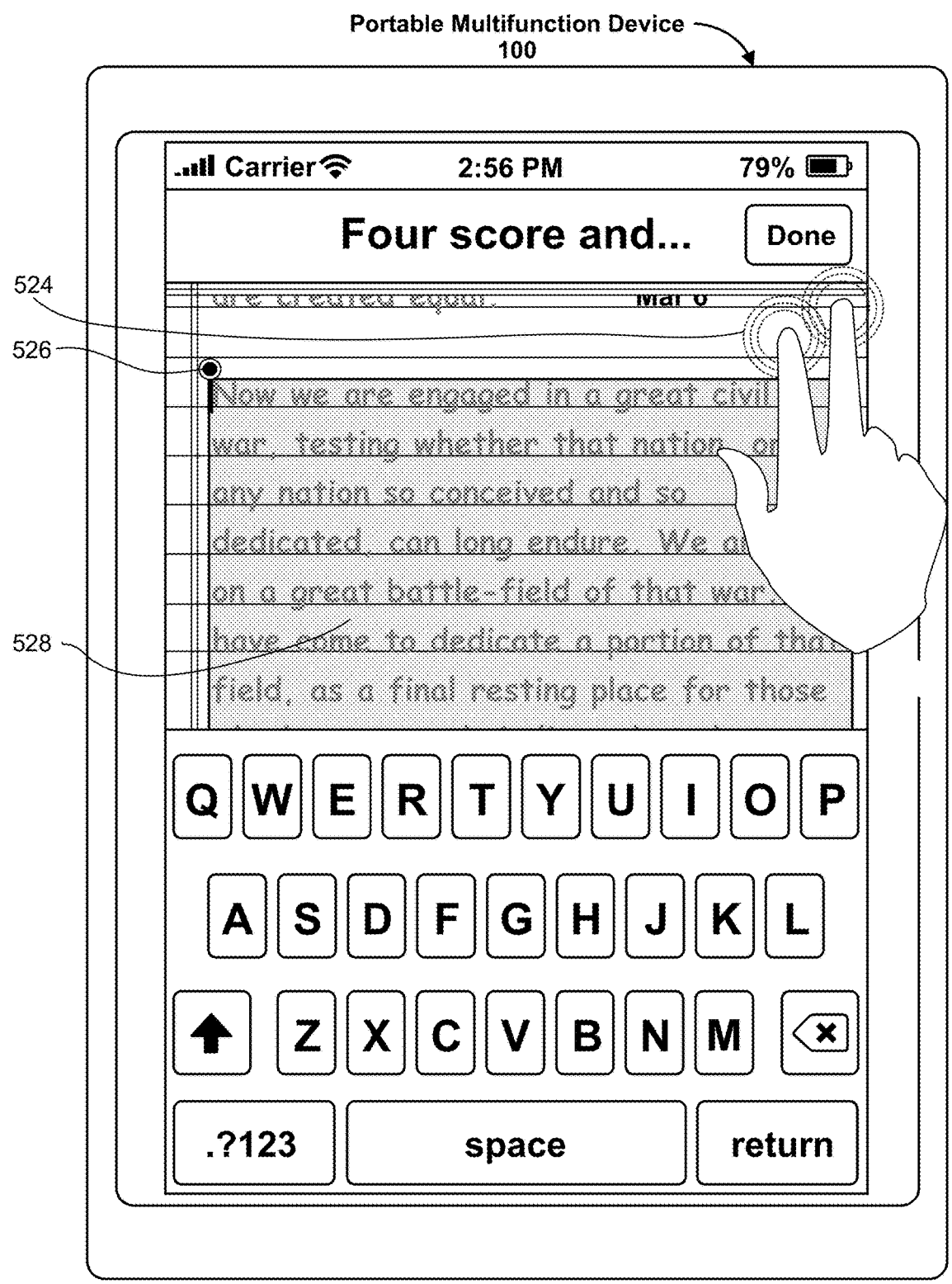

In some embodiments, upon determining that there is an existing selection (411—Yes, FIG. 4A), e.g., following the two-finger double-tap to select a line or a sentence shown in FIG. 5V or 5W, the device 100 detects a two-finger triple-tap at a contact point not on the selection (415—No, 419, and 462 of FIG. 4A). In some embodiments, the two-finger triple-taps need to be at or near the same contact point on the touch screen display and made within a short predetermined time of one another, e.g., 0.5 seconds. In response to detecting the two-finger triple-tap (462 of FIG. 4A), the device 100 selects a second predetermined expanded portion of the content (e.g., a paragraph) that includes at least a portion of the previously selected content 528, as shown in FIG. 5X. As further shown in FIG. 5X, to indicate the paragraph selection 528, the device 100 displays the second expanded portion of the content as selected content and displays markers, such as a start-point object 526 and possibly an end-point object (not shown in FIG. 5X) at respective ends of the paragraph selection 528.

Figure 5Y:
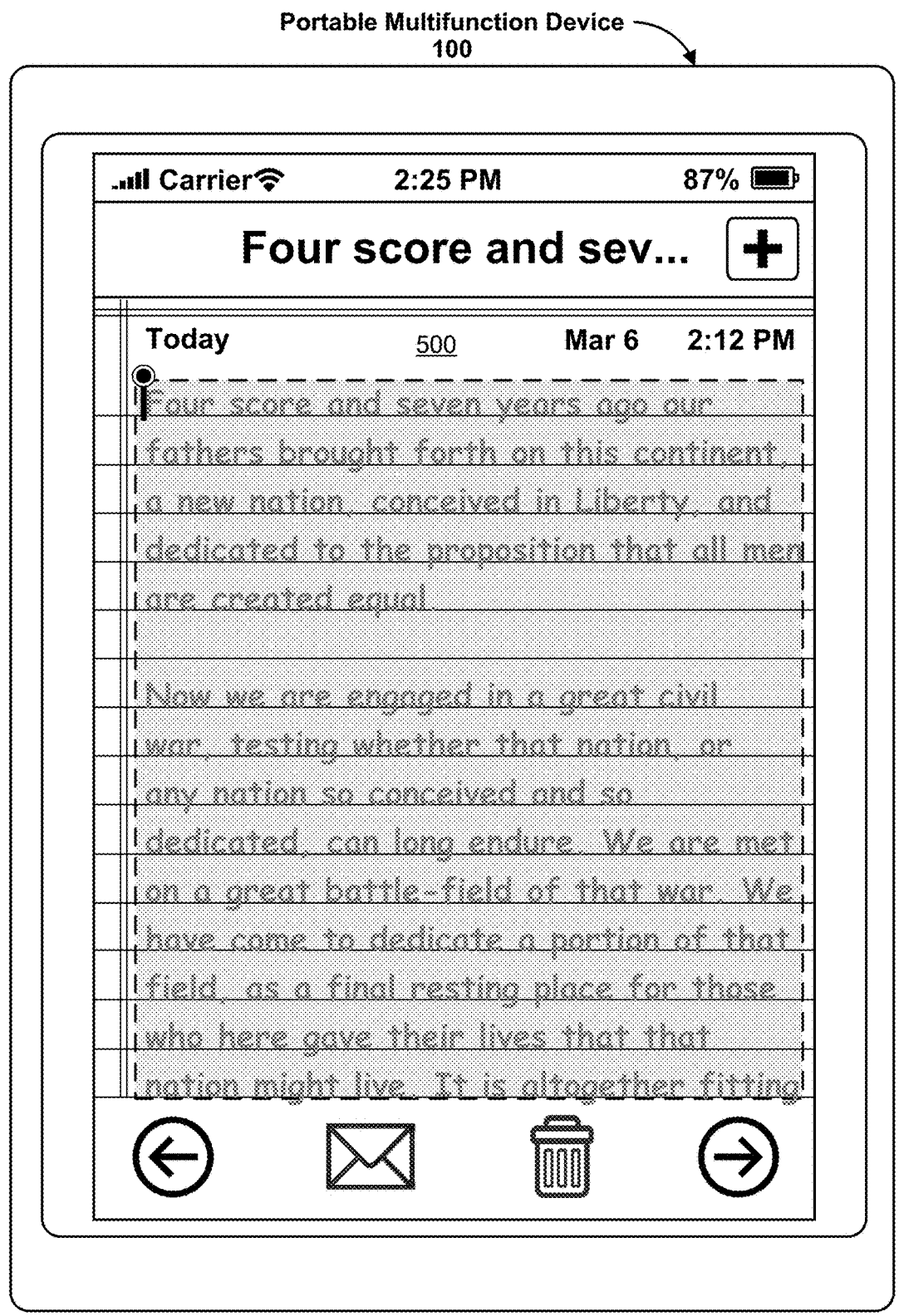
Figure 5Z:
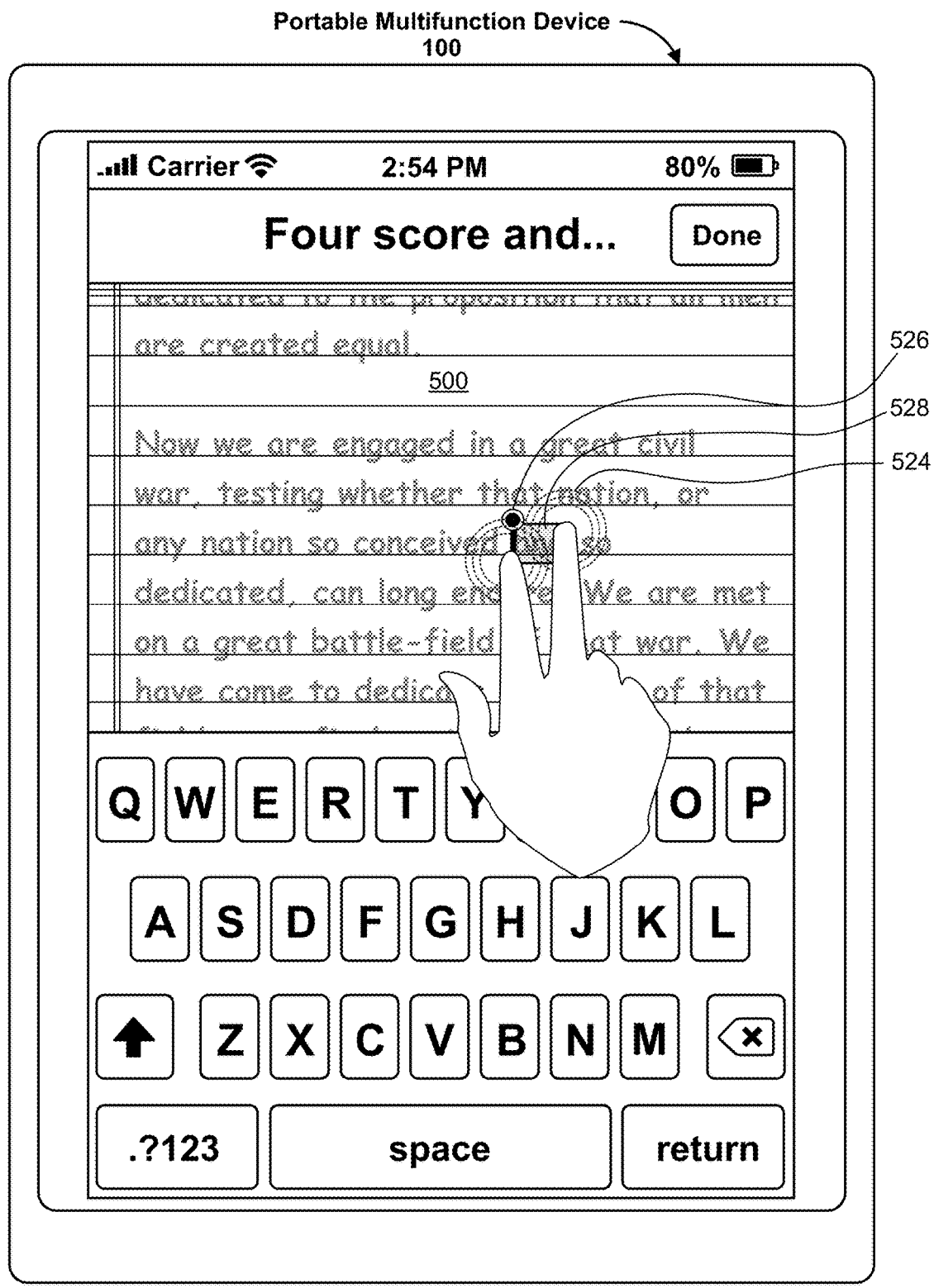
Figure 5A:
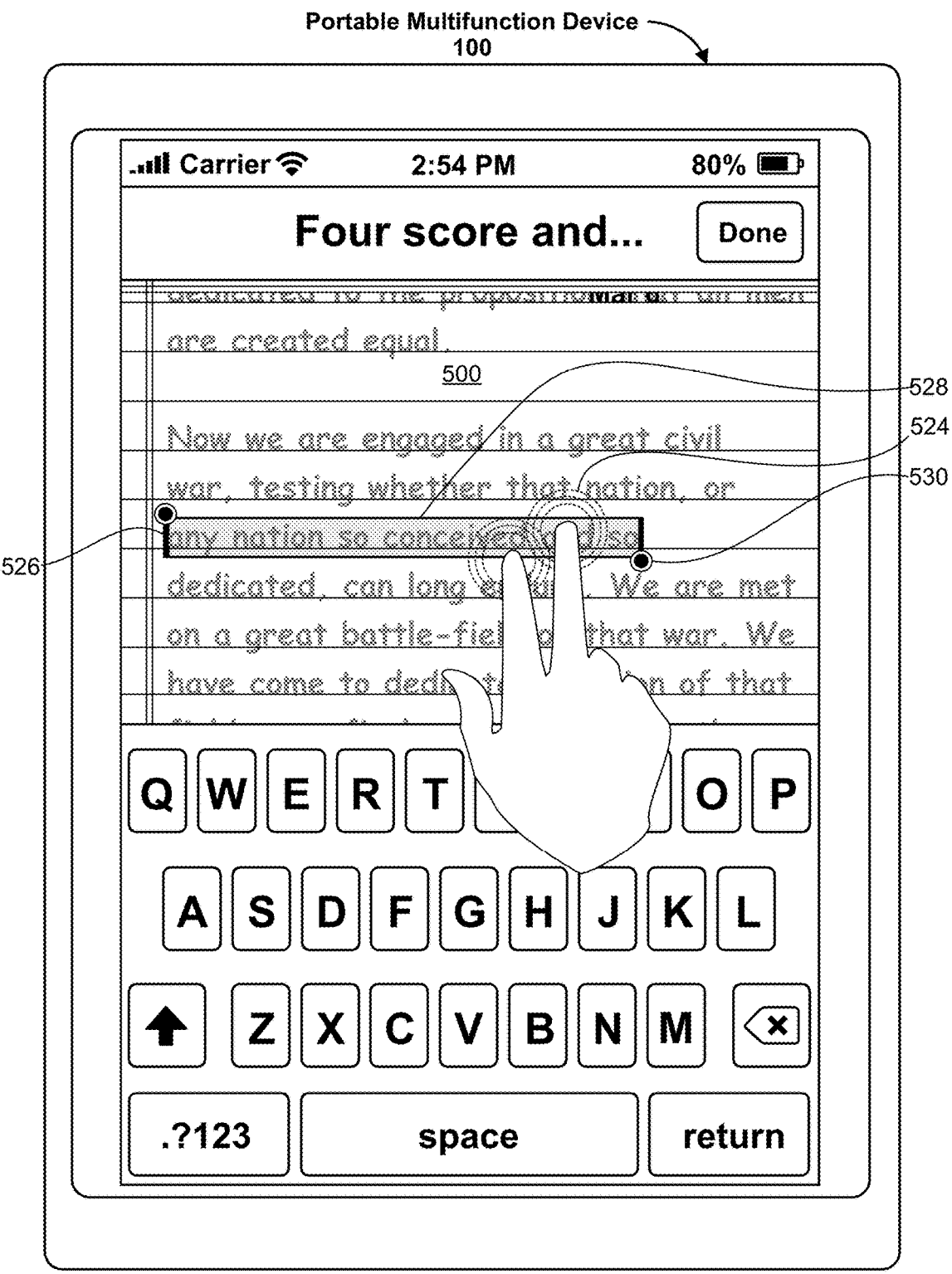
Figure 5A:
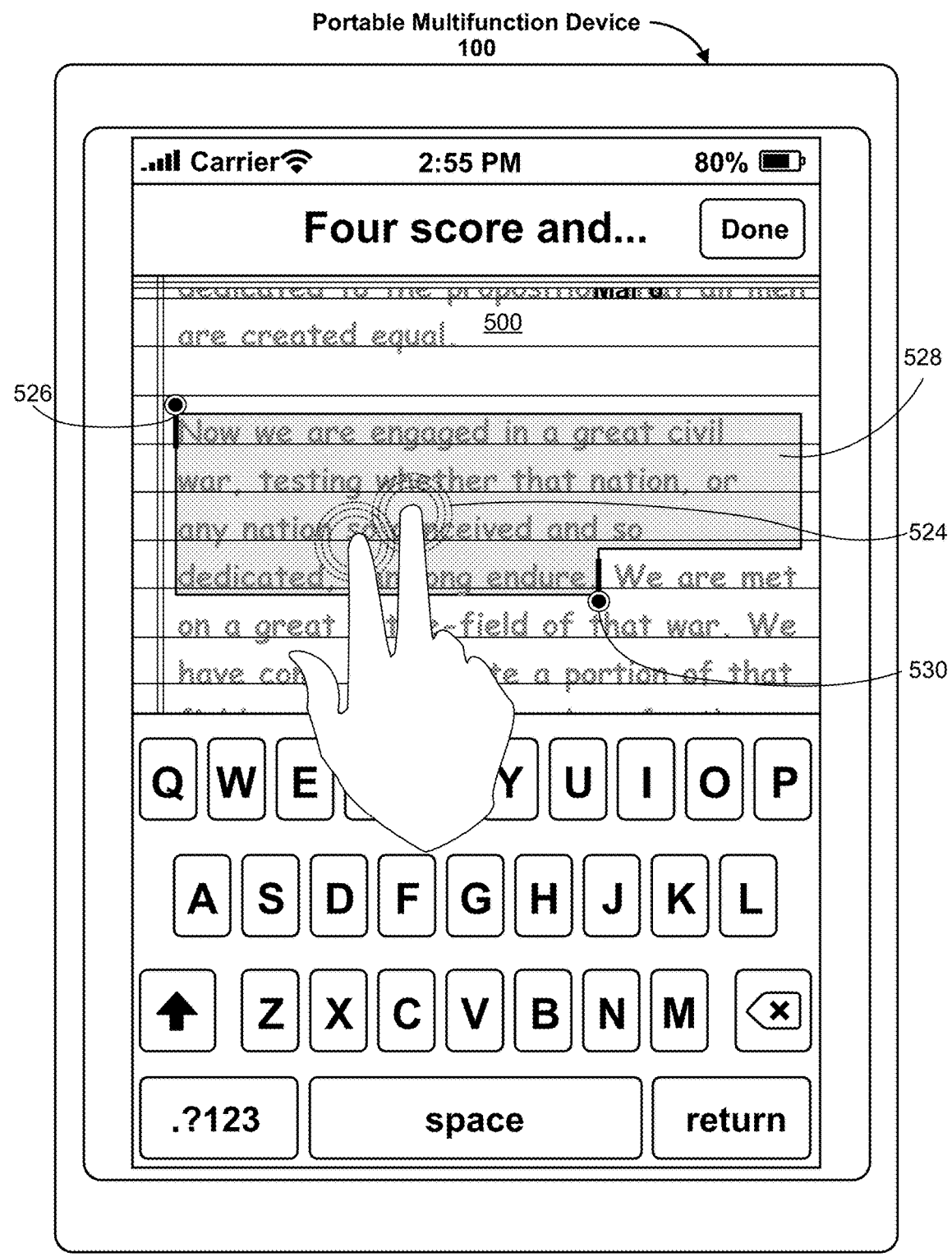
Figure 5A:
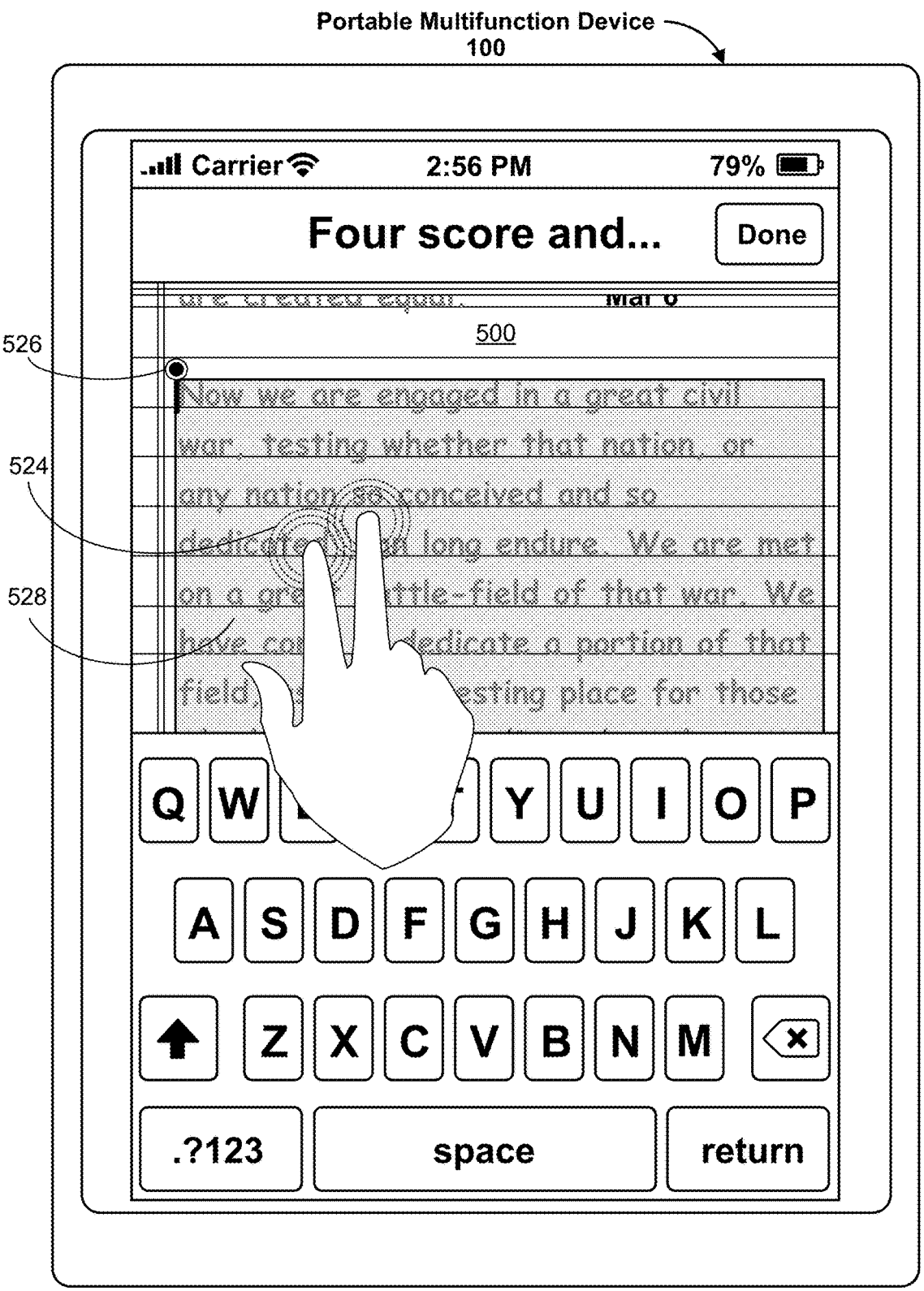
Figure 5A:
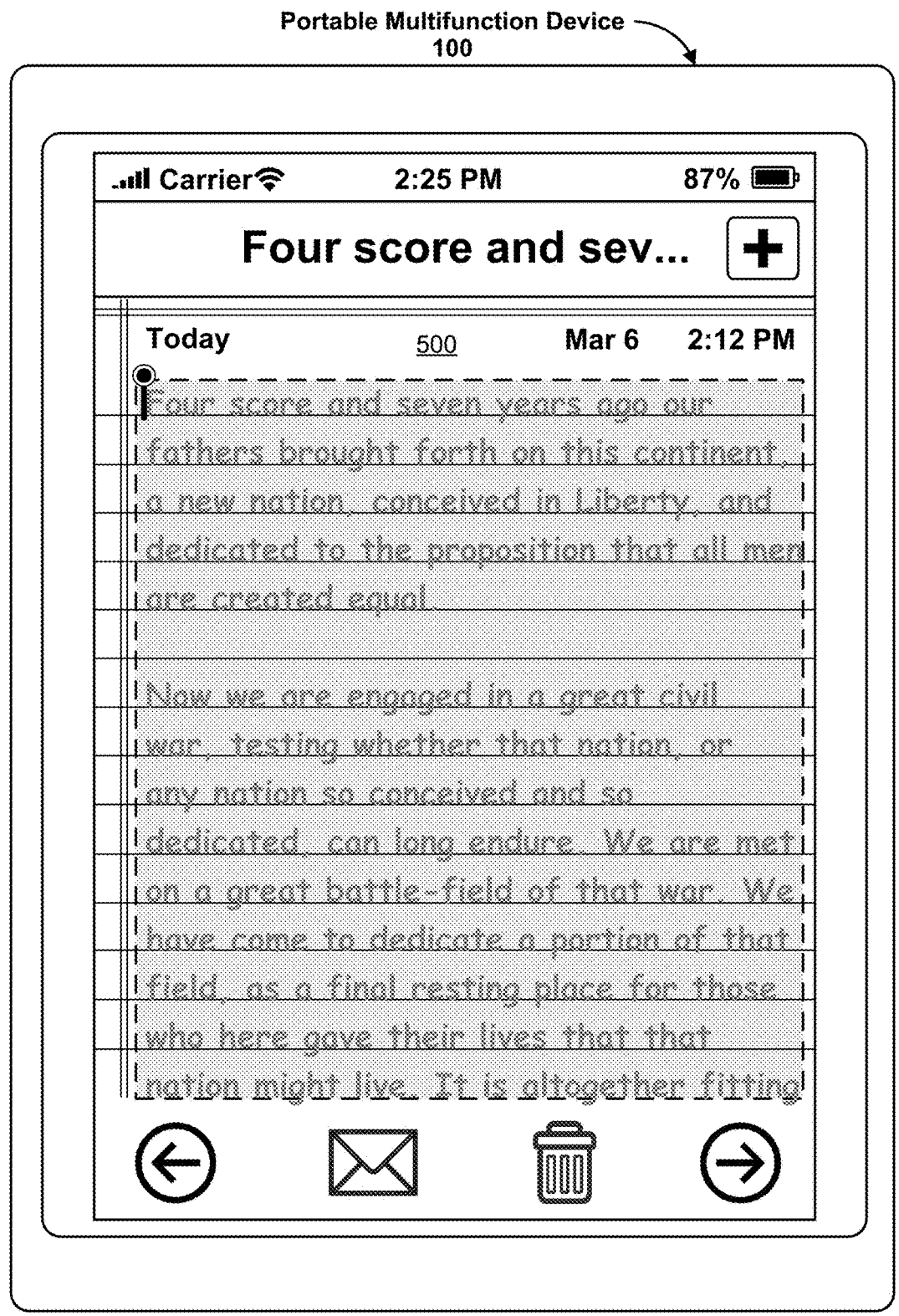
Figure 5A:
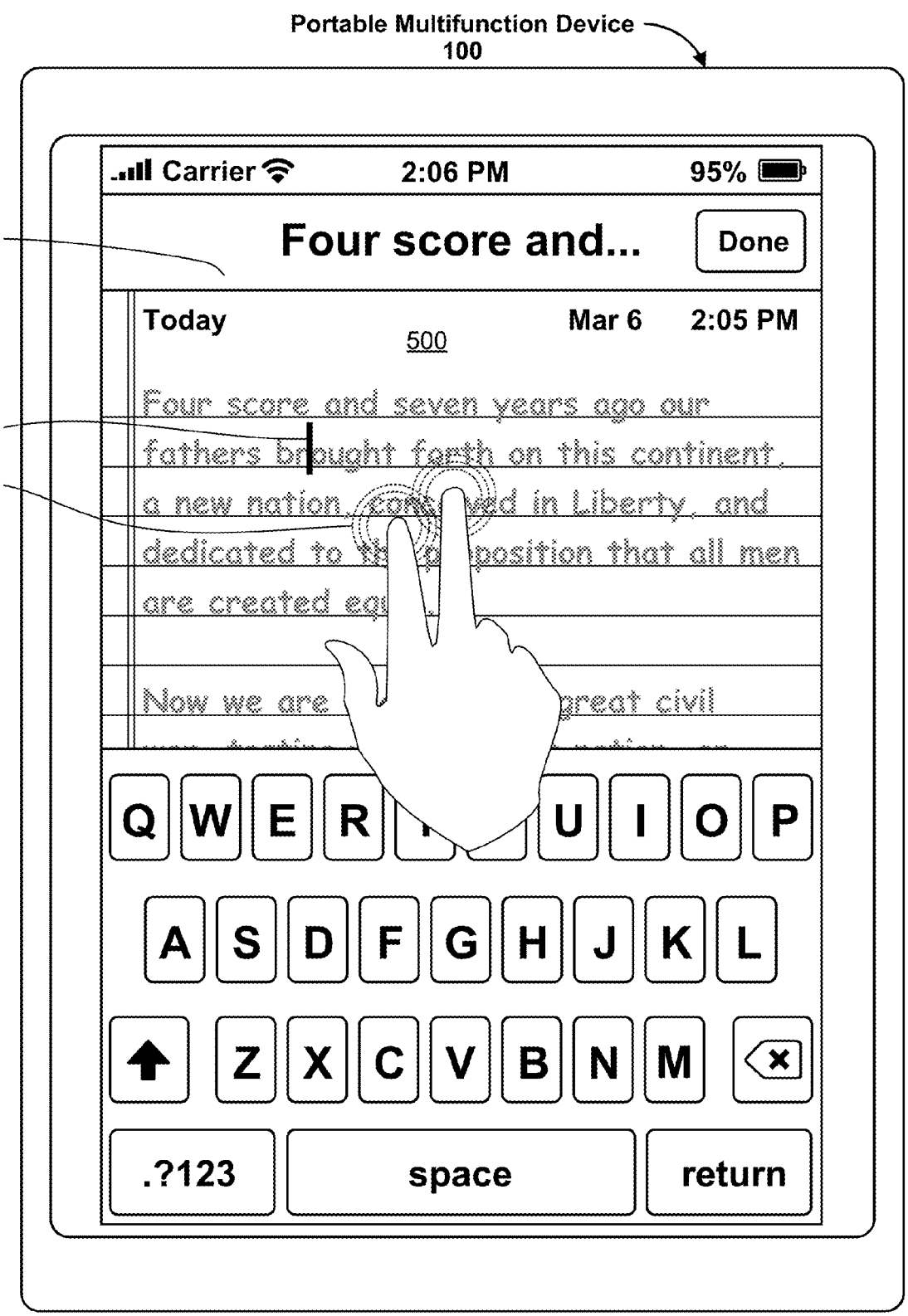
Figure 5A:
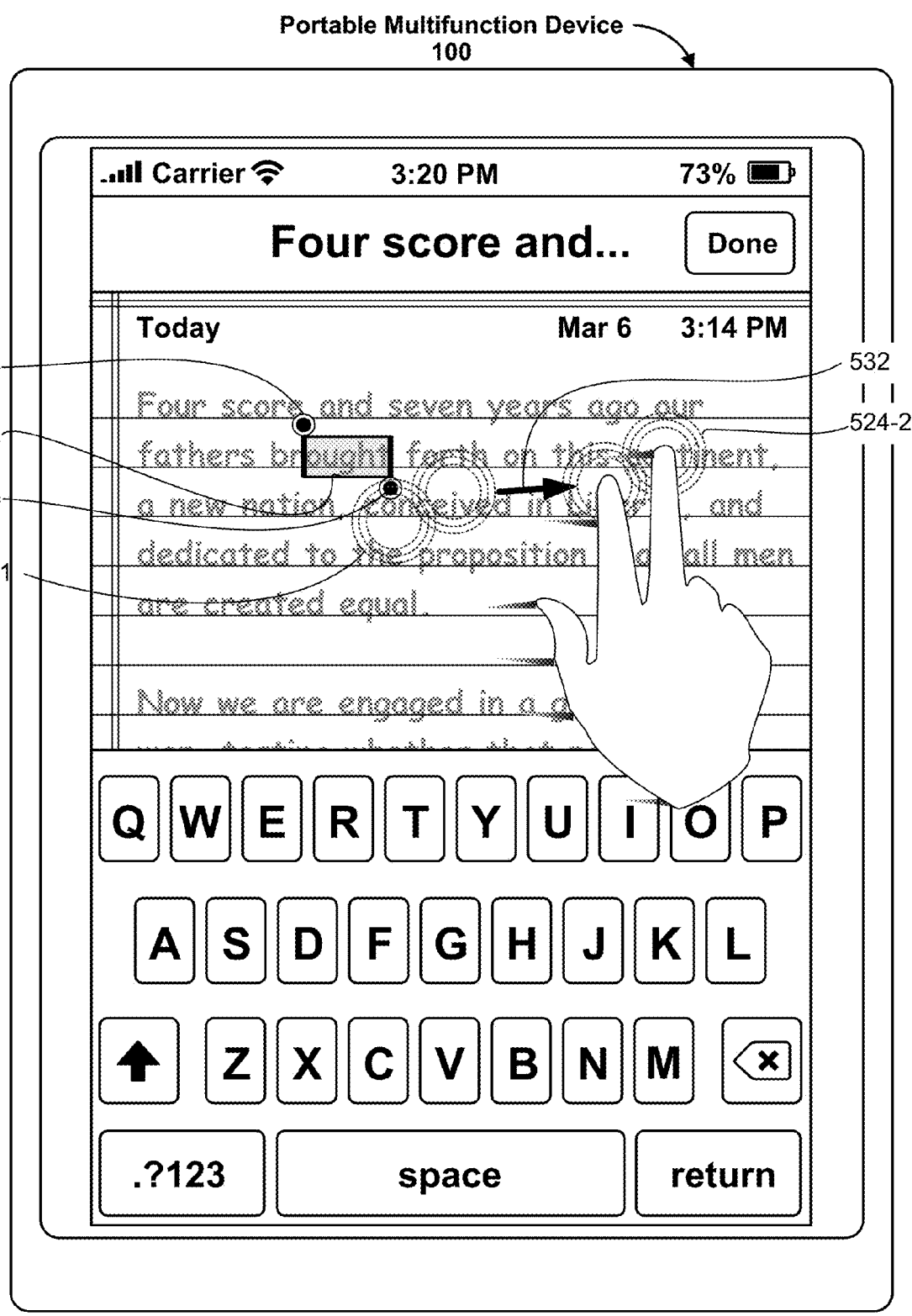
Figure 5A:
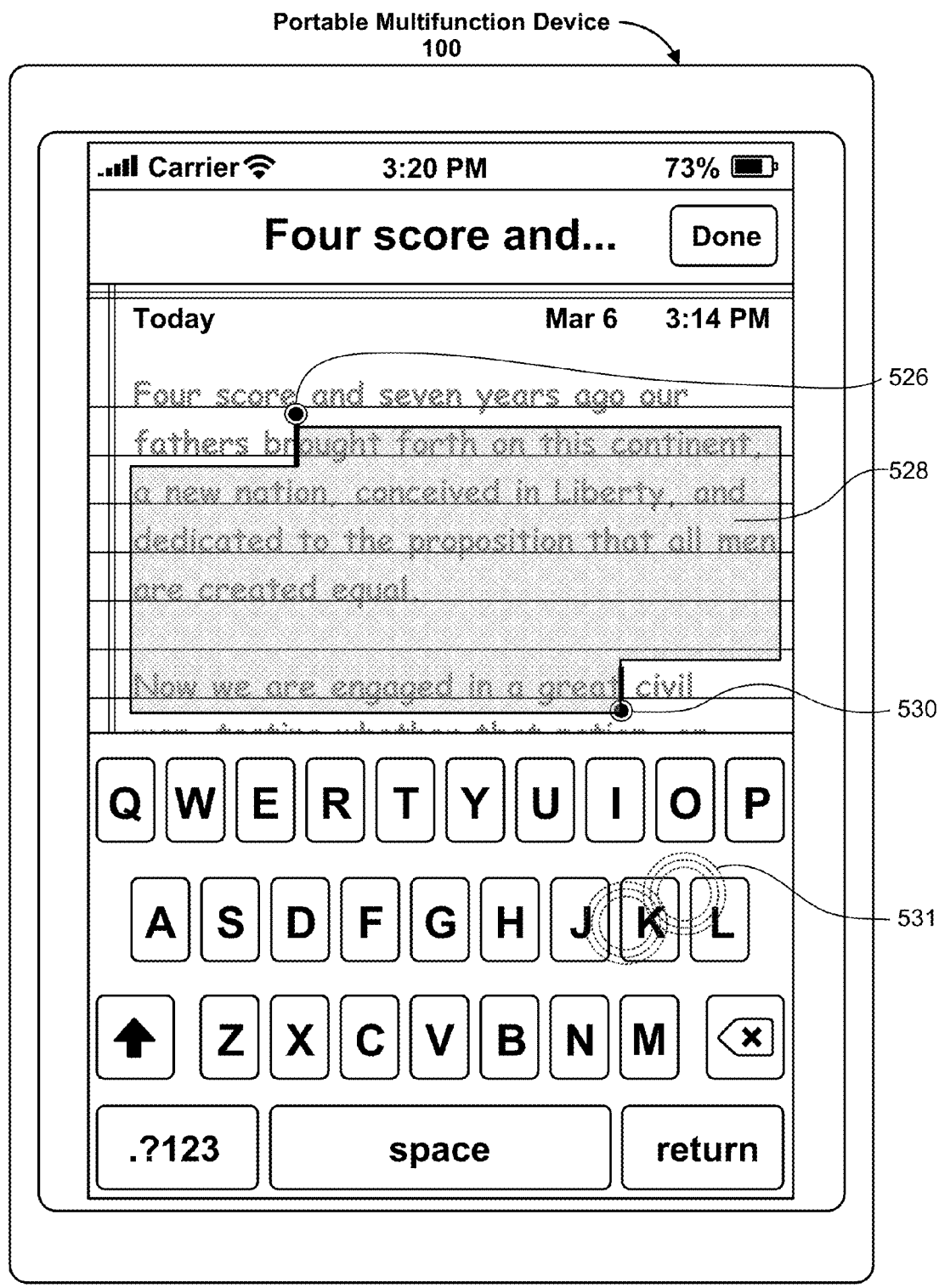
Figure 5A:
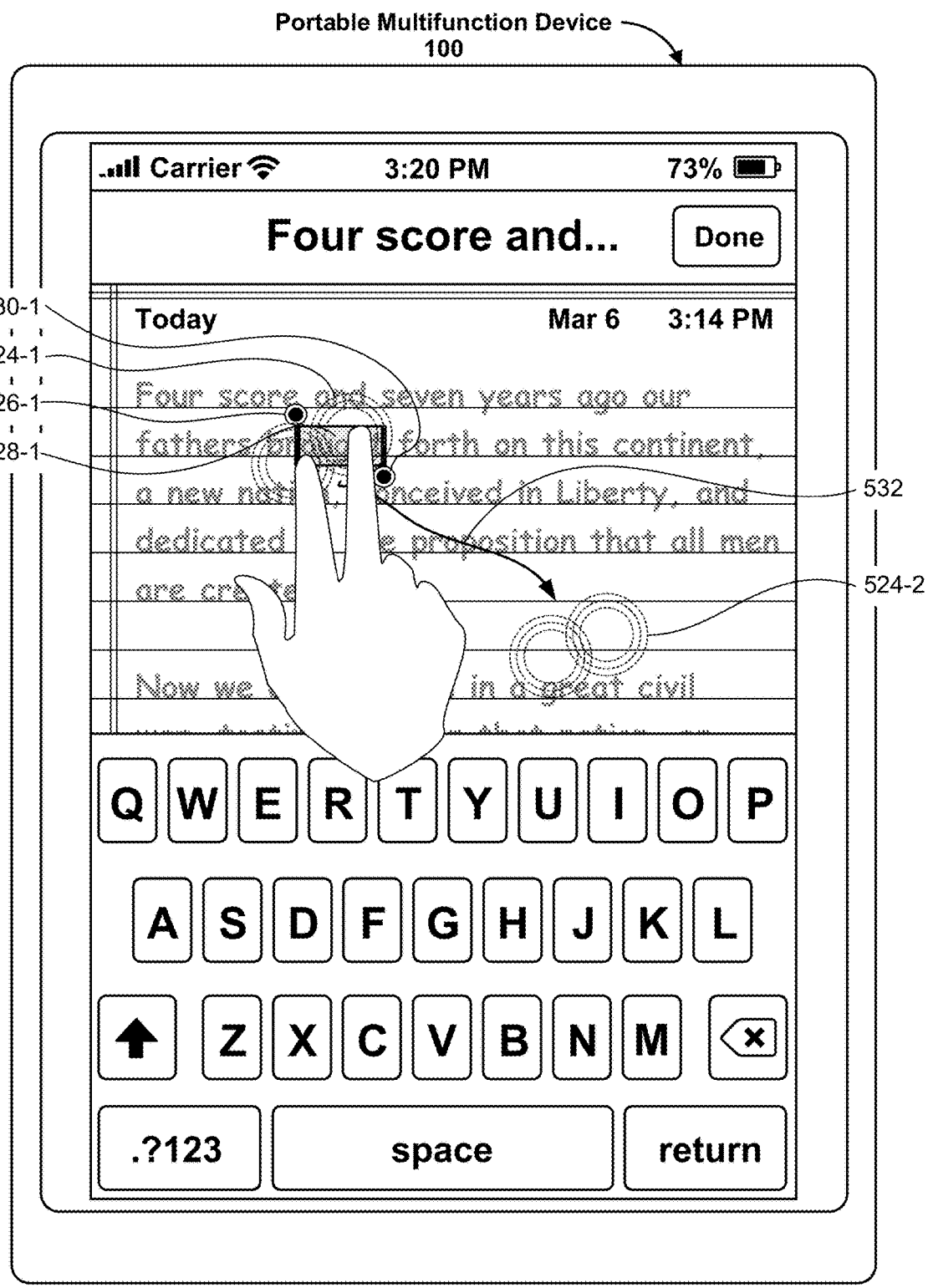
Figure 5A:
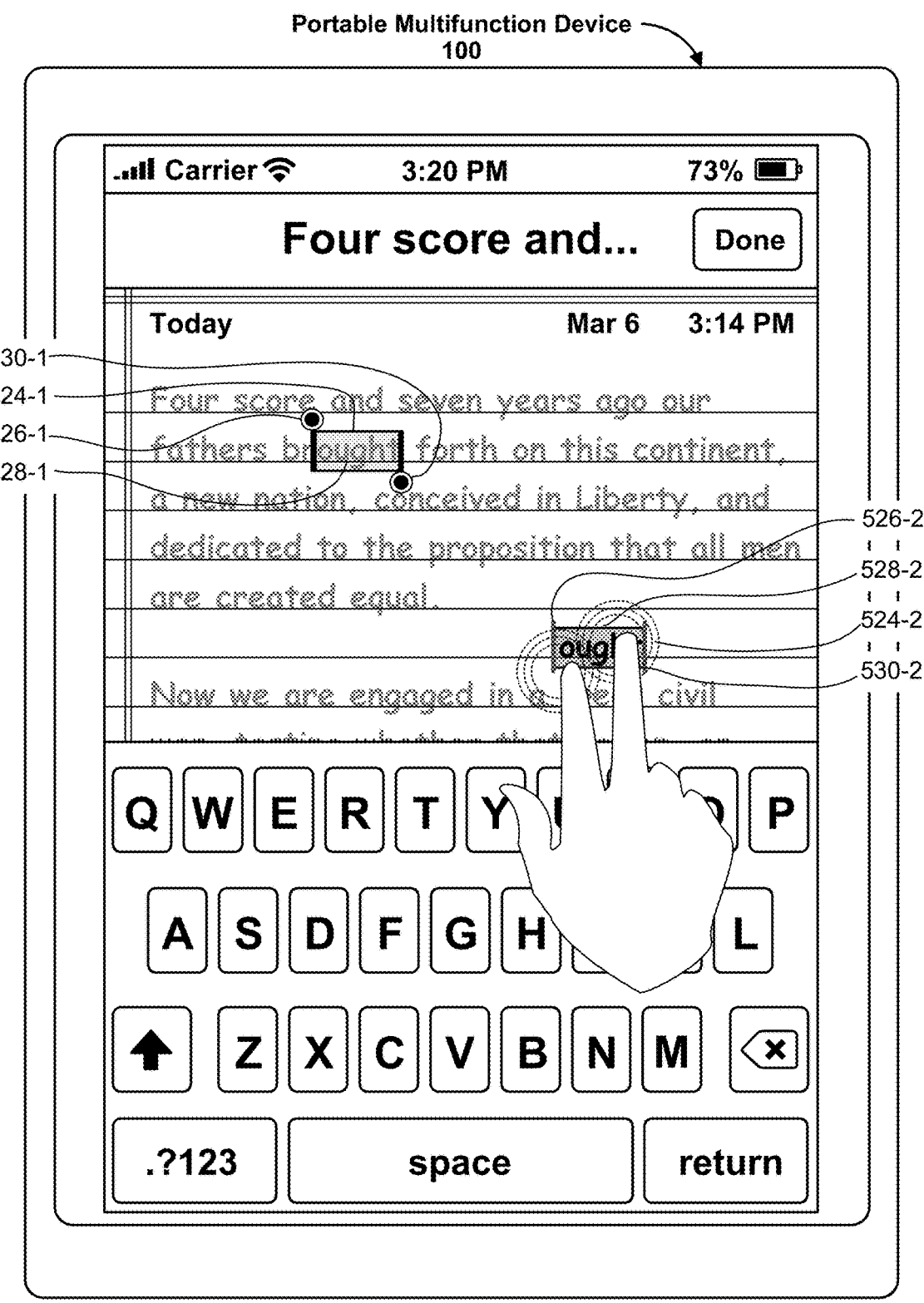
Figure 5A:
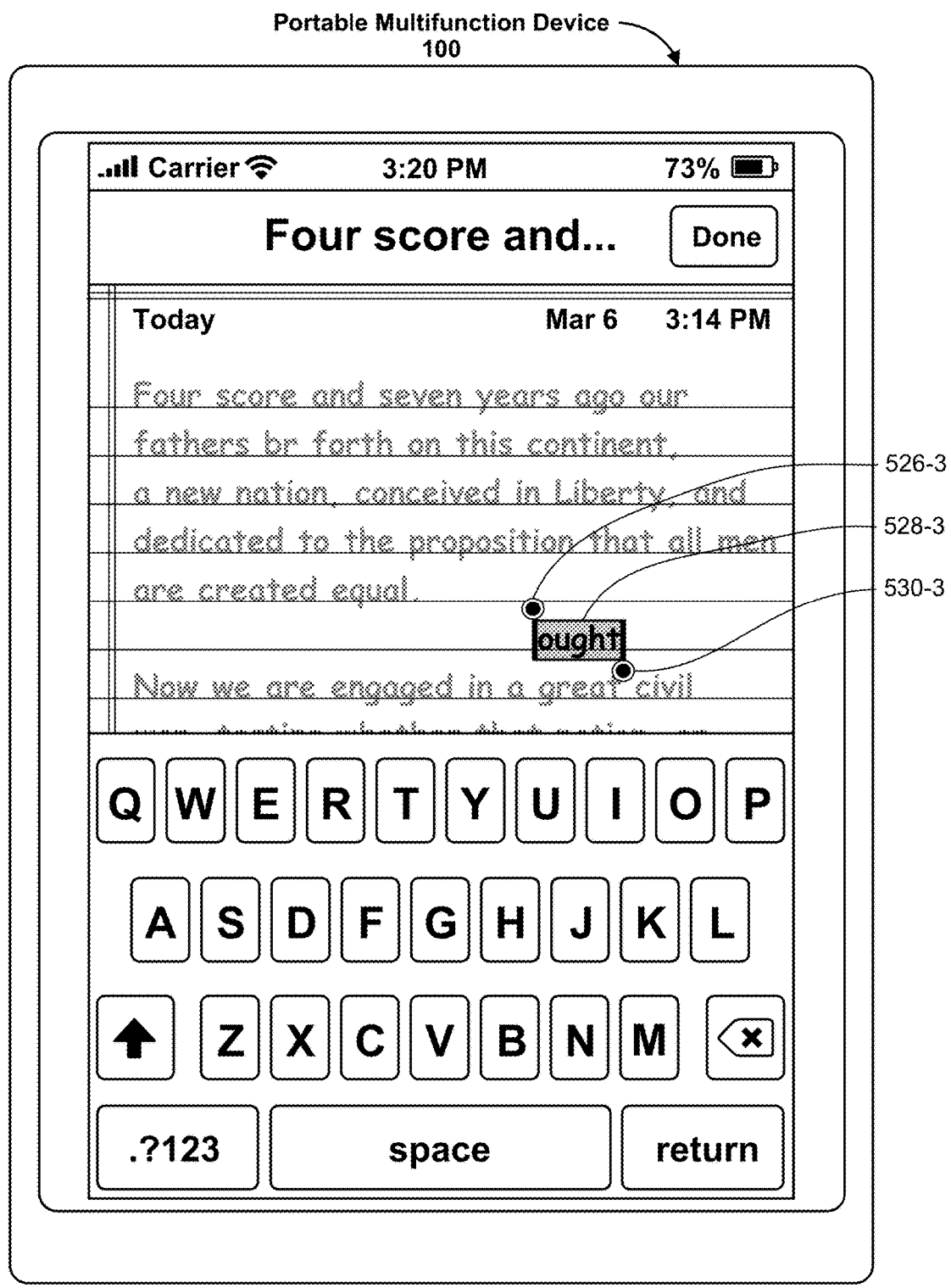
Figure 5A:
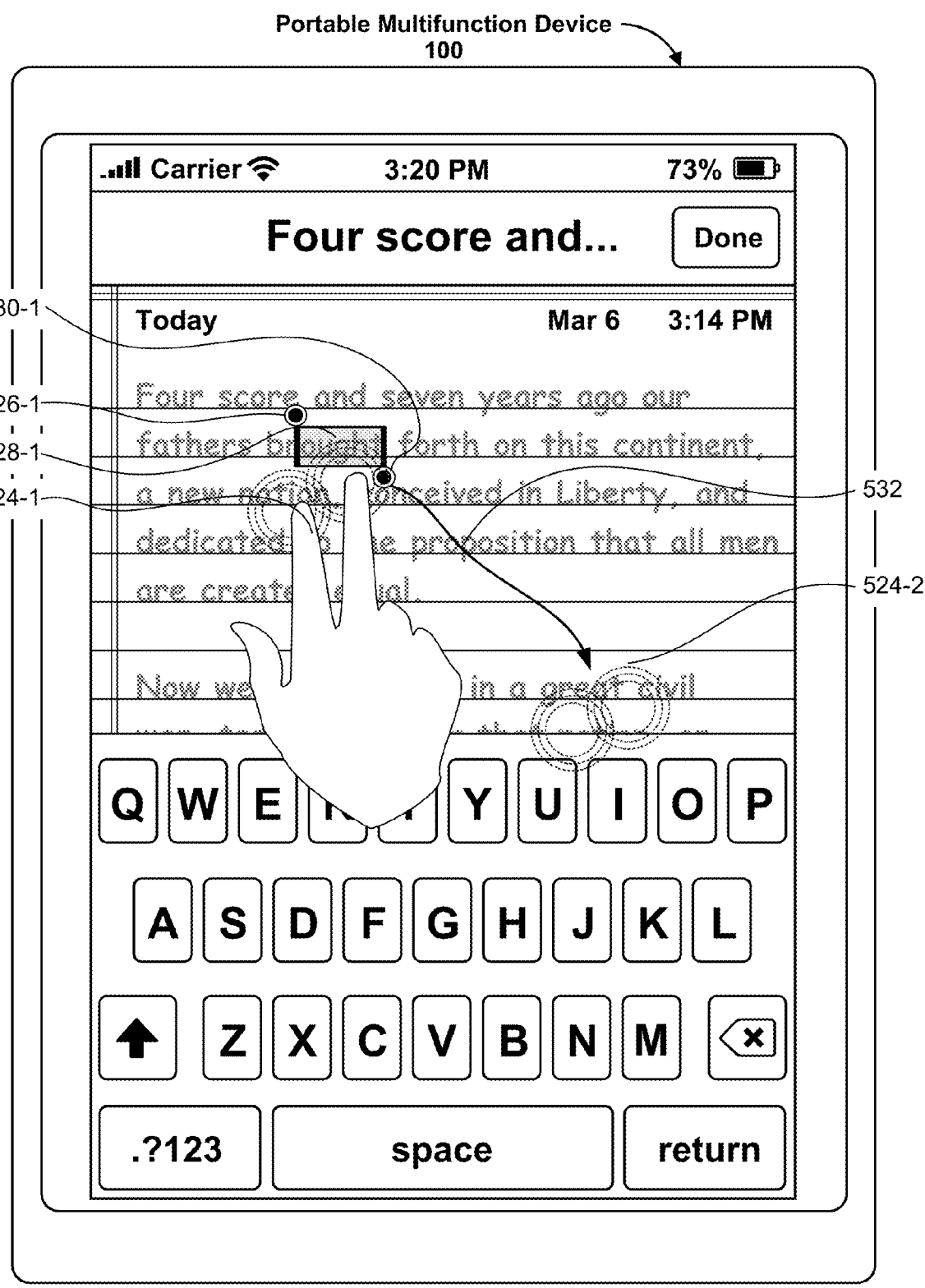
Figure 5A:
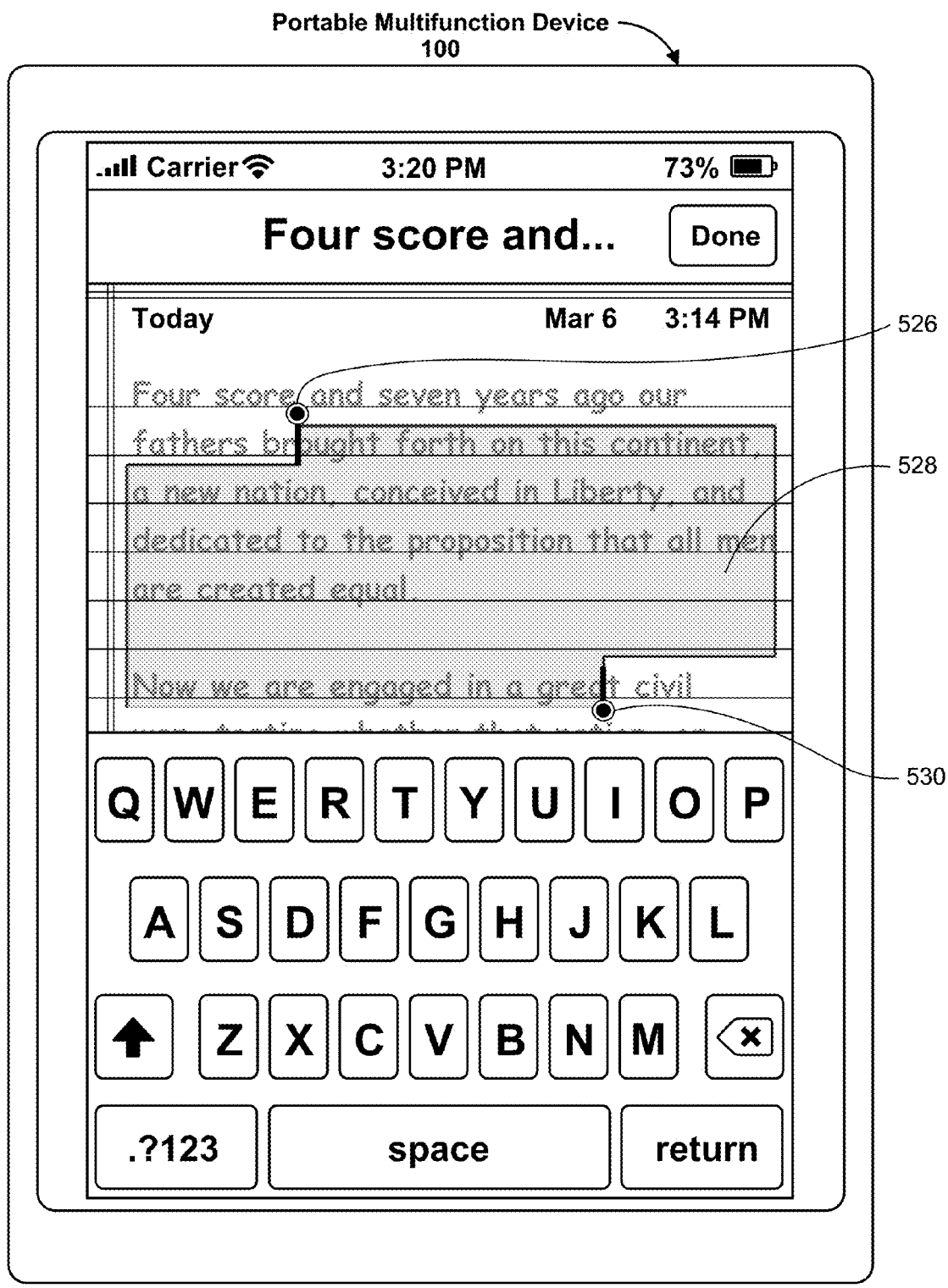
Figure 5A:
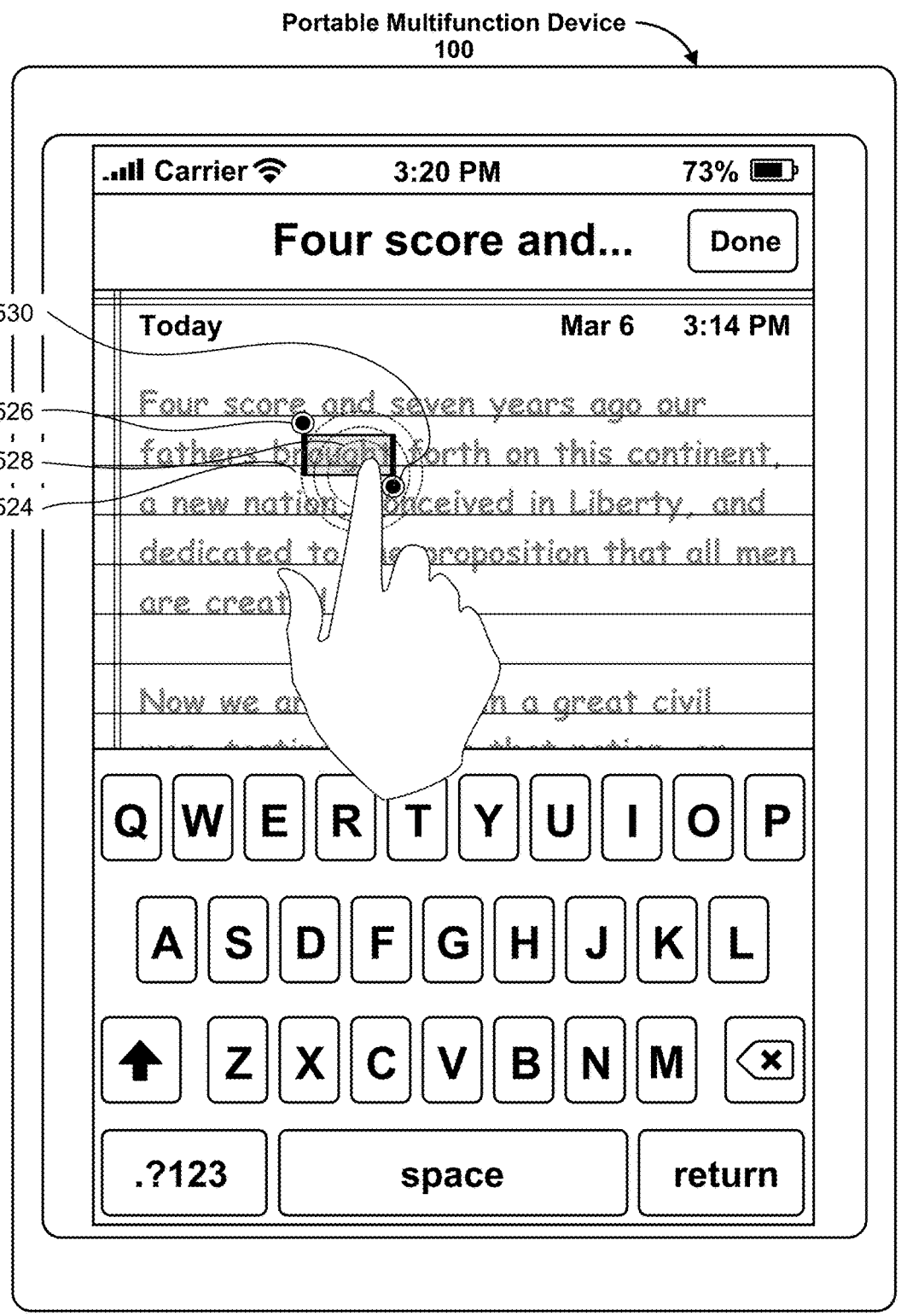
Figure 5A:
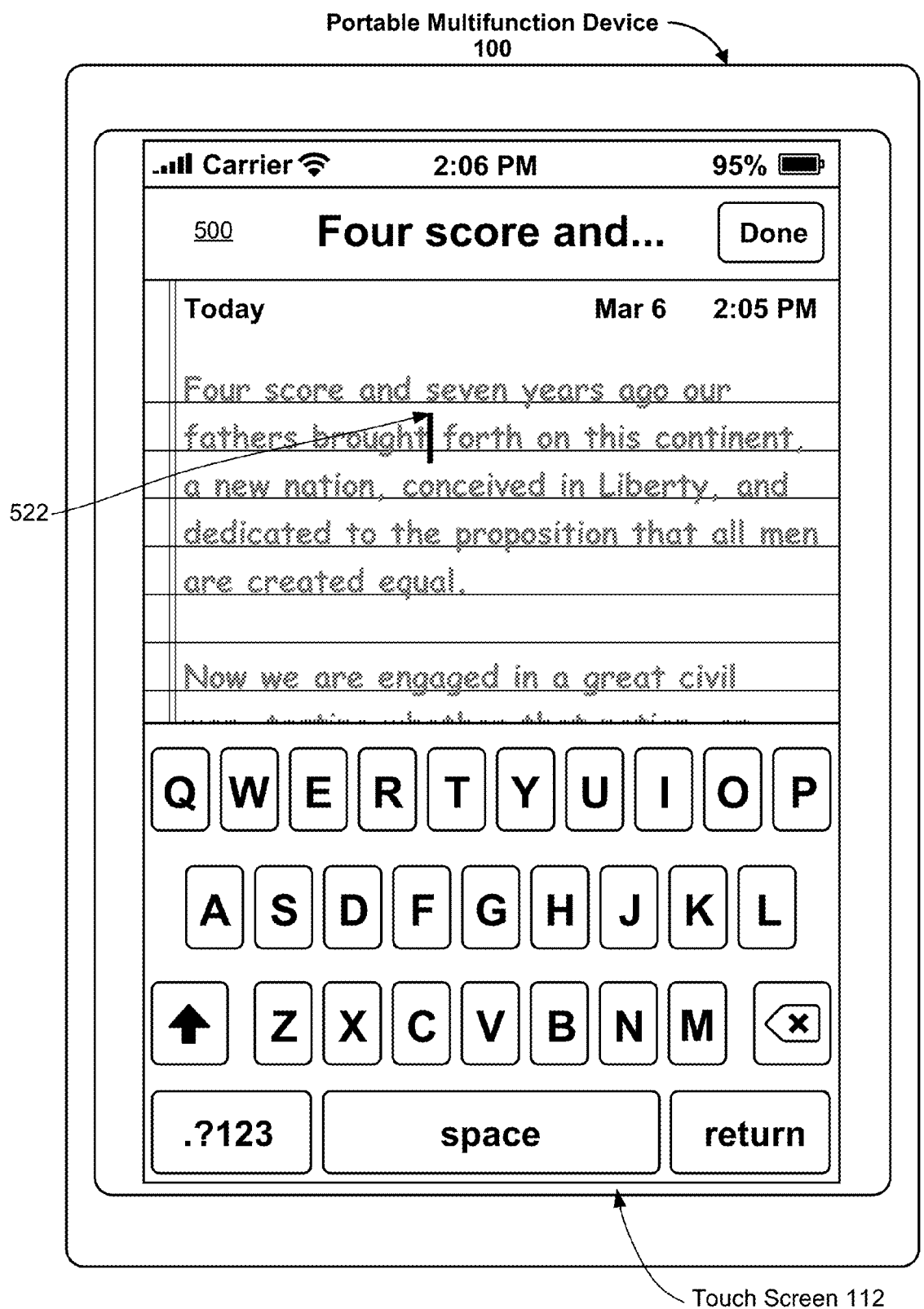
Figure 5A:
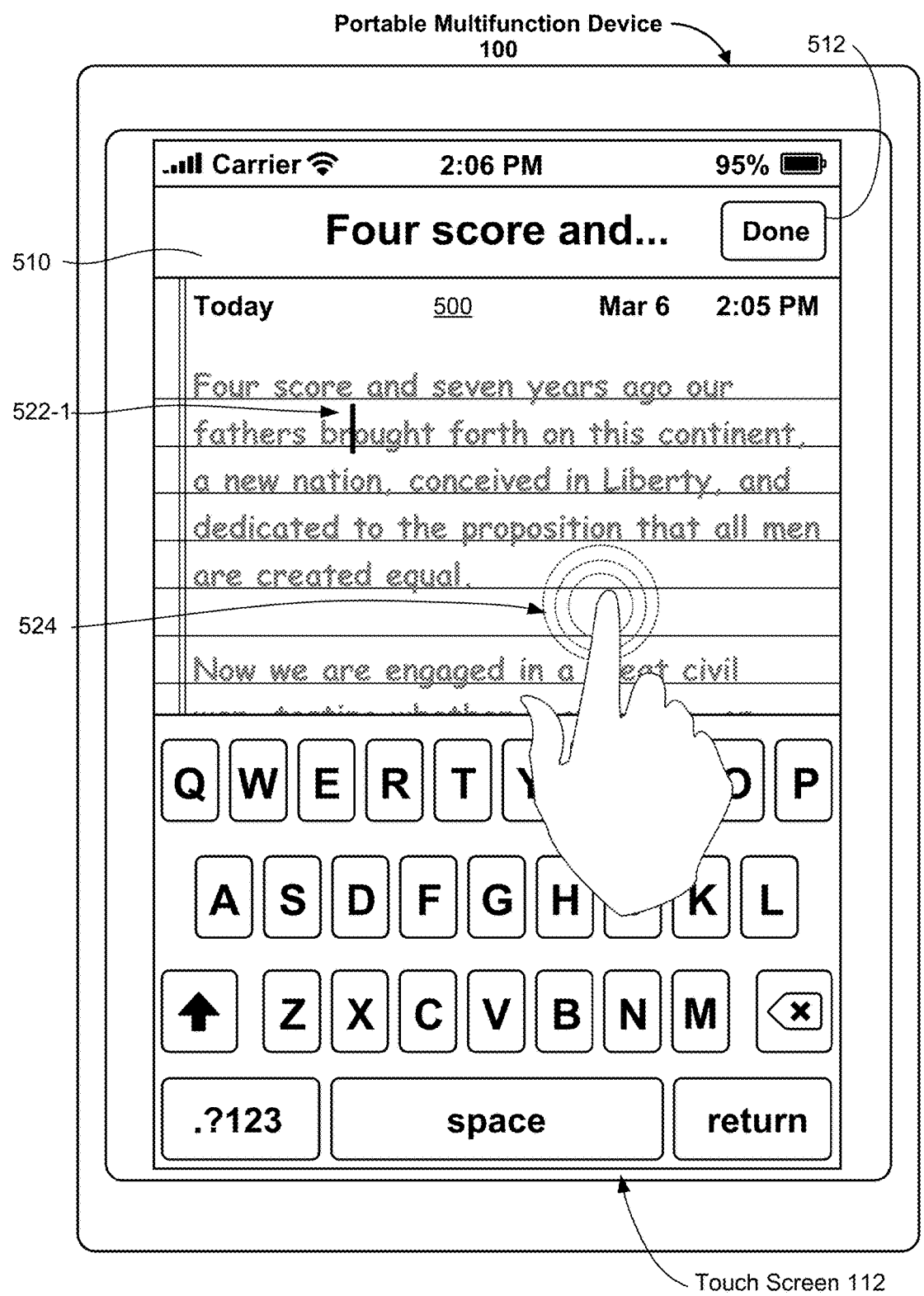
Figure 5A:
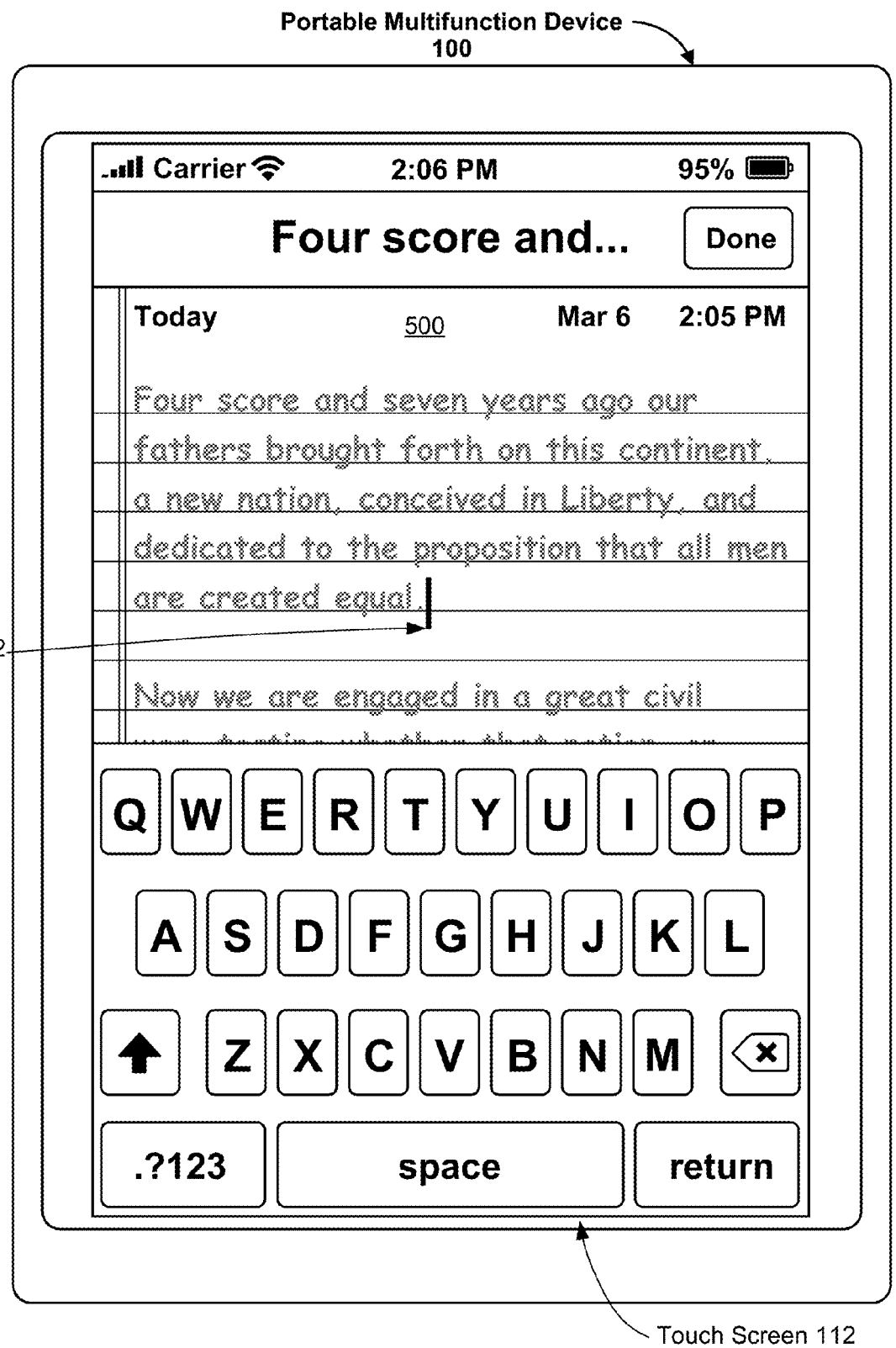
Figure 5A:
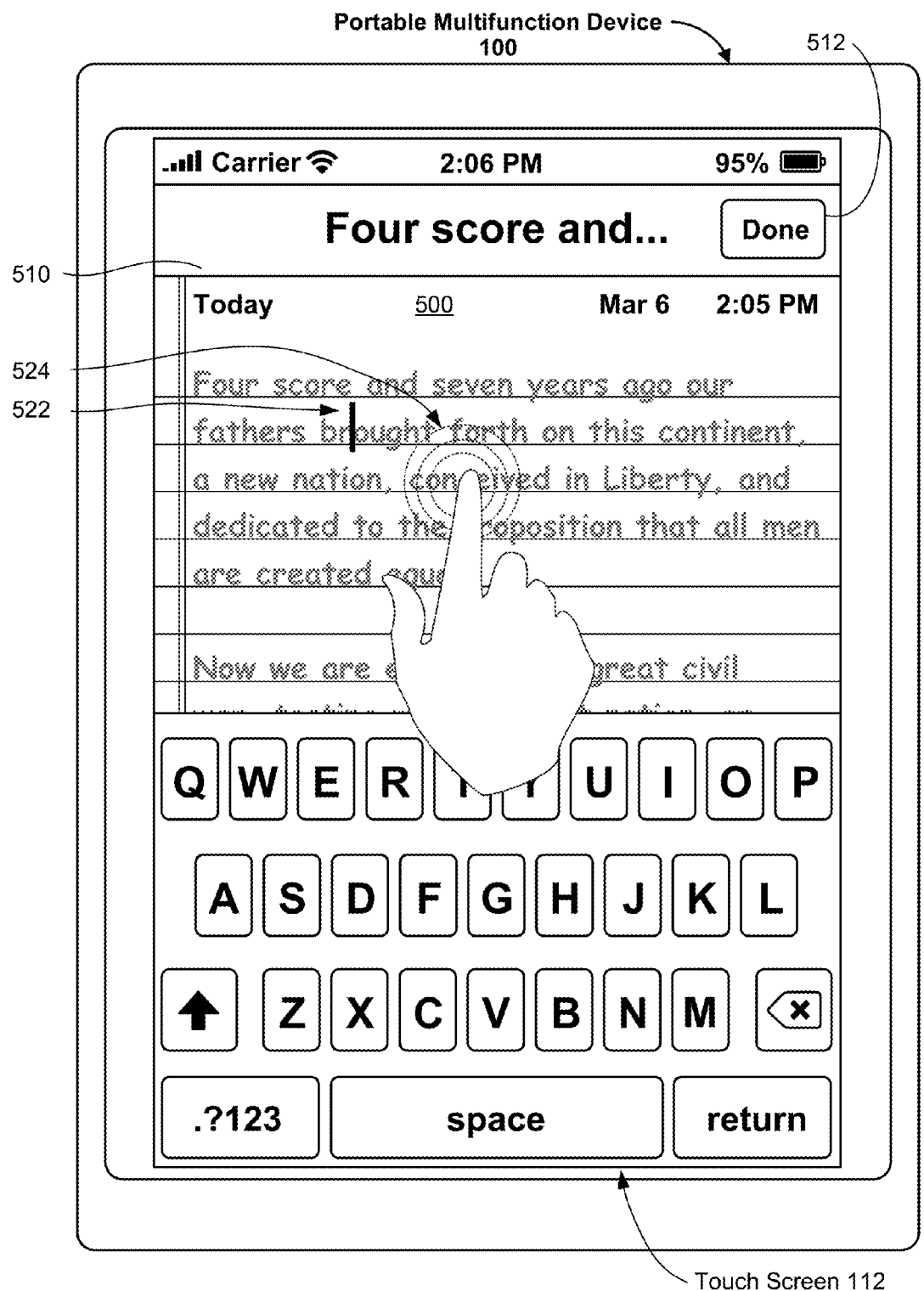
Figure 5A:
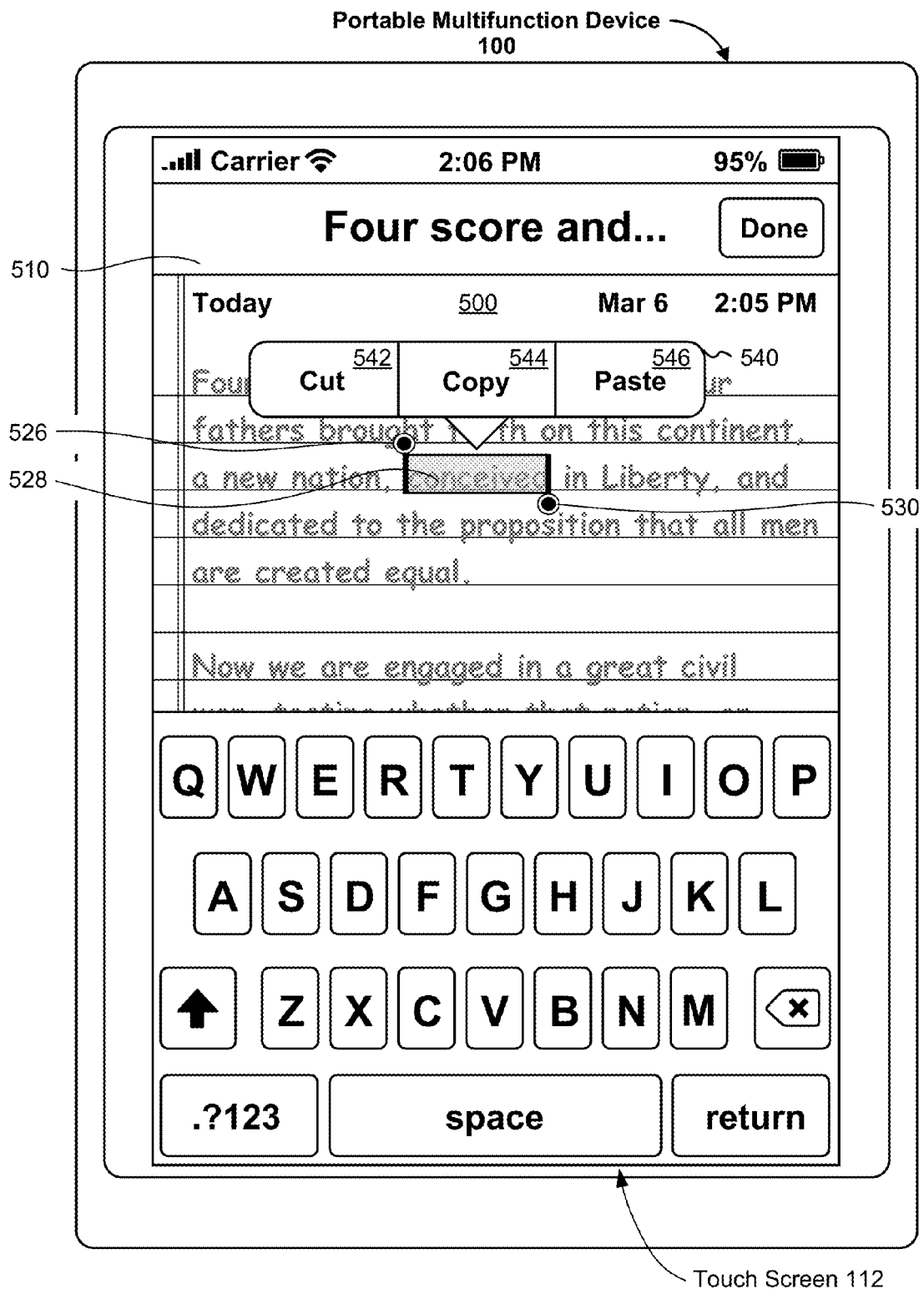
Figure 5A:
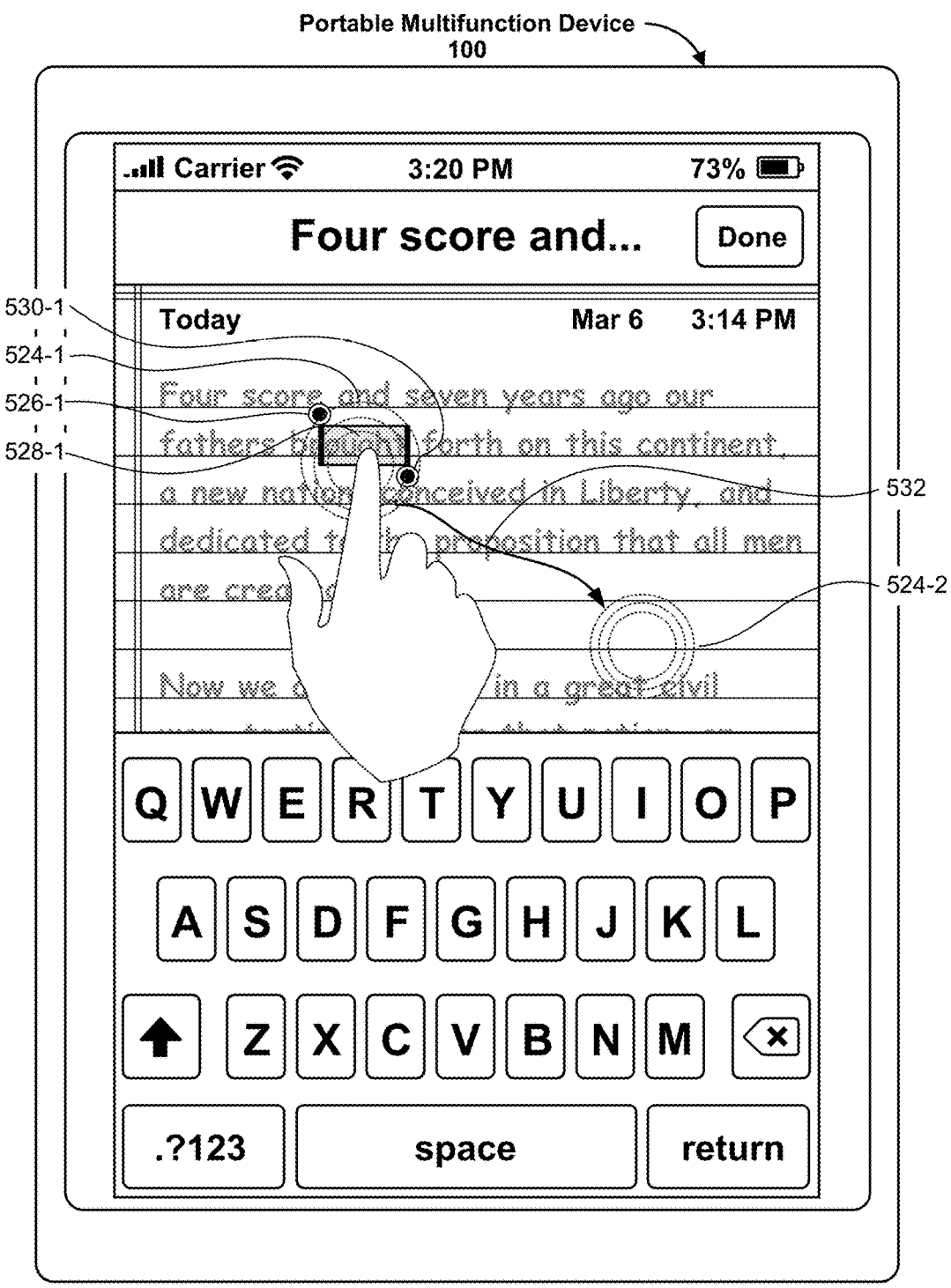
Figure 5A:
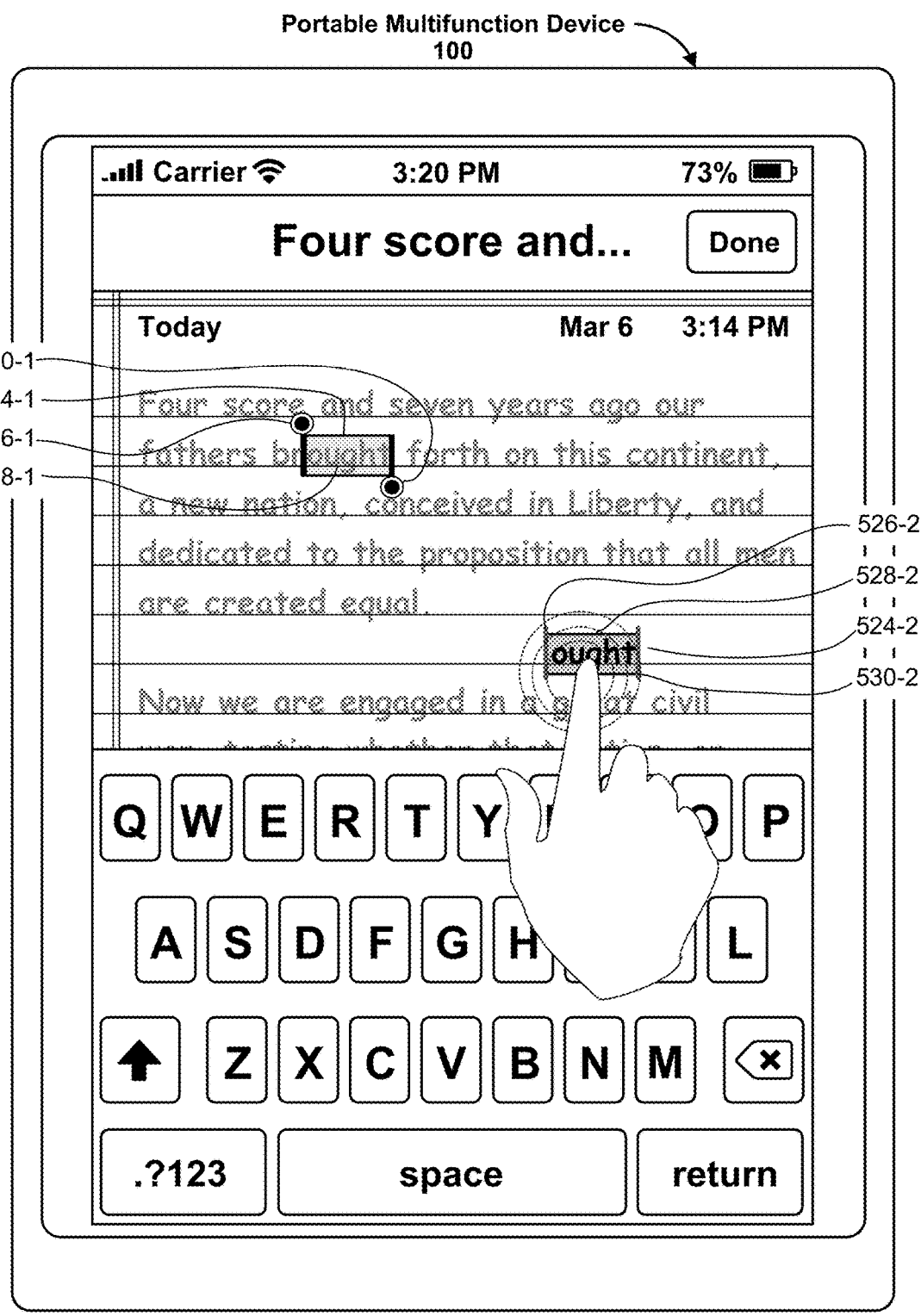
Figure 5A:
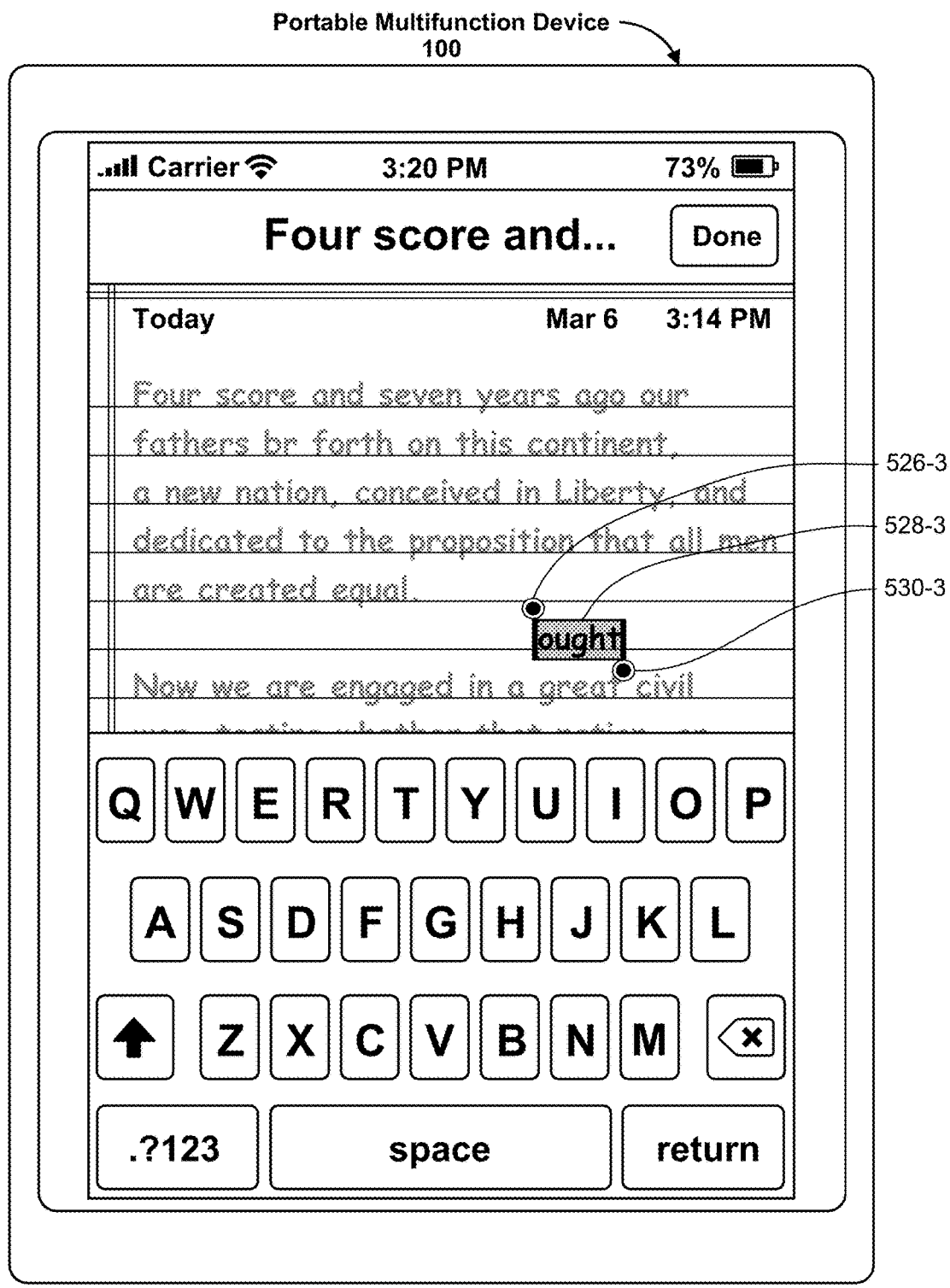
Figure 5A:
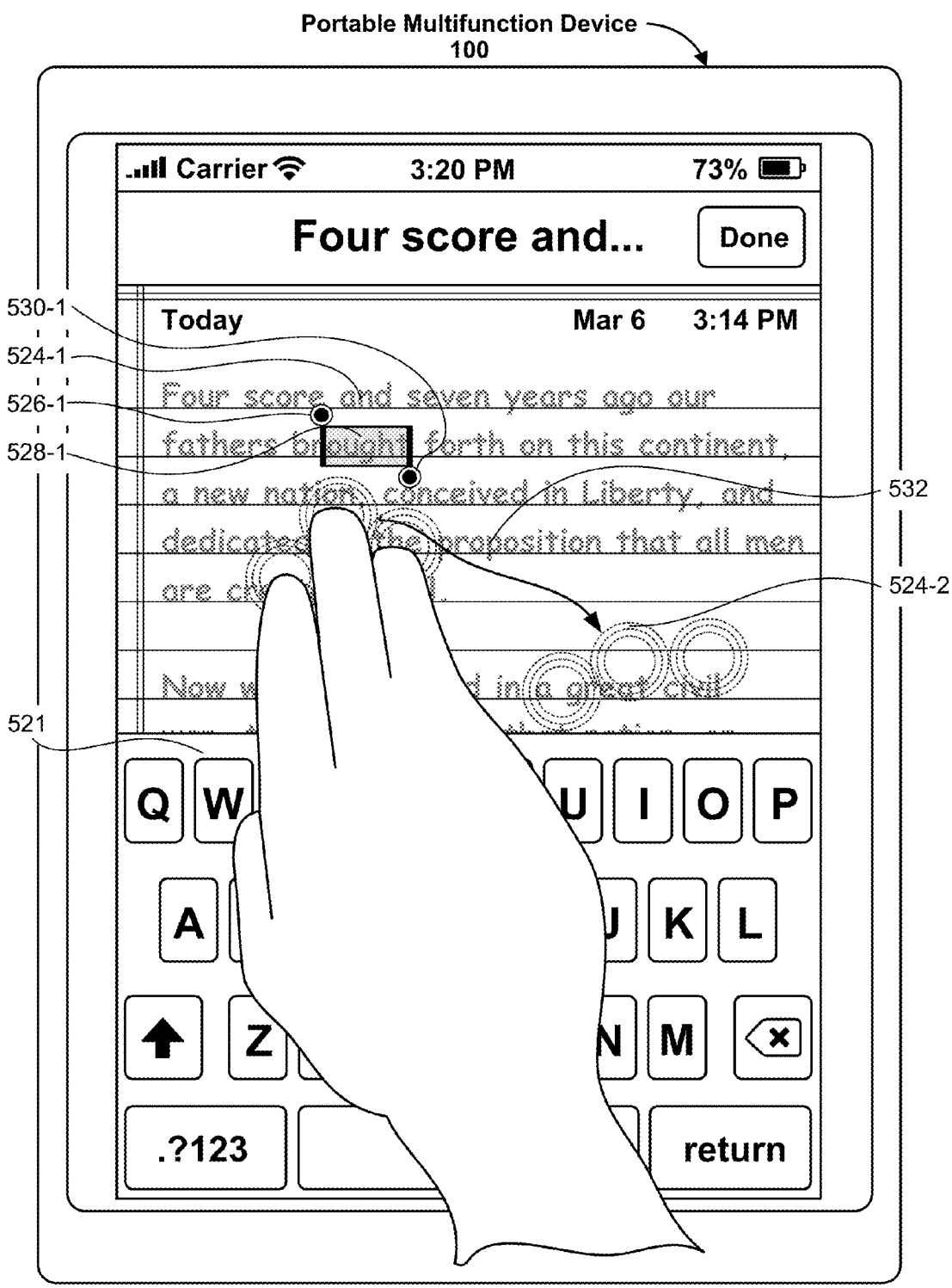
Figure 5A:
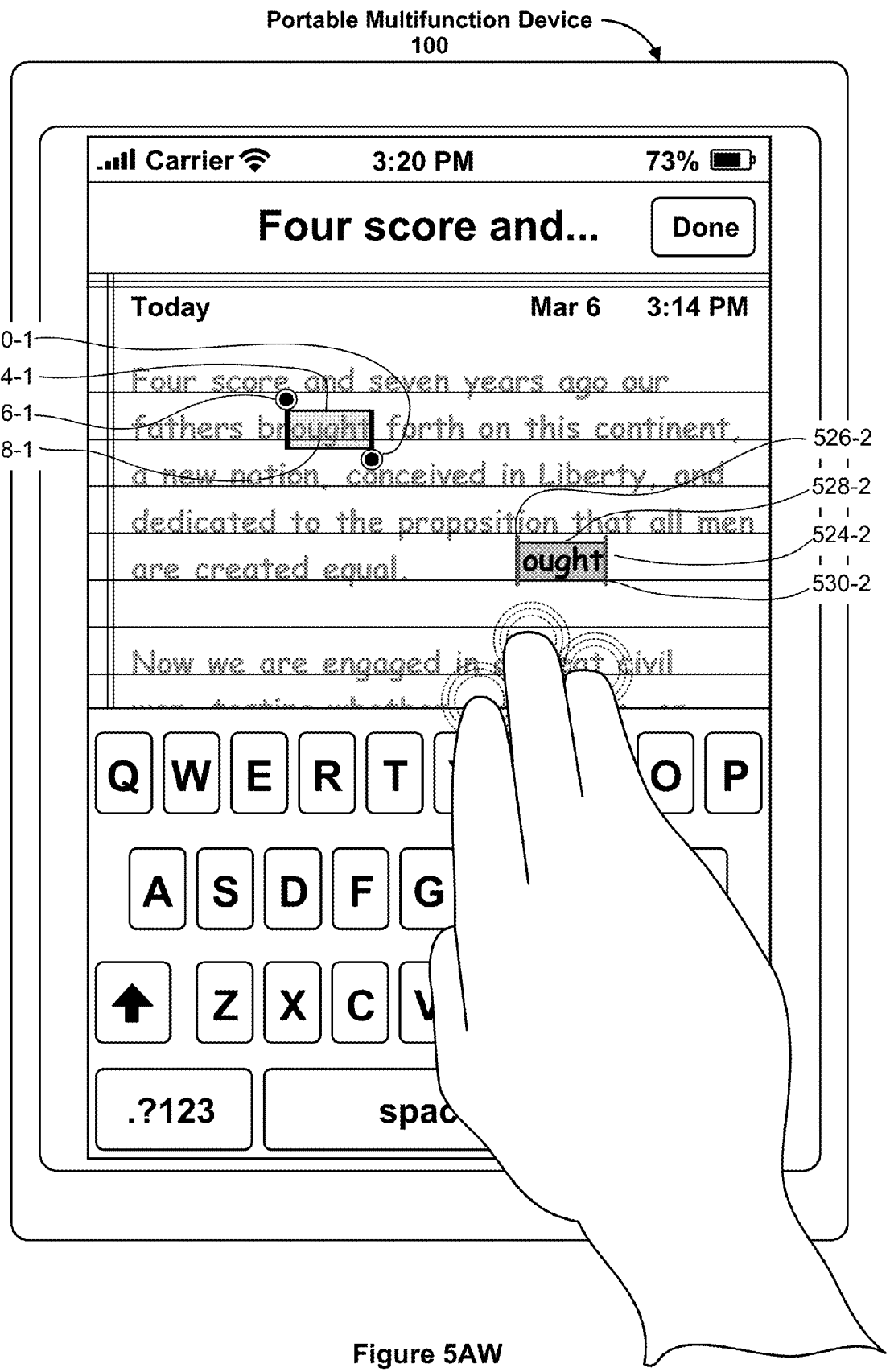
Figure 5A:
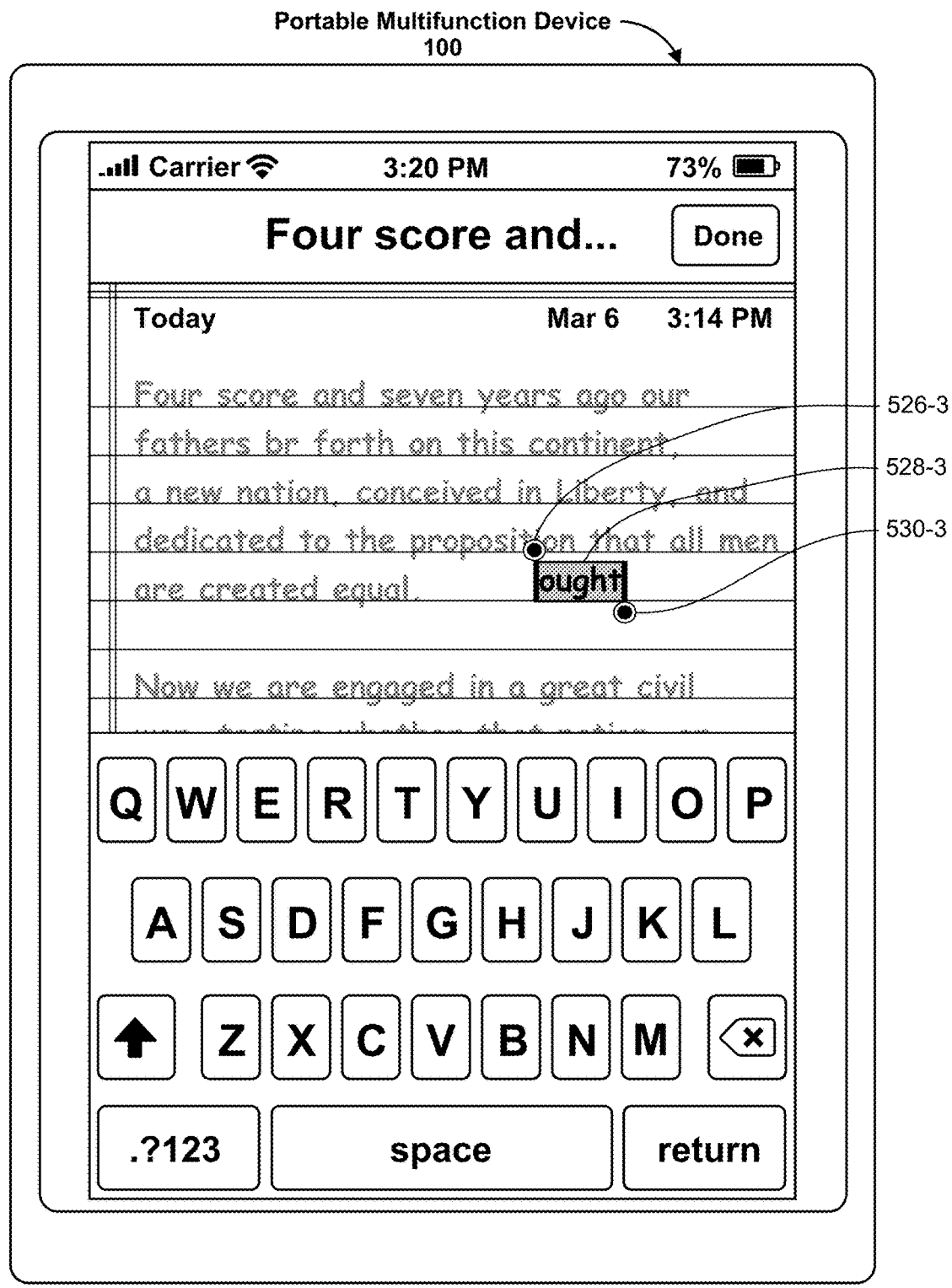

In some embodiments, upon determining that there is an existing selection (411—Yes, FIG. 4A), e.g., following the two-finger triple-tap to select a paragraph shown in FIG. 5X, the device 100 detects a two-finger quadruple-tap at a contact point not on the selection (415—No, 419, and 464 of FIG. 4A). In some embodiments, the two-finger quadruple-taps need to be at or near the same contact point on the touch screen display and made within a short predetermined time of one another, e.g., 0.5 seconds. In response to detecting the two-finger quadruple-tap (464 of FIG. 4A), the device 100 selects a third predetermined expanded portion of the content (e.g., a page or document) that includes at least a portion of the previously selected content 528, as shown in FIG. 5Y.

It should be noted that expansion of the selection illustrated in FIGS. 5T-5Y is performed in response to successive touch inputs. FIGS. 5T-5Y illustrate exemplary user interfaces corresponding to the steps 460-464 in FIG. 4A after the device determines that the touch inputs are located outside a selection or not on or over a selection. In some embodiments, the duration between each successive touch input in a multi-tap input is less than a predetermined amount, such as less than 0.25 seconds. For example, a two-finger quadruple-tap is four two finger taps in rapid succession. In response to a two-finger double-tap, the selection is expanded to a sentence or line; In response to a two-finger triple-tap, the selection is expanded to a paragraph; and in response to a two-finger quadruple-tap, the selection is expanded to the page or document.

FIGS. 5Z-5AD are used to illustrate the step 440 (FIG. 4A) of expanding the selection in response to tapping on a selection. After detecting two substantially simultaneous touch inputs at 402 (FIG. 4A), and detecting that there is an existing selection (411—Yes) (FIG. 4A), and determining that the touch inputs were made on or over a selection (415—Yes), the device determines the type of touch inputs that were detected 417 (FIG. 4A). When the device determines that the touch inputs are a tap over an existing selection, then the existing selection is expanded at 440. This is shown in FIGS. 5Z-5AD. FIG. 5Z shows an existing selection 528 of the word "and" with displayed markers, such as a start-point object 526 and an end-point object (not shown) at respective ends of the word to indicate the selection 528. FIG. 5Z also shows the two substantially simultaneous touch inputs 524 detected as a tap for expanding the selection to the next largest size of selection, e.g., word to line, line to sentence, sentence to paragraph, paragraph to page, page to document, or the like. For example, when the selected content is a word (or a plurality of words that are part of a single line or a sentence), the selected content can be expanded to a single line of text (as shown in FIG. 5AA) or a sentence (as shown in FIG. 5AB) containing the word "and."

In a similar vein, in some embodiments, the device 100 determines that the location of the tap 524 is on a selection 528 of a single line of text (FIG. 5AA) or a sentence (FIG. 5AB). In response to detecting the tap 440 (FIG. 4A), as shown in FIG. 5AC, the device 100 expands the selection 528 to a paragraph containing the single line of text or the sentence. In some embodiments, to indicate the paragraph selection 528, the device 100 displays markers, such as a start-point object 526 and possibly an end-point object 530 (not shown in FIG. 5AC) at respective ends of the paragraph selection 528. In some embodiments, the device 100 can further determine the location of the tap 524 is on a selection 528 of a paragraph (FIG. 5AC). In response, as shown in FIG. 5AD, the device 100 expands the selection 528 to the electronic document. To indicate the document selection 528, the device 100 displays markers, such as a start-point object 526 and possibly an end-point object 530 (not shown in FIG. 5AD) at respective ends of the document selection 528.

It should be noted that the selection expansion in response to successive touch inputs illustrated in FIGS. 5T-5Y is different from the selection expansion illustrated in FIGS. 5Z-5AD. FIGS. 5Z-5AD illustrate exemplary user interfaces corresponding to the step 440 in FIG. 4A after the device 100 determines the touch inputs are located on a selection. In contrast, FIGS. 5T-5Y illustrate exemplary user interfaces corresponding to the steps 460-464 in FIG. 4A after the device determines the touch inputs are located outside a selection or not on or over a selection. As stated with respect to FIGS. 5J-5P above, the two substantially simultaneous touch inputs 524 in FIG. 5T can be located anywhere on the touch screen display 112. In response to the first two-finger tap, a word closest to the cursor is selected, as shown in FIG. 5U. Subsequently each additional two-finger tap on the touch screen display 112 is detected by the device 100. In some embodiments, the duration of each contact is less than a predetermined threshold such that the additional two substantially simultaneous touch inputs can be detected as a two-finger double-tap, two-finger triple-tap, and two-finger quadruple-tap etc. In response to the double-tap, the selection is expanded to a sentence or line; in response to a triple-tap, the selection is expanded to a paragraph; and in response to a quadruple-tap, the selection is expanded to the page or document. In contrast, the device 100 performs the selection expansion as shown in FIGS. 5Z-5AD in response to detecting independent touch inputs on a selection. Thus, the touch inputs illustrates in FIGS. 5Z-5AD are detected by the device 100 as separate touch events, not as successive touch events in a single sequence.

Referring back to FIG. 4A, in addition to determining the type of touch inputs as drag, flick, and tap, the device 100 can detect the type of touch inputs as hold and drag. If the device 100 does not detect an existing selection (411—No), in response to determining 413 the type of touch inputs as hold and drag, the device 100 initiates selecting a portion of the document and extends the selection commensurate with the dragging gesture at 452. To determine if the inputs are a hold and drag gesture as compared to simply a drag gesture, the device determines if the touch inputs remain in contact with the screen without moving for a predetermined period of time (e.g., >0.75 seconds or >1 second) before the drag gesture occurs. In some embodiments, the selection starts at the point of contact and expands in the drag direction.

If the device 100 detects an existing selection (411—Yes), and further determines that the touch inputs are located on an existing selection (415—Yes), and then determines at 417 that the inputs are a hold and drag, then the device 100 moves the selection at 451. In some embodiments, the selected text remains in place with only a cursor moving, and only once the user releases contact with the touch screen surface (e.g., a lift-off event) is the selected text moved to the position of the cursor at the time of the lift-off or release. In other embodiments, the selection is dragged around the document and placed at the position of the selection (or a cursor) at the time of contact release or lift off. In yet another embodiment, a ghost copy of the selection is dragged around the document, while the original selection remains in place, and only placed at the position of the selection (or a cursor) at the time of contact release or lift off.

If the touch inputs are not located on an existing selection (e.g., outside an existing selection) (415—No), the device 100 determines the type of selection at 419, and if the type is a hold and drag 453, expands the existing selection in the direction of the drag gesture at 453. Here, the expanded selection includes the original selection and any expanded portion of the document. FIGS. 5AE-5AG illustrate the step 452 of expanding the selection while dragging. FIGS. 5AH-5AJ illustrate exemplary user interfaces implementing the step 451 of moving an existing selection. FIGS. 5AK-5AL illustrate exemplary user interfaces implementing the step 453 of starting a selection and extending the selection while dragging.

FIGS. 5AE-5AG illustrate the step 452 (FIG. 4A) of expanding the selection while dragging. In FIG. 5AE, the device 100 determines that prior to detecting the two-finger touch inputs, there is no existing selection. In response to detecting the two-finger touch contacts 524, followed by a predetermined period of time, followed by a dragging gesture 532 (FIG. 5AF), the device 100 determines that the inputs are a hold and drag gesture and starts a selection at the cursor 522 and expands it in a direction of the drag gesture 532. For example, the cursor is located between the letters "br" and "ought" and the dragging gesture is in the right direction so expansion of the selection is in the right direction to select "ought" 528. If the dragging continues in a rightward and downward direction, where a release or lift-off event occurs at 531, the selection ("ought forth on this continent . . . in a great") 528 is shown in FIG. 5AG.

FIGS. 5AE-5AG illustrate expanding the selection 528 in accordance with the dragging gesture 532. In some embodiments, the selection can expand either backward or forward. The initial direction of the drag gesture 532 determines the direction of the expansion. For example, a right (e.g., FIG. 5AF) and/or down drag gesture 532 moves the upside down lollipop shaped end-point object 530 right and/or down without moving the lollipop shaped start-point object 526 in order to expand the selection 528 forward; while a left and/or up drag gesture moves the lollipop shaped start-point object 526 left and/or up without moving the upside down lollipop shaped end-point object 530 in order to expand the selection 528 backward. In some embodiments, the selection 528 expands one word at a time if the drag is fast, and expands one character at a time if the drag is slow.

FIGS. 5AH-5AJ illustrate the step 451 (FIG. 4A) of moving an existing selection. Once the device detects two substantially simultaneous touch inputs at 402 (FIG. 4A), determines that there is an existing selection (411—Yes) (FIG. 4A), and determines that the inputs are on a selection (415—Yes) (FIG. 4A), then the device determines the type of input at 417 (FIG. 4A). If the type is a hold and drag, as described above, then the selection is moved at 451. In FIG. 5AH, the device 100 detects two substantially simultaneous touch inputs at a first region 524-1 on the touch screen display. The first region 524-1 is at least partially on or over a location of a selection 528-1, which may be marked by markers, such as a start-point object 526-1 and an end-point object 530-1 at respective ends of a partial word "ought". The device 100 further detects the two substantially simultaneous touch inputs remaining motionless on the touch screen display for a predetermined duration followed by a continuous drag gesture (e.g., start dragging within 0.5 or 0.75 seconds after remaining motionless) from the location of the two substantially simultaneous touch inputs in a direction 532 across the touch screen display from the first region 524-1 to a second region 524-2. In response to detecting the continuous touch movement, the device 100 moves the selection 528-1 across document 500 to a new location 528-2 as shown in FIG. 5AI following the continuous movement.

As mentioned above, in some embodiments, instead of moving the selection 528-1, a ghost selection 528 is displayed in response to the detection of the two-finger dragging. As shown in FIG. 5AI, in some embodiments, the ghost selection 528-2 is displayed offset from the selection 528-1, and in some embodiments, the ghost selection 528-2 can have a different appearance to the selection 528-1. For example, the ghost selection 528-2 can have a different color and/or shade to highlight the ghost selection 528-2 from the color and/or shade used to highlight the selection 528-1. Further, the ghost markers 526-2 and 530-2 mark the beginning and the ending of the ghost selection block 528 can have different color, size, and/or shape from the markers 526-1 and 528-1.

In some embodiments, the ghost selection 528-2 appears at location of the current position of the selection 528-1 as soon as the device 100 detects the two-finger dragging, and the start-point object 526-1 and the end-point object 530-1 can animate to attract the users attention to the appearance of the ghost selection 528-2. While dragging, the ghost selection 528-2 moves in the direction of the two-finger movement to indicate the position to where the selection will be moved when the user lifts or releases the contact (e.g., at the lift-off event). The ghost selection 528-2 may include a ghost start-point object 526-2 and a ghost end-point object 530-2. Both the ghost start point object 526-2 and the ghost end-point object 530-2 may have different appearances from the start point object 526-1 and the end-point object 530-1. On release of the two-finger drag, the selection moves to the location of the ghost selection 528-2. At release of the contacts, the device 100 ceases the display of the ghost selection 528-2 along with the ghost markers 526-2 and 530-2 as shown in FIG. 5AJ. In FIG. 5AJ, the selection 528-3 is indicated by markers, such as a start-point object 526-3 and an end-point object 530-3. Other suitable mechanisms for displaying the movement of the selection are described above.

Turning to FIG. 5AK, FIGS. 5AK-5AL illustrate exemplary user interfaces implementing step 453 (FIG. 4A) of starting a selection and extending the selection while dragging, when the hold and drag are not located on an existing selection (e.g., outside an existing selection in the content region or outside the existing selection on the soft keyboard), in accordance with some embodiments. In FIG. 5AK, after detecting two substantially simultaneous touch inputs 524-1 (402 of FIG. 4A), the device 100 determines that there is an existing selection (411—Yes) (FIG. 4A). The device 100 further determines at 415 that the touch inputs are not on the selection (415—No) (FIG. 4A) (e.g., outside the selection) and determines at 419 that the touch inputs are hold and drag. In response to determining the type of the touch inputs is a hold and drag, the device 100 expands the existing selection in the direction of the drag gesture at 453.

For example, as shown in FIG. 5AK, the device 100 detects the two substantially simultaneous touch inputs 524-1 remaining motionless on the touch screen display for a predetermined duration followed by a continuous drag gesture (e.g., start dragging within 0.5 or 0.75 seconds after remaining motionless) from the location of the two substantially simultaneous touch inputs in a direction 532 across the touch screen display from the first region 524-1 to a second region 524-2. In some embodiments, the drags are detected by the device 100 as a continuous touch movement across the touch screen display from the first location 524-1 to the second location 524-2.

As shown in FIG. 5AK, an existing selection 528-1 (e.g., the part "ought" of the word "brought") is detected by the device 100 and a cursor is not displayed on the touch screen display. In some embodiments, while the selection 528 is displayed, the device 100 also display a cursor and the cursor moves in accordance with the drag gesture. In response to detecting the two substantially simultaneous touch inputs 524-1 located outside the selection 528 (e.g., located below the selection "ought" in FIG. 5AK), the device 100 expands the original selection 528-1 in the direction of the drag gesture 532. In FIG. 5AK, the dragging gesture is in the rightward and downward direction towards 524-2. As a result, the expansion of the selection 528-1 is in the right and downward direction. When a release or lift-off event occurs at 524-2, the selection ("ought forth on this continent . . . in a great") 528 is shown in FIG. 5AL. In FIG. 5AL, the selection 528 is indicated by markers, such as a start-point object 526 and an end-point object 530.

FIGS. 5AK-5AL illustrate expanding the selection in accordance with the continuous touch movement 532. In some embodiments, the selection can expand either backward or forward. The initial direction of the drag gesture 532 determines the direction of the expansion. For example, a right and/or down (as shown in FIG. 5AK) drag gesture 532 moves the upside down lollipop shaped end-point object 530 right and/or down without moving the lollipop shaped start-point object 526 in order to expand the selection 528 forward; while a left and/or up dragging gesture moves the lollipop shaped start-point object 526 left and/or up without moving the upside down lollipop shaped end-point object 530 in order to expand the selection 528 backward. In some embodiments, the selection 528 expands one word at a time if the drag is fast, and expands one character at a time if the drag is slow.

FIG. 4B is a flow chart illustrating a method 470 of cursor manipulation with a single touch input (e.g., a single-finger touch input), in accordance with some embodiments. The method 470 is performed at a portable multifunction device (e.g., the device 100 in FIG. 1A) with a touch screen display (e.g., the touch screen display 112 in FIG. 1A). As described below, the method 470 provides an expedient mechanism for moving the cursor, selecting the content, and providing options to edit the content at a portable multifunction device with a touch screen display. This method is both faster and easier to perform than using a peripheral device, like a mouse. The method is also intuitive to a user, thereby reducing the number, extent, and/or nature of the inputs from the user when selecting content, and creating a more efficient human-machine interface. A more efficient input mechanism also requires less computing resources, thereby increasing battery life of the device.

In some embodiments, the device 100 displays content of an electronic document on the touch screen display 112. In some embodiments, the content comprises text (e.g., plain text, unstructured text, formatted text, or text in a web page). In other embodiments, the content comprises graphics with or without text. Moreover, the content may be editable or read-only. In addition to displaying the content, when no content is selected, the device 100 may display a cursor within the electronic document. In some embodiments, while displaying the content of the electronic document, the device 100 detects a single-finger touch input (e.g., a single-finger tap) at 472. The portable multifunction device 100 then determines whether prior to detecting the touch input, there is an existing selection of the content at 474.

If the device 100 detects an existing selection (474—Yes), then the device 100 further determines if the single-finger touch input is located on the selection at 475. If the device 100 determines that the single-finger touch input is not located on the selection (475—No), then device 100 dismisses the selection at 476 and proceeds to step 480. On the other hand, if the device 100 determines that the single-finger touch input is located on the selection (475—Yes), the device 100 determines the type of the touch input at 477.

If the device 100 determines the type of single-finger touch input is tap (down), lift (up), tap (down), and a drag (477—Tap-∓half∓drag), the device 100 at 487 first dismisses the selection, then performs actions similar to those performed at step 471, such as selecting a word closest to the touch input and expanding the selection while dragging. If the device 100 determines the type of single-finger touch input is a tap (477—Tap), then the device 100 can perform one of three different options depending on embodiment.

In some embodiments, one of the options (Tap Option 3, 489) is to do-nothing, such that the device 100 does not respond to the single-finger tap in accordance with a determination that the tap is located on a selection (e.g., a selected word). In some embodiment, another option includes dismissing the selection at 485 (Tap Option 1) and performing additional actions (e.g., steps 481-484 in FIG. 4B) in response to the tap gesture as if there were no existing selection. In some embodiments, a third option is to dismiss the selection and place the cursor adjacent to a word within the electronic document based on the location of the single-finger input relative to the closest space to this word at 479 (Tap Option 2). With respect to this embodiment, if the single-finger touch input is on a word and the contact location of the single-finger touch input is closer to the beginning of the word, then the device 100 places the cursor before the word, since the closest space to this word is the white space before the word. Conversely, if the single-finger touch input is on a word and the contact location of the single-finger touch input is closer to the end of the word, then the device 100 places the cursor after the word, since the closest space to this word is the white space after the word.

For example, FIGS. 5AM-5AN illustrate step 479 (Tap Option 2, FIG. 4B) of dismissing a selection and moving the cursor in response to detecting an existing selection and a single-finger tap on the selection. In FIG. 5AM, the device 100 detects a single-finger tap at a region 524 on the touch screen display 112. The region 524 is at a proximate location of the contact point of the single singer tap to the touch screen display 112, such as located on the word "brought", closer to the end of the word. As shown in FIG. 5AM, the region 524 is on the selection 528, which may be marked by markers, such as a start-point object 526 and an end-point object 530 at respective ends of a partial word "ought". In response to detecting the single-finger tap 524 outside the selection 528, the device 100 dismisses the selection and moves to the cursor to the closest white space before the word "brought", as shown in FIG. 5AN.

It should be noted that FIGS. 5AM-5AN illustrate dismissing selection in response to tapping on an existing selection of editable text in accordance with some embodiments. In some embodiments, similar actions are performed when tapping on an existing selection of non-editable text (e.g., a web page), such that the existing selection is deselected.

Still referring to FIG. 4B, the above steps are performed when the device 100 detects an existing selection. When there is no existing selection (474—No), the device 100 first determines the type of the single-finger touch input at 480. In response to recognizing a tap gesture (480—Tap), the device 100 determines a distance to the closest space between two words within the electronic document at 481. In accordance with a determination that the distance is less than a predetermined threshold distance (483—Yes), the device 100 moves the cursor to the closest space after a preceding word at 482. In accordance with a determination that the distance is more than a predetermined threshold distance (483—No), the device 100 selects the word closest to the touch input and displays an indication of the selection on the touch screen at 484.

Figure 6A:
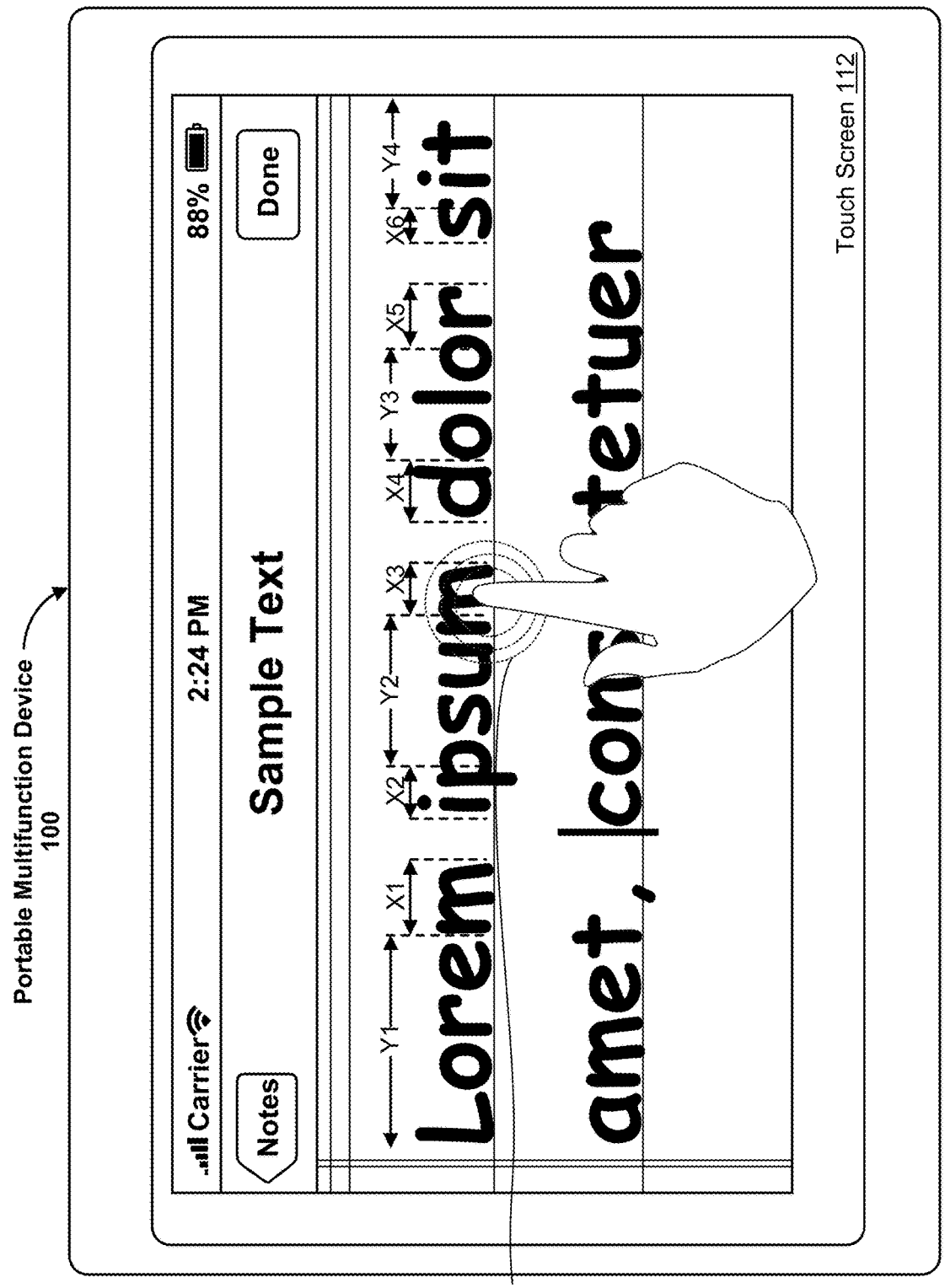
FIGS. 6A-6J illustrate exemplary user interfaces for cursor manipulation with a single touch input, in accordance with some embodiments.
Figure 6B:
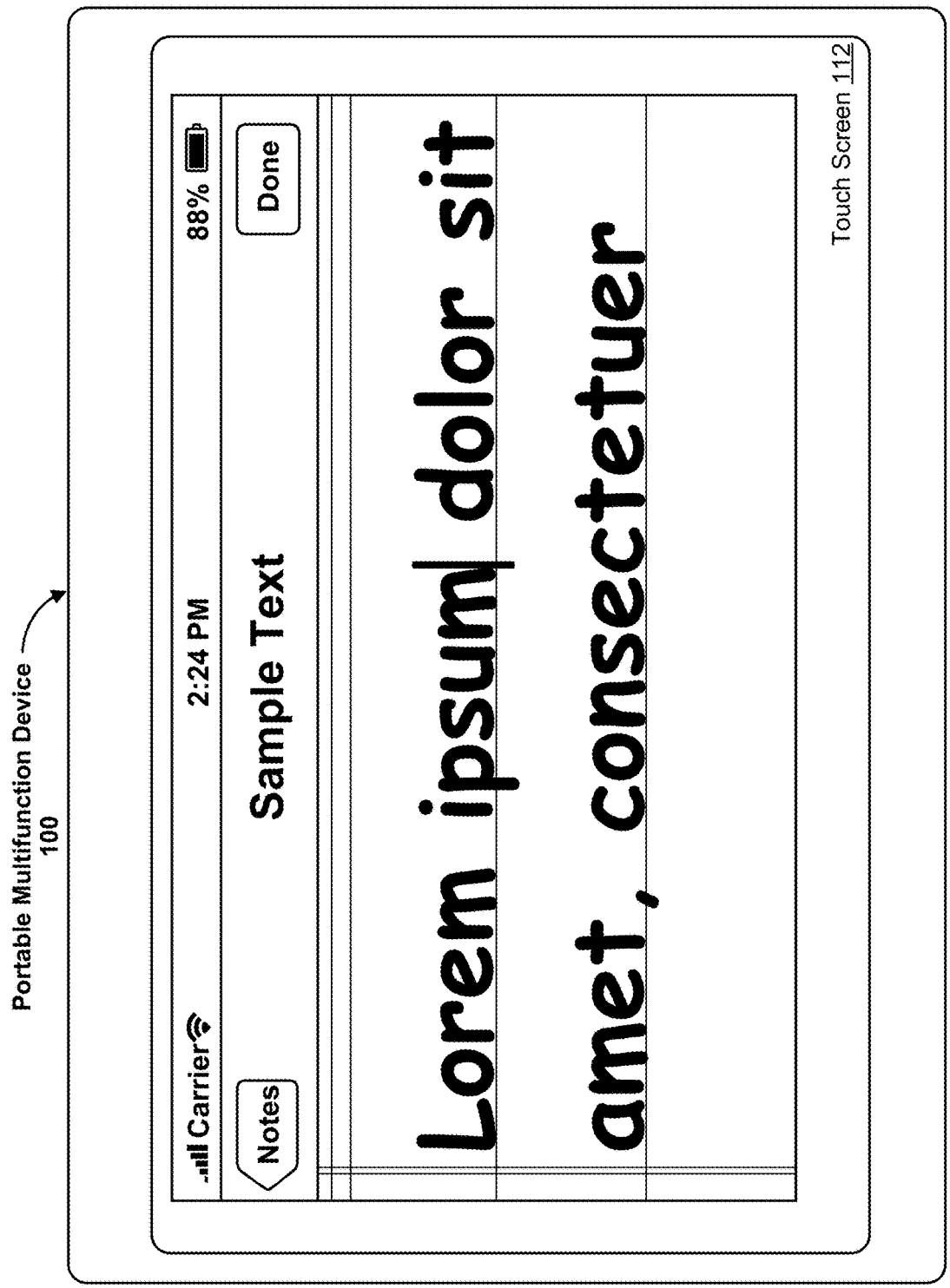

For example, FIGS. 6A-6B illustrate step 482 (FIG. 4B) of moving cursor in response to a tap gesture, in accordance with some embodiments. In FIG. 6A, content of an electronic document is displayed on the touch screen display 112. The content includes at least one line of text, which further includes at least two words. Based on the distance to the closest white space between two words within the electronic document, the device 100 defines zones (e.g., X zones and Y zone) for each word. In some embodiments, X zones are defined as zones from the beginning or end of a word to a distance less than or equal to a percentage of the word size. In some embodiments, the Y zone is the zone between X-zones for that word, e.g., where the distance to the closest white space is greater than or equal to a percentage of the word size.

For example, in FIG. 6A, the word "Lorem" is the first word in a line of text. The closest white space is the white space between the word "Lorem" and "ipsum". As shown in FIG. 6A, X1 starts from the end of the word "Lorem" to a distance less than or equal to a percentage of the word size (e.g., between the letter "e" and the letter "m" of "Lorem"). Within Y1, the distance to the closest white space is greater than or equal to a percentage of the word size "Lorem". Similarly, X2-X6 start from the beginning/end of a word to a distance less than or equal to a percentage of the word size, and within Y2-Y4, the distance to the closest white space is greater than or equal to a percentage of the word size.

In FIG. 6A, the device 100 detects a single-finger tap 524 on the touch screen display 112. The single-finger tap 524 is located approximately on the letter "m" of the word "ipsum" in X3. The closest white space to the single-finger tap 524 is the space between the word "ipsum" and the word "dolor". As a result of detecting the distance from the single-finger tap 524 to the closest white space between words less than a predetermined threshold distance (e.g., the distance from the touch input to the end of the word is less than X3), the device 100 places the cursor in the closest space after a preceding word (e.g., after "ipsum"), as shown in FIG. 6B.

In another example, FIGS. 5AO-5AP illustrate step 482 (FIG. 4B) of moving the cursor when tapping on white space in between two words. In FIG. 5AO, the device 100 detects a single-finger tap at a region 524 on the touch screen display 112. Different from the existing selection scenario as shown in FIG. 5AM-5AN, there is no existing selection prior to the single-finger tap at the region 524. Instead, a cursor 522-1 is displayed in the middle of the word "brought." In FIG. 5AO, the region 524 indicates the contact point of the single-finger tap to the touch screen display is at a proximate location of the space between two paragraphs. In response to detecting the single-finger tap 524 not located on a word, the device 100 moves the cursor to the contact point 522-2 as shown in FIG. 5AP, in between two paragraphs right after a preceding word (e.g., right after "equal.").

In yet another example, FIGS. 5AQ-5AR illustrate steps 484 (FIG. 4B) when a single-finger tap is located on a word. In FIG. 5AQ, similar to FIG. 5AO, there is no existing selection prior to the single-finger tap at the region 524. Instead, a cursor 522 is displayed in the middle of the word "brought." Different from FIG. 5AO, in FIG. 5AQ, the region 524 indicates the contact point of the single-finger tap to the touch screen display is located on a word "conceived", approximately in the middle (e.g., in a Y zone). As a result of the distance to the closest white space between words (e.g., the white space between the word "nation," and the word "conceived") greater than a predetermined threshold distance, the device 100 selects the word "conceived" and displays the selection as shown in FIG. 5AR. The selection is marked by The word "conceived" shown in the exemplary user interface is long enough for the device 100 to recognize the touch input located in a Y zone. In some embodiments, for short words, e.g., "as", "do", "I", due to the small size of a Y zone for such short words, the device 100 will always place the cursor and not select the word.

In FIG. 5AR, the selection 528 may be marked by markers as an indication of the selection 528, such as a start-point object 526 and an end-point object 530 at respective ends of a partial word "conceived." In addition, the device 100 displays a command display area 540 adjacent to the selected content 528. The command display area 540 includes an affordance for cutting the selected content 528 and an affordance for copying the selected content 528 (e.g., "Cut" icon 542 and "Copy" icon 544 in FIG. 5AR). In some embodiments, the command display area 540 includes an affordance for pasting previously cut or copied content (e.g., "Paste" icon 546). Though not shown in FIG. 5AR, in some embodiments, the command display area 540 includes an affordance for undoing a previous action, an affordance for displaying additional command options, an affordance redoing a previous action, at least one command that is user configurable, an affordance for defining the word, and/or at least one command that is context sensitive, among others.

The above examples (FIGS. 6A-6B, 5AO-5AP, and 5AQ-5AR) illustrate various operations performed in response to a single-finger tap on editable content. In some embodiments, in accordance with a determination that the content is editable text, the device 100 displays a cursor in the content displays a soft keyboard for text editing.

Figure 6C:
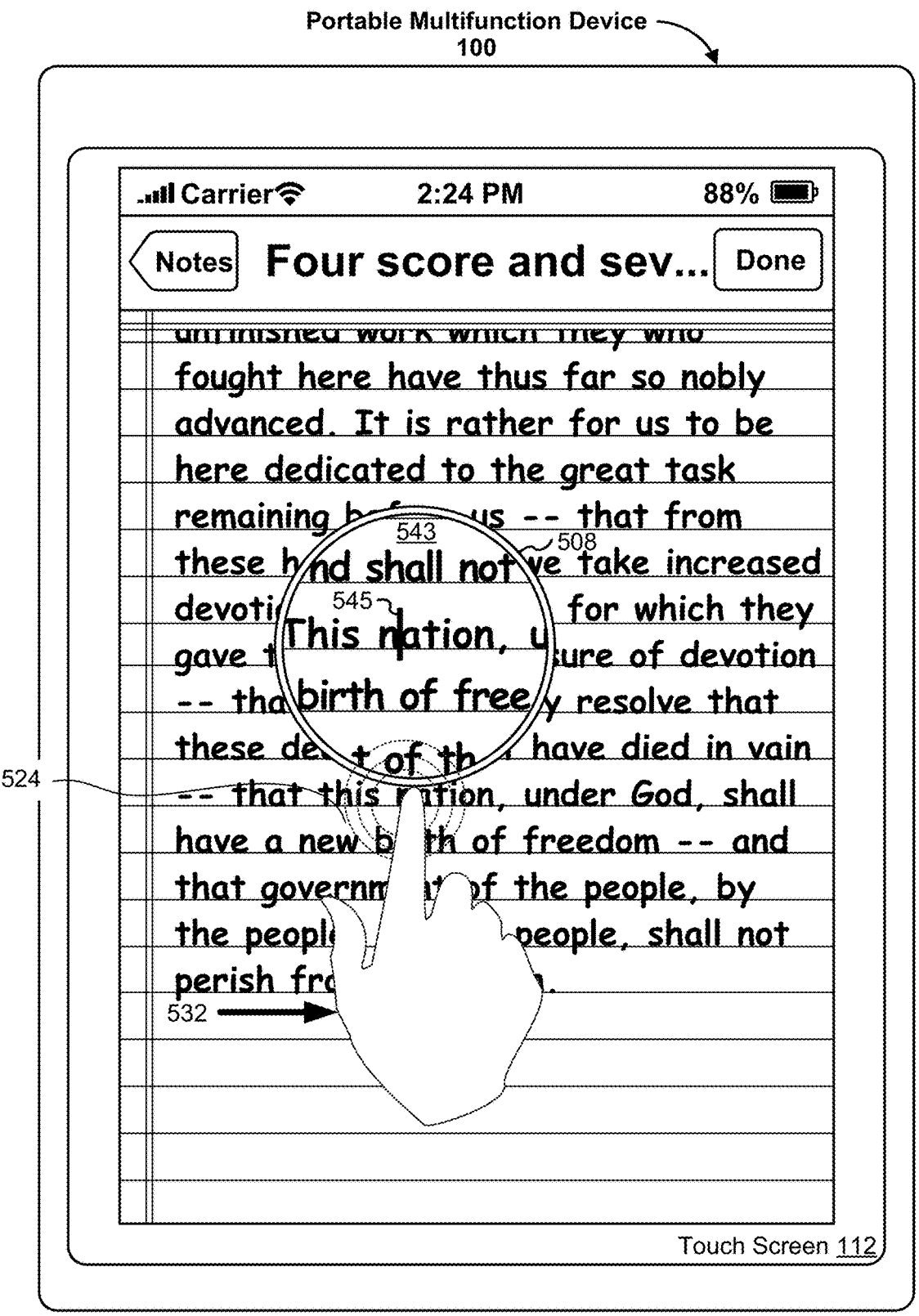

Referring back to FIG. 4B, if the device 100 determines (at 480) the type of single-finger touch input is hold and drag, the device 100 displays a loupe and moves the cursor at 473. FIG. 6C illustrates an exemplary user interface of cursor movement in response to a hold and drag gesture, in accordance with some embodiments.

As used herein, a hold and drag gesture is a stationary (or substantially stationary) pressing gesture by a single-finger at a location in the content displayed on the touch screen immediately followed by a drag. For example, a single-finger contact that moves less than a predefined amount (e.g., 1-2 mm) in a predefined time (e.g., 0.2-0.5 seconds) immediately followed by a drag is a hold and drag gesture. In response to recognizing the hold and drag gesture, as shown in FIG. 6C, the device 100 magnifies a portion of the content proximate to the contact location 524 on the touch screen 112. The content magnifier 508 displays the magnified portion 543 of the content as well as an insertion marker 545. The insertion marker 545 is displayed at a location within the expanded portion of the content that corresponds to the contact location of the single-finger. In some embodiments, in response to detecting a movement 532 of the single-finger across the touch screen 112, the device 100 moves the content magnifier 508, moves the insertion marker 545, and changes the magnified portion 543 of the content in accordance with the detected movement of the single-finger.

Although not shown in FIG. 4B, in some embodiments, if the device 100 determines the type of single-finger touch input is hold and drag and the touch input is located on a selection, the device 100 moves the selection. For example, FIGS. 5AS-5AU illustrate step 479 (FIG. 4B) of moving a selection when the device 100 detects a hold and drag gesture located on a selection. In FIG. 5AS, the device 100 detects a single-finger touch input at a first region 524-1 on the touch screen display 112. The first region 524-1 is at least partially on or over a location of a selection 528-1, which may be marked by markers, such as a start-point object 526-1 and an end-point object 530-1 at respective ends of a partial word "ought." The device 100 further detects the single-finger touch input remains motionless on the touch screen display for a predetermined duration followed by a continuous drag gesture (e.g., start dragging within 0.5 or 0.75 seconds after remaining motionless) from the location of the singer-finger touch input in a direction 532 across the touch screen display from the first region 524-1 to a second region 524-2. In response to detecting the continuous touch movement, the device 100 moves the selection 528-1 across document 500 to a new location 528-2 as shown in FIG. 5AU following the continuous movement.

As mentioned above, in some embodiments, instead of moving the selection 528-1, a ghost selection 528 is displayed in response to the detection of the single-finger dragging. As shown in FIG. 5AT, in some embodiments, the ghost selection 528-2 is displayed offset from the selection 528-1, and in some embodiments, the ghost selection 528-2 can have a different appearance to the selection 528-1. For example, the ghost selection 528-2 can have a different color and/or shade to highlight the ghost selection 528-2 from the color and/or shade used to highlight the selection 528-1. Further, the ghost markers 526-2 and 530-2 mark the beginning and the ending of the ghost selection block 528 can have different color, size, and/or shape from the markers 526-1 and 528-1.

In some embodiments, the ghost selection 528-2 appears at location of the current position of the selection 528-1 as soon as the device 100 detects the single-finger dragging, and the start-point object 526-1 and the end-point object 530-1 can animate to attract the users attention to the appearance of the ghost selection 528-2. While dragging, the ghost selection 528-2 moves in the direction of the single-finger movement to indicate the position to where the selection will be moved when the user lifts or releases the contact (e.g., at the lift-off event). The ghost selection 528-2 may include a ghost start-point object 526-2 and a ghost end-point object 530-2. Both the ghost start point object 526-2 and the ghost end-point object 530-2 may have different appearances from the start point object 526-1 and the end-point object 530-1. On release of the single-finger drag, the selection moves to the location of the ghost selection 528-2. At release of the contacts, the device 100 ceases the display of the ghost selection 528-2 along with the ghost markers 526-2 and 530-2 as shown in FIG. 5AU. In FIG. 5AU, the selection 528-3 is indicated by markers, such as a start-point object 526-3 and an end-point object 530-3. Other suitable mechanisms for displaying the movement of the selection are described above.

Referring back to FIG. 4B, if the device 100 determine (at 480) that the single-finger touch input is tap∓half∓drag, the device 100 selects a word closest to the touch input and expands the selection while dragging at 471. As used herein, a tap∓half∓drag gesture is a gesture that includes an initial touch input followed immediately (e.g., within a predefined time period such as 0.3-0.5 seconds) by an additional touch input on the touch screen display that subsequently moves on the touch screen display without breaking contact with the touch screen display. The move is a continuous touch gesture from a first location of the additional touch input on the touch screen display to a second location on the touch screen display.

Still referring to FIG. 4B, if the device 100 determines (at 480) that the single-finger touch input is a drag gesture, the device 100 scrolls the content displayed in the content region of the touch screen display 112 in accordance with the direction of the drag at 488. For example, an upward drag scrolls the content upward, a downward drag scrolls the content downward, a left drag scrolls the content to the left, and likewise, a right drag scrolls the content to the right.

In some embodiments, similar to scrolling in response to a drag gesture, the device 100 scrolls the content displayed in the content region in response to a swipe gesture in accordance with the direction of the swipe. For example, an upward swipe scrolls the content upward, a downward swipe scrolls the content downward, a left swipe scrolls the content to the left, and likewise, a right swipe scrolls the content to the right.

Figure 6D:
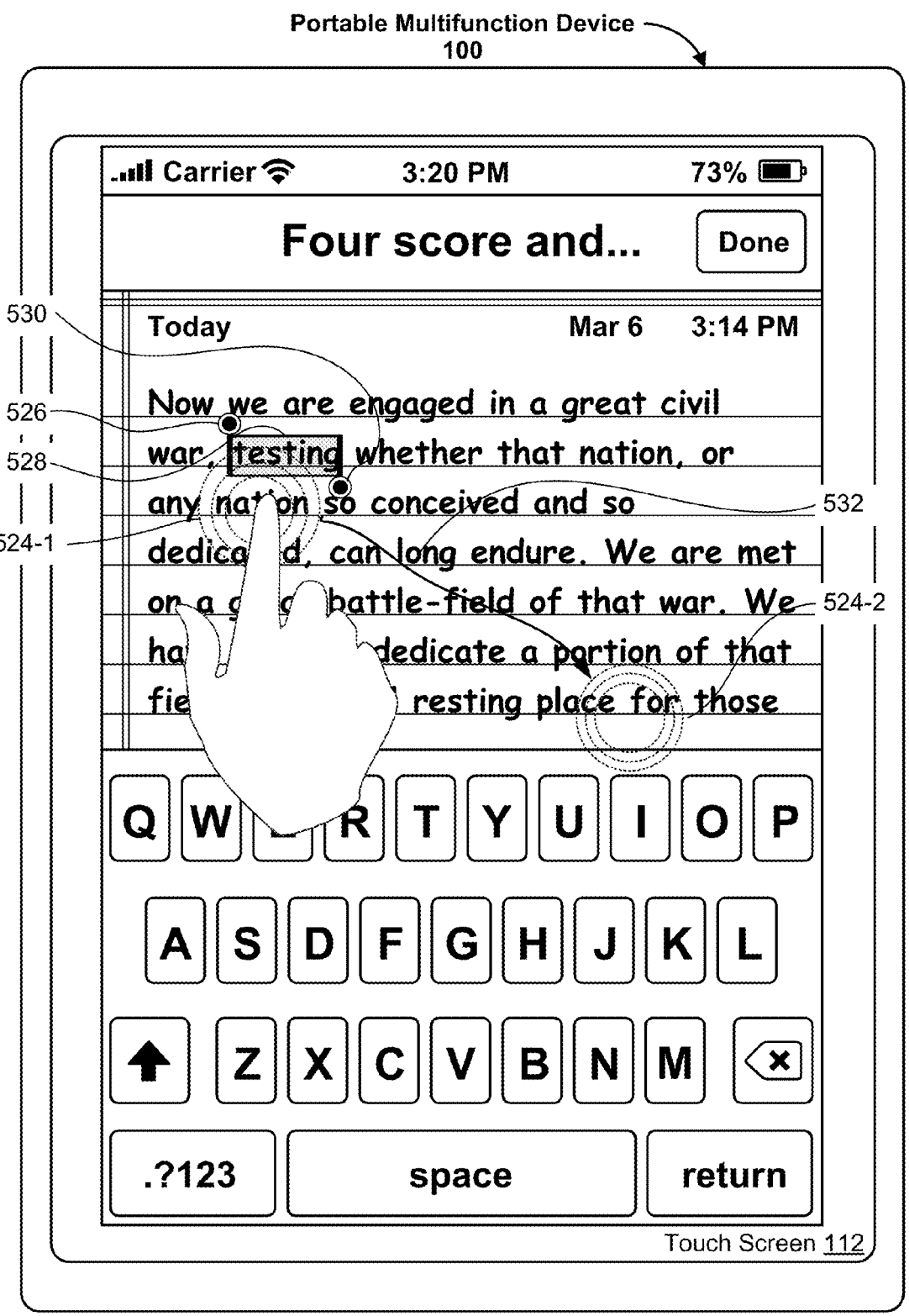
Figure 6E:
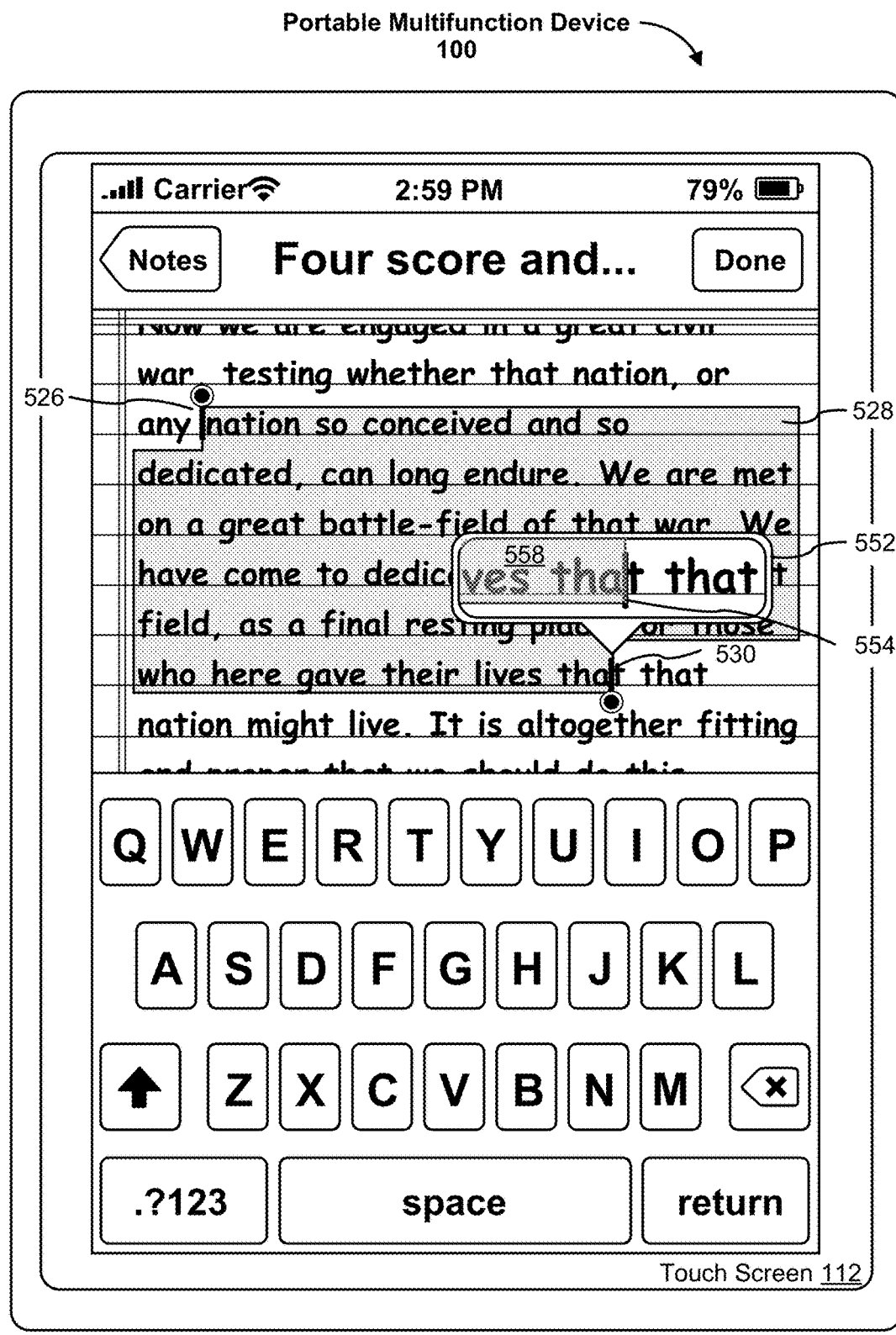

FIGS. 6D-6E illustrate exemplary user interfaces of expanding a selection while dragging in response to a tap∓half∓drag gesture, in accordance with some embodiments. The user interfaces in these figures illustrate steps 476 and 471 (FIG. 4B). In FIG. 6D, the device 100 detects a single-finger touch input 524-1. Upon detecting the single-finger touch input 524-1, the device 100 determines that there is an existing selection 528 (e.g., the word "testing"). The selection 528 is marked by markers, such as a start-point object 526 and an end-point object 530 at respective ends of the selection 528. The device 100 further determines that the single-finger touch input is not located on the existing selection 528 (e.g., on the word "nation"), and dismisses the existing selection 528. The device 100 then determines that the single-finger touch input is a tap-a-half-and-drag gesture. The dragging part of the tap-a-half-and-drag gesture starts from a first location 524-1 to a second location 524-2 in a direction 532 of the dragging.

In response to the tap∓half∓drag gesture, the device 100 selects the word closest to the starting location 524-1 (e.g., selecting the word "nation"), then expands the selection to include additional content beyond the selected word in the direction 532 towards the second location 524-2. The end of the selected portion of the content 530 is increased as the finger contact moves forward through text on the touch screen 112, as illustrated in FIG. 6E, while the beginning of the selected portion of the content 526 remains fixed (e.g., the beginning of the word "nation").

In some embodiments, the start-point object 526 and the end-point object 530 are displayed moving while the finger is dragging to indicate the expanding selection 528. The selection 528 expands one word at a time if the finger drags fast, and expands one character at a time if the finger drags slow. Though not shown in FIGS. 6D-6E, in some embodiments, whenever text is selected, the device 100 displays a command display area adjacent to the selected portion of the content to facilitate editing functions such as cut, copy, paste etc. An exemplary command display area displayed adjacent to a selected portion of the content is shown in FIG. 5AR and described in greater detail above with respect to FIG. 5AR.

In some embodiments, as shown in FIG. 6E, the device 100 displays a content magnifier 552 adjacent to the respective end of the selected content. The content magnifier 552 displays: an expanded portion 588 of the content proximate to the respective end of the selected content, and a boundary marker 554 that denotes a current position of the respective end of the selected content 528. In some embodiments, the expanded portion 558 of the content displayed by the content magnifier 552 includes selected content adjacent to the respective end (e.g., "ves tha" in FIG. 6E) and unselected content adjacent to the respective end (e.g., "t that" in FIG. 6E).

Referring back to FIG. 4B, in some embodiments, if the device 100 determines the type of single-finger touch input is double-tap, triple-tap, quadruple-tap, or 5th-tap (480—double/triple/4th/5th-Tap). In response to recognizing the multi-tap gesture, the device 100 selects a word closest to the touch input in response to a double-tap, and for each successive tap, the device 100 expands the selection with each successive tap at 478.

Figure 6F:
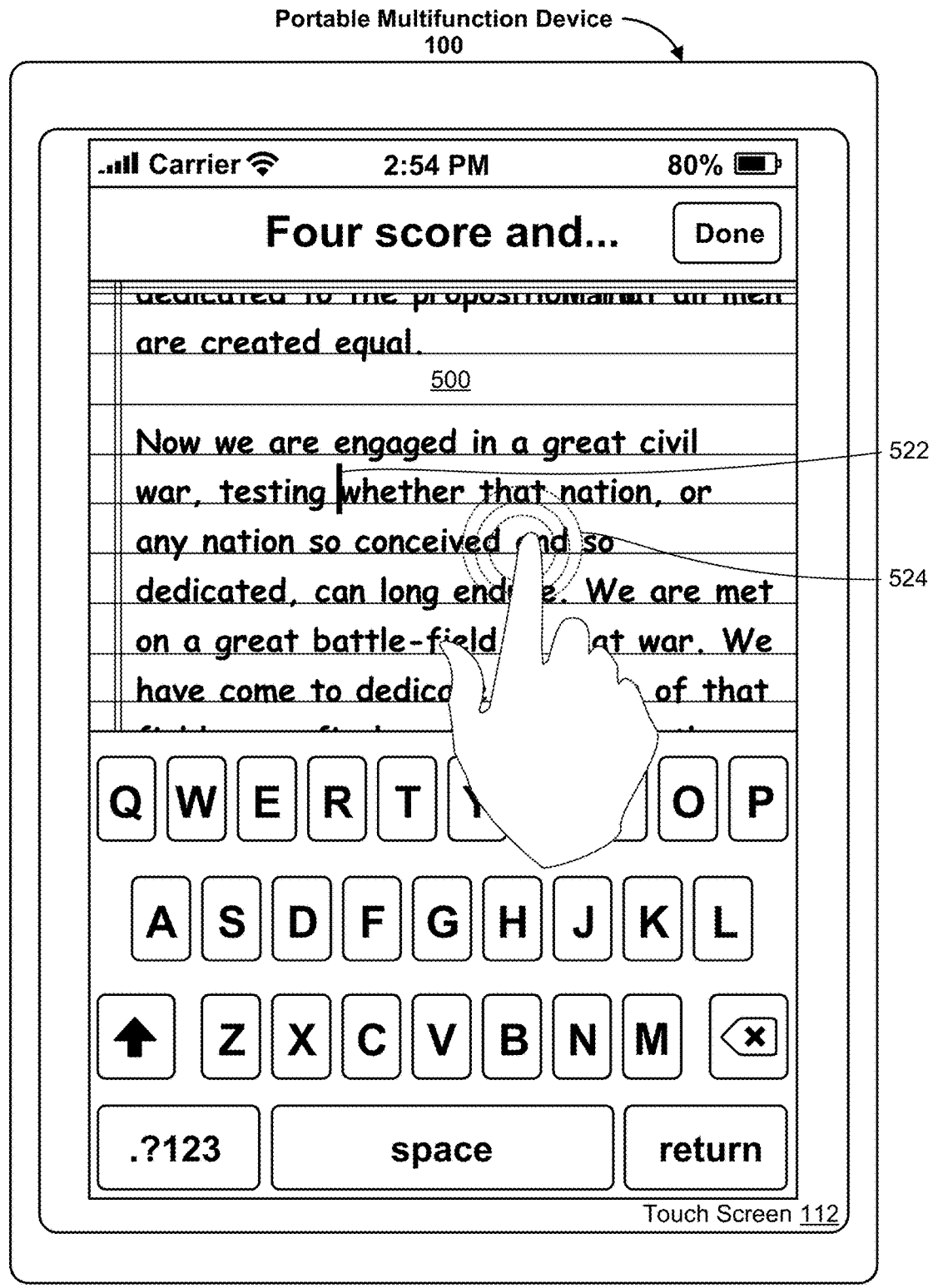
Figure 6G:
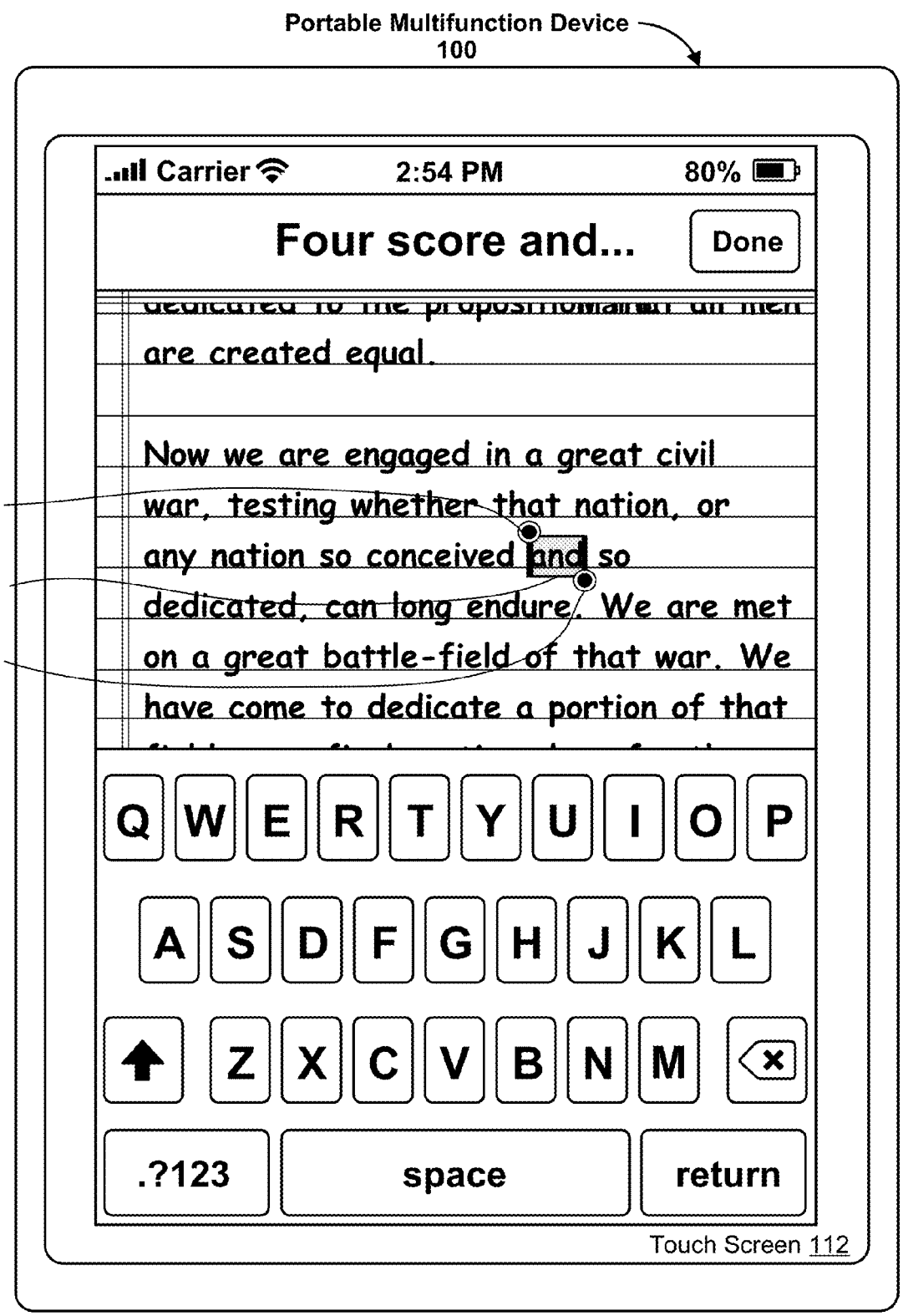
Figure 6H:
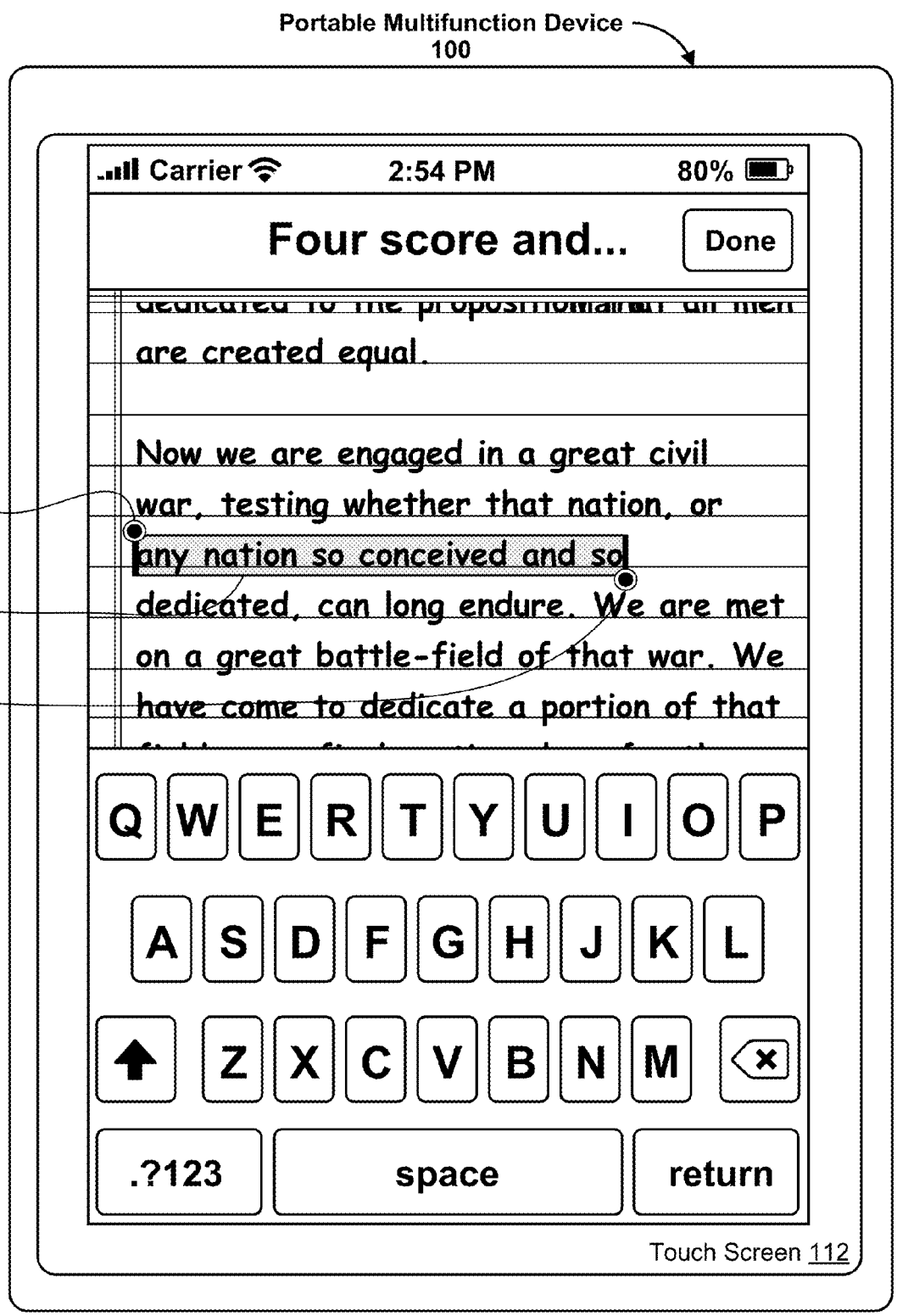
Figure 6I:
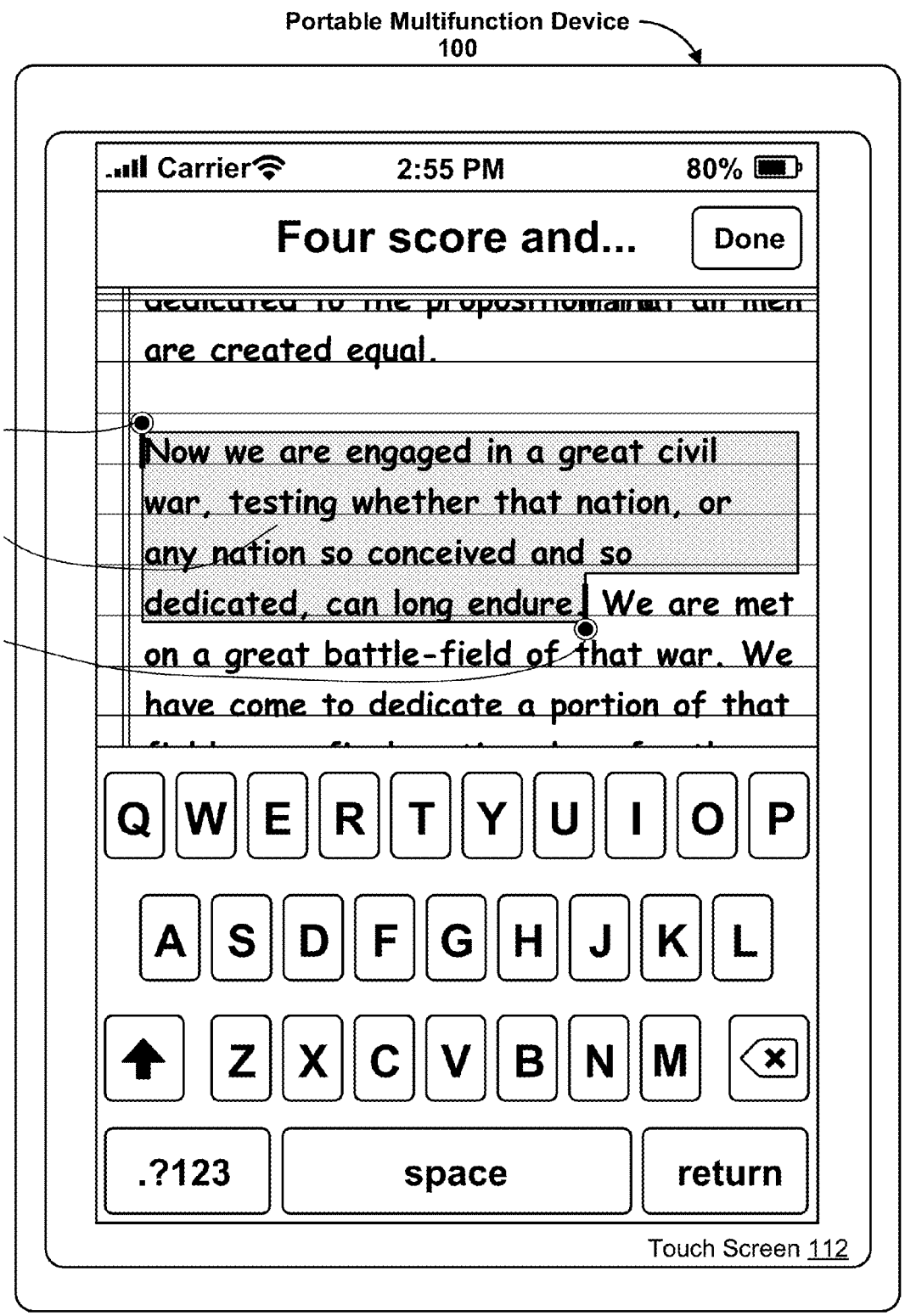
Figure 6J:
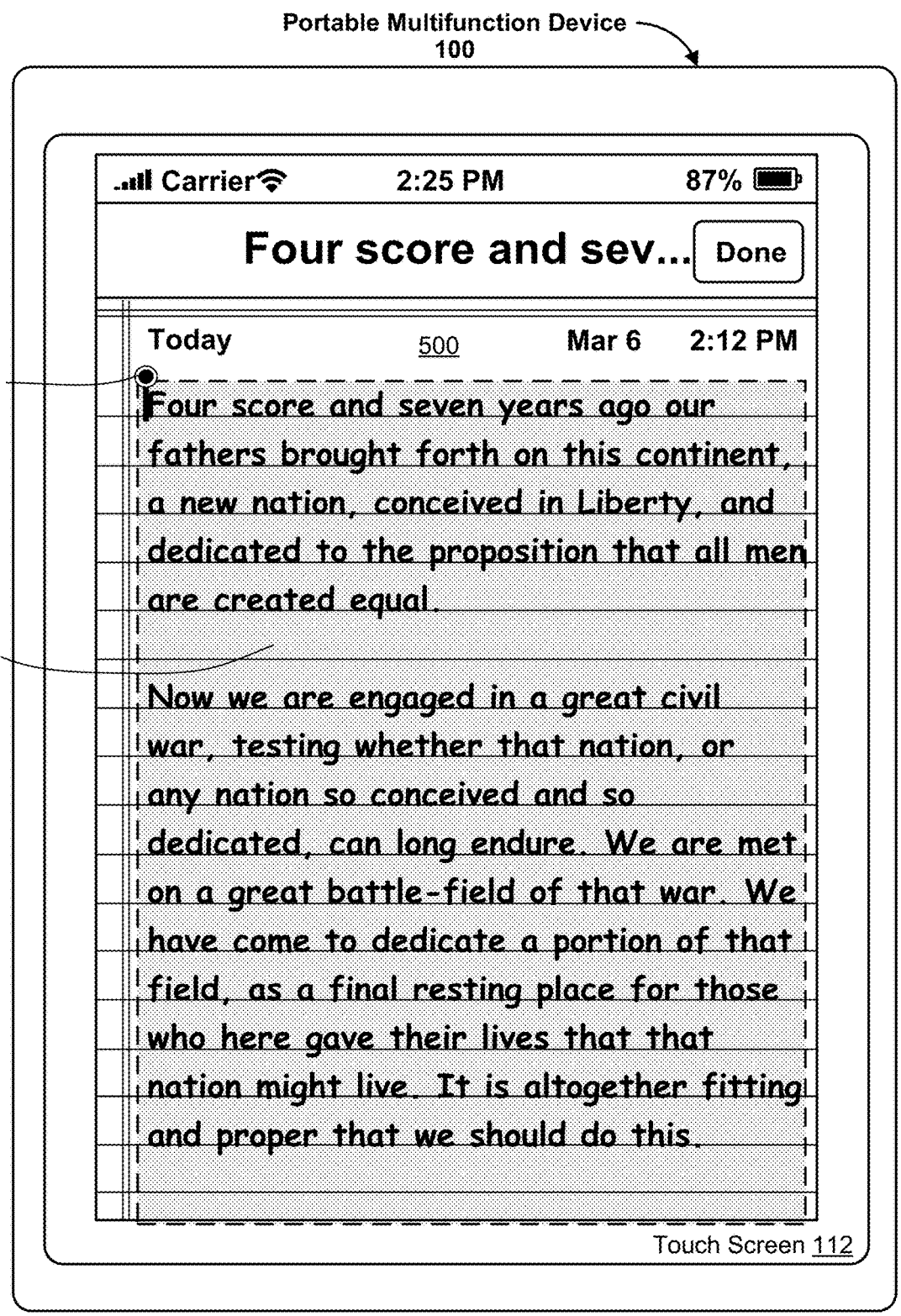

For example, in FIG. 6F, in response to detecting a single-finger double-tap touch input, the device 100 selects a word closest to the double-tap touch input (e.g., the word "and"). As shown in FIG. 6G, the word "and" is selected and an indication of the selection 528 is displayed and enclosed with a start-point object 526 and an end-point object 530. In case the single-finger touch input is a triple-tap, quadruple-tap, or 5th-tap, in response to detecting the touch input, the device 100 expands the selection, selects a sentence (e.g., the sentence "any nation so conceived and so" in FIG. 6H), a paragraph (e.g., the paragraph of "Now we are engaged in a great civil war . . . " in FIG. 6I), or the content of the electronic document (FIG. 6J) respectively and the respective selection 528 is displayed with an indication 528 and enclosed with a start-point object 526 and an end-point object 528.

It should be noted that different from in response to a single-tap gesture described above with respect to FIGS. 6A-6B, in some embodiments, even though the distance between the double-tap and the closest white space is less than a predetermined threshold distance (e.g., in X zone), in response to detecting a double-tap, the device 100 selects the word closest to the double-tap touch input (e.g., the word "and"). Furthermore, different from in response to a single-tap gesture described above with respect to FIG. 5AO-5AP, in some embodiments, in response to detecting a double-tap located on a white space between two words within the electronic document, the device 100 selects the word following the white space and displays an indication of the selection. Additionally, in some embodiments, when the double-tap is located on the cursor 522, the device 100 selects the word connected to the cursor and displays an indication of the selection. Exemplary indication of the selection is shown in FIG. 6G and described above.

In some embodiments, the device 100 can alternatively move the selected content in response to detecting three substantially simultaneous touch inputs, e.g., a three-finger touch input. FIG. 4C is a flow chart illustrating a method 490 of content movement with three substantially simultaneous touch inputs (e.g., a three-finger touch input), in accordance with some embodiments. The method 490 is performed at a portable multifunction device (e.g., the device 100 in FIG. 1A) with a touch screen display (e.g., the touch screen display 112 in FIG. 1A). As described below, the method 490 provides an expedient mechanism for moving the selected content at a portable multifunction device with a touch screen display.

Similar to the illustration in FIGS. 5AS-5AU, in some embodiments, the device 100 first displays content of an electronic document on the touch screen display 112. In some embodiments, the content comprises text (e.g., plain text, unstructured text, formatted text, or text in a web page). In other embodiments, the content comprises graphics with or without text. Moreover, the content may be editable or read-only. In some embodiments, while displaying the content of the electronic document, the device 100 detects three substantially simultaneous touch inputs (e.g., a three-finger tap) at 492. The portable multifunction device 100 then determines whether prior to detecting the touch input, there is an existing selection of the content at 494. If the device 100 detects an existing selection (494—Yes), then the device 100 moves the selection at 496 in response to a hold and drag gesture of the three-finger.

It should be noted that the three substantially simultaneous touch inputs can be located anywhere on the touch screen display 112. For example, a user can touch the touch screen display 112 with three fingers close together or three fingers spread out. Regardless the three touch inputs locations on the touch screen display 112, the device 100 can detect the three substantially simultaneous touch inputs and perform actions such as moving a selection in response to detecting a drag of the three-fingers following the initial three substantially simultaneous touch inputs.

It should also be noted that different from the single-finger hold and drag of a selection as illustrated in FIGS. 5AS-5AU, in some embodiments, the three substantially simultaneous touch inputs are not necessarily located on the selection. As illustrated in FIGS. 5AV-5AX and described below, the three substantially simultaneous touch inputs can be located outside a selection, on or over a selection, or even on the keyboard.

For example, FIGS. 5AV-5AX illustrate step 496 (FIG. 4C) of moving a selection in response to the device 100 detecting a hold and drag gesture of the three-finger. In FIG. 5AV, the device 100 detects a three-finger touch input at a first region 524-1 on the touch screen display 112. The first region 524-1 can be located anywhere on the touch screen display 112. As shown in FIG. 5AV, the three-finger touch input can be located outside a selection 528-1, which may be marked by markers, such as a start-point object 526-1 and an end-point object 530-1 at respective ends of a partial word "ought". Though not shown in FIG. 5AV, the three-finger touch input can be partially on or over a location of the selection 528-1, or even on the keyboard 521.

In some embodiments, the device 100 further detects the three-finger touch input remains motionless on the touch screen display for a predetermined duration followed by a continuous drag gesture (e.g., start dragging within 0.5 or 0.75 seconds after remaining motionless) from the location of the three-finger touch input in a direction 532 across the touch screen display from the first region 524-1 to a second region 524-2. In other embodiments, a delay (e.g., the predetermined duration, is not required for moving the selection.

In response to detecting the continuous touch movement, the device 100 moves the selection 528-1 across document 500 to a new location 528-2 as shown in FIG. 5AX following the continuous movement.

As mentioned above, in some embodiments, instead of moving the selection 528-1, a ghost selection 528 is displayed in response to the detection of the single-finger dragging. As shown in FIG. 5AW, in some embodiments, the ghost selection 528-2 is displayed offset from the selection 528-1, and in some embodiments, the ghost selection 528-2 can have a different appearance to the selection 528-1. For example, the ghost selection 528-2 can have a different color and/or shade to highlight the ghost selection 528-2 from the color and/or shade used to highlight the selection 528-1. Further, the ghost markers 526-2 and 530-2 mark the beginning and the ending of the ghost selection block 528 can have different color, size, and/or shape from the markers 526-1 and 528-1.

In some embodiments, the ghost selection 528-2 appears at location of the current position of the selection 528-1 as soon as the device 100 detects the three-finger dragging, and the start-point object 526-1 and the end-point object 530-1 can be animated to attract the user's attention to the appearance of the ghost selection 528-2. While dragging, the ghost selection 528-2 moves in the direction of the three-finger movement to indicate the position to where the selection will be moved when the user lifts or releases the contact (e.g., at the lift-off event). The ghost selection 528-2 may include a ghost start-point object 526-2 and a ghost end-point object 530-2. Both the ghost start point object 526-2 and the ghost end-point object 530-2 may have different appearances from the start point object 526-1 and the end-point object 530-1. On release of the three-finger drag, the selection moves to the location of the ghost selection 528-2. At release of the contacts, the device 100 ceases the display of the ghost selection 528-2 along with the ghost markers 526-2 and 530-2 as shown in FIG. 5AX. In FIG. 5AX, the selection 528-3 is indicated by markers, such as a start-point object 526-3 and an end-point object 530-3. Other suitable mechanisms for displaying the movement of the selection are described above.

It should be understood that the particular order in which the operations in FIGS. 4A-4C have been described is merely exemplary and is not intended to indicate that the described order is the only order in which the operations could be performed. One of ordinary skill in the art would recognize various ways to reorder the operations described herein. For brevity, these details are not repeated here.

Figure 8:
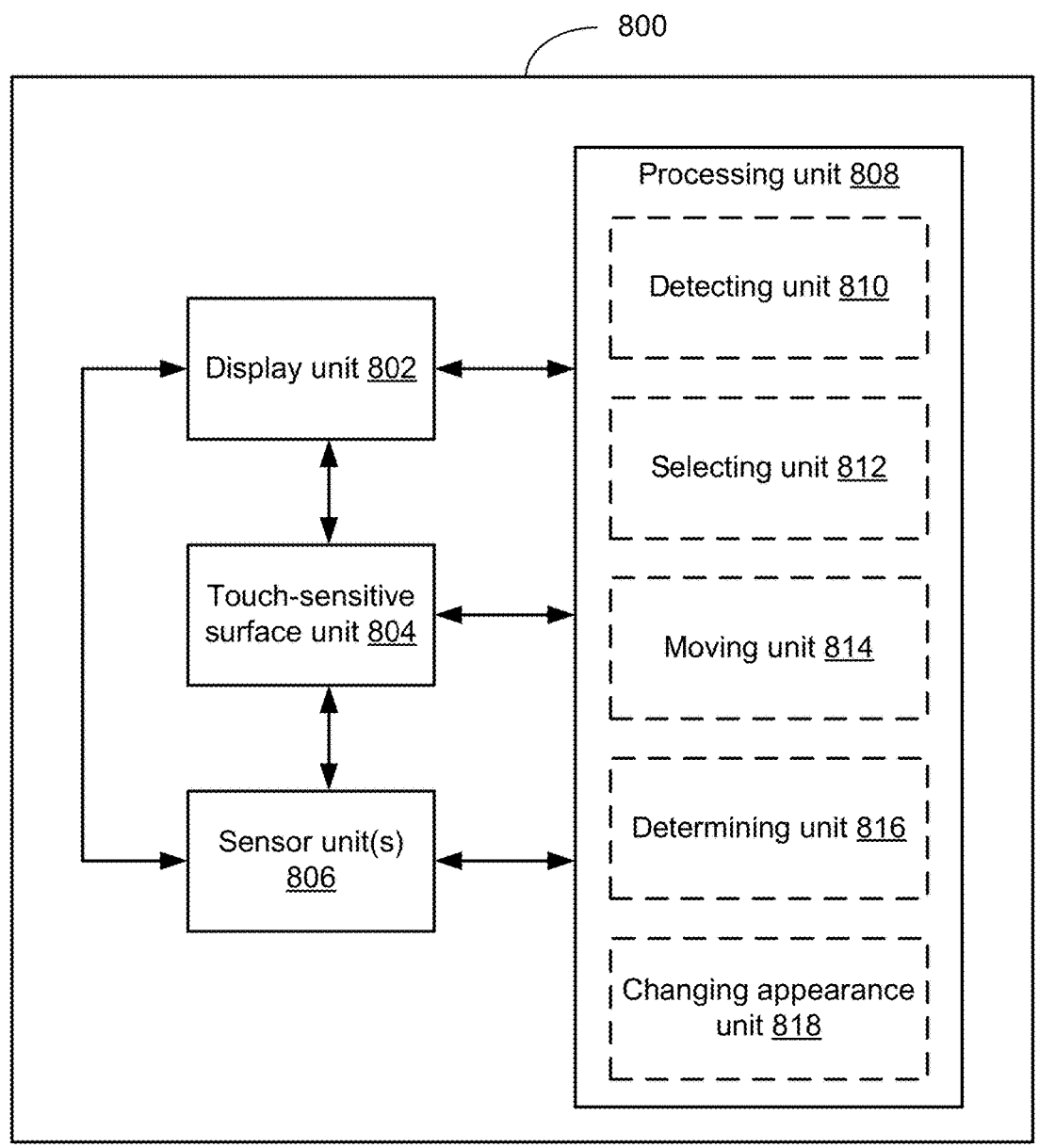
FIG. 8 is a functional block diagram of an electronic device in accordance with some embodiments.

In accordance with some embodiments, FIG. 8 shows a functional block diagram of an electronic device 800 configured in accordance with the principles of the invention as described above. The functional blocks of the device may be implemented by hardware, software, or a combination of hardware and software to carry out the principles of the invention. It is understood by persons of skill in the art that the functional blocks described in FIG. 8 may be combined or separated into sub-blocks to implement the principles of the invention as described above. Therefore, the description herein may support any possible combination or separation or further definition of the functional blocks described herein.

In some embodiments, the electronic device 800 includes a display unit 802 configured to display content of an electronic document and a cursor within the electronic document; a touch-sensitive surface unit 804 configured to receive user contacts; and a processing unit 808 coupled to the display unit 802 and the touch-sensitive surface unit 804. In some embodiments, the processing unit 808 includes a detecting unit 810 and a selecting unit 812.

The processing unit 808 is configured to: detect two substantially simultaneous touch inputs anywhere on the touch-sensitive surface unit 804 (e.g., with the detecting unit 810); and in response to detecting the two substantially simultaneous touch inputs: select a portion of the content in the document closest to the cursor (e.g., with the selecting unit 812); and display the portion of the content as selected content (e.g., with the display unit 802).

In some embodiments, the electronic device 800 includes the display unit 802 configured to display content of an electronic document and a cursor at a current location within the content; the touch-sensitive surface unit 804 configured to receive user contacts; and the processing unit 808 coupled to the display unit 802 and the touch-sensitive surface unit 804. In some embodiments, the processing unit 808 includes the detecting unit 810, a determining unit 816, and a moving unit 814.

The processing unit 808 is configured to: detect two substantially simultaneous touch inputs at a first region on the touch-sensitive surface unit 804 (e.g., with the detecting unit 810); upon determining that the two substantially simultaneous touch inputs remain in contact with the touch-sensitive surface unit 804 (e.g., with the detecting unit 810), detect a continuous touch gesture from a location of the two substantially simultaneous touch inputs across the touch-sensitive surface unit 804 (e.g., with the detecting unit 810) from the first region to a second region; and in response to detecting the continuous touch gesture: move the cursor from the current location to a new location in a direction of the continuous touch gesture (e.g., with the moving unit 814).

In some embodiments, the electronic device 800 includes the display unit 802 configured to display text and a cursor at a line within the text; the touch-sensitive surface unit 804 configured to receive user contacts; and the processing unit 808 coupled to the display unit 802 and the touch-sensitive surface unit 804. In some embodiments, the processing unit 808 includes the detecting unit 810 and the moving unit 814.

The processing unit 808 is configured to: detect a two-finger swipe gesture on the touch-sensitive surface unit 804 (e.g., with the detecting unit 810) in a direction at least partially parallel to the line and towards an edge of the touch-sensitive surface unit 804 (e.g., with the detecting unit 810); and in response to detecting the two-finger swipe gesture: move the cursor to a distal point of the text (e.g., with the moving unit 814).

In some embodiments, the electronic device 800 includes the display unit 802 configured to display content of an electronic document and a cursor within the electronic document; the touch-sensitive surface unit 804 configured to receive user contacts; and the processing unit 808 coupled to the display unit 802 and the touch-sensitive surface unit 804. In some embodiments, the processing unit 808 includes the detecting unit 810 and the selecting unit 812.

The processing unit 808 is configured to: detect a touch input on the touch-sensitive surface unit 804 (e.g., with the detecting unit 810), wherein the touch input is located on a word within the content; and in response to detecting the touch input: select the word (e.g., with the selecting unit 812); and display a command display area adjacent to the selected word, wherein the second command display area includes an icon for cutting the selected word, an icon for copying the selected word, and an icon for pasting a previously selected content.

In some embodiments, the electronic device 800 includes the display unit 802 configured to display content of an electronic document and a selection of the content within the electronic document; the touch-sensitive surface unit 804 configured to receive user contacts; and the processing unit 808 coupled to the display unit 802 and the touch-sensitive surface unit 804. In some embodiments, the processing unit 808 includes the detecting unit 810, the determining unit 816, and the moving unit 814.

The processing unit 808 is configured to: detect a single touch input on the touch-sensitive surface unit 804 (e.g., with the detecting unit 810) at a location over the selection; in response to detecting the single touch input at the location, display a set of options related to the selection (e.g., with the display unit 802); determine if the single touch input remains at the location for a predetermined amount of time followed by a continuous touch gesture away from the location on the touch-sensitive surface unit 804 (e.g., with the determining unit 816); and in response to detecting the single touch input remaining at the location for the predetermined amount of time followed by the continuous touch gesture away from the location, move the selection to a different location in a direction of the continuous touch gesture (e.g., with the moving unit 814).

In some embodiments, the electronic device 800 includes the display unit 802 configured to display content of an electronic document and a selection of the content within the electronic document; the touch-sensitive surface unit 804 configured to receive user contacts; and the processing unit 808 coupled to the display unit 802 and the touch-sensitive surface unit 804. In some embodiments, the processing unit 808 includes the detecting unit 810, the determining unit 816, and the moving unit 814.

The processing unit 808 is configured to: detect three substantially simultaneous touch inputs at locations anywhere on the touch-sensitive surface unit 804 (e.g., with the detecting unit 810); determine if the three substantially simultaneous touch inputs is followed by three continuous touch gestures away from the locations on the touch-sensitive surface unit 804 (e.g., with the determining unit 816); and in response to detecting the three continuous touch gestures, move the selection to a different location in a direction of the continuous touch gestures (e.g., with the moving unit 814).

In some embodiments, the electronic device 800 includes the display unit 802 configured to display content of an electronic document, the content includes at least one line of text comprising at least two words; the touch-sensitive surface unit 804 configured to receive user contacts; and the processing unit 808 coupled to the display unit 802 and the touch-sensitive surface unit 804. In some embodiments, the processing unit 808 includes the detecting unit 810, the determining unit 816, and the selecting unit 812.

The processing unit 808 is configured to: detect a touch input on the content (e.g., with the detecting unit 810); and in response to detecting the touch input: determine a distance of the touch input to a closest space between the two words within the electronic document (e.g., with the determining unit 816); and in accordance with a determination that the distance is greater than a predetermined threshold distance, select a word within the electronic document closest to the touch input and display the selection (e.g., with the display unit 802).

In some embodiments, the electronic device 800 includes the display unit 802 configured to display content of an electronic document and a soft keyboard in focus; the touch-sensitive surface unit 804 configured to receive user contacts; and the processing unit 808 coupled to the display unit 802 and the touch-sensitive surface unit 804. In some embodiments, the processing unit 808 includes the detecting unit 810 and the changing appearance unit 818.

The processing unit 808 is configured to: detect two substantially simultaneous touch inputs on the soft keyboard (e.g., with the detecting unit 810); and in response to detecting the two substantially simultaneous touch inputs on the soft keyboard, blur the soft keyboard (e.g., with the changing appearance unit 818).

In some embodiments, the electronic device 800 includes the display unit 802 configured to display content of an electronic document and a cursor within the electronic document; the touch-sensitive surface unit 804 configured to receive user contacts; and the processing unit 808 coupled to the display unit 802 and the touch-sensitive surface unit 804. In some embodiments, the processing unit 808 includes the detecting unit 810 and the changing appearance unit 818.

The processing unit 808 is configured to: display, on the touch-sensitive surface display unit 802, a soft keyboard having multiple keys each having a respective alphanumeric character of a plurality of alphanumeric characters; detect two substantially simultaneous touch inputs on the soft keyboard (e.g., with the detecting unit 810); and in response to detecting the two substantially simultaneous touch inputs on the soft keyboard, change the appearance of the soft keyboard to a changed appearance (e.g., with the changing appearance unit 818).

Figure 9A:
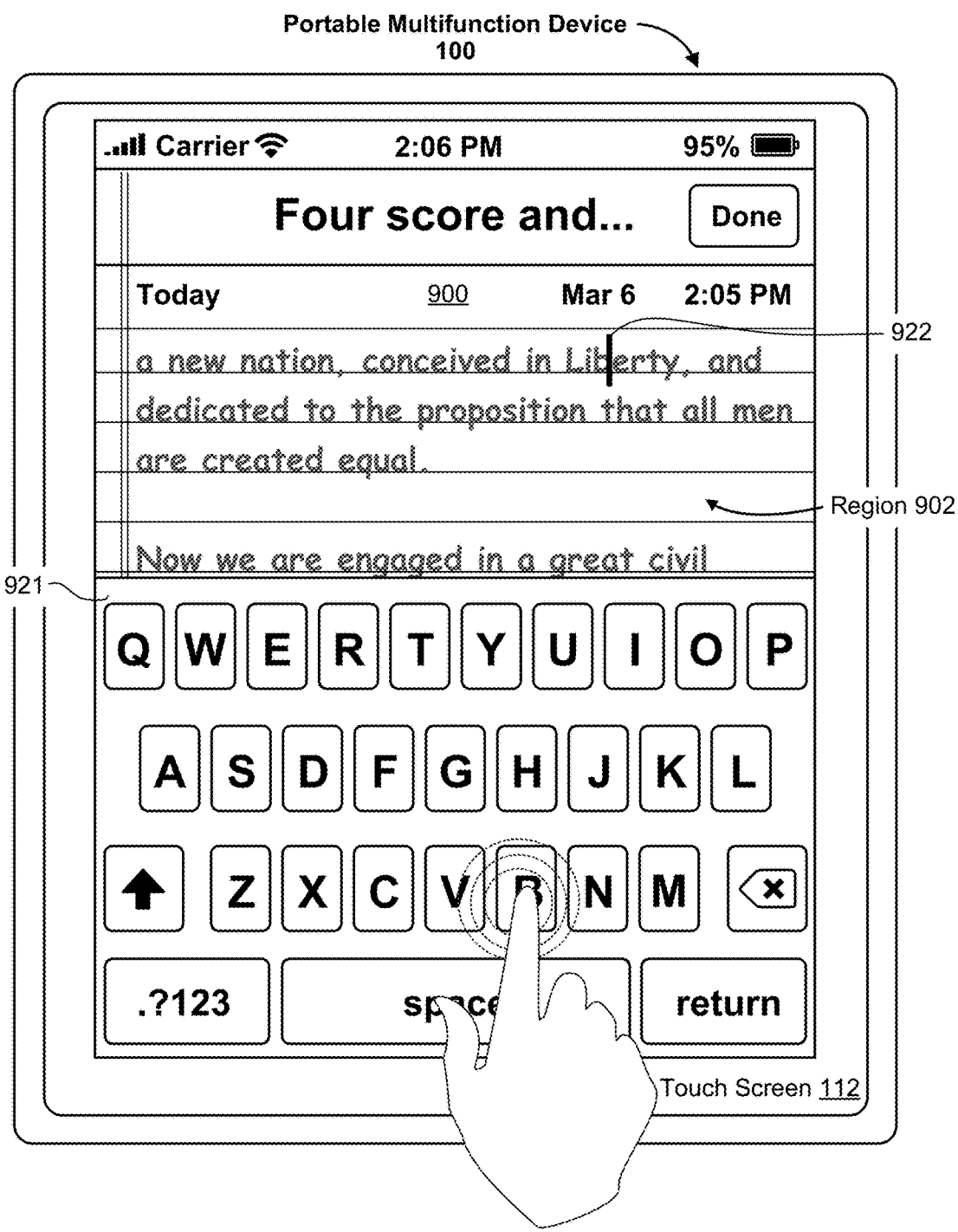
FIGS. 9A-9AD illustrate exemplary user interfaces for manipulating a cursor and selecting content in accordance with some embodiments.

Turning to FIGS. 9A-9AD, these figures illustrate exemplary user interfaces for selecting content, moving a text selection indicator, and changing keyboard appearance based on contact intensity (e.g., pressure), in accordance with some embodiments. The user interfaces in these figures are used to illustrate the processes described below with respect to FIGS. 10A-10G and 11A-11F. FIGS. 9B-9AD include intensity versus time diagrams that show the current intensity of the contact on the touch-sensitive surface relative to a plurality of intensity thresholds (e.g., "$IT_D$", "$IT_L$", and "$IT_0$").

FIGS. 9A-9N illustrate exemplary user interfaces for selecting content in a text selection mode in response to a deep press on an onscreen keyboard in accordance with some embodiments. The user interfaces in these figures are used to illustrate the processes described below with respect to FIGS. 10A-10G.

In FIG. 9A, editable content 900 is displayed in a content presentation region 902 while an application is in a document editing mode. The application runs on a device 100 that has one or more sensors (e.g., contact intensity sensor(s) 259, FIG. 2B) to detect intensity of contacts with the touch-sensitive display. In the document editing mode, an onscreen keyboard 921 is displayed for text inputs. A user may enter text by touch inputs (e.g., by contact) on the onscreen keyboard 921 and confirm completion of the editing by performing another touch input (e.g., a tap on "done" button) to exit the editing mode. An insertion marker (e.g., cursor 922) is displayed to indicate a current location for text inputs.

In FIG. 9B, at time $T_1$, while in the editing mode and displaying the keyboard 921, the device detects a deep press by a finger contact 924 on the onscreen keyboard 921, such that the intensity of the press input has increased above the deep press intensity threshold $IT_D$. In response to detecting the deep press, the appearance of the keyboard 921 changes to indicate that the application has entered a text selection mode. In the text selection mode, the keyboard 921 is not responsive to keystrokes, but rather serves as an onscreen touchpad or track pad for moving the cursor. As shown in FIG. 9B, in some embodiments, the keys are visually obscured. Visually obscuring keys on the keyboard 921 provides an intuitive indication that the function of the keyboard 921 has changed. In some embodiments, the onscreen keyboard 921 shown in FIG. 9B is dimmed or blurred relative to the keyboard 921 shown in FIG. 9A prior to detecting the deep press, such that the keys are no longer visible or clearly displayed as before. In some embodiments, the keyboard 921 becomes semitransparent, to reveal content lying underneath the keyboard.

When the keyboard 921 serves as an onscreen touch pad or track pad, in response to detecting finger movement 932 on the keyboard 921, in some embodiments, a floating cursor 922-1 moves across the touch screen display 112 in accordance with the movement of one or more finger contacts, and a ghost cursor 922-2 is displayed offset from the real cursor 922-1. In some embodiments, the ghost cursor 922-2 indicates where the cursor will be located after a lift-off of the finger contact 924. In some embodiments, the ghost cursor 922-2 is a modified version of the original cursor 922 displayed on the screen (e.g., the ghost cursor 922-2 is in grey color, while the original cursor 922 as shown in FIG. 9A is in black color).

In some embodiments, when the touch input for entering the text selection mode is detected, the original cursor 922 changes its appearance, while the floating cursor 922-1 springs into its initial location from the original text cursor 922. In some embodiment, the initial location of the floating cursor 922-1 is slightly offset from the location of the ghost cursor 922-2 (e.g., slightly higher in FIG. 9B). In some embodiments, the animation displayed in response to the touch input has the visual effect that the original text cursor 922 has jumped off the page and becomes a floating cursor 922-1, while leaving a shadow or ghost image at its original location. For example, the ghost cursor 922-2 shown in FIG. 9B is in the middle of the word "Liberty", the same location as the cursor 922 in FIG. 9A when the touch input by finger contact 924 is determined to satisfy the one or more criteria for entering the text selection mode at time $T_1$.

Figure 9D:
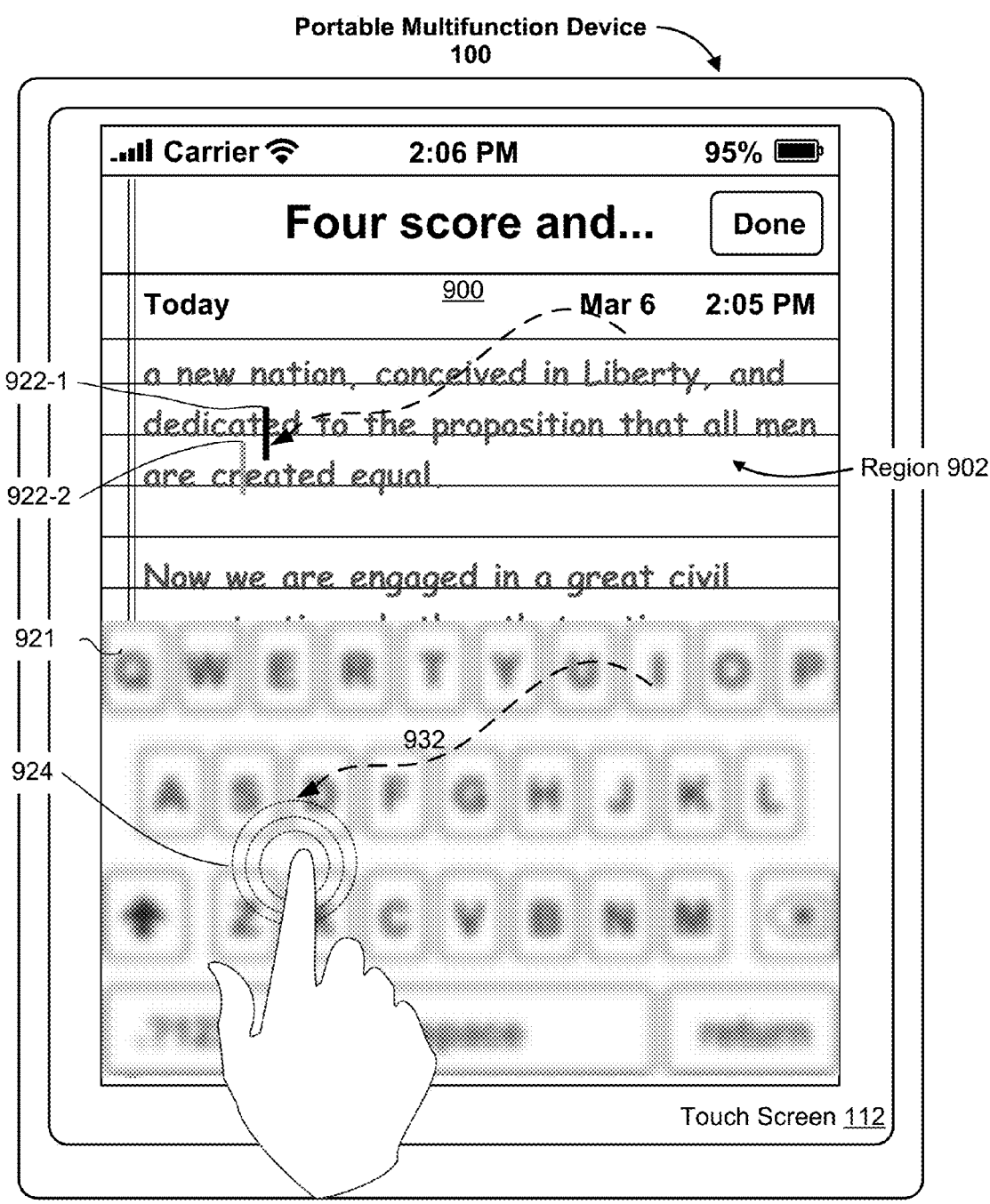

In some embodiments, when the user subsequently moves the finger contact, the floating cursor 922-1 moves with the finger contact 924 in a continuous fluid motion in the content presentation region 902, while the ghost cursor 922-2 moves in discrete jumps from one permitted insertion location to another permitted insertion location to indicate the final location of the cursor if the touch input was terminated at that moment. For example, in FIG. 9C, when the finger moves along a path 932, the floating cursor 922-1 moves along a similar path, while the ghost cursor 922-2 moves in the direction of the finger movement and in discrete jumps from the middle of the word "Liberty" (FIG. 9B) to the end of the word "conceived" (FIG. 9C), then to the middle of the word "created" (FIG. 9D). The ghost cursor 922-2 indicates the position where a cursor will be displayed when the user lifts the finger. As shown in FIGS. 9C and 9D, after the initial deep press at time $T_1$, the intensity of the contact 924 on the touch screen 112 can be above or below the deep press intensity threshold $IT_D$ during the finger movement between time $T_1$ and $T_3$.

In FIG. 9E, at the end of the finger movement 932, the contact intensity decreases to zero at time $T_4$, which corresponds to a lift-off of the finger. In response to the lift-off, in some embodiments, the device ceases to display the floating cursor, maintains display of the ghost cursor at a respective permitted insertion position reached by the ghost cursor after the discrete movements of the ghost cursor (e.g., in the middle of the word "created"). As shown in FIG. 9E, in some embodiments, the device ceases to display the ghost cursor, displays the cursor 922 in the middle of the word "created", and restores the appearance of the onscreen keyboard 921 (e.g., no longer obscured) to indicate the end of the text selection mode and that the onscreen keyboard 921 is responsive to keystrokes.

In FIG. 9F, while in the text selection mode, at time $T_4$, when a ghost cursor (not shown in FIG. 9F) is located in the middle of the word "created", the device detects the intensity of the press input exceed the deep press intensity threshold $IT_D$. In response to detecting the deep press on the editable content 900, the device begins to select a portion of the text input 928 in accordance with the movement 932 of the contact in the touch input. After time $T_4$, during the movement 932, the intensity of the press input can be above or below the deep press intensity threshold $IT_D$.

FIGS. 9G-9L illustrate a variety of possible behaviors that can occur at time $T_5$ in accordance with some embodiments.

In FIG. 9G, at time $T_5$, the device detects lift-off of the contact in the touch input, such that the intensity of the press input is zero. In response to detecting the lift-off of the contact in the touch input, in some embodiments, the device confirms selection of the portion of the text input 928. In some embodiments, a selection box 928 (e.g., a grey box) is maintained on the selected portion of the text input, and/or a menu bar 940 is displayed that shows actions that can be performed on the selected portion of the text input (e.g., copying 944, defining, cutting 942, pasting, etc.). Thus, FIGS. 9F and 9G illustrate using a first deep press input by a contact (924) to initiate text selection, then movement of the contact to select text, and then lift-off of the contact to confirm the selection.

In FIG. 9H, after selecting the portion of the text input between time $T_4$ and $T_5$, while the portion of the text input is selected (FIG. 9F), the device detects an intensity of the contact in the touch input that exceeds the deep press intensity threshold $IT_D$ at time $T_5$. In response to detecting the deep press while the portion of the text input is selected, in some embodiments, the device clears selection of the portion of the text input and displays the insertion marker 922, as shown in FIG. 9H. Thus, FIGS. 9F and 9H illustrate using a first deep press input by a contact (924) to initiate text selection, then movement of the contact to select text, and then a second deep press input by the contact to clear the selection.

In FIG. 9I, instead of clearing the selection as shown in FIG. 9H, upon detecting the deep press at time $T_5$, while the portion of the text input is selected (FIG. 9F), the device detects an intensity of the contact in the touch input that exceeds the deep press intensity threshold $IT_D$ followed by lift-off of the contact without further movement of the contact. In response to detecting the stationary deep press followed by the lift-off, the device confirms the selection 928, and in some embodiments, displays a menu bar 940. Thus, FIGS. 9F and 9I illustrate using a first deep press input by a contact (924) to initiate text selection, then movement of the contact to select text, and then a second deep press input by the contact and lift-off without further movement of the contact to confirm the selection.

In FIG. 9J, upon detecting the deep press at time $T_5$, while the portion of the text input is selected (FIG. 9F), the device detects an intensity of the contact in the touch input that exceeds the deep press intensity threshold $IT_D$ followed by further movement 932 of the contact. In response to the movement following the deep press, the device clears the selection and displays the insertion marker 922 at the end of the word "created". After clearing the selection at time $T_5$, a new selection 928 is made in accordance with the finger movement 932 between time $T_5$ and $T_6$, as shown in FIG. 9K. The new selection 928 starts from the end of the word "created", where the insertion marker 922 was located when a deep press was detected at time $T_5$. Thus, FIGS. 9F, 9J, and 9K illustrate using a first deep press input by a contact (924) to initiate text selection, then movement of the contact to select text, then a second deep press input by the contact to confirm the selection, and then further movement of the contact to clear the prior selection and start a new selection.

In FIG. 9L, upon detecting the deep press at time $T_5$, while the portion of the text input is selected (FIG. 9F), the device detects an intensity of the contact in the touch input that exceeds the deep press intensity threshold $IT_D$ followed by further movement 932 of the contact. In response to the movement following the deep press, the device moves the floating cursor 922-1 and the ghost cursor 922-2 within the content presentation region 902 in accordance with the further movement 932 of the contact. Thus, FIGS. 9F and 9L illustrate using a first deep press input by a contact (924) to initiate text selection, then movement of the contact to select text, then a second deep press input by the contact to confirm the selection, and then further movement of the contact to clear the prior selection and move the cursor(s), without starting a new selection.

In FIG. 9M, while in the text selection mode after detecting a deep press at time $T_1$, the device detects a first local intensity peak of the touch input at time $T_4$ followed by a second local intensity peak in the touch input at time $T_5$ that both exceed the deep press intensity threshold $IT_D$. In response, the device selects a predetermined unit (e.g., a word, or a phrase, or a sentence) of the text input according to a current location of the ghost cursor. For example, at time T3, the ghost cursor 922-2 is located in the middle of the word "created" (FIG. 9D). In response to detecting two local intensity peak exceeding the deep press intensity threshold $IT_D$ at time $T_4$ and $T_5$ respectively, the device selects the word "created" according to the current location of the ghost cursor located in the middle of the word.

In some embodiments, as shown in FIG. 9M, the device detects an increase in a characteristic intensity of the contact above the predefined threshold (e.g., $IT_D$) followed by a decrease in the characteristic intensity of the contact below the predefined intensity threshold (e.g., $IT_D$, and, optionally, a hysteresis intensity threshold that is below the predefined intensity threshold), which in turn is followed by another increase in the characteristic intensity of the contact above the predefined intensity threshold (e.g., $IT_D$).

In some embodiments, the criteria for selecting the first predetermined unit of the text includes a criterion that is met when the second increase in characteristic intensity of the contact above the predefined intensity threshold (e.g., $IT_D$) occurs within a predetermined time period after the first increase in characteristic intensity of the contact above the predefined intensity threshold (e.g., $IT_D$, the double press is a quick double press to trigger selection of the first predetermined unit of text input). For example, when the duration between time $T_4$ and $T_5$ is less than a threshold, the criteria for selecting the first predetermined unit of text are met.

In some embodiments, instead of just two increases in the characteristic intensity of the contact above the predefined intensity threshold (e.g., $IT_D$), three such increases are detected and used to trigger selection of a second predetermined unit of text input (e.g., a quick triple press triggers selection of a sentence, whereas a quick double press triggers selection of a word).

In FIG. 9N, after detecting the first local intensity peak followed by the second local intensity peak, the device detects a third consecutive local intensity peak in the touch input that exceeds the predetermined intensity threshold (e.g., $IT_D$). In some embodiments, the three consecutive local intensity peaks at time $T_4$, $T_5$, and $T_6$ are spaced within a predetermined duration (e.g., within 100 ms or within 200 ms) such that the three intensity peaks are recognized as a single user command (e.g., a triple deep press). In response to detecting the triple deep press, the device selects a second predetermined unit (e.g., a sentence "Four score . . . equal.") of the text input that is larger than and includes the first predetermined unit (e.g., the word "created" in FIG. 9M) of the text input.

Figure 9O:
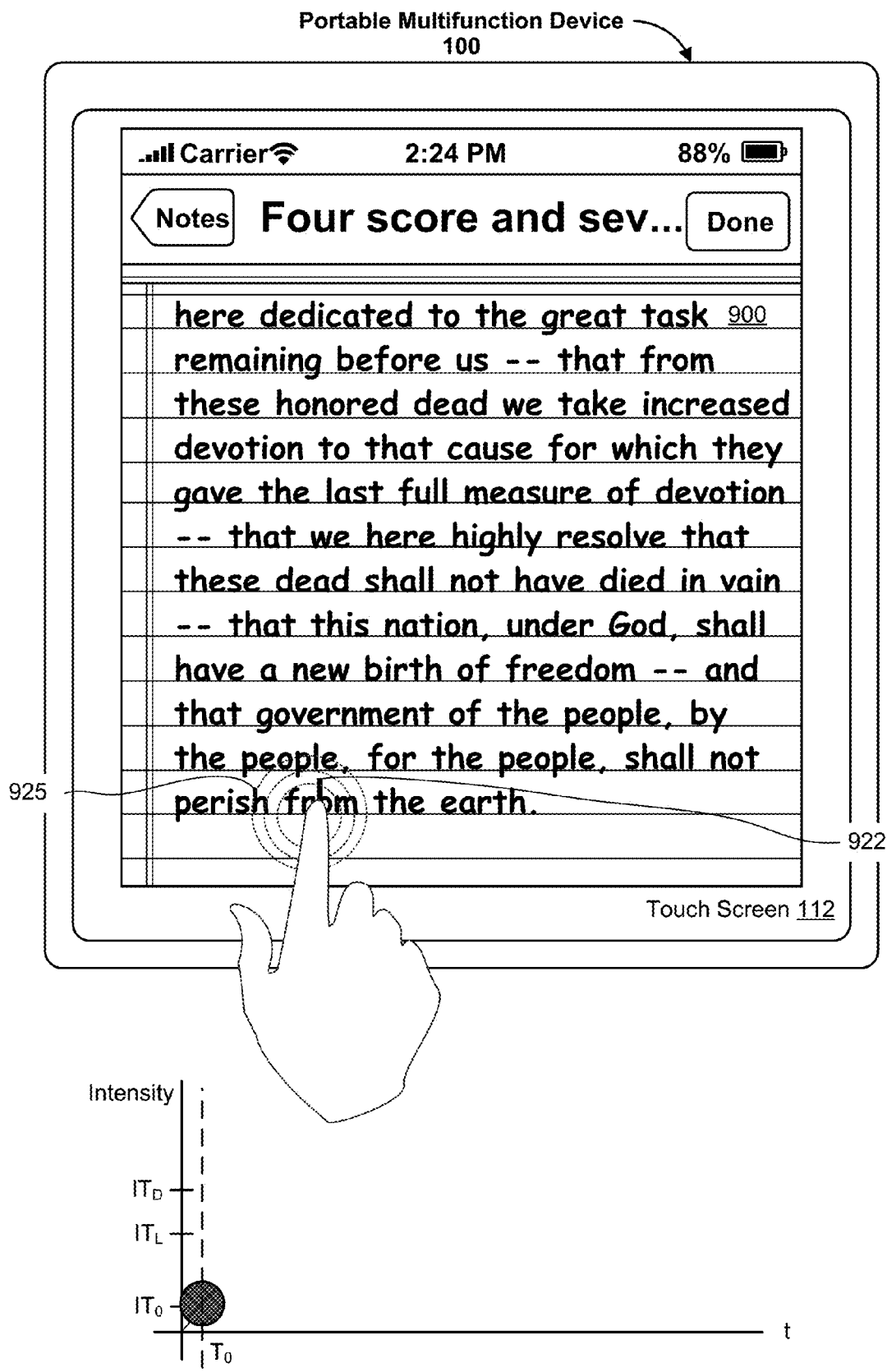

Turning to FIGS. 9O-9AD, FIGS. 9O-9AD illustrate exemplary user interfaces for selecting content. The user interfaces in these figures are used to illustrate the processes described below with respect to FIGS. 11A-11F.

In FIG. 9O, editable content 900 is displayed while an application is in a document editing mode. The application runs on a device 100 that has one or more sensors (e.g., contact intensity sensor(s) 259, FIG. 2B) to detect intensity of contacts with the touch-sensitive display. A user may edit text (e.g., via a keyboard, not shown) and confirm completion of the editing by performing a touch input (e.g., a tap on "done" button) to exit the editing mode. An insertion marker (e.g., cursor 922) is displayed to indicate a current location for text inputs.

At a time prior to $T_0$, no contact is present or detected on touch screen display 112. At $T_0$, the device detects the intensity of the press input increases above the contact intensity threshold $IT_0$. In response to detecting the finger contact 925 on the editable content 900, the device moves a text selection indicator (e.g., a cursor 922) to the location that corresponds to the finger contact (e.g., between the character "r" and "o" of the word "from).

Figure 9P:
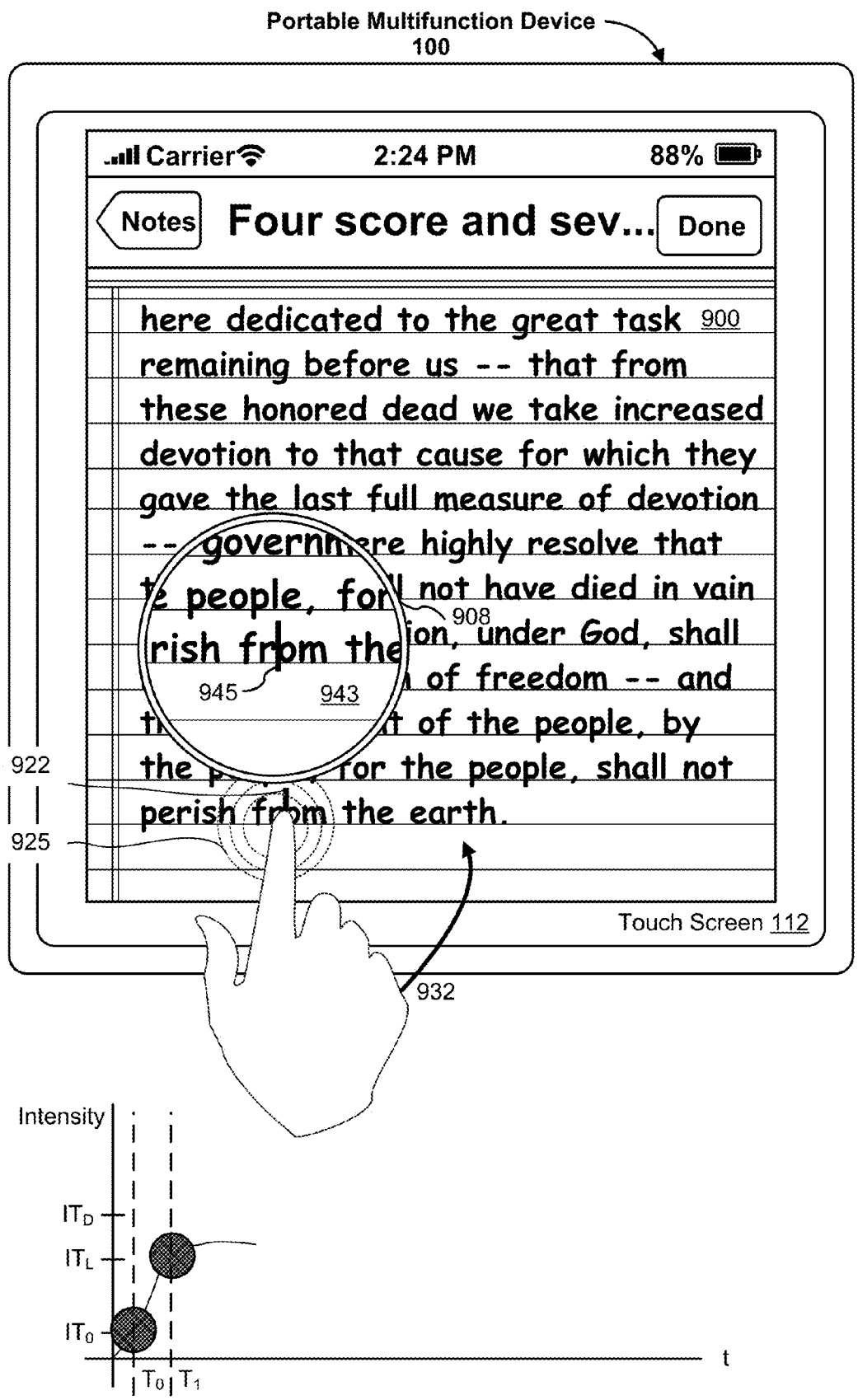

In FIG. 9P, in some embodiments, after the intensity of the press input increases above the contact intensity threshold $IT_0$ at $T_0$, the finger press maintains its pressure, which corresponds to a press and hold gesture. In response to detecting the press and hold gesture, the device displays a magnifying loupe 908. In the magnifying loupe 908, the device expands a portion 943 of the editable content on the touch screen display to a second magnification that is greater than the first magnification. The content magnifier 908 displays the expanded portion 943 of the editable content and a position marker 945 (which corresponds to cursor 922, and which may be displayed in addition to cursor 922 or in place of cursor 922) at a first location within the expanded portion of the editable content (e.g., in the middle of the word "from"). In some embodiments, the expanded portion 943 of the editable content displayed in the content magnifier includes portions of at least three horizontal lines of text displayed concurrently. In some embodiments, the content magnifier 908 has a predefined shape (e.g., a circle).

Figure 9Q:
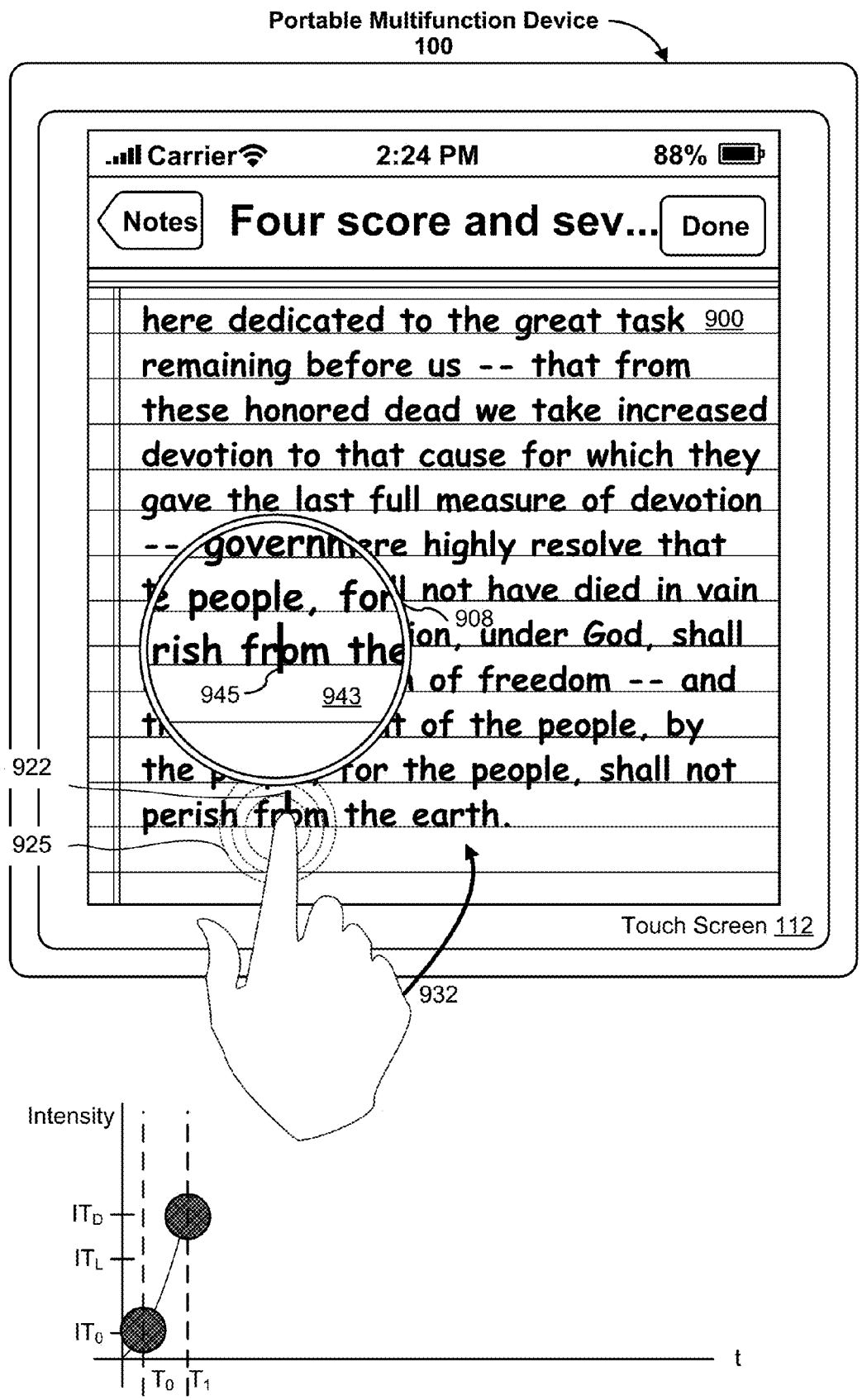
Figure 10A:
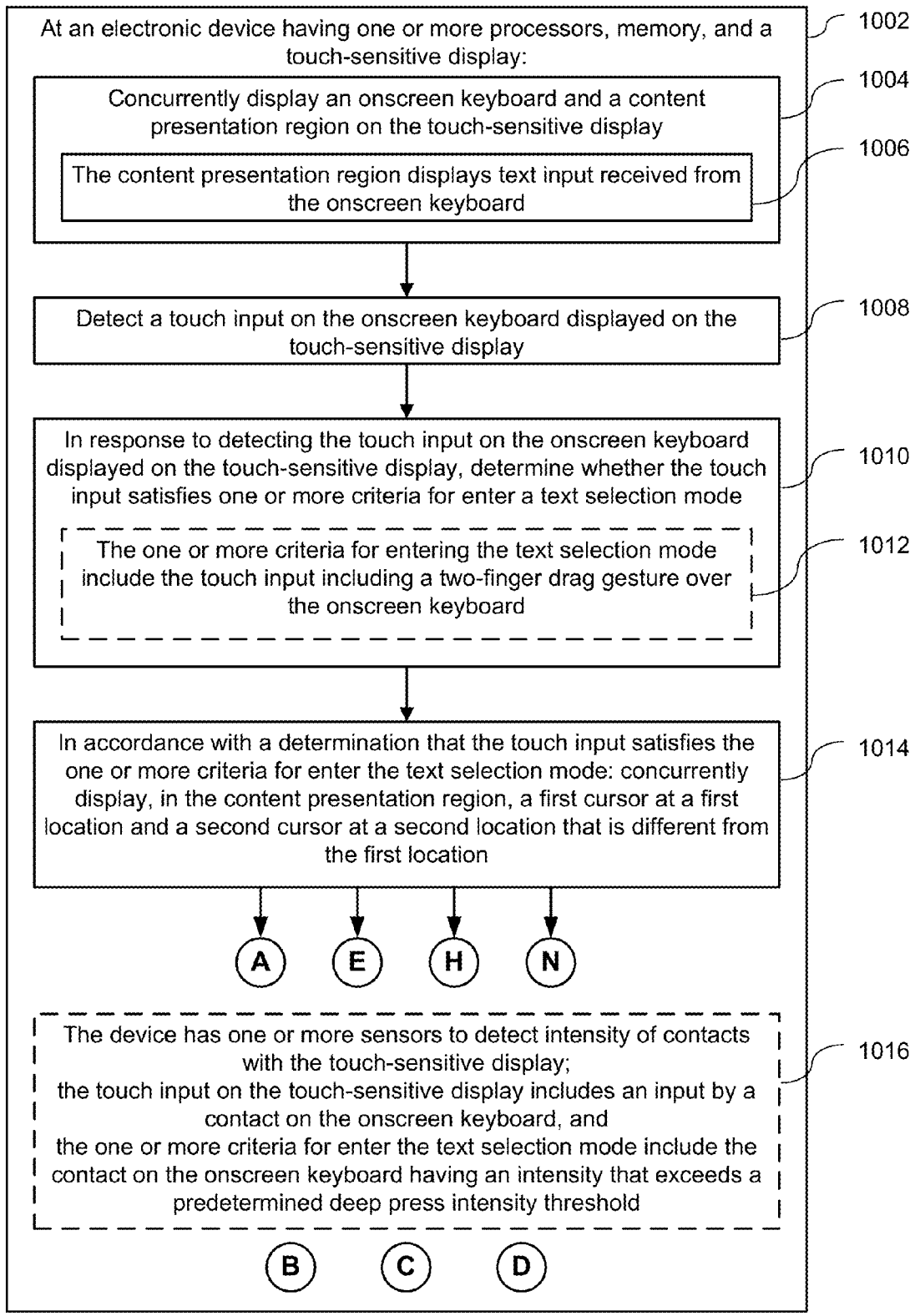
Figure 10C:
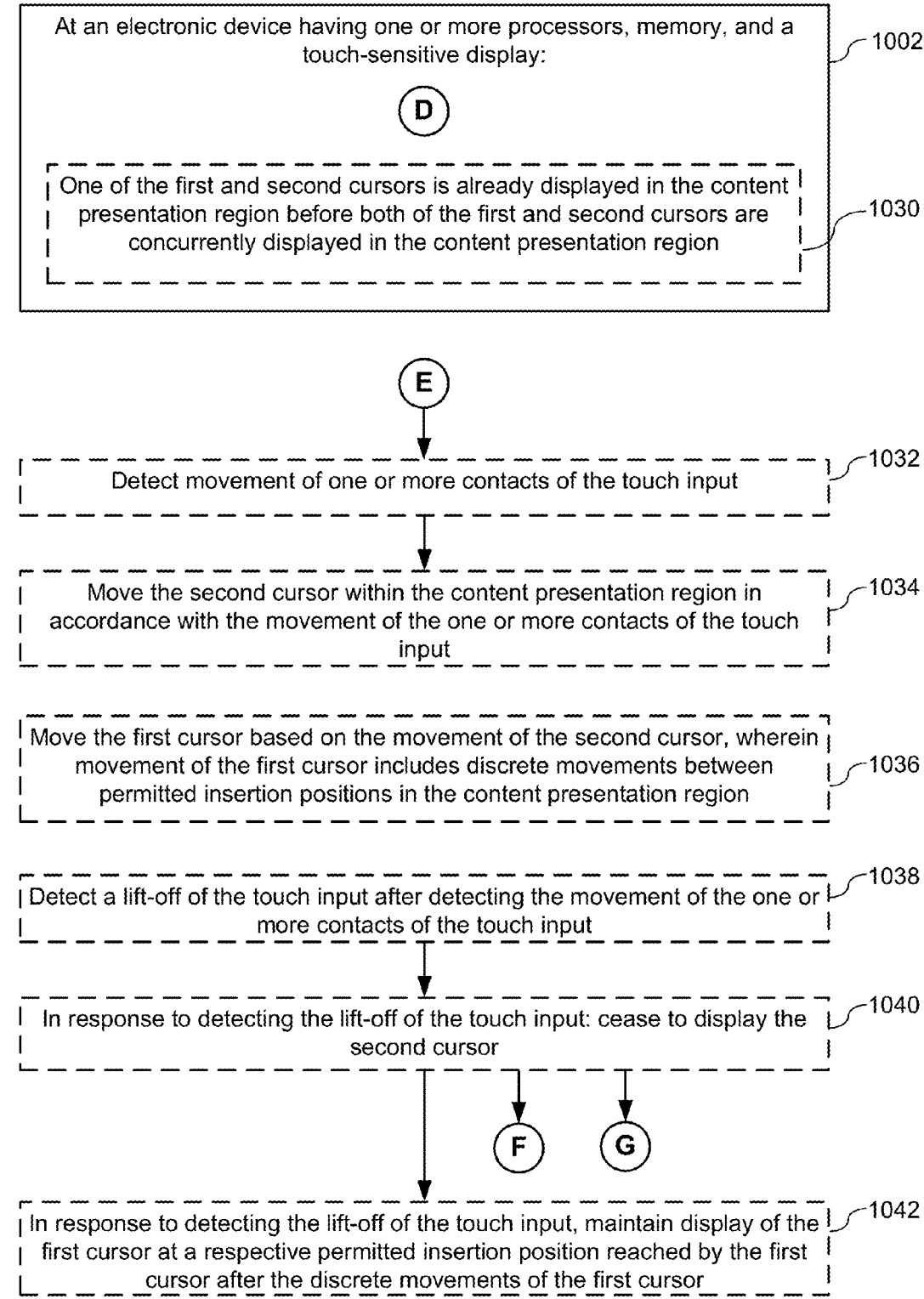
Figure 10D:
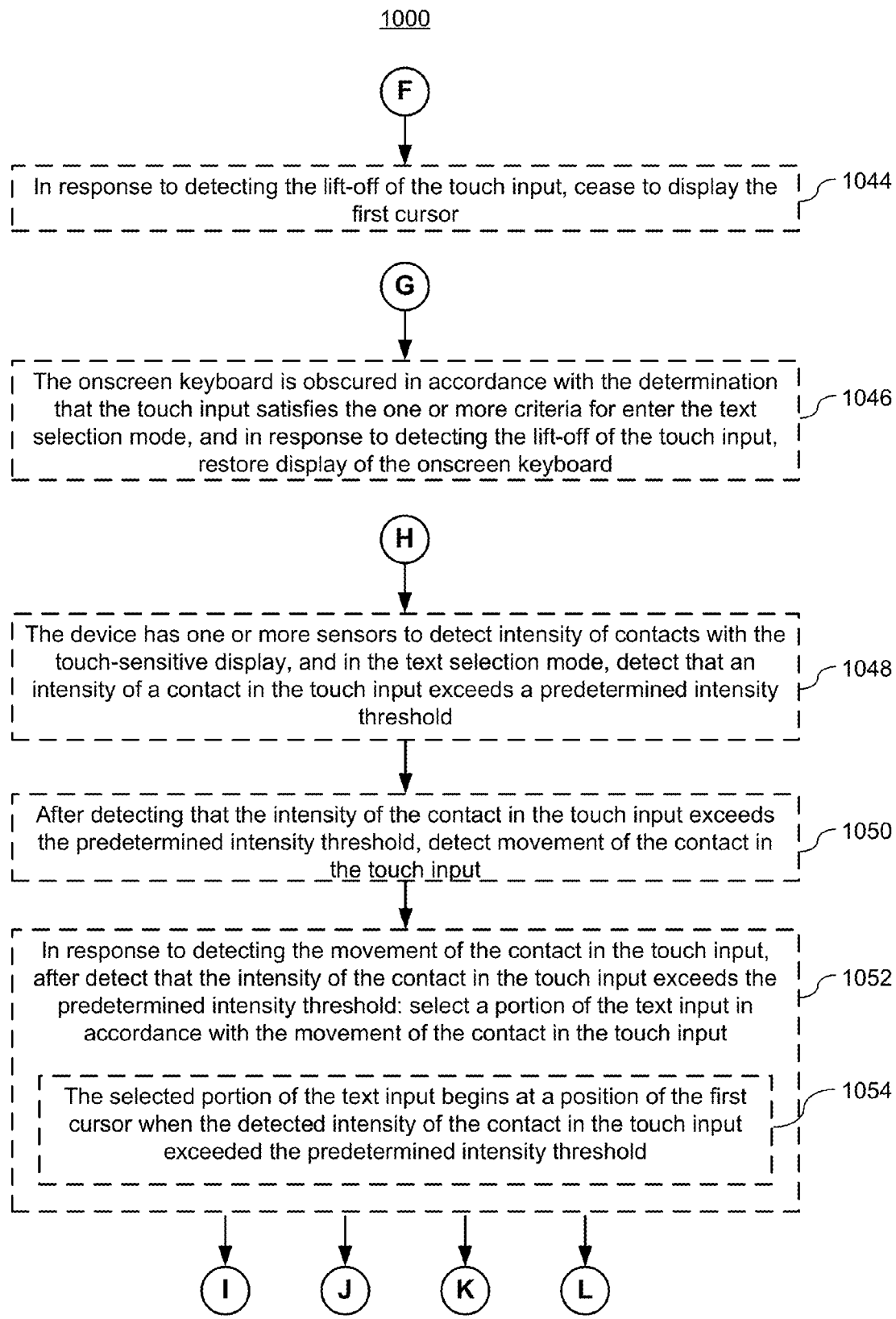
Figure 10E:
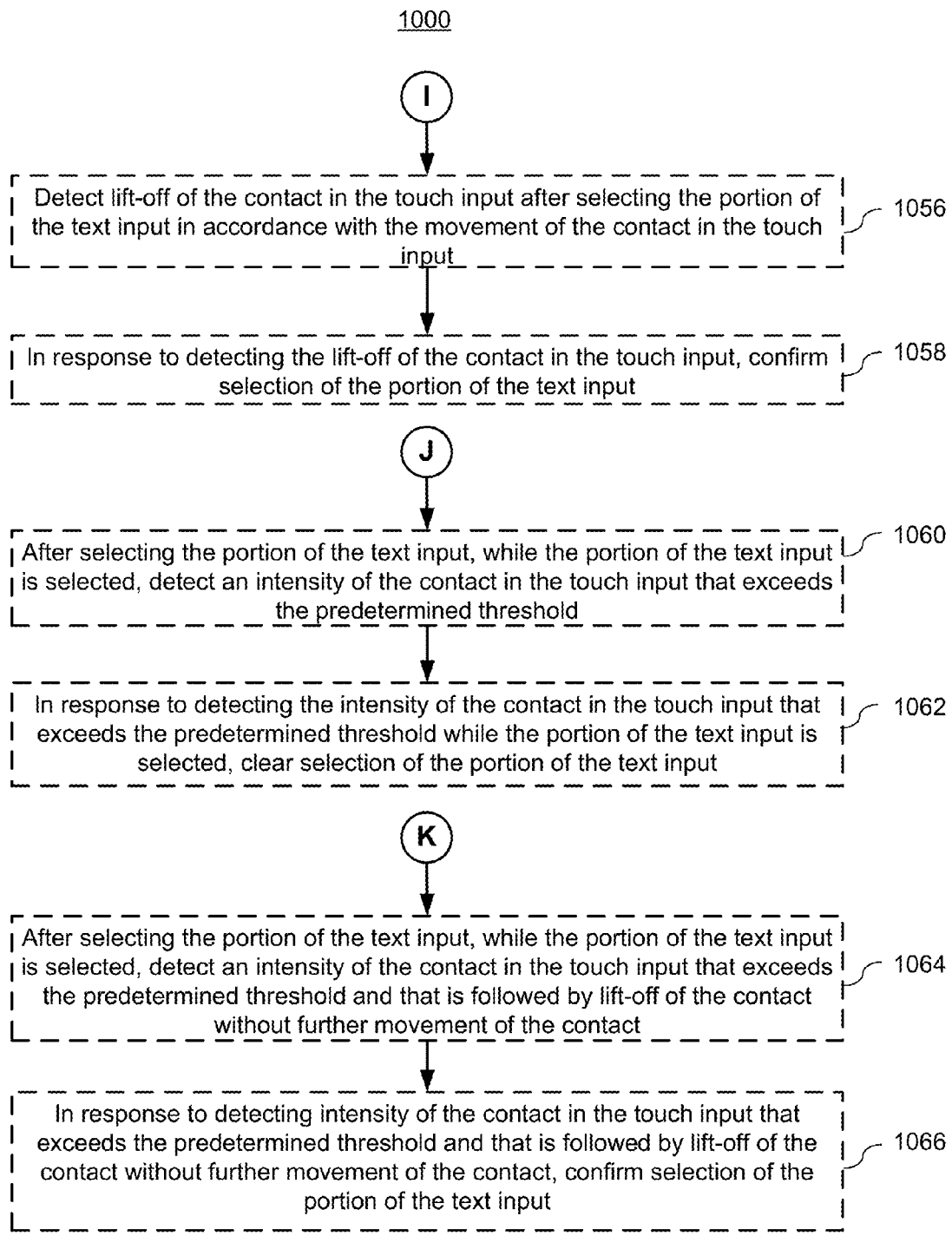
Figure 10F:
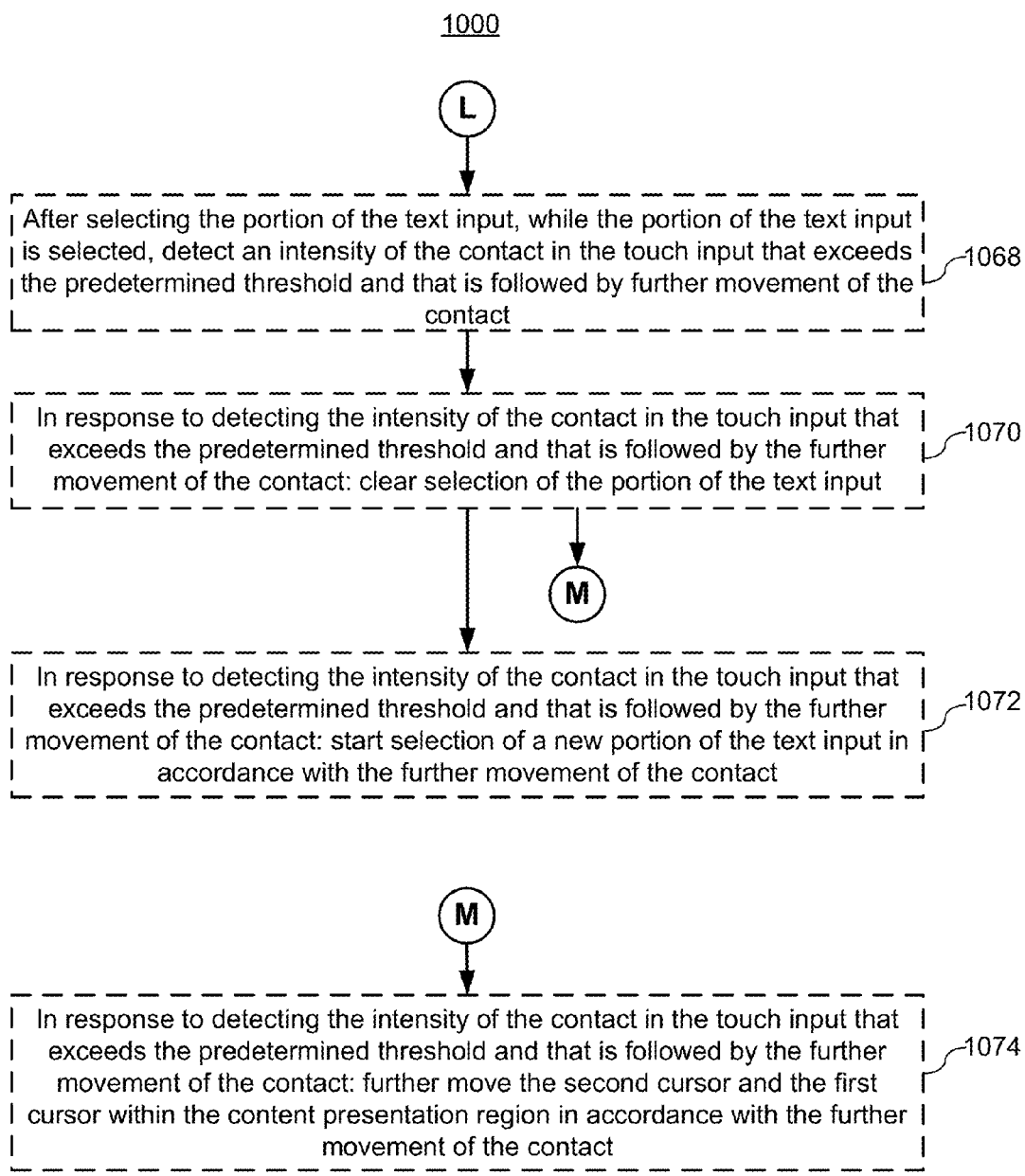
Figure 11A:
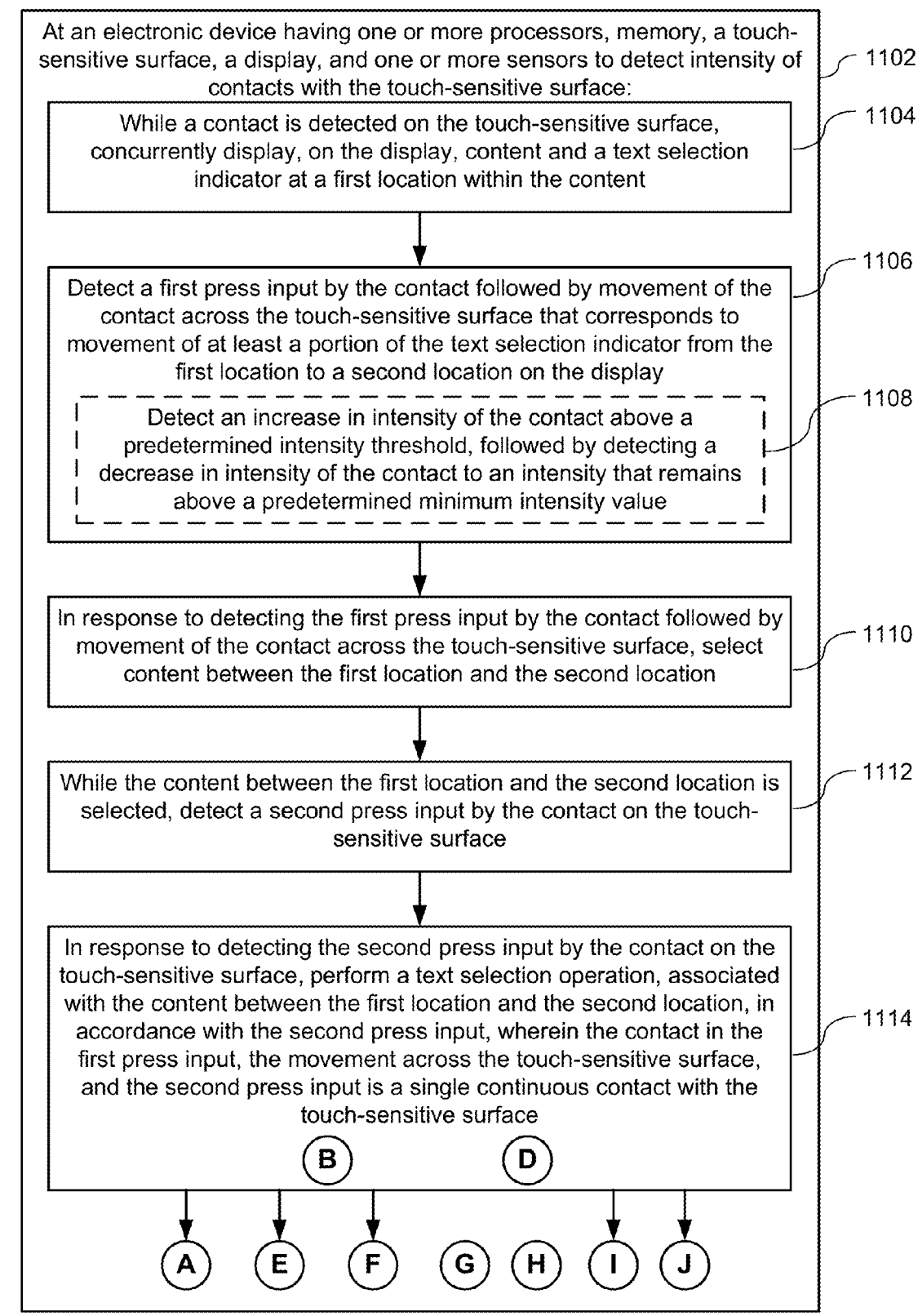
Figure 11F:
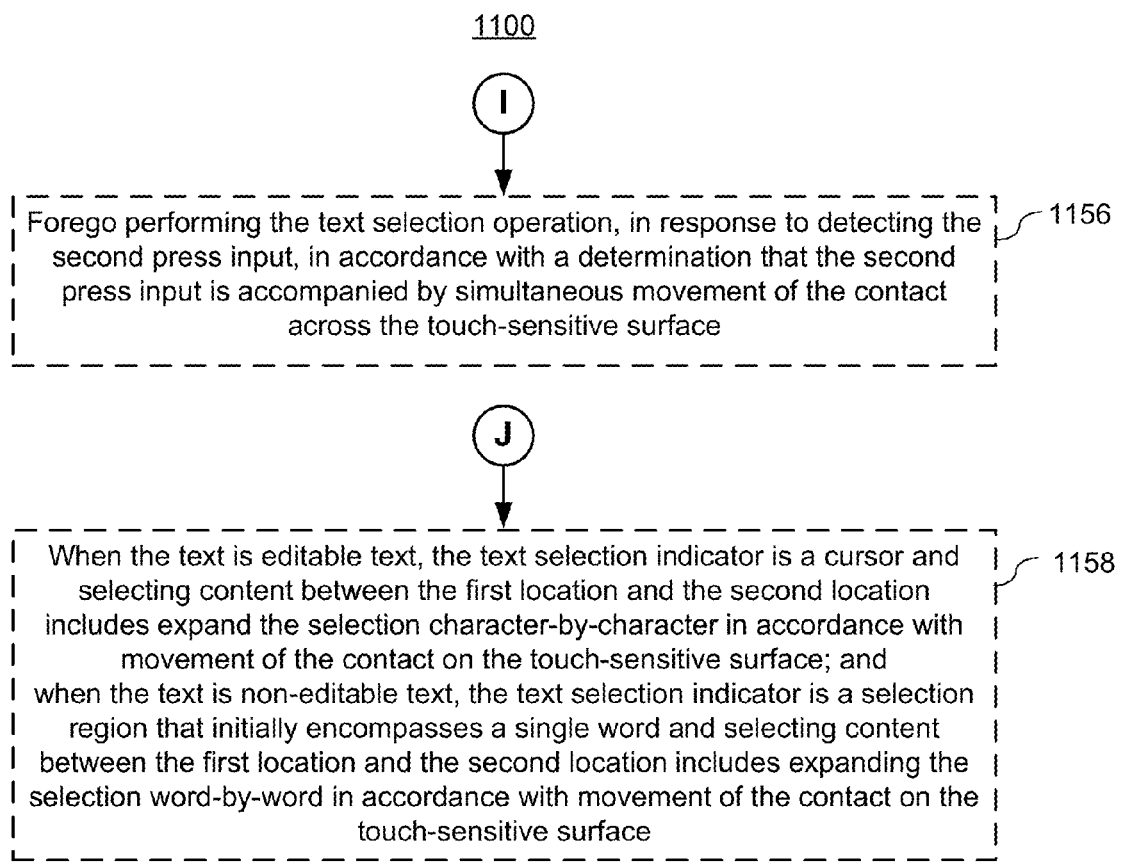

In FIG. 9Q, in some embodiments, after the intensity of the press input increases above the contact intensity threshold $IT_0$ at $T_0$, the intensity of the finger press further increases. At time $T_1$, the device detects that the intensity of the press input has increased above the deep press intensity threshold $IT_D$. In some embodiments, in response to detecting the deep press on the editable content 900, the device displays the content magnifier 908.

In FIG. 9P or FIG. 9Q, when the device detects movement 932 of the finger contact 925 across the touch screen display, the device moves the content magnifier 908 and the insertion marker 922 (and/or position marker 945) in accordance with the movement of the finger contact 925. In FIG. 9R, in response to detecting the movement 932 of the finger gesture from the middle of the word "from" at $T_1$ to the middle of the word "nation" at $T_2$, the device moves the content magnifier 908 and the insertion marker 922 in accordance with the movement of the finger. During the finger movement 932, the intensity of the press input can increase or decrease. For example, as shown in FIG. 9R, after time $T_1$, the intensity continues to rise above the deep press intensity threshold $IT_D$ then decreases to dip below the deep press intensity threshold $IT_D$ at time $T_2$. The device continues to move the content magnifier 908 and the insertion marker 922 until the device detects the intensity of the press input has once again increased above the deep press intensity threshold $IT_D$ at time $T_3$, as shown in FIG. 9S.

In FIG. 9S, at time $T_3$, the device detects a deep press followed by movement of contact 925. In response to detecting the deep press followed by movement of contact 925, the device selects editable text (e.g., one character at a time) as the finger contact 925 moves. In some embodiments, the selected content 928 is marked by a start-point object 926 and an end-point object 930 at respective ends of the selected content 928. For example, in response to detecting the movement 932 of the finger contact 925 from the middle of the word "nation" to the middle of the word "under", the device selects the editable content as the finger moves and marks the selection 928 by the start-point object 926 in the middle of the word "nation" and the end-point object 930 in the middle of the word "under".

In the corresponding intensity diagram, the movement of the finger from the middle of the word "nation" to the middle of the word "under" corresponds to the segment between time $T_3$ and $T_4$. As shown in FIG. 9S, once the initial deep press is detected, the intensity of the press input does not need to be constantly above the deep press intensity threshold $IT_D$. Even when the intensity of the press input has fallen below $IT_D$ during part of the finger movement, the content selection continues.

FIGS. 9T-9X illustrate a variety of possible behaviors that can occur at time $T_5$ in accordance with some embodiments.

In FIG. 9T, at the end of the content selection, in some embodiments, the device detects lift-off of the finger contact at time $T_5$ such that the device detects the intensity of the finger contact 925 decreases to zero. In response to detecting the lift-off, the device maintains the selection 928 and displays an action menu 940 adjacent to the selected content 928. In some embodiments, the action menu 940 includes an icon 942 for cutting the selected content 928, an icon 944 for copying the selected content 928, and an icon 946 for looking up the selected content 928. Thus, FIGS. 9S and 9T illustrate using a first deep press input by a contact (925) to initiate text selection, then movement of the contact to select text, and then lift-off of the contact to confirm the selection.

In FIG. 9U, at the end of the content selection, in some embodiments, the device detects another deep press by finger contact 925 at time $T_5$. In response to detecting the deep press, the device cancels the selection, and places the text selection indicator (e.g., cursor 922) at the deep press location (e.g., in the middle of the word "under"), and starts a new selection upon detecting further finger movement. Thus, FIGS. 9S and 9U illustrate using a first deep press input by a contact (925) to initiate text selection, then movement of the contact to select text, and then a second deep press input by the contact to clear the selection.

In FIG. 9V, in some embodiments, instead of canceling the selection upon detecting another deep press by finger contact 925, at time $T_5$, in response to detecting the deep press, the device maintains the selection 928. Subsequently, in some embodiments, as shown in FIG. 9W, the device detects finger movement 932 between time $T_5$ and $T_6$. In response to detecting the finger movement 932, the selection is cleared, and the text selection indicator (e.g., cursor 922) moves from the middle of the word "under" to the middle of the word "of" in accordance with the movement of the finger 932. Thus, FIGS. 9S, 9V, and 9W illustrate using a first deep press input by a contact (925) to initiate text selection, then movement of the contact to select text, then a second deep press input by the contact to confirm the selection, and then further movement of the contact to clear the prior selection and move the cursor(s), without starting a new selection.

FIG. 9X illustrates, in some embodiments, both cursor positioning and text selection occur in the text selection mode. After detecting the deep press at time $T_5$, in response to detecting further finger movement 932 between time $T_5$ and $T_6$, the device maintains the selection 928 and displays an action menu 940 adjacent to the selected content 928. In addition, the device displays the text selection indicator (e.g., cursor 922) that moves in accordance with movement 932 of the finger. The device will clear the selection 928 upon detecting another deep press. Thus, FIGS. 9S and 9X illustrate using a first deep press input by a contact (925) to initiate text selection, then movement of the contact to select text, then a second deep press input by the contact to confirm and complete the selection, and then further movement of the contact to move the cursor(s) and maintain the action menu 940, without clearing the selected content.

In some embodiments, if a third deep press input by the contact 925 is detected after the further movement of the contact to move the cursor(s), then the selected content (e.g., "ation un" in FIG. 9X) is cleared and display of the action menu 940 ends. In some embodiments, the third deep press input by the contact initiates text selection such that movement of the contact 925 after the third deep press input selects text in accordance with the movement of the contact 925.

In some embodiments, the third deep press input does not clear the previously selected content, but the third deep press input by the contact does initiate additional text selection such that movement of the contact 925 after the third deep press input selects an additional portion of text in accordance with the movement. In these embodiments, a user is able to select multiple portions of content with a single continuous contact by repeatedly: deep pressing to initiate text selection, moving to select text, deep pressing again to complete text selection, and moving without selecting text to a next position on the touch-sensitive surface that corresponds to a desired starting location for the next text selection.

On the other hand, if lift off of contact 925 is detected without detecting a third deep press input by contact 925, then display of the selected content "ation un" and the action menu 940 are maintained.

In some embodiments, in FIG. 9X, the selected text "ation un" is copied by moving contact 925 across the touch-sensitive surface to a position that corresponds to the location of copy icon 944, and then detecting a deep press with contact 925 at that position. Similarly, in FIG. 9X, the selected text "ation un" is cut by moving contact 925 across the touch-sensitive surface to a position that corresponds to the location of cut icon 942, and then detecting a deep press with contact 925 at that position. Similarly, in FIG. 9X, the selected text "ation un" is looked up by moving contact 925 across the touch-sensitive surface to a position that corresponds to the location of lookup icon 946, and then detecting a deep press with contact 925 at that position. Alternatively, while action menu 940 is displayed, a tap gesture on the touch-sensitive surface at a location that corresponds to the location of one of icons 942, 944, and 946 in the action menu 940 initiates the corresponding action. In some embodiments, a deep press input (e.g., an increase in intensity from below $IT_D$ to above $IT_D$) by contact 925 on text (e.g., a word, set of words or characters, hyperlink, or other portion of text) while the text is selected initiates a predefined user interface action associated with the selected text. In some embodiments, the predefined user interface action includes displaying additional information about the selected text (e.g., displaying a region displayed overlaid on the user interface that includes the text, wherein the overlaid region includes additional information about the text such as a definition for a word, an encyclopedia entry for a word or phrase, or a preview of a linked resource such as a webpage for a hyperlink). In some embodiments, the additional information continues to be displayed overlaid on the user interface that includes the text until contact 925 ceases to be detected, and the device ceases to display the additional information in response to ceasing to detect contact 925. In some embodiments, the additional information for the selected text continues to be displayed overlaid on the user interface that includes the text until another deep press (e.g., an increase in intensity from below $IT_D$ to above $IT_D$) by contact 925 is detected on the selected text, and the device ceases to display the additional information in response to detecting a deep press (e.g., an increase in intensity from below $IT_D$ to above $IT_D$) by contact 925 on the selected text while the additional information for the selected text is displayed.

Turning to FIGS. 9Y-9AD, FIGS. 9Y-9AD illustrate exemplary user interfaces for selecting read-only content (e.g., a webpage) on a device 100 that has one or more sensors (e.g., contact intensity sensor(s) 259, FIG. 2B) to detect intensity of contacts with the touch-sensitive display. In FIG. 9Y, prior to time $T_0$, no contact is present or detected on the touch screen 112. At $T_0$, the device detects the intensity of a press input by finger contact 927 increases above the contact intensity threshold $IT_0$.

In FIG. 9Z, at time $T_1$, the device detects that the intensity of the press input by finger contact 927 has increased above the deep press intensity threshold $IT_D$. In response to detecting the deep press on the read-only content, the device displays a selection box 929 around a word (e.g., "Translation") in the read-only text.

In FIG. 9AA, at time $T_2$, the device detects a movement 932 of the finger contact 927 from the word "Translation" to "Gift" in the read-only content. In accordance with the movement of the finger contact 927, additional words are selected, and the selection box 929 expands to "Translation: A U.S. Gift". In some embodiments, the expansion increases one word at a time.

In FIG. 9AB, at time $T_3$, the device detects that the intensity of the press input by finger contact 927 has increased above the deep press intensity threshold $IT_D$. In response to detecting the deep press, the device clears the selection, and starts a new selection by selecting a word at the deep press location of finger contact 927 (e.g., the word "Gift") as shown in FIG. 9AB and increases the new selection box 929 one word at a time in accordance with the movement 932 of the finger contact 927, as shown in FIG. 9AC.

In FIG. 9AD, at the end of the content selection, in some embodiments, the device detects a lift-off of the finger contact 927, such that the intensity of the press input has decreased to zero. In response to detecting the lift-off, the device maintains the selection and displays an action menu 940 adjacent to the selected content in selection box 929. The action menu 940, in some embodiments, includes an icon for copying the selected content.

FIGS. 10A-10G illustrate a flow diagram of a method 1000 of manipulating a cursor in accordance with some embodiments. The method 1000 is performed at (1002) an electronic device (e.g., portable multifunction device 100, FIG. 1A) with one or more processors, memory, and a display. In some embodiments, the display is a touch-screen display and the touch-sensitive surface is on or integrated with the display. In some embodiments, the display is separate from the touch-sensitive surface. Some operations in method 1000 are, optionally, combined and/or the order of some operations is, optionally, changed.

As described below, the method 1000 provides an efficient way to manipulate a cursor. The method reduces the cognitive burden on a user when using a cursor, thereby creating a more efficient human-machine interface. For battery-operated electronic devices, enabling a user to manipulate a cursor faster and more efficiently conserves power and increases the time between battery charges.

The device concurrently displays (1004) an onscreen keyboard (e.g., keyboard 921, FIG. 9A) and a content presentation region 902 on the touch-sensitive display. In some embodiments, the content presentation region displays (1006) text input received from the onscreen keyboard. The device then detects (1008) a touch input (e.g., by finger contact 924) on the onscreen keyboard 921 displayed on the touch-sensitive display. In response to detecting the touch input on the onscreen keyboard displayed on the touch-sensitive display, the device determines (1010) whether the touch input satisfies one or more criteria for entering a text selection mode.

In some embodiments, the one or more criteria for entering the text selection mode include (1012) the touch input including a two-finger drag gesture over the onscreen keyboard (FIG. 7B). In some embodiments, a two-finger drag gesture that starts outside of the onscreen keyboard and enters the onscreen keyboard through movement of the finger contacts satisfies the criteria for entering the text selection mode (FIGS. 7A and 7B). In some embodiments, after entering the onscreen keyboard, as long as the two-finger gesture is confined within the onscreen keyboard, the criteria for entering the text selection mode are satisfied.

In accordance with a determination that the touch input satisfies the one or more criteria for entering the text selection mode, the device concurrently displays (1014), in the content presentation region 902, a first cursor (e.g., ghost cursor 922-2, FIG. 9B) at a first location and a second cursor (e.g., floating cursor 922-1, FIG. 9B) at a second location that is different from the first location. In some embodiments, the second cursor 922-1 is a cursor that moves across the touch-sensitive display in accordance with the movement of one or more finger contacts in the touch input (FIGS. 9C-9E). In some embodiments, the first cursor 922-2 is a ghost cursor that indicates where the cursor will be located after the lift-off of the finger contact (FIGS. 9C-9E).

In some embodiments, the electronic device has (1016) one or more sensors to detect intensity of contacts with the touch-sensitive display, the touch input on the touch-sensitive display includes an input by a contact on the onscreen keyboard, and the one or more criteria for entering the text selection mode include the contact on the onscreen keyboard having an intensity that exceeds a predetermined deep press intensity threshold (FIG. 9B). In some embodiments, determining whether the touch input satisfies the one or more criteria for entering the text selection mode includes determining whether the touch input on the touch-sensitive display includes a press input by finger contact 924 over the onscreen keyboard 921, and the press input by finger contact 924 has a contact intensity that exceeds a predetermined deep press intensity threshold $IT_D$ (FIG. 9B).

In some embodiments, in accordance with the determination that the touch input satisfies the one or more criteria for entering the text selection mode, the device visually obscures (1018) keys on the onscreen keyboard (FIG. 9B). In some embodiments, visually obscuring the keys on the onscreen keyboard includes (1020) applying a blurring effect to the onscreen keyboard (FIG. 9B). As shown in FIG. 9B, by applying a blurring effect to the keyboard, the keys on the keyboard become fuzzy and indiscernible. In some embodiments, visually obscuring the keys on the onscreen keyboard includes (1022) transforming the onscreen keyboard into an onscreen touchpad (FIGS. 9B-9D). In some embodiments, visually obscuring the keys on the onscreen keyboard includes (1024) making the onscreen keyboard semitransparent to partially reveal content lying underneath the onscreen keyboard (FIGS. 9B-9D).

In some embodiments, the second location 922-1 (FIG. 9B) is (1026) based on a location of an initial contact in the touch input, and the first location is a permitted insertion position in the content presentation region that is based on the second location. In some embodiments, the initial location of a finger contact 924 on the touch screen display 112 determines the initial position of the second cursor. For example, if the initial location of the finger contact is on the left portion of the touch screen display 112, the second cursor 922-1 will be displayed at a corresponding location on the left portion of the content presentation region (FIG. 9L). Conversely, as shown in FIG. 9B, when the initial location of the finger contact 924 is on the right portion of the touch screen display 112, the second cursor 922-1 will be displayed at a corresponding location on the right portion of the content presentation region 902 (FIG. 9B).

In some embodiments, once the initial position of the second cursor (e.g., floating cursor 922-1, FIG. 9B) is determined based on the initial position of the finger contact, the initial position of the first cursor (e.g., ghost cursor

922-2, FIG. 9B) is determined based on the initial position of the second cursor. In some embodiments, the original text cursor (e.g., cursor 922, FIG. 9A) jumps to the position of the second cursor (e.g., floating cursor 922-1, FIG. 9B) to serve as the second cursor, and the first cursor (e.g., ghost cursor 922-2, FIG. 9B) is created at the corresponding insertion position (e.g., the position in the middle of the word "Liberty" marked by the insertion marker 922 in FIG. 9A) that is associated with the second cursor.

In some embodiments, as shown in FIG. 9B, the first location is (1028) an insertion position at which the first cursor 922-2 is located when the touch input is determined to satisfy the one or more criteria for entering the text selection mode, and the second location is displaced from the first location by a predetermined offset. For example, the insertion marker 922 is displayed in the text input (e.g., in the middle of the word "Liberty, FIG. 9A) when the touch input is determined to satisfy the one or more criteria for entering the text selection mode (FIG. 9B). When it is determined that the touch input satisfies the one or more criteria for entering the text selection mode, the first cursor (e.g., ghost cursor 922-2) is displayed at the position of the insertion marker (e.g., in the middle of the word "Liberty, FIG. 9B), and a second cursor (e.g., floating cursor 922-1) is created and placed near the first cursor. When the user subsequently moves the finger contact in the touch input, the floating cursor is dragged by the finger contact, and the first cursor moves from permitted insertion location to permitted insertion location in accordance with the current position of the floating cursor. In some embodiments, when the touch input is determined to satisfy the one or more criteria for entering the text selection mode, an animation is displayed that shows the floating cursor 922-1 being peeled off the first cursor 922-2, and floating above the first cursor 922-2 at a predetermined distance, and the first cursor 922-1 takes on an appearance (e.g., grayed) that mimics a shadow or ghost of the floating cursor 922-1.

In some embodiments, one of the first and second cursors is (1030) already displayed in the content presentation region 902 before both of the first and second cursors are concurrently displayed in the content presentation region 902. In some embodiments, the floating cursor 922-1 is already displayed when the touch input is determined to satisfy the one or more criteria for entering the text selection mode. In some embodiments, the insertion cursor 922-2 is already displayed when the touch input is determined to satisfy the one or more criteria for entering the text selection mode.

In some embodiments, the device detects (1032) movement of one or more contacts of the touch input, and moves (1034) the second cursor (e.g., the floating cursor 922-1) within the content presentation region in accordance with the movement of the one or more contacts of the touch input (e.g., the movement of the floating cursor smoothly follows the movement of a finger contact in terms of speed and direction). In some embodiments, the device moves (1036) the first cursor based on the movement of the second cursor, and movement of the first cursor includes discrete movements between permitted insertion positions in the content presentation region. For example, when the user moves the finger contact in the touch input (FIGS. 9B-9D), the floating cursor 922-1 is dragged by the finger contact, and the first cursor (e.g., ghost cursor 922-2) moves from permitted insertion location to permitted insertion location in accordance with the current position of the floating cursor 922-1 (e.g., from the middle of the word "Liberty in FIG. 9B to the end of the word "conceived" in FIG. 9C", then to the middle of the word "created" in FIG. 9D).

In some embodiments, the device detects (1038) a lift-off of the touch input after detecting the movement of the one or more contacts of the touch input (FIG. 9E). In response to detecting the lift-off of the touch input, the device ceases (1040) to display the second cursor.

In some embodiments, in response to detecting the lift-off of the touch input, the device maintains (1042) display of the first cursor at a respective permitted insertion position reached by the first cursor after the discrete movements of the first cursor (e.g., the middle of the word "created" in FIG. 9D).

In some embodiments, in response to detecting the lift-off of the touch input, the device ceases (1044) to display the first cursor (FIG. 9E).

In some embodiments, the onscreen keyboard is obscured in accordance with a determination that the touch input satisfies the one or more criteria for entering the text selection mode, and in response to detecting the lift-off of the touch input, the device restores (1046) display of the onscreen keyboard (FIG. 9E).

In some embodiments, the device has (1048) one or more sensors to detect intensity of contacts with the touch-sensitive display, and using the one or more sensors, the device detects that an intensity of a contact in the touch input exceeds a predetermined intensity threshold (e.g., $IT_D$). After detecting that the intensity of the contact in the touch input exceeds the predetermined intensity threshold, the device detects (1050) movement of the contact in the touch input. In response to detecting the movement of the contact in the touch input, after detecting that the intensity of the contact in the touch input exceeds the predetermined intensity threshold, the device selects (1052) a portion of the text input in accordance with the movement of the contact in the touch input (e.g., selecting "eated" in accordance with the finger movement 932, FIG. 9F). In some embodiments, the selected portion of the text input begins (1054) at a position of the first cursor (e.g., between the character "r" and "e" of the word "created", FIG. 9F), when the detected intensity of the contact in the touch input exceeded the predetermined intensity threshold.

In some embodiments, the device detects (1056) lift-off of the contact in the touch input after selecting the portion of the text input in accordance with the movement of the contact in the touch input. In response to detecting the lift-off of the contact in the touch input, the device confirms (1058) selection of the portion of the text input (FIG. 9G).

In some embodiments, after selecting the portion of the text input, while the portion of the text input is selected, the device detects (1060) an intensity of the contact in the touch input that exceeds the predetermined threshold (e.g., $IT_D$). In response to detecting the intensity of the contact in the touch input that exceeds the predetermined threshold while the portion of the text input is selected, the device clears (1062) selection of the portion of the text input (FIG. 9H).

In some embodiments, after selecting the portion of the text input, while the portion of the text input is selected, the device detects (1064) an intensity of the contact in the touch input that exceeds the predetermined threshold and that is followed by lift-off of the contact without further movement of the contact. In response to detecting the intensity of the contact in the touch input that exceeds the predetermined threshold and that is followed by lift-off of the contact without further movement of the contact, the device confirms (1066) selection of the portion of the text input (FIG. 9I). In some embodiments, in response to detecting the intensity of the contact in the touch input that exceeds the predetermined threshold and that is followed by lift-off of the contact without further movement of the contact: selection of text is stopped, a selection box is maintained on the selected portion of the text input, and/or a menu bar is displayed that shows actions that can be performed on the selected portion of the text input (e.g., copying, defining, cutting, pasting, etc.).

In some embodiments, after selecting the portion of the text input, while the portion of the text input is selected, the device detects (1068) an intensity of the contact in the touch input that exceeds the predetermined threshold and that is followed by further movement of the contact. In response to detecting the intensity of the contact in the touch input that exceeds the predetermined threshold and that is followed by the further movement of the contact, the device clears (1070) selection of the portion of the text input (FIG. 9J). Further, in some embodiments, in response to detecting the intensity of the contact in the touch input that exceeds the predetermined threshold and that is followed by the further movement of the contact, the device starts (1072) selection of a new portion of the text input in accordance with the further movement of the contact (FIG. 9K). In some other embodiments, instead of starting a new selection, in response to detecting the intensity of the contact in the touch input that exceeds the predetermined threshold and that is followed by the further movement of the contact, the device moves (1074) the second cursor and the first cursor within the content presentation region in accordance with the further movement of the contact (FIG. 9L).

In some embodiments, the device has one or more sensors to detect intensity of contacts with the touch-sensitive display, and using the one or more sensors, in the text selection mode, the device detects (1076) a first local intensity peak in the touch input followed by a second local intensity peak in the touch input that both exceed a predetermined intensity threshold (e.g., $IT_D$). In response to detecting the first local intensity peak followed by the second local intensity peak that both exceed the predetermined intensity threshold, the device selects (1078) a first predetermined unit (e.g., a word as shown in FIG. 9M, or a phrase, or a sentence as shown in FIG. 9N) of the text input according to a current location of the first cursor.

In some embodiments, after detecting the first local intensity peak followed by the second local intensity peak, the device detects (1080) a third consecutive local intensity peak in the touch input that exceeds the predetermined intensity threshold (e.g., a triple deep press). In response to detecting the three consecutive local intensity peaks in the touch input that all exceed the predetermined deep press intensity threshold, the device selects (1082) a second predetermined unit (e.g., a sentence, FIG. 9N) of the text input that is larger than and includes the first predetermined unit (e.g., a word, FIG. 9M) of the text input.

It should be understood that the particular order in which the operations in FIGS. 10A-10G have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 400 and 1100) are also applicable in an analogous manner to method 1000 described above with respect to FIGS. 10A-10G. For example, the contacts, gestures, user interface objects, intensity thresholds, and/or animations described above with reference to method 1000 optionally have one or more of the characteristics of the contacts, gestures, user interface objects, intensity thresholds, and/or animations described herein with reference to other methods described herein (e.g., methods 400 and 1100). For brevity, these details are not repeated here.

FIGS. 11A-11F illustrate a flow diagram of a method 1100 of selecting content in accordance with some embodiments. The method 1100 is performed at (1102) an electronic device (e.g., portable multifunction device 100, FIG. 1A) with one or more processors, memory, a touch-sensitive surface, a display, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 1100 are, optionally, combined and/or the order of some operations is, optionally, changed.

As described below, the method 1100 provides an efficient way to select content with press and movement inputs by a single continuous contact on the touch-sensitive surface, thereby creating a more efficient human-machine interface. For battery-operated electronic devices, enabling a user to select content faster and more efficiently conserves power and increases the time between battery charges.

While a contact (e.g., a finger contact or a stylus contact) is detected on the touch-sensitive surface, the device concurrently displays (1104) on the display content (e.g., editable content in FIGS. 9A-9X and/or read-only content in FIGS. 9Y-9AD) and a text selection indicator at a first location within the content.

In some embodiments, the text selection indicator is a cursor (e.g., cursor 922) that moves within editable content (FIGS. 9O-9R). In some embodiments, the text selection indicator is a selection box or other area that encloses selected content for read-only content (e.g., selection box 929, FIG. 9Z-9AD). In some embodiments, the text selection indicator indicates the starting location of content selection when no content is currently selected (FIG. 9P), and indicates the end location of the currently selected content as a result of contact movement in a content selection mode. In some embodiments, the selection box has a starting edge that indicates the starting location of the selected content, and an end edge that indicates the end location of the selected content (e.g., FIGS. 9S and 9Z). In some embodiments, the cursor moves one character at a time (FIGS. 9P-9R). In some embodiments, the selection box expands or contracts one word at a time (e.g., selection of read-only content by selection box 929, FIGS. 9Z-9AA). In some embodiments, the selection box selects at least one word at any given time (e.g., selection of read-only content, FIG. 9Z). In some embodiments, a magnifying loupe (e.g., 908 in FIG. 9P) is displayed with the cursor and shows a magnified version of the cursor and surrounding content. In some embodiments, a magnifying loupe is displayed with the selection box and shows a magnified version of the selection box and surrounding content (e.g., 952 in FIG. 9S).

The device detects (1106) a first press input by the contact followed by movement of the contact across the touch-sensitive surface that corresponds to movement of at least a portion of the text selection indicator from the first location to a second location on the display (e.g., moving a cursor to the second location on the display or moving an edge of a selection box to the second location on the display, where the edge of the selection box corresponds to one end of the selected content). In some embodiments, the device detects the first press input and the subsequent movement by detecting an increase in intensity of the contact above a predetermined intensity threshold (e.g., a deep press intensity threshold $IT_D$), followed by detecting a decrease in intensity of the contact to an intensity that remains above a predetermined minimum intensity value (e.g., a light press intensity threshold or a contact detection threshold). For example, as shown in FIG. 9AA, after applying a deep press using contact 927 at time $T_1$, the user may ease the contact intensity on the touch-sensitive surface during movement of the contact, as long as a the contact intensity is maintained above a predetermined minimum value, such as the light press threshold intensity $IT_L$, or the contact detection threshold $IT_0$.

In response to detecting the first press input by the contact followed by movement of the contact across the touch-sensitive surface, the device selects (1110) content between the first location and the second location (e.g., selecting content for an editing operation, such as copying). In some embodiments, the selected content (e.g., editable text or read-only text) is enclosed by a highlighted area (e.g., area 928 in FIG. 9S or area 929 in FIG. 9AA) that starts at the first location (e.g., 926 in FIG. 9S) and ends at the second location (e.g., 930 in FIG. 9S). In some embodiments, the selected content is enclosed by the selection box that encloses a word at the first location and a word at the second location and every word in between (FIG. 9AA). In some embodiments, the first location corresponds to the location of the contact on the touch-sensitive surface at the time that a first press input is received (e.g., in the middle of the word "nation" at time $T_3$ in FIG. 9S), and the second location corresponds to the location of the contact on the touch-sensitive surface when a second press input is received (e.g., in the middle of the word "under" at time $T_5$ in FIG. 9V).

While the content between the first location and the second location is selected (e.g., after moving at least the portion of the text selection indicator to the second location), the device detects (1112) a second press input by the contact on the touch-sensitive surface. For example, as shown in FIG. 9V, the device detects an increase in intensity of the contact above an intensity threshold, such as a deep press threshold $IT_D$ at time $T_5$.

In response to detecting the second press input by the contact on the touch-sensitive surface, the device performs (1114) a text selection operation, associated with the content between the first location and the second location, in accordance with the second press input. In some embodiments, the contact in the first press input, the movement across the touch-sensitive surface, and the second press input is a single continuous contact with the touch-sensitive surface (e.g., contact 924, contact 925, or contact 927).

In some embodiments, in response to detecting the first press input by the contact followed by movement of the contact across the touch-sensitive surface: the device displays (1116) at least the portion of the text selection indicator at the second location within the content. For example, the device displays a cursor at the second location on the display (FIG. 9U) or displays an edge of a selection box at the second location on the display (FIG. 9AA), where the edge of the selection box corresponds to one end of the selected content. In some embodiments, the current location of the cursor corresponds to the current location of the contact on the touch-sensitive surface during the movement of the contact on the touch-sensitive surface.

In some embodiments, the text selection operation includes (1118) stopping selection of content at the second location and maintaining selection of the content between the first location and the second location (e.g., FIG. 9V).

In some embodiments, after detecting the second press input and while the content between the first location and the second location remains selected, the device detects (1120) lift-off of the contact, and in response to detecting the lift-off of the contact, the device displays an action menu. For example, after detecting the second press input at a location on the touch-sensitive surface that corresponds to the second location on the display (e.g., in the middle of the word "under"), the device detects lift-off of the contact from that location on the touch-sensitive surface without detecting further movement of the contact. In response, the device displays an action menu bar 940 or other area that shows actions that can be performed on the selected portion of the text input (e.g., copying, defining, cutting, pasting, etc.) for the selected content between the first location and the second location.

In some embodiments, after detecting the second press input by the contact on the touch-sensitive surface and stopping the selection of the content at the second location, the device detects (1124) further movement of the contact. In response to detecting the further movement of the contact, the device displays at least a portion of the text selection indicator at a third location within the content. For example, in FIG. 9W, after detecting the second press input at a location on the touch-sensitive surface that corresponds to the second location on the display (e.g., in FIG. 9V, the press input at $T_5$ at a location on the touch-sensitive surface that corresponds to the middle of the word "under" on the display), the device detects further movement of the contact from that location on the touch-sensitive surface to another location on the touch-sensitive surface (e.g., in FIG. 9W, to a location on the touch-sensitive surface that corresponds to the middle of the word "of" at $T_6$). In response, the device moves the cursor 922 or an edge of the selection box to the third location (e.g., to the middle of the word "of" in FIG. 9W) in accordance with the movement of the contact on the touch-sensitive surface.

In some embodiments, in response to detecting the further movement of the contact, the device cancels (1126) selection of content between the first location and the second location without selecting content between the second location and the third location (FIG. 9W).

In some embodiments, the text selection operation includes (1128) cancelling selection of content between the first location and the second location (FIG. 9AB).

In some embodiments, after detecting the second press input by the contact on the touch-sensitive surface and canceling the selection of content between the first location and the second location, the device detects (1130) further movement of the contact. In response to detecting the further movement of the contact, the device selects content between the second location and a third location (FIGS. 9AB-9AC).

In some embodiments, while the content between the second location and the third location is selected, the device detects (1132) lift-off of the contact (e.g., without detecting further movement of the contact). In response to detecting the lift-off of the contact while the content between the second location and the third location is selected, the device stops selection of the content at the third location and maintains selection of the content between the second location and the third location (as shown in FIGS. 9AC-9AD).

In some embodiments, before displaying the text selection indicator at the first location within the content, the device detects (1134) an initial press input by the contact on the touch-sensitive surface. In response to detecting the initial press input, the device displays the text selection indicator at an initial location within the content that corresponds to a location of the initial press input on the touch-sensitive surface. In some embodiments, the initial press input is (1136) detected at a location on the touch-sensitive surface that corresponds to a location of the content on the display. When the initial press input is detected at a location that corresponds to the first location within the content, the text selection indicator (e.g. the cursor 922) is displayed at the first location within the content. If the initial press input is detected at a location that does not correspond to the first location within the content, the text selection indicator is displayed at the first location within the content when the contact, after making the initial press input, moves to a location on the touch-sensitive surface that corresponds to the first location. For example, for a "first location" of position marker 945 in FIG. 9R (which corresponds to cursor 922) between the letters "n" and "a" in "nation," the position marker was moved to this location after the initial press input shown in FIG. 9Q placed position marker 945 between the letters "r" and "o" in "from."

In some embodiments, the display is a touch-sensitive display that includes the touch-sensitive surface, and the device concurrently displays (1138), on the touch-sensitive display, the content and an onscreen keyboard. In some embodiments, the initial press input is detected on the onscreen keyboard (FIG. 9A).

In some embodiments, the display is a touch-sensitive display that includes the touch-sensitive surface, and the device concurrently displays (1140), on the touch-sensitive display, the content and an onscreen keyboard. Before displaying the text selection indicator at the first location within the content, the device detects (1142) a multi-contact drag input (e.g., a two-finger drag input as shown in FIG. 7B) on the onscreen keyboard. In response to detecting the multi-contact drag input on the onscreen keyboard, the device displays the text selection indicator at an initial location within the content based on a location of the multi-contact drag input on the onscreen keyboard. In some embodiments, as shown in FIG. 7B, the multi-contact drag input is detected on the onscreen keyboard, the keyboard is converted to a virtual trackpad as described with respect to FIG. 9B, and the text selection indicator is displayed. Subsequent movement of the contact(s) in the multi-contact drag input on the virtual trackpad moves the text selection indicator within the content.

In some embodiments, the content includes (1144) editable content and the text selection indicator includes a cursor (FIG. 9A). In such embodiments, the device displays (1146) a magnifying loupe that displays a magnified version of the cursor and a region surrounding the cursor in response to a deep press, as shown in FIG. 9Q. Further, when selecting the content between the first location and the second location, the device moves (1148) the cursor one character space at a time in response to detecting the movement of the contact across the touch-sensitive surface and selects one additional character at a time in accordance with the movement of the cursor (FIG. 9S).

In some embodiments, the content includes (1150) read-only content and the text selection indicator includes a selection area (e.g., a rectangular selection box 929, FIG. 9Z). In such embodiments, displaying the text selection indicator at the first location includes displaying a first word (e.g., "Translation" in FIG. 9Z) located at the first location within the selection area. When selecting the read-only content between the first location and the second location, the device expands (1152) the selection area one word at a time in accordance with the movement of the contact across the touch-sensitive surface and selects one additional word at a time in accordance with the expansion of the selection area (e.g., "Translation: A U.S. Gift" in selection area 929 in FIG. 9AA). In some embodiments, the device displays (1154) a magnifying loupe that displays a magnified version of the selection area and a region surrounding the selection area.

In some embodiments, the device foregoes (1156) performing the text selection operation, in response to detecting the second press input, in accordance with a determination that the second press input is accompanied by simultaneous movement of the contact across the touch-sensitive surface. For example, the text selection operation is not performed when the device detects the second press input accompanied by simultaneous movement of the contact. In other words, movement cancels the operation that is typically triggered by the second press input.

In some embodiments, when the text is editable text, the text selection indicator is a cursor and selecting content between the first location and the second location includes (1158) expanding the selection character-by-character in accordance with movement of the contact on the touch-sensitive surface (FIG. 9S); and when the text is non-editable text, the text selection indicator is a selection region that initially encompasses a single word and selecting content between the first location and the second location includes expanding the selection word-by-word in accordance with movement of the contact on the touch-sensitive surface (FIG. 9AA).

It should be understood that the particular order in which the operations in FIGS. 11A-11F have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 400 and 1000) are also applicable in an analogous manner to method 1100 described above with respect to FIGS. 11A-11F. For example, the contacts, gestures, user interface objects, intensity thresholds, and/or animations described above with reference to method 1100 optionally have one or more of the characteristics of the contacts, gestures, user interface objects, intensity thresholds, and/or animations described herein with reference to other methods described herein (e.g., methods 400 and 1000). For brevity, these details are not repeated here.

Figure 12:
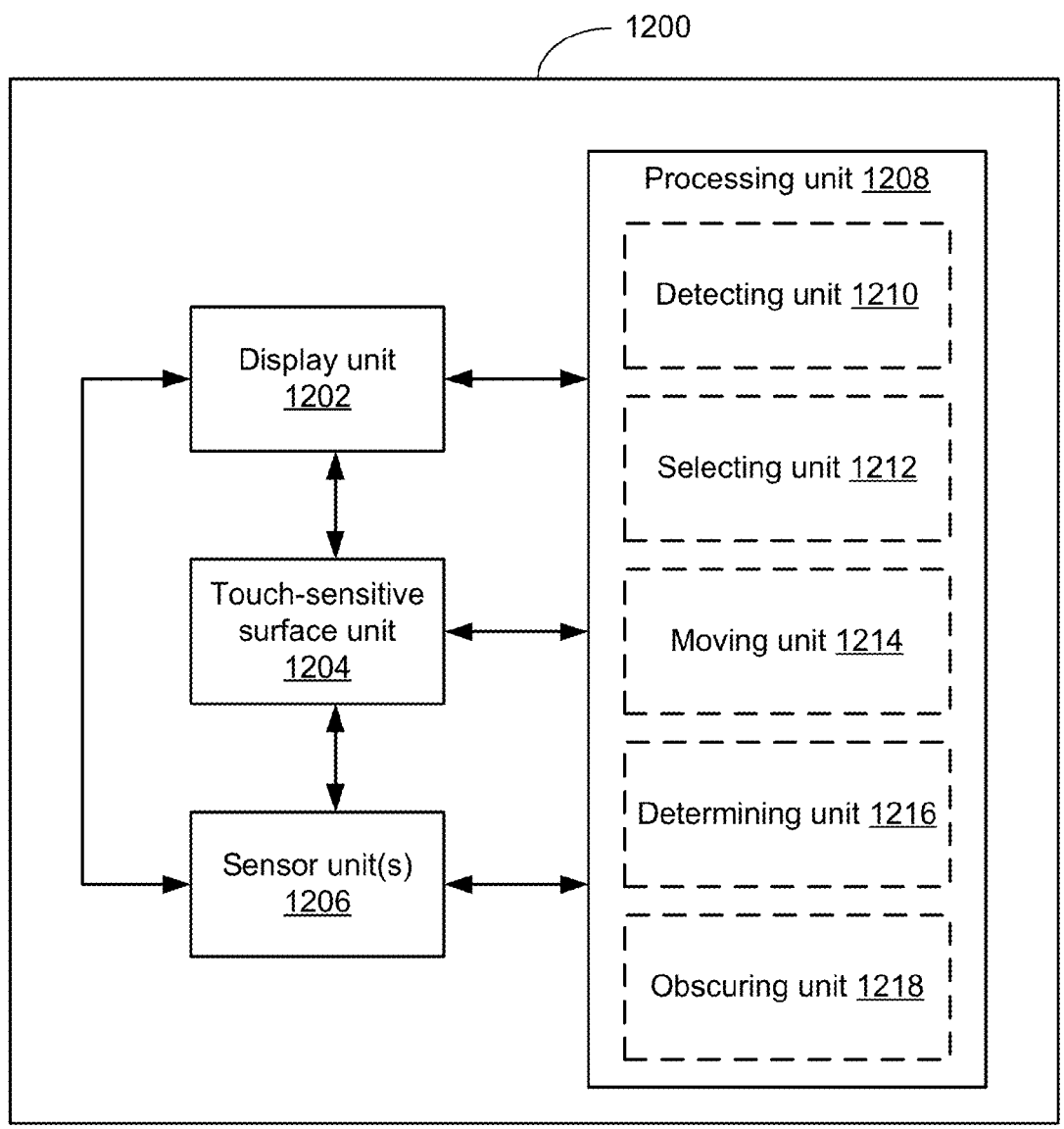
FIG. 12 is a functional block diagram of an electronic device in accordance with some embodiments.

In accordance with some embodiments, FIG. 12 shows a functional block diagram of an electronic device 1200 configured in accordance with the principles of the invention as described above. The functional blocks of the device may be implemented by hardware, software, or a combination of hardware and software to carry out the principles of the invention. It is understood by persons of skill in the art that the functional blocks described in FIG. 12 may be combined or separated into sub-blocks to implement the principles of the invention as described above. Therefore, the description herein may support any possible combination or separation or further definition of the functional blocks described herein.

In some embodiments, the electronic device 1200 includes a display unit 1202 configured to concurrently display an onscreen keyboard and a content presentation region on the display unit 1202, wherein the content presentation region displays text input received from the onscreen keyboard; a touch-sensitive surface unit 1204 configured to receive user touch inputs; one or more sensor units 1206 to detect intensity of contacts with the touch-sensitive surface unit 1204; and a processing unit 1208 coupled to the display unit 1202, the touch-sensitive surface unit 1204, and the one or more sensor units 1206. In some embodiments, the processing unit 1208 includes a detecting unit 1210, a determining unit 1216, an obscuring unit 1218, a moving unit 1214, and a selecting unit 1212.

The processing unit 1208 is configured to: detect a touch input on the onscreen keyboard displayed on the touch-sensitive surface unit 1204 (e.g., with the detecting unit 1210); in response to detecting the touch input on the onscreen keyboard displayed on the display unit 1202, determine whether the touch input satisfies one or more criteria for entering a text selection mode (e.g., with the determining unit 1216); and in accordance with a determination that the touch input satisfies the one or more criteria for entering the text selection mode: concurrently display (e.g., with the displaying unit 1202), in the content presentation region, a first cursor at a first location and a second cursor at a second location that is different from the first location.

In some embodiments, the one or more criteria for entering the text selection mode include the touch input including a two-finger drag gesture over the onscreen keyboard.

In some embodiments, the device has one or more sensor units 1206 to detect intensity of contacts with the touch-sensitive display; the touch input on the touch-sensitive display includes an input by a contact on the onscreen keyboard, and the one or more criteria for entering the text selection mode include the contact on the onscreen keyboard having an intensity that exceeds a predetermined deep press intensity threshold.

In some embodiments, the processing unit 1208 is configured to: in accordance with the determination that the touch input satisfies the one or more criteria for entering the text selection mode: visually obscure keys on the onscreen keyboard (e.g., with the obscuring unit 1218).

In some embodiments, visually obscuring the keys on the onscreen keyboard includes applying a blurring effect to the onscreen keyboard (e.g., with the display unit 1202).

In some embodiments, visually obscuring the keys on the onscreen keyboard includes transforming the onscreen keyboard into an onscreen touchpad (e.g., with the display unit 1202).

In some embodiments, visually obscuring the keys on the onscreen keyboard includes making the onscreen keyboard semitransparent to partially reveal content lying underneath the onscreen keyboard (e.g., with the display unit 1202).

In some embodiments, the second location is based on a location of an initial contact in the touch input; and the first location is a permitted insertion position in the content presentation region that is based on the second location.

In some embodiments, the first location is an insertion position at which the first cursor is located when the touch input is determined to satisfy the one or more criteria for entering the text selection mode; and the second location is displaced from the first location by a predetermined offset.

In some embodiments, one of the first and second cursors is already displayed in the content presentation region before both of the first and second cursors are concurrently displayed in the content presentation region.

In some embodiments, the processing unit 1208 is further configured to: detect movement of one or more contacts of the touch input (e.g., with the detecting unit 1210); and move the second cursor within the content presentation region in accordance with the movement of the one or more contacts of the touch input (e.g., with the moving unit 1214).

In some embodiments, the processing unit 1208 is further configured to: move the first cursor based on the movement of the second cursor, wherein movement of the first cursor includes discrete movements between permitted insertion positions in the content presentation region (e.g., with the moving unit 1214).

In some embodiments, the processing unit 1208 is further configured to: detect a lift-off of the touch input after detecting the movement of the one or more contacts of the touch input (e.g., with the detecting unit 1210); and in response to detecting the lift-off of the touch input: cease to display the second cursor (e.g., with the display unit 1202).

In some embodiments, the processing unit 1208 is further configured to: in response to detecting the lift-off of the touch input, maintain display of the first cursor at a respective permitted insertion position reached by the first cursor after the discrete movements of the first cursor (e.g., with the display unit 1202).

In some embodiments, the processing unit 1208 is further configured to: in response to detecting the lift-off of the touch input, cease to display the first cursor (e.g., with the display unit 1202).

In some embodiments, the onscreen keyboard is obscured in accordance with the determination that the touch input satisfies the one or more criteria for entering the text selection mode, and the processing unit 1208 is further configured to: in response to detecting the lift-off of the touch input, restore display of the onscreen keyboard (e.g., with the display unit 1202).

In some embodiments, the device has one or more sensor units 1206 to detect intensity of contacts with the touch-sensitive surface unit 1204, and the processing unit 1208 is further configured to: in the text selection mode, detect that an intensity of a contact in the touch input exceeds a predetermined intensity threshold (e.g., with the detecting unit 1210); after detecting that the intensity of the contact in the touch input exceeds the predetermined intensity threshold, detect movement of the contact in the touch input (e.g., with the detecting unit 1210); in response to detecting the movement of the contact in the touch input, after detecting that the intensity of the contact in the touch input exceeds the predetermined intensity threshold: select a portion of the text input in accordance with the movement of the contact in the touch input (e.g., with the selecting unit 1212).

In some embodiments, the selected portion of the text input begins at a position of the first cursor when the detected intensity of the contact in the touch input exceeded the predetermined intensity threshold.

In some embodiments, the processing unit 1208 is further configured to: detect lift-off of the contact in the touch input after selecting the portion of the text input in accordance with the movement of the contact in the touch input (e.g., with the detecting unit 1210); and, in response to detecting the lift-off of the contact in the touch input, confirm selection of the portion of the text input (e.g., with the selecting unit 1212).

In some embodiments, the processing unit 1208 is further configured to: after selecting the portion of the text input, while the portion of the text input is selected, detect an intensity of the contact in the touch input that exceeds the predetermined threshold (e.g., with the detecting unit 1210); and, in response to detecting the intensity of the contact in the touch input that exceeds the predetermined threshold while the portion of the text input is selected, clear selection of the portion of the text input (e.g., with the selecting unit 1212).

In some embodiments, the processing unit 1208 is further configured to: after selecting the portion of the text input, while the portion of the text input is selected, detect an intensity of the contact in the touch input that exceeds the predetermined threshold and that is followed by lift-off of the contact without further movement of the contact (e.g., with the detecting unit 1210); and, in response to detecting the intensity of the contact in the touch input that exceeds the predetermined threshold and that is followed by lift-off of the contact without further movement of the contact, confirm selection of the portion of the text input (e.g., with the selecting unit 1212).

In some embodiments, the processing unit 1208 is further configured to: after selecting the portion of the text input, while the portion of the text input is selected, detect an intensity of the contact in the touch input that exceeds the predetermined threshold and that is followed by further movement of the contact (e.g., with the detecting unit 1210); and, in response to detecting the intensity of the contact in the touch input that exceeds the predetermined threshold and that is followed by the further movement of the contact: clear selection of the portion of the text input (e.g., with the selecting unit 1212).

In some embodiments, the processing unit 1208 is further configured to: in response to detecting the intensity of the contact in the touch input that exceeds the predetermined threshold and that is followed by the further movement of the contact: start selection of a new portion of the text input in accordance with the further movement of the contact (e.g., with the selecting unit 1212).

In some embodiments, the processing unit 1208 is further configured to: in response to detecting the intensity of the contact in the touch input that exceeds the predetermined threshold and that is followed by the further movement of the contact: further move the second cursor and the first cursor within the content presentation region in accordance with the further movement of the contact (e.g., with the moving unit 1214).

In some embodiments, the device has one or more sensor units (1206) to detect intensity of contacts with the touch-sensitive display, and the processing unit 1208 is further configured to: in the text selection mode, detect a first local intensity peak in the touch input followed by a second local intensity peak in the touch input that both exceed a predetermined intensity threshold (e.g., with the detecting unit 1210); and, in response to detecting the first local intensity peak followed by the second local intensity peak that both exceed the predetermined intensity threshold, select a first predetermined unit of the text input according to a current location of the first cursor (e.g., with the selecting unit 1212).

In some embodiments, the processing unit 1208 is further configured to: after detecting the first local intensity peak followed by the second local intensity peak, detect a third consecutive local intensity peak in the touch input that exceeds the predetermined intensity threshold (e.g., with the detecting unit 1210); and in response to detecting the three consecutive local intensity peaks in the touch input that all exceed the predetermined deep press intensity threshold, select a second predetermined unit of the text input that is larger than and includes the first predetermined unit of the text input (e.g., with the selecting unit 1212).

In some embodiments, the electronic device 1200 includes a display unit 1202 configured to, while a contact is detected on the touch-sensitive surface unit 1204, concurrently display on the display unit 1202 content and a text selection indicator at a first location within the content; a touch-sensitive surface unit 1204 configured to receive user contacts; one or more sensor units 1206 to detect intensity of contacts with the touch-sensitive surface unit 1204; and a processing unit 1208 coupled to the display unit 1202, the touch-sensitive surface unit 1204, and the one or more sensor units 1206. In some embodiments, the processing unit 1208 includes a detecting unit 1210, a determining unit 1216, an obscuring unit 1218, a moving unit 1214, and a selecting unit 1212.

The processing unit 1208 is configured to: detect a first press input by the contact followed by movement of the contact across the touch-sensitive surface unit 1204 that corresponds to movement of at least a portion of the text selection indicator from the first location to a second location on the display unit 1202 (e.g., with the detecting unit 1210); in response to detecting the first press input by the contact followed by movement of the contact across the touch-sensitive surface unit 1204, select content between the first location and the second location (e.g., with the selecting unit 1212); while the content between the first location and the second location is selected, detect a second press input by the contact on the touch-sensitive surface unit 1204 (e.g., with the detecting unit 1210); in response to detecting the second press input by the contact on the touch-sensitive surface unit, perform a text selection operation, associated with the content between the first location and the second location, in accordance with the second press input, wherein the contact in the first press input, the movement across the touch-sensitive surface unit 1204, and the second press input is a single continuous contact with the touch-sensitive surface unit 1204 (e.g., with the selecting unit 1212).

In some embodiments, detecting the first press input by the contact followed by movement of the contact across the touch-sensitive surface unit 1204 includes: detecting an increase in intensity of the contact above a predetermined intensity threshold followed by detecting a decrease in intensity of the contact to an intensity that remains above a predetermined minimum intensity value (e.g., with the detecting unit 1210).

In some embodiments, the processing unit 1208 is configured to: in response to detecting the first press input by the contact followed by movement of the contact across the touch-sensitive surface unit 1204: display at least the portion of the text selection indicator at the second location within the content (e.g., with the display unit 1202).

In some embodiments, wherein the text selection operation includes stopping selection of content at the second location and maintaining selection of the content between the first location and the second location (e.g., with the selecting unit 1212).

In some embodiments, the processing unit 1208 is configured to: after detecting the second press input and while the content between the first location and the second location remains selected, detect lift-off of the contact (e.g., with the detecting unit 1210); and in response to detecting the lift-off of the contact, display an action menu for the selected content between the first location and the second location (e.g., with the display unit 1202).

In some embodiments, the processing unit 1208 is configured to: after detecting the second press input by the contact on the touch-sensitive surface unit 1204 and stopping the selection of the content at the second location, detect further movement of the contact (e.g., with the detecting unit 1210); and in response to detecting the further movement of the contact, display at least a portion of the text selection indicator at a third location within the content (e.g., with the display unit 1202).

In some embodiments, the processing unit 1208 is configured to: in response to detecting the further movement of the contact, cancel selection of content between the first location and the second location without selecting content between the second location and the third location (e.g., with the selecting unit 1212).

In some embodiments, the text selection operation includes cancelling selection of content between the first location and the second location.

In some embodiments, the processing unit 1208 is configured to: after detecting the second press input by the contact on the touch-sensitive surface unit and canceling the selection of content between the first location and the second location, detect further movement of the contact (e.g., with the detecting unit 1210); and, in response to detecting the further movement of the contact, select content between the second location and a third location (e.g., with the selecting unit 1212).

In some embodiments, the processing unit 1208 is configured to: while the content between the second location and the third location is selected, detect lift-off of the contact (e.g., with the detecting unit 1210); and, in response to detecting the lift-off of the contact while the content between the second location and the third location is selected, stop selection of the content at the third location and maintaining selection of the content between the second location and the third location (e.g., with the selecting unit 1212).

In some embodiments, the processing unit 1208 is configured to: before displaying the text selection indicator at the first location within the content, detect an initial press input by the contact on the touch-sensitive surface unit 1204 (e.g., with the detecting unit 1210); and in response to detecting the initial press input, enable display of the text selection indicator at an initial location within the content that corresponds to a location of the initial press input on the touch-sensitive surface unit 1204.

In some embodiments, the display unit 1202 is a touch-sensitive display that includes the touch-sensitive surface unit 1204, and the processing unit 1208 is configured to: concurrently display, on the touch-sensitive display, the content and an onscreen keyboard, wherein the initial press input is detected on the onscreen keyboard.

In some embodiments, the initial press input is detected at a location on the touch-sensitive surface unit 1204 that corresponds to a location of the content on the display unit 1202.

In some embodiments, the display unit 1202 is a touch-sensitive display that includes the touch-sensitive surface unit 1204, and the processing unit 1208 is configured to: concurrently enable display of, on the touch-sensitive display, the content and an onscreen keyboard; before displaying the text selection indicator at the first location within the content, detect a multi-contact drag input on the onscreen keyboard (e.g., with the detecting unit 1210); and, in response to detecting the multi-contact drag input on the onscreen keyboard, enable display of the text selection indicator at an initial location within the content based on a location of the multi-contact drag input on the onscreen keyboard.

In some embodiments, the content includes editable content and the text selection indicator includes a cursor.

In some embodiments, the processing unit 1208 is configured to: enable display of a magnifying loupe that displays a magnified version of the cursor and a region surrounding the cursor.

In some embodiments, selecting the content between the first location and the second location includes: moving the cursor one character space at a time in response to detecting the movement of the contact across the touch-sensitive surface unit 1204 (e.g., with the moving unit 1214); and selecting one additional character at a time in accordance with the movement of the cursor (e.g., with the selecting unit 1212).

In some embodiments, the content includes read-only content and the text selection indicator includes a selection area; and displaying the text selection indicator at the first location includes displaying a first word located at the first location within the selection area (e.g., with the display unit 1202).

In some embodiments, the processing unit 1208 is configured to: enable display of a magnifying loupe that displays a magnified version of the selection area and a region surrounding the selection area.

In some embodiments, selecting the content between the first location and the second location includes: expanding the selection area one word at a time in accordance with the movement of the contact across the touch-sensitive surface unit 1204 (e.g., with the selecting unit 1212); and selecting one additional word at a time in accordance with the expansion of the selection area (e.g., with the selecting unit 1212).

In some embodiments, the processing unit 1208 is configured to: forego performing the text selection operation, in response to detecting the second press input, in accordance with a determination that the second press input is accompanied by simultaneous movement of the contact across the touch-sensitive surface unit 1204.

In some embodiments, when the text is editable text, the text selection indicator is a cursor and selecting content between the first location and the second location includes expanding the selection character-by-character in accordance with movement of the contact on the touch-sensitive surface unit 1204 (e.g., with the selecting unit 1212); and when the text is non-editable text, the text selection indicator is a selection region that initially encompasses a single word and selecting content between the first location and the second location includes expanding the selection word-by-word in accordance with movement of the contact on the touch-sensitive surface unit 1204 (e.g., with the selecting unit 1212).

Figure 13E:
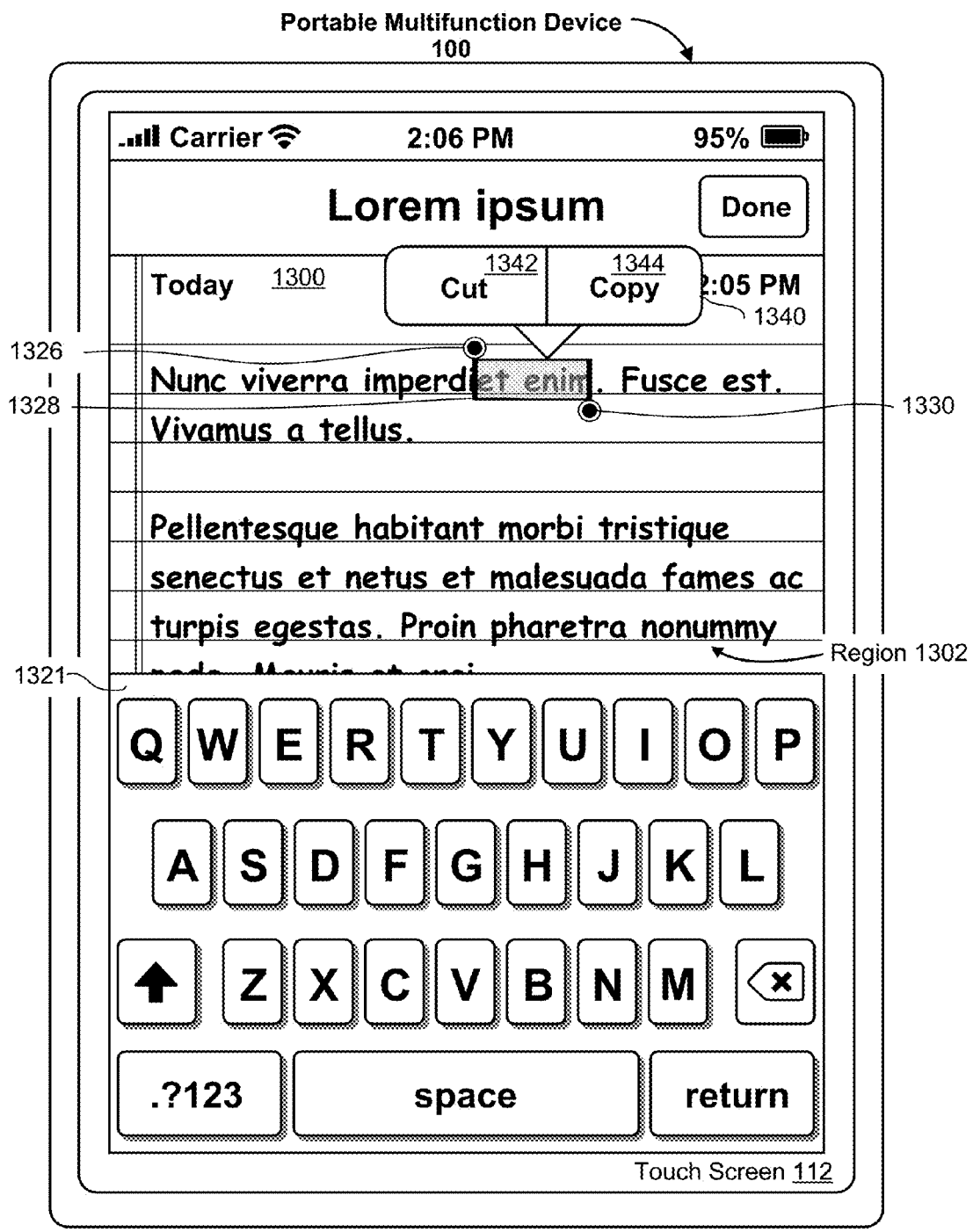
Figure 13H:
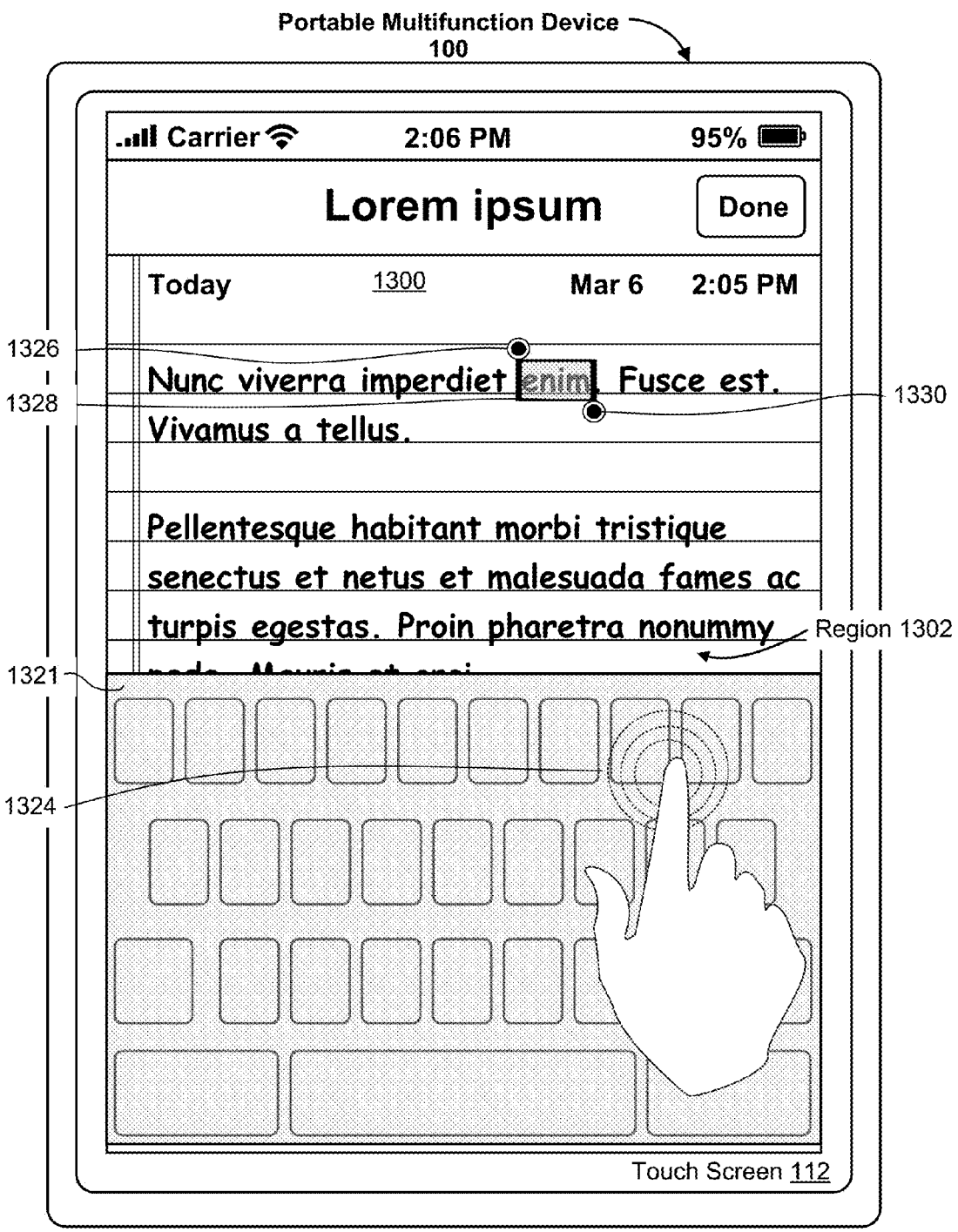
Figure 13I:
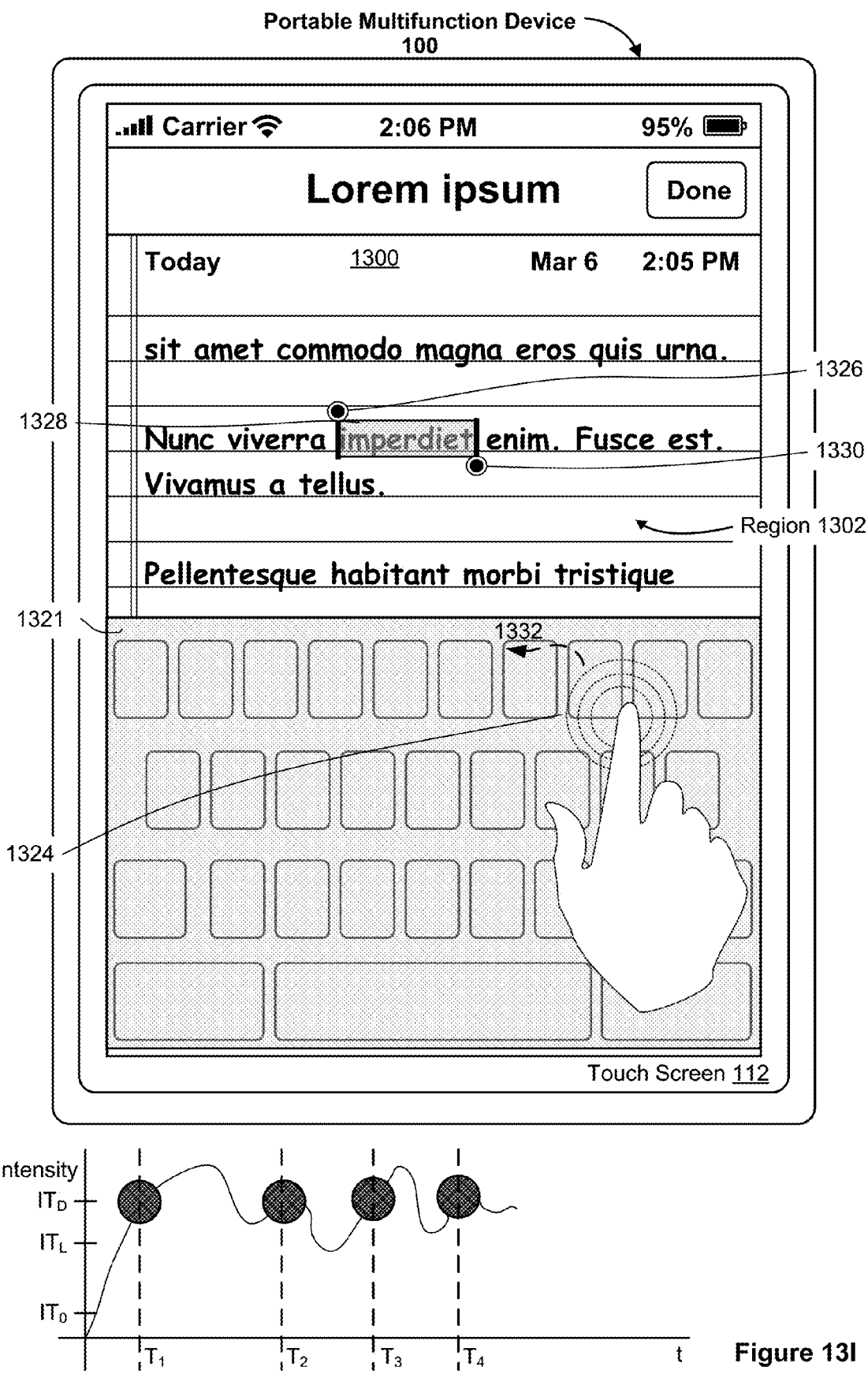
Figure 13K:
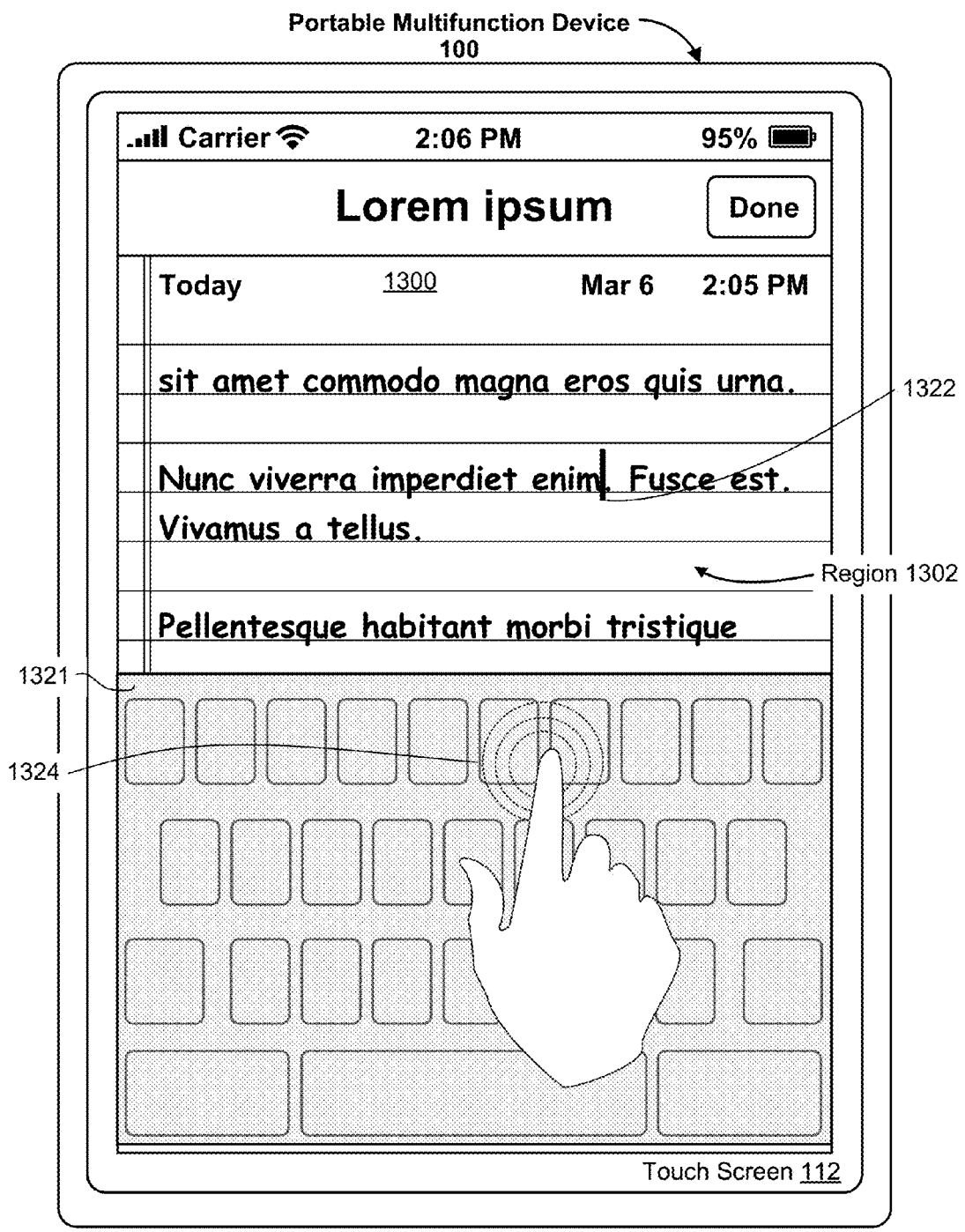
Figure 13M:
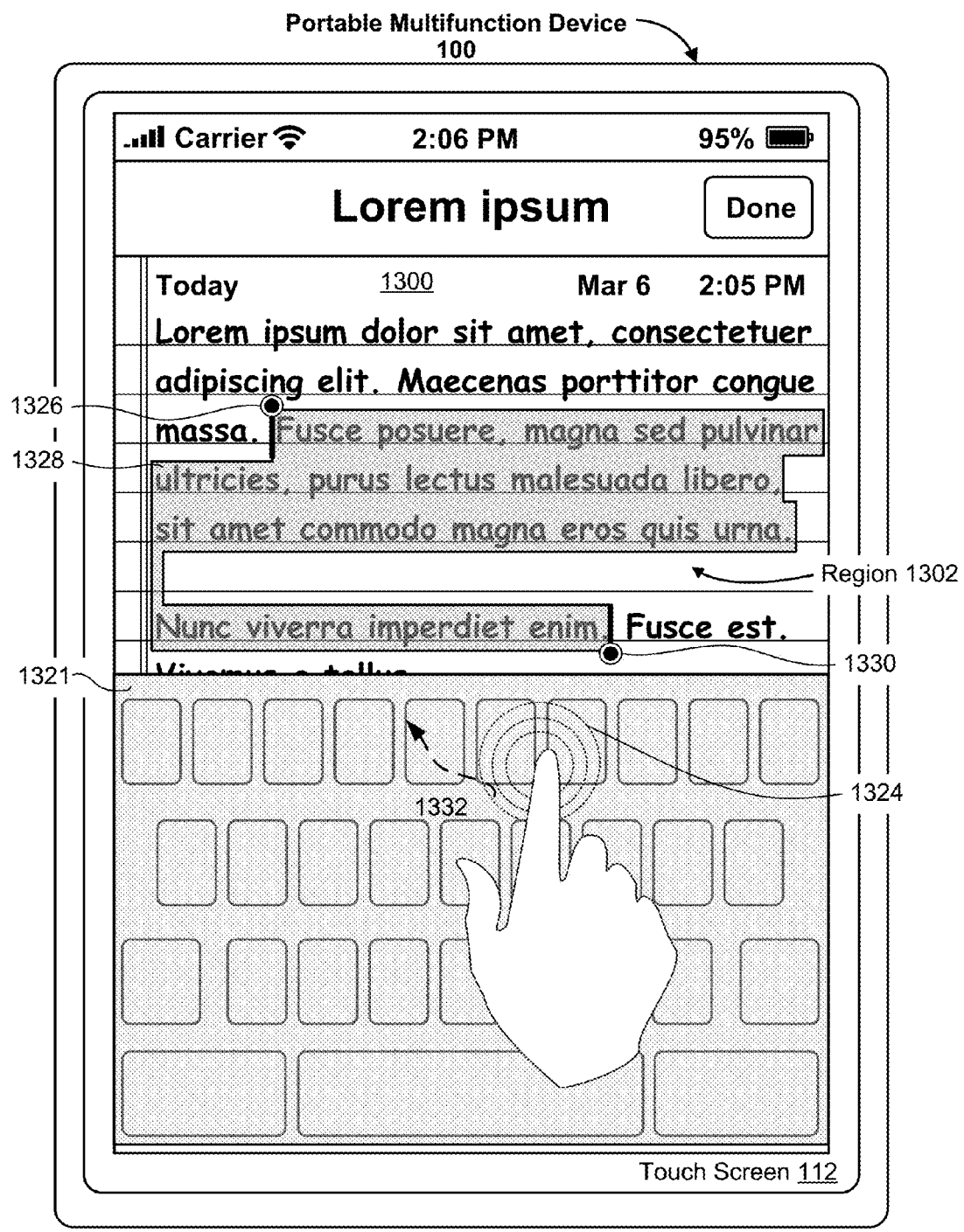
Figure 13N:
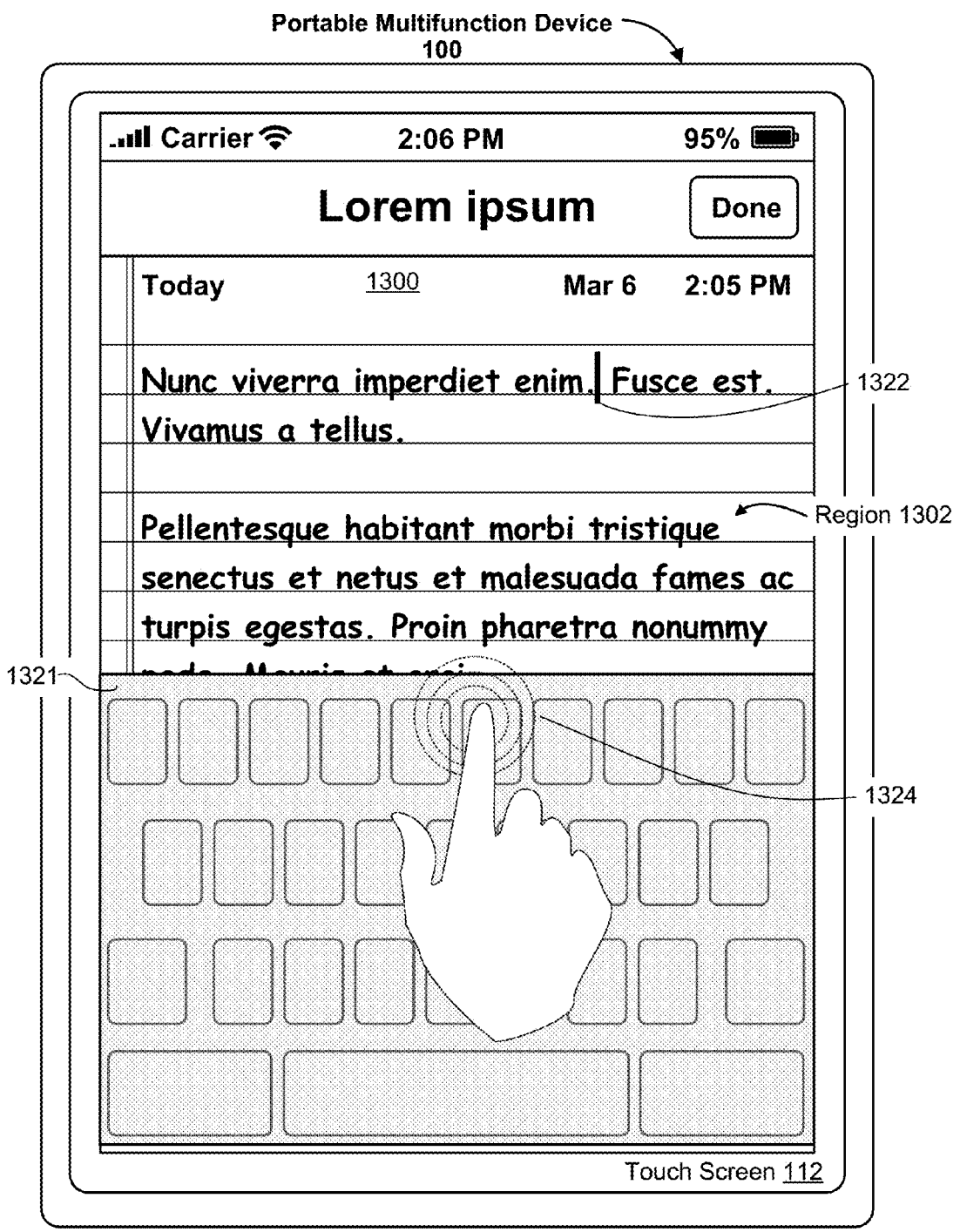
Figure 13Q:
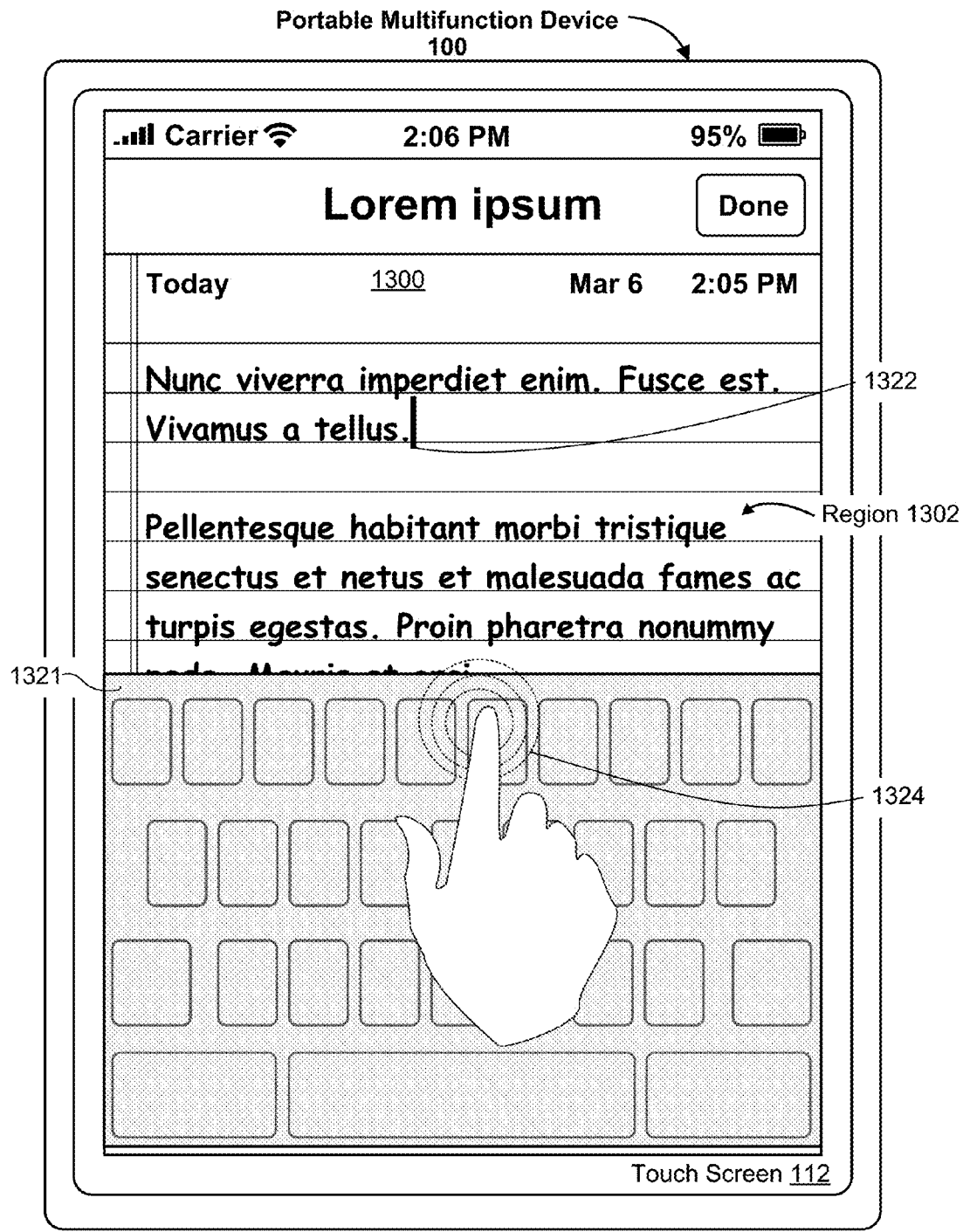

Turning to FIGS. 13A-13Q, these figures illustrate exemplary user interfaces for selecting content, moving a text selection indicator, and changing keyboard appearance based on contact intensity (e.g., pressure), in accordance with some embodiments. The user interfaces in these figures are used to illustrate the processes described below with respect to FIGS. 14A-14H. FIGS. 13A-13Q include intensity versus time diagrams that show the variations of a characteristic intensity of the contact on the touch-sensitive surface relative to a plurality of intensity thresholds (e.g., "$IT_D$", "$IT_L$", and "$IT_0$").

In FIG. 13A, editable content 1300 is displayed in a content presentation region 1302 while an application is in a document editing mode. The application runs on a device 100 that has one or more sensors (e.g., contact intensity sensor(s) 259, FIG. 2B) to detect intensity of contacts with the touch-sensitive display. In the document editing mode, an onscreen keyboard 1321 is displayed for text inputs. A user may enter text by touch inputs (e.g., by contact) on the onscreen keyboard 1321 and confirm completion of the editing by performing another touch input (e.g., a tap on "done" button) to exit the editing mode. An insertion marker (e.g., cursor 1322) is displayed to indicate a current location for text inputs.

When entering text into the content region 1302, a character can be entered upon detecting a touchdown or liftoff event. In some embodiments, entering the text into the content region 1302 includes entering a character that corresponds to character key at a location at which touchdown of the contact was detected on the onscreen keyboard. For example, touchdown of the finger contact 1324 was detected on the character key "h". In response to detecting the touchdown, character "h" is entered. In some embodiments, entering the text into the content region includes entering a character that corresponds to character key at a location at which liftoff of the contact was detected on the onscreen keyboard. For example, in response to liftoff of the finger contact 1324 from character key "h", character "h" is entered.

In FIG. 13B, at time $T_1$, while in the editing mode and displaying the keyboard 1321, the device detects a deep press by a finger contact 1324 on the onscreen keyboard 1321, such that the intensity of the press input has increased above a text selection intensity threshold (e.g., $IT_D$) before the movement of the contact is detected. In response to detecting the deep press, the appearance of the keyboard 1321 changes to indicate that the application has entered a text selection mode. In the text selection mode, the keyboard 1321 is not responsive to keystrokes, but rather serves as an onscreen touchpad or track pad for moving the cursor or selecting content.

In some embodiments, the press input is a stationary press input such that there is less than a threshold amount of movement between when touchdown of the finger contact 1324 is detected on the onscreen keyboard 1321 and when the increase in the characteristic intensity of the contact over the text selection intensity threshold $IT_D$ is detected. In some embodiments, if more than the threshold amount of movement is detected, upon liftoff, a character entry operation is performed based on which character entry key the contact is over when liftoff of the contact is detected.

As shown in FIG. 13B, in some embodiments, the keys are visually obscured. Visually obscuring keys on the keyboard 1321 provides an intuitive indication that the function of the keyboard 1321 has changed. In some embodiments, the onscreen keyboard 1321 is dimmed, faded, or blurred relative to the keyboard 1321 shown in FIG. 13A prior to detecting the deep press, such that the keys are no longer visible or clearly displayed as before. In some embodiments, as shown in FIG. 13B, an indication of a location of the keys is maintained while the appearance of the characters is obscured (e.g., by maintaining display of the shapes of some or all of the keys on the keyboard while removing or blurring the characters on the key caps) and three-dimensional characteristics (e.g., a three-dimensional shape, drop shadow, etc.) of some or all of the keys are no longer visible. In some embodiments, the keyboard 1321 becomes semitransparent, to reveal content lying underneath the keyboard.

When the keyboard 1321 serves as an onscreen touch pad or track pad, in response to detecting finger movement 1332 started on the keyboard 1321, text selection operations such as moving the cursor 1322 as shown in FIG. 13B within the content region 1302 or selecting text within the content region 1302 as shown in FIGS. 13D-13Q are performed. For example, after entering the text selection mode, upon detecting movement of the finger contact 1324 along a path 1332, which started from the keyboard region 1321, extended to the content region 1302, and returned back to the keyboard region 1321, the cursor 1322 is moved along a similar path in accordance with the movement of the finger contact 1324. In some embodiments, in response to detecting movement of the contact after the touch input has satisfied the text selection criteria, instead of displaying cursor 1322 and cursor movement, a ghost cursor and a floating cursor are displayed, and the floating cursor is moved along a similar path in accordance with the movement of the finger contact 1324 as shown in FIGS. 9B-9D and described in greater detail above.

FIGS. 13C-13Q illustrate a variety of possible text selection behaviors that can occur after entering text selection mode (e.g., after time $T_1$), in accordance with some embodiments.

Turning to FIG. 13C, at the end of the text selection mode (e.g., detecting liftoff of the contact such that the intensity of the press input has fallen to zero), in response to detecting liftoff of the contact, the device exits the text selection mode of operation. In conjunction with the end of the text selection mode of operation, the device reverses the change in appearance of the onscreen keyboard 1321 to reveal the characters on the keys of the onscreen keyboard 1321. As shown in FIG. 13C, the device reverses a fading or blurring of the keyboard 1321 to indicate that the device is no longer in the text selection mode of operation. In some embodiments, three-dimensional characteristics (e.g., a three-dimensional shape, drop shadow, etc.) of some or all of the keys are restored, and the characters on the key caps are displayed.

In FIG. 13D, continuing the example shown in FIG. 13B, while in the text selection mode, at time $T_2$, when a cursor is located in the middle of the word "imperdiet" (not shown in FIG. 13D), the device detects a portion of the touch input (e.g., a second deep press with the same contact 1324), such that the touch input satisfies selection-start criteria, which include a criterion that is met when the characteristic intensity of the contact increases above a selection-start intensity threshold. In some embodiments, the selection-start intensity threshold is the same as, greater than, or less than the text selection intensity threshold (e.g., $IT_D$) before the movement of the contact is detected. For illustration purpose, the selection-start intensity threshold is shown in FIG. 13D as $IT_D$.

In response to detecting the second deep press by the same contact on the onscreen keyboard 1321 at time $T_2$, the device begins to select a portion of the text input 1328 in accordance with the movement 1332 of the contact in the touch input. After time $T_2$, during the movement 1332, the intensity of the contact can be above or below the selection-start intensity threshold $IT_D$. In some embodiments, the text selection starts when an increase in intensity of the contact is detected while the contact is substantially stationary (e.g., moves not more than a threshold distance within a threshold amount of time before the characteristic intensity of the contact increases above the selection-start intensity threshold).

In FIG. 13E, at time $T_3$, the device detects lift-off of the contact in the touch input, such that the intensity of the contact is below a contact detection threshold. In response to detecting the lift-off of the contact, in some embodiments, the device confirms selection of the portion of the text input 1328. In some embodiments, a selection box 1328 (e.g., a grey box) is displayed on the selected portion of the text input, and/or a menu bar 1340 is displayed that showing actions that can be performed on the selected portion of the text input (e.g., copying 1344, defining, cutting 1342, pasting, etc.). In some embodiments, the menu bar 1340 is displayed in response to a touch input on the selection box 1328. Thus, FIGS. 13D and 13E illustrate using a substantially stationary deep press input by a contact 1324 to initiate text selection at time $T_2$, then movement of the contact to select text, followed by lift-off of the contact to confirm the selection at time $T_3$.

In FIG. 13F, continuing the example shown in FIG. 13D, instead of detecting a lift-off of the contact, after time $T_2$ and while continuing to detect the contact 1324 on the touch-sensitive display 112, the device detects a subsequent change in intensity of the contact (e.g. a substantially stationary deep press with the same contact) at time $T_3$. Upon detecting the substantially stationary deep press at time $T_3$, in accordance with a determination that the change in intensity of the contact satisfies selection-cancellation criteria, the device cancels the selection (e.g., deselecting the selected content and redisplaying the cursor). In some embodiments, as shown in FIG. 13F, upon the selection cancellation, the cursor 1322 is displayed at the end of the selection (e.g., at the end of the word "enim"). In some embodiments, upon cancelling the selection, the cursor 1322 is displayed at the beginning of the selection.

In some embodiments, the selection-cancellation criteria include a criterion that is met when the characteristic intensity of the contact increases above a selection-cancellation intensity threshold (e.g., a threshold that is the same as, greater than, or less than the text-selection intensity threshold and/or the selection-start intensity threshold). For illustration purpose, the selection-cancellation intensity threshold shown in FIG. 13F is the same as the text-selection intensity threshold and the selection-start intensity threshold $IT_D$. In some embodiments, the selection-cancellation criteria are met when an increase in intensity of the contact is detected while the contact is substantially stationary (e.g., the contact 1324 moves no more than a threshold distance within a threshold amount of time before the characteristic intensity of the contact increases above the selection-cancellation intensity threshold).

In FIG. 13G, following the substantially stationary deep press at time $T_3$ to cancel the selection and redisplay the cursor at the end of the word "enim", while continuing to detect the contact on the touch-sensitive display 112 after time $T_3$, the device detects a subsequent change in the intensity of the contact at time $T_4$. In response to detecting the subsequent change in the characteristic intensity of the contact and in accordance with a determination that the touch input (e.g., the subsequent change in the characteristic intensity of the contact at time $T_4$) satisfies the selection-start criteria described above with respect to FIG. 13D, the device starts a new selection of content in the content region 1302 in accordance with the finger movement 1332. The new selection starts at the end of the word "enim", where the cursor 1332 was located when the deep press was detected at time $T_4$, and expands character by character in accordance with the finger movement 1332. Thus, FIGS. 13D, 13F, and 13G illustrate a first deep press by a contact 1324 to initiate a text selection at time $T_2$, then movement of the contact 1324 to select text, followed by a second deep press with the same contact at time $T_3$ to cancel the text selection and display a cursor at the end of the selection, and a third deep press with the same contact at time $T_4$ to restart a new text selection.

In some embodiments, continuing the example shown in FIG. 13F, the new text selection includes a selection of a respective word. When the third subsequent change detected at time $T_4$ includes an increase in the characteristic intensity of the contact above the selection-start intensity threshold, a word is selected at the location of the cursor. For example, in FIG. 13F, after the selection cancellation at time T3, the cursor 1332 is located at the end of the word "enim". Subsequently, as shown in FIG. 13H, the word "enim" is selected at the location of the cursor in response to detecting a deep press at time $T_4$.

In FIG. 13H, the deep press by contact 1324 is substantially stationary. Alternatively, in some embodiments, when the third subsequent change in the touch input includes an increase in the characteristic intensity of the contact above the selection-start intensity threshold followed by movement of the contact, selection is started at the location of the cursor and expanded character by character in accordance with the movement of the contact; and in response to a subsequent increase in the characteristic intensity of the contact above a respective intensity threshold (e.g., the selection-start intensity threshold) within a threshold time, the current selection is expanded to include the entire word that was partially selected during the character-by-character expansion.

In FIG. 13I, continuing the example shown in FIG. 13H, while the respective word "enim" is selected, a subsequent finger movement 1332 is detected after time $T_4$. In response to detecting the subsequent finger movement 1332 while the respective word "enim" is selected, in accordance with a determination that the touch input meets selection-movement criteria, the selection of the first word "enim" is canceled, and a second word "imperdiet" is selected that is adjacent to the first word in a first direction (e.g., before or after the respective word) in accordance with the subsequent finger movement 1332, such that the selected respective word is the second word "imperdiet". As shown in FIG. 13H, the subsequent finger movement 1332 is moving in a left/up direction. As a result, the word "imperdiet" that is before the word "enim" is selected. Conversely, in case a right/down finger movement is detected, a word after the word "enim" is selected.

In some embodiments, the selection-movement criteria include a movement criterion that is met when the contact moves more than a respective threshold amount (e.g., the contact is not substantially stationary and optionally a respective time criterion that is met when an amount of time between the third subsequent change in the characteristic intensity of the contact is detected and when the first subsequent movement of the contact is detected is less than a respective delay threshold). Thus, FIGS. 13H and 13I illustrate selecting a first word, cancels selection of the first word and selects a second word that is adjacent to a first word "enim" in a direction in accordance with the finger movement 1332.

In FIG. 13J, continuing the example shown in FIG. 13H, while the respective word "enim" is selected, a subsequent finger movement 1332 is detected. In response to detecting the subsequent finger movement 1332 while the respective word "enim" is selected, in accordance with a determination that the touch input meets selection-expansion criteria at time $T_4$, the device expands the selection of the respective word "enim" to include a word "imperdiet" that is adjacent to the word "enim" in a direction of the finger movement 1332 (e.g., before or after the respective word "enim") without selecting one or more words in the respective sentence "Numc viverra imperdiet enim." that are adjacent to the respective word "enim" in the respective sentence in a direction that is different from the direction of the finger movement 1332. In other words, the expansion only goes in the direction corresponding to the finger movement 1332, and does not expand to include words in the reverse direction of the movement (e.g., as distinguished from expansion to select the whole sentence or more described below with respect to FIGS. 13K-13Q). In some embodiments, the selection expansion criteria include a criterion that is met when the contact moves more than the threshold amount (e.g., that the contact has remained stationary for at least a threshold amount of time prior to detecting the increase in intensity and that the increase in intensity was detected less than a threshold amount of time after detecting the third subsequent change in the characteristic intensity of the contact). Thus, FIGS. 13H and 13J illustrate selecting a word "enim" and expanding the selection word by word in a direction in accordance with the finger movement 1332.

In FIG. 13K, continuing the example shown in FIG. 13H, while the respective word "enim" is selected, the device detects another subsequent change in the intensity of the contact above a respective intensity threshold (e.g., the selection-cancellation intensity threshold) at time $T_5$. The touch input 1324 meets selection-cancellation criteria described above with respect to FIG. 13F, the device cancels selection of the respective sentence and displays the cursor 1332 at the end of the selection. Thus, FIGS. 13H and 13K illustrate a deep press to select a word at time $T_4$ followed by another deep press at time $T_5$ to cancel the selection.

In FIG. 13L, continuing the example shown in FIG. 13H, while the respective word "enim" is selected, the device detects another subsequent change in the intensity of the contact above a respective intensity threshold (e.g., the selection-start intensity threshold) at time $T_5$, such that the touch input 1324 meets sentence-selection criteria, e.g., the contact is substantially stationary before (e.g., just before) the subsequent change in intensity of the contact was detected at time $T_5$ and the amount of time between $T_4$, when the previous subsequent change in the characteristic intensity of the contact is detected, and $T_5$, when the subsequent change in the characteristic intensity of the contact is detected, is less than a delay threshold. In response to detecting such change in the touch input at time $T_5$. (e.g., in response to detecting the subsequent change in the intensity of the contact at time $T_5$), the device expands the selection 1328 to include the (entire) respective sentence "Nunc viverra imperdiet enim." that contains the respective word "enim". Thus, FIGS. 13H and 13L illustrate a deep press at time $T_4$ to select a word followed by another deep press at time $T_5$ within a threshold time and while the contact remains substantially stationary, to expand the selection to a sentence containing the selected word.

In FIG. 13M, while the respective sentence "Nunc viverra imperdiet enim." is selected, the device detects a subsequent movement of the contact 1332. In response to detecting the subsequent movement of the contact 1332 while the respective sentence is selected and in accordance with a determination that the touch input meets selection-expansion criteria described above with respect to FIG. 13J, the device expands the selection to include a sentence that is adjacent to the respective sentence in a first direction (e.g., before or after the respective sentence) in accordance with the subsequent movement of the contact (e.g., the expansion of the selection does not select one or more sentences in a respective paragraph that includes the respective sentence, that are adjacent to the respective sentence in the respective paragraph in a second direction that is different from the first direction). In other words, the expansion to include the sentence "Fusce posuere, magna sed pulvinar ultricies, punts lectus malesuada libero, sit amet commodo magna eros quis urna." only goes in the direction corresponding to the movement of the contact 1332, and does not expand to include in the reverse direction of the movement (e.g., as distinguished from expansion to select the whole paragraph or more described below). Thus, FIGS. 13L and 13M illustrate after a sentence selection at time $T_5$, expanding the selection sentence by sentence in a direction in accordance with the finger movement 1332.

In FIG. 13N, continuing the example shown in FIG. 13L, in some embodiments, while the respective sentence "Nunc viverra imperdiet enim." is selected, the device detects a subsequent change in the characteristic intensity of the contact above the respective intensity threshold (e.g., the selection-start intensity threshold) at time $T_6$. In response to detecting the subsequent change in the characteristic intensity of the contact at time $T_6$, in accordance with a determination that the touch input meets the selection-cancellation criteria described above with respect to FIG. 13F, the device cancels selection of the respective sentence and displays the cursor 1322 at the end of the selection. Thus, FIGS. 13L and 13M illustrate after a deep press to select a sentence at time $T_5$, in response to another deep press at time $T_6$ (which is more than a threshold amount of time after $T_5$), the sentence selection is cancelled.

In FIG. 13O, following the deep press at time $T_5$, the device detects a subsequent change in the characteristic intensity of the contact above the respective intensity threshold (e.g., the selection-start intensity threshold) at time $T_6$. In response to detecting the subsequent change in the characteristic intensity of the contact at time $T_6$, in accordance with a determination that the touch input 1324 (e.g., the subsequent change in the characteristic intensity of the contact detected at time $T_6$) meets paragraph-selection criteria (e.g., the paragraph-selection criteria include a movement criterion that is met when the contact moves less than the threshold amount within the threshold time period (e.g., is substantially stationary) before (e.g., just before) the subsequent change in intensity of the contact was detected at $T_6$ and a time criterion that is met when an amount of time between when the deep press is detected at time $T_5$ and when the subsequent change in the characteristic intensity of the contact is detected at time $T_6$ is less than the delay threshold), the device expands the selection to include the (entire) respective paragraph that contains the respective sentence. Thus, FIGS. 13L and 13O illustrate after a deep press to select a sentence at time $T_5$, in response to detecting another deep press that meets paragraph-selection criteria, the sentence selection is expanded to a paragraph containing the sentence.

In FIG. 13P, continuing the example shown in FIG. 13O, while the respective paragraph is selected, the device detects subsequent movement of the contact 1332 after time $T_6$. In response to detecting the subsequent movement of the contact while the respective paragraph is selected, in accordance with a determination that the touch input (e.g., the movement detected at time $T_6$) meets selection-expansion criteria described above with respect to FIG. 13J, the device expands the selection to include a paragraph that is adjacent to the respective paragraph in a first direction (e.g., before or after the respective paragraph) in accordance with the subsequent movement of the contact 1332.

For example, in FIG. 13P, the expansion of the selection does not select one or more paragraph in a respective document that includes the respective paragraph, that are adjacent to the respective paragraph in the respective document in a second direction that is different from the first direction. In other words, the expansion only goes in the direction corresponding to the movement of the contact, and does not expand to include in the reverse direction of the movement (e.g., as distinguished from expansion to select the whole document described below). Thus, FIGS. 13O and 13P illustrate after a paragraph selection, expanding the selection paragraph by paragraph in a direction in accordance with the finger movement 1332.

In FIG. 13Q, continuing the example shown in FIG. 13O, while the respective paragraph is selected, the device detects a subsequent change in the characteristic intensity of the contact above the respective intensity threshold (e.g., the selection-start intensity threshold) at time $T_7$. In response to detecting the subsequent change in the characteristic intensity of the contact at time $T_7$, in accordance with a determination that the touch input (e.g., the subsequent change in the characteristic intensity of the contact at $T_7$) meets selection-cancellation criteria (e.g., the deep press detected at $T_7$ is more than a threshold amount of time after the deep press detected at $T_6$) described above with respect to FIG. 13F, the device cancels selection of the respective paragraph. Thus, FIGS. 13O and 13Q illustrate after a paragraph selection, in response to detecting a subsequent deep press that meets selection-cancellation criteria, cancelling the paragraph selection.

Though not shown in figures, continuing the example shown in FIG. 13O, while the respective paragraph is selected, the selected paragraph can be expanded to the entire document that contains the selected paragraph in response to detecting a subsequent deep press at $T_7$ after time $T_6$. The subsequent deep press is a subsequent change in the characteristic intensity of the contact such that the subsequent change meets document-selection criteria, which include a movement criterion that is met when the contact moves less than the threshold amount within the threshold time period (e.g., is substantially stationary) before (e.g., just before) the subsequent deep press was detected, and a time criterion that is met when an amount of time between when the deep press is detected at time $T_6$ and when the subsequent deep press is detected at $T_7$ is less than the delay threshold.

FIGS. 14A-14H illustrate a flow diagram of method 1400 of content manipulation in accordance with some embodiments. Method 1400 is performed at an electronic device (e.g., portable multifunction device 100, FIG. 1A) with one or more processors, memory, and a display. In some embodiments, the display is a touch-screen display and the touch-sensitive surface is on or integrated with the display. In some embodiments, the display is separate from the touch-sensitive surface. Some operations in method 1400 are, optionally, combined and/or the order of some operations is, optionally, changed.

As described below, method 1400 provides an efficient way to manipulate a cursor. The method reduces the cognitive burden on a user when using a cursor, thereby creating a more efficient human-machine interface. For battery-operated electronic devices, enabling a user to manipulate a cursor faster and more efficiently conserves power and increases the time between battery charges.

The device concurrently displays (1402) an onscreen keyboard (e.g., keyboard 1321, FIG. 13A) and a content presentation region (e.g., region 1302, FIG. 13A) on the touch-sensitive display. In some embodiments, the content presentation region displays text input received from the onscreen keyboard (FIG. 13A). The device further detects (1404) a touch input on the onscreen keyboard displayed on the touch-sensitive display (e.g., by finger contact 1324, FIG. 13A). In some embodiments, detecting the touch input includes detecting movement of a contact (e.g., FIGS. 13B and 13D etc.) and liftoff of the contact (e.g., FIGS. 13C and 13E).

In some embodiments, in response to detecting (1406) the touch input on the onscreen keyboard displayed on the touch-sensitive display, in accordance with a determination that the touch input satisfies text-selection criteria, the text-selection criteria include a criterion that is met when a characteristic intensity of the contact increases above a text-selection intensity threshold (e.g., a deep press with contact characteristic intensity increases above $IT_D$ at time $T_1$, FIG. 13B), the device performs (1408) a text selection operation based on the movement of the contact (FIGS. 13D-13Q). In some embodiments, the text-selection criteria include (1410) a criterion that is met when the contact does not move more than a threshold distance before detect an increase in the characteristic intensity of the contact above the text-selection intensity threshold (e.g., the finger contact 1324 is substantially stationary at time $T_1$, there is less than a threshold amount of movement between when touchdown of the contact 1324 is detected on the onscreen keyboard and when the increase in the characteristic intensity of the contact over the text-selection intensity threshold is detected at time $T_1$, FIG. 13B). In some embodiments, if more than the threshold amount of movement is detected, upon liftoff, a character entry operation is performed based on which character entry key the contact is over when liftoff of the contact is detected. In some embodiments, the text-selection operation includes (1412) one of: moving a cursor within the content region (as shown in FIG. 13B) or selecting text within the content region (e.g., as shown in FIGS. 13D-13Q).

In addition to text-selection operations, in response to detecting (1406) the touch input on the onscreen keyboard displayed on the touch-sensitive display and in accordance with a determination that the touch input satisfies text-entry criteria (e.g., as shown in FIG. 13A), the text-entry criteria include a criterion that is met when the characteristic intensity of the contact does not increase above the text-selection intensity threshold, the device enters (1414) text into the content presentation region based on the touch input (e.g., entering text when the contact characteristic intensity does not increase above $IT_D$, FIG. 13A). In some embodiments, the text-entry criteria include (1416) a criterion that is met when the liftoff of the contact is detected while the contact is at a location of a character key of the onscreen keyboard. In some embodiments, the text-entry criteria include (1418) a criterion that is met when the contact does not move outside of the onscreen keyboard before liftoff of the contact is detected. In some embodiments, entering the text into the content region includes (1420) entering a character that corresponds to character key at a location at which touchdown of the contact was detected on the onscreen keyboard (e.g., entering character "h" when a touchdown of the contact 1324 is detected, FIG. 13A). In some embodiments, entering the text into the content region includes (1422) entering a character that corresponds to character key at a location at which liftoff of the contact was detected on the onscreen keyboard (e.g., entering character "h" when a liftoff of the contact 1324 is detected, FIG. 13A).

In some embodiments, in response to detecting that the text-selection criteria have been met, the device generates (1424) a tactile output (e.g., with one or more tactile output generating components of the device, 167 in FIG. 2A and/or 257 in FIG. 2B) that is indicative of an entry into a text selection mode of operation. In some embodiments, the tactile output that is indicative of entry into the text selection mode of operation is different from the tactile output that is generated when a device alert such as a notification of an incoming message is provided by the device.

In some embodiments, in response to detecting that the text-selection criteria have been met, the device changes (1426) an appearance of the onscreen keyboard to indicate that the device is operating in a text selection mode of operation. In some embodiments, changing the appearance of the onscreen keyboard includes obscuring an appearance of characters on keys of the onscreen keyboard (e.g., blurring in FIG. 9N, fading, and/or removing the characters on the key caps in FIG. 13B). In some embodiments, an indication of a location of the keys is maintained while the appearance of the characters is obscured (e.g., by maintaining display of the shapes of some or all of the keys on the keyboard while removing or blurring the characters on the key caps and the drop shadows of the key caps, FIG. 13B). In some embodiments, the device ends (1428) the text selection mode of operation (e.g., detecting liftoff of the contact and, in response to detecting liftoff of the contact, exiting the text selection mode of operation, FIGS. 13C and 13E) and, in conjunction with the end of the text selection mode of operation, the device reverses the change in appearance of the onscreen keyboard to reveal the characters on the keys of the onscreen keyboard (e.g., reversing a fading, blurring of the keyboard to indicate that the device is no longer in the text selection mode of operation, FIGS. 13C and 13E).

In some embodiments, when the touch input satisfies the text-selection criteria, the device detects (1430) movement of the contact after the touch input has satisfied the text-selection criteria and moving a cursor (FIG. 13B) in the content region in accordance with the movement of the contact detected after the touch input has satisfied the text-selection criteria. In some embodiments, instead of displaying a cursor and moving the cursor, a ghost cursor and a floating cursor are displayed and moved in the content region in accordance with the movement of the contact, as described in greater detail above with respect to FIGS. 9B-9D.

In some embodiments, when the touch input satisfies the text-selection criteria, the device detects (1432) a first subsequent change (e.g., a deep press at time $T_2$, FIG. 13D) in the characteristic intensity of the contact (optionally, after first detecting a decrease in intensity of the contact to an intensity below the text-selection intensity threshold) followed by additional movement of the contact on the touch-sensitive display. In response to detecting (1434) the first subsequent change in the characteristic intensity of the contact and in accordance with a determination that the touch input satisfies selection-start criteria, the selection-start criteria include a criterion that is met when the characteristic intensity of the contact increases above a selection-start intensity threshold (e.g., a threshold that is the same as, greater than, or less than the text-selection intensity threshold $IT_D$ before the movement of the contact is detected, FIG. 13D), the device starts (1436) to select content in the content region at a location of a cursor in accordance with the additional movement of the contact (e.g., starting the selection at the location of the cursor and expand the selection character by character in accordance with the movement of the contact as shown in FIG. 13G; or start selection at the word at the location of the cursor, and expand the selection word by word in accordance with the movement of the contact as shown in FIGS. 13H and 13J). On the other hand, in accordance with a determination that the touch input does not satisfy the selection-start criteria, the device moves the cursor in accordance with the additional movement of the contact without starting to select content in the content region (FIG. 13B). In some embodiments, the selection-start criteria are met when an increase in intensity of the contact is detected while the contact is substantially stationary (e.g., moves not more than a threshold distance within a threshold amount of time before the characteristic intensity of the contact increases above the selection-start intensity threshold).

In some embodiments, when the touch input satisfies selection-start criteria, after starting to select content in the content region, the device detects (1438) liftoff of the contact from the touch-sensitive display and confirms the selection in response to detecting the liftoff of the contact (e.g., as shown in FIG. 13E).

Alternatively, when the touch input satisfies selection-start criteria, after starting to select content in the content region, and while continuing to detect the contact on the touch-sensitive display, the device detects (1440) a second subsequent change in intensity of the contact (e.g., a deep press at time $T_3$ in FIG. 13F). In response to detecting (1442) the second subsequent change in the characteristic intensity of the contact and in accordance with a determination that the second subsequent change in the characteristic intensity of the contact satisfies selection-cancellation criteria, the selection-cancellation criteria include a criterion that is met when the characteristic intensity of the contact increases above a selection-cancellation intensity threshold (e.g., a threshold that is the same as, greater than, or less than the text-selection intensity threshold and/or the selection-start intensity threshold $IT_D$), the device cancels (1444) the selection (e.g., deselecting the selected content and redisplaying the cursor, as shown in FIG. 13F). On the other hand, in response to detecting the second subsequent change in the characteristic intensity of the contact and in accordance with a determination that the second subsequent change in the characteristic intensity of the contact does not satisfy the selection-cancellation criteria (e.g., if the contact did not reach the selection-cancellation intensity threshold and/or the contact was not substantially stationary when the selection-cancellation intensity threshold was reached), the device maintains the selection (e.g., and expanding the selection or contracting the selection in accordance with continued movement of the contact on the touch-sensitive display, as shown in FIG. 13D). In some embodiments, the selection-cancellation criterion include (1446) a criterion that is met when the contact moves no more than a threshold distance within a threshold amount of time before the characteristic intensity of the contact increases above the selection-cancellation intensity threshold.

In some embodiments, in response to detecting that the selection-cancellation criteria have been met, the device generates (1448) a tactile output (e.g., with one or more tactile output generating components of the device, 167 in FIG. 2A and/or 257 in FIG. 2B) that is indicative of an exit from the text selection mode of operation. In some embodiments, the tactile output that is indicative of exit from the text selection mode of operation is different from the tactile output that is generated when a device alert such as a notification of an incoming message is provided by the device. In some embodiments, this tactile output is not generated when corresponding selection cancellation operations are performed in the text (as opposed to being performed on the keyboard).

In some embodiments, after canceling the selection, and while continuing to detect the contact on the touch-sensitive display, the device detects (1450) a third subsequent change in the characteristic intensity of the contact (e.g., a deep press at time $T_4$ in FIG. 13G). In response to detecting (1452) the third subsequent change in the characteristic intensity of the contact and in accordance with a determination that the touch input (e.g., the third subsequent change in the characteristic intensity of the contact) satisfies the selection-start criteria, the device starts (1454) to select content in the content region at a location of the cursor (as shown in FIG. 13G). On the other hand, in response to detecting the third subsequent change in the characteristic intensity of the contact and in accordance with a determination that the touch input (e.g., the third subsequent change in the characteristic intensity of the contact) does not satisfy the selection-start criteria, the device forgoes starting to select content in the content region.

In some embodiments, starting to select content in response to detecting the third subsequent change in the characteristic intensity of the contact includes (1456) selecting a respective word at the location of the cursor (as shown in FIG. 13H). For example, after the cancelation of the selection (e.g., in response to a deep press at time $T_3$ in FIG. 13F), when the third subsequent change includes an increase in the characteristic intensity of the contact above the selection-start intensity threshold (e.g., a deep press at time $T_4$ in FIG. 13H), a word is selected at the location of the cursor (as shown in FIG. 13H).

In some embodiments, the selected respective word is (1458) a first word (e.g., the word "enim" is the selected first word, FIG. 13H). In some embodiments, while the first word is selected, the device detects first subsequent movement of the contact (13I). In response to detecting the first subsequent movement of the contact while the first word is selected and in accordance with a determination that the touch input meets selection-movement criteria which includes a movement criterion that is met when the contact moves more than a respective threshold amount (e.g., the contact is not substantially stationary and optionally a respective time criterion that is met when an amount of time between the third subsequent change in the characteristic intensity of the contact is detected and when the first subsequent movement of the contact is detected is less than a respective delay threshold), the device cancels selection of the first word and selects a second word that is adjacent to the first word in a first direction (e.g., before or after the respective word) in accordance with the first subsequent movement of the contact, such that the selected respective word is the second word (e.g., as shown in FIG. 13I).

In some embodiments, instead of selecting a second word that is adjacent to the first word, while the respective word is selected (e.g., as shown in FIG. 13H), the device detects (1460) first subsequent movement of the contact (e.g., as shown in FIG. 13J). In response to detecting the first subsequent movement of the contact while the respective word is selected and in accordance with a determination that the touch input meets selection-expansion criteria which includes a movement criterion that is met when the contact moves more than a respective threshold amount (e.g., the contact is not substantially stationary and optionally a respective time criterion that is met when an amount of time between the third subsequent change in the characteristic intensity of the contact is detected and when the first subsequent movement of the contact is detected is less than a respective delay threshold), the device expands the selection to include a word that is adjacent to the respective word in a first direction (e.g., before or after the respective word) in accordance with the first subsequent movement of the contact (e.g., as shown in FIG. 13J).

In some embodiments, instead of selecting a second word that is adjacent to the first word or expanding the selection word by word in respect to detecting a subsequent movement of the contact, while the respective word is selected, the device detects (1462) a fourth subsequent change (e.g., a deep press at time $T_5$, as shown in FIG. 13K) in the characteristic intensity of the contact above a respective intensity threshold (e.g., the selection-cancellation intensity threshold). In response to detecting the fourth subsequent change in the characteristic intensity of the contact, in accordance with a determination that the touch input (e.g., the fourth subsequent change in the characteristic intensity of the contact at time $T_5$) meets the selection-cancellation criteria, which includes a criterion that is met when the amount of time between when the third subsequent change in the characteristic intensity of the contact is detected and when the fourth subsequent change in the characteristic intensity of the contact is detected is greater than the delay threshold (e.g., and, optionally, that the contact is substantially stationary), the device cancels selection of the respective word (e.g., as shown in FIG. 13K).

In some embodiments, instead of canceling a selected word in response to a fourth subsequent change in the characteristic intensity of the contact above a respective intensity threshold, while the respective word is selected, the device detects (1464) a fourth subsequent change (e.g., a deep press at time $T_5$, FIG. 13L) in the characteristic intensity of the contact above a respective intensity threshold (e.g., the sentence-selection intensity threshold). In response to detecting the fourth subsequent change in the characteristic intensity of the contact, in accordance with a determination that the touch input (e.g., the fourth subsequent change in the characteristic intensity of the contact at time $T_5$) meets sentence-selection criteria which include a movement criterion that is met when the contact moves less than a threshold amount within a threshold time period (e.g., the contact is substantially stationary) before (e.g., just before) the fourth subsequent change in intensity of the contact was detected and a time criterion that is met when an amount of time between when the third subsequent change in the characteristic intensity of the contact is detected and when the fourth subsequent change in the characteristic intensity of the contact is detected is less than a delay threshold, the device expands the selection to include the (entire) respective sentence that contains the respective word (e.g., as shown in FIG. 13L).

In some embodiments, while the respective sentence is selected, the device detects (1466) second subsequent movement of the contact (e.g., as shown in FIG. 13M). In response to detecting the second subsequent movement of the contact while the respective sentence is selected: in accordance with a determination that the touch input meets selection-expansion criteria which includes a movement criterion that is met when the contact moves more than a respective threshold amount (e.g., the contact is not substantially stationary and optionally a respective time criterion that is met when an amount of time between the fourth subsequent change in the characteristic intensity of the contact is detected and when the second subsequent movement of the contact is detected is less than a respective delay threshold), the device expands the selection to include a sentence that is adjacent to the respective sentence in a first direction (e.g., before or after the respective sentence) in accordance with the second subsequent movement of the contact (e.g., the expansion of the selection does not select one or more sentences in a respective paragraph that includes the respective sentence, that are adjacent to the respective sentence in the respective paragraph in a second direction that is different from the first direction (e.g., as shown in FIG. 13M).

In some embodiments, instead of expanding the sentence selection in response to a subsequent movement of the contact, while the respective sentence is selected, the device detects (1468) a fifth subsequent change in the characteristic intensity of the contact above the respective intensity threshold (e.g., the selection-start intensity threshold) (e.g., as shown in FIG. 13N). In response to detecting the fifth subsequent change in the characteristic intensity of the contact, in accordance with a determination that the touch input meets the selection-cancellation criteria, which includes a criterion that is met when the amount of time between when the fourth subsequent change in the characteristic intensity of the contact is detected and when the fifth subsequent change in the characteristic intensity of the contact is detected is greater than the delay threshold (e.g., and, optionally, that the contact is substantially stationary), the device cancels selection of the respective sentence (e.g., as shown in FIG. 13N).

In some embodiments, instead of canceling the sentence selection, in response to detecting a subsequent change in the characteristic intensity of the contact, in response to detecting the fifth subsequent change in the characteristic intensity of the contact, in accordance with a determination that the touch input meets paragraph-selection criteria which include a movement criterion that is met when the contact moves less than the threshold amount within the threshold time period (e.g., is substantially stationary) before (e.g., just before) the fifth subsequent change in intensity of the contact was detected and a time criterion that is met when an amount of time between when the fourth subsequent change in the characteristic intensity of the contact is detected and when the fifth subsequent change in the characteristic intensity of the contact is detected is less than the delay threshold, the device expands (1470) the selection to include the (entire) respective paragraph that contains the respective sentence (e.g., as shown in FIG. 13O).

In some embodiments, while the respective paragraph is selected, the device detects (1472) third subsequent movement of the contact. In response to detecting the third subsequent movement of the contact while the respective paragraph is selected: in accordance with a determination that the touch input meets selection-expansion criteria which includes a movement criterion that is met when the contact moves more than a respective threshold amount, the device expands the selection to include a paragraph that is adjacent to the respective paragraph in a first direction in accordance with the third subsequent movement of the contact (e.g., as shown in FIG. 13P).

In some embodiments, the respective paragraph is selected in response to the fifth subsequent change in the characteristic intensity of the contact. While the respective paragraph is selected: the device detects (1474) a sixth subsequent change in the characteristic intensity of the contact above the respective intensity threshold; and, in response to detecting the sixth subsequent change in the characteristic intensity of the contact, in accordance with a determination that the touch input meets selection-cancellation 138-156 criteria, which includes a criterion that is met when the amount of time between when the fifth subsequent change in the characteristic intensity of the contact is detected and when the sixth subsequent change in the characteristic intensity of the contact is detected is greater than the delay threshold, the device cancels selection of the respective paragraph (e.g., as shown in FIG. 13Q).

In some embodiments, in response to detecting the sixth subsequent change in the characteristic intensity of the contact, in accordance with a determination that the touch input meets document selection criteria which include a movement criterion that is met when the contact moves less than the threshold amount within the threshold time period before the sixth subsequent change in intensity of the contact was detected and a time criterion that is met when an amount of time between when the fifth subsequent change in the characteristic intensity of the contact is detected and when the sixth subsequent change in the characteristic intensity of the contact is detected is less than the delay threshold, the device expands (1476) the selection to include the respective document that contains the respective paragraph.

It should be understood that the particular order in which the operations in FIGS. 14A-14H have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 400, 1000, and 1100) are also applicable in an analogous manner to method 1400 described above with respect to FIGS. 14A-14H. For example, the contacts, gestures, user interface objects, intensity thresholds, and/or animations described above with reference to method 1400 optionally have one or more of the characteristics of the contacts, gestures, user interface objects, intensity thresholds, and/or animations described herein with reference to other methods described herein (e.g., methods 400, 1000, and 1100). For brevity, these details are not repeated here.

Figure 15:
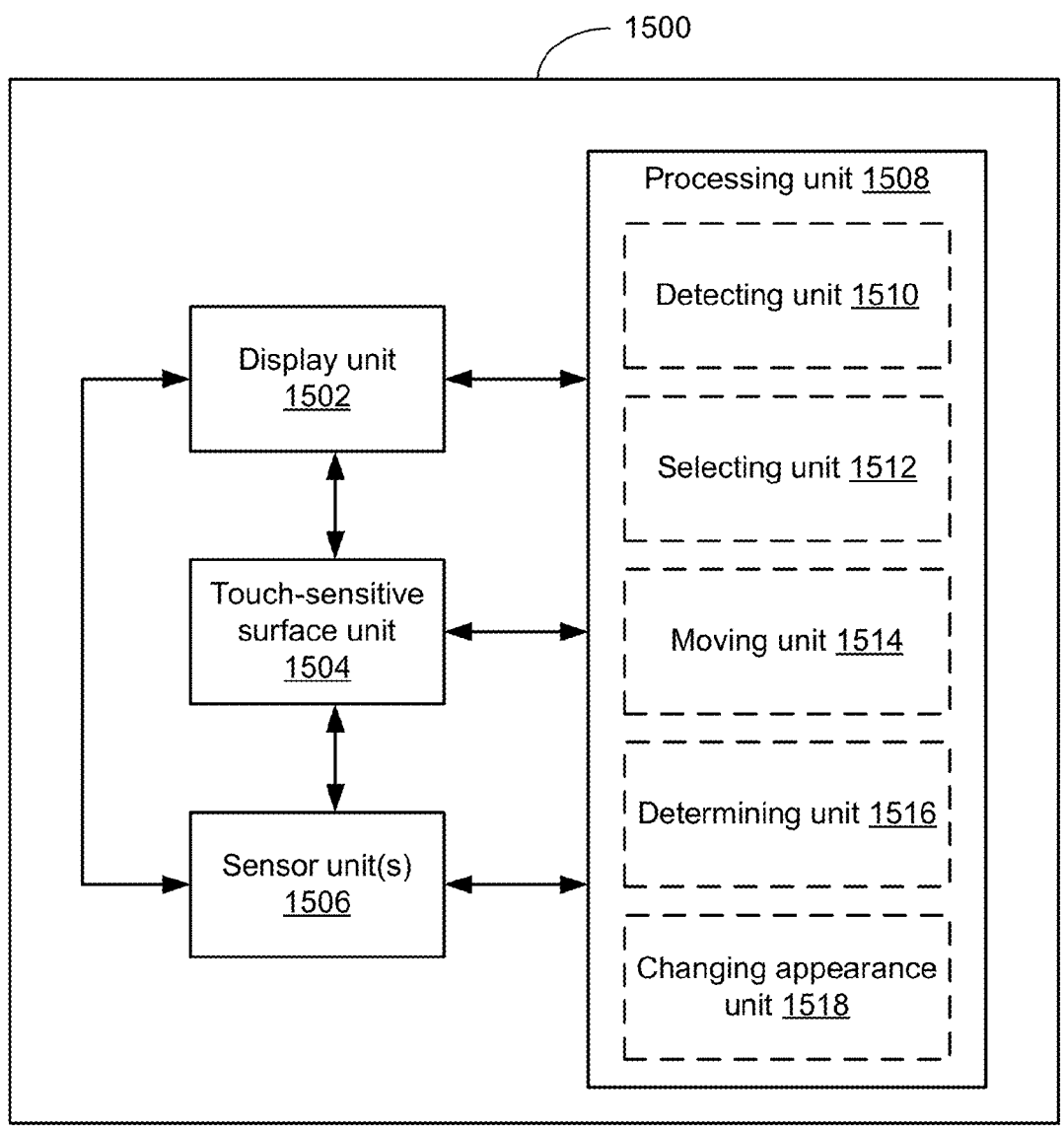
FIG. 15 is a functional block diagram of an electronic device in accordance with some embodiments.

In accordance with some embodiments, FIG. 15 shows a functional block diagram of an electronic device 1500 configured in accordance with the principles of the invention as described above. The functional blocks of the device may be implemented by hardware, software, or a combination of hardware and software to carry out the principles of the invention. It is understood by persons of skill in the art that the functional blocks described in FIG. 15 may be combined or separated into sub-blocks to implement the principles of the invention as described above. Therefore, the description herein may support any possible combination or separation or further definition of the functional blocks described herein.

In some embodiments, the electronic device 1500 includes a display unit 1502 configured to concurrently display an onscreen keyboard and a content presentation region on the display unit 1502, wherein the content presentation region displays text input received from the onscreen keyboard; a touch-sensitive surface unit 1504 configured to receive user touch inputs; one or more sensor units 1506 to detect intensity of contacts with the touch-sensitive surface unit 1504; and a processing unit 1508 coupled to the display unit 1502, the touch-sensitive surface unit 1504, and the one or more sensor units 1506. In some embodiments, the processing unit 1508 includes a detecting unit 1510, a selecting unit 1512, a moving unit 1514, a determining unit 1516, and a changing appearance unit 1518.

In some embodiments, the processing unit 1208 is configured to: in accordance with the determination that the touch input satisfies the one or more criteria for entering the text selection mode: visually obscure keys on the onscreen keyboard (e.g., with the obscuring unit 1218).

The processing unit 1508 is configured to: detect (e.g., with detecting unit 1510) a touch input on the onscreen keyboard displayed on the touch-sensitive display. In some embodiments, detect (e.g., with detecting unit 1510) the touch input includes detect (e.g., with detecting unit 1510) movement of a contact and liftoff of the contact. The processing unit 1508 is also configured to: in response to detecting the touch input on the onscreen keyboard displayed on the touch-sensitive display, in accordance with a determination (e.g., with determining unit 1516) that the touch input satisfies text-selection criteria, the text-selection criteria include a criterion that is met when a characteristic intensity of the contact increases above a text-selection intensity threshold, perform a text selection operation (e.g., with selecting unit 1512) based on the movement of the contact. Conversely, in accordance with a determination (e.g., with determining unit 1516) that the touch input satisfies text-entry criteria, the text-entry criteria include a criterion that is met when the characteristic intensity of the contact does not increase above the text-selection intensity threshold, the processing unit 1508 is configured to enter text into the content presentation region based on the touch input.

In some embodiments, the text-entry criteria include a criterion that is met when the liftoff of the contact is detected while the contact is at a location of a character key of the onscreen keyboard.

In some embodiments, the text-entry criteria include a criterion that is met when the contact does not move outside of the onscreen keyboard before liftoff of the contact is detected.

In some embodiments, enter the text into the content region includes enter a character that corresponds to character key at a location at which touchdown of the contact was detected on the onscreen keyboard.

In some embodiments, enter the text into the content region includes enter a character that corresponds to character key at a location at which liftoff of the contact was detected on the onscreen keyboard.

In some embodiments, the text-selection criteria include a criterion that is met when the contact does not move more than a threshold distance before detecting an increase in the characteristic intensity of the contact above the text-selection intensity threshold.

In some embodiments, the text-selection operation includes one of: moving a cursor within the content region or selecting text within the content region.

In some embodiments, the processing unit 1508 is configured to, in response to detecting that the text-selection criteria have been met, generate a tactile (e.g., with tactile output generator(s) 167, FIG. 2A or tactile output generator(s) 257, FIG. 2B) output that is indicative of an entry into a text selection mode of operation.

In some embodiments, the processing unit 1508 is configured to, in response to detecting that the text-selection criteria have been met, change an appearance (e.g., with changing appearance unit 1518) of the onscreen keyboard to indicate that the device is operating in a text selection mode of operation. In some embodiments, change the appearance (e.g., with changing appearance unit 1518) of the onscreen keyboard includes obscure an appearance (e.g., with changing appearance unit 1518) of characters on keys of the onscreen keyboard.

In some embodiments, the processing unit 1508 is configured to end the text selection mode of operation and, in conjunction with the end of the text selection mode of operation, reverse the change in appearance (e.g., with changing appearance unit 1518) of the onscreen keyboard to reveal the characters on the keys of the onscreen keyboard.

In some embodiments, the processing unit 1508 is configured to, when the touch input satisfies the text-selection criteria, detect (e.g., with detecting unit 1510) movement of the contact after the touch input has satisfied the text-selection criteria and move (e.g., with moving unit 1514) a cursor in the content region in accordance with the movement of the contact detected after the touch input has satisfied the text-selection criteria.

In some embodiments, the processing unit 1508 is configured to, when the touch input satisfies the text-selection criteria, detect (e.g., with detecting unit 1510) a first subsequent change in the characteristic intensity of the contact followed by additional movement of the contact on the touch-sensitive display; and, in response to detecting the first subsequent change in the characteristic intensity of the contact, in accordance with a determination (e.g., with determining unit 1516) that the touch input satisfies selection-start criteria, the selection-start criteria include a criterion that is met when the characteristic intensity of the contact increases above a selection-start intensity threshold, the processing unit 1508 is configured to start to select (e.g., with selecting unit 1512) content in the content region at a location of a cursor in accordance with the additional movement of the contact. Conversely, in accordance with a determination (e.g., with determining unit 1516) that the touch input does not satisfy the selection-start criteria, the processing unit 1508 is configured to move (e.g., with moving unit 1514) the cursor in accordance with the additional movement of the contact without starting to select content in the content region.

In some embodiments, the processing unit 1508 is configured to: when the touch input satisfies selection-start criteria, after starting to select content in the content region, detect (e.g., with detecting unit 1510) liftoff of the contact from the touch-sensitive display and confirm the selection (e.g., with selecting unit 1512) in response to detecting the liftoff of the contact.

In some embodiments, the processing unit 1508 is configured to: when the touch input satisfies selection-start criteria, after starting to select content in the content region, and while continuing to detect (e.g., with detecting unit 1510) the contact on the touch-sensitive display, detect (e.g., with detecting unit 1510) a second subsequent change in intensity of the contact. In response to detecting the second subsequent change in the characteristic intensity of the contact, in accordance with a determination (e.g., with determining unit 1516) that the second subsequent change in the characteristic intensity of the contact satisfies selection-cancellation criteria, the selection-cancellation criteria include a criterion that is met when the characteristic intensity of the contact increases above a selection-cancellation intensity threshold, the processing unit 1508 is configured to cancel the selection (e.g., with selecting unit 1512). Conversely, in accordance with a determination (e.g., with determining unit 1516) that the second subsequent change in the characteristic intensity of the contact does not satisfy the selection-cancellation criteria, the processing unit 1508 is configured to maintain the selection (e.g., with selecting unit 1512).

In some embodiments, the selection-cancellation criterion include a criterion that is met when the contact moves no more than a threshold distance within a threshold amount of time before the characteristic intensity of the contact increases above the selection-cancellation intensity threshold.

In some embodiments, the processing unit 1508 is configured to, in response to detecting that the selection-cancellation criteria have been met, generate a tactile (e.g., with tactile output generator(s) 167, FIG. 2A or tactile output generator(s) 257, FIG. 2B) output that is indicative of an exit from the text selection mode of operation.

In some embodiments, the processing unit 1508 is configured to: after canceling the selection, and while continuing to detect (e.g., with detecting unit 1510) the contact on the touch-sensitive display, detect (e.g., with detecting unit 1510) a third subsequent change in the characteristic intensity of the contact. In response to detecting the third subsequent change in the characteristic intensity of the contact, in accordance with a determination (e.g., with determining unit 1516) that the touch input satisfies the selection-start criteria, the processing unit 1508 is configured to start to select (e.g., with selecting unit 1512) content in the content region at a location of the cursor. Conversely, in accordance with a determination (e.g., with determining unit 1516) that the touch input does not satisfy the selection-start criteria, the processing unit 1508 is configured to forgo starting to select content (e.g., with selecting unit 1512) in the content region.

In some embodiments, start to select (e.g., with selecting unit 1512) content in response to detecting the third subsequent change in the characteristic intensity of the contact includes select (e.g., with selecting unit 1512) a respective word at the location of the cursor.

In some embodiments, the selected respective word is a first word, and the processing unit 1508 is configured to, while the first word is selected, detect (e.g., with detecting unit 1510) first subsequent movement of the contact. In response to detecting the first subsequent movement of the contact while the first word is selected, in accordance with a determination (e.g., with determining unit 1516) that the touch input meets selection-movement criteria which includes a movement criterion that is met when the contact move (e.g., with moving unit 1514)s more than a respective threshold amount, the processing unit 1508 is configured to cancel selection (e.g., with selecting unit 1512) of the first word, and select (e.g., with selecting unit 1512) a second word that is adjacent to the first word in a first direction in accordance with the first subsequent movement of the contact, such that the selected respective word is the second word.

In some embodiments, the processing unit 1508 is configured to, while the respective word is selected, detect (e.g., with detecting unit 1510) first subsequent movement of the contact. In response to detecting the first subsequent movement of the contact while the respective word is selected, in accordance with a determination (e.g., with determining unit 1516) that the touch input meets selection-expansion criteria which includes a movement criterion that is met when the contact moves more than a respective threshold amount, the processing unit 1508 is configured to expand the selection (e.g., with selecting unit 1512) to include a word that is adjacent to the respective word in a first direction in accordance with the first subsequent movement of the contact.

In some embodiments, the processing unit 1508 is configured to, while the respective word is selected, detect (e.g., with detecting unit 1510) a fourth subsequent change in the characteristic intensity of the contact above a respective intensity threshold. In response to detecting the fourth subsequent change in the characteristic intensity of the contact, in accordance with a determination (e.g., with determining unit 1516) that the touch input meets the selection-cancellation criteria, which includes a criterion that is met when the amount of time between when the third subsequent change in the characteristic intensity of the contact is detected and when the fourth subsequent change in the characteristic intensity of the contact is detected is greater than the delay threshold, the processing unit 1508 is configured to cancel selection (e.g., with selecting unit 1512) of the respective word.

In some embodiments, the processing unit 1508 is configured to, while the respective word is selected, detect (e.g., with detecting unit 1510) a fourth subsequent change in the characteristic intensity of the contact above a respective intensity threshold. In response to detecting the fourth subsequent change in the characteristic intensity of the contact, in accordance with a determination (e.g., with determining unit 1516) that the touch input meets sentence-selection criteria which include a movement criterion that is met when the contact move (e.g., with moving unit 1514)s less than a threshold amount within a threshold time period before the fourth subsequent change in intensity of the contact was detected and a time criterion that is met when an amount of time between when the third subsequent change in the characteristic intensity of the contact is detected and when the fourth subsequent change in the characteristic intensity of the contact is detected is less than a delay threshold, the processing unit 1508 is configured to expand the selection (e.g., with selecting unit 1512) to include the respective sentence that contains the respective word.

In some embodiments, the processing unit 1508 is configured to, while the respective sentence is selected, detect (e.g., with detecting unit 1510) second subsequent movement of the contact. In response to detecting the second subsequent movement of the contact while the respective sentence is selected, in accordance with a determination (e.g., with determining unit 1516) that the touch input meets selection-expansion criteria which includes a movement criterion that is met when the contact move (e.g., with moving unit 1514)s more than a respective threshold amount, the processing unit 1508 is configured to expand the selection (e.g., with selecting unit 1512) to include a sentence that is adjacent to the respective sentence in a first direction in accordance with the second subsequent movement of the contact.

In some embodiments, the respective sentence is selected in response to the fourth subsequent change in the characteristic intensity of the contact and the processing unit 1508 is configured to, while the respective sentence is selected: detect (e.g., with detecting unit 1510) a fifth subsequent change in the characteristic intensity of the contact above the respective intensity threshold. In response to detecting the fifth subsequent change in the characteristic intensity of the contact, in accordance with a determination (e.g., with determining unit 1516) that the touch input meets the selection-cancellation criteria, which includes a criterion that is met when the amount of time between when the fourth subsequent change in the characteristic intensity of the contact is detected and when the fifth subsequent change in the characteristic intensity of the contact is detected is greater than the delay threshold, the processing unit 1508 is configured to cancel selection (e.g., with selecting unit 1512) of the respective sentence.

In some embodiments, the processing unit 1508 is configured to, in response to detecting the fifth subsequent change in the characteristic intensity of the contact, in accordance with a determination (e.g., with determining unit 1516) that the touch input meets paragraph-selection criteria which include a movement criterion that is met when the contact move (e.g., with moving unit 1514)s less than the threshold amount within the threshold time period before the fifth subsequent change in intensity of the contact was detected and a time criterion that is met when an amount of time between when the fourth subsequent change in the characteristic intensity of the contact is detected and when the fifth subsequent change in the characteristic intensity of the contact is detected is less than the delay threshold, the processing unit 1508 is configured to expand the selection (e.g., with selecting unit 1512) to include the respective paragraph that contains the respective sentence.

In some embodiments, the processing unit 1508 is configured to, while the respective paragraph is selected, detecting third subsequent movement of the contact. In response to detecting the third subsequent movement of the contact while the respective paragraph is selected, in accordance with a determination (e.g., with determining unit 1516) that the touch input meets selection-expansion criteria which includes a movement criterion that is met when the contact move (e.g., with moving unit 1514)s more than a respective threshold amount, expand the selection (e.g., with selecting unit 1512) to include a paragraph that is adjacent to the respective paragraph in a first direction in accordance with the third subsequent movement of the contact.

In some embodiments, the respective paragraph is selected in response to the fifth subsequent change in the characteristic intensity of the contact and the processing unit 1508 is configured to, while the respective paragraph is selected, detect (e.g., with detecting unit 1510) a sixth subsequent change in the characteristic intensity of the contact above the respective intensity threshold. In response to detecting the sixth subsequent change in the characteristic intensity of the contact, in accordance with a determination (e.g., with determining unit 1516) that the touch input meets selection-cancellation criteria, which includes a criterion that is met when the amount of time between when the fifth subsequent change in the characteristic intensity of the contact is detected and when the sixth subsequent change in the characteristic intensity of the contact is detected is greater than the delay threshold, the processing unit 1508 is configured to cancel selection (e.g., with selecting unit 1512) of the respective paragraph.

In some embodiments, the processing unit 1508 is configured to, in response to detecting the sixth subsequent change in the characteristic intensity of the contact, in accordance with a determination (e.g., with determining unit 1516) that the touch input meets document selection criteria which include a movement criterion that is met when the contact move (e.g., with moving unit 1514)s less than the threshold amount within the threshold time period before the sixth subsequent change in intensity of the contact was detected and a time criterion that is met when an amount of time between when the fifth subsequent change in the characteristic intensity of the contact is detected and when the sixth subsequent change in the characteristic intensity of the contact is detected is less than the delay threshold, the processing unit 1508 is configured to expand the selection (e.g., with selecting unit 1512) to include the respective document that contains the respective paragraph.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
    at an electronic device having one or more processors, memory, a touch-sensitive display, and one or more sensors to detect intensities of contacts with the touch-sensitive display:
        concurrently displaying an onscreen keyboard and a content presentation region on the touch-sensitive display, wherein the content presentation region displays text input received from the onscreen keyboard;
        detecting a touch input on the onscreen keyboard displayed on the touch-sensitive display, wherein detecting the touch input includes detecting movement of a contact and liftoff of the contact;
        in response to detecting the touch input on the onscreen keyboard displayed on the touch-sensitive display:
            in accordance with a determination that the touch input on the onscreen keyboard satisfies text-selection criteria, wherein the text-selection criteria include a criterion that is met when a characteristic intensity of the contact increases above a text-selection intensity threshold, performing a text selection operation based on the movement of the contact that includes:
                in response to detecting an increase in the characteristic intensity of the contact above the text-selection intensity threshold, changing an appearance of the onscreen keyboard;
                in response to detecting movement of the contact while the appearance of the onscreen keyboard has been changed, performing the text selection operation based on the movement of the contact and,
                in response to detecting liftoff of the contact from the touch-sensitive display, reversing the change in appearance of the onscreen keyboard that occurred in response to detecting the increase in the characteristic intensity of the contact above the text-selection intensity threshold; and,
            in accordance with a determination that the touch input on the onscreen keyboard satisfies text-entry criteria, wherein the text-entry criteria include a criterion that is met when the characteristic intensity of the contact does not increase above the text-selection intensity threshold, entering text into the content presentation region based on the touch input.

2. The method of claim 1, wherein the text-entry criteria include a criterion that is met when the contact does not move outside of the onscreen keyboard before liftoff of the contact is detected.

3. The method of claim 1, wherein the text-selection criteria include a criterion that is met when the contact does not move more than a threshold distance before detecting an increase in the characteristic intensity of the contact above the text-selection intensity threshold.

4. The method of claim 1, wherein the text-selection operation includes one of: moving a cursor within the content region or selecting text within the content region.

5. The method of claim 1, including, in response to detecting that the text-selection criteria have been met, generating a tactile output that is indicative of an entry into a text selection mode of operation.

6. The method of claim 1, wherein changing the appearance of the onscreen keyboard includes maintaining display of keys in the onscreen keyboard while obscuring characters displayed on the keys of the onscreen keyboard.

7. The method of claim 6, wherein reversing the change in appearance of the onscreen keyboard reveals the characters on the keys of the onscreen keyboard.

8. The method of claim 1, including, when the touch input satisfies the text-selection criteria, detecting movement of the contact after the touch input has satisfied the text-selection criteria and moving a cursor in the content region in accordance with the movement of the contact detected after the touch input has satisfied the text-selection criteria.

9. The method of claim 1, including:
when the touch input satisfies the text-selection criteria, detecting a first subsequent change in the characteristic intensity of the contact followed by additional movement of the contact on the touch-sensitive display; and,
in response to detecting the first subsequent change in the characteristic intensity of the contact:
in accordance with a determination that the touch input satisfies selection-start criteria, wherein the selection-start criteria include a criterion that is met when the characteristic intensity of the contact increases above a selection-start intensity threshold, starting to select content in the content region at a location of a cursor in accordance with the additional movement of the contact; and
in accordance with a determination that the touch input does not satisfy the selection-start criteria, moving the cursor in accordance with the additional movement of the contact without starting to select content in the content region.

10. The method of claim 9, including when the touch input satisfies selection-start criteria, after starting to select content in the content region, detecting liftoff of the contact from the touch-sensitive display and confirming the selection in response to detecting the liftoff of the contact.

11. The method of claim 9, including:
when the touch input satisfies selection-start criteria, after starting to select content in the content region, and while continuing to detect the contact on the touch-sensitive display, detecting a second subsequent change in intensity of the contact:
in response to detecting the second subsequent change in the characteristic intensity of the contact:
in accordance with a determination that the second subsequent change in the characteristic intensity of the contact satisfies selection-cancellation criteria, wherein the selection-cancellation criteria include a criterion that is met when the characteristic intensity of the contact increases above a selection-cancellation intensity threshold, cancelling the selection; and
in accordance with a determination that the second subsequent change in the characteristic intensity of the contact does not satisfy the selection-cancellation criteria, maintaining the selection.

12. The method of claim 11, wherein the selection-cancellation criterion include a criterion that is met when the contact moves no more than a threshold distance within a threshold amount of time before the characteristic intensity of the contact increases above the selection-cancellation intensity threshold.

13. The method of claim 11, including, in response to detecting that the selection-cancellation criteria have been met, generating a tactile output that is indicative of an exit from the text selection mode of operation.

14. The method of claim 11, including:
after canceling the selection, and while continuing to detect the contact on the touch-sensitive display, detecting a third subsequent change in the characteristic intensity of the contact; and,
in response to detecting the third subsequent change in the characteristic intensity of the contact:
in accordance with a determination that the touch input satisfies the selection-start criteria, starting to select content in the content region at a location of the cursor; and
in accordance with a determination that the touch input does not satisfy the selection-start criteria, forgoing starting to select content in the content region.

15. The method of claim 14, wherein starting to select content in response to detecting the third subsequent change in the characteristic intensity of the contact includes selecting a respective word at the location of the cursor.

16. The method of claim 15, wherein the selected respective word is a first word, and the method includes:
while the first word is selected, detecting first subsequent movement of the contact; and
in response to detecting the first subsequent movement of the contact while the first word is selected:
in accordance with a determination that the touch input meets selection-movement criteria which includes a movement criterion that is met when the contact moves more than a respective threshold amount:
canceling selection of the first word; and
selecting a second word that is adjacent to the first word in a first direction in accordance with the first subsequent movement of the contact, such that the selected respective word is the second word.

17. The method of claim 15, including:
while the respective word is selected, detecting first subsequent movement of the contact; and
in response to detecting the first subsequent movement of the contact while the respective word is selected:
in accordance with a determination that the touch input meets selection-expansion criteria which includes a movement criterion that is met when the contact moves more than a respective threshold amount, expanding the selection to include a word that is adjacent to the respective word in a first direction in accordance with the first subsequent movement of the contact.

18. The method of claim 15, including:
while the respective word is selected, detecting a fourth subsequent change in the characteristic intensity of the contact above a respective intensity threshold; and,
in response to detecting the fourth subsequent change in the characteristic intensity of the contact, in accordance with a determination that the touch input meets the selection-cancellation criteria, which includes a criterion that is met when an amount of time between when the third subsequent change in the characteristic intensity of the contact is detected and when the fourth subsequent change in the characteristic intensity of the contact is detected is greater than a delay threshold, cancelling selection of the respective word.

19. The method of claim 15, including:
while the respective word is selected, detecting a fourth subsequent change in the characteristic intensity of the contact above a respective intensity threshold; and,
in response to detecting the fourth subsequent change in the characteristic intensity of the contact, in accordance with a determination that the touch input meets sentence-selection criteria which include
a movement criterion that is met when the contact moves less than a threshold amount within a threshold time period before the fourth subsequent change in intensity of the contact was detected and
a time criterion that is met when an amount of time between when the third subsequent change in the characteristic intensity of the contact is detected and when the fourth subsequent change in the characteristic intensity of the contact is detected is less than a delay threshold,
expanding the selection to include the respective sentence that contains the respective word.

20. The method of claim 19, including:
while the respective sentence is selected, detecting second subsequent movement of the contact; and
in response to detecting the second subsequent movement of the contact while the respective sentence is selected:
in accordance with a determination that the touch input meets selection-expansion criteria which includes a movement criterion that is met when the contact moves more than a respective threshold amount, expanding the selection to include a sentence that is adjacent to the respective sentence in a first direction in accordance with the second subsequent movement of the contact.

21. The method of claim 19, wherein the respective sentence is selected in response to the fourth subsequent change in the characteristic intensity of the contact and the method includes, while the respective sentence is selected:
detecting a fifth subsequent change in the characteristic intensity of the contact above the respective intensity threshold; and,
in response to detecting the fifth subsequent change in the characteristic intensity of the contact, in accordance with a determination that the touch input meets the selection-cancellation criteria, which includes a criterion that is met when the amount of time between when the fourth subsequent change in the characteristic intensity of the contact is detected and when the fifth subsequent change in the characteristic intensity of the contact is detected is greater than the delay threshold, cancelling selection of the respective sentence.

22. The method of claim 21, including:
in response to detecting the fifth subsequent change in the characteristic intensity of the contact, in accordance with a determination that the touch input meets paragraph-selection criteria which include
a movement criterion that is met when the contact moves less than the threshold amount within the threshold time period before the fifth subsequent change in intensity of the contact was detected and
a time criterion that is met when an amount of time between when the fourth subsequent change in the characteristic intensity of the contact is detected and when the fifth subsequent change in the characteristic intensity of the contact is detected is less than the delay threshold,
expanding the selection to include the respective paragraph that contains the respective sentence.

23. The method of claim 22, including:
while the respective paragraph is selected, detecting third subsequent movement of the contact; and
in response to detecting the third subsequent movement of the contact while the respective paragraph is selected:
in accordance with a determination that the touch input meets selection-expansion criteria which includes a movement criterion that is met when the contact moves more than a respective threshold amount, expanding the selection to include a paragraph that is adjacent to the respective paragraph in a first direction in accordance with the third subsequent movement of the contact.

24. The method of claim 23, wherein the respective paragraph is selected in response to the fifth subsequent change in the characteristic intensity of the contact and the method includes, while the respective paragraph is selected:
detecting a sixth subsequent change in the characteristic intensity of the contact above the respective intensity threshold; and,
in response to detecting the sixth subsequent change in the characteristic intensity of the contact, in accordance with a determination that the touch input meets selection-cancellation criteria, which includes a criterion that is met when the amount of time between when the fifth subsequent change in the characteristic intensity of the contact is detected and when the sixth subsequent change in the characteristic intensity of the contact is detected is greater than the delay threshold, cancelling selection of the respective paragraph.

25. The method of claim 24, including:
in response to detecting the sixth subsequent change in the characteristic intensity of the contact, in accordance with a determination that the touch input meets document selection criteria which include
a movement criterion that is met when the contact moves less than the threshold amount within the threshold time period before the sixth subsequent change in intensity of the contact was detected and
a time criterion that is met when an amount of time between when the fifth subsequent change in the characteristic intensity of the contact is detected and when the sixth subsequent change in the characteristic intensity of the contact is detected is less than the delay threshold,
expanding the selection to include the respective document that contains the respective paragraph.

26. The method of claim 1, wherein the contact in the touch input is a continuously detected contact and touch-down of the contact is detected at a location of a character key in the onscreen keyboard.

27. An electronic device, comprising:
a touch-sensitive display;
one or more sensors to detect intensities of contacts with the touch-sensitive display;
one or more processors;
memory; and
one or more programs, wherein the one or more programs are stored in the memory and configured to be executed by the one or more processors, the one or more programs including instructions for:
concurrently displaying an onscreen keyboard and a content presentation region on the touch-sensitive display, wherein the content presentation region displays text input received from the onscreen keyboard;
detecting a touch input on the onscreen keyboard displayed on the touch-sensitive display, wherein detecting the touch input includes detecting movement of a contact and liftoff of the contact;
in response to detecting the touch input on the onscreen keyboard displayed on the touch-sensitive display:

in accordance with a determination that the touch input satisfies text-selection criteria, wherein the text-selection criteria include a criterion that is met when a characteristic intensity of the contact increases above a text-selection intensity threshold, performing a text selection operation based on the movement of the contact that includes:
 in response to detecting an increase in the characteristic intensity of the contact above the text-selection intensity threshold, changing an appearance of the onscreen keyboard;
 in response to detecting movement of the contact while the appearance of the onscreen keyboard has been changed, performing the text selection operation based on the movement of the contact and,
 in response to detecting liftoff of the contact from the touch-sensitive display, reversing the change in appearance of the onscreen keyboard that occurred in response to detecting the increase in the characteristic intensity of the contact above the text-selection intensity threshold; and
in accordance with a determination that the touch input satisfies text-entry criteria, wherein the text-entry criteria include a criterion that is met when the characteristic intensity of the contact does not increase above the text-selection intensity threshold, entering text into the content presentation region based on the touch input.

28. The electronic device of claim 27, wherein the text-entry criteria include a criterion that is met when the contact does not move outside of the onscreen keyboard before liftoff of the contact is detected.

29. The electronic device of claim 27, wherein the text-selection criteria include a criterion that is met when the contact does not move more than a threshold distance before detecting an increase in the characteristic intensity of the contact above the text-selection intensity threshold.

30. The electronic device of claim 27, wherein the text-selection operation includes one of: moving a cursor within the content region or selecting text within the content region.

31. The electronic device of claim 27, including instructions for, in response to detecting that the text-selection criteria have been met, generating a tactile output that is indicative of an entry into a text selection mode of operation.

32. The electronic device of claim 27, wherein changing the appearance of the onscreen keyboard includes maintaining display of keys in the onscreen keyboard while obscuring characters displayed on the keys of the onscreen keyboard.

33. The electronic device of claim 32, wherein reversing the change in appearance of the onscreen keyboard reveals the characters on the keys of the onscreen keyboard.

34. The electronic device of claim 27, including instructions for, when the touch input satisfies the text-selection criteria, detecting movement of the contact after the touch input has satisfied the text-selection criteria and moving a cursor in the content region in accordance with the movement of the contact detected after the touch input has satisfied the text-selection criteria.

35. The electronic device of claim 27, including instructions for:
 when the touch input satisfies the text-selection criteria, detecting a first subsequent change in the characteristic intensity of the contact followed by additional movement of the contact on the touch-sensitive display; and,
 in response to detecting the first subsequent change in the characteristic intensity of the contact:
  in accordance with a determination that the touch input satisfies selection-start criteria, wherein the selection-start criteria include a criterion that is met when the characteristic intensity of the contact increases above a selection-start intensity threshold, starting to select content in the content region at a location of a cursor in accordance with the additional movement of the contact; and
  in accordance with a determination that the touch input does not satisfy the selection-start criteria, moving the cursor in accordance with the additional movement of the contact without starting to select content in the content region.

36. The electronic device of claim 35, including instructions for when the touch input satisfies selection-start criteria, after starting to select content in the content region, detecting liftoff of the contact from the touch-sensitive display and confirming the selection in response to detecting the liftoff of the contact.

37. The electronic device of claim 35, including instructions for:
 when the touch input satisfies selection-start criteria, after starting to select content in the content region, and while continuing to detect the contact on the touch-sensitive display, detecting a second subsequent change in intensity of the contact:
 in response to detecting the second subsequent change in the characteristic intensity of the contact:
  in accordance with a determination that the second subsequent change in the characteristic intensity of the contact satisfies selection-cancellation criteria, wherein the selection-cancellation criteria include a criterion that is met when the characteristic intensity of the contact increases above a selection-cancellation intensity threshold, cancelling the selection; and
  in accordance with a determination that the second subsequent change in the characteristic intensity of the contact does not satisfy the selection-cancellation criteria, maintaining the selection.

38. The electronic device of claim 37, wherein the selection-cancellation criterion include a criterion that is met when the contact moves no more than a threshold distance within a threshold amount of time before the characteristic intensity of the contact increases above the selection-cancellation intensity threshold.

39. The electronic device of claim 37, including instructions for, in response to detecting that the selection-cancellation criteria have been met, generating a tactile output that is indicative of an exit from the text selection mode of operation.

40. The electronic device of claim 37, including instructions for:
 after canceling the selection, and while continuing to detect the contact on the touch-sensitive display, detecting a third subsequent change in the characteristic intensity of the contact; and,
 in response to detecting the third subsequent change in the characteristic intensity of the contact:
  in accordance with a determination that the touch input satisfies the selection-start criteria, starting to select content in the content region at a location of the cursor; and
  in accordance with a determination that the touch input does not satisfy the selection-start criteria, forgoing starting to select content in the content region.

41. The electronic device of claim 40, wherein starting to select content in response to detecting the third subsequent change in the characteristic intensity of the contact includes selecting a respective word at the location of the cursor.

42. The electronic device of claim 41, wherein the selected respective word is a first word, and the electronic device includes instructions for:
- while the first word is selected, detecting first subsequent movement of the contact; and
- in response to detecting the first subsequent movement of the contact while the first word is selected:
  - in accordance with a determination that the touch input meets selection-movement criteria which includes a movement criterion that is met when the contact moves more than a respective threshold amount:
    - canceling selection of the first word; and
    - selecting a second word that is adjacent to the first word in a first direction in accordance with the first subsequent movement of the contact, such that the selected respective word is the second word.

43. The electronic device of claim 41, including instructions for:
- while the respective word is selected, detecting first subsequent movement of the contact; and
- in response to detecting the first subsequent movement of the contact while the respective word is selected:
  - in accordance with a determination that the touch input meets selection-expansion criteria which includes a movement criterion that is met when the contact moves more than a respective threshold amount, expanding the selection to include a word that is adjacent to the respective word in a first direction in accordance with the first subsequent movement of the contact.

44. The electronic device of claim 41, including instructions for:
- while the respective word is selected, detecting a fourth subsequent change in the characteristic intensity of the contact above a respective intensity threshold; and,
- in response to detecting the fourth subsequent change in the characteristic intensity of the contact, in accordance with a determination that the touch input meets the selection-cancellation criteria, which includes a criterion that is met when the amount of time between when the third subsequent change in the characteristic intensity of the contact is detected and when the fourth subsequent change in the characteristic intensity of the contact is detected is greater than the delay threshold, cancelling selection of the respective word.

45. The electronic device of claim 41, including instructions for:
- while the respective word is selected, detecting a fourth subsequent change in the characteristic intensity of the contact above a respective intensity threshold; and,
- in response to detecting the fourth subsequent change in the characteristic intensity of the contact, in accordance with a determination that the touch input meets sentence-selection criteria which include
  - a movement criterion that is met when the contact moves less than a threshold amount within a threshold time period before the fourth subsequent change in intensity of the contact was detected and
  - a time criterion that is met when an amount of time between when the third subsequent change in the characteristic intensity of the contact is detected and when the fourth subsequent change in the characteristic intensity of the contact is detected is less than a delay threshold,
  - expanding the selection to include the respective sentence that contains the respective word.

46. The electronic device of claim 45, including instructions for:
- while the respective sentence is selected, detecting second subsequent movement of the contact; and
- in response to detecting the second subsequent movement of the contact while the respective sentence is selected:
  - in accordance with a determination that the touch input meets selection-expansion criteria which includes a movement criterion that is met when the contact moves more than a respective threshold amount, expanding the selection to include a sentence that is adjacent to the respective sentence in a first direction in accordance with the second subsequent movement of the contact.

47. The electronic device of claim 45, wherein the respective sentence is selected in response to the fourth subsequent change in the characteristic intensity of the contact and the electronic device includes instructions for, while the respective sentence is selected:
- detecting a fifth subsequent change in the characteristic intensity of the contact above the respective intensity threshold; and,
- in response to detecting the fifth subsequent change in the characteristic intensity of the contact, in accordance with a determination that the touch input meets the selection-cancellation criteria, which includes a criterion that is met when the amount of time between when the fourth subsequent change in the characteristic intensity of the contact is detected and when the fifth subsequent change in the characteristic intensity of the contact is detected is greater than the delay threshold, cancelling selection of the respective sentence.

48. The electronic device of claim 47, including instructions for:
- in response to detecting the fifth subsequent change in the characteristic intensity of the contact, in accordance with a determination that the touch input meets paragraph-selection criteria which include
  - a movement criterion that is met when the contact moves less than the threshold amount within the threshold time period before the fifth subsequent change in intensity of the contact was detected and
  - a time criterion that is met when an amount of time between when the fourth subsequent change in the characteristic intensity of the contact is detected and when the fifth subsequent change in the characteristic intensity of the contact is detected is less than the delay threshold,
- expanding the selection to include the respective paragraph that contains the respective sentence.

49. The electronic device of claim 48, including instructions for:
- while the respective paragraph is selected, detecting third subsequent movement of the contact; and
- in response to detecting the third subsequent movement of the contact while the respective paragraph is selected:
  - in accordance with a determination that the touch input meets selection-expansion criteria which includes a movement criterion that is met when the contact moves more than a respective threshold amount, expanding the selection to include a paragraph that is adjacent to the respective paragraph in a first direction in accordance with the third subsequent movement of the contact.

50. The electronic device of claim 49, wherein the respective paragraph is selected in response to the fifth subsequent change in the characteristic intensity of the contact and the electronic device includes instructions for, while the respective paragraph is selected:
   detecting a sixth subsequent change in the characteristic intensity of the contact above the respective intensity threshold; and,
   in response to detecting the sixth subsequent change in the characteristic intensity of the contact, in accordance with a determination that the touch input meets selection-cancellation criteria, which includes a criterion that is met when the amount of time between when the fifth subsequent change in the characteristic intensity of the contact is detected and when the sixth subsequent change in the characteristic intensity of the contact is detected is greater than the delay threshold, cancelling selection of the respective paragraph.

51. The electronic device of claim 50, including instructions for:
   in response to detecting the sixth subsequent change in the characteristic intensity of the contact, in accordance with a determination that the touch input meets document selection criteria which include
      a movement criterion that is met when the contact moves less than the threshold amount within the threshold time period before the sixth subsequent change in intensity of the contact was detected and
      a time criterion that is met when an amount of time between when the fifth subsequent change in the characteristic intensity of the contact is detected and when the sixth subsequent change in the characteristic intensity of the contact is detected is less than the delay threshold,
   expanding the selection to include the respective document that contains the respective paragraph.

52. The electronic device of claim 27, wherein the contact in the touch input is a continuously detected contact and touchdown of the contact is detected at a location of a character key in the onscreen keyboard.

53. A non-transitory computer readable storage medium storing one or more programs, the one or more programs comprising instructions, which when executed by an electronic device with a touch-sensitive display and one or more sensors to detect intensities of contacts with the touch-sensitive display, cause the device to:
   concurrently display an onscreen keyboard and a content presentation region on the touch-sensitive display, wherein the content presentation region displays text input received from the onscreen keyboard;
   detect a touch input on the onscreen keyboard displayed on the touch-sensitive display, wherein detecting the touch input includes detecting movement of a contact and liftoff of the contact;
   in response to detecting the touch input on the onscreen keyboard displayed on the touch-sensitive display:
      in accordance with a determination that the touch input satisfies text-selection criteria, wherein the text-selection criteria include a criterion that is met when a characteristic intensity of the contact increases above a text-selection intensity threshold, perform a text selection operation based on the movement of the contact that includes:
         in response to detecting an increase in the characteristic intensity of the contact above the text-selection intensity threshold, changing an appearance of the onscreen keyboard;
         in response to detecting movement of the contact while the appearance of the onscreen keyboard has been changed, performing the text selection operation based on the movement of the contact and,
         in response to detecting liftoff of the contact from the touch-sensitive display, reversing the change in appearance of the onscreen keyboard that occurred in response to detecting the increase in the characteristic intensity of the contact above the text-selection intensity threshold; and,
      in accordance with a determination that the touch input satisfies text-entry criteria, wherein the text-entry criteria include a criterion that is met when the characteristic intensity of the contact does not increase above the text-selection intensity threshold, enter text into the content presentation region based on the touch input.

54. The computer readable storage medium of claim 53, wherein the text-entry criteria include a criterion that is met when the contact does not move outside of the onscreen keyboard before liftoff of the contact is detected.

55. The computer readable storage medium of claim 53, wherein the text-selection criteria include a criterion that is met when the contact does not move more than a threshold distance before detecting an increase in the characteristic intensity of the contact above the text-selection intensity threshold.

56. The computer readable storage medium of claim 53, wherein the text-selection operation includes one of: moving a cursor within the content region or selecting text within the content region.

57. The computer readable storage medium of claim 53, including instructions, which when executed by the electronic device with the touch-sensitive display and the one or more sensors, cause the electronic device to, in response to detecting that the text-selection criteria have been met, generate a tactile output that is indicative of an entry into a text selection mode of operation.

58. The computer readable storage medium of claim 53, wherein changing the appearance of the onscreen keyboard includes maintaining display of keys in the onscreen keyboard while obscuring characters displayed on the keys of the onscreen keyboard.

59. The computer readable storage medium of claim 58, wherein reversing the change in appearance of the onscreen keyboard reveals the characters on the keys of the onscreen keyboard.

60. The computer readable storage medium of claim 53, including instructions, which when executed by the electronic device with the touch-sensitive display and the one or more sensors, cause the electronic device to, when the touch input satisfies the text-selection criteria, detect movement of the contact after the touch input has satisfied the text-selection criteria and move a cursor in the content region in accordance with the movement of the contact detected after the touch input has satisfied the text-selection criteria.

61. The computer readable storage medium of claim 53, including instructions, which when executed by the electronic device with the touch-sensitive display and the one or more sensors, cause the electronic device to:
   when the touch input satisfies the text-selection criteria, detect a first subsequent change in the characteristic intensity of the contact followed by additional movement of the contact on the touch-sensitive display; and, in response to detecting the first subsequent change in the characteristic intensity of the contact:

in accordance with a determination that the touch input satisfies selection-start criteria, wherein the selection-start criteria include a criterion that is met when the characteristic intensity of the contact increases above a selection-start intensity threshold, start to select content in the content region at a location of a cursor in accordance with the additional movement of the contact; and in accordance with a determination that the touch input does not satisfy the selection-start criteria, move the cursor in accordance with the additional movement of the contact without starting to select content in the content region.

62. The computer readable storage medium of claim 61, including instructions, which when executed by the electronic device with the touch-sensitive display and the one or more sensors, cause the electronic device to when the touch input satisfies selection-start criteria, after starting to select content in the content region, detect liftoff of the contact from the touch-sensitive display and confirm the selection in response to detecting the liftoff of the contact.

63. The computer readable storage medium of claim 61, including instructions, which when executed by the electronic device with the touch-sensitive display and the one or more sensors, cause the electronic device to:

when the touch input satisfies selection-start criteria, after starting to select content in the content region, and while continuing to detect the contact on the touch-sensitive display, detect a second subsequent change in intensity of the contact:

in response to detecting the second subsequent change in the characteristic intensity of the contact:

in accordance with a determination that the second subsequent change in the characteristic intensity of the contact satisfies selection-cancellation criteria, wherein the selection-cancellation criteria include a criterion that is met when the characteristic intensity of the contact increases above a selection-cancellation intensity threshold, cancel the selection; and in accordance with a determination that the second subsequent change in the characteristic intensity of the contact does not satisfy the selection-cancellation criteria, maintain the selection.

64. The computer readable storage medium of claim 63, wherein the selection-cancellation criterion include a criterion that is met when the contact moves no more than a threshold distance within a threshold amount of time before the characteristic intensity of the contact increases above the selection-cancellation intensity threshold.

65. The computer readable storage medium of claim 63, including instructions, which when executed by the electronic device with the touch-sensitive display and the one or more sensors, cause the electronic device to, in response to detecting that the selection-cancellation criteria have been met, generate a tactile output that is indicative of an exit from the text selection mode of operation.

66. The computer readable storage medium of claim 63, including instructions, which when executed by the electronic device with the touch-sensitive display and the one or more sensors, cause the electronic device to:

after canceling the selection, and while continuing to detect the contact on the touch-sensitive display, detect a third subsequent change in the characteristic intensity of the contact; and, in response to detecting the third subsequent change in the characteristic intensity of the contact:

in accordance with a determination that the touch input satisfies the selection-start criteria, start to select content in the content region at a location of the cursor; and in accordance with a determination that the touch input does not satisfy the selection-start criteria, forgo starting to select content in the content region.

67. The computer readable storage medium of claim 66, wherein starting to select content in response to detecting the third subsequent change in the characteristic intensity of the contact includes selecting a respective word at the location of the cursor.

68. The computer readable storage medium of claim 67, wherein the selected respective word is a first word, and the one or more programs comprise instructions, which when executed by the electronic device cause the device to:

while the first word is selected, detect first subsequent movement of the contact; and in response to detecting the first subsequent movement of the contact while the first word is selected:

in accordance with a determination that the touch input meets selection-movement criteria which includes a movement criterion that is met when the contact moves more than a respective threshold amount:

cancel selection of the first word; and select a second word that is adjacent to the first word in a first direction in accordance with the first subsequent movement of the contact, such that the selected respective word is the second word.

69. The computer readable storage medium of claim 67, including instructions, which when executed by the electronic device with the touch-sensitive display and the one or more sensors, cause the electronic device to:

while the respective word is selected, detect first subsequent movement of the contact; and in response to detecting the first subsequent movement of the contact while the respective word is selected:

in accordance with a determination that the touch input meets selection-expansion criteria which includes a movement criterion that is met when the contact moves more than a respective threshold amount, expand the selection to include a word that is adjacent to the respective word in a first direction in accordance with the first subsequent movement of the contact.

70. The computer readable storage medium of claim 67, including instructions, which when executed by the electronic device with the touch-sensitive display and the one or more sensors, cause the electronic device to:

while the respective word is selected, detect a fourth subsequent change in the characteristic intensity of the contact above a respective intensity threshold; and, in response to detecting the fourth subsequent change in the characteristic intensity of the contact, in accordance with a determination that the touch input meets the selection-cancellation criteria, which includes a criterion that is met when the amount of time between when the third subsequent change in the characteristic intensity of the contact is detected and when the fourth subsequent change in the characteristic intensity of the contact is detected is greater than the delay threshold, cancel selection of the respective word.

71. The computer readable storage medium of claim 67, including instructions, which when executed by the electronic device with the touch-sensitive display and the one or more sensors, cause the electronic device to:
while the respective word is selected, detect a fourth subsequent change in the characteristic intensity of the contact above a respective intensity threshold; and,
in response to detecting the fourth subsequent change in the characteristic intensity of the contact, in accordance with a determination that the touch input meets sentence-selection criteria which include
a movement criterion that is met when the contact moves less than a threshold amount within a threshold time period before the fourth subsequent change in intensity of the contact was detected and
a time criterion that is met when an amount of time between when the third subsequent change in the characteristic intensity of the contact is detected and when the fourth subsequent change in the characteristic intensity of the contact is detected is less than a delay threshold,
expand the selection to include the respective sentence that contains the respective word.

72. The computer readable storage medium of claim 71, including instructions, which when executed by the electronic device with the touch-sensitive display and the one or more sensors, cause the electronic device to:
while the respective sentence is selected, detect second subsequent movement of the contact; and
in response to detecting the second subsequent movement of the contact while the respective sentence is selected:
in accordance with a determination that the touch input meets selection-expansion criteria which includes a movement criterion that is met when the contact moves more than a respective threshold amount, expand the selection to include a sentence that is adjacent to the respective sentence in a first direction in accordance with the second subsequent movement of the contact.

73. The computer readable storage medium of claim 71, wherein the respective sentence is selected in response to the fourth subsequent change in the characteristic intensity of the contact and the one or more programs comprise instructions, which when executed by the electronic device cause the device to:
detect a fifth subsequent change in the characteristic intensity of the contact above the respective intensity threshold; and,
in response to detecting the fifth subsequent change in the characteristic intensity of the contact, in accordance with a determination that the touch input meets the selection-cancellation criteria, which includes a criterion that is met when the amount of time between when the fourth subsequent change in the characteristic intensity of the contact is detected and when the fifth subsequent change in the characteristic intensity of the contact is detected is greater than the delay threshold, cancel selection of the respective sentence.

74. The computer readable storage medium of claim 73, including instructions, which when executed by the electronic device with the touch-sensitive display and the one or more sensors, cause the electronic device to:
in response to detecting the fifth subsequent change in the characteristic intensity of the contact, in accordance with a determination that the touch input meets paragraph-selection criteria which include
a movement criterion that is met when the contact moves less than the threshold amount within the threshold time period before the fifth subsequent change in intensity of the contact was detected and
a time criterion that is met when an amount of time between when the fourth subsequent change in the characteristic intensity of the contact is detected and when the fifth subsequent change in the characteristic intensity of the contact is detected is less than the delay threshold,
expand the selection to include the respective paragraph that contains the respective sentence.

75. The computer readable storage medium of claim 74, including instructions, which when executed by the electronic device with the touch-sensitive display and the one or more sensors, cause the electronic device to:
while the respective paragraph is selected, detect third subsequent movement of the contact; and
in response to detecting the third subsequent movement of the contact while the respective paragraph is selected:
in accordance with a determination that the touch input meets selection-expansion criteria which includes a movement criterion that is met when the contact moves more than a respective threshold amount, expand the selection to include a paragraph that is adjacent to the respective paragraph in a first direction in accordance with the third subsequent movement of the contact.

76. The computer readable storage medium of claim 75, wherein the respective paragraph is selected in response to the fifth subsequent change in the characteristic intensity of the contact and the one or more programs comprise instructions, which when executed by the electronic device cause the device to, while the respective paragraph is selected:
detect a sixth subsequent change in the characteristic intensity of the contact above the respective intensity threshold; and,
in response to detecting the sixth subsequent change in the characteristic intensity of the contact, in accordance with a determination that the touch input meets selection-cancellation criteria, which includes a criterion that is met when the amount of time between when the fifth subsequent change in the characteristic intensity of the contact is detected and when the sixth subsequent change in the characteristic intensity of the contact is detected is greater than the delay threshold, cancel selection of the respective paragraph.

77. The computer readable storage medium of claim 76, including instructions, which when executed by the electronic device with the touch-sensitive display and the one or more sensors, cause the electronic device to:
in response to detecting the sixth subsequent change in the characteristic intensity of the contact, in accordance with a determination that the touch input meets document selection criteria which include
a movement criterion that is met when the contact moves less than the threshold amount within the threshold time period before the sixth subsequent change in intensity of the contact was detected and
a time criterion that is met when an amount of time between when the fifth subsequent change in the characteristic intensity of the contact is detected and when the sixth subsequent change in the characteristic intensity of the contact is detected is less than the delay threshold, expand the selection to include the respective document that contains the respective paragraph.

78. The computer readable storage medium of claim 53, wherein the contact in the touch input is a continuously detected contact and touchdown of the contact is detected at a location of a character key in the onscreen keyboard.

79. A non-transitory computer readable storage medium storing one or more programs, the one or more programs comprising instructions, which when executed by an electronic device with a touch-sensitive display and one or more sensors to detect intensities of contacts with the touch-sensitive display, cause the device to:
concurrently display an onscreen keyboard and a content presentation region on the touch-sensitive display, wherein the content presentation region displays text input received from the onscreen keyboard;
detect a touch input by a contact on the onscreen keyboard displayed on the touch-sensitive display, wherein detecting the touch input includes
detecting touchdown of the contact at a location of a character key in the onscreen keyboard,
detecting movement of the contact on the onscreen keyboard displayed on the touch-sensitive display, and
detecting liftoff of the contact from the touch-sensitive display;
in response to detecting the touch input by the contact on the onscreen keyboard displayed on the touch-sensitive display:
in accordance with a determination that the touch input on the onscreen keyboard satisfies text-selection criteria, wherein the text-selection criteria include a criterion that is met when a characteristic intensity of the contact increases above a text-selection intensity threshold, perform a text selection operation based on the movement of the contact on the onscreen keyboard displayed on the touch-sensitive display, wherein performing the text selection operation includes:
in response to detecting an increase in the characteristic intensity of the contact above the text-selection intensity threshold, changing an appearance of the onscreen keyboard;
in response to detecting movement of the contact on the onscreen keyboard while the appearance of the onscreen keyboard has been changed, performing the text selection operation based on the movement of the contact; and,
in response to detecting liftoff of the contact from the touch-sensitive display, reversing the change in appearance of the onscreen keyboard that occurred in response to detecting the increase in the characteristic intensity of the contact above the text-selection intensity threshold; and,
in accordance with a determination that the touch input on the onscreen keyboard satisfies text-entry criteria, wherein the text-entry criteria include a criterion that is met when the characteristic intensity of the contact does not increase above the text-selection intensity threshold, enter text into the content presentation region based on the touch input.

\* \* \* \* \*